US012179539B2

(12) United States Patent
Anderson et al.

(10) Patent No.: US 12,179,539 B2
(45) Date of Patent: Dec. 31, 2024

(54) ACTIVE VEHICLE SUSPENSION SYSTEM

(71) Applicant: ClearMotion, Inc., Billerica, MA (US)

(72) Inventors: Zackary Martin Anderson, Cambridge, MA (US); Shakeel Avadhany, Cambridge, MA (US); Matthew D. Cole, Boston, MA (US); Robert Driscoll, Derry, NH (US); John Giarratana, Whitman, MA (US); Marco Giovanardi, Melrose, MA (US); Vladimir Gorelik, Medford, MA (US); Jonathan R. Leehey, Wayland, MA (US); William G. Near, Boston, MA (US); Patrick W. Neil, Randolph, MA (US); Colin Patrick O'Shea, Cambridge, MA (US); Tyson David Sawyer, Mason, NH (US); Johannes Schneider, Cambridge, MA (US); Clive Tucker, Charlestown, MA (US); Ross J. Wendell, Medford, MA (US); Richard Anthony Zuckerman, Somerville, MA (US)

(73) Assignee: ClearMotion, Inc., Billerica, MA (US)

( * ) Notice: Subject to any disclaimer, the term of this patent is extended or adjusted under 35 U.S.C. 154(b) by 0 days.

(21) Appl. No.: 18/491,335

(22) Filed: Oct. 20, 2023

(65) Prior Publication Data

US 2024/0300275 A1 Sep. 12, 2024

Related U.S. Application Data

(63) Continuation of application No. 17/324,821, filed on May 19, 2021, now Pat. No. 11,850,905, which is a
(Continued)

(51) Int. Cl.
*B60G 17/052* (2006.01)
*B60G 13/14* (2006.01)
(Continued)

(52) U.S. Cl.
CPC .......... *B60G 17/052* (2013.01); *B60G 13/14* (2013.01); *B60G 17/019* (2013.01); *F03G 7/08* (2013.01);
(Continued)

(58) Field of Classification Search
CPC .... B60G 17/052; B60G 17/019; B60G 13/14; B60G 2202/413; B60G 2300/06;
(Continued)

(56) References Cited

U.S. PATENT DOCUMENTS

| | | | |
|---|---|---|---|
| 3,610,611 | A | 10/1971 | Elliott et al. |
| 4,924,674 | A | 5/1990 | Hara et al. |

(Continued)

FOREIGN PATENT DOCUMENTS

| | | | |
|---|---|---|---|
| DE | 102011100307 | A1 | 11/2012 |
| EP | 1961960 | A2 | 8/2008 |

(Continued)

OTHER PUBLICATIONS

International Search Report and Written Opinion dated Oct. 29, 2014 in connection with International Application No. PCT/US2014/029654.

(Continued)

*Primary Examiner* — Peter D Nolan
*Assistant Examiner* — Wae L Louie
(74) *Attorney, Agent, or Firm* — Wolf, Greenfield & Sacks, P.C.

(57) ABSTRACT

A method of on-demand energy delivery to an active suspension system comprising an actuator body, hydraulic pump, electric motor, plurality of sensors, energy storage
(Continued)

facility, and controller is provided. The method comprises disposing an active suspension system in a vehicle between a wheel mount and a vehicle body, detecting a wheel event requiring control of the active suspension; and sourcing energy from the energy storage facility and delivering it to the electric motor in response to the wheel event.

39 Claims, 165 Drawing Sheets

Related U.S. Application Data continuation of application No. 16/020,668, filed on Jun. 27, 2018, now Pat. No. 11,021,033, which is a continuation of application No. 15/432,907, filed on Feb. 14, 2017, now Pat. No. 10,040,330, which is a continuation of application No. 14/602,463, filed on Jan. 22, 2015, now Pat. No. 9,702,349, which is a continuation of application No. PCT/US2014/029654, filed on Mar. 14, 2014.

(60) Provisional application No. 61/913,644, filed on Dec. 9, 2013, provisional application No. 61/865,970, filed on Aug. 14, 2013, provisional application No. 61/815,251, filed on Apr. 23, 2013, provisional application No. 61/789,600, filed on Mar. 15, 2013, provisional application No. 61/930,452, filed on Jan. 22, 2014.

(51) Int. Cl.
*B60G 17/019* (2006.01)
*F03G 7/08* (2006.01)

(52) U.S. Cl.
CPC .... *B60G 2202/413* (2013.01); *B60G 2300/06* (2013.01); *B60G 2300/60* (2013.01); *B60G 2600/182* (2013.01); *B60G 2800/012* (2013.01)

(58) Field of Classification Search
CPC .......... B60G 2300/60; B60G 2800/182; B60G 2800/012; F03G 7/08
See application file for complete search history.

(56) References Cited

U.S. PATENT DOCUMENTS 5,183,127 A 2/1993 Kageyama et al.
5,360,445 A 11/1994 Goldowsky
5,925,951 A 7/1999 Edwards et al.
6,025,665 A 2/2000 Poag et al.
6,161,844 A 12/2000 Charaudeau et al.
6,190,319 B1 2/2001 Goldowsky
6,227,817 B1 5/2001 Paden
6,923,298 B2 8/2005 Tanner
7,401,520 B2 7/2008 Parison
7,896,360 B2 3/2011 Buma
7,936,113 B2 * 5/2011 Namuduri ............. H02N 2/183 310/319
7,963,529 B2 6/2011 Oteman et al.
8,075,002 B1 12/2011 Pionke et al.
8,112,198 B2 2/2012 Parison, Jr. et al.
8,143,766 B2 * 3/2012 Namuduri ............. H02N 2/186 310/339
8,253,281 B2 * 8/2012 Namuduri ............ H02K 7/1876 310/34
8,466,639 B2 6/2013 Parison, Jr. et al.
8,471,418 B2 6/2013 Yamasaki
8,641,053 B2 2/2014 Pare et al.
8,781,681 B2 7/2014 Parison, Jr. et al.
8,840,118 B1 * 9/2014 Giovanardi ......... F15B 13/0444 280/124.157
8,966,889 B2 * 3/2015 Six ........................... F15B 1/04 60/413
9,035,477 B2 * 5/2015 Tucker .................... F01C 9/002 290/1 R
9,291,300 B2 3/2016 Parker et al.
9,676,244 B2 6/2017 Giovanardi et al.
10,160,276 B2 12/2018 Tucker et al.
11,850,905 B2 12/2023 Anderson et al.
2003/0000765 A1 1/2003 Spadafora
2003/0077183 A1 4/2003 Franchet et al.
2004/0096334 A1 5/2004 Aldinger et al.
2008/0190104 A1 8/2008 Bresie
2009/0060728 A1 3/2009 Grimes et al.
2009/0065314 A1 * 3/2009 Kondo .................... F16F 15/03 188/290
2009/0143936 A1 6/2009 Craig
2009/0192674 A1 * 7/2009 Simons ................ B60G 17/021 701/37
2009/0241537 A1 * 10/2009 Browne ................. B60J 11/025 60/527
2009/0260935 A1 10/2009 Avadhany et al.
2010/0072760 A1 3/2010 Anderson et al.
2010/0244457 A1 * 9/2010 Bhat ...................... H02N 2/186 310/319
2011/0243759 A1 10/2011 Ozaki et al.
2011/0254388 A1 10/2011 Yamasaki
2011/0293450 A1 12/2011 Grimes et al.
2011/0303049 A1 12/2011 Neelakantan et al.
2012/0161590 A1 6/2012 Yamasaki et al.
2012/0181757 A1 7/2012 Oteman et al.
2013/0060444 A1 * 3/2013 Matsunaga ............ B60K 6/485 701/99
2013/0104534 A1 * 5/2013 Six .......................... F15B 1/027 60/413
2013/0147205 A1 * 6/2013 Tucker ................. B60G 11/265 290/1 A
2013/0154280 A1 6/2013 Tucker et al.
2014/0030122 A1 1/2014 Ozaki et al.
2014/0265169 A1 9/2014 Giovanardi et al.
2014/0265170 A1 * 9/2014 Giovanardi ........... F16K 11/065 280/5.5
2014/0294625 A1 10/2014 Tucker et al.
2015/0152888 A1 * 6/2015 Six ..................... B60G 17/0416 60/413
2015/0224845 A1 * 8/2015 Anderson ................. F03G 7/08 701/37
2015/0343874 A1 12/2015 Kurata et al.
2021/0339595 A1 11/2021 Anderson et al.

FOREIGN PATENT DOCUMENTS

WO WO 2005/108128 A2 11/2005
WO WO 2012/149949 A1 11/2012
WO WO 2012/167316 A1 12/2012

OTHER PUBLICATIONS

International Preliminary Report on Patentability dated Sep. 24, 2015 in connection with International Application No. PCT/ US2014/ 029654.

* cited by examiner

Fig 89

| Event Type | Intervention Benefit | Intervention Cost | Performance Factor |
|---|---|---|---|
| Smooth Road | 5 | 30 | 6 |
| Medium Roughness Road | 8 | 40 | 4 |
| Rough Road | 45 | 90 | 3 |
| Single-Sided Large Bump | 100 | 100 | 1 |
| Single-Sided Small Bump | 90 | 80 | 0.89 |
| Double-Sided Large Bump | 70 | 100 | 1.42 |
| Double-Sided Small Bump | 80 | 90 | 1.12 |
| Driveway Entrance | 100 | 70 | 0.7 |

ACTIVE VEHICLE SUSPENSION SYSTEM

CROSS REFERENCE TO RELATED APPLICATIONS

This application is a continuation of U.S. patent application Ser. No. 17/324,821, filed May 19, 2021, which is a continuation of U.S. patent application Ser. No. 16/020,668, filed Jun. 27, 2018, which is a continuation of U.S. patent application Ser. No. 15/432,907, filed Feb. 14, 2017, which is a continuation of U.S. patent application Ser. No. 14/602,463, filed Jan. 22, 2015, which is a continuation of International Application PCT/US2014/029654, filed Mar. 14, 2014, which claims the benefit of priority under 35 U.S.C. § 119(e) of U.S. provisional application Ser. No. 61/789,600, filed Mar. 15, 2013, U.S. provisional application Ser. No. 61/815,251, filed Apr. 23, 2013, U.S. provisional application Ser. No. 61/865,970, filed Aug. 14, 2013, and U.S. provisional application Ser. No. 61/913,644, filed Dec. 9, 2013, the disclosures of each of which are incorporated herein by reference in their entirety. U.S. patent application Ser. No. 14/602,463 also claims the benefit of priority under 35 U.S.C. § 119(e) of U.S. provisional application Ser. No. 61/930,452, filed Jan. 22, 2014, the disclosure of which is incorporated by reference herein in its entirety.

BACKGROUND

Field

The methods and systems described herein relate to improvements in active vehicle suspension.

Art

Current active suspension systems can benefit from improvements in power, efficiency, architecture, size, and compatibility, many of which are described herein.

SUMMARY

Active Suspension with on-Demand Energy Flow

In one embodiment, an active suspension system includes a hydraulic actuator including an extension volume and a compression volume. The hydraulic actuator is constructed and arranged to be coupled to a vehicle wheel or suspension member. A hydraulic motor is in fluid communication with the extension volume and the compression volume of the hydraulic actuator to control extension and compression of the hydraulic actuator. An electric motor is also operatively coupled to the hydraulic motor. A controller is electrically coupled to the electric motor, and the controller controls a motor input of the electric motor to operate the hydraulic actuator in at least three of four quadrants of a force velocity domain of the hydraulic actuator.

In another embodiment, a method for controlling an active suspension system includes: controlling a motor input of an electric motor to operate a hydraulic actuator in at least three of four quadrants of a force velocity domain of the hydraulic actuator, wherein the hydraulic actuator is constructed and arranged to be coupled to a vehicle wheel or suspension member, and wherein the electric motor is operatively coupled to a hydraulic motor in fluid communication with an extension volume and a compression volume of the hydraulic actuator to control extension and compression of the hydraulic actuator.

In yet another embodiment, an active suspension system includes a hydraulic actuator including an extension volume and a compression volume. The hydraulic actuator is constructed and arranged to be coupled to a vehicle wheel or suspension member. A hydraulic motor-pump is in fluid communication with the extension volume and the compression volume of the hydraulic actuator to control extension and compression of the hydraulic actuator. An electric motor is also operatively coupled to the hydraulic motor, and a sensor is configured and arranged to sense wheel events and/or body events. A controller is electrically coupled to the electric motor and the sensor. Additionally, in response to a sensed wheel event and/or a sensed body event, the controller applies a motor input to the electric motor to control the hydraulic actuator.

In another embodiment, a method for controlling an active suspension system includes: sensing a wheel event and/or a body event; and applying a motor input to an electric motor in response to the sensed wheel event and/or the body event, wherein the electric motor is operatively coupled to a hydraulic motor-pump in fluid communication with an extension volume and a compression volume of a hydraulic actuator.

In yet another embodiment, an actuation system includes a hydraulic actuator including an extension volume and a compression volume. A hydraulic motor is in fluid communication with the extension volume and the compression volume of the hydraulic actuator to control extension and compression of the hydraulic actuator. Also, an electric motor is operatively coupled to the hydraulic motor. The actuation system has a reflected system inertia and a system compliance, and a product of the system compliance times the reflected system inertia is less than or equal to about $0.0063\ s^{-2}$.

In another embodiment, a device includes a housing including a first port and a second port. A hydraulic motor-pump is disposed within the housing, and the hydraulic motor-pump controls a flow of fluid between the first port and the second port. An electric motor is disposed within the housing and operatively coupled to the hydraulic motor. Additionally, a controller electrically coupled to the electric motor and disposed within the housing controls a motor input of the electric motor.

In yet another embodiment, an active suspension system includes an active suspension housing, and a hydraulic motor-pump disposed within the active suspension housing. The hydraulic motor controls a flow of fluid through the active suspension housing. An electric motor is disposed within the active suspension housing and operatively coupled to the hydraulic motor. Also, a controller is electrically coupled to the electric motor and disposed within the active suspension housing. The controller controls a motor input of the electric motor.

In another embodiment, a vehicle includes one or more active suspension actuators, where each active suspension actuator includes a hydraulic actuator including an extension volume and a compression volume. A hydraulic motor-pump is in fluid communication with the extension volume and the compression volume of the hydraulic actuator to control extension and compression of the hydraulic actuator. An electric motor is operatively coupled to the hydraulic motor-pump, and a controller is electrically coupled to the electric motor. The controller controls a motor input of the electric motor to control the hydraulic actuator.

In another embodiment, a device includes a housing and a pressure-sealed barrier located in the housing disposed between a first portion of the housing and a second portion of the housing. The first portion is constructed and arranged to be filled with a fluid subjected to a variable pressure relative to the second portion. Additionally, an electrical feed-through passes from the first portion of the housing to the second portion of the housing through the pressure-sealed barrier. A compliant connection is electrically connected to the electrical feed-through and is also electrically connected to a controller disposed on or within the housing.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

Self Powered Adaptive Suspension

An on-demand energy hydraulic actuator, where motor torque is controlled to directly control actuator response, may be associated with a self-powered architecture where the damping and/or active function is at least partially powered by regenerated energy. In one embodiment, an active suspension with on demand energy delivery may contain a hydraulic pump that can be backdriven as a hydraulic motor. This can be coupled to an electric motor that may be backdriven as an electric generator. An on-demand energy controller may provide for regenerative capability, wherein regenerated energy from the hydraulic machine (pump) is transferred to the electric machine (motor), and delivered to a power bus containing energy storage. By controlling the amount of energy recovered, the effective impedance on the electric motor may be controlled. This can set a given damping force. In this way, damping force can be controlled without consuming energy.

Further, the on-demand energy controller and other associated power electronics may be optionally run off the power bus such that the regenerated energy is at least partially used to power the control circuit. In one embodiment, upon the first induced high velocity movement of the electric motor, a voltage surge may overcome the reverse biased diode in an H-bridge motor controller, thus conducting energy from the motor to the power bus. If the controller is powered off this bus (either directly or via an intermediate regulated power supply), the controller can wake up and start controlling the active suspension. In one embodiment, energy storage on the power bus may be sized to accommodate regenerative spikes, and then this energy can be used to actively control the wheel movement (bidirectional energy flow).

Several advantages may be achieved by combining an active suspension with a self-powered architecture. An active suspension may be failure tolerant of a power bus failure, wherein the system can still provide damping, even controlled damping with a bus failure. Another advantage is the potential for a retrofittable semi-active or fully active suspension that may be installed OEM or aftermarket on vehicles and not require any wires or power connections. Such a system may communicate with each damper device wirelessly. Energy to power the system may be obtained through recuperating dissipated energy from damping. This has the advantage of being easy to install and lower cost. Another advantage is for an energy efficient active suspension. By utilizing the regenerated energy in the active suspension, DC/DC converter losses can be minimized such that recuperated energy is not delivered back to the vehicle, but rather, stored and then used directly in the suspension at a later time.

Energy Neutral

An on-demand energy hydraulic actuator, where motor torque is controlled to directly control actuator response, may be associated with an energy neutral active suspension control system, wherein the active suspension control system harvests energy during a regenerative cycle by withdrawing energy from the active suspension and storing it for later use by the active suspension. In one embodiment for example, a controller can output energy into the motor only when it is needed due to wheel or body movement (on-demand energy delivery), and recover energy during damping, thus achieving roughly energy neutral operation. Here, power consumption for the entire active suspension may be energy neutral (e.g. under 100 watts). This may be particularly advantageous in order to make an active suspension that is highly energy efficient.

Using Voltage Bus Levels to Signal

An on-demand energy hydraulic actuator, where motor torque is controlled to directly control actuator response, may be associated with an electronics architecture that uses an energy bus with voltage levels that can be used to signal active suspension system conditions. For example, an active suspension with on demand energy delivery may be powered by a loosely regulated DC bus that fluctuates between 40 and 50 volts. When the bus is below a lower threshold, say 42 volts, the active suspension controller for each actuator may reduce its energy consumption by operating in a more efficient state or reducing the amount of force it commands, or for how long it commands force (e.g. during a roll event, the controller allows the vehicle to increasingly lean by relaxing the anti-roll mitigation to save energy). Additionally, a lower voltage may signal the active suspension actuators to bias towards a regenerative mode if the actuator is capable of energy recovery. Similarly, at a high voltage, the actuators may reduce energy recovery or dissipate damping energy in the windings of a motor in order to prevent an overvoltage. While this example was described using thresholds, it may also be implemented in a continuous manner wherein the active suspension is simply controlled as some function of the voltage of its power bus.

Such a system may have several advantages. For example, allowing the voltage to fluctuate increases the usable capacity of certain energy storage mechanisms such as super capacitors on the bus. It may also reduce the number of data connections in the system, or reduce the amount of data that needs to be transmitted over data connections such as CAN.

In some embodiments the power bus may even be used to transmit data through a variety of communication of power line modulation schemes in order to transmit data such as force commands and sensor values.

Energy Storage

An on-demand energy hydraulic actuator, where motor torque is controlled to directly control actuator response, may be associated with an energy storage device such as super capacitors or lithium ion batteries. For example, the active suspension may be at least partially during at least one mode powered by energy contained in an energy storage medium. This has the advantage of limiting energy consumption from the vehicle's electrical system during peak power demands from the active suspension. In such cases, the instantaneous energy consumption in the active suspension may be lower than the instantaneous energy draw from the vehicle's electrical system. Energy storage can effectively decouple energy usage in the active suspension from energy usage on the vehicle power bus. Likewise, regenerated energy can be buffered and energy storage can be used to reduce the number and size of power spikes on the vehicle electrical system.

Vehicular High Power Electrical System

An on-demand energy hydraulic actuator, where motor torque is controlled to directly control actuator response, may be associated with a vehicular high power electrical system that operates at a voltage different from (e.g. higher than) the vehicle's primary electrical system. For example, multiple active suspension power units may be energized from a common high power electrical bus operating at a voltage such as 48 volts, with a DC/DC converter between the high power bus and the vehicle's electrical system. Several devices in addition to the active suspension may be powered from this bus, such as electric power steering (EPS). This high power bus may be galvantically isolated from the vehicle's primary electrical system using transformer-based DC/DC converter between the two buses. In some embodiments the high power electrical system may be loosely regulated, with devices allowing voltage swing within some range. In some embodiments the high power electrical system may be operatively connected to energy storage such as capacitors and/or rechargeable batteries. These can be directly controlled to the bus and referenced to ground; connected between the vehicle electrical system and the high power electrical system; or connected via an auxiliary DC/DC converter. Certain other connections exist, such as a split DC/DC converter connecting the vehicle electrical system, the high power bus, and the energy storage.

By combining an active suspension with a power bus that is independent of the vehicle's electrical system, several advantages may be achieved. The vehicle's electrical system may be isolated from voltage spikes and electrical noise from high power consumers such as suspension actuators. The DC/DC converter may be able to employ dynamic energy limits so that too many loads do not overtax the vehicle's electrical system. By running the high power bus at a voltage higher than the vehicle's electrical system, the system may operative more efficiently by reducing current flow in the power cables and the motor windings. In addition, the active suspension actuators may be able to operate at higher velocities with a given motor winding.

Rotor Position Sensing

An on-demand energy hydraulic actuator, where motor torque is controlled to directly control actuator response, may be coupled with a rotor position sensor that senses the position and/or velocity of the electric motor. This sensor may be operatively coupled to the electric motor directly or indirectly. For example, motor position may be sensed without contact using a magnetic or optical encoder. In another embodiment, rotor position may be measured by measuring the hydraulic pump position, which may be relatively fixed with respect to the electric motor position. This rotor position or velocity information may be used by a controller connected to the electric motor. The position information may be used for a variety of purposes such as: motor commutation (e.g. in a BLDC motor); actuator velocity estimation (which may be a function of rotor velocity for systems with a substantially positive displacement pump); electronic cancellation of pressure fluctuations and ripples; and actuator position estimation (by integrating velocity, and potentially coupling the sensor with an absolute position indicator such as a magnetic switch somewhere in the actuator stroke travel such that activation of the switch implies the actuator position is in a specific location).

By coupling an active suspension containing an electric motor and/or hydraulic pump with a rotary position sensor coupled to it, the system may be more accurately and efficiently controlled.

Predictive Inertia Algorithms

An on-demand energy hydraulic actuator, where an electric motor is moved in lockstep with the active suspension movement (linear travel of the actuator) in at least one mode, may be combined with an algorithm that predicts inertia of the electric motor and controls the motor torque to at least partially reduce the effect of inertia. For example, for a hydraulic active suspension that has a hydraulic pump operatively connected to an electric motor, wherein the pump is substantially positive displacement, a fast pothole hit to the wheel will create a surge in hydraulic fluid pressure and accelerate the pump and motor. The inertia of the rotary element (the pump and motor in this case) will resist this acceleration, creating a force in the actuator, which will counteract compliance of the wheel. This creates harshness in the ride of the vehicle, and may be undesirable. Such a system employing predictive analytic algorithms that factor inertia in the active suspension control may control motor torque at a command torque lower than the desired torque during acceleration events, and at a higher torque that the desired torque during deceleration events. The delta between the command torque of the motor and the desired torque (such as the control output from a vehicle dynamics algorithm) is a function of the rotor or actuator acceleration. Additionally, the mass and physical properties of the rotor may be incorporated in the algorithm. In some embodiments acceleration is calculated from a rotor velocity sensor (by taking the derivative), or by one or two differential accelerometers on the suspension. In some cases the controller employing inertia mitigation algorithms may actively accelerate the mass.

Coupling an active suspension with algorithms that reduce inertia of an electric motor and its connected components (e.g. a hydraulic pump rotor) may be highly desirable because it can reduce ride harshness on rough roads.

Integrated Activalve

An on-demand energy hydraulic actuator, where motor torque is controlled to directly control actuator response, may be accomplished with a highly integrated power pack. This may be a single body active suspension actuator comprising an electric motor, an electronic (torque or speed) motor controller, and a sensor in a housing. In another embodiment, it may be accomplished with a single body actuator comprising an electric motor, a hydraulic pump, and an electronic motor controller in a housing. In another embodiment, it may be accomplished by a single body valve comprising an electric motor, a hydraulic pump, and an electronic motor controller in a fluid filled housing. In another embodiment, it may be accomplished with a single body valve comprising a hydraulic pump, an electric motor that controls operation of the hydraulic pump, an electronic motor controller, and one or more sensors, in a housing. In another embodiment, it may be accomplished with an actuator comprising an electric motor, a hydraulic pump, and a piston, wherein the actuator facilities communication of fluid through a body of the actuator and into the hydraulic pump. In another embodiment, it may be accomplished with a vehicle active suspension system comprising a hydraulic motor disposed proximal to each wheel of the vehicle that produces wheel-specific variable flow/variable pressure, and a controllable electric motor disposed proximal to each hydraulic motor for controlling wheel movement via the hydraulic motor. In another embodiment, this may be accomplished with a vehicle wheel-well compatible active suspension actuator comprising a piston rod disposed in an actuator body, a hydraulic motor, an electric motor, an electronic motor controller, and a passive valve disposed in the actuator body or power pack and that operates either in parallel or series with the hydraulic motor, all packaged to fit within or near the vehicle wheel well.

The ability to package an active suspension with on demand energy delivery into a highly integrated package may be desirable to reduce integration complexity (e.g. eliminates the need to run long hydraulic hoses), improve durability by fully sealing the system, reduce manufacturing cost, improve response time, and reduce loses (electrical, hydraulic, etc.) from shorter distances between components.

Power and Energy Optimizing Algorithms

An on-demand energy hydraulic actuator, where motor torque is controlled to directly control actuator response, may be associated with power and/or energy optimizing control algorithms, wherein instantaneous power and/or energy over time are tracked and active suspension control is at least partially a function of the energy over time. For example, an active suspension may be controlled by an electronic controller that monitors energy consumption in each actuator or energy at the vehicle electrical system interface. If the actuators consume a large amount of energy for an extended period of time, for example, during an extended high lateral acceleration turn, the control algorithm may slowly allow the vehicle to roll, thus reducing the instantaneous power consumption, and over time will reduce the energy consumed (a lower average power). With an on-demand energy suspension, this may be directly utilized to deliver on-demand performance. For example, the electric motor driving the suspension unit may be directly controlled as a consequence of both vehicle dynamics algorithms and an average power consumed over a given window.

Combining an active suspension capable of adjusting its power consumed with energy optimizing algorithms can particularly enhance the efficiency of an active suspension. In addition, it may allow an active suspension to be integrated into a vehicle without compromising the current capacity of the alternator. For example, the suspension may adjust to reduce its instantaneous energy consumed in order to provide enough vehicle energy for other subsystems such as ABS braking, electric power steering, dynamic stability control, and engine ECUs.

Active Chassis Power Management for Power Throttling

An on-demand energy hydraulic actuator, where motor torque is controlled to directly control actuator response, may be associated with an active chassis power management system for power throttling, wherein a controller responsible for commanding the active suspension responds to energy needs of other devices on the vehicle such as active roll stabilization, electric power steering, etc. and/or energy availability information such as alternator status, battery voltage, and engine RPM.

In one embodiment, an active suspension capable of adjusting its power consumed may reduce its instantaneous and/or time-averaged power consumption if one of the following events occur: vehicle battery voltage drops below a certain threshold; alternator current output is low, engine RPM is low, and battery voltage is dropping at a rate that exceeds a threshold; an controller (e.g. ECU) on the vehicle commands a power consumer device (such as electric power steering) at high power (for example, during a sharp turn at low speed); an economy mode setting for the active suspension is activated, thus limiting the average power consumption over time.

Integration with Other Vehicle Control and Sensing Systems

An on-demand energy hydraulic actuator, where motor torque is controlled to directly control actuator response, may receive data from other vehicle control and sensing systems [such as GPS, self-driving parameters, vehicle mode setting (i.e. comfort/sport/eco), driver behavior (e.g. how aggressive is the throttle and steering input), body sensors (accelerometers, IMUs, gyroscopes from other devices on the vehicle), safety system status (ABS braking engaged, ESP status, torque vectoring, airbag deployment, etc.)], and then react based on this data. Reacting may mean changing the force, position, velocity, or power consumption of the actuator in response to the data.

For example, the active suspension may interface with GPS on board the vehicle. In one embodiment the vehicle contains (either locally or via a network connection) a map correlating GPS location with road conditions. In this embodiment, the active suspension may react in an anticipatory fashion to adjust the suspension in response to the location. For example, if the location of a speed bump is known, the actuators can start to lift the wheels immediately before impact. Similarly, topographical features such as hills can be better recognized and the system can respond accordingly. Since civilian GPS is limited in its resolution and accuracy, GPS data can be combined with other vehicle sensors such as an IMU (or accelerometers) using a filter such as a Kalman Filter in order to provide a more accurate position estimate.

In another example, the active suspension may not only receive data from other sensors, but may also command other vehicle subsystems. In a self-driving vehicle, the suspension may sense or anticipate rough terrain, and send a command to the self-driving control system to deviate to another road.

In another embodiment the vehicle may automatically generate the map described above by sensing road conditions using sensors associated with the active suspension and other vehicle devices.

By integrating an active suspension with other sensors and systems on the vehicle, the ride dynamics may be improved by utilizing predictive and reactive sensor data from a number of sources (including redundant sources, which may be combined and used to provide greater accuracy to the overall system). In addition, the active suspension may send commands to other systems such as safety systems in order to improve their performance. Several data networks exist to communicate this data between subsystems such as CAN (controller area network) and FlexRay.

Suspension as an Active Safety System

An on-demand energy hydraulic actuator, where motor torque is controlled to directly control actuator response, may be associated with an active safety system, wherein the suspension is controlled to improve the safety of the vehicle during a collision or dangerous vehicle state. In one embodiment, the active suspension with on-demand energy delivery is controlled to deliver a vehicle height adjustment when an imminent crash is detected in order to ensure the vehicle's bumper collides with the obstacle (for example, a stopped SUV ahead) so as to maximize the crumple zone or minimize the negative impact on the driver and passengers in the vehicle. In such an embodiment, the suspension may adjust to set ride height to optimize in any sort of pre or post-crash scenario. In another embodiment, the active suspension with on demand energy delivery can adjust wheel force and tire to road dynamics in order to improve traction during ABS braking events or electronic stability program (ESP) events. For example, the wheel can be pushed towards the ground to temporarily increase contact force (by utilizing the vertical inertia of the vehicle), and this can be pulsated.

For these instances, the on-demand energy capability can be utilized to rapidly throttle up energy in the active suspension on a per event basis in order to respond to the imminent safety threat. By exploiting the fast response time characteristics of an active suspension with on demand energy delivery in combination with an active safety system, where corrective action often has to occur under 100 ms, vehicle dynamics such as height, wheel position, and wheel traction, can be rapidly adjusted and can operate in unison with other safety systems and controllers on the vehicle.

Adaptive Controller for Hydraulic Power Packs

An on-demand energy hydraulic actuator, where motor torque is controlled to directly control actuator response, may be associated with an adaptive controller for hydraulic power packs, wherein the controller instantaneously controls energy in the hydraulic power pack of an active suspension in order to modify the kinematic characteristics of the actuator.

Active Truck Cabin Stabilization System

An on-demand energy hydraulic actuator, where motor torque is controlled to directly control actuator response, may be used as an active truck cab stabilization system to improve comfort, among other benefits. In one embodiment geared towards European-design trucks, four active suspension with on demand energy delivery actuators are disposed between the chassis of a heavy truck and the cabin. A spring sits in parallel with each actuator (i.e. coil spring, air spring, or leaf spring, etc.), and each assembly is placed roughly at the corner of the cabin. Sensors on the cabin and/or the chassis sense movement, and a control loop controlling the active suspension commands the actuators to keep the cabin roughly level. In an embodiment for North American-design trucks, two actuators are used at the rear of the cabin, with the front of the cabin hinged on the chassis. In some embodiments such a suspension may contain modified hinges and bushings to allow greater compliance in yaw/pitch/roll.

In some embodiments, the actuators may be placed in other locations, such as on an isolated truck bed or trailer to reduce vibration to the truck load.

In another embodiment, a single actuator with on demand energy delivery can be used in a suspended seat. Here, the seat (such as a truck seat) rides on a compliant device such as an air spring, and the actuator is connected in parallel to this complaint device. Sensors measure acceleration and control the seat height dynamically to reduce heave input to the individual sitting on the seat. In some instances the actuator may be placed off the vertical axis in order to affect motion in a different direction. By using a mechanical guide, this motion might not be limited to linear movement. In addition, multiple actuators may be used to provide more than one degree of freedom.

A long haul truck containing an active suspension may especially benefit by improving driver comfort and reducing driver fatigue. By using an active suspension with on demand energy delivery, the system can be smaller, easier to integrate, faster response time, and more energy efficient.

Active Suspension with Air Spring

An on-demand energy hydraulic actuator, where motor torque is controlled to directly control actuator response, may be associated with an air spring suspension in which static ride height is nominally provided by a chamber containing compressed air. In one embodiment, the active suspension actuator is of a standard hydraulic triple tube damper, with a side-mounted valve that contains a hydraulic pump and an electric motor. The valve porting and location is placed towards the base of the actuator body such that an airbag with folding bellows can fit around the actuator above the valve. With the valve such mounted, a standard air suspension airbag can be placed about the actuator body towards the top of the unit.

In another embodiment, the system just described contains hoses exiting the hydraulic damper near the bottom and leading towards an external power pack containing a hydraulic pump and an electric motor. As such, the physical structures of the active suspension actuator and the air spring can be united.

In another embodiment, the control systems for the on-demand energy delivery active suspension and the air suspension system can be coupled. In such a system, air pressure in the air suspension may be controlled in conjunction with the commanded force in the active suspension actuator. This may be controlled for the entire air spring system, or on a per-spring (per wheel) basis. The frequency of this control may be on a per event basis, or based on general road conditions. Generally, the response time of the active suspension actuator is faster than the air spring, but the air spring may be more effective in terms of energy consumption at holding a given ride height or roll force. As such, a controller may control the active suspension for rapid events by increasing the energy instantaneously in the on-demand energy system, while simultaneously increasing or decreasing pressure in the air spring system, thus making the air spring effectively an on-demand energy delivery device, albeit at a lower frequency.

By combining the controlled aspects of an active suspension that uses on-demand energy with an air spring that can also be controlled to dynamically change spring force, greater forces may be achieved in the suspension, adjustments can be more efficient, and the overall ride experience can be improved.

Low Inertia Material for Reduced Inertia Dependence

A hydraulic actuator with on demand energy delivery and a rotating element, where rotary motor torque is controlled in response to kinematic input into the actuator from an outside element, may utilize a low inertia material in the rotary element to reduce parasitic acceleration dependence. For example, the hydraulic pump and/or motor shaft may be produced from an engineered plastic in order to reduce rotary inertia. This has the benefit in an on-demand energy delivery system containing a positive displacement pump of reducing the transmissibility of high frequency input into the actuator (i.e. a graded road at high speed input on the wheel).

System and Method for Using Voltage Bus Levels to Signal System Conditions

Self Powered Adaptive Suspension

An active suspension with on demand energy delivery, where motor torque is controlled in response to road and/or wheel conditions, may be associated with a self-powered architecture where the damping and/or active function is at least partially powered by regenerated energy. In one embodiment, an active suspension with on demand energy delivery may contain a hydraulic pump that can be backdriven as a hydraulic motor. This can be coupled to an electric motor that may be backdriven as an electric generator. An on-demand energy controller may provide for regenerative capability, wherein regenerated energy from the hydraulic machine (pump) is transferred to the electric machine (motor), and delivered to a power bus containing energy storage. By controlling the amount of energy recovered, the effective impedance on the electric motor may be controlled. This can set a given damping force. In this way, damping force can be controlled without consuming energy.

Further, the on-demand energy controller and other associated power electronics may be optionally run off the power bus such that the regenerated energy is at least partially used to power the control circuit. In one embodiment, upon the first induced high velocity movement of the electric motor, a voltage surge may overcome the reverse biased diode in an H-bridge motor controller, thus conducting energy from the motor to the power bus. If the controller is powered off this bus (either directly or via an intermediate regulated power supply), the controller can wake up and start controlling the active suspension. In one embodiment, energy storage on the power bus may be sized to accommodate regenerative spikes, and then this energy can be used to actively control the wheel movement (bidirectional energy flow).

Several advantages may be achieved by combining an active suspension with a self-powered architecture. An active suspension may be failure tolerant of a power bus failure, wherein the system can still provide damping, even controlled damping with a bus failure. Another advantage is the potential for a retrofittable semi-active or fully active suspension that may be installed OEM or aftermarket on vehicles and not require any wires or power connections. Such a system may communicate with each damper device wirelessly. Energy to power the system may be obtained through recuperating dissipated energy from damping. This has the advantage of being easy to install and lower cost. Another advantage is for an energy efficient active suspension. By utilizing the regenerated energy in the active suspension, DC/DC converter losses can be minimized such that recuperated energy is not delivered back to the vehicle, but rather, stored and then used directly in the suspension at a later time.

Energy Neutral

An active suspension with on demand energy delivery, where motor torque is controlled in response to road and/or wheel conditions, may be associated with an energy neutral active suspension control system, wherein the active suspension control system harvests energy during a regenerative cycle by withdrawing energy from the active suspension and storing it for later use by the active suspension. In one embodiment for example, a controller can output energy into the motor only when it is needed due to wheel or body movement (on-demand energy delivery), and recover energy during damping, thus achieving roughly energy neutral operation. Here, power consumption for the entire active suspension may be energy neutral (e.g. under 100 watts). This may be particularly advantageous in order to make an active suspension that is highly energy efficient.

Using Voltage Bus Levels to Signal

An active suspension with on demand energy delivery, where motor torque is controlled in response to road and/or wheel conditions, may be associated with an electronics architecture that uses an energy bus with voltage levels that can be used to signal active suspension system conditions. For example, an active suspension with on demand energy delivery may be powered by a loosely regulated DC bus that fluctuates between 40 and 50 volts. When the bus is below a lower threshold, say 42 volts, the active suspension controller for each actuator may reduce its energy consumption by operating in a more efficient state or reducing the amount of force it commands, or for how long it commands force (e.g. during a roll event, the controller allows the vehicle to increasingly lean by relaxing the anti-roll mitigation to save energy). Additionally, a lower voltage may signal the active suspension actuators to bias towards a regenerative mode if the actuator is capable of energy recovery. Similarly, at a high voltage, the actuators may reduce energy recovery or dissipate damping energy in the windings of a motor in order to prevent an overvoltage. While this example was described using thresholds, it may also be implemented in a continuous manner wherein the active suspension is simply controlled as some function of the voltage of its power bus.

Such a system may have several advantages. For example, allowing the voltage to fluctuate increases the usable capacity of certain energy storage mechanisms such as super capacitors on the bus. It may also reduce the number of data connections in the system, or reduce the amount of data that needs to be transmitted over data connections such as CAN.

In some embodiments the power bus may even be used to transmit data through a variety of communication of power line modulation schemes in order to transmit data such as force commands and sensor values.

Energy Storage

An active suspension with on demand energy delivery, where motor torque is controlled in response to road and/or wheel conditions, may be associated with an energy storage device such as super capacitors or lithium ion batteries. For example, the active suspension may be at least partially during at least one mode powered by energy contained in an energy storage medium. This has the advantage of limiting energy consumption from the vehicle's electrical system during peak power demands from the active suspension. In such cases, the instantaneous energy consumption in the active suspension may be lower than the instantaneous energy draw from the vehicle's electrical system. Energy storage can effectively decouple energy usage in the active suspension from energy usage on the vehicle power bus. Likewise, regenerated energy can be buffered and energy storage can be used to reduce the number and size of power spikes on the vehicle electrical system.

Vehicular High Power Electrical System

An active suspension with on demand energy delivery, where motor torque is controlled in response to road and/or wheel conditions, may be associated with a vehicular high power electrical system that operates at a voltage different from (e.g. higher than) the vehicle's primary electrical system. For example, multiple active suspension power units may be energized from a common high power electrical bus operating at a voltage such as 48 volts, with a DC/DC converter between the high power bus and the vehicle's electrical system. Several devices in addition to the active suspension may be powered from this bus, such as electric power steering (EPS). This high power bus may be galvanically isolated from the vehicle's primary electrical system using transformer-based DC/DC converter between the two buses. In some embodiments the high power electrical system may be loosely regulated, with devices allowing voltage swing within some range. In some embodiments the high power electrical system may be operatively connected to energy storage such as capacitors and/or rechargeable batteries. These can be directly controlled to the bus and referenced to ground; connected between the vehicle electrical system and the high power electrical system; or connected via an auxiliary DC/DC converter. Certain other connections exist, such as a split DC/DC converter connecting the vehicle electrical system, the high power bus, and the energy storage.

By combining an active suspension with a power bus that is independent of the vehicle's electrical system, several advantages may be achieved. The vehicle's electrical system may be isolated from voltage spikes and electrical noise from high power consumers such as suspension actuators. The DC/DC converter may be able to employ dynamic energy limits so that too many loads do not overtax the vehicle's electrical system. By running the high power bus at a voltage higher than the vehicle's electrical system, the system may operative more efficiently by reducing current flow in the power cables and the motor windings. In addition, the active suspension actuators may be able to operate at higher velocities with a given motor winding.

Rotor Position Sensing

An active suspension with on demand energy delivery, where motor torque is controlled in response to road and/or wheel conditions, may be coupled with a rotor position sensor that senses the position and/or velocity of the electric motor. This sensor may be operatively coupled to the electric motor directly or indirectly. For example, motor position may be sensed without contact using a magnetic or optical encoder. In another embodiment, rotor position may be measured by measuring the hydraulic pump position, which may be relatively fixed with respect to the electric motor position. This rotor position or velocity information may be used by a controller connected to the electric motor. The position information may be used for a variety of purposes such as: motor commutation (e.g. in a BLDC motor); actuator velocity estimation (which may be a function of rotor velocity for systems with a substantially positive displacement pump); electronic cancellation of pressure fluctuations and ripples; and actuator position estimation (by integrating velocity, and potentially coupling the sensor with an absolute position indicator such as a magnetic switch somewhere in the actuator stroke travel such that activation of the switch implies the actuator position is in a specific location).

By coupling an active suspension containing an electric motor and/or hydraulic pump with a rotary position sensor coupled to it, the system may be more accurately and efficiently controlled.

Predictive Inertia Algorithms

An active suspension with on demand energy delivery, where an electric motor is moved in lockstep with the active suspension movement (linear travel of the actuator) in at least one mode, may be combined with an algorithm that predicts inertia of the electric motor and controls the motor torque to at least partially reduce the effect of inertia. For example, for a hydraulic active suspension that has a hydraulic pump operatively connected to an electric motor, wherein the pump is substantially positive displacement, a fast pothole hit to the wheel will create a surge in hydraulic fluid pressure and accelerate the pump and motor. The inertia of the rotary element (the pump and motor in this case) will resist this acceleration, creating a force in the actuator, which will counteract compliance of the wheel. This creates harshness in the ride of the vehicle, and may be undesirable. Such a system employing predictive analytic algorithms that factor inertia in the active suspension control may control motor torque at a command torque lower than the desired torque during acceleration events, and at a higher torque that the desired torque during deceleration events. The delta between the command torque of the motor and the desired torque (such as the control output from a vehicle dynamics algorithm) is a function of the rotor or actuator acceleration. Additionally, the mass and physical properties of the rotor may be incorporated in the algorithm. In some embodiments acceleration is calculated from a rotor velocity sensor (by taking the derivative), or by one or two differential accelerometers on the suspension. In some cases the controller employing inertia mitigation algorithms may actively accelerate the mass.

Coupling an active suspension with algorithms that reduce inertia of an electric motor and its connected components (e.g. a hydraulic pump rotor) may be highly desirable because it can reduce ride harshness on rough roads.

Integrated Activalve

An active suspension with on demand energy delivery, where motor torque is controlled in response to road and/or wheel conditions, may be accomplished with a highly integrated power pack. This may be a single body active suspension actuator comprising an electric motor, an electronic (torque or speed) motor controller, and a sensor in a housing. In another embodiment, it may be accomplished with a single body actuator comprising an electric motor, a hydraulic pump, and an electronic motor controller in a housing. In another embodiment, it may be accomplished by a single body valve comprising an electric motor, a hydraulic pump, and an electronic motor controller in a fluid filled housing. In another embodiment, it may be accomplished with a single body valve comprising a hydraulic pump, an electric motor that controls operation of the hydraulic pump, an electronic motor controller, and one or more sensors, in a housing. In another embodiment, it may be accomplished with an actuator comprising an electric motor, a hydraulic pump, and a piston, wherein the actuator facilities communication of fluid through a body of the actuator and into the hydraulic pump. In another embodiment, it may be accomplished with a vehicle active suspension system comprising a hydraulic motor disposed proximal to each wheel of the vehicle that produces wheel-specific variable flow/variable pressure, and a controllable electric motor disposed proximal to each hydraulic motor for controlling wheel movement via the hydraulic motor. In another embodiment, this may be accomplished with a vehicle wheel-well compatible active suspension actuator comprising a piston rod disposed in an actuator body, a hydraulic motor, an electric motor, an electronic motor controller, and a passive valve disposed in the actuator body or power pack and that operates either in parallel or series with the hydraulic motor, all packaged to fit within or near the vehicle wheel well.

The ability to package an active suspension with on demand energy delivery into a highly integrated package may be desirable to reduce integration complexity (e.g. eliminates the need to run long hydraulic hoses), improve durability by fully sealing the system, reduce manufacturing cost, improve response time, and reduce loses (electrical, hydraulic, etc.) from shorter distances between components.

Power and Energy Optimizing Algorithms

An active suspension with on demand energy delivery, where motor torque is controlled in response to road and/or wheel conditions, may be associated with power and/or energy optimizing control algorithms, wherein instantaneous power and/or energy over time are tracked and active suspension control is at least partially a function of the energy over time. For example, an active suspension may be controlled by an electronic controller that monitors energy consumption in each actuator or energy at the vehicle electrical system interface. If the actuators consume a large amount of energy for an extended period of time, for example, during an extended high lateral acceleration turn, the control algorithm may slowly allow the vehicle to roll, thus reducing the instantaneous power consumption, and over time will reduce the energy consumed (a lower average power). With an on-demand energy suspension, this may be directly utilized to deliver on-demand performance. For example, the electric motor driving the suspension unit may be directly controlled as a consequence of both vehicle dynamics algorithms and an average power consumed over a given window.

Combining an active suspension capable of adjusting its power consumed with energy optimizing algorithms can particularly enhance the efficiency of an active suspension. In addition, it may allow an active suspension to be integrated into a vehicle without compromising the current capacity of the alternator. For example, the suspension may adjust to reduce its instantaneous energy consumed in order to provide enough vehicle energy for other subsystems such as ABS braking, electric power steering, dynamic stability control, and engine ECUs.

Active Chassis Power Management for Power Throttling

An active suspension with on demand energy delivery, where motor torque is controlled in response to road and/or wheel conditions, may be associated with an active chassis power management system for power throttling, wherein a controller responsible for commanding the active suspension responds to energy needs of other devices on the vehicle such as active roll stabilization, electric power steering, etc. and/or energy availability information such as alternator status, battery voltage, and engine RPM.

In one embodiment, an active suspension capable of adjusting its power consumed may reduce its instantaneous and/or time-averaged power consumption if one of the following events occur: vehicle battery voltage drops below a certain threshold; alternator current output is low, engine RPM is low, and battery voltage is dropping at a rate that exceeds a threshold; an controller (e.g. ECU) on the vehicle commands a power consumer device (such as electric power steering) at high power (for example, during a sharp turn at low speed); an economy mode setting for the active suspension is activated, thus limiting the average power consumption over time.

Integration with Other Vehicle Control and Sensing Systems

An active suspension with on demand energy delivery, where motor torque is controlled in response to road and/or wheel conditions, may receive data from other vehicle control and sensing systems [such as GPS, self-driving parameters, vehicle mode setting (i.e. comfort/sport/eco), driver behavior (e.g. how aggressive is the throttle and steering input), body sensors (accelerometers, IMUs, gyroscopes from other devices on the vehicle), safety system status (ABS braking engaged, ESP status, torque vectoring, airbag deployment, etc.)], and then react based on this data. Reacting may mean changing the force, position, velocity, or power consumption of the actuator in response to the data.

For example, the active suspension may interface with GPS on board the vehicle. In one embodiment the vehicle contains (either locally or via a network connection) a map correlating GPS location with road conditions. In this embodiment, the active suspension may react in an anticipatory fashion to adjust the suspension in response to the location. For example, if the location of a speed bump is known, the actuators can start to lift the wheels immediately before impact. Similarly, topographical features such as hills can be better recognized and the system can respond accordingly. Since civilian GPS is limited in its resolution and accuracy, GPS data can be combined with other vehicle sensors such as an IMU (or accelerometers) using a filter such as a Kalman Filter in order to provide a more accurate position estimate.

In another example, the active suspension may not only receive data from other sensors, but may also command other vehicle subsystems. In a self-driving vehicle, the suspension may sense or anticipate rough terrain, and send a command to the self-driving control system to deviate to another road.

In another embodiment the vehicle may automatically generate the map described above by sensing road conditions using sensors associated with the active suspension and other vehicle devices.

By integrating an active suspension with other sensors and systems on the vehicle, the ride dynamics may be improved by utilizing predictive and reactive sensor data from a number of sources (including redundant sources, which may be combined and used to provide greater accuracy to the overall system). In addition, the active suspension may send commands to other systems such as safety systems in order to improve their performance. Several data networks exist to communicate this data between subsystems such as CAN (controller area network) and FlexRay.

Suspension as an Active Safety System

An active suspension with on demand energy delivery, where motor torque is controlled in response to road and/or wheel conditions, may be associated with an active safety system, wherein the suspension is controlled to improve the safety of the vehicle during a collision or dangerous vehicle state. In one embodiment, the active suspension with on-demand energy delivery is controlled to deliver a vehicle height adjustment when an imminent crash is detected in order to ensure the vehicle's bumper collides with the obstacle (for example, a stopped SUV ahead) so as to maximize the crumple zone or minimize the negative impact on the driver and passengers in the vehicle. In such an embodiment, the suspension may adjust to set ride height to optimize in any sort of pre or post-crash scenario. In another embodiment, the active suspension with on demand energy delivery can adjust wheel force and tire to road dynamics in order to improve traction during ABS braking events or electronic stability program (ESP) events. For example, the wheel can be pushed towards the ground to temporarily increase contact force (by utilizing the vertical inertia of the vehicle), and this can be pulsated.

For these instances, the on-demand energy capability can be utilized to rapidly throttle up energy in the active suspension on a per event basis in order to respond to the imminent safety threat. By exploiting the fast response time characteristics of an active suspension with on demand energy delivery in combination with an active safety system, where corrective action often has to occur under 100 ms, vehicle dynamics such as height, wheel position, and wheel traction, can be rapidly adjusted and can operate in unison with other safety systems and controllers on the vehicle.

Adaptive Controller for Hydraulic Power Packs

An active suspension with on demand energy delivery, where motor torque is controlled in response to road and/or wheel conditions, may be associated with an adaptive controller for hydraulic power packs, wherein the controller instantaneously controls energy in the hydraulic power pack of an active suspension in order to modify the kinematic characteristics of the actuator.

Active Truck Cabin Stabilization System

An active suspension with on demand energy delivery, where motor torque is controlled in response to road and/or wheel conditions, may be used as an active truck cab stabilization system to improve comfort, among other benefits. In one embodiment geared towards European-design trucks, four active suspension with on demand energy delivery actuators are disposed between the chassis of a heavy truck and the cabin. A spring sits in parallel with each actuator (i.e. coil spring, air spring, or leaf spring, etc.), and each assembly is placed roughly at the corner of the cabin. Sensors on the cabin and/or the chassis sense movement, and a control loop controlling the active suspension commands the actuators to keep the cabin roughly level. In an embodiment for North American-design trucks, two actuators are used at the rear of the cabin, with the front of the cabin hinged on the chassis. In some embodiments such a suspension may contain modified hinges and bushings to allow greater compliance in yaw/pitch/roll.

In some embodiments, the actuators may be placed in other locations, such as on an isolated truck bed or trailer to reduce vibration to the truck load.

In another embodiment, a single actuator with on demand energy delivery can be used in a suspended seat. Here, the seat (such as a truck seat) rides on a compliant device such as an air spring, and the actuator is connected in parallel to this complaint device. Sensors measure acceleration and control the seat height dynamically to reduce heave input to the individual sitting on the seat. In some instances the actuator may be placed off the vertical axis in order to affect motion in a different direction. By using a mechanical guide, this motion might not be limited to linear movement. In addition, multiple actuators may be used to provide more than one degree of freedom.

A long haul truck containing an active suspension may especially benefit by improving driver comfort and reducing driver fatigue. By using an active suspension with on demand energy delivery, the system can be smaller, easier to integrate, faster response time, and more energy efficient.

Active Suspension with Air Spring

An active suspension with on demand energy delivery, where motor torque is controlled in response to road and/or wheel conditions, may be associated with an air spring suspension in which static ride height is nominally provided by a chamber containing compressed air. In one embodiment, the active suspension actuator is of a standard hydraulic triple tube damper, with a side-mounted valve that contains a hydraulic pump and an electric motor. The valve porting and location is placed towards the base of the actuator body such that an airbag with folding bellows can fit around the actuator above the valve. With the valve such mounted, a standard air suspension airbag can be placed about the actuator body towards the top of the unit.

In another embodiment, the system just described contains hoses exiting the hydraulic damper near the bottom and leading towards an external power pack containing a hydraulic pump and an electric motor. As such, the physical structures of the active suspension actuator and the air spring can be united.

In another embodiment, the control systems for the on-demand energy delivery active suspension and the air suspension system can be coupled. In such a system, air pressure in the air suspension may be controlled in conjunction with the commanded force in the active suspension actuator. This may be controlled for the entire air spring system, or on a per-spring (per wheel) basis. The frequency of this control may be on a per event basis, or based on general road conditions. Generally, the response time of the active suspension actuator is faster than the air spring, but the air spring may be more effective in terms of energy consumption at holding a given ride height or roll force. As such, a controller may control the active suspension for rapid events by increasing the energy instantaneously in the on-demand energy system, while simultaneously increasing or decreasing pressure in the air spring system, thus making the air spring effectively an on-demand energy delivery device, albeit at a lower frequency.

By combining the controlled aspects of an active suspension that uses on-demand energy with an air spring that can also be controlled to dynamically change spring force, greater forces may be achieved in the suspension, adjustments can be more efficient, and the overall ride experience can be improved.

Low Inertia Material for Reduced Inertia Dependence

An active suspension with on demand energy delivery and a rotating element, where rotary motor torque is controlled in response to road and/or wheel conditions, may utilize a low inertia material in the rotary element to reduce parasitic acceleration dependence. For example, the hydraulic pump and/or motor shaft may be produced from an engineered plastic in order to reduce rotary inertia. This has the benefit in an on-demand energy delivery system containing a positive displacement pump of reducing the transmissibility of high frequency input into the actuator (i.e. a graded road at high speed input on the wheel).

Integration with Roll Bar

An active suspension with on demand energy delivery may be coupled with one or more anti-roll bars in a vehicle. In one embodiment, a standard mechanical anti-roll bar is attached between the two front wheels and a second between the two rear wheels. In another embodiment a cross coupled hydraulic roll bar (or actuator) is attached between the front left and the rear right wheels, and then another between the front right and the rear left wheels.

Since the active suspension will often counteract the roll bar during wheel events, it may be desirable for efficiency and performance reasons to completely eliminate the roll bar (wherein the active suspension with on demand energy acts as the only vehicular roll bar), or to attach a novel roll bar design. In one embodiment, a downsized anti roll bar is disposed between the wheels, such that there is a large amount of sprung compliance in the bar. In another embodiment, an anti roll bar with hysteresis is disposed between the two front and/or the two rear wheels. Such a system may be accomplished with a standard roll bar that has a rotation point in the center of the roll bar, wherein between two limits the two ends of the bar can twist freely. When the twist reaches some angle, a limit is reached and the twist becomes stiff. As such, for certain angles between some negative twist and some positive twist from level, the bar is able to move freely. Once the threshold on either side is reached, the twist becomes more difficult. Such a system can be further improved by using springs or rotary fluid dampers such that engagement of the limit is gradual (for example, prior to reaching the limit angle a spring engages and twist resistance force increases), and/or it is damped (e.g. using a dynamic mechanical friction or fluid mechanism).

In another embodiment, the active suspension with on-demand energy delivery may be further coupled with an active roll stabilizer system (either hydraulic, electromechanical, or otherwise).

Use of anti-roll bar technologies in connection with an active suspension may especially help at high lateral accelerations, where roll force is greatest and where roll force may exceed the maximum force capability of the active suspension actuator. By implementing a solution that primarily operates at the higher accelerations, roll force levels, or roll angles, roll performance can be improved. While several technologies are disclosed that serve the function of assistive roll mitigation to the active suspension, the present invention is not limited in this regard as there are many suitable devices and methods of accomplish anti-roll force to supplement the active suspension.

Energy Neutral Active Suspension Control

Methods and systems for facilitating energy neutral active suspension may include a method of harvesting energy from suspension actuator movement, delivering the harvested energy to an energy source from which the suspension actuator conditionally draws energy to create a force, and consuming energy from the energy source to control movement of the suspension actuator for wheel events that result in actuator movement, wherein energy consumption is regulated and limited so that harvested energy substantially equals consumed energy over a time period that is substantially longer than an average wheel event duration.

In an aspect of the method, energy may be temporarily consumed so that the actuator complies with at least one of active suspension safety and comfort limits. Also in the aspect, delivered energy may substantially equal consumed energy when consumed energy is less than 100 watts and when generated energy is less than 100 watts averaged over the time period.

To facilitate energy neutrality, limiting the delivered energy may be effected when average delivered energy is greater than 100 watts over the time period. Likewise, limiting the consumed energy may be effected when average consumed energy is greater than 100 watts over the time period. Also limiting energy consumption may include adjusting active suspension wheel event response parameters to comply with a power consumption reduction protocol. In the method, limiting energy delivery may include diverting harvested energy away from the energy source.

An energy source of the methods and systems may be at least one of a vehicle electrical system, a lead acid vehicle battery, a super capacitor, a lithium ion battery, a lithium phosphate battery, and another hydraulic actuator. The energy source may include an energy storage apparatus coupled with a bi-directional DC-DC converter disposed between a power bus of the suspension actuator and a vehicle primary electrical bus. With an embodiment of the method that includes an energy source, consuming energy may include consuming energy from the energy storage apparatus before consuming energy from the vehicle primary electrical bus. Energy from the vehicle primary electrical bus may be sourced through the converter when the energy available in the energy storage apparatus is below a low energy threshold and an anticipated energy need of the suspension actuator would result in the energy available in the energy storage apparatus being below the low energy threshold if the anticipated energy was consumed from the energy storage apparatus. According to another aspect, energy from the vehicle primary electrical bus may be sourced at any time, including when energy is being sourced from the energy storage apparatus (e.g. energy is simultaneously sourced from both the converter and the energy storage apparatus).

In another aspect of the methods and systems for facilitating energy neutral active suspension of a vehicle, a method may include harvesting energy from suspension actuator movement, storing the harvested energy in an energy storage facility from which the suspension actuator conditionally draws energy to control the operation of the suspension, consuming energy from the energy storage facility to control movement of the suspension actuator for wheel events that result in actuator movement and adapting control of the suspension actuator to ensure that stored energy substantially equals consumed energy over a time period that is substantially longer than an average wheel event duration. In this aspect, the energy source may be at least one of a vehicle electrical system, a lead acid vehicle battery, a super capacitor, a lithium ion battery, a lithium phosphate battery, and another hydraulic actuator.

In this aspect, adapting control of the suspension actuator may include harvesting substantially more energy than the energy consumed by the suspension actuator during an energy recovery period of time. Also, adapting control of the suspension actuator may comprise shunting harvested energy away from the energy storage facility during an excess energy disposal period of time. Additionally, adapting control of the suspension actuator may include limiting energy consumed by the suspension actuator such that average energy consumed in the actuator is less than 75 watts over a time period substantially longer than an average wheel event duration.

In the methods and systems for facilitating energy neutral vehicle suspension, an electronic suspension system may include a piston disposed in a hydraulic housing, an energy recovery mechanism such that movement of the piston results in energy generation, an energy storage facility to which harvested energy from the energy recovery mechanism is stored and a control system that regulates force on the piston by varying an electrical characteristic of the energy recovery mechanism and that operates from energy stored in the energy storage facility, wherein the control system determines an average net energy exchange over a time period that is substantially longer than an average wheel event duration. The electronic suspension may be one of a semi-active and a fully-active suspension. In this embodiment, the average net energy exchange may be determined by subtracting energy used to operate the active suspension system from energy harvested. To achieve energy neutrality in the electric suspension system, the controller may regulate force on the piston so that stored energy substantially equals energy used to operate the system over a time period that is substantially longer than an average wheel event duration, while temporarily consuming sufficient energy so that the suspension system complies with suspension safety and comfort limits. The electric suspension system may also be designed for aftermarket installation on a vehicle as a self-powered fully-active suspension. Such a system may include an energy storage apparatus to store energy during certain modes of operation (e.g. while operating in regenerative compression and extension strokes), and to use energy during other modes of operation (e.g. during active extension and active compression). Controller logic may also be powered from this energy storage apparatus. In some embodiments such a system may be completely wireless, requiring no power or data connections.

In any of the embodiments described herein the control system may be configured with wireless network links that facilitate communication between multiple electronic suspension members in order to coordinate vehicle body control tasks. In other embodiments, wired communication networks may comprise CAN, FlexRay, Ethernet, data over powerlines, or other suitable means. Such networks may communicate sensor, command, or other data. In some embodiments, firmware for actuator-specific controllers may be updated (reflashed via a bootloader or similar) over such a network. This may facilitate software upgrades during vehicle servicing.

In another aspect of the methods and systems for facilitating energy neutral vehicle suspension, a self-powered adaptive suspension system may include a piston disposed in a hydraulic housing and a control system that regulates force on the piston by varying an electrical characteristic of the energy recovery mechanism and that operates from energy stored in the energy storage facility, wherein the control system determines an average net energy exchange over a time period that is substantially longer than an average wheel event duration. Other embodiments may include linear motors or ball screw mechanisms connected to rotary electric motors as actuation mechanisms.

In yet another aspect of the methods and systems for facilitating energy neutral vehicle suspension, a method of self powered suspension includes measuring energy consumption by an active vehicle suspension system that is capable of operating in at least a passive rebound suspension quadrant, a passive compression suspension quadrant and at least one of a push rebound suspension quadrant (active extension) and a pull compression suspension quadrant (active compression) over a period of time; consuming energy with the active vehicle suspension system during operation in the at least one of a push rebound suspension quadrant and a pull compression suspension quadrant; calculating an average of the measured energy consumption; comparing the calculated average of the measured energy consumption to an energy neutrality target threshold value; and based on the comparison, biasing a control of the active vehicle suspension system to respond to wheel events by operation in the passive rebound and passive compression quadrants until a running average of energy consumed by the active vehicle suspension is lower than the energy neutrality target threshold. In this method, the running average of energy consumed by the active vehicle suspension may be lower than the energy neutrality target threshold by at least an energy threshold reserve value.

According to another aspect, the power or energy neutrality constraint may comprise an energy neutrality target threshold that may comprise a measure of available power from the vehicle's alternator. Alternatively, the energy neutrality target threshold may be lower than an average available power from the vehicle's alternator across an average drive cycle. In some embodiments the actuator may be regenerative capable, but in other embodiments the system may operate in only a dissipative semi-active and a consumptive active state.

The methods and systems described herein may also use power consumption and generation limit means as control mechanisms for achieving substantially neutral average power used by and produced by active vehicle suspension actuators without unduly affecting the performance that such actuators provide. At least one controller may dynamically measure power into at least one actuator, and may keep track of running averages over time. Based on time averaged energy use and generation, at least one actuator can be throttled so that at least an average power goal for a vehicle suspension system is substantially met.

Active vehicle suspension actuators differ from fixed electrical loads such as rear window defrosters, air-conditioning compressors, fans and the like in that that their power requirements are dynamic over time and are not fixed or easily predictable. In most cases, the power consumed by an active vehicle suspension actuator varies on a time basis that is faster than the average power consumption. In addition some active vehicle suspension actuators, can operate as both energy consumers and energy generators, regenerating power in some modes.

Aspects of using power limits for achieving suspension system energy neutrality described herein relate to systems and methods for measuring or estimating power used and generated by at least one active vehicle suspension actuator and controlling the operation of the at least one actuator to achieve overall energy neutrality.

According to one aspect, a plurality of active vehicle suspension actuators is powered off a power bus that is independent from the vehicle's primary electrical system and where the total power on the independent bus can be measured. This power measurement is averaged over at least one time constant and the results are compared to at least one average power neutrality constraint. The difference between the measured power and average power neutrality constraint is used by the plurality of active vehicle suspension actuator controllers to throttle the actuator commands in such a way that the total power consumed by each of the plurality of active vehicle suspension actuators stays below the at least one average power neutrality constraint. The average power neutrality constraint may be a power consumption constraint, a power generation constraint, or both.

According to another aspect, the at least one actuator can be throttled by lowering its control gains, by implementing a command limit or clamp or by a combination thereof. Lower control gains reduce the dynamic performance of the actuator, resulting in reduced power consumption. By limiting or clamping the peak value of the actuator command, the peak as well as the average power consumption is reduced without affecting the performance of the actuator for commands below the limit. In the mode where the actuator is regenerative, a throttling limit on the peak regenerative command will limit the peak regeneration as well as the average power regenerated.

According to another aspect, the average power neutrality constraint can be fixed or dynamic and based upon a vehicle power/energy state. This state may be determined from a number of vehicle parameters including, but not limited to: engine RPM, alternator load state, vehicle battery voltage, vehicle battery state of charge (SOC), age and state of battery health, and vehicle energy management data. The state may also be communicated from a vehicle electronic control unit (ECU) either directly or via a vehicle communications network such as CAN or FlexRay.

According to another aspect, the at least one power neutrality constraint is one of the following: an instantaneous power limit, at least one moving time window average, at least one exponential filter average, or a combination thereof. Other averaging methods are envisioned and the methods and systems described herein are not limited in this regard.

According to another aspect, the at least one power neutrality constraint comprises a maximum average power versus moving time window length table or plot where each point in the table or plot defines a constraint on the maximum power averaged over that time window. This power neutrality constraint may be calculated by a suspension controller and communicated in the form of a data structure, table, matrix, array or similar.

According to another aspect, the power consumption or generation of the plurality of active vehicle suspension actuators are individually measured or estimated from their actuator commands. Most active vehicle suspension actuators have a relatively simple model for estimating power consumption as a function of actuator command. In this embodiment, the at least one average power neutrality constraint can be implemented on an actuator by actuator basis.

According to another aspect, a least a portion of the plurality of active vehicle suspension actuators are controlled to ensure that the average power neutrality for the portion of the plurality of active vehicle suspension actuators stays below the at least one average power neutrality constraint.

According to another aspect, the power throttling is implemented in at least one controller or processor, where the at least one processor algorithm uses information from at least one power consumption sensor. The power consumption sensor can be a current sensor at a substantially constant voltage actuator connection, a voltage sensor at a substantially constant current actuator connection or a sensor that computes the product of voltage and current at a dynamically varying actuator connection. The at least one processor algorithm can be centralized in a suspension controller or distributed to the processors controlling the plurality of active vehicle suspension actuators. Processors may comprise microcontrollers, ASICS, and FPGAs.

According to another aspect, the plurality of active vehicle suspension actuators each have a priority in terms of how much power they are allowed to consume or produce and this prioritization is incorporated into the at least one average power constraints such that actuators with higher priority receive a great portion of the available power. This prioritization is dynamically changeable based on the vehicle power/energy state. In one embodiment, a triage controller (or triage algorithm implemented in a vehicle energy management ECU) allocates more power to certain actuators at key times to improve performance, comfort or safety. The triage controller may have a safety mode that allows the power constraints to be overridden during avoidance, hard braking, fast steering and when other safety-critical maneuvers are sensed.

A simple embodiment of a safety-critical maneuver detection algorithm is a trigger if the brake position or brake pressure measurement exceeds a certain threshold and the derivative of the brake position (the brake depression velocity) or the derivative of the brake pressure also exceeds a threshold. An even simpler embodiment may utilize longitudinal or lateral acceleration thresholds. Another simple embodiment may utilize steering where a fast control loop compares a steering threshold value to a factor derived by multiplying the steering rate and a value from a lookup table indexed by the current speed of the vehicle. The lookup table may contain scalar values that relate maximum regular driving steering rate at each vehicle speed. For example, in a parking lot a quick turn is a conventional maneuver. However, at highway speeds the same quick turn input is likely to be a safety maneuver where the triage controller should disregard power constraints in order to help keep the vehicle stabilized.

According to another aspect, the plurality of active vehicle suspension actuators may have a total allocated power based upon operating modes of the vehicle. Operating modes include, but are not limited to: normal driving, highway driving, stopped, sport mode, comfort mode, economy mode, emergency avoidance maneuver, and road condition specific modes.

According to another aspect, the bus that provides power to the plurality of active vehicle suspension actuators comprises at least one energy storage device or apparatus where at least one actuator can receive energy from the energy storage device. This embodiment may also comprise at least one sensor that detects future driving conditions, including but not limited to: a GPS unit to calculate future route, a forward-looking sensor to detect vehicles, pedestrians, stop signs and road conditions, an adaptive speed control system, weather forecasts, driver input such as steering, braking and throttle position. Other sensors and prediction methods are envisioned and the methods and systems described herein are not limited in this regard. This system also may comprise at least one controller with at least one algorithm to predict future power flow for at least one of the plurality of active vehicle suspension actuators. The at least one controller regulates the state of charge (SOC) of the at least one energy storage device to prepare for the predicted future power requirements. For example, the knowledge of an impending stop is used to raise the SOC of the energy storage device to make sure that there is enough power available for at least one active suspension actuator to mitigate nose dive of the vehicle.

According to another aspect, at least one integrated active suspension system is disposed to perform vehicle suspension functions at a wheel of the vehicle. An independent power bus may power active vehicle suspension actuators, thus allowing regenerative actuators such as those used by an active suspension system to help balance the power consumption of non-regenerative actuators. In this embodiment, the plurality of active vehicle suspension actuators may each have its own processor and algorithm to facilitate calculating its own average power neutrality constraint and the processors may coordinate this activity via communications over a communications network. Alternatively, at least one processor and at least one algorithm may be centralized in a suspension controller.

According to another aspect, the plurality of active vehicle suspension actuators include an active suspension system, at least one sensor that detects future driving conditions, two front active suspension actuators, and two rear active suspension actuators. In this embodiment, the power drawn by the front active suspension actuators gives a predictive value for the power requirements for the rear active suspension actuators. The system reacts by increasing a limit of the generative output of regenerative actuators so that the SOC of the energy storage device can be at least temporarily raised above a normal energy capacity threshold to at least partially compensate for these impending power requirements.

According to another aspect, when the plurality of active vehicle suspension actuators includes at least one actuator capable of regeneration in some modes, the power neutrality constraint can be an average power over a long period of time substantially close to zero. For example, when the plurality of active vehicle suspension actuators includes an active suspension system disposed to perform vehicle suspension functions at at least one wheel, energy captured via regeneration from small amplitude and/or low frequency wheel events may be stored in the energy storage device. When the suspension control system requires energy, such as to resist movement of a wheel at very low velocities substantially close to zero velocity, or to encourage movement of a wheel in response to a wheel event, energy may be drawn from the energy storage device. Energy that is consumed to manage various wheel events may be replaced by the regeneration described above. In this aspect, the active suspension actuators may be operating in an energy neutral regime. Such a regime may allow for net energy consumption up to an energy consumption neutrality limit, such as 100 watts. If energy consumption exceeds such a limit, energy throttling measures may be applied to the suspension system. Likewise an energy neutral regime may allow for net energy generation up to an energy generation neutrality limit, such as 100 watts. If energy generation exceeds such a limit, energy generation or storage throttling measure may be applied, such as shunting the generated energy away from the energy storage device, changing the suspension actuator regenerative operational profile to generate less energy, and the like.

According to another aspect, the plurality of active vehicle suspension actuators can be throttled indirectly by allowing the voltage on their power bus to droop. In this embodiment, a DC/DC converter disposed to provide power to the bus implements an at least one average power neutrality constraint. When the total power consumption of the plurality of active vehicle suspension actuators exceeds this constraint the voltage on the bus droops and the actuators react by reducing power consumption. One method is to have each actuator implement a bus current limit so as the voltage droops, the power drawn by each actuator decreases in direct proportion to the bus voltage. Alternate methods include, but are not limited to, implementing a gain or lookup table such that the power draw per actuator is a stronger, a weaker or a non-linear function of bus voltage.

According to another aspect, the DC/DC converter may be capable of unidirectional or bidirectional power flow. A bidirectional DC/DC converter allows excess regenerative energy to be returned to the vehicle electrical system reducing the amount of power required from the vehicle alternator.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

System and Method for Using Voltage Bus Levels to Signal System Conditions

Some embodiments relate to an electrical system for a vehicle. The electrical system includes a power converter configured to convert a vehicle battery voltage at a first electrical bus into a second voltage at a second electrical bus. The second voltage is at least as high as the vehicle battery voltage. The electrical system also includes an energy storage apparatus coupled to the second electrical bus. At least one load is coupled to the second electrical bus. The power converter is configured to provide power to the at least one load from the first electrical bus and to limit a power drawn from the first electrical bus to no higher than a maximum power. When the at least one load draws more power than the maximum power, the at least one load at least partially draws power from the energy storage apparatus.

Some embodiments relate to an electrical system for a vehicle. The electrical system includes a power converter configured to convert a vehicle battery voltage at a first electrical bus into a second voltage at a second electrical bus. The second voltage is at least as high as the vehicle battery voltage. The power converter is configured to provide power to the load from the first electrical bus and to limit a power drawn from the first electrical bus to no higher than a maximum power based on an amount of energy drawn from the first electrical bus over a time interval.

Some embodiments relate to an electrical system for a vehicle. The electrical system includes a power converter configured to convert a vehicle battery voltage at a first electrical bus into a second voltage at a second electrical bus. The second voltage is at least as high as the vehicle battery voltage. The power converter is configured to receive a signal indicating a state of the vehicle. The state of the vehicle represents a measure of energy available from the first electrical bus. At least one load is coupled to the second electrical bus. The power converter is configured to provide power to the at least one load from the first electrical bus and to limit a power drawn from the first electrical bus based on the state of the vehicle.

Some embodiments relate to an electrical system for a vehicle. The electrical system includes a power converter configured to convert a vehicle battery voltage at a first electrical bus into a second voltage at a second electrical bus. The power converter is configured to allow the second voltage to vary in response to a power source and/or power sink coupled to the second electrical bus. The second voltage is allowed to fluctuate between a first threshold and a second threshold.

Some embodiments relate to an electrical system for an electric vehicle. The electrical system includes a first electrical bus that operates at a first voltage and drives a drive motor of the electric vehicle. The electrical system includes an energy storage apparatus coupled to the first electrical bus. The electrical system also includes a second electrical bus that operates at a second voltage lower than the first voltage. The electrical system also includes a power converter configured to transfer power between the first electrical bus and the second electrical bus. The electrical system further includes at least one electrical load connected to and controlled by an electronic controller. The at least one electrical load is powered from the second electrical bus. The at least one electrical load includes an active suspension actuator.

Some embodiments relate to an electrical system for a vehicle. The electrical system includes an electrical bus configured to deliver power to a plurality of connected loads. The electrical system also includes an energy storage apparatus coupled to the electrical bus. The energy storage apparatus has a state of charge. The energy storage apparatus is configured to deliver power to the plurality of connected loads. The electrical system also includes a power converter configured to provide power to the energy storage apparatus and regulate the state of charge of the energy storage apparatus. The electrical system further includes at least one device that obtains information regarding an expected future driving condition. The power converter regulates the state of charge of the energy storage apparatus based on the expected future driving condition.

Some embodiments relate to an electrical system for a vehicle. The electrical system includes a power converter configured to convert a vehicle battery voltage at a first electrical bus into a second voltage at a second electrical bus. The second voltage is at least as high as the vehicle battery voltage. The electrical system also includes an energy storage apparatus connected across the power converter. A first terminal of the energy storage apparatus is connected to the first electrical bus and a second terminal of the energy storage apparatus is connected to the second electrical bus. At least one load is coupled to the second electrical bus. The power converter is configured to provide power to the at least one load and to limit a net power drawn from the first electrical bus to no higher than a maximum power. Net power drawn from the first electrical bus comprises a combination of power through the power converter and the energy storage apparatus.

Some embodiments relate to electrical system for a vehicle in which a power converter is configured to convert a vehicle battery voltage at a first electrical bus into a second voltage at a second electrical bus. The electrical system includes at least one controller configured to control at least one load coupled to the second electrical bus. The at least one controller is configured to measure the second voltage and to determine a state of the vehicle based on the second voltage. The at least one controller is configured to control the at least one load based on the state of the vehicle.

Some embodiments relate to an electrical system for a vehicle in which a power converter is configured to convert a vehicle battery voltage at a first electrical bus into a second voltage at a second electrical bus. The electrical system includes at least one controller configured to control at least one active suspension actuator coupled to the second electrical bus. The at least one controller is configured to measure the second voltage and to determine a state of the vehicle based on the second voltage. The at least one controller is configured to control the at least one active suspension actuator based on the state of the vehicle.

Some embodiments relate to a method of operating at least one load of a vehicle. The vehicle has an electrical system in which a power converter is configured to convert a vehicle battery voltage at a first electrical bus into a second voltage at a second electrical bus. At least one load is coupled to the second electrical bus. The method includes measuring the second voltage, determining a state of the vehicle based on the second voltage and controlling the at least one load based on the state of the vehicle.

Some embodiments relate to a method, device (e.g., a controller), and/or computer readable storage medium having stored thereon instructions, which, when executed by a processor, perform any of the techniques described herein.

The foregoing summary is provided by way of illustration and is not intended to be limiting.

A system and method for using voltage bus levels to signal system conditions is particularly applicable to voltage busses supported by supercapacitor energy storage. Supercapacitor energy storage can be used to implement a loosely regulated voltage bus where the voltage is directly proportional to the amount of energy stored in the supercapacitor string. (E=½ CV2). All systems using the voltage bus have a simple method of determining the energy storage state of the bus by simply measuring the DC voltage on the bus.

Using supercapacitors for energy storage and allowing the voltage bus to fluctuate increases the usable capacity of the supercapacitors. Signaling the energy state of the bus allows this loosely regulated bus to operate without degrading performance of the subsystems using the bus.

A system and method for using voltage bus levels to signal system conditions is can be used to implement predictive energy storage algorithms for the bus. As an example, the rate of change of the bus voltage allows the system or systems capable of providing power to the bus to predict the future state of the bus and to act accordingly. A dropping voltage could signal a DC/DC converter responsible for interfacing the bus to the vehicles 12V electrical system to request more current from the vehicle battery or alternator. Conversely, a rising voltage on the bus could signal the systems on the bus that require variable power that now is a good time to perform tasks that require the highest power. For example, the dynamic stability control subsystem could use this opportunity to run its pump to pressurize its brake fluid reservoir.

In contrast to systems the simply monitor the voltage bus for Undervoltage or Overvoltage conditions, this system and method for signaling system conditions provides additional information to predictive energy storage and usage algorithms implemented in one or more subsystems connected to the bus.

A system and method for using voltage bus levels to signal system conditions can be associated with a vehicular high power electrical system that interconnects a set of high power electrical producers and consumers. By isolating this set of electrical consumers and producers from the vehicle 12V electrical system, the vehicular high power electrical system can distribute power and signal the state of said system while being substantially isolated from the variations on the 12V electrical system due to battery state of charge (SOC), alternator power limits and response time, and dynamic loads of the 12V electrical bus.

Isolating a subset of consumers and producers with a vehicular high power electrical system simplifies the meaning of the bus voltage levels and enables the high power subsystems to use simpler and more robust algorithms to control the energy balance on the bus. For example, an active suspension actuator no longer needs to know the operating state of the vehicle alternator to react appropriately to the voltage on the high power bus.

A system and method for using voltage bus levels to signal system conditions can be used to implement a power/energy optimizing control system for an active suspension [active damping] system. In a typical vehicle, the active suspension system is connected via a medium voltage bus to a DC/DC or similar interface to the vehicle 12V electrical system. There may also be other producers and consumers of power on this high power voltage bus. In such vehicles it is possible to control the active suspension in an optimal fashion by using the bus voltage to indicate energy balance on the bus.

An active suspension may operate in a regeneration mode, in an active mode or in a combination thereof depending upon road conditions and the actions of the vehicle operator. Optimal active suspension performance may be achieved when the active suspension system is allowed consume or regenerate as much power as it needs. However, the DC/DC or similar interface to the vehicle 12V electrical system is often limited in peak power and/or average power (energy). By monitoring the voltage on the bus, the active suspension can maximize its use of power in either direction while maintaining the energy balance on the bus within acceptable levels.

A system and method for using voltage bus levels to signal system conditions can be used as part of a system for power throttling. Any consumer of power on the bus can monitor the bus voltage and use it as an indication of power balance on the bus as well as the energy stored in the system. When the bus voltage drops and or falls below a threshold, consumers of power can implement a power limit to throttle their use of power. Conversely, if the bus voltage rises or exceeds a threshold, producers of power can implement a power limit to throttle their power production or, in the case of an active suspension, their regeneration. These power throttles (limits) implement a non-linear control method for reducing the peak and average power used or regenerated. When throttled, if the bus voltage continues to rise or fall, the systems on the bus can change their power limits until power balance is substantially reached and the bus voltage is maintain within an acceptable range. In contrast to other methods of reducing power such as adaptively changing control gains, power throttling allows the control system to otherwise operate normally and at the same performance level for operating points that do not exceed the power limits.

This system and method for using voltage bus levels to signal system conditions is simpler, more robust and more accurate than alternative methods of calculating peak and average power using per system and then communicating these values to all other systems on the bus so that all systems can work in unison to control the power balance on the bus. This may also apply to situational active control algorithms wherein the system is controlled with active energy only during events that will have a considerable positive ride impact for the driver and passengers.

A system and method for using voltage bus levels to signal system conditions can be integrated with other vehicle control and sensing systems to improve the operation of said control systems. As an illustrative example, the state of a voltage bus connected to an active or semi-active suspension system could be used by a vehicle dynamic stability control (DSC) system to help determine the type of road, the road conditions and the driving style of vehicle operator. A dropping bus voltage due to high power consumption by an active suspension could signal a winding secondary road and an aggressive driving style and this information could be used to tailor the response of the DSC system.

Conversely, integrating information from other vehicle control/sensing system could improve upon the system state estimation generated by the bus voltage levels alone. For example, lateral acceleration measured by a vehicle inertial measurement unit (IMU) or other such sensing system for use by the DSC control system can be used by an active or semi-active suspension system as redundant information for predicting the energy state of the high power voltage bus in the future and react accordingly.

A system and method for using voltage bus levels to signal system conditions can be used to help control a self-powered active suspension and maintain the energy balance on the bus. A self-powered active suspension needs to adjust its operating conditions in order to pull zero net energy from the DC bus. If it operates too long in the active power region, the bus voltage will collapse. Conversely, if the active suspension regenerates power for too long, the bus voltage will rise to unacceptable levels. A system and method for signaling the energy state of the bus using bus voltage level solves this energy balance requirement by providing a feedback signal to the active suspension system.

This approach can work even when there are other consumers or producers of power on the voltage bus. With some limitations, the active suspension can maintain the bus voltage by providing additional regenerative power to the bus to balance an otherwise net load condition or by using more active power to balance an otherwise net excess of power. The ability of the active suspension to successfully balance the bus only depends on the availability of suspension power from the road and/or the active suspension ability to spend power on active functions.

A system and method for using voltage bus levels to signal system conditions can be used to implement an energy neutral active suspension control system where the goal is to balance the active suspension's regeneration with its use of active power such that the average power drawn from the voltage bus over a period of time is substantially zero. In a vehicle where the active suspension is one of only two systems on the bus and the other system (a DC/DC or similar producer of bus power) is controlled to operate with zero net power produced over time, the active suspension can use the voltage of the bus as feedback to control its operating conditions for energy neutrality such that the bus voltage is held substantially to a setpoint over time.

In a vehicle with more systems on the [high power] voltage bus, the active suspension can be controlled in a similar fashion to balance out any net energy imbalances on the bus. In this case the systems on the bus as a whole are operating in an energy neutral fashion.

Vehicular High Power Electrical System

Some embodiments relate to an electrical system for a vehicle. The electrical system includes a power converter configured to convert a vehicle battery voltage at a first electrical bus into a second voltage at a second electrical bus. The second voltage is at least as high as the vehicle battery voltage. The electrical system also includes an energy storage apparatus coupled to the second electrical bus. At least one load is coupled to the second electrical bus. The power converter is configured to provide power from the first electrical bus to the at least one load and to limit a power drawn from the first electrical bus to no higher than a maximum power. When the at least one load draws more power than the maximum power, the at least one load at least partially draws power from the energy storage apparatus.

Some embodiments relate to an electrical system for a vehicle. The electrical system includes a power converter configured to convert a vehicle battery voltage at a first electrical bus into a second voltage at a second electrical bus. The second voltage is at least as high as the vehicle battery voltage. The power converter is configured to provide power from the first electrical bus to a load coupled to the second electrical bus, and to limit a power drawn from the first electrical bus to no higher than a maximum power based on an amount of energy drawn from the first electrical bus over a time interval.

Some embodiments relate to an electrical system for a vehicle. The electrical system includes a power converter configured to convert a vehicle battery voltage at a first electrical bus into a second voltage at a second electrical bus. The second voltage is at least as high as the vehicle battery voltage. The power converter is configured to receive a signal indicating a state of the vehicle. The state of the vehicle represents a measure of energy available from the first electrical bus. At least one load is coupled to the second electrical bus. The power converter is configured to provide power from the first electrical bus to the at least one load and to limit a power drawn from the first electrical bus based on the state of the vehicle.

Some embodiments relate to an electrical system for a vehicle. The electrical system includes a power converter configured to convert a vehicle battery voltage at a first electrical bus into a second voltage at a second electrical bus. The power converter is configured to allow the second voltage to vary in response to a power source and/or power sink coupled to the second electrical bus. The second voltage is allowed to fluctuate between a first threshold and a second threshold.

Some embodiments relate to an electrical system for an electric vehicle. The electrical system includes a first electrical bus that operates at a first voltage and drives a drive motor of the electric vehicle. The electrical system includes an energy storage apparatus coupled to the first electrical bus. The electrical system also includes a second electrical bus that operates at a second voltage lower than the first voltage. The electrical system also includes a power converter configured to transfer power between the first electrical bus and the second electrical bus. The electrical system further includes at least one electrical load connected to and controlled by an electronic controller. The at least one electrical load is powered from the second electrical bus. The at least one electrical load includes an active suspension actuator.

Some embodiments relate to an electrical system for a vehicle. The electrical system includes an electrical bus configured to deliver power to a plurality of connected loads. The electrical system also includes an energy storage apparatus coupled to the electrical bus. The energy storage apparatus has a state of charge. The energy storage apparatus is configured to deliver power to the plurality of connected loads. The electrical system also includes a power converter configured to provide power to the energy storage apparatus and regulate the state of charge of the energy storage apparatus. The electrical system further includes at least one device that obtains information regarding an expected future driving condition. The power converter regulates the state of charge of the energy storage apparatus based on the expected future driving condition.

Some embodiments relate to an electrical system for a vehicle. The electrical system includes a power converter configured to convert a vehicle battery voltage at a first electrical bus into a second voltage at a second electrical bus. The second voltage is at least as high as the vehicle battery voltage. The electrical system also includes an energy storage apparatus connected across the power converter. A first terminal of the energy storage apparatus is connected to the first electrical bus and a second terminal of the energy storage apparatus is connected to the second electrical bus. At least one load is coupled to the second electrical bus. The power converter is configured to provide power from the first electrical bus to the at least one load and to limit a net power drawn from the first electrical bus to no higher than a maximum power. Net power drawn from the first electrical bus comprises a combination of power through the power converter and the energy storage apparatus.

Some embodiments relate to electrical system for a vehicle in which a power converter is configured to convert a vehicle battery voltage at a first electrical bus into a second voltage at a second electrical bus. The electrical system includes at least one controller configured to control at least one load coupled to the second electrical bus. The at least one controller is configured to measure the second voltage and to determine a state of the vehicle based on the second voltage. The at least one controller is configured to control the at least one load based on the state of the vehicle.

Some embodiments relate to an electrical system for a vehicle in which a power converter is configured to convert a vehicle battery voltage at a first electrical bus into a second voltage at a second electrical bus. The electrical system includes at least one controller configured to control at least one active suspension actuator coupled to the second electrical bus. The at least one controller is configured to measure the second voltage and to determine a state of the vehicle based on the second voltage. The at least one controller is configured to control the at least one active suspension actuator based on the state of the vehicle.

Some embodiments relate to a method of operating at least one load of a vehicle. The vehicle has an electrical system in which a power converter is configured to convert a vehicle battery voltage at a first electrical bus into a second voltage at a second electrical bus. At least one load is coupled to the second electrical bus. The method includes measuring the second voltage, determining a state of the vehicle based on the second voltage and controlling the at least one load based on the state of the vehicle.

Some embodiments relate to a method, device (e.g., a controller), and/or computer readable storage medium having stored thereon instructions, which, when executed by a processor, perform any of the techniques described herein.

The foregoing summary is provided by way of illustration and is not intended to be limiting.

ADDITIONAL DISCLOSURE

A vehicular high power electrical system with energy storage may be used to implement a self-powered active suspension and maintain the energy balance on the bus. A self-powered active suspension needs to adjust its operating conditions in order to pull zero net energy from the DC bus. If it operates too long in the active power region, the bus voltage will collapse. Conversely, if the active suspension regenerates power for too long, the bus voltage will rise to unacceptable levels. Having adequate energy storage in the high power electrical system makes it feasible to control this energy balance. The voltage on the energy storage is a simple feedback signal to the active suspension system that is directly proportional to the energy stored in the system.

This approach can work even when there are other consumers or producers of power on the voltage bus. With some limitations, the active suspension can maintain the bus voltage by providing additional regenerative power to the bus to balance an otherwise net load condition or by using more active power to balance an otherwise net excess of power. The ability of the active suspension to successfully balance the bus only depends on the availability of suspension power from the road and/or the active suspension ability to spend power on active functions.

A vehicular high power electrical system may be associated with an energy-neutral active suspension control system where the goal is to balance the active suspension's regeneration with its use of active power such that the average power drawn from the vehicular high power electrical system over a period of time is substantially zero. This approach has the advantage of allowing the vehicular high power electrical system to be designed for high peak power without the size or cost required to provide high average power.

The vehicular high power electrical system may incorporate energy storage, such as supercapacitors or high-performance batteries to provide the peak power and only require a small DC/DC converter to interface with the vehicle 12V electrical system to recharge to energy storage and possibly transfer excess energy back to the vehicle 12V electrical system.

Using supercapacitors for energy storage is especially advantageous as their voltage directly indicates the energy state or state of charge (SOC) of the high power electrical system and the energy neutrality of the active suspension can be achieved over time by controlling the operation of the active suspension so the voltage on the bus stays constant. A similar approach may be taken when using batteries but may require a different method of estimating SOC.

A vehicular high power electrical system may incorporate energy storage and predictive energy storage algorithms to meet the power requirements of the systems on the high power bus while minimizing the peak power required from the vehicle 12V electrical system. To provide high peak power on demand, the energy storage must be kept at an adequate state of charge (SOC). Either supercapacitors or high performance Lithium batteries can be used for energy storage.

In one algorithm, the DC/DC converter measures the SOC of the energy storage and controls the current to/from the 12V electrical system to keep the energy storage at an SOC setpoint. In another algorithm, the rate of change of the SOC allows the DC/DC converter to predict the future state of the bus energy and to request more or less current from the vehicle battery or alternator. These algorithms can be used singularly or in conjunction.

Incorporating a predictive energy storage algorithm into the vehicular high power electrical system allows the system to be more optimally designed, lowering cost and reducing size.

Single body valve comprising an electric motor, a hydraulic pump, and an electronic [torque/speed] electric motor controller, in a [fluid-filled] housing (CV30-3)

A vehicular high power electrical system may be associated with a highly integrated power pack. This may be a single body active suspension actuator comprising an electric motor, an electronic (torque or speed) motor controller, and a sensor in a housing. In another embodiment, it may be accomplished with a single body actuator comprising an electric motor, a hydraulic pump, and an electronic motor controller in a housing. In another embodiment, it may be accomplished by a single body valve comprising an electric motor, a hydraulic pump, and an electronic motor controller in a fluid filled housing. In another embodiment, it may be accomplished with a single body valve comprising a hydraulic pump, an electric motor that controls operation of the hydraulic pump, an electronic motor controller, and one or more sensors, in a housing. In another embodiment, it may be accomplished with an actuator comprising an electric motor, a hydraulic pump, and a piston, wherein the actuator facilities communication of fluid through a body of the actuator and into the hydraulic pump. In another embodiment, it may be accomplished with a vehicle active suspension system comprising a hydraulic motor disposed proximal to each wheel of the vehicle that produces wheel-specific variable flow/variable pressure, and a controllable electric motor disposed proximal to each hydraulic motor for controlling wheel movement via the hydraulic motor. In another embodiment, this may be accomplished with a vehicle wheel-well compatible active suspension actuator comprising a piston rod disposed in an actuator body, a hydraulic motor, an electric motor, an electronic motor controller, and a passive valve disposed in the actuator body or power pack and that operates either in parallel or series with the hydraulic motor, all packaged to fit within or near the vehicle wheel well.

The combination of a vehicular high power electrical system with one or more power pack actuators to form an active suspension system for a vehicle maximized electrical efficiency, minimizes installation complexity and minimizes cost. The alternative of powering an active suspension directly off the vehicle 12V electrical system would increase cost in distribution wiring and would require that a DC/DC converter stage be added to the power packs.

A vehicular high power electrical system may be associated with a power/energy optimizing control system for an active suspension (active damping.) In a typical vehicle, there may be a number of produces and consumers of power on this high power voltage bus. In such vehicles it is possible to control the active suspension in an optimal fashion by using the state of charge (SOC) of the energy storage to indicate energy balance on the bus. When the high power electrical system incorporates supercapacitors or batteries as energy storage, the voltage on the bus directly represents the SOC of the energy storage. For energy storage comprising batteries, a different method of estimating energy storage can be used to achieve similar results.

An active suspension may operate in a regeneration mode, in an active mode or in a combination thereof depending upon road conditions and the actions of the vehicle operator. Optimal active suspension performance may be achieved when the active suspension system is allowed consume or regenerate as much power as it needs. However, the DC/DC or similar interface to the vehicle 12V electrical system is often limited in peak and/or average power (energy). By monitoring the SOC of the energy storage, the active suspension can maximize its use of power in either direction while maintaining the energy balance on the bus within acceptable levels.

A vehicular high power electrical system may be associated with an open-loop driver input correction active suspension algorithm and with a vehicle model for feed-forward active suspension control. When the driver starts an aggressive maneuver which will require high power in the active suspension system to counter roll, the feed-forward signals (steering input and forward vehicle speed in this example) can be passed through a model of the vehicle to calculate how much power will be required. The DC/DC interface to the 12V vehicle electrical system can then temporarily increase its current draw from the 12V electrical system to provide the increased power on the high power bus.

This open loop (feed-forward) algorithm improves performance by not having to first let the bus voltage droop before increasing the current/power of the DC/DC converter. This temporary increase can be limited in amplitude and time duration to avoid overtaxing the 12V electrical system and causing the alternator to have to ramp up in power.

A vehicular high power electrical system may be associated with a system for power throttling. Any consumer of power on the high power bus can monitor the energy storage state of charge (SOC), either by measuring the bus voltage or by other means, and use it as an indication of power balance on the bus. When the SOC drops or falls below a threshold, consumers of power can implement a power limit to throttle their use of power. Conversely, if the SOC rises or exceeds a threshold, producers of power can implement a power limit to throttle their power production or, in the case of an active suspension, their regeneration. These power throttles (limits) implement a non-linear control method for reducing the peak and average power used or regenerated. When throttled, if the SOC continues to rise or fall, the systems on the bus can change their power limits until power balance is substantially reached and the energy storage SOC is maintain within an acceptable range. In contrast to other methods of reducing power such as adaptively changing control gains, power throttling allows the control system to otherwise operate normally and at a consistent performance level for operating points that do not exceed the power limits.

A vehicular high power electrical system with energy storage may be associated with a frequency dependant damping algorithm in an active suspension. Energy storage such as supercapacitors or lithium phosphate batteries can best absorb the peak power generated by high frequency wheel damping without allowing excessive bus voltage spikes or causing high currents regenerated into the vehicle 12V electrical system. Supercapacitors have higher power density than batteries but lower energy density so are best suited to absorb this high frequency regenerated power. In some embodiments the energy storage is a rechargeable battery pack, which has high power density as well and can capture and respond to energy needs for lower frequency body events such as roll and heave, the control algorithms for which may operate in a lower frequency regime.

Contactless Sensing of Electric Generator Rotor Position Through a Diaphragm

Aspects of this disclosure relate to a method and system for measuring rotor position or velocity in an electric motor disposed in hydraulic fluid. The methods and systems disclosed herein may comprise a contactless position sensor that measures electric motor rotor position via magnetic, optical, or other means through a diaphragm that is permeable to the sensing means but impervious to the hydraulic fluid. According to one aspect there are provided a housing containing hydraulic fluid, an electric motor immersed in the fluid in the housing, wherein the electric motor comprises a rotatable portion that includes a sensor target element, a diaphragm that is impervious to the hydraulic fluid that separates the hydraulic fluid in the housing from a sensing compartment, and a position sensor located in the sensing compartment, wherein the diaphragm permits sensing of the sensor target element by the position sensor. According to another aspect the position sensor is a contactless sensor, wherein the position sensor is at least one of an absolute position and a relative position sensor, wherein the position sensor is a contactless magnetic sensor. According to another aspect the position sensor may be a Hall effect detector, and the sensor target element may be adapted to be detectable by the position detector and the diaphragm comprises a non-magnetic material. In some embodiments of the system the position sensor may be an array of Hall effect sensors and wherein the Hall effect sensors are sensitive to magnetic field in the axial direction with respect to the rotatable portion of the electric motor. In some embodiments of the system the sensor target element may be a diametrically magnetized two-pole magnet. In some embodiments of the system the magnet does not need to be aligned in manufacturing. According to another aspect the position sensor may be a metal detector, the sensor target element may be adapted to be detectable by the metal detector and the diaphragm comprises a non-magnetic material. According to another aspect the position sensor may be an optical detector, the sensor target element may be adapted to be detectable by the optical detector and the diaphragm comprises a translucent region that may be disposed in an optical path between the optical detector and the portion of the rotatable portion that comprises the sensor target element. According to another aspect the position sensor may be a radio frequency detector and the sensor target element may be adapted to be detectable by the position detector. According to another aspect the position sensor may be tolerant of at least one of variation in air gap between the sensor target element and the position sensor, pressure of the hydraulic fluid, temperature of the hydraulic fluid, and external magnetic fields. According to another aspect the system comprises a fluid filled housing wherein the fluid in the housing may be pressurized, wherein the pressure in the fluid filled housing exceeds an operable pressure limit of the position sensor.

According to another aspect a system of electric motor rotor position sensing, comprises an active suspension system in a vehicle between a wheel mount and a vehicle body, wherein the active suspension system comprises an actuator body, a hydraulic pump, and an electric motor coupled to the hydraulic pump immersed in hydraulic fluid. In some embodiments of the system the electric motor comprises a rotor with a sensor target element, the rotation of which may be detectable by contactless position sensor, and a diaphragm that isolates the contactless position sensor from the hydraulic fluid while facilitating disposing the contactless position sensor in close proximity to the sensor target element. In some embodiments of the system further comprises of a plurality of sensors, an energy source and a controller that senses wheel and body events through the plurality of sensors, senses the rotor rotational position with the position sensor and in response thereto sources energy from the energy source for use by the electric motor to control the active suspension, wherein the response to the position sensor comprises commutation of an electric BLDC motor to create at least one of a torque and velocity characteristic in the motor. In some embodiments of the system creating at least one of a torque and velocity characteristic in the motor creates a force from the active suspension system. In some embodiments of the system the response to the position sensor comprises a vehicle dynamics algorithm that uses at least one of rotor velocity, active suspension actuator velocity, actuator position, actuator velocity, wheel velocity, wheel acceleration, and wheel position, wherein such value may be calculated as a function of the rotor rotational position. In some embodiments of the system the response to the position sensor comprises a hydraulic ripple cancellation algorithm.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

Electric motor/generator rotor position sensing that in one embodiment may include magnetically sensing the rotary position through a diaphragm and in another embodiment may include magnetically sensing the rotary position of a fluid immersed motor/generator. An active suspension may use a rotary position sensor to provide accurate speed and/or torque control of the motor/generator to improve the control feedback and provide superior damper performance.

For reasons of performance, reliability and durability it may be preferred to have the motor/generator immersed the in the working fluid, under pressure, thereby negating the need for a rotating shaft seal. It may also be necessary to use a rotary position sensor that is not suitable to be immersed the in the working fluid, under pressure, therefore a rotary position sensing device that can sense the rotary position a fluid immersed motor/generator through a diaphragm that separates the fluid immersed motor/generator from the senor may be desirable.

Electric motor/generator rotor position sensing that may include magnetically sensing the rotary position of a fluid immersed motor/generator through a diaphragm that in one embodiment is integrated into a single body active suspension actuator comprising of an electric motor/generator, an electronic [torque/speed] electric motor controller, and a sensor, in housing. In another embodiment this may be integrated into a single body active suspension actuator comprising of an electric motor/generator, a hydraulic pump, an electronic [torque/speed] electric motor controller, and a sensor, in a housing.

The ability to package an active suspension, that incorporates a rotary position sensor to provide accurate speed and/or torque control of the motor/generator to improve the control feedback and provide superior damper performance into a highly integrated package may be desirable to reduce integration complexity (e.g. eliminates the need to run long hydraulic hoses), improve durability by fully sealing the system, reduce manufacturing cost, improve response time, and reduce loses (electrical, hydraulic, etc.) from shorter distances between components.

Electric motor/generator rotor position sensing in an active valve may include magnetically sensing the rotary position of a fluid immersed motor/generator through a diaphragm that in one embodiment comprises of a single body valve comprising an electric motor, a hydraulic pump, and an electronic [torque/speed] electric motor controller, in a [fluid-filled] housing, and in another embodiment comprises of a single body valve comprising a hydraulic pump, an electric motor that controls operation of the hydraulic pump, an electronic [torque/speed] electric motor controller, and one or more sensors, in a housing.

The ability to package a hydraulic power pack, that tightly integrates the motor/generator with a hydraulic pump that contains the electronic [torque/speed] electric motor controller and any required sensors in a single body is highly desirable where smart control of hydraulic flow and pressure is required where the energy flow may be bidirectional so that electrical power may be generated as well as used where such power packs could be termed an 'active valve'. Tight integration of all of the components of an 'active valve' facilitates reduced integration complexity (e.g. eliminates the need to run long hydraulic hoses), improved durability by fully sealing the system, reduced manufacturing cost, improved response time, and reduce loses (electrical, hydraulic, etc.) from shorter distances between components.

Electric motor/generator rotor position sensing that may include magnetically sensing the rotary position of a fluid immersed motor/generator through a diaphragm that in one embodiment includes an active suspension actuator comprising an electric motor, a hydraulic pump, and a piston equipped hydraulic actuator that facilitates communication of hydraulic actuator fluid through a body of the actuator with the hydraulic pump.

The ability to package an active suspension, that incorporates a rotary position sensor to provide accurate speed and/or torque control of the motor/generator to improve the control feedback and provide superior damper performance into a an active damper actuator body where the fluid communication from the hydraulic pump to the piston via fluid channels that are in the actuator body may be desirable to reduce integration complexity by eliminating the need to run external hydraulic hoses, and improve durability by fully sealing the system, reduce manufacturing cost, improve response time, and reduce hydraulic losses by employing larger more direct flow areas.

Electric motor/generator rotor position sensing that may include magnetically sensing the rotary position of a fluid immersed motor/generator through a diaphragm in one embodiment includes a vehicle active suspension system comprising a hydraulic motor disposed proximal to each wheel of the vehicle that produces wheel-specific [variable flow/variable pressure], and a controllable electric motor disposed proximal to each hydraulic motor for controlling wheel movement via the hydraulic motor. In another embodiment includes a vehicle wheel well compatible active suspension actuator comprising a piston rod disposed in an actuator body, a hydraulic motor, an electric motor, an electronic [torque/speed] electric motor controller, and a passive valve disposed in the actuator body and that operates in [parallel/series] with the hydraulic motor, all packaged to fit within a vehicle wheel well.

The ability to incorporate an active suspension that incorporates a rotary position sensor that may include magnetically sensing the rotary position of a fluid immersed motor/generator through a diaphragm to provide accurate speed and/or torque control of the motor/generator to improve the control feedback and provide superior damper performance into a tight integrated package that is disposed proximal to each wheel and is compatible to be disposed into a vehicle wheel well may be desirable to reduce integration complexity (e.g. eliminates the need to run long hydraulic hoses), improve durability by fully sealing the system, reduce manufacturing cost, improve response time, and reduce loses (electrical, hydraulic, etc.) from shorter distances between components.

Electric motor/generator rotor position sensing that may include magnetically sensing the rotary position of a fluid immersed motor/generator through a diaphragm that in one embodiment includes a multi-aperture diverter valve with a smooth opening/transition.

Certain applications of an active suspension may require high damper velocities with resulting high hydraulic flow velocities that may produce unacceptably high hydraulic pump speeds. In such applications it may be desirable to limit the speed of the hydraulic pump to acceptable limits when high flow rates exist. The use of a multi-aperture diverter valve will allow at least partial fluid flow to bypass the hydraulic pump when a certain flow velocity is achieved. It is desirable to have the fluid bypass transition to act in a smooth manner so as not to produce undesirable ride harshness. Therefore, an active suspension that incorporates a rotary position sensor that may include magnetically sensing the rotary position of a fluid immersed motor/generator through a diaphragm to provide accurate speed and/or torque control of the motor/generator to improve the control feedback and provide superior damper performance that includes with a smooth opening/transition diverter valve may be desirable.

Electric motor/generator rotor position sensing that may include magnetically sensing the rotary position of a motor/generator through a diaphragm, wherein the motor/generator may be fluid immersed that in one embodiment includes a self-calibrating sensor based on detected noise patterns that are filtered out by selective position sensing. In another embodiment includes a real-time online no latency [rotational sensor] calibration based on off-line generated calibration curve. In another embodiment includes a high-accuracy calibration method for a low-cost [low-accuracy] position sensor. In another embodiment includes a deriving [magnetic] sensor error compensation based on velocity calculation Certain types of position sensors, esp. low cost sensors that can operate through a diaphragm, can have non-linearities. When the position information is differentiated to create velocity data, the non-linearity error in the position data can be detrimental to system performance. This problem is further compounded if the velocity is further differentiated to calculate acceleration. In cost sensitive applications, redundant sensors, which might be used as a reference to correct these errors, are typically not present. Typical solutions include low pass or notch filtering the data to reduce signals that match the frequencies of the error signal. However, filters introduce latency or delay in the signal which may be unacceptable to performance sensitive applications. Therefore, method to correct for these errors, without the need for redundant sensing which does not introduce latency in the measured signals may be desirable.

Electric motor/generator rotor position sensing that may include magnetically sensing the rotary position of a motor/generator through a diaphragm, wherein the motor/generator that may be fluid immersed that in one embodiment uses sensorless data to correct for sensor errors and to improve accuracy.

Certain types of position sensors, esp. low cost sensors that can operate through a diaphragm, can have non-linearities. When the position information is differentiated to create velocity data, the non-linearity error in the position data can be detrimental to system performance. This problem is further compounded if the velocity is further differentiated to calculate acceleration. In cost sensitive applications, redundant sensors which might be used as a reference to correct these errors are typically not present. Typical solutions include low pass or notch filtering the data to reduce signals that match the frequencies of the error signal. However, filters introduce a latency or delay in the signal which may be unacceptable to performance sensitive applications. In the case that the system contains velocity signals that correlate with the errors in the position sensor, then it will not be possible to separate sensor error from system signal for the purpose of creating a calibration table. If the system is a Brushless DC (BLDC) electric motor then it will include current sensors for at least some of the motor phases. In this case, it may be desirable to use what are known in the industry as "sensor-less techniques" to derive a base velocity or position signal in some parts of the operating domain which can be used to create a calibration table for the position sensor which is not effected by the correlating system signals and can be used in operating domains where "sensor-less techniques" do provide sufficient accuracy or are not possible.

Electric motor/generator rotor position sensing that may include magnetically sensing the rotary position of a motor/generator through a diaphragm, wherein the motor/generator that may be fluid immersed that in one embodiment the electric motor/generator is controlled by an adaptive controller for hydraulic power packs.

A tightly integrated hydraulic power pack comprises a compact, high efficiency and low-hydraulic-noise omnidirectional pump that is characterized by very low transport delay and is capable of on-demand rapid reversal of energy flow without the use of external hydraulic accumulators and/or hydraulic control valves while maintaining the desired and rapidly variable force and flow characteristics. The controller for the hydraulic power pack system utilizes internal sensors to sense rotor movement as well as external sensor inputs to control desired torque. The controller directly controls the dynamics of a hydraulic system by regulating motor torque. To achieve tight power pack integration, it is desirable to have the motor integral with the hydraulic pump in a common fluid filled housing. It is therefore desirable to have an adaptive controller for hydraulic power packs coupled to motor position sensor arrangement that can sense motor position when the motor is immersed in fluid.

Electric motor/generator rotor position sensing that may include magnetically sensing the rotary position of a fluid immersed motor/generator through a diaphragm that in one embodiment is integrated with a controller that contains active diverter valve smoothing algorithms.

Certain applications of an active suspension may require high damper velocities with resulting high hydraulic flow velocities that may produce unacceptably high hydraulic pump speeds. In such applications it may be desirable to limit the speed of the hydraulic pump to acceptable limits when high flow rates exist. The use of a multi-aperture diverter valve will allow at least partial fluid flow to bypass the hydraulic pump when a certain flow velocity is achieved. It is desirable to have the fluid bypass transition to act in a smooth manner so as not to produce undesirable ride harshness. It is possible through control of the motor torque to smooth this transition. To achieve tight integration of the active suspension, it is desirable to have the motor integral with the hydraulic pump in a common fluid filled housing. It is therefore desirable to have an active suspension that incorporates an active diverter valve smoothing algorithm with a motor position sensor arrangement that can sense motor position when the motor is immersed in fluid.

Electric motor/generator rotor position sensing that may include magnetically sensing the rotary position of a motor/generator through a diaphragm, wherein the motor/generator that may be fluid immersed that in one embodiment includes active suspension control algorithms to mitigate braking dive, pitch/roll, speed bump response, body heave, head toss, seat bounce, inclined operation, cross slope, large event smoothing that can provide an active safety suspension system.

The active suspension comprises a compact, high efficiency and low-hydraulic-noise omnidirectional pump that is characterized by very low transport delay and is capable of on-demand rapid reversal of energy flow while maintaining the desired and rapidly variable force and flow characteristics. The controller directly controls the dynamics of a hydraulic system by regulating motor torque. The controller for the active suspension system may utilize the rotary position sensor to sense rotor movement as well as external sensor inputs to control desired torque. It is desirable to use inputs from these sensors with control algorithms that are designed to improve the vehicle dynamics, road holding and comfort by mitigating braking dive, pitch/roll, speed bump response, body heave, head toss, seat bounce, inclined operation, cross slope and large event smoothing. It is also desirable to incorporate algorithms that can work in conjunction with the vehicle safety systems, such as stability control etc. so the controller can sense when a safety issue may occur so that it can control the active suspension in a manner to improve the vehicle handling so as to help avoid the safety issue, or by rapidly varying the ride height of the vehicle to reduce the effect of an impact.

Electric motor/generator rotor position sensing that may include magnetically sensing the rotary position of a motor/generator through a diaphragm, wherein the motor/generator that may be fluid immersed that in one embodiment includes an active suspension control algorithms to mitigate braking, pitch/roll, speed bump response, body heave, head toss, seat bounce, inclined operation, cross slope, large event smoothing The active suspension comprises a compact, high efficiency and low-hydraulic-noise omnidirectional pump that is characterized by very low transport delay and is capable of on-demand rapid reversal of energy flow while maintaining the desired and rapidly variable force and flow characteristics. The controller directly controls the dynamics of a hydraulic system by regulating motor torque. The controller for the active suspension system may utilize the rotary position sensor to sense rotor movement as well as external sensor inputs to control desired torque. It is desirable to use inputs from these sensors with control algorithms that are designed to improve the vehicle dynamics, road holding and comfort by mitigating braking dive, pitch/roll, speed bump response, body heave, head toss, seat bounce, inclined operation, cross slope and large event smoothing.

Active Adaptive Hydraulic Ripple Cancellation

Aspects of the invention relate to a device and methods to electronically control and improve the ripple characteristics of hydraulic pumps/motors. Subsequent references to a hydraulic pump will encompass a hydraulic pump and a hydraulic motor except where context indicates otherwise. Subsequent references to an electric motor will encompass an electric motor, an electric generator and/or a BLDC motor except where context indicates otherwise. References to a rotor and position thereof encompass the entire rotating assembly and therefore with the electric motor position and hydraulic pump position except where context indicates otherwise. Subsequent references to ripple torque and ripple velocity encompass a torque signal that is commanded by the controller and/or a velocity signal commanded by the controller respectively except where context indicates otherwise; both are cancellation signals that are added to a nominal command torque or velocity signal. Subsequent references to steady state conditions encompass a substantially constant hydraulic pump velocity. Subsequent references to displacement flow encompass flow that is transported through the hydraulic pump/motor. This displacement flow may vary with the angular position of the rotor. An operating point may be specified by a combination of pressure differential and pump velocity.

According to one aspect, a hydraulic pump is coupled to the shaft of an electric motor such that torque applied to the shaft of the electric motor results in torque applied to the hydraulic pump. A method of electric motor position sensing is provided such that accurate control over motor torque with respect to position is achieved. Pressure differential is generated across the hydraulic pump by applying torque to the shaft of the electric motor. This torque can be either a retarding torque, in which case shaft power is extracted from the pressure differential, or a driving torque, in which case power is input to the electric motor to cause a pressure differential. Normally, constant application of torque at steady state will generate non-constant and periodic fluctuations in pressure differential due predominately to the geometric nature of the hydraulic pump and non-constant flow capacity therein; this fact is well known by those trained in the art. With proper analysis it can be discovered that these fluctuations occur in a predictable manner with respect to the position (angular or linear) of the pump and at a frequency proportional to the rotational speed of the pump. To counteract these natural fluctuations in pressure, a non-constant torque, or ripple torque, can be carefully applied as a function of rotor position by the electric motor in order to attenuate the magnitude of the generated pressure ripple. This torque may fluctuate above and below the nominal mean constant torque to achieve the same mean pressure as the above-mentioned case of constant torque application. In this manner the mean of the ripple torque may be the same value as the constant torque to achieve the same mean pressure differential. Typically, one revolution of the hydraulic motor will generate a predetermined and predictable number of periodic fluctuations in pressure and/or flow, which in steady state operation will comprise a periodic waveform with respect to position. In order to correctly apply torque to achieve this behavior, the position dependent nature of the ripple and therefore the position dependent requirements of ripple torque application must be known or discovered. The ripple torque may result in a ripple velocity to increase velocity and generate increased displacement flow when the displacement flow is lower than the mean flow, and to decrease velocity and generate decreased displacement flow when the displacement flow is higher than the mean flow.

According to one aspect the ripple torque applied is commanded of the controller by a ripple model that includes rotor position. The ripple model specifies the waveform of ripple torque to be applied in order to attenuate pressure ripple at a given operating point. The specification of the torque waveform may include the magnitude of one or more periodic waveforms, relative phase angles between each of the plurality of waveforms, as well as the relative phase angle of the resultant waveform with respect to position of the electric motor. The summation of one or a plurality of waveforms with predominant frequencies with respect to rotor position at any integer harmonic may produce a resultant waveform that serves to attenuate pressure ripple at multiple harmonic frequencies of the primary rotational frequency.

In one embodiment the mean ripple torque applied in order to achieve a substantially constant pressure differential value is substantially equal to the constant torque value applied to achieve a mean pressure ripple of the same value. The root mean square value of the ripple torque may be higher than the mean ripple torque. In this manner the additional electric power losses associated with this method of ripple cancellation are a result of the electrical resistance losses due to the difference between the root mean square current and the mean current required to produce the tipple current. This may be considered small in comparison with the overall electrical resistance losses and therefore negligible as a loss of the system.

In one embodiment the ripple model takes as direct inputs any of rotor velocity, electric motor torque, hydraulic flow rate, and hydraulic pressure. An operating point may be determined by a combination of rotor velocity or hydraulic flow rate, and motor torque or hydraulic pressure. The model may be a function or a series of functions in which the direct inputs serve as independent variables. The model may otherwise be a multidimensional array indexed by any combination of the direct inputs.

In one embodiment the parameters of the ripple model with either of the above detailed formulations are adaptable and or updatable. Sensor input from one or a plurality of secondary sensors that are not used to detect rotor position are used as feedback to the ripple model in order to update model parameters that specify the ripple torque waveform. In this manner the model need not account for all effects of externalities and perturbations but rather, may dynamically update its parameters to account for these factors as they relate to the hydraulic pressure ripple and the corresponding cancellation waveform.

In one embodiment, the ripple model is a feed-forward ripple model of any of torque and velocity. The inputs to the model are based on commanded or sensed parameters while the system response is not monitored as a feedback signal. In this manner the model does not have a measure of its performance and does not dynamically adjust its output accordingly to system response in a time scale on the order of the system time constant.

In one embodiment ripple cancellation is carried out in a closed loop feedback based control system. A sensor that correlates with pressure ripple (a pressure sensor, a flow sensor, a strain gauge, an accelerometer etc.) is used to feed back the ripple response and compare it to a desired output, which may be based on an input parameter (pressure, flow, force etc.), the difference between the desired and actual being considered the error or ripple. This signal is then fed into the motor controller, which adjusts the applied torque in order to minimize the magnitude of the ripple signal.

In one embodiment rotor position may be detected by any of a number of methods including a rotary encoder, a Hall effect sensor, optical sensors, or model-based position estimation that utilize external signals such as phase voltages and phase current signals of the electric motor. The latter are known in the field as "sensor-less" algorithms for controlling electric motors. Sensor-less methods may include comparing electric motor parameters to a model of motor back EMF.

In one embodiment the output of the ripple model is a specified ripple velocity as opposed to a ripple torque. At constant velocity the displacement flow of the hydraulic pump is non-constant so it may be necessary for the speed to ripple accordingly. In this manner the motor controller performs closed-loop velocity control in order to achieve the ripple velocity specified by the ripple model. No ripple torque specification is necessary and no feedback on torque is performed. The output of a ripple velocity has the same attenuation effect on pressure ripple as the model that specifies ripple torque. The factors that influence how ripple torque leads to a ripple velocity primarily include hydraulic drag torque and rotational inertia. The primary difference of a ripple velocity model over a ripple torque model is that these influences and changes therein are external to the model set parameters and are instead accounted for in the closed loop velocity control. Any changes in torque requirements to achieve a specified ripple velocity will be directly handled by the velocity feedback control.

In one embodiment the electric motor is immersed in a hydraulic fluid along with the hydraulic pump. In this manner position sensing of the electric motor must be performed inside a pressurized fluid environment. The hydraulic pump is preferably located coaxially with the electric motor.

In one embodiment the electric motor and hydraulic pump are contained in an actuator of a vehicle suspension system. Pressure differential generated across the hydraulic pump results in a force on the piston of the actuator. Command torque on the electric motor may be the output of a separate vehicle dynamics model and or feedback control system. The ripple torque may be added to the command torque to impart an overall torque applied to the rotor. In the event that a ripple velocity model is used, the command torque is used to specify the mean pressure, which may be used as an input to the ripple velocity model.

In one embodiment, operating the electric motor comprises adjusting the current flow through the windings of the electric motor in response to sensed angular position of the rotor. Operating the electric motor may also be accomplished by adjusting the voltage in the windings of the electric motor in response to sensed angular position of the rotor. The electric motor may be a BLDC motor.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

Adaptive model based feed-forward hydraulic pump/motor pressure ripple cancellation may be associated with active feedback-based hydraulic pump/motor pressure ripple cancellation. The torque of a hydraulic pump/motor may be regulated by a controller and a constant torque application will result in fluctuating pressure differential across the hydraulic pump/motor, or pressure ripple. A model-based feed-forward method of torque control may apply non-constant torque in a manner so as to attenuate the resulting pressure ripple from the hydraulic device. A model may be physical in nature or may be based on empirical data. This feed-forward method may further be associated with a feedback-based control system to dynamically adapt the model to external disturbances or changes in physical parameters such as temperature.

A single body active suspension actuator comprising an electric motor may include a hydraulic pump/motor, an electronic electric motor controller and a position sensor all contained inside a housing and may be associated with active hydraulic pump/motor pressure ripple cancellation. The torque of an electric motor coupled to a hydraulic pump/motor may be regulated by an electronic motor controller and a constant torque application will result in fluctuating pressure differential across the hydraulic pump/motor, or pressure ripple. An electric motor controller may include as sensor inputs, a rotational position sensor, pressure sensors, force load cell, accelerometers or any combination therein. These sensors may be used in an active control system to attenuate hydraulic ripple by applying closed-loop feedback torque control on either pressure, acceleration, load cell force or any combination. This system can provide smooth force control of an actuator for a single body active suspension. The pressure generated by the hydraulic pump/motor may act directly on a piston and transmit the resulting force through to a suspension.

A single body active suspension actuator comprising an electric motor may include a hydraulic pump/motor, an electronic electric motor controller and a position sensor all contained inside a housing and may be associated with adaptive model based feed-forward hydraulic pump/motor pressure ripple cancellation. The torque of an electric motor coupled to a hydraulic pump/motor may be regulated by an electronic motor controller and a constant torque application will result in fluctuating pressure differential across the hydraulic pump/motor, or pressure ripple. An electric motor controller may include as sensor inputs, a rotational position sensor, pressure sensors, force load cell, accelerometers or any combination therein. These sensors may be used in an adaptive control system to attenuate hydraulic ripple by applying model-based feed forward torque control on either pressure, acceleration, load cell force or any combination therein. A ripple cancellation model may be based on any number of parameters such as torque applied and sensed speed. As external disturbances may stray the physical system from the original model, sensor information such as temperature, acceleration, pressure, or load cell force may be used to update the model parameters using quasi-feedback model updating. This is in contrast to using direct closed loop feedback which can inherently contain latency and be prone to instability.

A vehicle active suspension system that comprises a hydraulic motor disposed proximal to each wheel of the vehicle that produces wheel specific pressure/flow and a controllable electric motor disposed proximal to each hydraulic motor for controlling wheel movement via the hydraulic motor may be associated with active hydraulic pump/motor pressure ripple cancellation. The torque of an electric motor coupled to a hydraulic pump/motor may be regulated by an electronic motor controller and a constant torque application will result in fluctuating pressure differential across the hydraulic pump/motor, or pressure ripple. Sensor input to the electric motor controller may be used in feedback torque control to attenuate the hydraulic pressure ripple of the pump/motor and subsequently the force to the suspension and resulting acceleration of the body or wheel. Alternatively, ripple attenuation by torque control may be done in an adaptive model-based feed-forward control system, wherein sensor inputs to the controller may be used to adapt the model to changing system conditions or disturbances. In this manner, sensors are not used for closed loop control but are used as feedback for updating the model following control system.

An adaptive controller for hydraulic power packs may run software employing active hydraulic pump ripple cancellation. A controller for hydraulic power packs may be a torque controller and may further be an electric motor with an electric motor torque controller. The controller may be adaptive by adjusting its parameters to changing system conditions or disturbances. The torque of an electric motor coupled to a hydraulic pump/motor regulated by an electronic motor controller my apply a constant torque and will result in fluctuating pressure differential across the hydraulic pump/motor, or pressure ripple. The controller may include as inputs, sensors which may be used in an active control system to attenuate hydraulic ripple by applying closed-loop feedback torque control on pressure. In addition, the adaptive controller may apply feed-forward control by employing a lookup table or equation, and controlling motor torque with a control signal that equals the command torque offset by the ripple cancellation value at that time step (for example, by applying motor torque plus the amplitude/phase/frequency shifted sine wave that is out of phase with the ripple).

Active hydraulic pump ripple cancellation may be associated with a control topology of an active suspension including a processor-based controller per wheel. A processor-based control method per wheel of a vehicle may be used as the primary control method of an active suspension system. The method of control may be torque control of an electric motor coupled to a hydraulic pump/motor. The torque may be regulated by the processor-based controller to actively cancel pressure ripple of the hydraulic pump motor. Constant torque application to a hydraulic pump/motor will result in pressure that fluctuates or ripples around a mean value. Using sensor feedback to actively adjust the torque to attenuate this pressure ripple greatly reduces undesirable vibrations and noise in the active suspension system.

Active hydraulic pump ripple cancellation may be associated with electric motor/generator rotor position sensing in an active suspension. A hydraulic pump/motor may be used to control pressure and thereby force in an active suspension system. Torque control of the hydraulic pump/motor may be achieved by coupling to an electric motor/generator. For accurate electric motor torque control it is necessary to include a rotor position sensor. Constant torque application to a hydraulic pump/motor will result in pressure that fluctuates or ripples around a mean value. Using a rotor position sensor to accurately track the angular position of the electric motor and thereby the hydraulic pump/motor, a method of active hydraulic pump ripple cancellation may be implemented by using sensor feedback to the motor torque controller that is based on pump rotary position. Sensors including pressure sensors, accelerometers, load cells etc. may be used along with the rotor position sensor in a closed-loop or semi-closed loop control system to actively attenuate hydraulic pressure ripple and greatly reduce undesirable vibrations and noise in the active suspension system.

Adaptive feed-forward hydraulic pump ripple cancellation may be associated with electric motor/generator rotor position sensing in an active suspension. A hydraulic pump/motor may be used to control pressure and thereby torque in an active suspension system. Torque control of the hydraulic pump/motor may be achieved by coupling to an electric motor/generator. For accurate electric motor torque control it is necessary to include a rotor position sensor. Constant torque application to a hydraulic pump/motor will result in pressure that fluctuates or ripples around a mean value. Using a rotor position sensor to accurately track the angular position of the electric motor and thereby the hydraulic pump/motor, a method of hydraulic pump ripple cancellation may be implemented by using an adaptive model-based feed-forward motor torque control system to attenuate pressure ripple generated by the hydraulic pump/motor. Sensor data used for the active suspension such as accelerometer data may be used to update the feed-forward model in order to adapt to external disturbances or changes in physical parameters such as temperature. This association to attenuate hydraulic pressure ripple can greatly reduce undesirable vibrations and noise in the active suspension system.

Active hydraulic pump ripple cancellation may be associated with magnetically sensing the rotor position of an electric motor/generator through a diaphragm. A hydraulic pump/motor may be used to control pressure and thereby torque in a hydraulic system. Torque control of the hydraulic pump/motor may be achieved by coupling to an electric motor/generator. For accurate electric motor torque control it is necessary to include a rotor position sensor. This may drive motor commutation and the ripple cancellation control, which may be a function of hydraulic pump position (which may be proportional to the electric motor position). The rotor of the electric motor may be encased in a high pressure fluid environment and it therefore may be necessary to sense rotor position from an external environment through a diaphragm. This can be achieved by a rotary magnetic sensor couple to the spinning shaft of the electric motor/generator and sensing through a diaphragm constructed of a non-magnetic material. Constant torque application to a hydraulic pump/motor will result in pressure that fluctuates or ripples around a mean value. Using a rotor position sensor to accurately track the angular position of the electric motor and thereby the hydraulic pump/motor, a method of active hydraulic pump ripple cancellation may be implemented by using feedback from this sensor, in addition to other optional sensors such as pressure, accelerometers, load cells etc. to implement active torque control to the hydraulic pump/motor.

Active hydraulic pump ripple cancellation may be associated with sensing rotor position of a fluid immersed electric generator shaft in an active suspension. A hydraulic pump/motor may be used to control pressure and thereby torque in an active suspension system. Torque control of the hydraulic pump/motor may be achieved by coupling to an electric motor/generator. In some embodiments, the electric motor/generator may be disposed in fluid with the hydraulic pump, coupled on the same shaft. An active ripple cancellation algorithm may use feedback from shaft rotary position in order to induce a cancellation signal in the motor by dynamically controlling motor torque.

In addition, for accurate electric motor torque control it is sometimes necessary to include a rotor position sensor. The rotor of the electric motor may be encased in a high pressure fluid environment and it therefore may be necessary to sense rotor position from an external environment through a diaphragm. This can be achieved by a rotary magnetic sensor couple to the spinning shaft of the electric motor/generator and sensing through a diaphragm constructed of a non-magnetic material. Constant torque application to a hydraulic pump/motor will result in pressure that fluctuates or ripples around a mean value. Using a rotor position sensor to accurately track the angular position of the electric motor and thereby the hydraulic pump/motor, a method of active hydraulic pump ripple cancellation may be implemented by using feedback from sensors such as pressure, accelerometers, load cells etc. to implement active torque control to the hydraulic pump/motor. This cancellation or attenuation of the hydraulic pressure ripple can greatly reduce undesirable vibrations and noise in the active suspension system.

Active hydraulic pump ripple cancellation may be associated with using sensor-less motor control. A hydraulic pump/motor may be used to control pressure and thereby pressure in a hydraulic system. Torque control of the hydraulic pump/motor may be achieved by coupling to an electric motor/generator. In the case of a brushless synchronous motor, position feedback may be necessary in order to provide commutation (driving the phases with current). In addition, position feedback of the rotor may be an input to an active ripple cancellation algorithm that applies a cancellation signal in phase with rotor position. Since a sensor is not always feasible to implement to detect rotary position, it may be desirable to detect rotor position without a position sensor. This may be accomplished by measuring current and voltage on the phases of the motor (for example, in the case of a permanent magnet three-phase brushless motor connected to a three phase motor controller bridge, reading phase currents and voltages on at least two of the phases). Current may be read as a voltage drop across a shunt resistor, as an analog or digital output from a Hall-effect current sensor, or some other suitable means. Voltage may be read in an analog to digital converter (ADC), either directly or via a voltage divider or the like.

During commutation in a three phase motor for example, as one phase is controlled to positive and another phase is controlled to negative using MOSFET transistors or the like, the third phase is left floating. Back EMF from the motor creates a voltage on the third phase that can be read by an ADC. This voltage crosses zero when the rotor position is half-way through the rotation from the one controlled phase to the other, serving as an indication of absolute rotor position. By calculating the time between zero crossings as it rotates across multiple phases during controlled commutation, a rotor velocity can be estimated. This angular velocity can be multiplied by time between zero crossings to obtain an estimate on rotor position between floating phase zero crossings. This position estimate can then be used by the active hydraulic ripple noise cancellation algorithm by inducing a torque command to the motor that is equal to the command torque plus/minus a ripple cancellation wave (the wave being a function of rotor position). While the above description is one way of conducting sensorless control, multiple such methods exist in the art and the present invention is not limited in this regard.

In another embodiment, sensorless control techniques are used in conjunction with a physical sensor. The sensorless technique may provide an a priori estimate of rotor position, which can be used in a filter along with the sensed position in order to eliminate sensor errors from the output.

This technique of using rotor position estimate data using voltage/current, either alone or in conjunction with a position sensor, may be used with both feed-forward hydraulic pump/motor ripple cancellation Adaptive feed-forward hydraulic pump ripple cancellation may be associated with using data to correct for sensor errors and to improve sensor accuracy. A hydraulic pump/motor may be used to control pressure and thereby torque in a hydraulic system. Torque control of the hydraulic pump/motor may be achieved by coupling to an electric motor/generator. A model for feed-forward pressure ripple cancellation may include as inputs rotational speed and or torque. Using data, or comparison of sensed parameters such as pressure to the model, corrections to other system sensors such as rotor position may be implemented. Certain sensor errors such as dropped counts per revolution may be detected and corrected for by comparing the necessary phase of cancellation torque to the model output of cancellation torque. Detecting and correcting similar sensor errors can help maintain the sensor inaccuracies within certain bounds and control sensor errors from accumulating especially in one direction.

Adaptive feed-forward hydraulic pump ripple cancellation may be associated with a predictive analytic algorithm that factors in inertia in an active suspension control to arrive at a desired suspension force. A hydraulic pump/motor may be used to control pressure and thereby force in a hydraulic system. Torque control of the hydraulic pump/motor may be achieved by coupling to an electric motor/generator. A model for feed-forward pressure ripple cancellation may include as inputs rotational speed and or torque. A model for inertia of the hydraulic pump/motor rotating assembly may be used in a force control algorithm in an active suspension.

Under steady state conditions, the force due to hydraulic pressure is produced from torque on the hydraulic motor/pump. Under increasing flow conditions or conditions that cause the rotational speed to change there is a dynamic pressure due to the acceleration of the hydraulic motor. This additional pressure force due to the inertia of the rotating assembly may be at least partially cancelled by accounting for and summing to the electric motor/generator torque on the hydraulic pump/motor in order to produce the desired force in the active suspension. For example, during acceleration, a lower torque will be applied to the motor to achieve some larger command torque (by helping it accelerate). Similarly, during deceleration, a higher control torque than the command torque will be applied to the motor to slow it down, counteracting inertia. Constant torque application to the hydraulic pump/motor will result in pressure that fluctuates or ripples around a mean value at high frequency steady state inputs. In the dynamic case of changing average rotational speed of the rotating assembly (acceleration) the torque required from the feed-forward ripple cancellation model must in turn be summed to the torque required from the inertia model to result in the overall pressure force in the active suspension. Therefore, such as system that electronically cancels both pressure ripple from the pump and inertia from accelerating the rotary (and/or linear) mass can be achieved by adding both torque control signals with the command torque (wherein the added value may be positive or negative).

A single body active suspension actuator comprising an electric motor, an electronic [torque/speed] electric motor controller, and at least one sensor, in a housing, that may include a hydraulic pump that may be in a fluid filled housing, whereby the electric motor may control the hydraulic pump. That in one embodiment is combined with power/energy optimizing control systems for active damping vehicle [roll] dynamics. A single body active suspension offers benefits of integration.

The ability to package an active suspension, that tightly integrates the electric motor/generator with a hydraulic pump that contains the electronic [torque/speed] electric motor controller and sensor in a single body is highly desirable reduced integration complexity (e.g. eliminates the need to run long hydraulic hoses), improved durability by fully sealing the system, reduced manufacturing cost, improved response time, and reduce loses (electrical, hydraulic, etc.) from shorter distances between components.

It is desirable to use the single body active suspension to improve roll stability of the vehicle and hence improve the handling dynamics of the vehicle, it also desirable to minimize the amount of energy drawn from the vehicle power bus to power the active suspension (so as to reduce impact on fuel economy and emissions etc.), therefore it may desirable to incorporate a single body active suspension with a control system that can optimize the vehicle dynamics and energy usage.

A single body active suspension actuator comprising an electric motor, an electronic [torque/speed] electric motor controller, and at least one sensor, in a housing, that may include a hydraulic pump that may be in a fluid filled housing, whereby the electric motor may control the hydraulic pump, that in one embodiment is coupled with an airspring for a vehicle.

The ability to package an active suspension, that tightly integrates the electric motor/generator with a hydraulic pump that contains the electronic [torque/speed] electric motor controller and sensor in a single body is highly desirable reduced integration complexity (e.g. eliminates the need to run long hydraulic hoses), improved durability by fully sealing the system, reduced manufacturing cost, improved response time, and reduce loses (electrical, hydraulic, etc.) from shorter distances between components. By coupling the single body active suspension with airspring further improvements in ride quality can be achieved, as well as the ability to provide ride height adjustability, by dynamically controlling the spring force and the spring rate of the airspring. It may therefore be desirable to couple a single body active suspension with an airspring in order to achieve the benefits of an improved ride quality with tight packaging.

An active suspension actuator comprising an electric motor, a hydraulic pump, and a piston equipped hydraulic actuator that facilitates communication of hydraulic actuator fluid through a body of the actuator with the hydraulic pump that in one embodiment is a vehicle wheel well compatible active suspension actuator comprising a piston rod disposed in an actuator body, a hydraulic motor, an electric motor, an electronic [torque/speed] electric motor controller, and a passive valve disposed in the actuator body and that operates in [parallel/series] with the hydraulic motor, all packaged to fit within a vehicle wheel well.

The ability to package an active suspension, that incorporates an active damper actuator body where the fluid communication from the hydraulic pump to the piston via fluid channels that are in the actuator body, that incorporates passive valving to further extend the operation of the active suspension that is all packaged to fit within a vehicle wheel well may be desirable to provide exemplary suspension performance while reducing integration complexity by eliminating the need to run external hydraulic hoses, and improve durability by fully sealing the system, reduce manufacturing cost, improve response time, and reduce hydraulic losses by employing larger more direct flow passages.

A vehicle active suspension system comprising a hydraulic motor disposed proximal to each wheel of the vehicle that produces wheel-specific [variable flow/variable pressure], and a controllable electric motor disposed proximal to each hydraulic motor for controlling wheel movement via the hydraulic motor that in one embodiment is a vehicle wheel well compatible active suspension actuator comprising a piston rod disposed in an actuator body, a hydraulic motor, an electric motor, an electronic [torque/speed] electric motor controller, and a passive valve disposed in the actuator body and that operates in [parallel/series] with the hydraulic motor, all packaged to fit within a vehicle wheel well.

The ability to package an active suspension, that incorporates an active damper actuator body where the fluid communication from the hydraulic pump to the piston via fluid channels that are in the actuator body, that incorporates passive valving to further extend the operation of the active suspension that is all packaged to fit within a vehicle wheel well may be desirable to provide exemplary suspension performance while reducing integration complexity by eliminating the need to run external hydraulic hoses, and improve durability by fully sealing the system, reduce manufacturing cost, improve response time, and reduce hydraulic losses by employing larger more direct flow passages.

An active suspension actuator comprising an electric motor, a hydraulic pump, and a piston equipped hydraulic actuator that facilitates communication of hydraulic actuator fluid through a body of the actuator with the hydraulic pump that in one embodiment is coupled with an airspring.

The ability to package an active suspension, into a highly integrated package may be desirable to reduce integration complexity (e.g. eliminates the need to run long hydraulic hoses), improve durability by fully sealing the system, reduce manufacturing cost, improve response time, and reduce loses (electrical, hydraulic, etc.) from shorter distances between components while offering improved ride quality and the ability to provide ride height adjustability, by dynamically controlling the spring force and the spring rate of the airspring.

A vehicle active suspension system comprising a hydraulic motor disposed proximal to each wheel of the vehicle that produces wheel-specific [variable flow/variable pressure], and a controllable electric motor disposed proximal to each hydraulic motor for controlling wheel movement via the hydraulic motor that in one embodiment is coupled with an airspring.

The ability to package an active suspension, into a highly integrated package that is located proximal to each wheel of the vehicle may be desirable to reduce integration complexity (e.g. eliminates the need to run long hydraulic hoses), improve durability by fully sealing the system, reduce manufacturing cost, improve response time, and reduce loses (electrical, hydraulic, etc.) from shorter distances between components while offering improved ride quality and the ability to provide ride height adjustability, by dynamically controlling the spring force and the spring rate of the airspring.

A vehicle wheel well compatible active suspension actuator comprising a piston rod disposed in an actuator body, a hydraulic motor, an electric motor, an electronic [torque/speed] electric motor controller, and a passive valve disposed in the actuator body and that operates in [parallel/series] with the hydraulic motor, all packaged to fit within a vehicle wheel well that in one embodiment is coupled with an airspring.

The ability to incorporate an active suspension that is wheel well compatible that incorporates passive valving to further extend the operation of the active suspension into a tight integrated package that is incorporated with an air spring may be desirable to reduce integration complexity (e.g. eliminates the need to run long hydraulic hoses), improve durability by fully sealing the system, reduce manufacturing cost, improve response time, and reduce loses (electrical, hydraulic, etc.) from shorter distances between components, while offering improved ride quality and the ability to provide ride height adjustability, by dynamically controlling the spring force and the spring rate of the airspring.

A single body active suspension actuator comprising an electric motor, an electronic [torque/speed] electric motor controller, and at least one sensor, in a housing, that may include a hydraulic pump that may be in a fluid filled housing (i.e. a power pack), whereby the electric motor may control the hydraulic pump, that may comprise a piston equipped hydraulic actuator that facilitates communication of hydraulic actuator fluid through a body of the actuator with the hydraulic pump, whereby the active suspension actuator may be disposed proximal to each wheel of the vehicle that produces wheel-specific [variable flow/variable pressure], and a controllable electric motor disposed proximal to each hydraulic motor for controlling wheel movement via the hydraulic motor that in one embodiment the electric motor/generator is controlled by an adaptive controller for hydraulic power packs.

The ability to package an active suspension that tightly integrates the electric motor/generator with a hydraulic pump that contains the electronic [torque/speed] electric motor controller and sensor in a single body, whereby all the fluid flow passages may be internal to the single body, is highly desirable for reduced integration complexity (e.g. eliminates the need to run long hydraulic hoses), improved durability by fully sealing the system, reduced manufacturing cost, improved response time, and reduce loses (electrical, hydraulic, etc.) from shorter distances between components. The hydraulic power pack of the active suspension comprises a compact, high efficiency and low-hydraulic-noise omnidirectional pump that is characterized by very low transport delay and is capable of on-demand rapid reversal of energy flow without the use of external hydraulic accumulators and/or hydraulic control valves while maintaining the desired and rapidly variable force and flow characteristics. The controller for the hydraulic power pack system utilizes internal sensors to sense rotor movement as well as external sensor inputs to control desired torque. The controller directly controls the dynamics of a hydraulic system by regulating motor torque. To provide superior control of the active suspension delivering accurate and rapid response to inputs to the controller from sensor(s) it is desirable to control the single body active suspension actuator with an adaptive controller for hydraulic power packs.

A vehicle wheel well compatible active suspension actuator comprising a piston rod disposed in an actuator body, a hydraulic motor, an electric motor, an electronic [torque/speed] electric motor controller (i.e. a power pack), and a passive valve(s) disposed in the actuator body and that operates in [parallel/series] with the hydraulic motor, all packaged to fit within a vehicle wheel well that in one embodiment the electric motor/generator is controlled by an adaptive controller for hydraulic power packs.

The ability to package an active suspension actuator in a wheel well is highly desirable as it integration into the vehicle will have minimal impact on the vehicle design as the optimum suspension and steering arrangements can still be retained without significant modifications. The integration of passive valving into the active suspension actuator is also desirable as it enables the active suspension actuator to operate smoothly over very high velocities (over 6 m/s) without over-speeding components within the power-pack. The hydraulic power pack of the active suspension comprises a compact, high efficiency and low-hydraulic-noise omnidirectional pump that is characterized by very low transport delay and is capable of on-demand rapid reversal of energy flow without the use of external hydraulic accumulators and/or hydraulic control valves while maintaining the desired and rapidly variable force and flow characteristics. The controller for the hydraulic power pack system utilizes internal sensors to sense rotor movement as well as external sensor inputs to control desired torque. The controller directly controls the dynamics of a hydraulic system by regulating motor torque. To provide superior control of the wheel well active suspension actuator delivering accurate and rapid response to inputs to the controller from sensor(s) as well as to allow operation at high suspension velocities, it is desirable to control the single body active suspension actuator with an adaptive controller for hydraulic power packs in combination with passive valving.

Active Stabilization System for Truck Cabin

Aspects of the invention relate to a commercial vehicle cabin stabilization system that actively responds to external force inputs from the road using sensors to monitor mechanical road input, and at least one or a plurality of controllers to command force outputs to at least one or a plurality of electro-hydraulic actuators to isolate the cabin from these inputs.

According to one aspect, the system is comprised of a plurality of electro-hydraulic actuators, each actuator comprising an electric motor operatively coupled to a hydraulic pump, and a closed hydraulic circuit, wherein each of the plurality of electro-hydraulic actuators is disposed between structural members of the chassis and cabin of the vehicle.

According to another aspect, the system has at least one sensor to sense movement in at least one axis of at least one of the cabin and the chassis.

According to another aspect, the system has a control program executing on at least one controller to activate at least one of the plurality of electro-hydraulic actuators in response to the sensed movement, wherein the activated at least one of the plurality of electro-hydraulic actuators operates to isolate at least a portion of the chassis movement from the cabin.

In some embodiments, the control program causes current to flow through the electric motor to at least one of induce rotation of the hydraulic motor thereby inducing hydraulic fluid flow through the actuator and retard rotation of the hydraulic motor thereby reducing movement of the actuator.

In some embodiments, the electro-hydraulic actuator hydraulic pump has a first port and a second port, wherein the first port is in fluid communication with the first side of a hydraulic cylinder, and the second port is in fluid communication with the second side of the hydraulic cylinder, and each actuator further comprises of an accumulator.

In some embodiments, each actuator further comprises a dedicated controller and each dedicated controller executes a version of the control program.

In some embodiments, at least one electro-hydraulic actuator operates to control roll, pitch, and heave of the cabin.

In some embodiments, at least one electro-hydraulic actuator is disposed perpendicular to the vehicle chassis and cabin.

In some embodiments, at least one electro-hydraulic actuator is disposed at a non-perpendicular angle between the chassis and cabin.

In some embodiments, the system can control fore and aft motion of the cabin.

In some embodiments, the plurality of sensors are adapted to detect vehicle acceleration in at least two axes.

In some embodiments, the plurality of sensors are feed-forward sensors and adapted to detect at least one of steering angle, brake application, and throttle.

In some embodiments, the plurality of sensors includes a sensor to detect movement of the operator's seat.

In some embodiments, the cabin is a front hinged cabin and the plurality of electro-hydraulic actuators comprises of two actuators operatively connected to the rear of the cabin.

In some embodiments, the cabin is four-point suspended cabin and the plurality of electro-hydraulic actuators comprises of four actuators operatively connected to each corner of the cabin.

In some embodiments, the system further is comprised of the least of one and a plurality of actuators disposed between a operator's seat and the cabin, wherein the least of one and a plurality of controllers for the least of one and a plurality of seat actuators communicate with the cabin suspension actuators.

In some embodiments, energy in the actuator is consumed in response to a command force.

According to one aspect, the system is a vehicle cabin stabilization system comprising a plurality of electro-hydraulic actuators, each actuator comprising an electric motor operatively coupled to a hydraulic pump, and a closed hydraulic circuit, wherein each of the plurality of electro-hydraulic actuators is disposed between structural members of the chassis and cabin of the vehicle;

According to another aspect, there is at least one sensor for determining movement of the vehicle in at least two axes.

According to another aspect, there is a control program executing on the controller to activate the plurality of electro-hydraulic actuators in response to the sensed vehicle movement, wherein the activated plurality of electro-hydraulic actuators cooperatively operate to isolate at least a portion of pitch, roll, and heave motions of the cabin from the determined vehicle movement.

In some embodiments, the plurality of sensors disposed to sense movement of the vehicle sense at least one of the chassis, the wheels, a seat, and the cabin.

In some embodiments, the control program causes current to flow through the electric motor to at least one of induce rotation of the hydraulic motor thereby inducing hydraulic fluid flow through the actuator and retard rotation of the hydraulic motor thereby reducing movement of the actuator.

In some embodiments, the electro-hydraulic actuator hydraulic pump has a first port and a second port, wherein the first port is in fluid communication with the first side of a hydraulic cylinder, and the second port is in fluid communication with the second side of the hydraulic cylinder, and each actuator further comprises of an accumulator.

In some embodiments, each actuator further comprises a dedicated controller and each dedicated controller executes a version of the control program.

In some embodiments, at least one electro-hydraulic actuator is disposed perpendicular to the vehicle chassis and cabin.

In some embodiments, at least one electro-hydraulic actuator is disposed at a non-perpendicular angle between the chassis and cabin.

In some embodiments, the system can control fore and aft motion of the cabin.

In some embodiments, the plurality of sensors are feed-forward sensors and adapted to detect at least one of steering angle, brake application, and throttle.

In some embodiments, the plurality of sensors includes a sensor to detect movement of the operator's seat.

In some embodiments, the cabin is a front hinged cabin and the plurality of electro-hydraulic actuators comprises of two actuators operatively connected to the rear of the cabin.

In some embodiments, the cabin is four-point suspended cabin and the plurality of electro-hydraulic actuators comprises of four actuators operatively connected to each corner of the cabin.

In some embodiments, the system is further comprised of the least of one and a plurality of actuators disposed between a operator's seat and the cabin, wherein the least of one and a plurality of controllers for the least of one and a plurality of seat actuators communicate with the cabin suspension actuators.

In some embodiments, energy in the actuator is consumed in response to a command force.

According to one aspect, the system is a method of secondary vehicle suspension wherein a plurality of controllable electro-hydraulic actuators are disposed between a structural member of a vehicle chassis and a structural member of a cabin of the vehicle.

According to another aspect, sensed movement information is received on at least one of the plurality of self-controllable electro-hydraulic actuators.

According to another aspect, the plurality of controllable electro-hydraulic actuators are controlled to mitigate the impact of the sensed vehicle movement on the cabin by applying current to at least one electric motor that controls movement of the hydraulic fluid through one of the plurality of actuators by at least one of resisting and assisting rotation of a hydraulic pump that engages the hydraulic fluid.

In some embodiments, the electric motor is immersed in hydraulic fluid with the pump.

In some embodiments, movement of the vehicle is measured the cabin, the chassis, the wheels, or some combination of the three.

According to one aspect, the system is a method of secondary vehicle suspension wherein a plurality of self-controllable electro-hydraulic actuators are disposed between a structural member of a vehicle chassis and a structural member of a cabin of the vehicle.

According to another aspect, sensed movement information is received on at least one of the plurality of self-controllable electro-hydraulic actuators.

According to another aspect, the movement of the cabin is mitigated by controlling rotation of a hydraulic motor of the self-controllable electro-hydraulic actuator that at least partially determines hydraulic fluid pressure within the self-controllable electro-hydraulic actuator in response to the sensed movement.

In some embodiments, each of the plurality of self-controllable electro-hydraulic actuators responds independently to the sensed movement.

In some embodiments, each of the plurality of self-controllable electro-hydraulic actuators comprises at least one local sensor to sense movement of the vehicle.

In some embodiments, each of the plurality of self-controllable electro-hydraulic actuators responds cooperatively to the sensed movement by communicating with at least one other of the plurality of self-controllable electro-hydraulic actuators.

According to one aspect, the system is a method of secondary vehicle suspension, which senses movement of a vehicle chassis.

According to another aspect, a reactive movement of a cabin of the vehicle based on the sensed movement is predicted.

According to another aspect, a plurality of controllable electro-hydraulic actuators disposed between a structural member of the vehicle chassis and a structural member of the cabin are controlled to counteract a portion of the predicted reactive movement that impacts at least one of roll, pitch and heave of the cabin.

In some embodiments, controlling comprises applying current to at least one electric motor that controls movement of the hydraulic fluid through one of the plurality of actuators by at least one of resisting or assisting rotation of a hydraulic pump that engages the hydraulic fluid.

According to one aspect, the system is a method of secondary vehicle suspension wherein movement of a vehicle cabin is sensed using an accelerometer, a gyroscope, a position sensor, or some combination of the three.

According to another aspect, a plurality of controllable electro-hydraulic actuators disposed between a structural member of the vehicle chassis and a structural member of the cabin are controlled to counteract a portion of the cabin movement in the roll, pitch and heave modes of the cabin.

In some embodiments, controlling comprises applying current to at least one electric motor that controls movement of the hydraulic fluid through one of the plurality of actuators by at least one of resisting or assisting rotation of a hydraulic pump that engages the hydraulic fluid.

An active suspension system for a truck cabin may be coupled with multiple air springs. The air springs would assist in the mitigation of mechanical inputs between the chassis and the cab. In a three point active truck cab stabilization system, as well as a four point truck secondary suspension, an air spring may be installed in parallel with each actuator to assist with creating a static holding force for the cabin. This air spring can be collocated on the active suspension actuator itself. The active suspension actuator can provide short term force changes, while the air spring can provide longer term force changes. This greatly reduces the force outputs required by the actuators in the system and improves overall efficiency.

The actuators utilized in the active truck cab stabilization system may each be an independent, closed loop electrohydraulic system. The mechanical structure within each actuator may contain compression, rebound, or combined diverter valves which assist in the routing of flow within the closed loop actuator. The diverter valve could be disposed in the actuator body and operate as follows: in a free flow mode fluid freely flows into the pump. During a diverted bypass mode a fluid-velocity activated valve moves to open a second flow passage that bypasses the pump. In some embodiments during the diverted bypass mode, fluid still flows into the pump, although in some embodiments this flow is limited during the diverted bypass mode. Additionally, in some embodiments the fluid bypass goes through a tuned valve that creates a specific force velocity characteristic. The routing of flow caused by the diverter valves improves the operation range of a pump in the actuator by increasing durability during high velocity impacts and reducing acoustic noise which can negatively impact driver comfort.

The active truck cab stabilization system may be combined with a self-powered control system, wherein the active truck cab stabilization system can be a self-powered active suspension for a truck cabin. The system may utilize a regenerative electrohydraulic actuator, wherein the hydraulic pump can be backdriven, thus turning an operatively coupled motor/generator to generate electricity. By employing an electronic control unit for each actuator that has an energy storage element, the controller can regenerate energy during regenerate strokes, and consume active energy during active strokes from the energy storage facility. The amount of energy harvested may be enough to fully rectify the power consumption needs of the suspension system, thereby allowing the system to be self-powered. When the active truck cab stabilization system is installed on a vehicle and the system is using the self-powered feature, the system will not require any additional power inputs from the vehicle. This allows the system to operate independently of the vehicle electronics which greatly improves the ease of implementation of the system on any vehicle and eliminates the need to divert power from other systems on the truck. This may also facilitate an aftermarket system for cars and trucks for both the primary and secondary suspensions.

The active truck cab stabilization system may be combined with an energy neutral active suspension control system, wherein energy consumption in at least one controller of the active truck cab stabilization system is monitored and regulated so that the long term average power consumed is substantially energy neutral. In some embodiments this might include electrohydraulic or linear electromagnetic actuators that can regenerate energy. Control loop gain factors may be continuously modified, or power output thresholds regulated, in order to achieve a target energy consumption level in the system.

The active truck cab stabilization system may be combined with multiple passive valves which close at high flow velocities within the actuator. The closing of these valves prevents the electro-hydro-mechanical pump of the actuator from over-speeding during high acceleration events. This improves the life and durability of the actuators. The closing of the valve also provides additional damping to the actuator which improves driver comfort and ride quality.

The active truck cab stabilization system may comprise of active suspension actuators containing an electric motor, a hydraulic pump, and a hydraulic actuator body and piston that facilitates communication of a hydraulic actuator fluid through the body of the actuator with the hydraulic pump. The system may use data gathered from accelerometers located at each actuator to counteract road inputs using software algorithms to calculate the required force output to each actuator. In some embodiments the force output is commanded to the electric motor which is linked to the hydraulic pump. The pump moves the hydraulic fluid within the actuator to act upon the piston such that it counteracts the road input. In some embodiments the actuator body might be a monotube damper body, a twin tube damper body with two concentric tubes, or a triple tube damper body with three concentric tubes. In the triple tube damper, the annular areas between the outermost and middle tube, and then the middle tube and the inner tube, are used as fluid communication channels between the compression volume and the extension volume of the innermost cavity. An active truck cab valve may attach on the side or base of the damper body and connect with these inner tubes so that fluid flows from the tube passages to the valve mechanism.

The truck cab stabilization system may use a vehicle model for feed-forward active suspension control. The system may use data from the truck steering sensor, braking sensors, and throttle sensors in order to counteract disturbances before they create a cabin movement. The vehicle model greatly improves the ability of the system to rapidly and correctly respond to driver input induced oscillations and thereby improves driver comfort and ride quality.

The truck cab stabilization system may be integrated with other vehicle control/sensing systems (GPS, sensing, autonomous driving). The system may consist of multiple actuators with an accelerometer at each actuator. The data collected by the accelerometers may be stored and utilized by other vehicle control/sensing systems. For example, if the truck cab stabilization system is linked to the GPS of the vehicle, location data can be stored for road imperfections and the system can respond by creating an actuator force in a predictive manner. This data can later be accessed by the GPS to warn the driver of road hazards. In addition, the system may respond to various other sensors such as load sensors that detect trailer weight.

The truck cab stabilization system may use active suspension control algorithms to mitigate braking, pitch/roll, speed bump response, body heave, head toss, seat bounce, inclined operation, cross slope, and large event smoothing and to act as an active safety suspension system. The active suspension control algorithms take input from the body accelerometers on the vehicle and command the appropriate force outputs to the actuators. By mitigating these inputs, the active suspension control algorithms may improves the ability of the truck cab stabilization system to affect driver comfort and ride quality.

Active Vehicle Suspension with Air Spring

The methods and systems described herein incorporate the advantages that are offered by an active suspension actuator with that of an air spring system. It is desirable to provide an active suspension system that is compact in size so as to reduce the installation impact into the vehicle and to facilitate the integration of an air spring. Furthermore it is desirable to link the control systems and to share vehicle sensor inputs for the active suspension with that of the air spring system and to employ novel control strategies to improve the vehicle dynamic behavior and response. Additionally, other desirable features and characteristics of the present methods and systems will become apparent from the subsequent description taken in conjunction with the accompanying drawings and the foregoing technical field and background.

Aspects relate to an active air suspension system comprising an air spring and an active damper with an integrated smart valve wherein the active damper is an electro-hydraulic actuator wherein movement is in lockstep an electric motor. According to one aspect a vehicle suspension system comprises a controller adapted to control an electric motor that creates a force applied to a hydraulic actuator, wherein the actuator is capable of being controlled in at least three operational quadrants; an air spring operatively coupled in parallel to the hydraulic actuator; and a controller adapted to control at least one of air pressure and air volume of the air spring, wherein at least one of air pressure and air volume, and the actuator force are coordinated among the controllers. According to another aspect the system comprises at least one diverter valve capable of diverting hydraulic fluid away from a hydraulic pump operatively connected to the hydraulic actuator in response to the hydraulic fluid flowing at a rate that exceeds a fluid diversion threshold, wherein the diverter creates a damping force during the diverted flow mode, such that wheel motion is damped. According to another aspect a method for calculating wheel force in an active suspension on a vehicle comprises a pneumatic air spring disposed between the wheel and the vehicle chassis, an actuator generating force on the air spring, further comprising at least one pressure sensor operatively connected to the air spring; and at least one position sensor measuring at least one of vehicle ride height, air spring displacement, and suspension position. According to another aspect a vehicle suspension system comprises an active suspension actuator capable of being controlled in each of four operational quadrants, a controller integrated into a single housing with the active suspension actuator for controlling the actuator and an air spring capable of being controlled via an air compressor and at least one valve, wherein control of the air spring and control of the actuator are coordinated.

According to another aspect a vehicle suspension system comprises of an air spring that causes low frequency changes to a vehicle ride height in response to commands of a controller and an integrated four-quadrant capable active suspension system having a hydraulic actuator that causes high frequency changes to wheel force via applying at least one of torque commands and velocity commands applied to an electric motor that is coupled to a hydraulic pump that affects fluid flow that changes a position of a piston in a hydraulic actuator, wherein the hydraulic actuator is operatively in parallel to the air spring. According to another aspect a method of mitigating impact of wheel events on vehicle occupants, comprises identifying a first set of frequency components of a wheel/body event, identifying a second set of frequency components of the wheel/body event, controlling an air spring with a computerized controller to mitigate impact of the first set of frequency components and controlling an active electro-hydraulic actuator with a computerized controller to mitigate impact of the second set of frequency components, wherein the air spring and the actuator are operatively disposed substantially between a vehicle and a wheel of the vehicle such that they are operatively in parallel.

According to another aspect a vehicle suspension controller for a wheel of a vehicle comprises a first algorithm for determining electric motor commands of an electro-hydraulic suspension actuator a second algorithm for determining commands for the pneumatic valves and air compressor of a suspension air spring and a processor for executing the first algorithm and the second algorithm to control the electro-hydraulic suspension actuator and the air-spring to cooperatively control position and rate of movement of the wheel, wherein the electro-hydraulic suspension actuator and the air spring are operatively disposed in parallel between the wheel and the vehicle. According to another aspect a vehicle suspension system comprises a force controllable electro-hydraulic actuator comprising at least one diverter valve capable of at least partially diverting hydraulic fluid away from a hydraulic pump in response to the hydraulic fluid flowing at a rate that exceeds a fluid diversion threshold and at least one of an air pressure and an air volume controllable air spring operatively coupled in parallel with the actuator. According to another aspect a ride height adjustment system for a vehicle comprising a linear actuator operatively disposed between a wheel of the vehicle and the chassis of the vehicle, an air spring operatively disposed between a wheel of the vehicle and the chassis of the vehicle, such that it operates in parallel to the linear actuator, a controller adapted to control at least one of air pressure and air volume of the air spring and the force from the linear actuator such that the controller adjusts average ride height of the vehicle, and a command of the controller wherein during a fast ride height increase event, both the air spring air volume is increased and the actuator force is increased in the extension direction.

According to another aspect an active roll mitigation system for a vehicle having a first side and a second side, comprising at least one linear actuator operatively disposed between at least one first side of the vehicle wheel and the chassis of the vehicle at least one air spring operatively disposed between at least one first side of the vehicle wheel and the chassis of the vehicle, such that it operates in parallel to the linear actuator at least one linear actuator operatively disposed between at least one second side of the vehicle wheel and the chassis of the vehicle at least one air spring operatively disposed between at least one second side of the vehicle wheel and the chassis of the vehicle, such that it operates in parallel to the linear actuator at least one air compressor configured such that static air pressure may be uniquely selected for each of at least one first side air spring and at least one second side air spring at least one sensor to detect vehicle roll; and a controller adapted to control air pressure of the air spring and force from the linear actuator such that during detected vehicle roll, the controller increases air pressure in at least one air spring on the first side and creates an extension force on at least one actuator on the first side, and decreases air pressure in at least one air spring on the second side and creates a compression force on at least one actuator on the second side. In some embodiments of the system the hydraulic actuator response time is substantially faster than the air spring response time. In some embodiments of the system, the actuator and the air spring create force in the same direction during a first mode and opposite directions during a second mode, and the controller can command at least one of a first and second mode regardless of input to the wheel from the road. In some embodiments of the system the actuator is capable of both providing wheel damping and actively changing wheel position. In some embodiments of the system the air pressure in the air spring and force from the actuator is controlled independently in each wheel. In some embodiments of the system when a vehicle roll event is detected, at least one of air pressure and air volume in the air springs of the two outside wheels to the turn is controlled to be larger than the two inside wheels, and the actuator creates a downward force on the outside wheels, and an upward force on the inside wheels. In some embodiments of the system the air spring system and the hydraulic actuator system use at least one common sensor for feedback control. In some embodiments of the system the vehicle has at least two modes of operation, wherein stiffness of the air spring and average damping force of the hydraulic actuator change in unison. In some embodiments of the system a first mode is a sport mode with stiffer air spring and higher actuator damping, a second mode is comfort mode with softer air spring rate and lower actuator damping. In some embodiments of the system at least one of the hydraulic actuator and air spring are configured to recuperate energy, and a mode is economy mode wherein energy is captured. In some embodiments of the system the spring constant of the air spring changes with respect to at least one of air volume and pressure in the air spring. In some embodiments of the system at least one of the air spring pressure and air volume is controlled via an air compressor and at least one valve that are controlled by a controller. In some embodiments of the system the air spring and the hydraulic actuator are controlled by separate processor-based controllers that coordinate changes to ride height and wheel force to mitigate impact of at least one of wheel events and vehicle events on occupants of the vehicle. In some embodiments of the system the air spring and the actuator share a common controller for controlling ride height and wheel force. In some embodiments of the system at least one of vehicle ride height actions and wheel force actions taken by the air spring are coordinated with at least one of vehicle ride height actions and wheel force actions taken by the active suspension system. In some embodiments of the system the actuator and the air spring create force in the same direction during a first mode and opposite directions during a second mode. In some embodiments of the system the actuator force changes at a first frequency, and air spring force/height changes at a lower, second frequency. In some embodiments of the system torque changes in the electric motor create force changes in the hydraulic actuator. In some embodiments of the system the hydraulic actuator provides wheel damping via a back EMF from the electric motor, which is operatively coupled to a hydraulic pump/motor connected to the actuator. In some embodiments the system further comprises a compression bump stop internal to the air spring. In some embodiments the system further comprises a pressure sensor operatively connected to the air spring, wherein the pressure sensor is used by the active suspension system to calculate spring force. In some embodiments of the system the response of the active suspension actuator changes based on selected ride height of the air spring. In some embodiments of the system a controller for an active suspension system calculates wheel force based on the actuator force, the air spring force, and the inertial force from the unsprung mass. In some embodiments of the system the actuator is driven by an electric motor, and the actuator force is a function of measured current in the electric motor. In some embodiments of the system the air spring force is calculated by multiplying measured air pressure with the effective area of the air spring at the current displacement, which is calculated based on the position sensor data. In some embodiments of the system the inertial force of the unsprung mass is calculated by multiplying the mass of the unsprung mass by the acceleration of the unsprung mass. In some embodiments of the system the acceleration of the unsprung mass is measured with one of an accelerometer and at least one of a position sensor by double differentiating the position. In some embodiments of the system the wheel force is calculated for low frequencies, and used by the control algorithm for the active suspension actuator. In some embodiments of the system a first set of frequency components comprise frequencies that are lower than a second set of frequency components. In some embodiments of the system the first set of frequency components are selectable from a range of frequencies that are associated with low frequency vehicle motion and the second set of frequency components are selectable from a range of frequencies that are associated with high frequency wheel motion. In some embodiments of the system the electronic controller executes the first algorithm when presented with data indicative of at least one of a wheel event and a vehicle event that is suitable for being mitigated by the air spring. In some embodiments of the system the electronic controller executes the second algorithm when presented with data indicative of at least one of a wheel event and a vehicle event that is suitable for being mitigated by the electro-hydraulic suspension actuator. In some embodiments of the system the electronic controller adjusts displacement of the air spring when presented with data indicative of at least one of a wheel event and a vehicle event that is suitable for being mitigated by the air spring. In some embodiments of the system the electronic controller adjusts displacement of the electro-hydraulic suspension actuator when presented with data indicative of at least one of a wheel event and a vehicle event that is suitable for being mitigated by the electro-hydraulic suspension actuator. In some embodiments of the system operation of the hydraulic pump is controlled by an electric motor that is operatively coupled with the pump. In some embodiments of the system after a threshold of time the actuator force is decreased and at least one of the air spring pressure and the air spring volume remains constant. In some embodiments of the system the threshold is a function of the air spring system response time, such that the actuator provides the dominant vehicle lift force immediately after the fast ride height increase event, and the air spring provides the dominant vehicle lift force at time greater than the response time of the air spring, wherein the air spring system further comprises a range of air spring pressure having a minimum and a maximum pressure limit, such that when the limit is reached the controller does not exceed the maximum pressure limit. In embodiments the pressure is measured using at least one of a pressure sensor and a position height sensor. In some embodiments of the system the air spring system further comprises a range of air spring volume having a minimum and a maximum volume limit, such that when the limit is reached the controller does not exceed the maximum volume limit, wherein the volume is measured using at least one of a volume sensor and a position height sensor. In some embodiments of the system the linear actuator further comprises a minimum and a maximum force limit, such that when the limit is reached the controller does not exceed the operational force range. In some embodiments of the system during a detected roll event at least one of the linear actuator and air spring are further controlled by a body/wheel control protocol. In some embodiments of the system further comprise at least one electronically controlled valve that can set different air pressures in the first side and second side air springs. In some embodiments of the system air spring pressure and actuator force are controlled independently in all four corners of a two-axle, four-wheeled vehicle. In some embodiments of the system the first side constitutes a left side of the vehicle, and a second side constitutes a right side of the vehicle. In some embodiments the system is adapted to create pitch control, wherein the first side constitutes a front axle of the vehicle, and the second side constitutes a rear axle of the vehicle.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

Low Inertia Material for Reduced Dependence.

Active suspension coupled with an airspring for a vehicle that in one embodiment may incorporate a low inertia material for reduced dependence. In certain vehicular applications it may be desirable to use an airspring as opposed to a mechanical spring to improve ride quality and/or add the function of ride height adjustability. To reduce the secondary ride harshness of the system, it is important to reduce the inertia of any of the rotating components of the active suspension components that are accelerated in response to damper acceleration. In this regard it is necessary to utilize low density materials for any of the rotating components of the pump/motor assembly, such as using engineered plastic for the pump components. Also it is necessary to reduce the mass of any of the rotating components by close coupling the pump to the motor thereby reducing the size and mass of the coupling.

A Multi-Aperture Diverter Valve with a Smooth Opening/Transition

An active suspension coupled with an airspring for a vehicle in one embodiment may include a multi-aperture diverter valve with a smooth opening/transition. Certain applications active suspension integrated with an airspring may require high damper velocities when a high speed wheel event is witnessed. This may result in high hydraulic flow velocities that may produce unacceptably high hydraulic pump speeds. In such applications it may be desirable to limit the speed of the hydraulic pump to acceptable limits when high flow rates exist. The use of a multi-aperture diverter valve will allow at least partial fluid flow to bypass the hydraulic pump when a certain flow velocity is achieved. The diverter valve can be adapted to operate and divert fluid in a smooth manner so as not to impart any unwanted harshness on the vehicle when the valve activates. It may therefore be desirable to incorporate the benefits of an airspring suspension with those of an active suspension that includes a diverter valve to allow for high speed operation.

Self-Powered Adaptive Suspension

An active suspension coupled with an airspring that in one embodiment is utilized on a self-powered adaptive suspension where the damping and/or active function is at least partially powered by regenerated energy. In one embodiment, an active suspension coupled with an airspring may contain a hydraulic pump that can be backdriven as a hydraulic motor. This can be coupled to an electric motor that may be backdriven as an electric generator. The active suspension controller may provide for regenerative capability, wherein regenerated energy from the hydraulic machine (pump) is transferred to the electric machine (motor), and delivered to a power bus containing energy storage. By controlling the amount of energy recovered, the effective impedance on the electric motor may be controlled. This can set a given damping force. In this way, damping force can be controlled without consuming energy. One advantage of incorporating An active suspension coupled with an airspring with a self-powered adaptive suspension is the energy stored may also be used to control the air pressure/volume that is contained in the air spring to offer self-powered air spring control.

Energy Neutral Suspension Control System

An active suspension coupled with an airspring that in one embodiment is utilized on an energy neutral suspension control system wherein the hydraulic actuator control system harvests energy during a regenerative cycle by withdrawing energy from the hydraulic actuator and storing it for later use by the hydraulic actuator. In one embodiment for example, a controller can output energy into the motor only when it is needed due to wheel or body movement (on-demand energy delivery), and recover energy during damping, thus achieving roughly energy neutral operation. Here, power consumption for the entire active suspension may be energy neutral (e.g. under 100 watts). This may be particularly advantageous in order to make an active suspension that is highly energy efficient.

Predictive Analytic Algorithm and System for Inertia Compensation

The present invention describes a method to compensate for the effects of rotary inertia in an actuator. The method uses advance information from sensors upstream with respect to a disturbance affecting the actuator to predict the effects of inertia, and to compensate for the disturbance, thus creating the effect of a more ideal actuator.

The advance information allows for a fast reaction to these events. The advance information can come from a multitude of types sensors, that may facilitate sensing information upstream in a disturbance path and thus may sense information about an upcoming disturbance input before that input is felt at the ends of the actuator.

The advance information is sent to a model, which calculates inertia compensation force commands. These are then added to other force commands, for example those coming from other parts of the control system such as the active control loop designed to isolate the target system from disturbance inputs. In some embodiments, these external force commands can be null, in which case the desired force output is zero and the inertial forces act as a disturbance on the actuator output that can be cancelled. In other embodiments, the external forces might be designed to make the target system follow a trajectory.

A goal of the methods and systems described herein is to allow the actuator to move as freely as possible when the target force command is zero, and as close to ideal as possible when the target force command is non-zero.

The method and systems may include back-drivable actuators, which may be defined in some embodiments as any actuator where motion at the ends of the actuator creates motion at the actuator itself, and vice-versa motion of the actuator itself creates motion at the ends of the actuator. This is particularly not obvious when the actuator acts through a lever mechanism; for example, ballscrew actuators are back-drivable only if the angle of the screw is inside a range determined by the material of the screw and the friction in the ballcage, which normally is around 10-80 degrees.

A backdrivable hydraulic actuator may include a property whereby actuation of the actuating element, for example an electric motor, directly creates a pressure differential in the actuator, and whereby a pressure differential at the actuator creates motion of the actuating element, for example through a backdrivable hydraulic pump unit.

An example of a back-drivable actuator could be an hydraulic actuator where the piston is coupled to a bidirectional pump operating in lockstep with the piston, and the pump is operatively coupled with an electric motor used for actuation.

The moment of inertia of the rotating elements of the actuating element is of concern in this type of application, when the actuator is back-driven by external input and the desire is for the actuator to be easily back-drivable. One such moment of inertia that is relevant in this case is the moment of inertia of all rotating components in the electric motor and the pump, as well as any elements coupling the two and any other elements rotating substantially in lockstep with the piston motion. The effect of this inertia is felt through the reaction force caused by the moment of inertia multiplied by the angular acceleration of each rotating part, scaled by the square of the motion ratio of angular motion to linear motion of the piston for each element. The property thus calculated, which relates relative acceleration to force and has units of [kg], is called inertance.

In a typical embodiment, the electric motor constituting the actuating element is coupled to the lever mechanism, which could be a pump or a screw mechanism, but also a linear lever, through a shaft, and both are held in place by a multitude of bearing elements. The rotating parts of each of these elements contribute to the system inertance as scaled by their respective motion ratios. For example, bearing elements typically circulate at a fraction of the rotational speed of the inner or outer race moving with the element constrained by the bearing.

In other embodiments, the inertance can be due to the rotational inertia of a pinion element rotating on a geared rack, or of a rotating hydraulic pump element and motor in an electro-hydraulic active suspension actuator.

Compensating for inertia is a problem that is challenging from a controls point of view. In general, relative acceleration could be measured or calculated with an estimation method to derive it from other measured quantities. Then we could estimate The resulting inertial force could be estimated from the relative acceleration, thereby allowing compensation for it as it is happening. The main problem with this approach, as shown in FIG. 73, is that any real control system has delays associated with the sensing, processing, and sending of information inside the control system, and with delays in the physical actuation system itself. Even a small delay in a simple system like the one shown in FIG. 69, and for which FIG. 73 calculates example control schemes, can immediately make it very hard to obtain performance at the higher end of the frequency spectrum characterizing the actuator, where it is typically most critical.

It is therefore advantageous for this scheme to use preview information to identify and quantify a disturbance before it reaches the actuator. This preview information may come from a sensor with upstream information with respect to the disturbance. In one embodiment such a sensor could be a wheel accelerometer or a tire pressure sensor in a vehicle's active suspension system where the actuator is a back-drivable actuator disposed between the wheel and vehicle body. In this system, the inputs are mostly coming from the road and the wheel will first sense changes in road elevation.

In another embodiment, the sensor might be a sensor with more advance information, such as a laser measuring the road in front of the tire.

In yet another embodiment, the information could come from a look-ahead sensor like a radar, sonar, lidar or camera-based sensor, or the system could use information from other vehicles having driven the same road at a past time with respect to the target vehicle, or from other information sources such as GPS-based road mapping and texture mapping.

The next step is to feed the information from the sensor to a model of the actuator that includes linear effects of the inertia, nonlinear effects of inertia, effects of the dynamics of the system surrounding the actuator, delays in the signal propagation and control response, and other useful information.

In one embodiment, the actuator is an electro-hydraulic actuation unit with a rotary pump and electric motor disposed such as to be backdrivable from suspension motion, and disposed between the wheel and the vehicle body. In this system, the nonlinear effects of the hydraulics should include pump friction and leakage, fluid flow effects in the hydraulic piston and communicating fluid paths, and any passive valving elements that are disposed in series or in parallel with the pump unit.

The remaining dynamics of the system for this embodiment should include wheel dynamics in the case of a vehicle suspension, sprung or target mass and stiffness, any bushing elements between the disturbance source and the actuator, as well as the actuator and the target system, and any nonlinear effects of the suspension kinematics present in any system where the actuator only constrains one degree of freedom of motion between the disturbance input and the target system.

In other embodiments, the dynamics of the system surrounding the actuator, and the nonlinear effects within the actuator can be carefully modeled according to their importance in the resulting force. For example, backlash and friction in a transmission mechanism such as a ballscrew can be important elements for modeling.

The model is then used to provide an expected motion of the system, and to calculate the required compensation command to mitigate the effects of the system inertia. This force is then applied with a proper time lag to compensate for the advance knowledge of the event derived from the upstream sensor.

The compensation command is then added to any external actuator commands to create a single command tasked with both performing the desired actuator response and at the same time mitigating the unwanted effects of inertia resulting from external disturbance inputs.

In some embodiments, the hydraulic actuator will have significant compliance. This compliance can for example be due to the fact that the fluid column between the pressure source (the pump) and the force output (the piston) contains a large enough volume of fluid that it exhibits significant compressibility compared to other compliances in the mechanical assembly.

The compliance in the hydraulic actuator can also come from flexibility in the mechanical components transporting the pressure fluid, for example flexible hose components.

The compliance in the hydraulic actuator can also be due to the mechanical compliance of the mounting points of the actuator. For example, in a vehicle suspension the active suspension actuator will typically be mounted through a rubber isolator at each end, the top one of which is typically very soft for impact isolation reasons.

The hydraulic pump will typically exhibit leakage, where fluid can move around the pump without rotating the pump, and vice-versa, where the pump can rotate without creating motion of the piston. This leakage may be an important component in any model describing the hydraulic actuator.

In many embodiments, the hydraulic actuator will contain valves to protect the actuator from excessive pressure (pressure blow-off valves), or active or passive valves that divert at least part of the fluid flow created by piston motion, in a parallel fluid path with the pump unit.

These passive valves can serve multiple purposes, but they will in general affect the behavior of the system in a non-linear way that can be accurately modeled in order to facilitate cancelling inertial forces. Non-linear behavior of passive valves can include the dependency of pressure to flow rate typical in turbulent or laminar flow, or the behavior of the valves that restrict flow differently at different operating points of the valve.

A model of the system can be built to accurately reflect any of the system's parameters and behaviors, and can furthermore be built to adapt, through the use for example of Kalman filters or similar adaptation schemes well known in the literature, to changes in the environment, system behavior, or other parameters. Kalman filters in general operate by using the difference between model outputs and measured outputs to correct system parameters in order to better predict future states of the system.

In some embodiments the inertance of the actuator can be calculated based on the rotating inertia of all the components, scaled by the square of the motion ration between linear and rotary motion in the device. The inertia model of the system may comprise of a calculation related to this, or it may incorporate other features such as hydraulic leakage. Hydraulic leakage effectively reduces the inertance of the system as a function of leakage, which is a function of fluid pressure, velocity, viscosity, etc. In some embodiments the inertia model may dynamically adapt based on at least one parameter. For example, it may adapt based on temperature in the fluid or based on the lifetime durability or age of the active suspension component.

Provided herein are methods and systems for inertia compensation in a back-drivable hydraulic actuator under electronic control. The methods and systems may include a back-drivable hydraulic actuator in fluid coupling with a hydraulic pump, which is operatively coupled to an electric motor, at least one of the hydraulic pump and electric motor comprising a rotatable element that has a moment of inertia; at least one sensor, wherein the sensor is disposed to sense a disturbance before said disturbance causes angular acceleration of the rotatable element; and a controller for determining an inertial compensation force based on the physical parameters of the hydraulic actuator and information from the sensor, and modifying a force command on the actuator to apply the inertial compensation force. The inertial compensation force may be determined based on a computer model of the physical and operational characteristics of the actuator, the vehicle in which it is disposed, and the environment in which the vehicle is operated.

The term "sensor" should be understood, except where context indicates otherwise, to encompass analog and digital sensors, as well as other data collection devices and systems, such as forward-looking cameras, navigation and GPS systems that provide advance information about road conditions, and the like.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

Integrated Active Suspension System for Self-Driving Vehicle

Self-driving vehicles have a significant need for improved ride comfort, and have a number of sensors not typically available on conventional vehicles. The inventors have appreciated that active suspension technologies may be improved by integrating actuator control with vehicle sensors and networks. Further, self-driving vehicles may be improved by being responsive to road-related comfort characteristics.

Aspects relate broadly to control methodologies of active suspension systems and self-driving vehicles. More specifically, aspects relate to building topographical maps, route planning based on road roughness, regulating energy storage based on planned routes, and mitigating forward and lateral acceleration feel through adaptive pitch and tilt correction.

According to one aspect, an active suspension system comprises a number of active suspension actuators, typically one per wheel for the vehicle. Each active suspension actuator may operate in at least three force/velocity operational quadrants such that it may both resist an external motion input and actively push/pull. At least one forward-looking sensor is disposed on the vehicle such that it is capable of detecting a road condition the vehicle may encounter in the future. The vehicle comprises a location sensor such as a GPS receiver. The vehicle may further comprise at least one relative sensor that is capable of detecting relative movement between the vehicle and the ground, or the vehicle and a future road condition. Relative sensors may include sensors such as an IMU, accelerometer, speed sensor, etc. A sensor fusion system such as a Kalman Filter may combine the location data and relative data to obtain an accurate estimate of absolute position. For example, a sensor fusion system may bias the location sensor over the long term, but bias the relative sensor over the short term. Similarly, the sensor fusion system may eliminate extraneous points (for example, ignore a GPS coordinate reading if it has moved significantly farther than the vehicle could have moved given the current speed sensor reading). A memory system may comprise a topographical map. Any suitable memory system will suffice, but in some embodiments it may comprise of a processor-based vehicular electronic control unit (ECU) containing rewriteable memory. The topographical map may comprise three-dimensional terrain information. This may be implemented relative to the vehicle such that the map comprises relative X,Y coordinates from the center of the vehicle and a Z terrain/feature height for the road at each point. In such an embodiment, the topographical map indices may change at each iteration of the control loop. The system may also be implemented as an absolute map, wherein the X,Y coordinates relate to absolute positions such as GPS coordinates, and similarly the Z value indicates a terrain/feature height. An active suspension controller, which may be centralized, distributed among several processor or FPGA-based controllers with one at each actuator, co-located with another vehicle ECU, or any other suitable controller topology, may receive information from the sensor fusion system and the memory system containing the topological map. According to one aspect, the active suspension controller both controls the active suspension actuators in response to the topographical map and updates the topographical map based on a parameter sensed by either the active suspension actuators or the forward-looking sensor. Controlling the active suspension actuators may comprise changing a force, position, or other parameter of the actuators in order to mitigate a detected event in the topographical map. Updating the topographical map may comprise recording sensed future events from the forward-looking sensor, recording data from wheel impacts of the front or rear active suspension actuator sensors, or any other suitable data source wherein road data may be extracted and related to a position.

According to another aspect, a self-driving or navigation-guided vehicle performs route planning at least partially based on road roughness. A controller on the vehicle receives a driving plan that comprises an anticipated route for the vehicle, such as a GPS-guided route laid onto data from a roadway map database. Along a route of travel, road condition data is collected at a variety of points along the route. The controller determines a road roughness impact on the vehicle for at least a portion of the gathered points of road condition data. This may be a calculation based on the road condition data, or it may comprise the road condition data itself, depending on what data is stored. The self-driving or navigation-guided vehicle then adjusts the driving plan to reduce road roughness impact on the vehicle. For example, it may avoid a road that is particularly rough.

According to another aspect, an intelligent energy storage system regulates state of charge in a predictive fashion. According to this aspect, a plurality of electrical loads are connected to an electrical bus. Such electrical loads may include active suspension actuators, electric propulsion motors, electric power steering, an electric air compressor, electronically actuated stability control, and the like. The electrical bus may comprise an energy storage apparatus such as a rechargeable battery bank, super capacitors, and/or other suitable means of storing electrical energy. The energy storage apparatus may be characterized by a state of charge, which is a measure of the energy contained in the apparatus. The energy storage apparatus may be disposed to provide energy to at least a portion of the connected electrical loads on the bus. A power converter may be configured to provide power to the energy storage, thus changing its state of charge. Additionally, the loads may be electronically connected such that they also regulate the state of charge. An electronic controller for a self-driving vehicle calculates a driving plan, which is an anticipated route for the vehicle. A computer-based model or algorithm may predict or calculate energy usage by at least a portion of the plurality of loads at a variety of points along the route. According to one aspect, energy usage may be positive or negative (consumption or regeneration). While driving, the algorithm or model may then dynamically and predictively set a state of charge of the energy storage apparatus as a function of calculated energy usage for points along the route. In one example, if the algorithm calculates that a large amount of energy will be needed ahead, the power converter may put additional energy into the energy storage apparatus in order to accommodate the future consumption load.

According to another aspect, an active suspension system for a self-driving vehicle mitigates fore/aft and lateral acceleration feel through adaptive pitch and tilt corrections. The active suspension system comprises a plurality of active suspension actuators, with an actuator disposed at each wheel of the vehicle. Each actuator is capable of creating an active force between the vehicle chassis and the wheel. A self-driving controller, which may be a single controller or several controllers distributed in the vehicle, commands steering, acceleration, and deceleration of the vehicle during driving. An active suspension controller is in communication with the self-driving controller such that the active suspension controller receives feed-forward command and control information. This feed-forward information may include steering, acceleration, and deceleration signals from the self-driving controller. According to one aspect, this sensor data may be feedback data, such as measured fore/aft and lateral acceleration. An algorithm mitigates passenger disturbance caused by such fore/aft and lateral acceleration by creating a compensation attitude, or a pitch/tilt condition of the vehicle. The compensation attitude may be set using the active suspension actuators in response to the feed-forward steering, acceleration, and deceleration signals. According to one aspect, the compensation attitude is set using feedback data such as measured fore/aft and lateral acceleration. The algorithm commands a pitch-up attitude during deceleration (such as braking), a pitch-down attitude during acceleration, and a roll-in attitude during steering. According to one aspect, a pitch-up attitude comprises lifting the front of the vehicle such that its ride height is higher than the rear, a pitch-down attitude comprises lowering the front of the vehicle such that its ride height is lower than the rear, and a roll-in attitude comprises lowering the side of the vehicle on the inside radius of the turn such that its ride height is lower than the outside radius side of the vehicle. According to one aspect, in a force-limited saturation regime of the actuator, ride height command authority may be limited in comparison to large acceleration events causing large roll or pitch moments, and the control system may not fully achieve such compensation attitude behavior.

It should be appreciated that the foregoing concepts, and additional concepts discussed below, may be arranged in any suitable combination, as the present disclosure is not limited in this respect. In particular, while several embodiments are disclosed for self-driving vehicles, certain concepts may be used with human-operated vehicles as well. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

Predictive Energy Storage Algorithms

A self-driving vehicle with an active suspension may be associated with predictive energy storage algorithms, wherein the state of charge of an energy storage system is regulated in response to anticipated future energy need. This energy storage system may be used to power the active suspension system. In one embodiment, a vehicle utilizes at least one of the following sensors to command the energy storage system for an active suspension to either charge or discharge: look-ahead vision sensor, LIDAR look-ahead sensor, radar, topographical map (stored or cloud-based), vehicle-to-vehicle data on road surface or other driving conditions, and GPS information. In one embodiment, GPS can be used in conjunction with the autonomous driving subsystem such that the energy storage can be charged higher if the driving subsystem knows that a high energy need event such as an extended turn is coming up.

While the above embodiments describe a self-driving vehicle with an active suspension and predictive energy storage algorithm, the invention is not limited in this regard and the system may be implemented on human-driven vehicles that have similar sensors and telematics on board.

By combining a self-driving vehicle with an active suspension and predictive energy storage algorithms, energy storage capacity can be intelligently and efficiently utilized, with the state of charge being regulated in response to a number of sensors that may at least partially predict in a statistically probable fashion the need for energy consumption in an active suspension.

Vehicular High Power Electrical System

A self-driving vehicle with an active suspension may be associated with a vehicular high power electrical system comprising an energy storage medium and a loosely regulated DC bus (wherein voltage is allowed to fluctuate depending on energy storage state. Further, one or more high-energy consumers such as an active suspension may be connected to this vehicular high power electrical system. In one embodiment, a nominally 48 volt DC bus is connected to the main vehicle electrical system running at 12 volts. A unidirectional or bidirectional DC/DC converter connects the two buses. Algorithms in the DC/DC converter dynamically limit energy/power transfer in one or more directions (e.g. it executes a maximum average current over a time window). In some embodiments multiple vehicle systems may be connected to this bus, such as electric power steering and electric air conditioning compressors. In some embodiments an energy storage mechanism is one of a battery (e.g. lithium iron phosphate cell pack), a super capacitor, or a flywheel driven by an electric motor, however, any mechanism capable of storing electrical energy for later use may be suitable.

By combining a self-driving car with an active suspension and a vehicular high power electrical system, the self-driving car can provide sufficient power and loads to high power accessories such as the active suspension without compromising loads on the primary electrical system.

Integrated Activalve

A self-driving vehicle with an active suspension may be associated with a highly integrated power pack that drives the active suspension actuators. This may be a single body active suspension actuator comprising an electric motor, an electronic (torque or speed) motor controller, and a sensor in a housing. In another embodiment, it may be accomplished with a single body actuator comprising an electric motor, a hydraulic pump, and an electronic motor controller in a housing. In another embodiment, it may be accomplished by a single body valve comprising an electric motor, a hydraulic pump, and an electronic motor controller in a fluid filled housing. In another embodiment, it may be accomplished with a single body valve comprising a hydraulic pump, an electric motor that controls operation of the hydraulic pump, an electronic motor controller, and one or more sensors, in a housing. In another embodiment, it may be accomplished with an actuator comprising an electric motor, a hydraulic pump, and a piston, wherein the actuator facilities communication of fluid through a body of the actuator and into the hydraulic pump. In another embodiment, it may be accomplished with a vehicle active suspension system comprising a hydraulic motor disposed proximal to each wheel of the vehicle that produces wheel-specific variable flow/variable pressure, and a controllable electric motor disposed proximal to each hydraulic motor for controlling wheel movement via the hydraulic motor. In another embodiment, this may be accomplished with a vehicle wheel-well compatible active suspension actuator comprising a piston rod disposed in an actuator body, a hydraulic motor, an electric motor, an electronic motor controller, and a passive valve disposed in the actuator body or power pack and that operates either in parallel or series with the hydraulic motor, all packaged to fit within or near the vehicle wheel well of the self-driving vehicle.

The ability to package an active suspension on a self-driving car into a highly integrated package may be desirable to reduce integration complexity (e.g. eliminates the need to run long hydraulic hoses), improve durability by fully sealing the system, reduce manufacturing cost, improve response time, and reduce loses (electrical, hydraulic, etc.) from shorter distances between components.

Integration with Other Vehicle Control and Sensing Systems

A self-driving vehicle with an active suspension may receive data from other vehicle control and sensing systems [such as GPS, self-driving parameters, vehicle mode setting (i.e. comfort/sport/eco), driver behavior (e.g. how aggressive is the throttle and steering input), body sensors (accelerometers, IMUs, gyroscopes from other devices on the vehicle), safety system status (ABS braking engaged, ESP status, torque vectoring, airbag deployment, etc.)], and then react based on this data. Reacting may mean changing the force, position, velocity, or power consumption of the actuator in response to the data.

For example, the active suspension may interface with GPS on board the vehicle. In one embodiment the vehicle contains (either locally or via a network connection) a map correlating GPS location with road conditions. In this embodiment, the active suspension may react in an anticipatory fashion to adjust the suspension in response to the location. For example, if the location of a speed bump is known, the actuators can start to lift the wheels immediately before impact. Similarly, topographical features such as hills can be better recognized and the system can respond accordingly. Since civilian GPS is limited in its resolution and accuracy, GPS data can be combined with other vehicle sensors such as an IMU (or accelerometers) using a filter such as a Kalman Filter in order to provide a more accurate position estimate.

In another example, the active suspension may not only receive data from other sensors, but may also command other vehicle subsystems. In a self-driving vehicle, the suspension may sense or anticipate rough terrain, and send a command to the self-driving control system to deviate to another road.

In another embodiment the vehicle may automatically generate the map described above by sensing road conditions using sensors associated with the active suspension and other vehicle devices.

By integrating an active suspension with other sensors and systems on the vehicle, the ride dynamics may be improved by utilizing predictive and reactive sensor data from a number of sources (including redundant sources, which may be combined and used to provide greater accuracy to the overall system). In addition, the active suspension may send commands to other systems such as safety systems in order to improve their performance. Several data networks exist to communicate this data between subsystems such as CAN (controller area network) and FlexRay.

Active Safety Suspension Control

A self-driving vehicle with an active suspension may be associated with an active safety suspension system, wherein the suspension reacts to improve the safety of the vehicle during unusual vehicle circumstances. In this way, the active safety system may benefit from data and advance knowledge of the navigation/driving algorithms, sensor data from a variety of sensors such as vision, LIDAR, etc. Similarly, the self-driving control system can benefit from sensing and control data in order to change the driving behavior in response to a detected unusual vehicle circumstance. Unusual vehicle circumstances may include collision events, anticipated or potential collisions (e.g. fast closing speed and short distance between the vehicle and an object in front), loss of traction during braking (e.g. ABS engaged), vehicle slippage (e.g. electronic stability control engaged), etc.

In one embodiment, the self-driving vehicle's sensors may detect an obstacle and a vehicle velocity that create a collision course. The self-driving vehicle may relay this information to the active safety system, which can then adjust suspension dynamics (e.g. four quadrant active control) to reduce stopping distance and/or reduce the effect of the impact on the driver and passengers by adjusting pre-crash ride height and vehicle stance. In another embodiment, the active safety system may detect an unusual vehicle circumstance and command the vehicle to change its steering angle, throttle position, etc. in order to mitigate the unusual vehicle circumstance. In another embodiment, the active safety suspension system may utilize information from a vehicle to vehicle communication interface, which may transmit data such as the state or future state of other vehicles in the vicinity, road and other conditions ahead, etc.

By combining a self-driving vehicle with an active safety suspension system, the overall vehicle safety can be improved. In one direction this is a result of the active safety suspension utilizing information from self-driving sensors and thereby calculating a better estimate of vehicle state. In the other direction, this is a result of the active safety suspension requesting the self-driving vehicle to change course.

Distributed Active Suspension Control System

Unlike most vehicular systems, active suspension power handling is characterized by a unique need to produce and absorb large energy spikes while delivering desired performance at acceptable cost. Furthermore, unlike most vehicular systems, suspension is not a stand-alone and independent function, it is rather a vehicle-wide function with each wheel actuated independently while having some interplay with the actual and anticipated motions of other wheels and the vehicle's body. The methods and systems disclosed herein are based on an appreciation of the needs dictated by improved vehicle dynamics, safety consideration, vehicle integration complexities and cost of implementation and ownership, as well as the limitations of existing active suspension actuators. To achieve maximum performance from a fully-active suspension actuator, a control system architecture that involves a low-latency communication network between units distributed across the vehicle body is described.

One objective of the present methods and systems of distributed active suspension control described herein is to improve performance of active suspension systems based on hydraulics, electromagnetics, electro-hydraulics, or other suitable systems by reducing latency and improving response time, reducing central processing requirements, and improving fault-tolerance and reliability.

Aspects relate to distributed, fault-tolerant controllers and distributed processing algorithms for active suspension control technologies.

According to one aspect, a distributed suspension control system comprises a number of active suspension actuators (which, in some embodiments, may be valveless, hydraulic, linear motor, ball screw, valved hydraulic, or other actuators) that are disposed throughout a vehicle such that each active suspension actuator is associated with a single wheel. The actuator operates by converting applied energy into motion of a wheel. In one embodiment, the actuator may comprise a multi-phase electric motor for controlling suspension activity of a wheel, and the actuator may be disposed within a wheel-well of a vehicle between the vehicle's chassis and the vehicle's wheel. The vehicle's chassis may be a chassis of any wheeled vehicle, but in at least some embodiments, the vehicle chassis is a car body, a truck chassis, or a truck cabin. Further, each actuator comprises an active suspension actuator controller operably coupled to a corresponding actuator (which, in some embodiments, may be to control torque, displacement, or force). Each controller has processing capability that executes wheel-specific and vehicle-specific algorithms, and in one embodiment, each controller may run substantially similar control algorithms such that any two distributed actuator-controller pairs may be expected to produce similar actuator outputs given the same controller inputs. Further, the active suspension control system comprising a number of actuator-controller pairs disposed throughout the vehicle also forms a network for facilitating communication, control, and sensing information among all of the controllers. The system also comprises at least one sensor which, in some embodiments, may be an accelerometer, a displacement sensor, a force sensor, a gyroscope, a temperature sensor, a pressure sensor, etc. disposed with each controller to provide vehicle chassis motion and/or vehicle wheel motion related information to the controller. The controller acts to process the sensor information and to execute a wheel-specific suspension protocol to control a corresponding wheel's vertical motions. In one embodiment, the wheel-specific suspension protocol may comprise suspension actions that facilitate keeping the vehicle chassis substantially level during at least one control mode, while maintaining wheel contact with the road surface. In another embodiment, the wheel-specific suspension protocol may comprise suspension actions that dampen wheel movement while mitigating an impact of road surface on wheel movement and consequently on the vehicle vertical motions. In one embodiment, the wheel-specific suspension protocol may measure the actuator inertia used in a feedback loop to control the single wheel motion. In one embodiment, the wheel-specific suspension protocol may comprise two algorithms, one for wheel control and the other for vehicle chassis/body control. Further the controller processes information received over the communication network from any other controller to execute a vehicle-wide suspension protocol to cooperatively control vehicle motion. In one embodiment, the vehicle-wide suspension protocol may be effected by each controller controlling the single wheel with which it is associated. Also, in one embodiment, the vehicle-wide suspension protocol may facilitate control of vehicle roll, pitch, and vertical acceleration.

According to another aspect, a distributed active valve system comprises a number of active suspension actuators (which, in some embodiments, may be valveless, hydraulic, linear motor, ball screw, valved hydraulic, or other actuators) that are disposed throughout a vehicle such that each active suspension actuator is associated with a single wheel. Each actuator comprises an electric motor operatively coupled to a hydraulic pump that communicates with hydraulic fluid that moves a piston of the actuator. Each actuator behaves by converting applied energy into a vertical motion of a single wheel in an overall suspension architecture. Further, each actuator comprises a separate active suspension actuator controller operably coupled to control torque/velocity to the electric motor thereby causing rotation capable of both resisting and assisting the hydraulic pump. The distributed active valve system comprising a number of actuator-controller pairs disposed throughout the vehicle also comprises a communication network for facilitating communication of vehicle control and sensing information among all of the controllers. The system also comprises at least one sensor (which, in some embodiments, may be an accelerometer, displacement sensor, force sensor, gyroscope, etc.) disposed with each controller to provide vehicle chassis motion and/or vehicle wheel motion related information to the controller with which the sensor is disposed. Each controller executes wheel-specific suspension protocols and vehicle-wide suspension protocols to cooperatively control vehicle motion. In one embodiment, wheel-specific suspension protocols may perform groundhook control of the wheel to improve damping of an unsprung wheel mass (that is, control that is adapted to maintain contact of the wheel with the ground under conditions that might otherwise results in the wheel losing contact). In one embodiment, wheel-specific suspension protocols may control the actuator at wheel frequencies. In one embodiment, vehicle-wide suspension protocols may perform skyhook control (that is, control adapted to maintain a relatively steady position of the vehicle cabin notwithstanding up and down motion of the wheels), active roll control, and/or pitch control. Further, in one embodiment vehicle-wide suspension protocols may control the actuator at body frequencies.

According to another aspect, a distributed active valve system comprises a number of active suspension actuators (which, in some embodiments, may be valveless, hydraulic, linear motor, ball screw, valved hydraulic, or other actuators) that are disposed throughout a vehicle such that each active suspension actuator is associated with a single wheel. Each actuator comprises a separate active suspension actuator controller, and in one embodiment, the controller may comprise a motor controller which applies torque to the active suspension system actuator. Further the distributed active valve system comprises a communication network for facilitating communication of vehicle control and sensing information among the actuator controllers. In some embodiments, the communication network may be a CAN bus, FlexRay, Ethernet, RS-485, or data-over-power-lines communication bus. The system also comprises at least one sensor (which, in some embodiments, may be an accelerometer, displacement sensor, force sensor, gyroscope, etc.) disposed with each controller to provide vehicle chassis motion and/or vehicle wheel motion related information to the controller with which the sensor is disposed. Further the active valve system comprises a localized energy storage facility for each active suspension system actuator. In one embodiment, the localized energy storage facility may be one or more capacitors operatively coupled to the controller to store electrical energy. In another embodiment, the active suspension system actuators may be capable of both consuming energy and supplying energy to the energy storage facility independently of the other actuators. The energy may be supplied by transferring energy harvested from an electric motor operating in a regenerative mode. In addition to the localized energy storage, in one embodiment, the system may comprise a centralized energy storage facility. Energy may be able to flow out from the centralized energy storage to the actuators over a power bus and energy may be able to flow into the energy storage from a vehicular high power electrical system, the vehicle primary electrical system, a DC-DC converter, or a regenerative active suspension actuator. In one embodiment of the system, each controller may be capable of independently detecting and responding to loss of power conditions, which may include providing power to the controller by harvesting power from wheel motion, supplying the harvested power to the controller, and/or applying a preset impedance on the terminals of a motor that controls the active suspension actuator. In one embodiment of the system, there may be a central vehicle dynamics controller that issues commands to the active suspension actuator controllers. In one embodiment, the actuator controllers may communicate sensor data to the central vehicle dynamics controller via the communication network, and in one embodiment, external sensors may be connected to the central vehicle dynamics controller to sense wheel movement, body movement, and vehicle state.

According to another aspect, a method of distributed vehicle suspension control comprises controlling a number of vehicle wheels with a number of wheel-specific active suspension actuators disposed in proximity to the wheel and responsible for the wheel's vertical motion. In one embodiment, the actuators may comprise multi-phase electric motors for controlling suspension activity of the single wheel and the actuator may be disposed within a wheel well of a vehicle between the vehicle body and the vehicle wheel. The method further comprises communicating actuator-specific suspension control information over a network that electrically connects the wheel-specific active suspension actuators. In one embodiment, the communication network may be a private network that contains a gateway to the vehicle's communication network and electronic control units. At each wheel-specific actuator the method further comprises localized sensing of motion (which, in some embodiments, is one of wheel displacement, velocity, and acceleration with respect to the vehicle chassis), and processing of the sensing to execute a wheel-specific suspension protocol to control the single vehicle wheel. Wheel velocity may be measured by sensing the velocity of an electric motor that moves in relative lockstep with the active suspension system actuator. In one embodiment, the wheel-specific suspension protocol may comprise wheel suspension actions that facilitate maintaining wheel compliance with a road surface over which the vehicle is operating while mitigating an impact of road surface based wheel movements on the vehicle. In one embodiment, the wheel-specific suspension protocol may include a measure of actuator inertia used as feedback to control the actuator. On a vehicle-wide level the method further comprises the processing of information received over the communication network from any other actuator to execute a vehicle-wide suspension protocol to cooperatively control vehicle motion. In one embodiment, the vehicle-wide suspension protocol may be effected by each controller that controls a single vehicle wheel. In one embodiment, the vehicle-wide suspension protocol may facilitate control of vehicle roll, pitch, and vertical acceleration. Further, in one embodiment of the system, the information received by the controller over the communication network may come from a central vehicle dynamics controller. According to another aspect, a fault-tolerant electronic suspension system comprises a plurality of electronic suspension dampers disposed throughout a vehicle so that each suspension damper is associated with a single wheel. In some embodiments, the electronic suspension damper is a semi-active damper or a fully active suspension actuator. Each damper comprises a separate active suspension controller. Further the fault-tolerant electronic suspension system comprises a communication network for facilitating communication of vehicle chassis control information among the controllers, and at least one sensor disposed with each controller to provide vehicle motion information and controller-specific vehicle wheel motion information to the controller. Further the fault-tolerant electronic suspension system comprises a power distribution bus that provides power to each electronic suspension controller. In one embodiment, a power distribution fault may include a bus-wide fault or an actuator-specific fault. Each electronic suspension controller is capable of independently detecting and responding to power distribution bus fault conditions by self-configuring to provide one of a preset force/velocity dynamic and a semi-active force/velocity dynamic. In one embodiment, the controller may be able to independently respond to power distribution bus fault conditions by regenerating energy harvested in the electronic suspension damper from wheel motion and facilitating the self-configuring. In one embodiment, the controller may further self-configure to provide a fully-active force/velocity dynamic. In one embodiment, the system may comprise an energy storage device operatively connected and proximal to each electronic suspension controller.

According to another aspect, a distributed suspension control system comprises a number of active suspension actuators (which, in some embodiments, may be valveless, hydraulic, linear motor, ball screw, valved hydraulic, or other actuators) that are disposed throughout a vehicle such that each active suspension actuator is associated with a single wheel. Further the system comprises a number of active suspension actuator controllers disposed so that active suspension actuators on a single vehicle axle share a single controller. The distributed suspension control system also comprises a communication network for facilitating communication of vehicle control and sensing information among all of the controllers. Further the system comprises at least one sensor disposed with each controller to provide vehicle chassis motion and/or vehicle wheel motion related information to the controller. Each controller processes information provided by its sensors to execute a wheel specific-suspension protocol to control the two or more wheels with which it is associated. Each controller also processes information received over the communication network from any of the other controllers to execute a vehicle-wide suspension protocol to cooperatively control vehicle motion.

According to another aspect, a power distribution bus and a communication link between a plurality of controller modules disposed throughout a vehicle body comprise a unified communication over power lines architecture.

In one embodiment, such architecture utilizes a high power impedance matching medium, capable of transmitting/receiving high-speed data via one of many commonly known RF technologies. Such communication medium may comprise a highly flexible coaxial cable with impedance matching terminations and RF baluns disposed at each power feed input to each controller module to separate data from raw DC power. An RF transformer extracts/injects data streams into the DC power feed while also attenuating low frequency noise associated with bidirectional DC power flow.

In another embodiment, communication packets are sent over unterminated power lines between a single DC power cable interconnecting all controllers distributed within the vehicle's wheel wells and use the vehicle's chassis as a return path.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

A voltage failure-tolerant smart valve controller may be associated with the control topology of an active suspension system with a processor-based controller located at each wheel. An active suspension may include a distributed network of smart valves with one or more controllers per valve powered from a bus and a regenerative source, where a failure of one controller does not adversely impact operation of the other controllers. In the event that the power bus shared by all controllers loses energy, the regenerative source at each wheel allows the controller to create either a preset input force/velocity dynamic in the actuator, or a dynamic ("semi-active") force/velocity dynamic. By designing the control topology to persist in the event of a bus failure, the active suspension system is more robust and guaranteed to provide a safe, reliable handling experience. In addition, distributed logic and control may provide that the failure of a single node does not compromise the control of the other corners.

A voltage failure-tolerant smart valve controller may be associated with a vehicular high power 48V electrical system for use in suspension and other vehicle applications. The high power 48V electrical system may include a power bus shared by multiple vehicle systems. In the event that the power bus shared by multiple systems loses energy, a benefit of a voltage failure-tolerant device, such as a smart valve, is that a controller located in the smart valve could create either a preset input force/velocity dynamic in the actuator, or a dynamic ("semi-active") force/velocity dynamic. By designing the smart valve to continue to operate in the event of a failure of the high power electrical system, the active suspension system is more robust and guaranteed to provide a safe, reliable handling experience.

A voltage failure-tolerant smart valve controller may be associated with a single body active suspension actuator comprising an electric motor, a hydraulic pump, and an electronic [torque or speed] electric motor controller, in a housing (which may be fluid filled, or the motor may be in air). By designing the active suspension system with highly-integrated smart valve components at each wheel, the costs of manufacturing, integration, and electrical wire distribution in the vehicle will be reduced. The single body acts as a node in a failure tolerant distributed network, where the failure of one highly-integrated smart valve does not adversely impact operation of the smart valves. Each single body active suspension actuator comprises a complete set of electromechanical components necessary to minimally function if the node loses resources from the distributed network. Therefore the single body active suspension actuator may further comprise an electronic controller that is voltage failure tolerant.

A voltage failure-tolerant smart valve controller may be associated with a vehicle active suspension system comprising a hydraulic motor and a controllable electric motor disposed proximal to each wheel. The smart valve may include a controller, hydraulic motor, and electric motor in a highly-integrated form factor near each wheel, and controlling its respective wheel. By designing the active suspension system with highly-integrated smart valve components at each wheel, the costs of manufacturing, integration, and hydraulic hose and electrical wire distribution in the vehicle will be reduced. The integration isolates wheel-specific processing and movement proximal to the wheel and reduces the requirements of a central processing node. The integration also enables a failure tolerant distributed network, where the failure of one highly-integrated smart valve does not adversely impact operation of the smart valves.

A voltage failure-tolerant smart valve controller may be associated with the control method for hydraulic power packs. The controller for a voltage failure-tolerant smart valve may implement an adaptive control method that adjusts for different operating conditions during normal operation and failure modes, such as a power bus open-circuit (disconnect) or short-circuit failure. In normal operation, the adaptive controller may adjust power control based on a loosely regulated or varying power bus voltage. In the event of a failure in the electrical system, the adaptive nature of the controller allows the hydraulic power packs to continue to operate in the most effective mode possible. Such a voltage failure tolerant motor controller may be combined to operate an electric motor that is operatively coupled to a hydraulic pump, which in turn may control a hydraulic actuator.

A voltage failure-tolerant smart valve controller may be associated with using voltage bus levels to signal active suspension system conditions. The smart valve controller may be integrated with a motor mechanically coupled to a hydraulic pump and storage (i.e. capacitor(s)) at each wheel. The motor may be capable of being driven or acting as a generator in response to hydraulic flow through the pump. The generated energy can be used to maintain a bus voltage across the capacitor(s) to self-power the controller. While the controller is self-powered, the suspension system can operate independent of a voltage failure on the voltage bus. The smart valve controller may be signaled that the failure has occurred by sensing the voltage bus levels. The voltage bus levels thus allow the voltage failure-tolerant smart valve controller to sense the active suspension system conditions and adapt its control based on the system conditions.

A voltage failure-tolerant smart valve controller may be associated with a self-powered semi-active (adaptive) suspension. The controller may control a damper that is capable of operating in the reactive quadrants (resisting an input force and velocity) in a controlled manner. Typically such systems require an external power source. In the case of a self-powered semi-active suspension with a voltage failure tolerant smart valve controller, the semi-active damper may continue to operate in a controlled manner even if an external energy source is lost. Such a system may be combined with a damper capable of recuperating energy (translating kinetic input energy into electricity or other potential energy i.e. hydraulic energy storage) and an energy storage apparatus (such as a capacitor).

The control topology of an active suspension including a processor-based controller per wheel may be associated with a vehicular high power 48V electrical system. The processor-based controller per wheel may be powered directly from the high power 48V bus or directly control active suspension components powered from the high power 48V bus. In either case, the control topology will rely on the processor-based controller per wheel knowing the state of the high power 48V electrical system and producing a control output in response to changes in the state of the electrical system or external command signals (over a network such as a CAN bus). For example, in a reduced power capabilities mode, the control topology at each wheel may choose to operate the active suspension system in a lower power consumption mode with reduced force capability. In such a system, each actuator on the high power bus may contain a processor that is responsible for controlling the actuator, and the multiple controllers may communicate via a communications bus (e.g. CAN, FlexRay, Ethernet, data over powerlines, etc.).

The control topology of an active suspension including a processor-based controller per wheel may be associated with electric motor/generator rotor position sensing in an active suspension, and/or a high-accuracy calibration method for a low-cost [low-accuracy] position sensor, and/or self-calibrating a sensor based on detected noise patterns that are filtered out by selective position sensing. An active suspension system with an electric motor/generator located proximal to each wheel will benefit from the collocated processor-based controller. The processor may interface with a rotor position sensor to provide position, velocity, or acceleration feedback of the electric motor (which may be coupled to a hydraulic pump, ball screw, or other mechanical translation mechanism) to the control topology. By designing motor/generator control loops local to each wheel, the active suspension system leverages a distributed architecture. The benefits of a distributed architecture include reduced latency and faster response time to localized sensing and events, and reduced processing load requirements of a central node. To reduce system cost, the processor-based controller may implement a high-accuracy calibration method that enables the use of a low-cost [low-accuracy] position sensor. The position sensor may exhibit detectable noise patterns that the processor-based controller selectively filters through a calibration process. Both calibration methods would allow a lower cost position sensor to replace a higher cost [higher accuracy] sensor.

The control topology of an active suspension including a processor-based controller per wheel may be associated with predictive analytic algorithms that factor in inertia in an active suspension control, wherein a torque command signal for an electric motor is dynamically controlled in order to compensate for inertia as the electric motor accelerates.

Feed-forward control of inertia in a back-drivable actuator where the actuator has linear or rotating inertia such that it reflects back as a force on both ends of the actuator that is proportional to the relative acceleration of the two ends with respect to each other. A wheel accelerometer or other sensor may predict the acceleration of the system (e.g. front wheels, look ahead, etc.), and thus be able to counteract what would normally be a marginally stable feedback system. The inertial compensation control input that mitigates the effect of inertia is then layered on top of the desired control input signal. The presence of a processor for the wheel allows sensor data to be fed into this processor, such as rotary or linear position sense, or one or more accelerometers.

The control topology of an active suspension including a processor-based controller per wheel may be associated with a frequency-dependent damping algorithm, wherein damping and/or actuation are controlled as a function of the frequency of operation. Such a system may include a damper and a smart valve where the damping force is dependent on the frequency of motion and on the input velocity. The resulting system can be lightly damped at one frequency, for example the body frequency of the vehicle, while at the same time being highly damped at other frequencies, for example the wheel frequency. Thus, a system of this type allows for a well-controlled wheel while the body can be actuated, lightly damped, or heavily damped as desired in the particular driving circumstance. The presence of a processor for the wheel allows sensor data to be fed into this processor, such as rotary or linear position sense, or one or more accelerometers.

The control topology of an active suspension including a processor-based controller per wheel may be associated with a vehicle model for feed-forward active suspension control, wherein a model of the vehicle response to all vehicle-impacting inputs (e.g. driver, suspension, road) is used to guide how a suspension system is controlled in response to external inputs (primarily from direct vehicle-impacting sources). Suspension system control actions are based on the inputs and the model in an open-loop control mode. The presence of a processor for the wheel allows sensor data to be fed into this processor, such as rotary or linear position sense, or one or more accelerometers.

The control topology of an active suspension including a processor-based controller per wheel may be associated with an open-loop driver input correction algorithm, wherein each processor per wheel receives common vehicle driver input data (a steering sensor, throttle sensor, etc.), and controls a suspension actuator in response to this driver input.

The control topology of an active suspension including a processor-based controller per wheel may be associated with and/or active hydraulic pump ripple noise cancellation, and/or active suspension control algorithms to mitigate [braking, pitch/roll, speed bump response, body heave, head toss, seat bounce, inclined operation, cross slope, large event smoothing, large event smoothing] in an active safety suspension system. The processor-based controller per wheel may implement localized predictive analytic algorithms to arrive at a chosen (desired) suspension force in response to localized or central sensing. The processor-based controller per wheel may also implement a damping algorithm that depends on the frequency of localized or central sensing. The benefits of running the algorithms that factor in inertia in a processor-based controller per wheel architecture include reduced latency and faster response time to localized sensing and events, and reduced processing load requirements of a central node. High-frequency events will require fast response times to generate damping commands that mitigate the stimulus.

The control topology of an active suspension including a processor-based controller per wheel may be associated with a self-powered adaptive suspension. The processor-based controller may be integrated with a motor mechanically coupled to a hydraulic pump and storage (i.e. capacitor(s)) at each wheel. The motor may be capable of being driven or acting as a generator in response to hydraulic flow through the pump. The generated energy can be used to maintain a bus voltage across the capacitor(s) to self-power the controller. While the controller is self-powered, the suspension system can adapt to the varying bus voltage and produce a suspension output.

The control topology of an active suspension including a processor-based controller per wheel may be associated with using voltage bus levels to signal active suspension system conditions. Due to the high power demand requirements of an active suspension, the voltage bus levels may fluctuate during load conditions. The active suspension system may include distributed smart valve controllers that sense the voltage bus levels and adjust force output to the load conditions. For example, during peak loads when the voltage bus drops significantly and the active suspension performance degrades, one or more distributed smart valve controllers may reduce their force output to allow the voltage bus to recover.

The control topology of an active suspension including a processor-based controller per wheel may be associated with super capacitor use in a vehicle active suspension system. Due to the high power demand requirements of an active suspension during transient events, a low-impedance energy storage buffer may be desirable to provide the active suspension smart valves with the on-demand energy needed to function properly. If the energy storage buffer does not have low enough impedance, the voltage bus powering the active suspension smart valves will drop in response to high-power transient events, reducing suspension damping force capabilities. The super capacitor(s) may be centrally located on the active suspension system's voltage bus or the super capacitor(s) may be located per wheel similar to the processor-based controllers.

Context Aware Active Suspension Control System

Provided herein are methods and systems for reducing energy consumption in an active suspension system. The methods and systems may include determining a set of detectable wheel events and vehicle events that cause movement of the vehicle greater than an operator perception threshold; adjusting operation of the vehicle suspension system so that suspension actions taken in response to at least one of wheel events and vehicle events that are not in the set consume power below a first power consumption threshold; and adjusting operation of the vehicle suspension system so that suspension actions taken in response to an event in the set of events consume power sufficient to maintain vehicle movement below the operator perception threshold.

One novel concept disclosed herein is to consciously and constantly weigh the benefit of an active suspension intervention, and its cost in terms of power consumption, and to intervene continuously in the way to balance those two effects. This approach reduces the requirements for the active suspension.

The present invention describes methods and systems, including a control protocol, for reducing energy consumption in an active vehicle suspension system comprising an event detector scheme coupled with a cost/benefit analysis of each event. This cost/benefit analysis may comprise of any of a number of methods, with power consumption only being one such method.

According to one aspect, the concept relies on detection and classification of discrete wheel events or body events (either as they occur or in a predictive fashion), a method for calculating the expected cost and benefit for each event, and an algorithm for acting on the expected cost and benefit to provide the highest performance at the lowest cost. Once a detectable event is located by the algorithm, a calculation is made to determine the amount of active control performance to apply.

Reference to an "algorithm" throughout this disclosure should be understood to encompass collectively, except where context indicates otherwise, various computer-based components, methods, and systems, and related data structures, for taking a defined set of inputs and executing a protocol involving calculation, transformation, iteration, and the like, to achieve a defined type of outputs.

Events are detected and classified as early as possible, using advanced information, statistical information, or sensor information, and then the expected benefit to the occupants in terms of any of a number of known analysis methodologies that may be further described. The expected cost of the intervention is calculated in terms of its power consumption, or in terms of its energy consumption if the event has a finite duration. This cost function may comprise of other parameters such as gain factors, force commands, averages of these parameters, or any other control parameter that may have an energy implication on the system. The term "sensor" should be understood, except where context indicates otherwise, to encompass analog and digital sensors, as well as other data collection devices and systems that are capable of detecting events and other potential inputs, including accelerometers, motion sensors, Hall Effect sensors, forward-looking cameras, navigation and GPS systems and many others that provide information to assist in the control protocols described herein, including, without limitation, advance information about road conditions, and the like.

According to one aspect, in response to the event detector, the algorithm adjusts the actions of the active suspension in a way such that the energy or power consumed over the upcoming detected event is kept as low as possible while the performance meets the desired levels. This may be done using a continuous scale, or it may be done using discrete thresholds on the benefit, the cost, and the settings. These thresholds may also be limited to simple trigger thresholds. Event detection may be a discrete event or a continuous analysis of terrain. For example, in the latter case a smooth road may be detected, and the system may reduce active control output (gain factors, thresholds, etc.) when there is a high cost (in terms of energy, etc.) compared to a small benefit it is creating (vertical acceleration mitigation, other ride metric, etc.), in response to the smooth road.

The suspension system's operation may be adjusted to consume power below a threshold for power consumption, and the interventions may be sized such that vehicle body movement is kept below a threshold.

The vehicle body may be a passenger vehicle, such as a car, SUV, or light truck, as well as a heavy industrial or vocational truck. It may also be a superstructure suspended by a suspension from a moving substructure, such as for example a truck cab suspended from the truck frame, a truck bed suspended from the frame, a medical procedure table suspended from an ambulance or vessel, or a seat suspended from a truck, passenger vehicle, bus, or ship, just to name a few. The vehicle body may also be a suspended platform for instrumentation, weapons, or video camera equipment where the suspension system is disposed between the platform and the substructure creating the disturbance.

The approach is predicated on the fact that in general, less motion of the vehicle or other device is associated with more power expenditure in an active suspension system, and that benefit of an active suspension vehicle is in general heavily nonlinear; therefore, a way of reducing average power consumption is to apply more active control to the body only when this control provides a significant benefit, and operating in energy-efficient, but somewhat less comfortable, modes the rest of the time. To enable this, one may identify the scenarios, events, or interventions in which greater benefit is provided, such as comfort to the consumer in the case of vehicles and more critical stability in the case of other devices (e.g., a medical platform). Methods and systems disclosed herein generally relate to changing active suspension control algorithms in relation to a cost function that has at least one parameter related to energy consumption (average power, instantaneous power, control function gains, force output, etc.).

The road events for the purposes of this invention may encompass a variety of meanings. In a preferred embodiment, wheel events seen by a vehicle's suspension are classified into a set of detectable characteristic events. In this context, wheel events may be defined as inputs into the wheel from the road, including wheel motion at body frequency (in some embodiments approximately 0-5 Hz), causing body motion also, and wheel motion at wheel frequency or higher (in some embodiments approximately 5-25 Hz). Wheel motion at body frequency is sometimes referred to as vehicle body events, which may be considered a subclass of wheel events. In some cases the term "wheel event" is used to refer to a specific wheel event that may occur roughly at a wheel frequency.

These detectable events may occur on typical average roads, which may be classified according to their roughness, the frequency or number of turns, the speed on which they are typically driven, or specific recognizable input shapes such as speed bumps, driveway entrances, road transitions, and manhole covers. Road events may include particular shapes of road that cause discomfort or high power consumption. They may also include specific roads, such as racetracks, which may be either recognized by the event detector scheme, as described further on, or even recognized by the driver and communicated to the algorithm through a user interface.

Another way to classify roads or events is by how often they are likely to occur. For example, the driveway leading to one's home is an important event in many ways, because it is a regular, known disturbance and carries an expectation of comfort by the operator of the vehicle. This event may thus be classified through recognition of its recurrence, and qualified as being of high importance for the same reason. Roads may also more generally be classified through analysis of the history of the suspension system, and grouped into similar road profiles using a statistical approach, or they may be grouped according to known road profiles ahead of the car gathered from look-ahead sensors or from stored or cloud based information like road profile maps using GPS.

Special cases of road events are emergency situations, where special rules may apply since the benefit calculation in these cases dramatically exceeds any power considerations. As an example, when the event detector recognizes an emergency maneuver through large lateral acceleration or longitudinal acceleration, it might increase the road holding ability and decrease the comfort in the suspension. In another embodiment, the vehicle may be able to use one or more sensors to detect an imminent crash by analyzing driver inputs (e.g. braking), radar, sonar, vision, and other sensors. When an imminent crash event is detected, a signal may be sent to the active suspension system to prepare it for an evasive or braking maneuver. In such a scenario, one or more of a plurality of settings may be instantiated: stiffen up the suspension to reduce roll and dive, increase power limits to use all necessary energy to keep wheel in uniform contact with the road to reduce wheel bounce, and/or stabilize the vehicle to reduce oscillations. In the event of an imminent rear-end collision (where the active suspension vehicle is about to collide with the rear end of another vehicle), the active suspension may instantaneously adjust ride height (e.g. increase ride height) in order to ensure the bumper collides with the vehicle in front. This may similarly be done with the rear of the active suspension vehicle to limit damage if another vehicle hits the active suspension vehicle rear end. In some embodiments, the adaptive cruise control, collision detection, or parking assistance sensors may be used to detect this imminent collision, and in some cases it may be able to indicate whether the ride height should be increased or decreased.

In another embodiment targeted towards safety but also comfort, the active suspension may adjust the pitch of the vehicle during brake roll-off based on the depression angle or amount the driver has set the brakes at.

One aspect of the methods and systems disclosed herein is defining ways to recognize a given event as early as possible, and classify it according to the definitions given previously. This is done through the use of a plurality of sensors, on or off the vehicle, and various kinds of analysis to process the sensor data. The classification and characterization of events is important. When transitioning between an energy efficient mode and an active mode, the determination of the expected perceived benefit should be made as early as possible to avoid uncomfortable transitions.

In one embodiment, the event detection algorithm compares the severity of an event, defined in terms of its impact on occupant benefit, to a threshold. If that threshold is exceeded, then an intervention of the active suspension system is warranted; otherwise, the suspension system may concentrate on energy-efficient operation to conserve fuel or electricity (for example, in an electric car). If the event is not expected to produce motion in the vehicle body that exceeds a lower perception threshold for the occupants, then no action should be taken to mitigate it.

While the notion of perception thresholds is discussed, it is possible that some allowed disturbances may still create a perceptive effect, albeit substantially lower than if the event was not mitigated using the active suspension system.

Another embodiment of the invention comprises a different approach to the same problem. In this embodiment, the event detector is replaced by an algorithm classifying the current driving scenario and continuously calculating the projected cost/benefit ratio for each potential future intervention.

A statistical analysis might allow predicting future events. For example, when driving on a smooth road, slowing down, and turning sharply, there is a high likelihood of a road transition coming up. These road transitions include driveways or road junctures that often cause large motions to the vehicle body, and which often are a significant factor in the perception of a smooth riding vehicle. The algorithm reacts to the pre-conditions of such an event (in this case, decreasing speed with a certain pattern, overall smooth road approaching, and high steering angle) by increasing its intervention, for example by increasing the control gains of the active suspension system.

Another pre-condition that may be detected might be specific driver inputs. If a driver is driving erratically, and thus imparting a pattern of steering, brake, accelerator, or gear shift inputs that may be correlated with poor visibility, bad road conditions, or impaired driving conditions, then the safety of the vehicle should be prioritized at any expense in the power consumption, thus setting a different performance factor than without these pre-conditions. If on the other hand the driver input is easy, but tenses up suddenly, then a bad road segment might be expected.

Another pre-condition might be derived from purely statistical analysis of existing roads. It is most likely to see large potholes on roads that are driven in a certain speed range, and with a certain steering input. For example, the driver may reduce speed and swerve repeatedly if the road exhibits large holes. In this case, the performance of the active suspension system is more important and should be prioritized. In addition, road conditions may be at least partially predicted based on a sensed driver input.

Another pre-condition might be based on a history of the wheel motion in the past period of time driven. If the road has been bad for the last few seconds, it is likely to at the very least remain that way, and thus performance of the active suspension might be adapted to slowly increase if the benefit has been underestimated over the past period of time. In one embodiment, this scheme may be improved through analysis of all of the past events seen by the suspension. The algorithm may look for time periods in the past history of the motion of the vehicle where the occupant comfort levels are poor, and find characteristics in the input profile leading up to these time periods that are repeatable. As an example, an analysis of wheel motion as measured by accelerometers on the wheel may detect elevated levels of peak wheel acceleration on roads with cracked or damaged road surface. These roads are likely to excite the vehicle body even if they have not already done so, and an analysis of past history of driving may lead to defining a continuous or discrete scale relating road roughness to the likelihood of poor occupant comfort, taking into account the past actions of the active suspension system during these times. This continuous or discrete scale may then be used, possibly in conjunction with other sensors, to recognize this event.

Another way of characterizing events is based on road mapping information. This may come from cloud-based or stored information such as maps and road profiles, in conjunction with GPS position mapping. It may also come from GPS-based recorded information. For example, the control algorithm may store every event where the level of discomfort exceeds a certain threshold, and the corresponding GPS location is measured. This may then allow preparing for possible large events by detecting an approaching stored "bad event" position. The GPS location may also be used in a more sophisticated way by using the mapped road information, along with vehicle speed, driver inputs, and other factors such as for example navigation system commands to pre-determine turns, lane changes, and road transitions, and thus predisposing the control system for those situations. Mapped information may include topographical map information, which may be an input to ride comfort, overall vehicle efficiency, and the like.

Another way to characterize events ahead of the vehicle may be to use look-ahead information from vision-based systems, radar, sonar, lidar, laser or other measurement systems that in conjunction with processing algorithms may detect road profiles ahead. In this case, the algorithm may detect large road bumps, potholes, and other road unevenness and predict the impact on occupant comfort; it may also detect impending driver inputs or even impacts, as many systems already do, and allow the suspension algorithm to switch to a high active mode for safety or for comfort reasons.

The benefit to the occupant or system may be defined in many ways. In general, it may represent a measure of the quality of the isolation the active suspension is providing. For human occupants, this measure is determined through a relationship between measured quantities and subjective measures of comfort. In general, it may be based on human interface models developed by the automotive, aerospace, and transportation industries to determine what motions at what frequencies most affect humans. In some implementations, it may be a simple sensor measurement such as an accelerometer reading.

For non-human target systems such as instrumentation or weapons systems the benefits may be more directly based on measurable quantities, though still typically through a relationship between those quantities and the motion parameters the instrumentation or weapon is sensitive to.

The expected benefit may be continuously calculated in some embodiments, but in other embodiments may also be calculated only when events are detected, or in yet other embodiments may be calculated in discrete time or space increments for entire sections of road.

The human perception of comfort in a passenger vehicle is typically not linear with regards to motion of the vehicle. First of all, it depends heavily on the frequency of the motion, which may be more or less emphasized in an active suspension control system. Second, it depends on the direction of motion. For example, roll motions of the vehicle are perceived differently, and with different critical frequencies, than pitch or heave motions. The inventors have discovered that roll motions are particularly critical at the frequencies where the neck has to do a lot of work to hold up the head (normally around 3 Hz), while heave motions are particularly critical at the resonant frequencies of the inner organs inside the human body (normally between 4 and 8 Hz). In some embodiments roll motion compensation is biased towards higher performance around 3 Hz, whereas vertical heave motion compensation is biased towards higher performance between 4 and 8 Hz.

In other embodiments, the benefit might be defined as allowing instrumentation to work, which may depend heavily on the suspended natural frequencies of components of the instrumentation.

In yet another embodiment, the benefit might be the ability of a surgeon to do his or her work while the superstructure is in motion, which might be particularly difficult if the medical procedure table moves at intermediate frequencies where the surgeon may have to control their hand motions in response, while they may be much less sensitive to low frequency motions or high frequency motions.

A simple implementation of a benefit calculation represents defining a lower threshold for what the human or non-human occupant of the target system is sensitive to. For example, a measure of vertical acceleration at the occupant's seat in a passenger vehicle crosses a threshold, at a given frequency, if the occupant can sense the motion, or more precisely, if the occupant feels disturbed by the motion. Based on this, the perception threshold may be calculated for any given input, based on its frequency content and time history. In many embodiments the perception threshold is a measure of occupant discomfort, not merely an indicator on whether the disturbance may be felt.

In one embodiment, such an analysis may include a root mean squared acceleration, weighted according to human perception factors at each frequency. The perception factors may for example be industry-wide accepted "ride meter" values as used by vehicle manufacturers to quantify a vehicle's comfort performance, or they may rely on the well-known NASA studies for human body vibration sensitivity. Another embodiment may include determining the frequency of the input, and characterizing the event by the input frequency alone.

In a preferred embodiment, the expected benefit for the occupant is calculated ahead of time, and for a multitude of interventions from the active suspension system. In order to do this, we may use information from the available sensors on the vehicle and ahead of the vehicle, as described previously, to predict the upcoming inputs. This information is then fed into a model of the vehicle and suspension.

In a simple embodiment, this model may represent a quarter car model with a sprung and unsprung mass, the suspension and tire springs, dampers, and actuators as needed. In more complicated embodiments, this model may represent a full vehicle, which may include only rigid body degrees of freedom or also include flexibility of the vehicle body, and may include suspension dynamics and kinematics as required to achieve the desired model accuracy. The model may also, in other embodiments, be continuously adapted and improved based on measured outputs, in a predictor-corrector type scheme, like for example a Kalman filter.

The output of this model may then be used to determine the expected benefit to the occupants. In a simple embodiment, the output may be calculated for the vehicle in each of a multitude of control modes, and the expected benefit and cost may be calculated for each, based on the model. This may provide sufficient information to preemptively modify suspension behavior to maximize performance and minimize power consumption.

The cost for the purposes of this calculation may be defined as the amount of power consumed by the active suspension system. Depending on the type of input event, the cost may mean one of a multitude of things. For events that are characterized by short or in general finite duration, or may be predicted in their entirety, it makes more sense to calculate the total amount of energy for the event, while for events that are indeterminate in duration it makes more sense to talk about the average or instantaneous power. The goal is for the system to reduce overall energy consumption.

Once a classified event is recognized, and a calculation of the expected benefit and cost is made, then a scheme may be applied to determine the course of action to take in the active suspension system. A general way of defining the action taken is to define a performance parameter that scales the level of active suspension intervention.

In a simple embodiment, we may simply set a lower threshold on the benefit. The threshold on the benefit may for example be related to a frequency-weighted perception threshold to the human occupant. If the event is expected to cause discomfort greater than the threshold, and an intervention is thus warranted, then steps are taken to operate in a less fuel-efficient, but more comfortable, mode. As soon as the motion of the vehicle in the more fuel-efficient mode is projected to fall below the mentioned lower threshold for discomfort, the intervention may be discontinued and fuel-efficient operation may resume. A lower threshold on benefit allows the control system to ignore small interventions and focus on only the significant ones. An upper threshold on power allows to not skew the average power disproportionately through a single event.

In a more general embodiment, one may consider a ratio between the benefit and the cost, while still maintaining lower and upper thresholds on each. In general, a parameter related to the ratio of benefit to cost may determine the amount of active intervention required for each event.

The algorithm in one embodiment continuously adjusts its expected benefit/cost ratio for the present or upcoming road events, and sets the performance parameter accordingly. For events or interventions where a high benefit/cost ratio is expected, the performance parameter is set high and the active suspension algorithm creates high performance along with typically higher power outputs. For events where the benefit/cost ratio is expected to be low, the performance parameter may be low and the active suspension algorithm may maintain a low-energy, low performance status, thus saving overall average energy. For events where the benefit/cost ratio is between high and low, the performance factor may also be lower than the maximum but higher than the lowest value, and the active suspension system may go into an intermediate mode where comfort is prioritized, but not as much as in high performance mode.

The benefit/cost ratio may be continuously calculated, or may be limited to a simple threshold or multiple sets of thresholds. These thresholds may also adapt over time as a function of the comparison between expected benefit and cost to actual benefit and cost over each road event.

The range between high performance and high efficiency operation in the suspension system may be a continuous scale, may have a nonlinear mapping where certain regions are more emphasized than others, or the algorithm may change in discrete steps including at least two operating points.

In one embodiment, the algorithm operates on a purely reactive basis by reading the sensors on the vehicle, including any of acceleration sensors on the vehicle body, rate sensors on the vehicle body, position sensors between the sprung and unsprung mass, sensors correlated with the position or velocity of the unsprung mass with respect to the sprung mass, accelerometers on the unsprung mass, or look-ahead sensors as described above. The algorithm may then instantaneously determine the benefit and the cost of the active suspension intervention in course, and may adapt its output to either increase or decrease performance of the system. For example, the algorithm in this mode may target maintaining a minimum benefit/cost ratio, so that when the expected benefit is low or below a first threshold, the cost is kept at a maximum or a low cost threshold. If an event occurs and the benefit/cost ratio decreases because the benefit decreases, the performance is raised until the cost increases too and the ratio is again kept at a minimum level.

In some embodiments, the system is implemented with an average filter on the cost to avoid increasing performance after the event is already over. It may also comprise nonlinear schemes such as a fast-attack, slow-decay limit that allows the performance factor to rise quickly but drop slowly after each event.

In a different embodiment, such an analysis may include creating perception thresholds at various levels in terms of measured quantities such as for example vertical or lateral acceleration at the occupant's head, and using the crossing of a given threshold as the quantitative value for ride benefit. In this case, events below a certain threshold of perception may be ignored.

In another embodiment, the analysis may include characterizing each event ahead of time at different control settings, and determining the importance to the driver of each change.

In one exemplary embodiment, we classify events into single-sided and double-sided events, and by their size and the vehicle speed. Large single-sided bumps are important to the perception of smoothness during operation of a passenger vehicle. Such bumps may be recognized at the onset if they follow a certain pattern in road slope, often coupled with low speeds and high steering angles. In this example, the vehicle is driving on a smooth road, in the most energy-efficient mode. A single-sided bump is encountered and detected, or may be is detected ahead of time by a look-ahead system. The active suspension is switched into the most high performance mode, and held there during the duration of the event. Once the event is over, or once it is determined that the event was misdiagnosed, the suspension system is again transitioned gently back into the most fuel-efficient mode. The overall power consumption in this driving mode may be very low, while the perception to the occupant may be that of a high performance system.

One aspect of the invention is a method of reducing the power consumed in an active suspension system by reducing the amount of roll control the suspension does. There are multiple ways of doing this.

First of all, the benefits of roll control must be evaluated. When a vehicle goes into a turn, the lateral acceleration, which from a rigid body point of view may be thought of as acting at the center of gravity of the vehicle body, may impart a lateral force on the vehicle body (the centrifugal force).

Any suspension system with one or more degrees of kinematic freedom may be linearized at any given operating point along its kinematic path (at any given ride height) to reduce the instantaneous path constraints imposed by the kinematics to a single link with rotary joints at each end, called a swing arm. This swing arm is a simplified representation of the complex suspension articulation path at that operating point, and allows one to find the instantaneous center around which the vehicle as a whole is allowed to roll in absence of suspension forces from the suspension actuators, including springs (airsprings and coil springs and torsion springs), dampers (linear, nonlinear, and variable dampers) and active elements (actuators of all sorts).

This lateral force at the vehicle center of gravity may impart a roll moment on the vehicle body that is counterbalanced by the suspension actuator forces. In absence of active systems, and in a steady-state scenario, the vehicle may roll until the spring force is sufficient to counterbalance the roll moment imparted by the centrifugal force.

An active suspension may act to lower this roll angle. In general, the inventors have discovered that drivers perceive roll rate much more than roll angle.

Some existing suspension systems mitigate final roll angle. Such systems often do so in a nonlinear way as a function of the input level only, and not as a function of time, such that for example the ratio of roll angle change over lateral acceleration change at higher lateral accelerations is higher than the same ratio at lower lateral accelerations.

The present invention relates to a method for reducing energy consumption in an active suspension system while still providing the benefit the consumer is looking for. The inventors have discovered that a major benefit of an active suspension when it comes to roll control is the fact that the vehicle does not roll at the beginning of a turn, and thus is more stable in emergency maneuvers and responds quickly to sharp steering inputs.

On the other hand, the energy consumption of an active suspension is heavily driven by its need for controlling the static roll angle of the vehicle. Some turns, even in normal operation of a passenger vehicle, may be upwards of 10 seconds long, such as for example highway exit ramps or hairpin turns on a mountain road. To hold the vehicle upright for this duration consumes a significant fraction of the total energy consumption in the active suspension.

An active suspension control algorithm that may react quickly to fast steering inputs, and then gently bleed off the need for roll control in longer turns, dramatically reduces the energy consumption and yet still delivers performance the customer notices. The present invention describes one such algorithm. The first step is to calculate a desired roll force command as the force that may be required to keep the vehicle level, or at a small angle that is deemed desirable for short periods of time. In a preferred embodiment, this angle may be zero, but in other embodiments it might be non-zero and in general follow a curve such as the one described above and shown in FIG. 95. The roll force command to maintain the vehicle at zero roll angle is higher than the desired roll force command in this plot, which follows curve 118-806.

The next step is to feed this desired command into a nonlinear algorithm that allows any fast changes in desired command to get through unaltered, much like a high-pass filter. The algorithm also provides for an initial period of time after any change in command where the desired command is followed closely without any reduction in the output force, which is unlike a high-pass filter. If the desired roll force command is above a threshold, it may also be saturated to avoid excessive power output by the active suspension system.

After a specified time, which in one embodiment might be around one second, the actual roll force command starts to bleed off from the desired command at a slow rate, such as to be substantially undetectable by the vehicle's occupants. This may let the vehicle roll gently at a rate that is substantially slower than any typical maneuver, and is scaled such that it minimizes energy, but without allowing the driver to perceive the change.

The actual roll command changes until it reaches a level at which it both keeps energy consumption below a predefined acceptable threshold even for long periods of time, and maintains the roll angle of the vehicle below a threshold deemed acceptable and safe. This level might be set by drawing a curve as a function of lateral acceleration that represents the minimum threshold, or it might be adjusted based on the duration of the input and the energy state of the system, while still remaining above or at a predefined minimum acceptable roll angle and below or at a maximum defined energy level. Such an algorithm may work in combination with tuned mechanical devices such as one or more anti-roll bars for the vehicle.

One aspect of this algorithm is how it deals with transitions from one turn into the opposite turn. In this case, it is desirable that the vehicle right itself fairly quickly so as to not introduce any lag in the roll response of the vehicle, and then after crossing through zero lateral acceleration behave the same way as at the beginning of the first turn. In one embodiment, the vehicle may follow the desired roll force command for a period of time that is long enough to allow for no detectable changes in roll force command during a typical slalom or double lane change maneuver. If the driver input or road conditions, and thus the desired roll force command, change in the period between the time when the actual roll force follows the desired roll force, and the time when the actual roll force reaches a steady-state value as a function of the input, then the actual roll force again follows any changes in the desired roll force, without removing the already bled roll force command. This allows the vehicle to avoid rapidly changing roll angle as a result of rapid changes in input.

In one embodiment, this algorithm may be modified in such a way that the desired roll force command does not maintain the vehicle flat, but instead allows a certain roll angle that is yet smaller than the final roll angle after bleeding off the actual roll force command. This may also be done adaptively, or in response to a vehicle power state in order to reduce the overall consumption if the vehicle is being driven aggressively for long periods of time.

The methods described here are particularly well suited for active suspension systems using electro-hydraulic, electromagnetic, and hydraulic actuators, where holding force is expensive in terms of power consumption and thus allowing the vehicle to bleed off roll force after some time is a key enabler for low-energy solutions. Such algorithms may be combined with linear motor actuators, hydraulic actuators using electronically controlled valves, hydraulic actuators using controlled pumps and motors, and hydraulic actuators containing a spring in series with the actuator and a damper in parallel with both the actuator and spring. In one embodiment the above algorithms are combined with a hydraulic actuator that comprises of a multi-tube damper body that communicates fluid with a hydraulic pump, which is coupled in lockstep with an electric motor.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

Brushless Dc Motor Rotor Position Sensing in an Active Suspension

Aspects of the methods and systems of brushless DC motor rotor position sensing in an active suspension relate to a device to improve the control feedback of an electronically controlled active suspension actuator by sensing the rotational position of a brushless (BLDC) motor, wherein the BLDC motor is operatively connected to a semi- or fully-active suspension system such that the torque from the motor creates force from the actuator. According to one aspect a BLDC motor is in operational communication with a hydraulic pump in a vehicle suspension system, the BLDC motor comprises a rotor that includes a sensor target element, sensing the sensor target upon rotation of the rotor using a position sensor, collecting a set of rotor position data, and processing the set of rotor position data along with at least one external sensor in a vehicle dynamics algorithm in order to determine a command torque/velocity for the BLDC motor, optionally further comprising calibrating the rotor position data in real-time by applying a calibration curve. According to another aspect an active suspension system comprises an electric motor comprising a rotor that includes a sensor target magnet, a hydraulic pump that is operatively coupled to the electric motor rotor, a hydraulic actuator that is in fluid communication with the hydraulic pump, a contactless position sensor array comprising a plurality of Hall effect sensors, a controller executing a control algorithm for the active suspension system, wherein the control algorithm uses data from the position sensor and at least one external sensor in order to control the active suspension system. According to another aspect, a method comprises disposing a BLDC motor in operational communication with a hydraulic pump in a vehicle suspension system, wherein the BLDC motor comprises a rotor that includes a sensor target element, sensing the sensor target upon rotation of the rotor using a position sensor, collecting a set of rotor position data, processing the set of rotor position data along with at least one of BLDC command torque/velocity data and sensed BLDC current/voltage data to determine a calibration curve and calibrating rotor position data in real-time by applying the calibration curve, wherein the position sensor may be any of a wide range of sensors. By way of example, the position sensor may be a contactless sensor or a metal detector wherein the sensor target element is adapted to be detectable by the metal detector. In embodiments the position sensor may be an optical detector, and the sensor target element may be adapted to be detectable by the optical detector. The position sensor may be a Hall effect detector, and the sensor target element may be adapted to be detectable by the Hall effect detector. In embodiments the position sensor may be a radio frequency detector, and the sensor target element may be adapted to be detectable by the radio frequency detector. In embodiments the position sensor may bean array of Hall effect sensors, or the Hall effect sensors may be sensitive to magnetic field in the axial direction with respect to the rotatable portion of the electric motor. In some embodiments of the system the sensor target element may be a diametrically magnetized two-pole magnet, wherein the magnet does not need to be aligned in manufacturing. In some embodiments of the system the vehicle suspension system contains pressurized fluid, wherein the pressure exceeds an operable pressure limit of the position sensor. In some embodiments of the system a primary axis of the sensor and the target element are coaxial with the rotational axis of rotor. In some embodiments of the system a primary axis of the sensor and the target element are off-axis from the rotational axis of the rotor and the target element is of an annular construction. In some embodiments of the system the position sensor is located in a sealed sensor compartment that is separated from the fluid in the system by a ferrous material that is held in rigid connection to a housing of the suspension system. In some embodiments of the system the sensor target element is assembled onto the rotor. According to yet another aspect, sealing a fluid in the suspension system from the sensing compartment via a diaphragm that is impervious to the hydraulic fluid and disposing the position sensor in the sensing compartment, wherein the diaphragm permits sensing of the sensor target element by the position sensor, wherein the position sensor is disposed on a controller PCB that controls the motor. According to another aspect, sealing a fluid in the suspension system from the sensing compartment via a diaphragm that is impervious to the hydraulic fluid and disposing the position sensor in the sensing compartment, wherein the diaphragm permits sensing of the sensor target element by the position sensor, wherein the position sensor is disposed remote from the controller PCB that controls the motor.

According to another aspect, the BLDC motor comprises controlling at least one of torque and rotational speed of the rotatable portion of the BLDC motor by adjusting current flowing through windings of the BLDC motor in response to the sensed sensor target position. Another aspect relates to processing a series of sensor target detections with at least one of a derivative and integration filter and an algorithm that uses velocity over time to determine position and acceleration of the rotatable portion.

Another aspect relates to sealing a fluid in the suspension system to form a dry region in the suspension system via a diaphragm that is impervious to the hydraulic fluid and disposing the position sensor in the dry region, wherein the diaphragm permits sensing of the sensor target element by the position sensor. Another aspect relates to a method that comprises disposing a BLDC motor in operational communication with a hydraulic pump in a vehicle suspension system, the BLDC motor comprising a rotor that includes a sensor target element, sensing the sensor target upon rotation of the rotor with a position sensor, processing the sensed rotor position data to determine noise patterns, selecting a subset of sensed rotor positions from the sensed rotor position data; and filtering out the determined noise patterns for the selected subset of sensed rotor positions.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

Active Chassis Power Management System for Power Throttling

The methods and systems described herein use a power limit as a control mechanism for reducing the average power used by active vehicle actuators without unduly affecting the performance that such actuators provide. At least one controller may dynamically measure power into at least one actuator and may keep track of running averages over time. Based on instantaneous and time-averaged energy use, as well as a vehicle state, at least one actuator can be throttled so that at least an average power goal for the plurality of actuators is substantially met.

Active vehicle actuators differ from fixed electrical loads such as rear window defrosters, air-conditioning compressors, fans and the like in that that their power requirements are dynamic over time and are not fixed or easily predictable. In most cases, the power consumed by an active vehicle actuator varies on a time basis that is rapid compared to variability of other power requirements. In addition some active vehicle actuators, such as those used for active suspension, can operate in different modes, sometimes acting as energy consumers and at other times acting as energy generators.

Aspects of using a power limit for reducing average power consumed described herein relate to systems and methods for measuring or estimating power used by at least one active vehicle actuator and controlling the operation of the at least one actuator to manage (e.g., reduce) overall power consumption.

According to one aspect, a plurality of active vehicle actuators is powered from a power bus that is independent from the vehicle's primary electrical system and where the total power on the independent bus can be measured. This power measurement is averaged over at least one time constant and the results are compared to at least one average power consumption constraint. The difference between the measured power and average power consumption constraint is used by the plurality of active vehicle actuator controllers to throttle the actuator commands in such a way that the total power consumed by the plurality of active vehicle actuators stays below the at least one average power consumption constraint.

According to another aspect, the at least one actuator can be throttled by lowering its control gains, by implementing a command limit or clamp, or by a combination thereof. Lower control gains reduce the dynamic performance of the actuator, resulting in reduced power consumption. By limiting or clamping the peak value of the actuator command, the peak as well as the average power consumption is reduced without affecting the performance of the actuator for commands below the limit. In the mode where the actuator is regenerative, a throttling limit on the peak regenerative command will limit the peak regeneration as well as the average power regenerated.

According to another aspect, the average power consumption constraint can be fixed or dynamic and based upon a vehicle power/energy state. This state may be determined from a number of vehicle parameters including, but not limited to: engine RPM, alternator load state, vehicle battery voltage, vehicle battery state of charge (SOC), age and state of battery health, vehicle energy management data and anticipated state data, such as based on a look-ahead to anticipated road condition that may impact the likely mode of the actuator (e.g., a certain kind of moderately rough road may provide more opportunities for operating in regenerative mode than a primarily smooth road that has occasional large disturbances). The state may also be communicated from a vehicle electronic control unit (ECU) either directly or via a vehicle communications network such as CAN or FlexRay.

According to another aspect, the at least one power consumption constraint is one of the following: an instantaneous power limit, at least one moving time window average, at least one exponential filter average, or a combination thereof. Other averaging methods are envisioned and the methods and systems described herein are not limited in this regard.

According to another aspect, the at least one power consumption constraint comprises a maximum average power versus moving time window length table or plot where each point in the table or plot defines a constraint on the maximum power averaged over that time window. This power consumption constraint may be calculated by a vehicle ECU and communicated in the form of a data structure, table, matrix, array or similar.

According to another aspect, the power consumption of the plurality of active vehicle actuators are individually measured or estimated from their actuator commands. Most active vehicle actuators have a relatively simple model for estimating power consumption as a function of actuator command. In this embodiment, the at least one average power consumption constraints can be implemented on an actuator by actuator basis.

In another embodiment a plurality of parameter values that define a model involved in calculating actuator commands may change due to the components aging as well as due to temperature and other variations that affect the performance of an actuator. In such cases an aging and an environment-dependent scaling factor are applied to calculate the scaling factor for actuator commands.

Furthermore, in another embodiment a non-linear effect of aging is compensated by applying a lookup table, or a piecewise or polynomial approximation, as a multiplication factor to a desired command.

According to another aspect, at least a portion of the plurality of active vehicle actuators are controlled to ensure that the average power consumption for the portion of the plurality of active vehicle actuators stays below the at least one average power consumption constraint.

According to another aspect, the power throttling is implemented in at least one processor, where the at least one processor algorithm uses information from at least one power consumption sensor. The power consumption sensor can be a current sensor at a substantially constant voltage actuator connection, a voltage sensor at a substantially constant current actuator connection or a sensor that computes the product of voltage and current at a dynamically varying actuator connection. The at least one processor algorithm can be centralized in a vehicle ECU or distributed to the processors controlling the plurality of active vehicle actuators.

According to another aspect, the plurality of active vehicle actuators each have a priority in terms of how much power they are allowed to consume and this prioritization is incorporated into the at least one average power constraints such that actuators with higher priority receive a great portion of the available power. This prioritization is dynamically changeable based on the vehicle power/energy state. In one embodiment, a triage controller (or triage algorithm implemented in a vehicle energy management ECU) allocates more power to certain actuators at key times to improve performance, comfort or safety. The triage controller may have a safety mode that allows the power constraints to be overridden during avoidance, hard braking, fast steering and when other safety-critical maneuvers are sensed.

A simple embodiment of a safety-critical maneuver detection algorithm is a trigger if the brakes are engaged beyond a certain threshold and the derivative of the brake position (the brake depression velocity) also exceeds a threshold. An even simpler embodiment may utilize longitudinal acceleration thresholds. Another simple embodiment may utilize steering where a fast control loop compares a steering threshold value to a factor derived by multiplying the steering rate and a value from a lookup table indexed by the current speed of the vehicle. Alternatively, a piecewise or a polynomial multiplier can be used as for current loop gain adjustments. The lookup table may contain scalar values that relate maximum regular driving steering rate at each vehicle speed. For example, in a parking lot a quick turn is a conventional maneuver. However, at highway speeds the same quick turn input is likely to be a safety maneuver where the triage controller should disregard power constraints in order to help keep the vehicle stabilized.

According to another aspect, the plurality of active vehicle actuators may have a total allocated power based upon operating modes of the vehicle. Operating modes include, but are not limited to: normal driving, highway driving, stopped, sport mode, comfort mode, economy mode, emergency avoidance maneuver, and road condition specific modes.

According to another aspect, the bus that provides power to the plurality of active vehicle actuators comprises at least one energy storage device where at least one actuator can receive energy from the energy storage device. This embodiment also comprises at least one sensor that detects future driving conditions, including but not limited to: a GPS unit to calculate future route, a forward-looking sensor to detect vehicles, pedestrians, stop signs and road conditions, an adaptive speed control system, weather forecasts, driver input such as steering, braking and throttle position. Other sensors and prediction methods are envisioned and the methods and systems described herein are not limited in this regard. This system also comprises at least one ECU with at least one algorithm to predict future power flow for at least one of the plurality of active vehicle actuators. The at least one ECU regulates the state of charge (SOC) of the at least one energy storage device to prepare for the predicted future power requirements. For example, the knowledge of an impending stop is used to raise the SOC of the energy storage device to make sure that there is enough power available for an electronic steering actuator to perform an avoidance maneuver, a dynamic stability control actuator to control skidding, and at least one active suspension actuator to mitigate nose dive of the vehicle.

According to another aspect, the plurality of active vehicle actuators comprises at least one integrated active suspension system disposed to perform vehicle suspension functions at a wheel of the vehicle and at least one active vehicle actuator of a different type. An independent power bus may power active vehicle actuators of differing types without limitation, thus allowing regenerative actuators such as those used by an active suspension system to help balance the power consumption of non-regenerative actuators. In this embodiment, the plurality of active vehicle actuators may each have its own processor and algorithm to facilitate calculating its own average power constraint and the processors may coordinate this activity via communications over a communications network. Alternatively, at least one processor and at least one algorithm may be centralized in a vehicle ECU.

According to another aspect, the plurality of active vehicle actuators include an active suspension system disposed to perform vehicle suspension functions, where the at least one sensor that detects future driving conditions comprises the two front active suspension actuators. In this embodiment, the power drawn by the front active suspension actuators gives a predictive value for the power requirements for the rear active suspension actuators and for other vehicle actuators such as roll stability. The system reacts by increasing the SOC of the energy storage device to at least partially compensate for these impending power requirements.

According to another aspect, when the plurality of active vehicle actuators includes at least one actuator capable of regeneration in some modes, the power consumption constraint can be an average power over a long period of time substantially close to zero. For example, when the plurality of active vehicle actuators includes an active suspension system disposed to perform vehicle suspension functions for at least one wheel, energy captured via regeneration from small amplitude and/or low frequency wheel events may be stored in the energy storage device. When the suspension control system requires energy, such as to resist movement of a wheel at very low velocities substantially close to zero velocity, or to encourage movement of a wheel in response to a wheel event, energy may be drawn from the energy storage device. Energy that is consumed to manage various wheel events may be replaced by the regeneration described above. In this aspect, the active suspension actuators are operating an energy neutral regime.

According to another aspect, the plurality of active vehicle actuators includes a mild hybrid braking system comprising at least one from the following list of active vehicle actuators: the vehicle alternator, the vehicle starter motor, a regenerative braking electrical generator or another motor. In this embodiment, the energy regenerated during braking may be used to offset the power consumed by other active vehicle actuators and thus reduce the total average power consumption over time. Regenerative braking systems typically include an energy storage device to temporarily store the regenerated energy so that it may be used at a later time, reducing the amount of throttling required later, but the methods and systems described herein are not limited in this regard.

According to another aspect, the plurality of active vehicle actuators can be throttled indirectly by allowing the voltage on their power bus to droop. In this embodiment, a DC/DC converter disposed to provide power to the bus implements an at least one average power consumption constraint. When the total power consumption of the plurality of active vehicle actuators exceeds this constraint the voltage on the bus droops and the actuators react by reducing power consumption. One method is to have each actuator implement a bus current limit so when the voltage changes, power drawn by each actuator proportionally follows the bus voltage. Alternate methods include, but are not limited to, implementing a gain, a lookup table, a piecewise, or a polynomial scaling, such that the power draw per actuator is a stronger, a weaker or a non-linear function of bus voltage.

According to another aspect, the DC/DC converter may be capable of unidirectional or bidirectional power flow. A bidirectional DC/DC converter allows excess regenerative energy to be returned to the vehicle electrical system reducing the amount of power required from the vehicle alternator.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

An active chassis power management system for power throttling may be associated with an energy-neutral active suspension control system where the goal is to balance the active suspension's regeneration with its use of active power such that the average power drawn from the vehicular high power electrical system over a period of time is substantially zero. This approach has the advantage of allowing the vehicular high power electrical system to be designed for high peak power without the size or cost required to provide high average power.

An active chassis power management system for power throttling may be associated with a vehicular high power electrical system incorporating energy storage, such as supercapacitors or high-performance batteries, to provide the peak power required by the actuators. This allows the actuators to have a high instantaneous power limit for high performance and only require throttling to reduce power consumption over longer time periods.

Using supercapacitors for energy storage is especially advantageous as their voltage directly indicates the energy state or state of charge (SOC) of the energy storage device. Energy neutrality of the plurality of active vehicle actuators can be achieved over time by throttling so that the voltage on the bus stay substantially constant. A similar approach may be taken when using high-performance batteries but may require a different method of estimating SOC, such as coulomb counting, individual cell voltage measurements or a combination thereof.

An active chassis power management system for power throttling may be associated with an active suspension system comprising on-demand energy electrohydraulic actuators. Such an actuator may include a hydraulic actuator operatively coupled to a hydraulic pump. The pump is coupled to an electric motor, which is connected to a motor controller that provides on-demand energy, wherein the motor controller provides energy to the motor instantaneously to create a force from the actuator. By throttling energy to the actuator, the instantaneous power used by the motor may be directly regulated, resulting in an on-demand system that consumes less power over time.

An active chassis power management system for power throttling may be associated with a self-driving vehicle with integrated active suspension. Such vehicles have a number of sensors that may be used by the power throttling algorithm to detect and predict future driving conditions. A list of such sensors includes, but is not limited to: Radar, Lidar, infrared, long-range ultrasonic, stereo cameras, fisheye cameras, and laser rangefinders. This information may be used to predict future power flow requirements for at least one of the plurality of active vehicle actuators and may also be used to regulate the state of charge (SOC) of an energy storage device to prepare for the future power requirements. For example, the knowledge of an impending obstacle avoidance maneuver may be used to raise the SOC of the energy storage device to make sure that there is enough power available for an electronic steering actuator to perform the avoidance maneuver, a dynamic stability control actuator to control skidding, and at least one active suspension actuator to mitigate vehicle body roll.

An active chassis power management system for power throttling may be associated with a context aware active suspension control system. In addition to actuator command limiting and actuator controller gain modification, throttling may be implemented by changing the relative weighting given to suspension events that require more or less power. In this way, the overall power consumption of the active suspension system can be reduced without degrading performance.

An active chassis power management system for power throttling may be associated with an open loop driver inputs correction active suspension algorithm & feed-forward active suspension control using a vehicle model which is used to improve performance of an active suspension system. Feed-forward approaches improve performance by minimizing the gain error of the closed-loop feedback control. The amount of throttle applied to at least one active suspension actuator may be used in the calculation of the acceptable error of the closed-loop system thus avoiding saturation and windup.

Inertia Mitigating Buffer

In an aspect of the methods and systems of an inertia migration buffer described herein, an active suspension device is disclosed. The active suspension device includes a housing containing a piston that is operatively disposed to separate a first volume and a second volume and a hydraulic motor operatively connected between the first volume and the second volume. The active suspension device further includes a main system accumulator attached to the first volume and an inertia mitigation accumulator in fluid communication with the second volume, such that fluid communication between the second volume and the inertia mitigation accumulator passes through a fluid restriction. The inertia mitigation accumulator includes a compressible medium. The active suspension device may be a regenerative, semi-active, and fully-active suspension damper.

In an aspect of the inertia mitigation buffer methods and systems described herein, the pressure in the inertia mitigation accumulator is greater than the pressure of the main system accumulator when the piston is fully compressed. In an aspect of the inertia mitigation buffer methods and systems described herein, the fluid restriction is a tuned orifice.

In an aspect of the inertia mitigation buffer methods and systems described herein, a stiffness of the inertia mitigation accumulator is greater than a stiffness of the main system accumulator. In embodiments, a stiffness of the inertia mitigation accumulator is lower than a stiffness of the main system accumulator.

The housing includes one of a mono-tube, twin tube, and triple tube damper body. The inertia mitigation accumulator includes a chamber that contains a floating piston separating a gas volume from a fluid volume and the fluid volume is in communication with the fluid restriction.

In an aspect of the inertia mitigation buffer methods and systems described herein, the compressible medium is at least one of a compressed gas separated by a floating piston, and a mechanical force biasing element acting on a floating piston. The main system accumulator is a gas-charged accumulator further comprising a floating piston. In an aspect of the inertia mitigation buffer methods and systems described herein, the piston is connected to a piston rod that is disposed in the second volume. The second volume includes a variable pressure side of the hydraulic motor. In an aspect of the inertia mitigation buffer methods and systems described herein, the compressible medium is an air bag.

In an aspect of the inertia mitigation buffer methods and systems described herein, the inertia mitigation accumulator is mounted to at least one of on the piston, in the piston rod, in a base of the housing, in a top of the housing near a seal of the piston rod, outside the housing, and inside a housing containing the hydraulic motor.

During a first mode, the fluid enters the inertia mitigation accumulator and the hydraulic motor provides a high impedance to fluid flow, and during a second mode the fluid exits the inertia mitigation accumulator and the hydraulic motor provides a lower impedance to fluid flow. In an aspect of the inertia mitigation buffer methods and systems described herein, the first mode occurs during a high pressure spike in the system.

In embodiments, the fluid restriction is designed to facilitate dampening resonance of the inertia and compliance of the overall system.

According to embodiments, a method for reducing inertia induced forces in a damper is disclosed. An accumulator is disposed in fluid communication with a variable pressure side of a hydraulic motor. Small amplitude, high frequency pulsations in the accumulator are absorbed. The fluid is directed between the accumulator and the variable pressure side of the hydraulic motor through a fluid restriction. In an aspect of the inertia mitigation buffer methods and systems described herein, during high fluid acceleration events, the fluid flows into the accumulator and compresses a compliant medium. The variable pressure side of the hydraulic motor includes a side opposite to a main system accumulator. The compliant medium is a floating piston separating a gas volume from the fluid.

According to embodiments, an active suspension actuator is disclosed. The active suspension actuator includes an actuator housing containing a piston that is operatively disposed to separate a first fluid volume and a second fluid volume and a hydraulic motor in fluid connection between the first volume and the second volume. The hydraulic motor and electric motor contain rotational elements that have a mass. The active suspension actuator further includes a first accumulator attached to the first fluid volume and a second accumulator attached to the second fluid volume and a damping device that provides damping to at least one of the first and second accumulator.

In embodiments, the first accumulator comprises a floating piston separating compressed gas from the fluid filled first volume and the second accumulator comprises a floating piston separating compressed gas from the fluid filled second volume.

In embodiments, at least one of the first accumulator and the second accumulator contains a compressible force element that pushes against the accumulator. The compressible force element may be a spring disposed to push a floating piston in the accumulator against the gas force.

In embodiments, at least one of the first accumulator and the second accumulator includes a sealed gas bag. The first accumulator and second accumulator may share a common gas volume.

In embodiments, the damping device includes a fluid restriction orifice between the second fluid volume and the second accumulator. The damping device may include a friction seal around a floating piston in at least one of the first accumulator and the second accumulator.

In an aspect of the inertia mitigation buffer methods and systems described herein, a separating piston is in direct fluid communication with a first (e.g. compression or rebound and the like) chamber of the hydraulic actuator on a first side of the separating piston, and in direct communication with a second (e.g. rebound or compression and the like) chamber of the hydraulic actuator on a second side of the separating piston that is substantially opposite of the first side of the separating piston. In some embodiments at least one force biasing element (such as a mechanical spring) is attached between a fixed member and the separating piston.

In an aspect of the inertia mitigation buffer methods and systems described herein, a separating piston is in direct fluid communication with a first (e.g. compression or rebound and the like) chamber of the hydraulic actuator on a first side of a first separating piston, and in direct communication with a second (e.g. rebound or compression and the like) chamber of the hydraulic actuator on a second side of a second separating piston, wherein a compliant mechanism that creates a force when compressed is disposed between a second side of the first separating piston, and a first side of the second separating piston. In some embodiments the compliant mechanism may comprise a gas volume or a spring element disposed between the two separating pistons. In such an embodiment, a force on the first separating piston from a fluid pressure in the first chamber may provide a force on the second separating piston thus creating a force on fluid in the second chamber.

Sensor Calibration and Error Correction

The present invention describes how to improve the accuracy of a sensor by calibrating it against one of the derivatives of the sensor signal. The process allows for the use of a lower accuracy sensor in a high accuracy environment, since the calibrated sensor will perform significantly better than the specified accuracy of the actual sensor.

For this type of system, a method must be found to improve the accuracy of the sensor in an ongoing way and without the use of other sensors.

Sensor inaccuracy is of many forms. Most sensors have a basic resolution of the output signal (often due to the discretized nature of the output, or due to the signal-to-noise ratio of the output signal. Some sensors also have a behavior that can be characterized as a nonlinearity or repeatable inaccuracy of the output signal as a function of their basic output. For example, many position sensors have a position error that is a function of only the actual position. In an optical encoder for example, this could be due to a poor alignment of the optical screens, such that at a given position, the output reading is always deviating from the actual position. In an accelerometer this could be due to the nonlinear behavior of the basic strain signal underlying the accelerometer reading, such that the output at higher accelerations is not proportional to the actual acceleration in the same way as the output at lower accelerations is. There are many other examples.

The present disclosure describes a method whereby the nature of the error signal is used to calibrate the sensor using its own output readings. The sensor reading is differentiated with respect to time and filtered to remove all or part of the signal that is periodic with the sensor output. The periodicity of this signal corresponds to the harmonics of the actual physical value measured by the sensor; for example, in a rotary position sensor the periodicity corresponds to the multiples of each full revolution of the system, where the sensor is physically in the same position again upon completion of a revolution, and the output should thus repeat itself.

The filtered signal is then subtracted from the measured signal (accounting as needed for any group delay in the filter to avoid time shifts), and the result is divided by the filtered signal. This value is then multiplied by the incremental sensor reading at the given output and provides a calibration factor for that increment of the sensor's output reading.

This method can also be applied when using an estimated signal, based on other correlated sensors and a model of the system, to provide a measure of feedback for the signal to be calibrated. This allows for the use of the same technique, but with an added third source for comparison purposes, which might, for example, have higher accuracy over one range of operation of the sensor and lower accuracy over a different range.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

According to one aspect, a method of improving accuracy of a sensor comprises using an output from a sensor, calculating a sensor calibration function, and subsequently generating a corrected sensor signal by mapping the output from the sensor with the sensor calibration function. The sensor calibration function is generated by performing steps comprising calculating a first intermediate signal by performing one of differentiating and integrating the output from the sensor with respect to time, calculating a second intermediate signal by filtering the first intermediate signal to remove at least a portion of the first intermediate signal that is correlated with the output from the sensor, calculating a third intermediate signal by delaying the first intermediate signal by an amount substantially equal to the group delay in the filter used in the previous step, calculating a fourth intermediate signal by subtracting the second intermediate signal from the third intermediate signal and finally dividing the fourth intermediate signal by the third intermediate signal to obtain an error correction function at a plurality of output values from the sensor.

In some embodiments, the sensor may be one of a position linear position, velocity, or acceleration sensor, an angular position, velocity, or acceleration sensor. In some embodiments, the sensor calibration function is one of a lookup table or a nonlinear mapping function.

In some embodiments, the first intermediate signal may be calculated by integrating or differentiating the output from the sensor multiple times. In some embodiments, the filter to remove a portion of the sensor signal that is correlated is a notch filter or a string of multiple filters.

According to one aspect, the method described above is equally effective if the steps for generating a sensor calibration table comprise calculating a first intermediate signal by performing one of differentiating and integrating the output from the sensor with respect to time, calculating a second intermediate signal by filtering the first intermediate signal to remove at least a portion of the first intermediate signal that is not correlated with the output from the sensor, calculating a third intermediate signal by delaying the first intermediate signal by an amount substantially equal to the group delay in the filter used in the previous step and finally dividing the second intermediate signal by the third intermediate signal to obtain an error correction function at a plurality of output values from the sensor.

In some embodiments, the sensor calibration may be one of updated in a continuous fashion, updated a finite number of times, updated only during a part of the operating range of the sensor, or updated only during specific times.

According to one aspect, calculating a sensor calibration function further comprises applying a parameter improvement factor derived from a system model to obtain the error correction function.

In some embodiments, applying the parameter improvement factor to update the sensor calibration function is at least one of sensor signal frequency dependent and system model output confidence factor dependent. In other embodiments it comprises applying a parameter improvement factor derived from a system model to the corrected sensor signal to obtain a corrected, filtered position signal.

According to one aspect, a sensor calibration method comprises a controller adapted to control an electric motor, a position sensor disposed to sense the electric motor position, wherein output from the sensor comprises the position sensor output, and an algorithm to improve accuracy of the position sensor, comprising generating a corrected position sense signal by using a calibration table to correct the position sensor output, wherein the calibration table is a correlation between position sensor output and corrected position sensor output.

In some embodiments, the electric motor is at least one of a rotary motor and a linear motor. In some embodiments, the position sensor is a contactless rotary position sensor such as a Hall effect array magnetic sensor. In some embodiments, the position sensor output is transmitted from a position sensor via a digital communications bus such as I2C, SPI, UART, CAN, or other communication method.

In some embodiments, the calibration table comprises a lookup table or a function with at least the position sensor output as an input, and the corrected position sense is an output. This may be accomplished in a variety of ways, but one aspect is generating a corrected position sensor output from the raw position sensor output (e.g. from the sensor) without any time step delay. In some embodiments, the algorithm produces a corrected position sensor output for a given position sensor output without a time-step delay. In some embodiments, the algorithm operates in real-time with no latency.

In some embodiments, the calibration table is generated by processing at least a portion of position sensor output through a filter, and determining a relationship between the filtered position sensor output and a time-correlated position sensor output. In some embodiments, the time-correlated position sensor output (e.g. raw output) comprises time-delayed position sensor output data. In other embodiments, the filter is a method that removes periodic content from a signal. The filter may comprise at least one of a notch filter, a sync filter, a low-pass filter, a high-pass filter, an FIR filter, and an IIR filter.

In some embodiments, the calibration table is generated periodically during operation of the position sensor; in other embodiments, the calibration table is generated when the sensor is operating in a given operational regime. These may be considered offline, in that processing of the calibration table does not occur on the critical path of calculating a corrected position sensor output from the position sensor output. For example, offline may comprise two parallel paths: a real-time sensor correction path to create a corrected position sensor output, and an offline calibration generation path that calculates a calibration table, function, or similar mapping.

In some embodiments, the electric motor is a BLDC motor.

According to one aspect, a linear actuator comprises an electric motor connected to a linear translation device. The linear translation device translates a motion of the electric motor into linear motion between a top mount and a bottom mount (top and bottom are used for clarity, but the linear translation device can be mounted in any orientation and the invention is not limited in this regard). A motor position sensor detects a position of the motor. A controller is electrically connected to the electric motor such that the controller controls the electric motor. The electric motor is controlled at least partially as a function of the motor position sensor output, wherein the motor position sensor output is first processed to provide a more accurate position sensor signal.

The linear translation device may comprise a ball screw mechanism, such as with a thread pitch that allows for it to be backdriveable, connected to a motor such that rotation of the motor creates a linear translation between the two members of the ball screw (wherein each is connected to a top and a bottom mount, respectively).

The linear translation device may comprise a hydraulic actuator such as a housing containing a piston separating two volumes (a first volume and a second volume) and a piston rod attached to the piston. In such an embodiment, a hydraulic motor-pump may be operatively connected with a first port in fluid communication with the first volume, and a second port in fluid communication with the second volume. These may be straight connections or through one or more passive or electronically-controlled valves. In such an electro-hydraulic embodiment, the electric motor may be operatively coupled to the hydraulic motor-pump (either directly or via a mechanical gain linkage such as gears) such that movement of the electric motor creates a linear translation of the hydraulic actuator.

The linear translation device may comprise a linear electric motor, such as a device that contains coils on a stator and magnets on a piston rod, such that passing current through the coils may provide a force on the piston rod. The top mount or bottom mount may comprise a connection with either the stator or the piston rod.

In some embodiments the sensor may be close coupled to a working fluid such as hydraulic fluid in an actuator body (i.e. in the linear translation device housing). A magnetic sensor target such as a polarized magnet for a Hall effect sensor may be placed in the working fluid. This may also contribute to sensor errors. For example, fluid temperature may affect sensor accuracy which may be corrected. In addition, over the life of the actuator the sensor target flux may change. The position sensor error correction may adapt for such flux changes, which may be non-linear, over the life of the unit.

In some embodiments the electric motor being controlled at least partially as a function of the motor position sensor output comprises commutation of a BLDC motor using the motor position sensor. In another embodiment, the motor position sensor output may be corrected and then used as an input to a vehicle dynamics algorithm in an active and/or regenerative suspension system. For example, motor velocity may be a parameter that can be used in the vehicle dynamics algorithm, as it may be correlated directly (via a motion ratio) with translation of the linear translation device (between the top mount and the bottom mount). Such a system may be considered to operate in lockstep with the electric motor. Even hydraulic systems that may contain some leakage through valves and a hydraulic motor-pump should be considered in lockstep when configured in such a way.

For purposes of this aspect, the more accurate position sensor signal may be synonymous with a corrected position sensor output signal.

In some embodiments the processing to provide a more accurate position sensor signal may comprise using a calibration table or function to correct a position-correlated error. The calibration table or function may be generated by processing the motor position sensor output (raw output from the motor position sensor signal) at least periodically in an offline manner. A description of offline is given above. In some embodiments of this aspect and other aspects, the calibration table may adapt based on at least one other parameter such as a temperature reading, a motor velocity, a motor current, and an acceleration of the linear translation device.

In some embodiments the controller may comprise a motor controller such as a MOSFET or IGBT driven H-bridge or multi-phase bridge. In some embodiments this may further contain current sensors and/or voltage sensors. These sensors may be used to employ "sensorless" model-based techniques to estimate motor position and velocity, which may be used in some embodiments to improve overall corrected position sensor output to generate a filtered signal.

According one aspect, a sensor error correction system uses both a sensor mapping function that uses a calibration table to generate a corrected position sensor output from a position sensor output, and a position estimate using a model based "sensorless" motor position estimator (which may use current sensors and/or voltage measurements, either sensed or predicted based on control, for operation). Both the corrected position sensor output and the sensorless model estimate are fed into a filter to produce a filtered signal. This filter may be a Kalman Filter, combination filtering algorithm or similar. A parameter estimator portion of the filter may be used as feedback to adapt the model-based motor position estimator model. The parameter estimator portion of the filter may also be used as feedback to update parameters or calibration curve of the sensor mapping (i.e. using the calibration table).

Systems and techniques for improved position sensor accuracy may be combined with algorithms, methods, and systems for reducing ripple (pressure ripple and/or noise) in hydraulic systems. In such systems, an algorithm may operate to control motor torque as a function of rotary position in order to cancel a known ripple that is at least partially a function of rotational position of the pump. The use of an accurate rotary sensor allows the system to provide superior performance. Similarly, more accurate sensor readings may be used for algorithms, methods, and systems for reducing the effect of inertia in an actuator.

Although many embodiments are described with a position sensor such as a rotary motor position sensor, the invention is not limited in this regard and may function with any sensor detecting any parameter. In addition, some embodiments disclose use in suspension systems (fully active suspensions, semi-active suspensions, regenerative suspensions, etc.), however, the invention is not limited in this regard. Many of the techniques can be used in generalized hydraulic actuators for a number of applications, and the like.

Multi-Path Fluid Diverter Valve

Aspects of a multi-path fluid diverter valve relate to a device to improve high-speed control of a hydraulic damper and provide tunable high velocity passive damping coefficients, herein called a diverter valve (DV).

According to one aspect, a diverter valve is used with a regenerative active or semi-active damper. In order to provide active damping authority with reasonable sized electric motor/generator and hydraulic pump/motor, a high motion ratio is required between damper velocity and motor rotational velocity. Although this may allow for accurate control of the damper at low to medium damper velocities, this ratio can cause overly high motor speeds and unacceptably high damping forces at high velocity damper inputs. To avoid this, passive valving can be used in parallel and in series with a hydraulic active or semi-active damper valve. In some embodiments a diverter valve may be used to allow fluid to freely rotate a hydraulic pump/motor up to a predetermined rotational velocity and then approximately hold the hydraulic motor at that predetermined rotational velocity, even as fluid flow into the diverter valve increases. In some embodiments a diverter valve may be used to allow fluid to freely rotate a hydraulic pump/motor up to a predetermined flow velocity into the hydraulic motor and then approximately hold the fluid flow velocity into the hydraulic motor at that predetermined fluid flow velocity, even as fluid flow into the diverter valve increases. The terms fluid velocity and flow velocity in this disclosure shall also include volumetric flow rate, which includes the amount of fluid flowing per unit time, given a fluid flow velocity and passage area.

According to one aspect, a diverter valve for a damper contains an inlet, a first outlet port, and a second outlet port. The diverter valve may have two flow modes/stages. In a free flow mode, fluid is able to pass freely from the inlet to the first outlet port of the diverter valve. This first outlet port may be operatively coupled to a hydraulic pump or hydraulic motor in an active suspension system. In a diverted bypass flow stage, the free flow is reduced by at least partially closing the first outlet port and at least partially opening the second outlet port that can operate as a bypass. In an active damper, this diverted bypass flow stage may allow fluid to flow between the compression and rebound chambers thereby bypassing the hydraulic pump/motor. According to this aspect, the transition from free flow mode to diverted bypass flow stage is primarily or completely controlled by the flow velocity of fluid from the inlet to the first outlet port (in some embodiments there may be a secondary pressure dependence). That is, in certain embodiments flow is diverted based on a measure of fluid velocity flowing toward the diverter valve independent of a measure of pressure of the fluid proximal (e.g. static pressure outside the diverter valve) to the diverter valve. In some embodiments an additional damping valve such as a digressive flexible disk stack is in fluid communication with the second outlet port such that fluid flowing through the second outlet port is then restricted before flowing into the compression or rebound chamber.

According to another aspect, a diverter valve for a damper comprises of a first port acting as a fluid flow inlet, a second port acting as a first outlet, and a third port acting as a second outlet. According to this aspect, a moveable sealing element (such as a valve), such as a sealing disk or spool valve moves through at least two positions. In a first position the sealing element provides fluid communication between the first port and the second port, and in a second position the sealing element provides fluid communication between the first port and the third port. During rest, a force element (such as a spring) pushes the moveable sealing element into the first position. In many cases it is desirable to apply a preload to the spring so that the moveable sealing element activates at a predetermined pressure drop generated by a predetermined flow velocity (or volumetric flow rate). A fluid restriction such as a small orifice is placed between the first port (high pressure) and the second port (low pressure) such that there is a pressure drop from the first port to the second port. The moveable sealing element may move in an axial direction and it contains a first side and an opposite second side that are perpendicular to the direction of travel (e.g. pushing on the first side will move the moveable sealing element into the second position, and pushing on the second side will move the moveable sealing element into the first position). The moveable sealing element may be configured such that the higher pressure first port is in fluid communication with the first side of the moveable sealing element, and the lower pressure second port is in fluid communication with the second side of the moveable sealing element. Since the pressure drop from the first port to the second port is a function of the fluid velocity through the diverter valve (such as through the moveable sealing element during the first mode), and with the areas exposed to fluid pressure of the first side and the second side being equal or roughly equal, the net force acting on the moveable sealing element is a function of fluid velocity through the valve which causes a pressure differential on the first and second sides of the moveable sealing element. By selecting a corresponding counteracting force element (such as a spring force), the valve may be tuned to switch modes at a particular fluid flow velocity (or volumetric flow rate). Depending on the accuracy of the selected counteracting force, precision of the particular fluid flow at which the valve switches may be established. As such, the valve may move into the second position when the pressure differential from the first side to the second side (the net pressure acting on the first side) of the moveable sealing element exceeds a first threshold. Furthermore, in some embodiments when the net pressure acting on the first side of the moveable sealing element drops below a second threshold, the moveable sealing element moves into a first mode. In many cases it may be desirable for the second threshold to be below the first threshold for reasons such as creating a hysteresis band to reduce valve oscillations. In some embodiments it is desirable to not completely cut off flow to the second port when the moveable sealing element moves to the second position. For these embodiments, while the diverter valve is in this second position some fluid is allowed to pass restricted from the first port to the second port. According to some aspects this diverter valve is used in a damper containing a hydraulic motor, wherein one port of the hydraulic motor is connected to the second port of the diverter valve, with the third port bypassing the hydraulic motor to the opposite port of the hydraulic motor. In such situations, it is sometimes desirable to keep the hydraulic motor spinning when the moveable sealing element is in the second position, which may be provided from a small restricted fluid path from the first port to the second port even while the moveable sealing element is in the second position bypassing the hydraulic motor. According to another aspect, the moveable sealing element may pass through more than two discrete states, such as a linear regime where both the first position and the second position are partially activated, allowing partial fluid flow from the first port to both the second port and the third port generally proportional to the moveable sealing element's position. There are several embodiments of a diverter valve, and these may use several different types of moveable sealing elements including but not limited to sprung discs/washers, spool valves, poppet valves, and the like.

According to another aspect a diverter valve uses a moveable disc. A first (inlet) port and a second and third (outlet) outlet ports communicate fluid with the valve. The moveable disc has a first face and a second face and sits within a manifold. The manifold is configured such that fluid from the first port (the inlet) is allowed to communicate with the first face of the moveable disc such that a pressure in the first port acts on the first face of the disc. The diverter valve moves through at least two modes of operation: a first mode and a second mode. In the first mode, the valve is in a free flow mode such that fluid is allowed to communicate from the first (inlet) port through a first restrictive orifice at least partially created by the second face of the disc, and to the second (outlet) port. The restrictive orifice creates a pressure drop such that pressure on the second face is less than the pressure on the first face when fluid is flowing through the first restrictive orifice. A spring, optionally preloaded, creates a counteracting force holding the disc in the first mode unless the pressure differential from sufficient fluid flow velocity is attained to actuate the disc into the second mode. In the second mode, the disc at least partially seals the fluid path from the first port to the second port, and opens a fluid path from the first port to the third port. In some embodiments an additional second fluid restriction path exists between the first port and the second port to allow restricted fluid communication in both the first and the second modes. In some embodiments only part of the second face acts as an orifice or sealing land, with the rest of the second face area open to the pressure of the second port.

According to another aspect a diverter valve uses a radially-sealed spool valve as the moveable sealing element in a manifold. The valve comprises at least three ports: a first port, a second port, and a third port. A spool valve moves through at least two modes and contains an orifice through its axis and an annular area on the top and bottom. The orifice contains a first region comprising a first fluid restriction such as an hourglass taper in the bore, and may contain a second region with radial openings such as slotted cutouts that communicate fluid from the orifice to the outside diameter of the spool in a restricted fashion (the second restriction). This second restriction may be implemented in a number of different ways and is not limited to notches in the spool valve. For example, it may be implemented with passages or notches in the manifold. The functional purpose of this optional feature is to communicate fluid from the first port to the second port in a restricted manner in either the first or second mode. During the first mode, fluid may escape through the orifice and through an annular gap about the valve into the second port (a large opening). The spool valve has an outside diameter (OD) in which at least a portion of the OD surface area acts as a sealing land. This sealing land may be perpendicular to the axis of travel of the spool, that is, if the spool moves about the z-axis, the sealing land is on a circumference in the xy plane. In some embodiments such a sealing configuration prevents fluid from flowing in the z direction. The sealing land on the OD of the spool valve substantially creates a seal that blocks flow from the first port to the third port when in the first mode. A force element such as a spring biases the spool valve into the first mode. When in the first mode, fluid may flow through the spool valve orifice, being constricted by the first restriction, and then discharges into the second port through a large opening. When fluid flow velocity through the first restriction exceeds a threshold, the pressure differential between the first port acting on the annular area of one side of the spool valve, and the second port acting on the opposite annular area side of the spool valve, creates a net force greater than the force element and moves the spool into, or toward, the second mode. When in the second mode, the radial sealing land may open, allowing fluid flow from the first port to the third port. Additionally, during the second mode, restricted fluid may flow through the second restriction from the first port to the second port. By sealing radially and setting both annular areas to be roughly equal, the valve will switch from the first mode to the second mode solely based on fluid flow (not ambient system pressure). In this embodiment, the seal creates a pressure gradient during the first mode from the first port to the third port, wherein the pressure gradient acts perpendicular to the direction of valve travel.

According to another aspect, an active damper is comprised of separate rebound and compression diverter valves in order to limit high-speed operation of a coupled hydraulic pump. These diverter valves may be constructed using a number of different embodiments such as with a face sealing disc, a radially sealing spool valve, or other embodiments that provide diverter valve functionality. The active damper may contain one or two diverter valves, and these may be the same or different physical embodiments. Further, diverter valves can be used in monotube, twin-tube, or triple-tube damper bodies that have either mono-directional or bidirectional fluid flow. In some embodiments the hydraulic pump is in lockstep with the damper movement such that at least one of compression or rebound movement of the damper results in movement of the hydraulic pump. In some embodiments, the hydraulic pump is further coupled to an electric motor. The hydraulic pump and electric motor may be rigidly mounted on the damper, or remote and communicate via devices such as fluid hoses. The diverter valve may be integrated into the damper across a variety of locations such as in the active valve, in the base assembly, in the piston rod seal assembly, or in the piston head. In some configurations the damper may be piston rod up or piston rod down when installed in a vehicle. The damper may further comprise a floating piston disposed in the damper assembly. In some embodiments the floating piston is between the compression diverter and the bottom mount of the damper assembly.

According to another aspect, a method in an active suspension for transitioning from a free flow mode where fluid flows into a hydraulic motor or pump, to a diverted bypass flow mode where fluid is allowed to at least partially bypass the hydraulic motor or pump, is disclosed. A sealing element moves to switch from the free flow mode to the diverted bypass flow mode. In some embodiments the diverted bypass flow mode contains an additional flow path where some fluid still flows into the hydraulic motor or pump. In some embodiments this transition is controlled by fluid flow velocity. However, the multi-path fluid diverter valve methods and systems described herein are not limited in this regard and may be controlled by other parameters such as a hybrid of fluid flow velocity and pressure, digitally using external electronics, or otherwise.

According to another aspect, a method comprising controlling a rotational velocity of a hydraulic motor by diverting fluid driving the motor with a passive diverter valve between the motor and at least one of a compression and a rebound chamber of an active suspension damper based on a measure of fluid velocity flowing toward the diverter valve independent of a measure of pressure of the fluid proximal to the diverter valve.

Aspects of the multi-path fluid diverter valve methods and systems described herein are may be beneficially coupled with a number of features, especially passive valving techniques such as piston-head blowoff valves, flow control check valves, and progressive or digressive valving. Many of the aspects and embodiments discussed may benefit from controlled valving such as flexible or multi-stage valve stacks further restricting fluid exiting the bypass port (herein referred to as the third port).

A diverter valve for use in improving high-speed control of a hydraulic regenerative active or semi active suspension system that uses an electric motor to regulate hydraulic motor RPM, such as described herein may be combined with progressive valving (e.g. multi-stage valving) with or without flexible discs; a fluid diverter, such as a rebound or compression diverter or blow-off valve; a baffle plate for defining a quieting duct for reducing noise related to fluid flow, and the like; flexible disks; electronic solenoid valves; and the like. In an example, a diverter valve may be configured as depicted at least in FIGS. 1-18.

The active/semi-active suspension system described throughout this disclosure may be combined with amplitude dependent passive damping valving to effect diverter valve functionality, such as a volume variable chamber that varies in volume independently of a direction of motion of a damper piston. In an example, diverter valve functionality may be configured as a chamber into which fluid can flow through a separating element that separates the variable volume chamber from a primary fluid chamber of the damper. The variable volume chamber further includes a restoring spring for delivering an amplitude-dependent damping force adjustment, which facilitates changing the volume of the variable volume chamber independently of the direction of movement of a piston of the suspension system.

The methods and techniques of diverter valving may be beneficially combined with various damper tube technologies including: dual and triple-tube configurations, McPherson strut; deaeration device for removing air that may be introduced during filling or otherwise without requiring a dedicated air collection region inside the vibration damper; high pressure seals for a damper piston rod/piston head; a low cost low inertia floating piston tube (e.g. monotube); and the like.

The methods and techniques of diverter valving may be beneficially combined with various accumulator technologies, including: a floating piston internal accumulator that may be constrained to operate between a compression diverter or throttle valve and a damper body bottom; an externally connected accumulator; accumulator placement factors; fluid paths; and the like.

The methods and techniques of diverter valving may be beneficially combined with various aspects of integration technology including: strut mounting; inverted damper configurations; telescoping hydraulic damper that includes a piston rod axially moveable in a pressure tube which is axially moveable in an intermediate tube; air spring configurations, McPherson strut configurations and damper bodies, self-pumping ride height adjustment configurations, thermally isolating control electronics that are mounted on a damper body to facilitate operating the control electronics as an ambient temperature that is lower than the damper body; airstream mounting of electronics; mounting smart valve (e.g. controller, hydraulic motor, and the like) components on a shock absorber; flexible cable with optional modular connectors for connecting a smart valve on a standard configuration or inverted damper to a vehicle wiring harness; direct wiring of power electronics from externally mounted power switches to an electric motor in the smart valve housing; directly wiring power electronics within the smart valve housing from internally mounted power switches disposed in air to an electric motor/generator disposed in fluid; fastening a smart valve assembly to a damper assembly via bolted connection; and the like.

An active suspension system, such as the system described herein that incorporates electric motor control of a hydraulic pump/motor, may benefit from a diverter valve that may act as a safety or durability feature while providing desirable ride quality during high speed damper events. While an active suspension system may be configured to handle a wide range of wheel events, pressure buildup of hydraulic fluid may exceed a threshold beyond which components of the suspension system may fail or become damaged. Therefore, passive valving, such as a diverter valve or a blow-off valve, and the like may be configured into the hydraulic fluid flow tubes of the suspension system.

The methods and techniques of diverter valving may be combined with valving techniques and technologies including progressive valving, disk stacks (e.g. piston head valve stacks), amplitude-specific passive damping valve, proportional solenoid valving, adjustable pressure control valve limits, curve shaping, and the like in an active/semi-active suspension system to provide benefits, such as mitigating the effect of inertia, noise reduction, rounding off of damping force curves, gerotor bypass, improved blowoff valve operation, and the like.

In active vehicle suspension systems comprising passive valving schematically placed in parallel or in series with a hydraulic pump/motor, it may be desirable to use a common valve that limits the maximum speed at which the hydraulic pump/motor rotates, regardless of hydraulic flow rate, while it simultaneously limits and/or controls the damping force at high hydraulic flow rates during high speed suspension events.

The present multi-path fluid diverter valve methods and systems described herein are not limited to vehicle dampers. According to another aspect, a diverter valve is used in a generic hydraulic system with a back-drivable fluid motor or pump. In such a system, the diverter valve protects the hydraulic motor or pump from rotating faster than specified when an external input on the system would otherwise cause the motor or pump to be back-driven too rapidly.

Gerotor

Aspects of a wide band hydraulic ripple noise buffer relate to a device that attenuates ripple in hydraulic systems over a broad range of frequencies and magnitudes, with minimal efficiency penalty, herein referred to as a ripple buffer. This device may directly couple the method of attenuation to the origin or source of ripple. The source of ripple may be a function of the pump/motor shaft position. According to one aspect, the ripple buffer is operatively controlled as a function of pump/motor shaft position, thereby allowing the frequency-variant source to present the ripple to the buffer at ripple frequency. In normal applications the ripple frequency may be anywhere from 0 Hz to upwards of 2,500 Hz. This buffer may accept and release flow in positions or orientations that correspond to rising system pressure and falling system pressure respectively, accepting a flow volume when the system output flow is above its nominal value, storing this volume, and then re-injecting this flow volume back into the system output flow when the system output flow is below its nominal value, thereby substantially reducing the output flow ripple. This attenuator may independently adjust its operating pressure to be similar to that of the nominal hydraulic unit operating pressure so as to offer effective ripple attenuation over the normal operating pressure range of the hydraulic unit with minimal to no pressure dependence. In addition, a dead band may be configured such that the buffer accepts flow volume when system output flow is above some nominal value plus a first delta, and injects the flow volume when system output flow is below some nominal value minus a second delta.

According to one aspect, the buffer is coupled to a frequency-variant positive displacement source that is a gerotor pump/motor. Typically, when presented with flow the gerotor creates an inlet pressure ripple at a frequency equal to the inner rotor rotational frequency multiplied by the number of lobes on the inner rotor. In each lobe cycle there may exist an orientation of maximum flow capacity and an orientation of minimum flow capacity, whereby, these orientations correspond to orientations of minimum pressure and maximum pressure respectively. There exists a wide range of achievable pressure-flow operating points (with the unit functioning as a pump in both directions and functioning as a motor in both directions). The knowledge of these orientations can be discovered using computational fluid dynamics by monitoring the inlet port pressure throughout time. The buffer may be directly coupled to the inlet port of the gerotor such that the buffer inlet and outlets (one or more communication ports) are exposed to the gerotor port and concealed from the gerotor port by the position of the lobes of the gerotor itself. One method to accomplish this is to have communication ports in the gerotor manifold. At certain positions an individual lobe will be directly in line with at least one buffer port such that the lobe effectively seals the buffer port from the main gerotor port. At other positions an individual lobe will be oriented such that at least one buffer communication port is directly exposed to, and in fluid communication with, the main gerotor port with no sealing by the lobe. The buffer communication ports can selectively communicate fluid to a buffer chamber containing a volume of compressible medium, which generally compresses to accept flow when being pressurized, and expands to release flow when depressurizing.

According to one aspect a buffer comprises at least one communication port to the main gerotor port, each of which may act as either a gerotor inlet port or outlet port depending on the operating regime of the hydraulic system. The inner element, the outer element or both elements may at certain angular orientations effectively seal at least one of the buffer communication ports from the main gerotor port by presenting its rotating planar face to the inlet of that buffer port. In this orientation the only fluid communication that can exist between the main gerotor port and the said buffer communication port is by way of the axial leakage gap that exists between the gerotor lobe and the buffer communication port surface. This is considered to be very small (normally in the range of 0.0005"-0.00075") when compared to the area of the buffer communication port itself, and therefore the buffer communication port is effectively hydraulically sealed from the main gerotor port. Furthermore, design of the shape and location of such communication ports will yield progressive damping as the restriction opens and closes, which may be tuned for optimal operating characteristics.

According to another aspect a buffer comprises at least one communication port to the main gerotor port. Flow passages or notches may be incorporated as features in either of the gerotor elements to aid in the filling and evacuation of the buffer chamber via the buffer communication ports. As in the above paragraph, the lobe faces may act as a seal to the buffer communication ports at certain angular orientations, at other angular orientations the fluid passages in the rotor elements may create a fluid circuit from the main gerotor port through the rotor element and into the buffer communication port or visa-versa. The shape, size and position of these notches can be used to dictate the optimal angular timing of communication between the main gerotor port and at least one buffer communication port.

According to one aspect a buffer is coupled to the port of a gerotor and contains a compressible medium that is comprised of a gas such as air contained by a sealable barrier (collectively referred to as a diaphragm), which may be accomplished with a multitude of devices such as a floating piston, compliant bladder, folding bellow, etc. The buffer comprises at least one communication port to the main gerotor port, each of which may act as either an inlet port or an outlet port depending on the operating regime of the hydraulic system. Rising pressure of the source causes rising pressure force on the diaphragm, which then exerts a force on the gas volume causing it to compress and rise in pressure. Decreasing pressure of the source causes the higher gas pressure to force the diaphragm in the direction of the source such that fluid flows from the buffer volume back into the source volume causing its pressure to rise.

According to another aspect a buffer uses as its compressible medium a compliant material such as rubber that encloses a gas volume that is nominally at atmospheric pressure. The buffer comprises at least one port that is in communication with the main gerotor port, each of which may act as either an inlet port or an outlet port depending on the operating regime of the hydraulic system. With rising pressure, the compliant material can deform to compress the gas volume thereby causing a certain amount of hydraulic fluid to flow into the buffer chamber. Under decreasing pressure this compliant material can relax allowing the gas volume to expand and hydraulic fluid to be expelled from the buffer chamber.

According to another aspect a buffer uses as its compressible medium a compliant material such as rubber that encloses a gas volume that is nominally at a pressure greater than atmospheric pressure. The nominal gas pressure or gas “pre-charge” pressure allows for tuning of the volumetric compression per unit of increasing pressure or the “volumetric spring rate”. The buffer comprises at least one port that is in communication with the main gerotor port, each of which may act as either an inlet port or an outlet port depending on the operating regime of the hydraulic system. The compliant material may be pre-charged and bound on at least one side by a surface such that its initial volume is predetermined and its nominal pressure is higher than the nominal hydraulic system pressure. This bounding will ensure that the compliant material does not begin to deform under compression inward away from its bounding surface until a certain hydraulic system pressure is achieved. This is a similar notion to the mechanical preloading of a spring to achieve threshold force behavior.

According to another aspect a buffer uses as its compressible medium a mechanical spring or other deformable solid that supports a piston subjected to the source pressure. The side of the piston supported by the mechanical spring may be subjected to the low pressure side of the unit, to gas, or to atmosphere. The buffer comprises at least one port that is in communication with the main gerotor port, each of which may act as either an inlet port or an outlet port depending on the operating regime of the hydraulic system. Movement of the piston that acts to compress the spring may result in expansion of the high pressure buffer cavity and compression the low pressure cavity thereby shuttling fluid out of the low pressure cavity. The spring may have some mechanical preload to a predetermined force.

According to another aspect, both sides of the piston described in the above paragraph may be subjected to the high pressure side of the unit with different areas of exposure.

According to another aspect, there may be a plurality of buffer chambers each of which comprises at least one port that is in communication with the main gerotor port, each of which may act as either an inlet port or an outlet port depending on the operating regime of the hydraulic system. The communication ports to the main gerotor port may be commonly shared between each of the plurality of buffer chambers such that each port acts as either the inlet to the entire buffer system or the outlet of the entire buffer system. In some arrangements the inlet and outlet ports are the same port. The arrangement of each buffer chamber and the quantity of such chambers may be determined by mechanical packaging constraints. Each buffer may use any compliant medium as described above to achieve the necessary volumetric compliance.

According to another aspect a buffer system is comprised of a plurality of buffers as described above. In each instance, each individual buffer comprises at least one port that is in communication with the main gerotor port, each of which may act as either an inlet port or an outlet port depending on the operating regime of the hydraulic system. Each buffer may use any compliant medium as described above to achieve the necessary volumetric compliance.

According to another aspect, a ripple attenuation device for positive displacement hydraulic pumps/motors contains at least one buffer chamber. The buffer chamber has some level of compliance such that the fluid volume can change. This may be accomplished in a variety of ways, for example, through the use of compliant materials (gas bags, rubber membranes sealing a gas volume, floating pistons, actuated pistons, piezo flexures impermeable to fluid, metal, plastic, or rubber bellows, etc. The ripple attenuation device may be used to mitigate ripple in a hydraulic system (a ripple fluid region). For example, it may attenuate ripple caused from a positive displacement hydraulic pump/motor. In the ripple fluid region of a hydraulic system, there exists a steady state pressure, which may result from pump velocity, pressure, valving, and other devices in the fluid system. On top of this steady state pressure is an additive ripple pressure, which is a fluctuating wave that oscillates to make the total system pressure greater than the steady state pressure at the peak of the ripple wave, and less than the steady state pressure at the trough of the ripple wave. While called "steady state pressure," it should be understood that this ambient system pressure may fluctuate, even rapidly, due to control inputs such as changing pump/motor speed, opening and closing valves, and other parameters in the hydraulic system that cause overall system pressure to change. One or more fluid communication ports between the ripple fluid region and the buffer chamber provide fluid flow to and from the buffer chamber. These ports may contain control valves to dampen and/or completely close fluid flow to and from the buffer chamber at specific periods of each pressure ripple wave. According to this aspect, ports control fluid flow such that fluid exits the buffer and enters the ripple fluid region when pressure in the ripple fluid region is less than the steady state pressure, and fluid enters the buffer and exits the ripple fluid region when the pressure in the ripple fluid region is more than the steady state pressure. For example, in a positive displacement rotary hydraulic motor, the ripple waves are a function of the rotating pump position, and appropriately located ports within the pump can time fluid flow to flow into and out of the buffer at different points in the ripple wave.

It is recognized that several of the aspects of this invention may be used to mitigate the ripple from positive displacement hydraulic pump/motors, although the invention is not limited in this regard. Such pumps may include gerotors, external gear pumps, vane pumps, piston pumps, scroll pumps, etc. Buffer chambers may be sized for a variety of characteristics, but often it is desirable to accommodate enough fluid to accept the ripple volume, which is the volume of fluid which, when removed from the system at the buffer, substantially eliminates the pressure ripple. Depending on the system and ripple, this may be the amount of fluid volume required in the ripple fluid region to bring the pressure from the steady state pressure to the steady state pressure plus the peak of the ripple pressure wave. Oftentimes this is sized for a worst-case average scenario in terms of ripple pressure waves. In some systems the ripple volume may be the maximum fluid volume in a hydraulic pump/motor exposed to the variable pressure side of the pump/motor (the side without a large accumulator), minus the minimum fluid volume in the pump/motor exposed to the variable pressure side.

The coupled hydraulic system may have multiple frequencies of ripple, integer harmonics of dominant ripple frequencies or ripple at multiple equal frequencies that are out of phase with one another. Several embodiments describe systems design to cancel the first harmonic, or dominant ripple frequency, but the invention is not limited in this regard and similar methods can be used to cancel higher order harmonics as well.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 89 shows a table of example values for cost and benefit calculations, and an example performance factor that governs control force application in response to the events.

FIG. 117 shows a schematic of a more complete scheme for using corrected encoder data and sensor estimation to adapt encoder mapping and system model parameters FIG. 118 shows a schematic layout of how the method is used in the context of low-latency correction and asynchronous mapping updates.

FIG. 119 shows a possible embodiment of the notch filter used to remove

FIG. 120A is a spool type diverter valve (DV) assembly in an exploded view to show its main components—the spool, spool spring, blow off valve (BOV) spring stack, manifold plate and the valve support.

FIG. 120B is a spool type DV assembly in an assembled view to show its main components: the spool, spool spring, BOV spring stack, manifold plate the valve support, the BOV cavity and the Spring Cavity.

FIG. 121 depicts an active damper with a DV assembly in the compression chamber that is used to limit the speed of the of the hydraulic pump/motor and electric generator at high damper compression velocities; wherein the diverter valve comprises of a spool type valve that uses the spool outer diameter to seal between the compression chamber and the blow off valve (BOV) cavity.

FIG. 122 depicts a spool type DV located in the compression chamber of an active damper in the closed (un-activated) position—such that fluid flow is blocked from the compression chamber to the BOV chamber.

FIG. 123 depicts a spool type DV located in the compression chamber of an active damper in the open (activated) position—such that fluid can flow from the compression chamber to the BOV chamber by-passing the active valve hydraulic pump/motor.

FIG. 124 depicts the spool valve to show the flow notches in its outer diameter that allow flow across the diverter valve to the BOV cavity when the valve is activated.

FIGS. 125A-125F depict a moveable disk type DV with multi-stage activation.

FIGS. 126A-126F depict a moveable disk type DV with flexible disc based progressive damping during DV actuation.

FIG. 127 depicts a Triple-tube active damper with internal accumulator and DV.

FIG. 128 is a generic schematic description of a spool type diverter valve embodiment as depicted in FIG. 120A.

Figure 129:
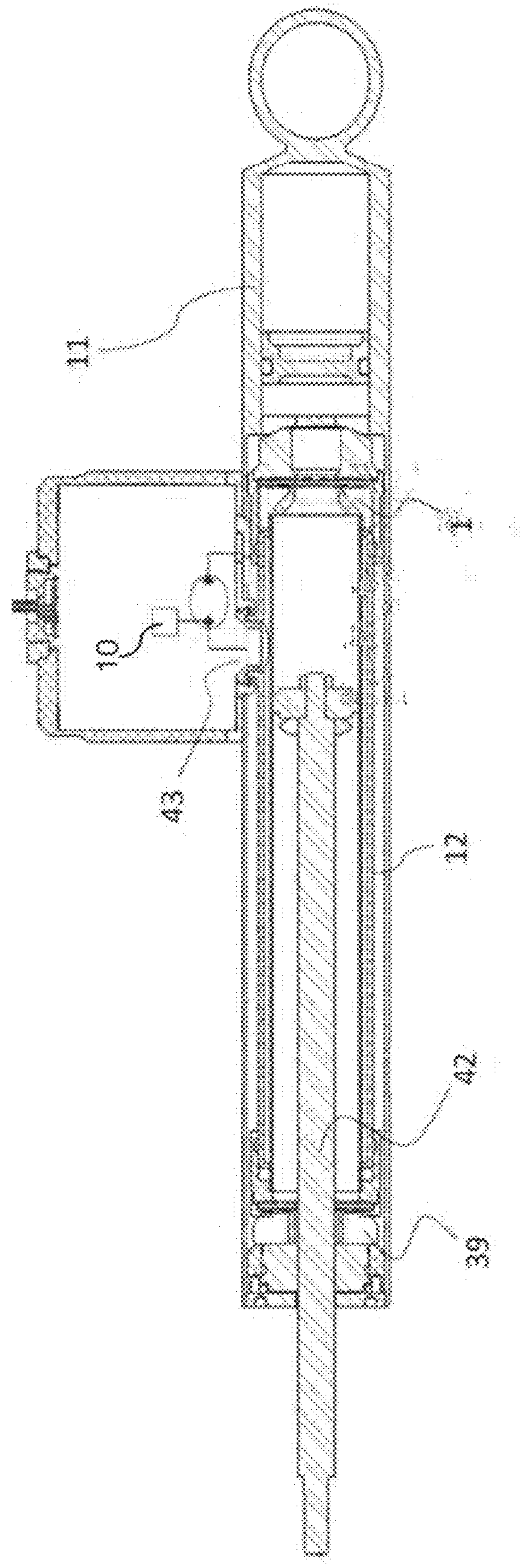

FIG. 129 is an embodiment of a regenerative active/semi active damper that comprises a hydraulic regenerative, active/semi active damper valve in a monotube damper architecture with a passive diverter valve placed in the compression and rebound chamber.

Figure 130:
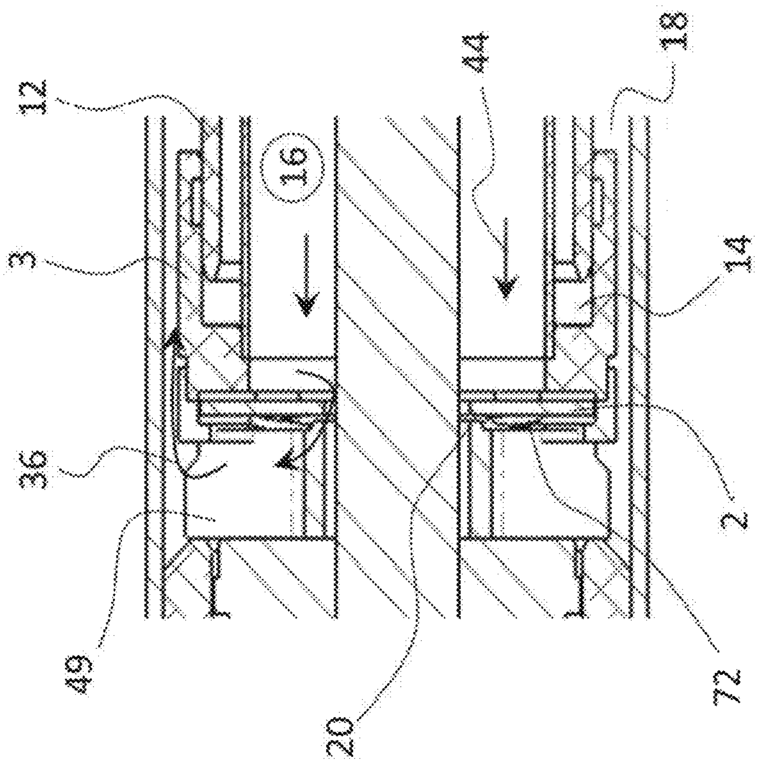

FIG. 130 is an embodiment of a diverter valve mounted in the rebound chamber of a regenerative active/semi active damper. The diverter valve is shown in cross section and in the 'un-activated' state, to show that there is free flow from the rebound chamber to the active/semi active damper valve.

Figure 131:
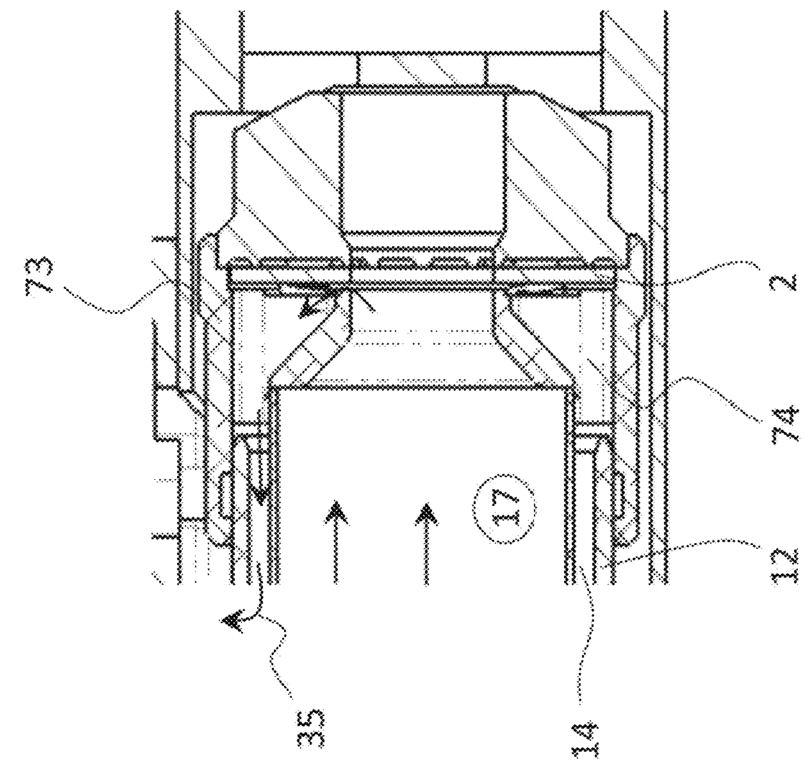

FIG. 131 is an embodiment of a diverter valve mounted in the compression chamber of a regenerative active/semi active damper. The diverter valve is shown in cross section and in the 'un-activated' state, to show that there is free flow from the compression chamber to the active/semi active damper valve.

Figure 132:
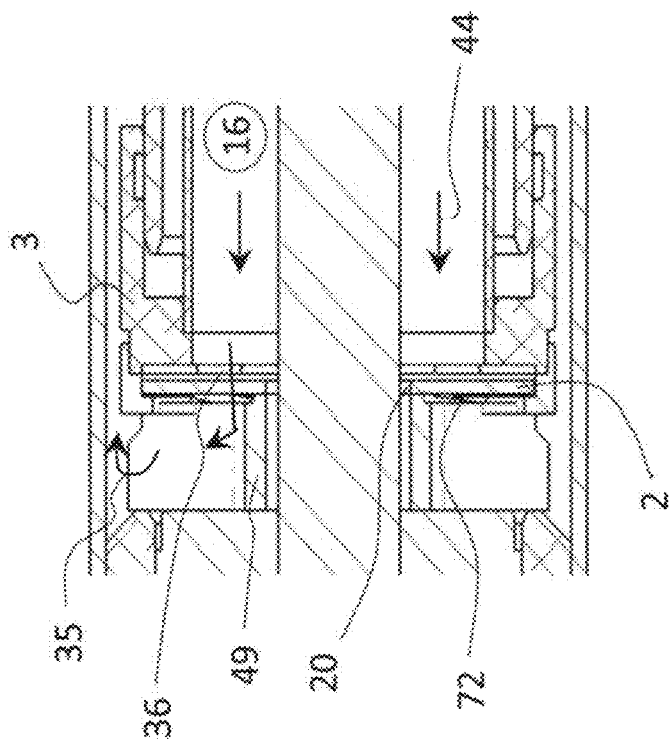

FIG. 132 is an embodiment of a diverter valve mounted in the rebound chamber of a regenerative active/semi active damper. The diverter valve is shown in cross section and in the 'activated' state, to show that there is restricted flow from the rebound chamber to the active/semi active damper valve.

Figure 133:
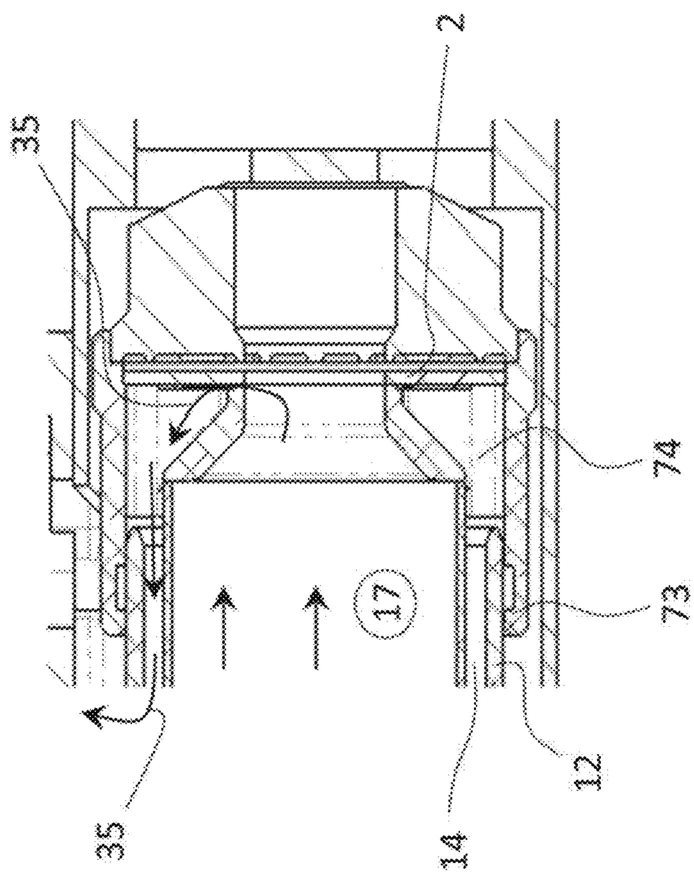

FIG. 133 is an embodiment of a diverter valve mounted in the compression chamber of a regenerative active/semi active damper. The diverter valve is shown in cross section and in the 'activated' state, to show that there is restricted flow from the compression chamber to the active/semi active damper valve.

Figure 134:
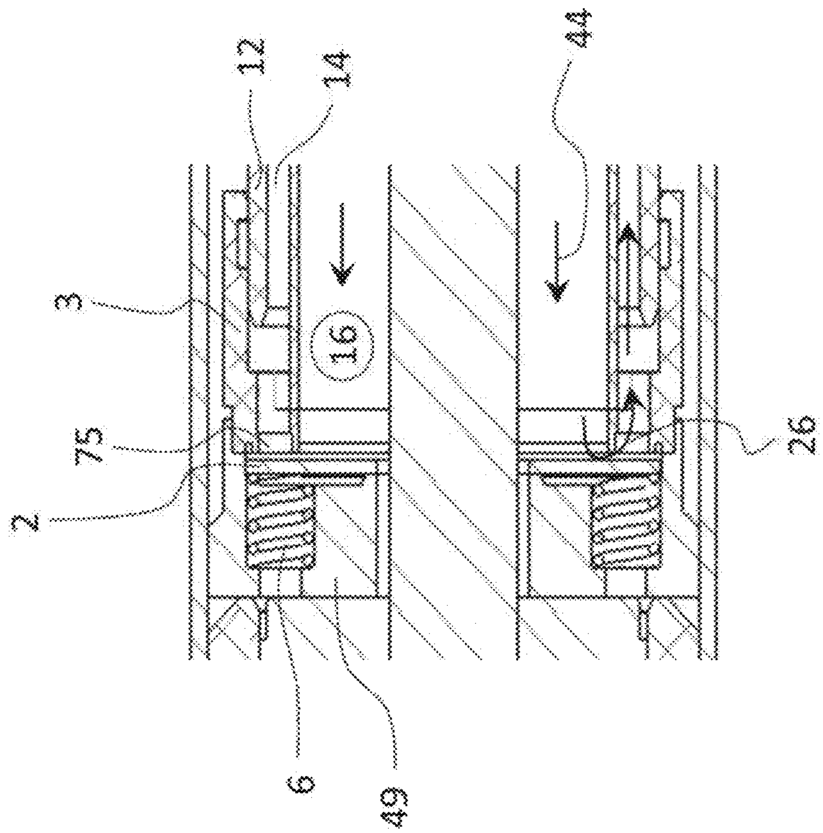

FIG. 134 is an embodiment of a diverter valve mounted in the rebound chamber of a regenerative active/semi active damper. The diverter valve is shown in cross section and in the 'activated' state, to show the by-pass flow from the rebound chamber to the compression chamber.

Figure 135:
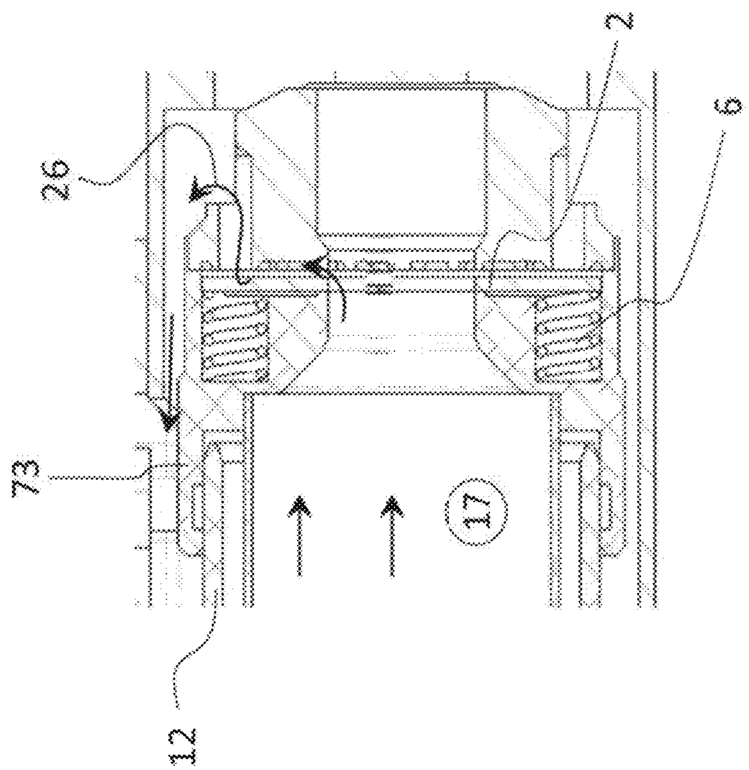

FIG. 135 is an embodiment of a diverter valve mounted in the compression chamber of a regenerative active/semi active damper. The diverter valve is shown in cross section and in the 'activated' state, to show the by-pass flow from the compression chamber to the rebound chamber.

Figure 136:
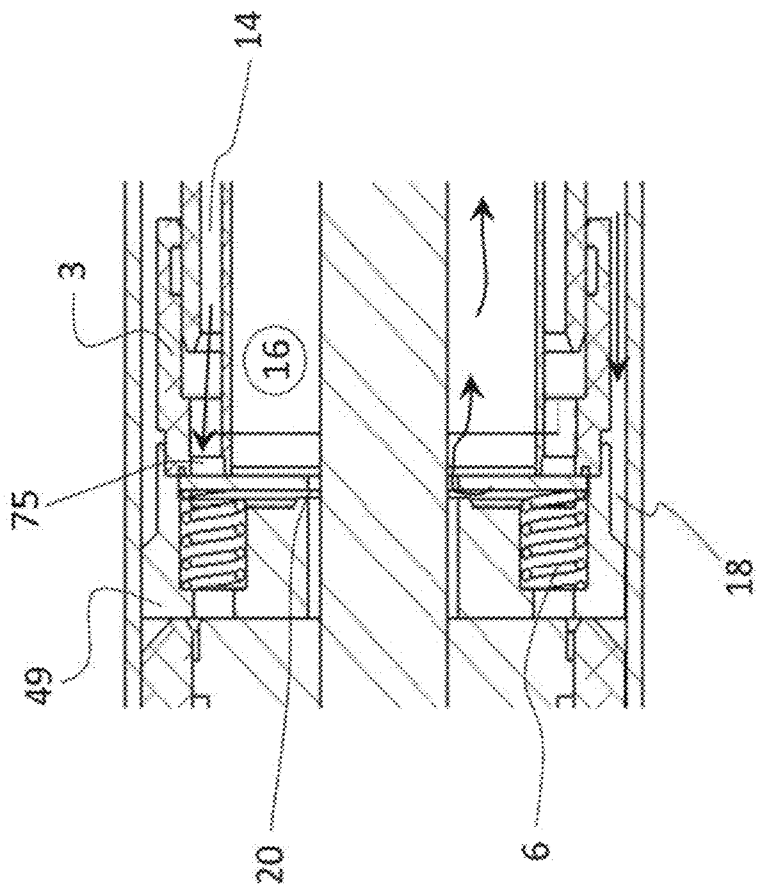

FIG. 136 is an embodiment of a diverter valve mounted in the rebound chamber of a regenerative active/semi active damper. The diverter valve is shown in cross section and in the 'un-activated' state, to show that by-pass flow from the rebound chamber to the compression chamber is blocked.

Figure 137:
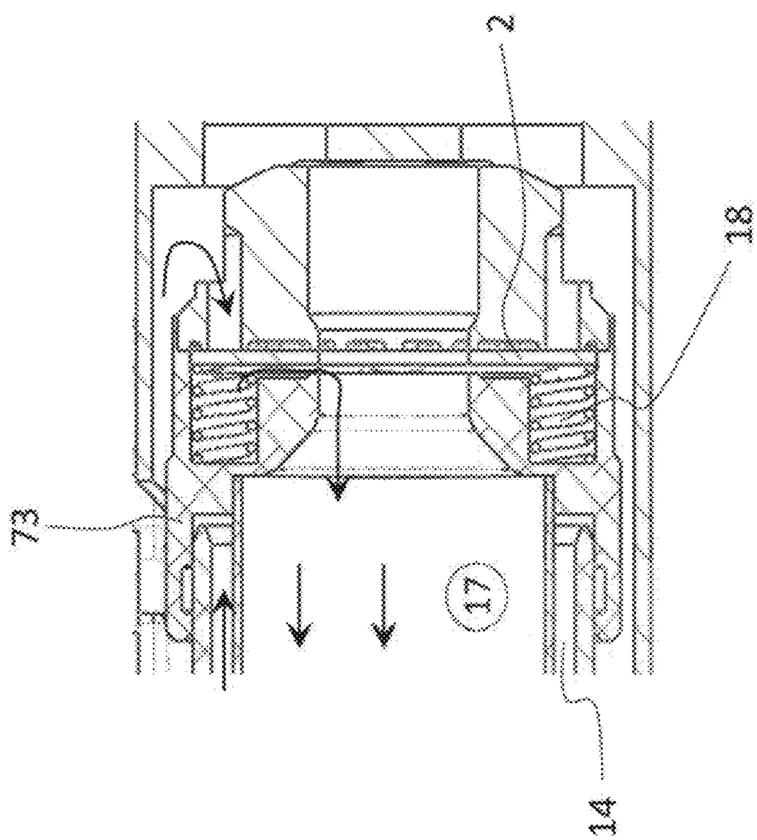

FIG. 137 is an embodiment of a diverter valve mounted in the compression chamber of a regenerative active/semi active damper. The diverter valve is shown in cross section and in the 'un-activated' state, to show that by-pass flow from the compression chamber to the rebound chamber is blocked.

Figure 138:
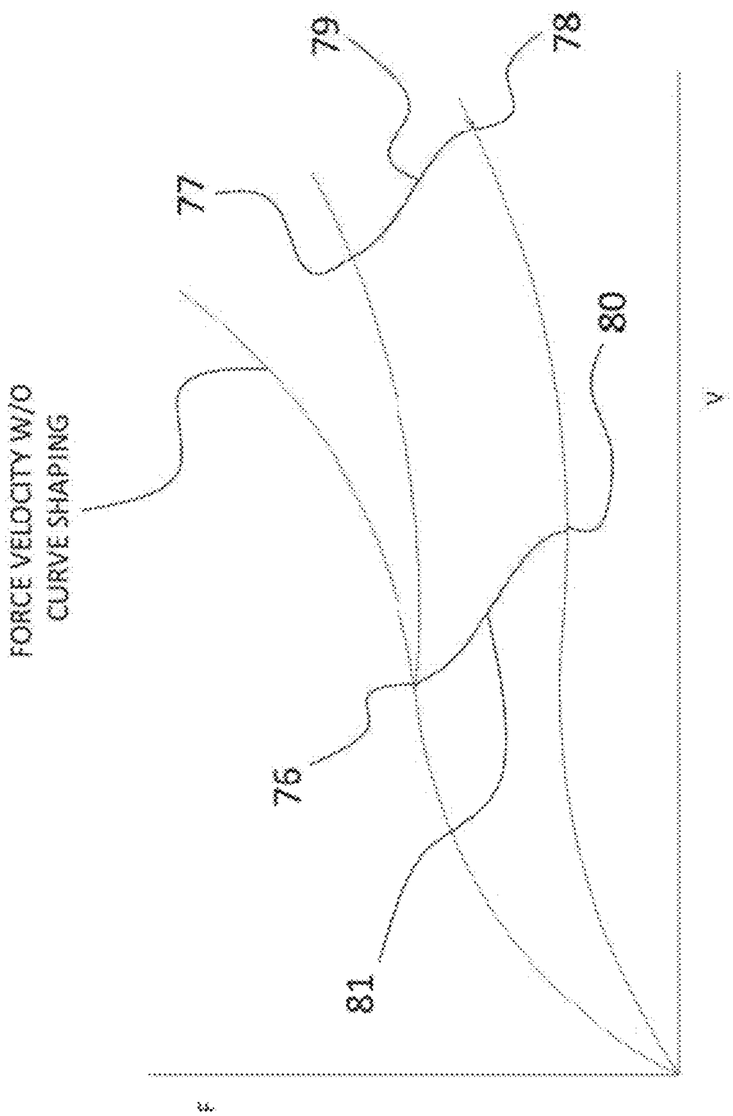

FIG. 138 is a curve of force/velocity of a regenerative active/semi active damper with passive diverter valve curve shaping.

Figure 139C:
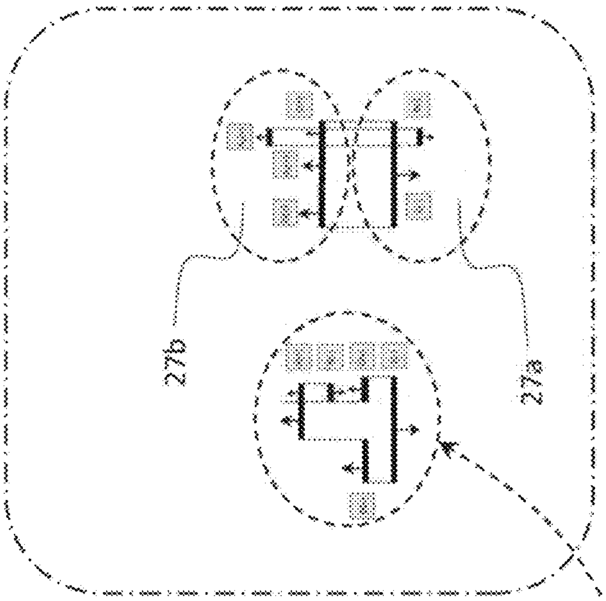
Figure 139A:
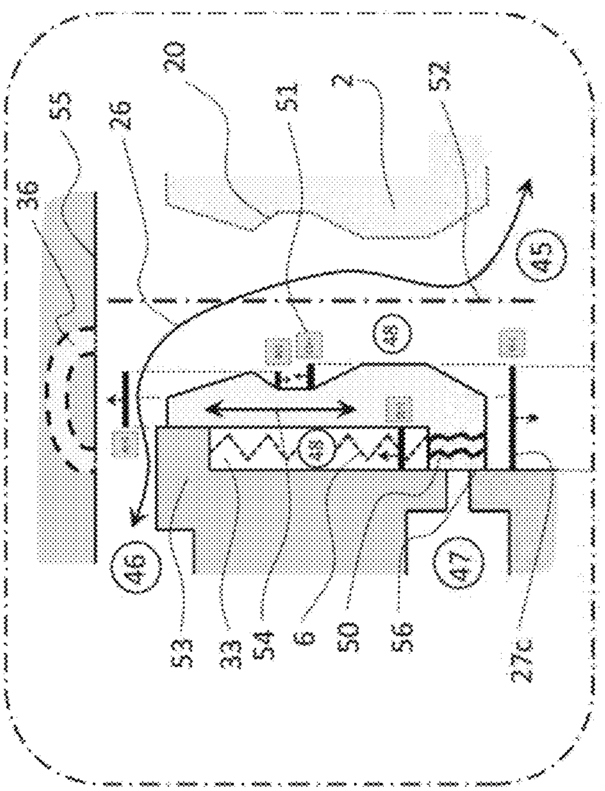

FIG. 139A is a schematic of a spool type diverter valve (DV) that depicts the projected fluid pressure areas of the movable sealing element onto a plane perpendicular to the direction of travel.

Figure 139B:
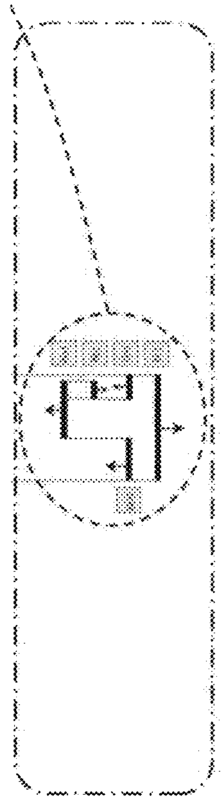

FIG. 139B is a schematic of the stack-up of effective pressure areas of a spool type diverter valve (DV).

FIG. 139C is a schematic of the stack-up of effective pressure areas of a spool type diverter valve (DV) that shows the projected pressure area of the first side of the moveable sealing element to be substantially equal in area to the second side of the moveable sealing element.

Figure 140:
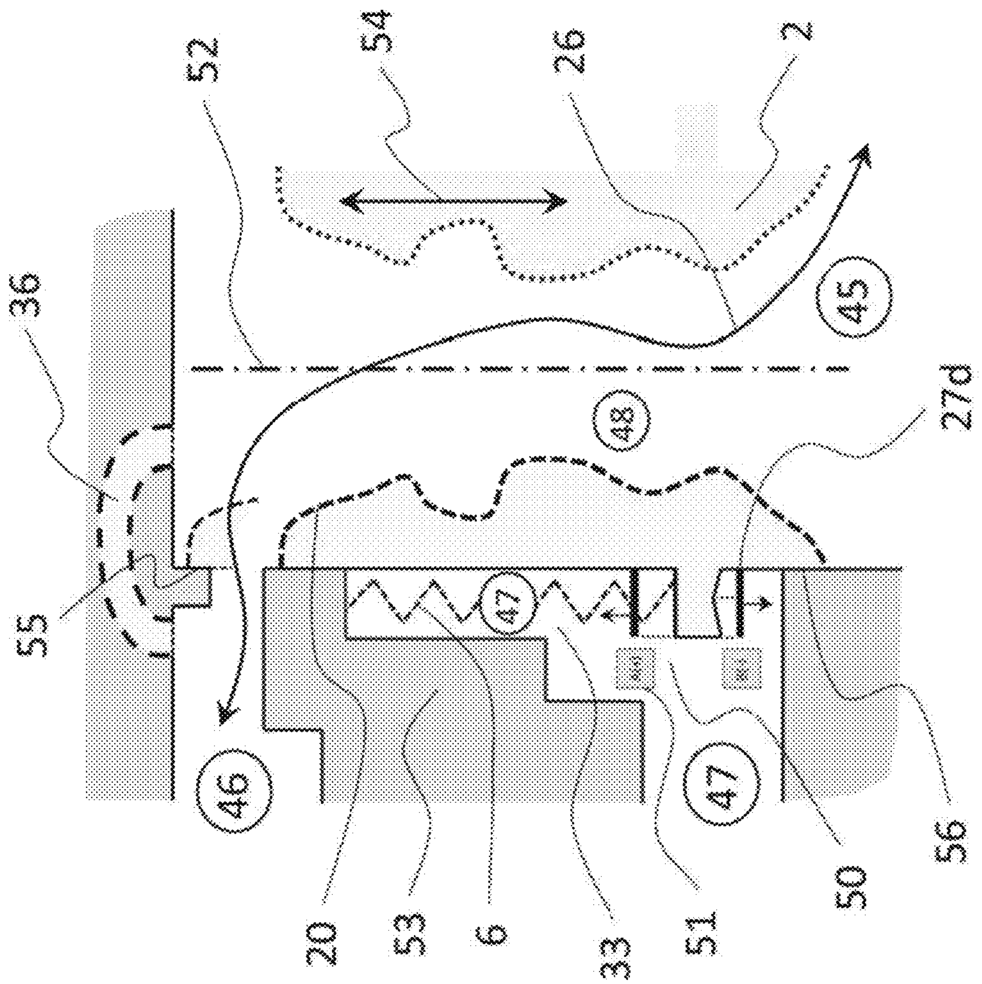

FIG. 140 is a schematic of a spool type diverter valve (DV) that depicts the projected fluid pressure areas of the movable sealing element that are not in primary fluid pressure communication with the flow path between the first and second ports, onto a plane perpendicular to the direction of travel.

Figure 141:
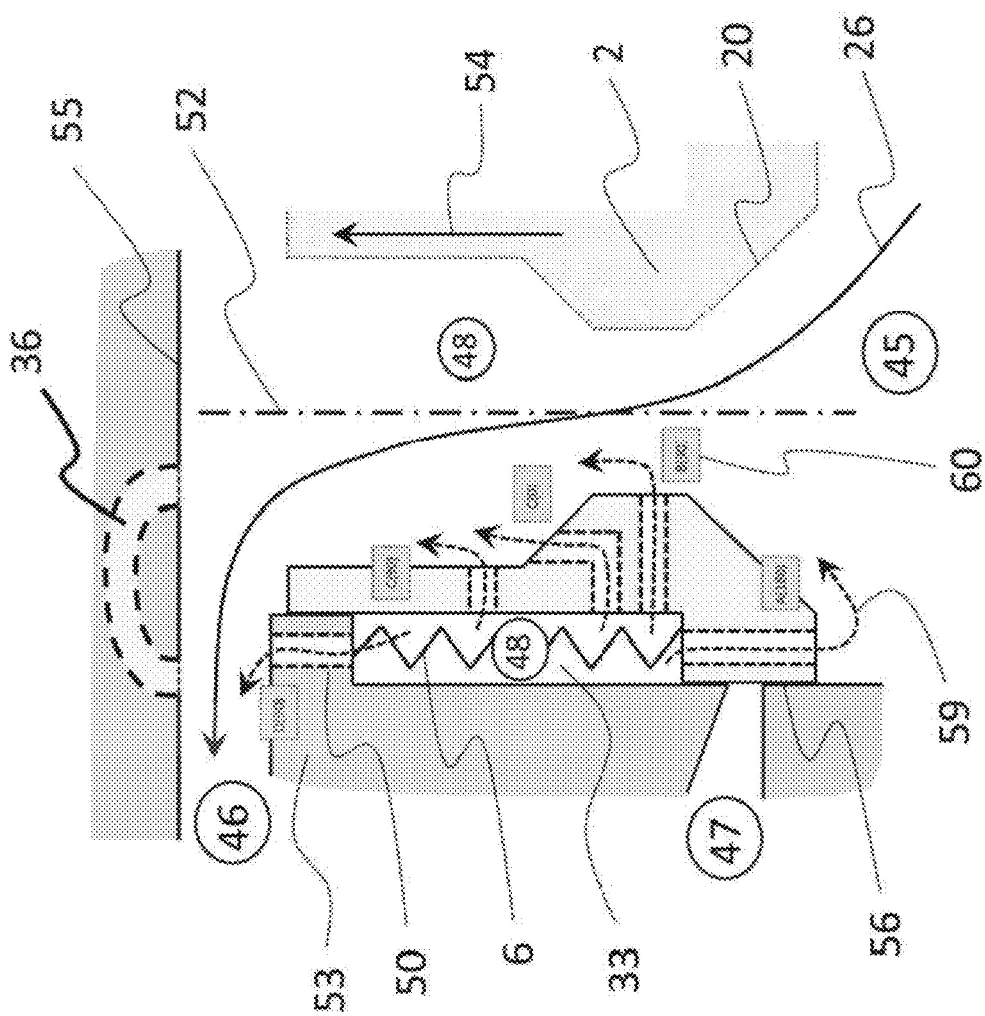

FIG. 141 is a schematic of a spool type diverter valve (DV) that shows a variety of different options for establishing a primary fluid pressure communication path between the cavity that houses the force element that biases the movable sealing element into the first mode position, and the flow path between the first and second ports.

Figure 142A:
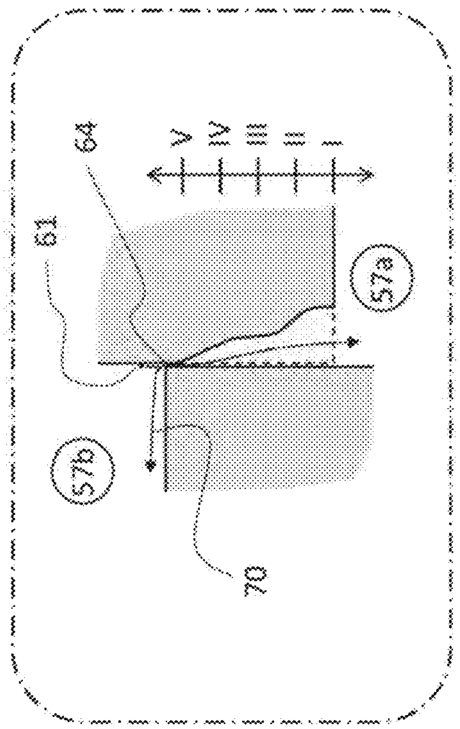

FIG. 142A is a schematic of a section of the movable sealing element of a diverter valve (DV) and a section of the manifold assembly on which it seals that move with respect to one another and configured in a first positional instance during the transition of the DV between first and second modes at which the effective fluid flow area between the two sections is substantially negligible.

Figure 142B:
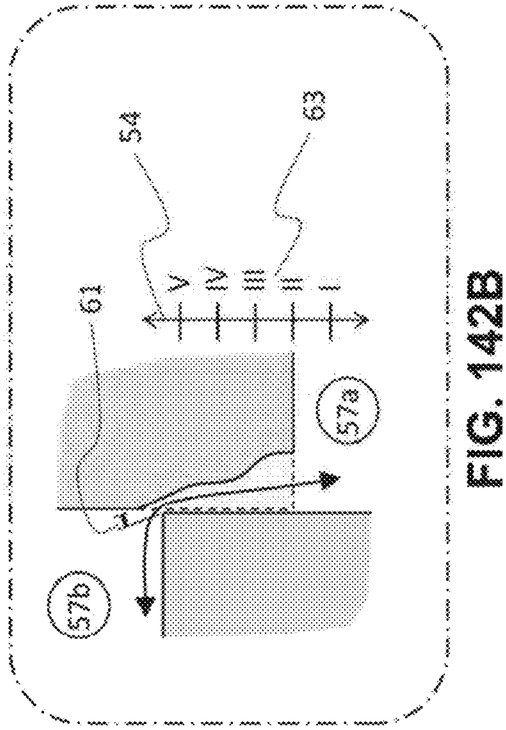

FIG. 142B is a schematic that depicts a second positional instance during the transition of the DV between the first and second modes at which the effective fluid flow area between the two sections is substantial.

Figure 142C:
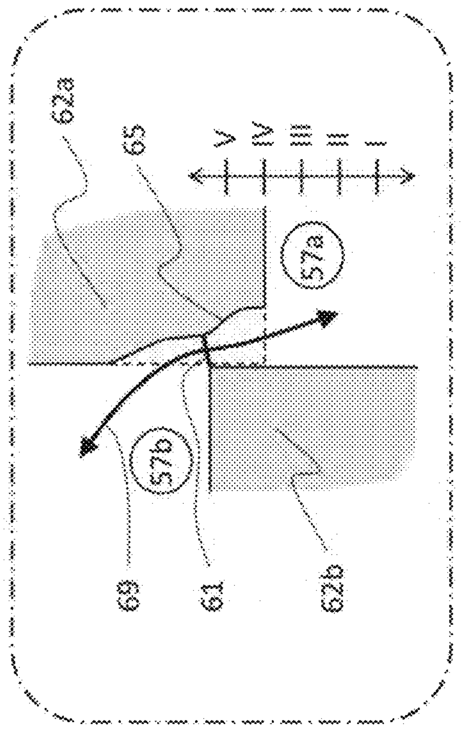

FIG. 142C is a schematic that depicts a third positional instance during the transition of the DV between the first and second modes at which the effective fluid flow area between the two sections is substantial and greater than the effective fluid flow area of the second positional instance.

Figure 142D:
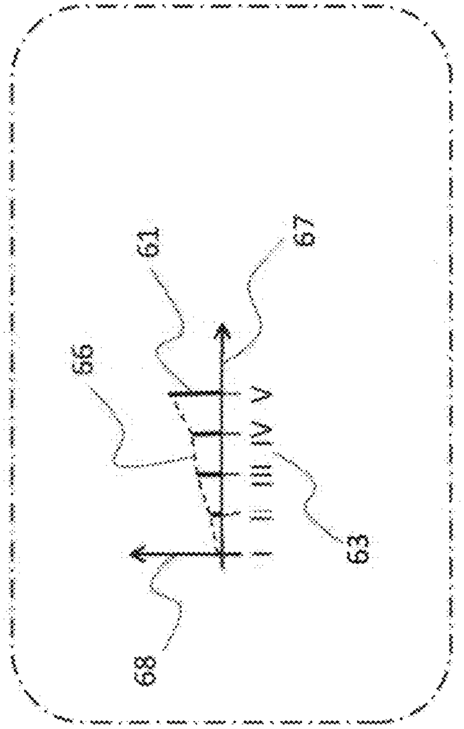

FIG. 142D is a plot that depicts the effective fluid flow area between a section of the movable sealing element of a diverter valve (DV) and a section of the manifold assembly as a function of relative position of the two sections with respect to another.

Figure 143:
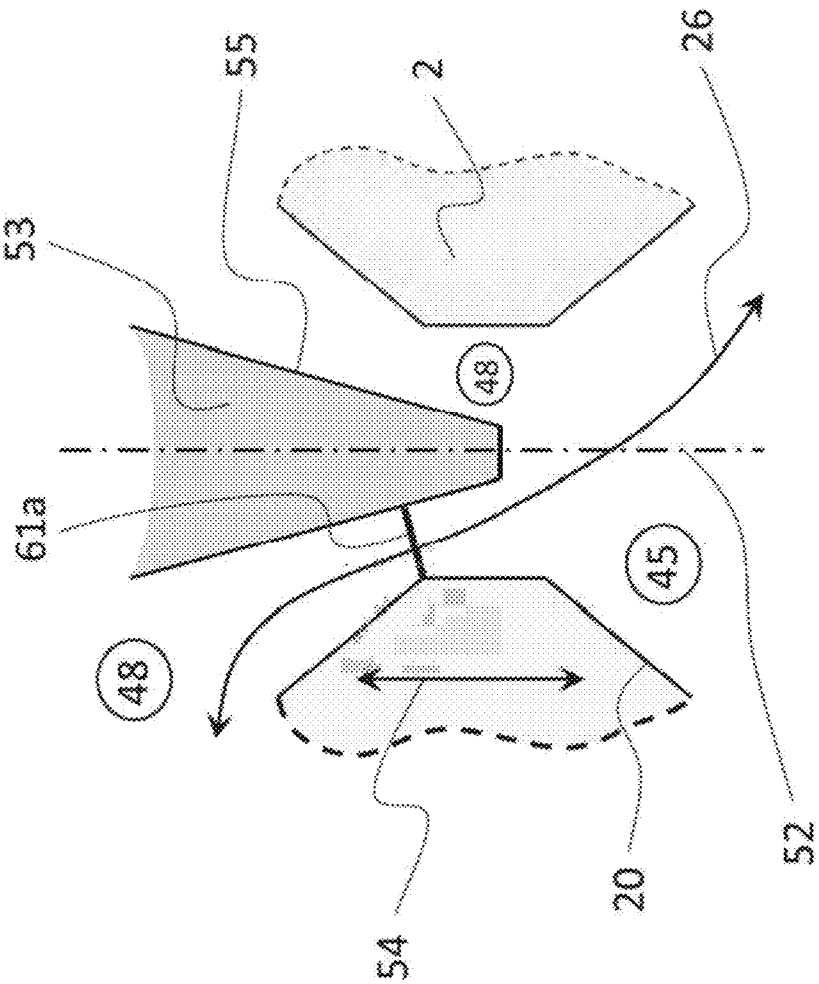

FIG. 143 is a schematic of a section of the movable sealing element of a diverter valve (DV) that shows the interaction of the surfaces that form the first fluid flow restriction in the fluid flow path between the first and second ports.

Figure 144A:
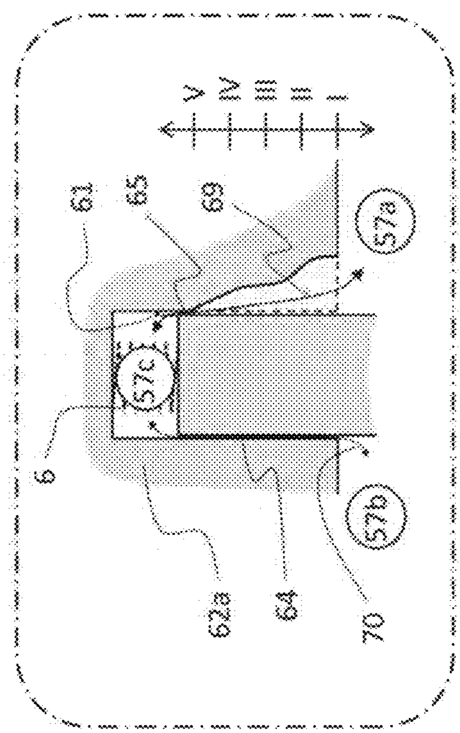

FIG. 144A is a schematic of a section of the movable sealing element of a diverter valve (DV) and a section of the manifold assembly on which it seals, effectively forming a fluid cavity that stands in fluid communication with two fluid volumes through two separate fluid flow paths that move with respect to another and configured in a first positional instance during the transition of the DV between first and second modes at which the effective fluid flow area of the first of the two fluid flow paths between these two sections is substantially negligible and the effective fluid flow area of the second of the two flow paths is also substantially negligible.

Figure 144B:
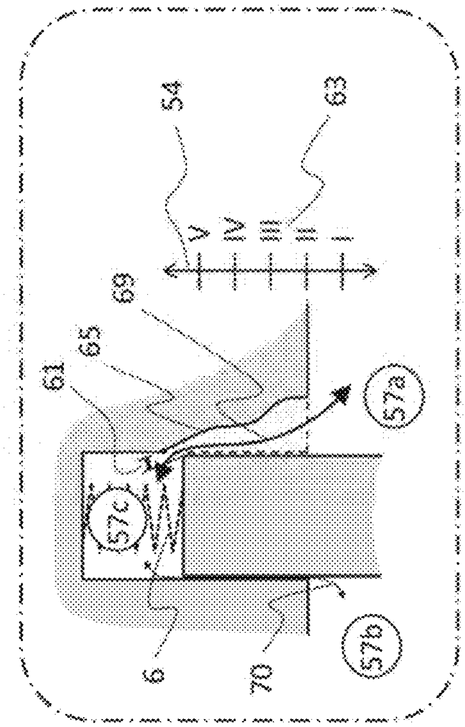

FIG. 144B is a schematic that depicts a second positional instance during the transition of the DV between the first and second modes at which the effective fluid flow area of the first of the two fluid flow paths between these two sections is substantially negligible and the effective fluid flow area of the second of the two flow paths is also substantial.

Figure 144C:
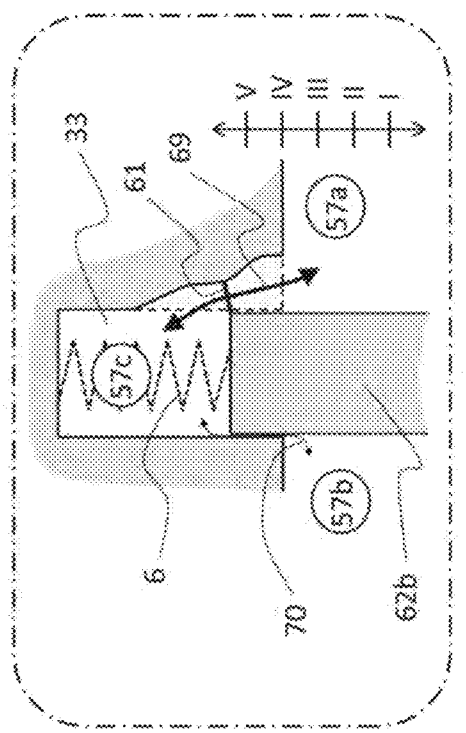

FIG. 144C is a schematic that depicts a third positional instance during the transition of the DV between the first and second modes at which the effective fluid flow area of the first of the two fluid flow paths between these two sections is substantially negligible and the effective fluid flow area of the second of the two flow paths is also substantial and greater than the effective fluid flow area of the same flow path of the second positional instance.

Figure 144D:
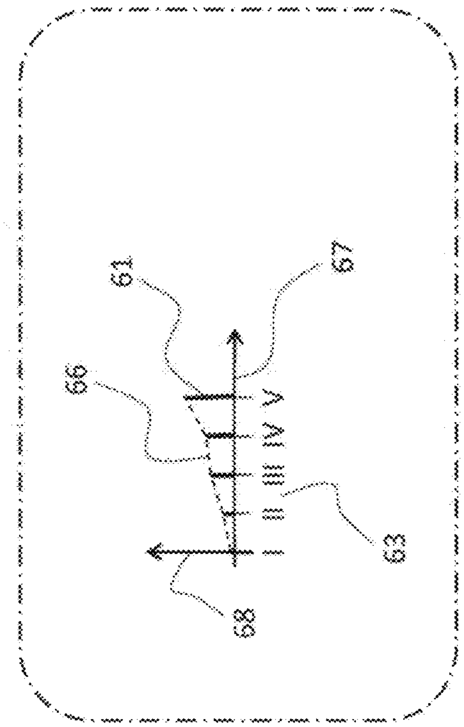

FIG. 144D is a plot that depicts the effective fluid flow area in the second of the two fluid flow paths between a section of the movable sealing element of a diverter valve (DV) and a section of the manifold assembly on which it seals that effectively form a fluid cavity that stands in fluid communication with two fluid volumes through two separate fluid flow paths, as a function of relative position of the two sections with respect to another.

Figure 145A:
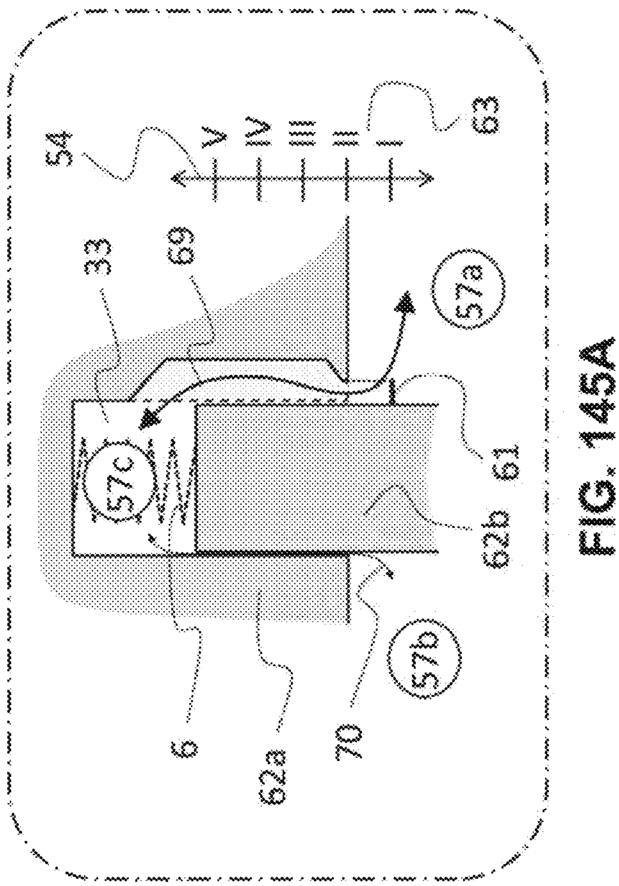

FIG. 145A is a schematic of a section of the movable sealing element of a diverter valve (DV) and a section of the manifold assembly on which it seals, effectively forming a fluid cavity that stands in fluid communication with two fluid volumes through two separate fluid flow paths, that move with respect to another and configured in a positional instance during the transition of the DV between first and second modes at which the effective fluid flow area of the first of the two fluid flow paths between these two sections is substantially negligible and the effective fluid flow area of the second of the two flow paths is also substantial and independent of the relative position of the two sections with respect to another.

Figure 145B:
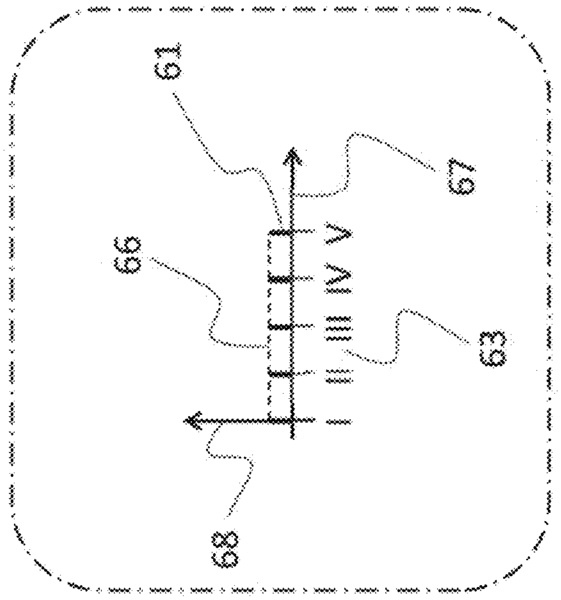

FIG. 145B is a plot that depicts the effective fluid flow area in the second of the two fluid flow paths between a section of the movable sealing element of a diverter valve (DV) and a section of the manifold assembly on which it seals on which it seals that effectively form a fluid cavity that stands in fluid communication with two fluid volumes through two separate fluid flow paths, as a function of relative position of the two sections with respect to another.

Figure 146A:
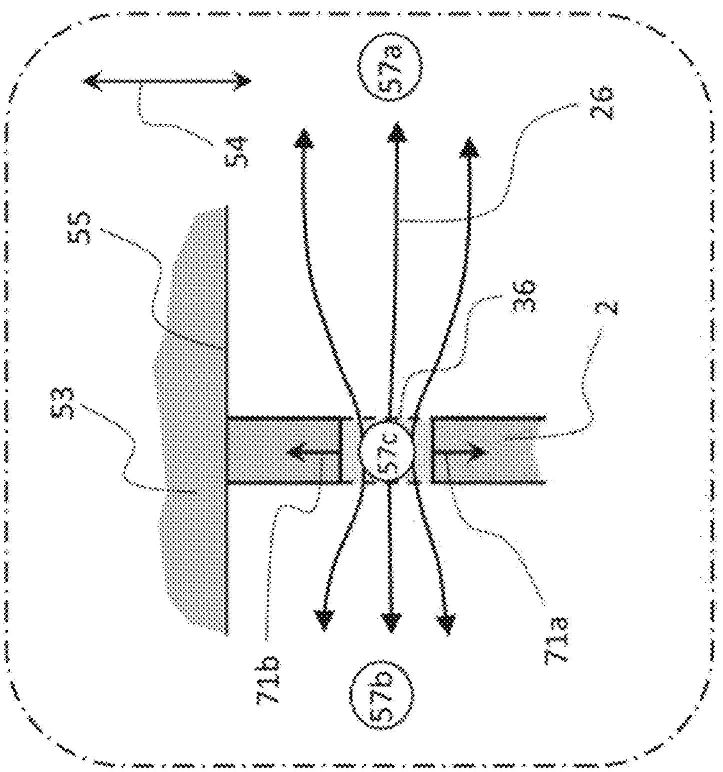

FIG. 146A is a schematic of an embodiment of the second flow restriction in the fluid flow path between the first and second ports of a spool type diverter valve (DV) including a movable sealing element with radial openings that do not substantially contribute any additional fluid pressure force on the movable sealing element in its direction of travel.

Figure 146B:
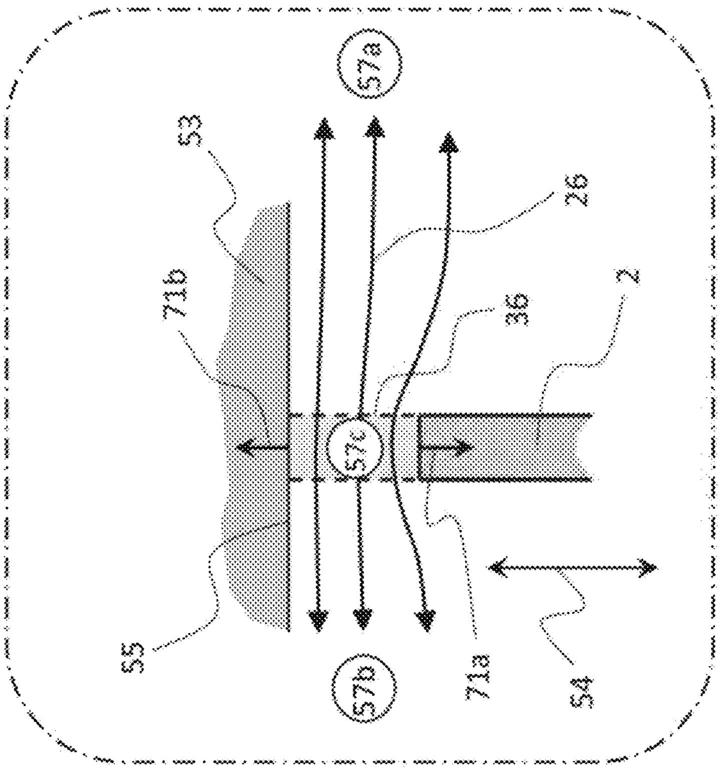

FIG. 146B is a schematic of an embodiment of the second flow restriction in the fluid flow path between the first and second ports of a spool type diverter valve (DV) including a movable sealing element radial openings that substantially contribute an additional fluid pressure force on the movable sealing element in its direction of travel.

Figure 147A:
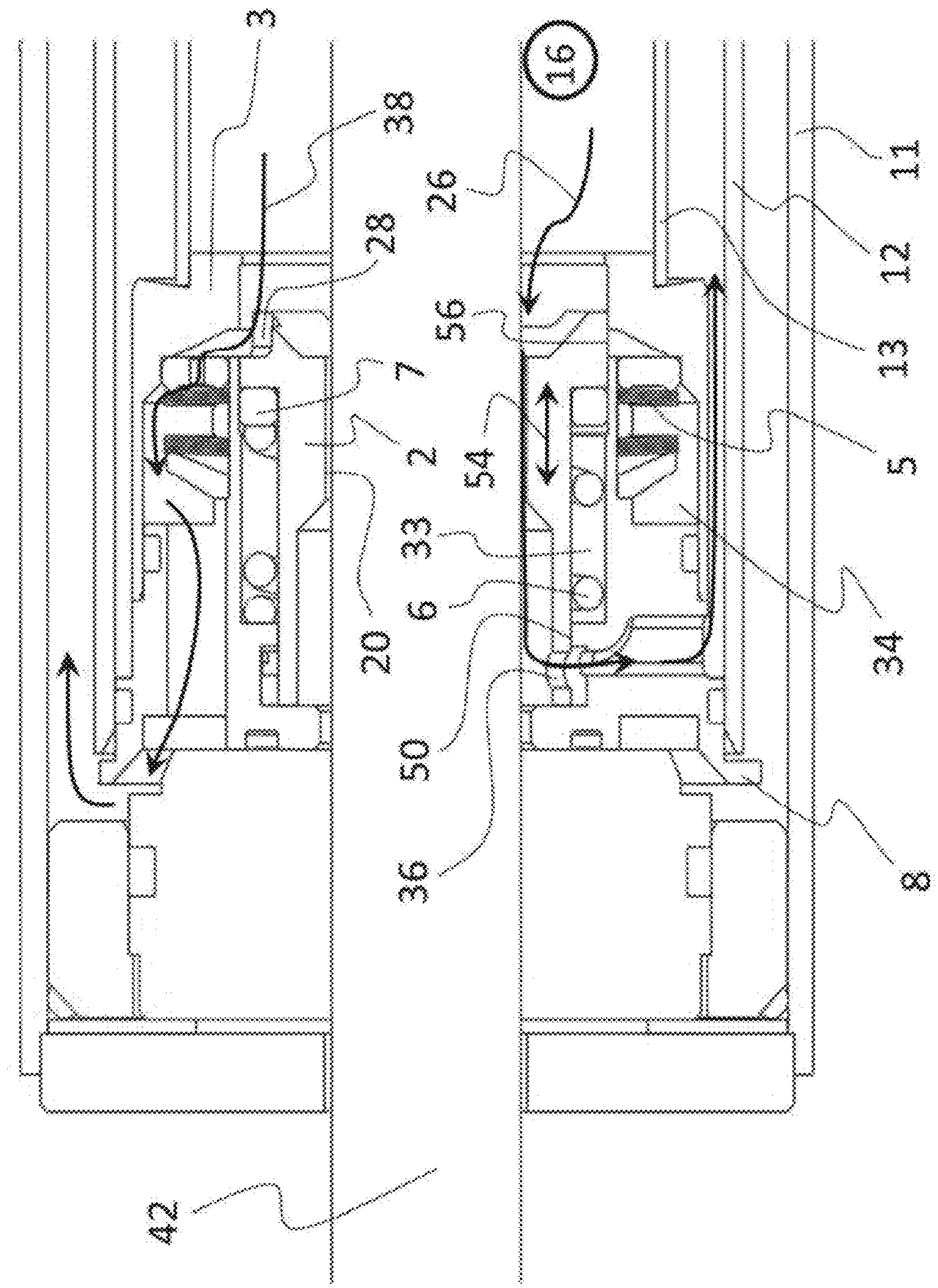

FIG. 147A is a schematic that depicts a spool type DV located in the rebound chamber of an active damper in the activated position wherein the movable sealing element is in the second mode.

Figure 147B:
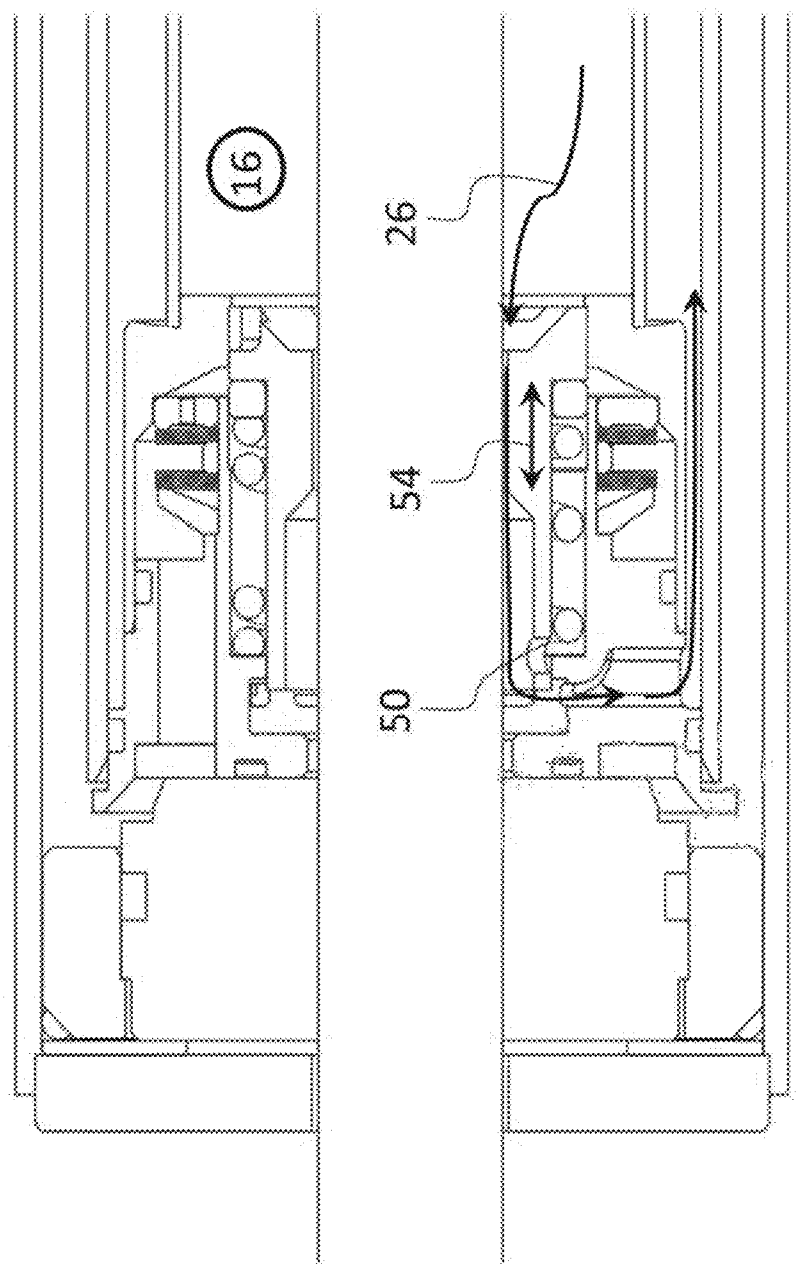

FIG. 147B is a schematic that depicts a spool type DV located in the rebound chamber of an active damper in the un-activated position.

Figure 148A:
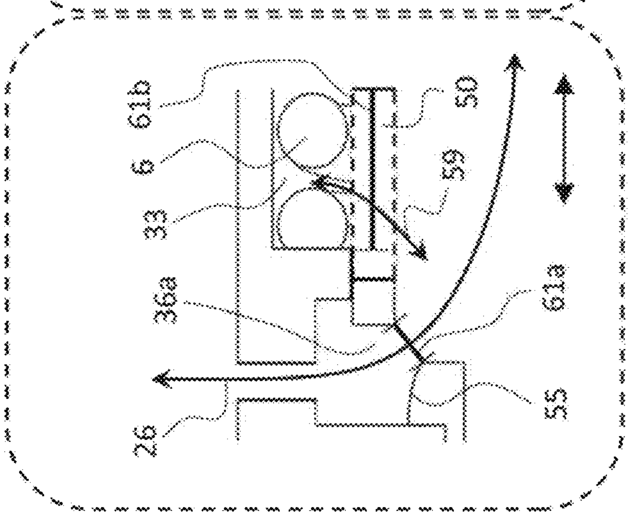

FIG. 148A is a schematic that depicts a section view of the end of a spool type DV at the second flow restriction with the movable sealing element in the un-activated position, the first mode, such that the effective flow area at the second flow restriction is substantially large.

Figure 148B:
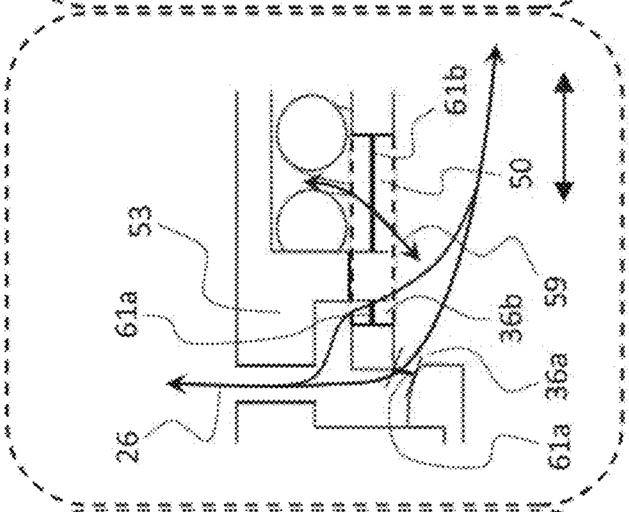

FIG. 148B shows the movable sealing element in an intermediate position between the first and second modes such that the effective flow area at the second flow restriction is substantially smaller than when the movable sealing element is in the first mode.

Figure 148C:
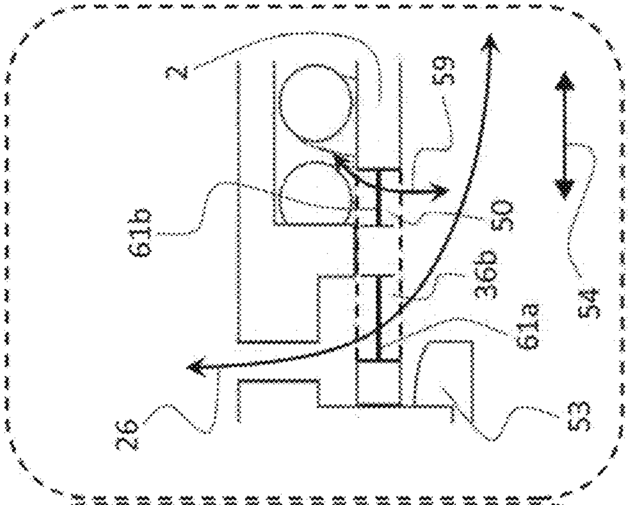

FIG. 148C shows the movable in the fully activated position, the second mode, such that the effective flow area at the second flow restriction is substantially negligible.

Figure 149B:
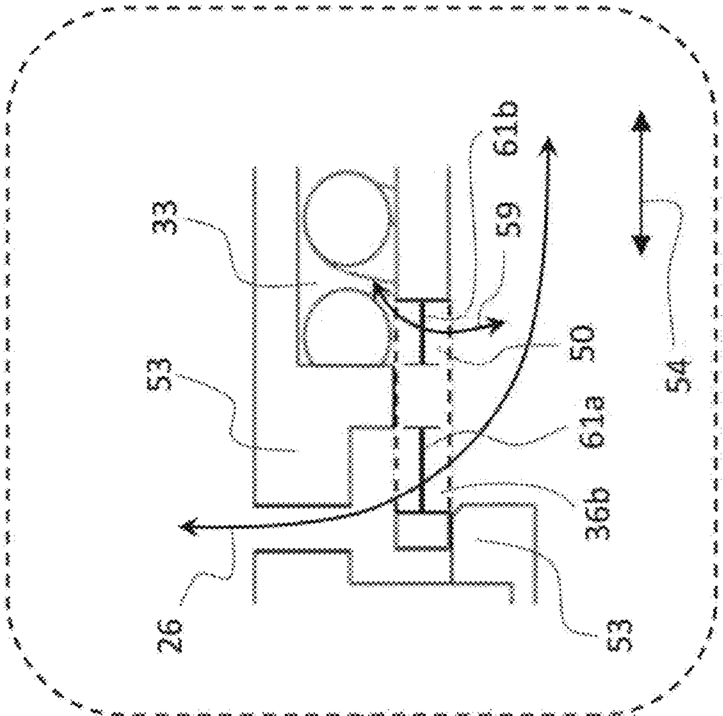
Figure 149A:
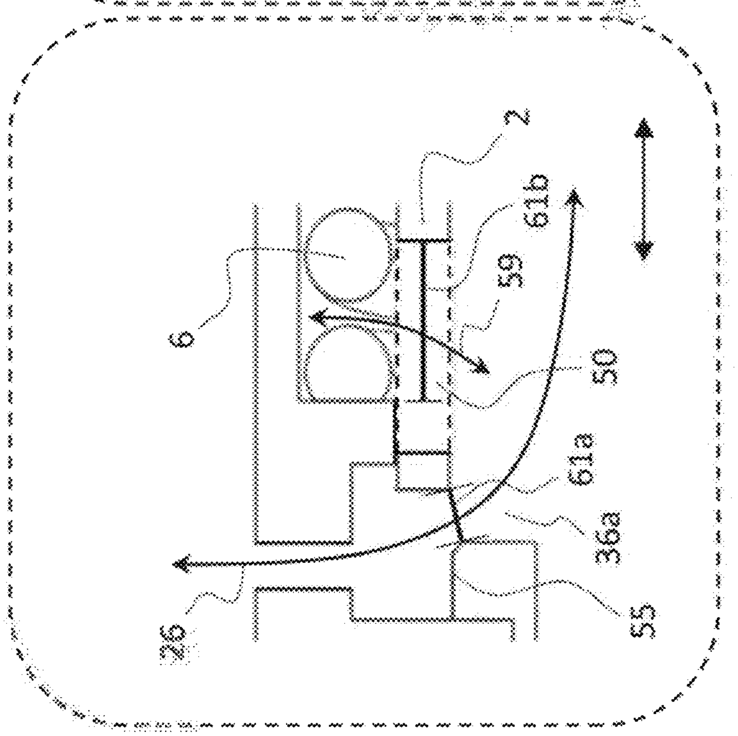

FIG. 149A is a schematic that depicts a section view of the end of a spool type DV at the second flow restriction with the movable sealing element in the un-activated position, the first mode.

FIG. 149B shows the movable sealing element in the activated position, second mode, wherein the spool end forms a radial seal with the sealing manifold at the second flow restriction.

Figure 150:
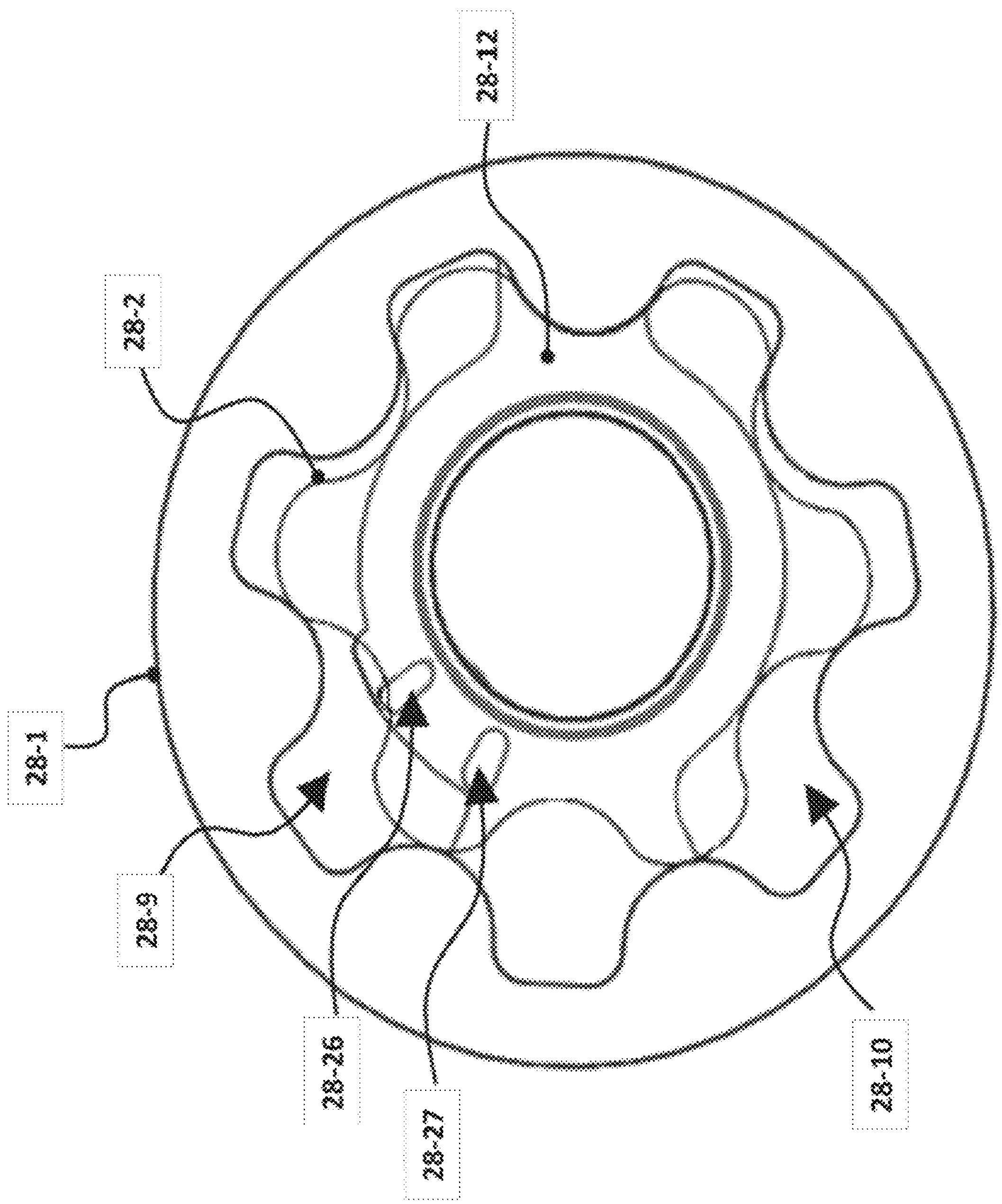

FIG. 150 is a top view of a gerotor set including inner and outer elements with the location of buffer communication ports highlighted.

Figure 151:
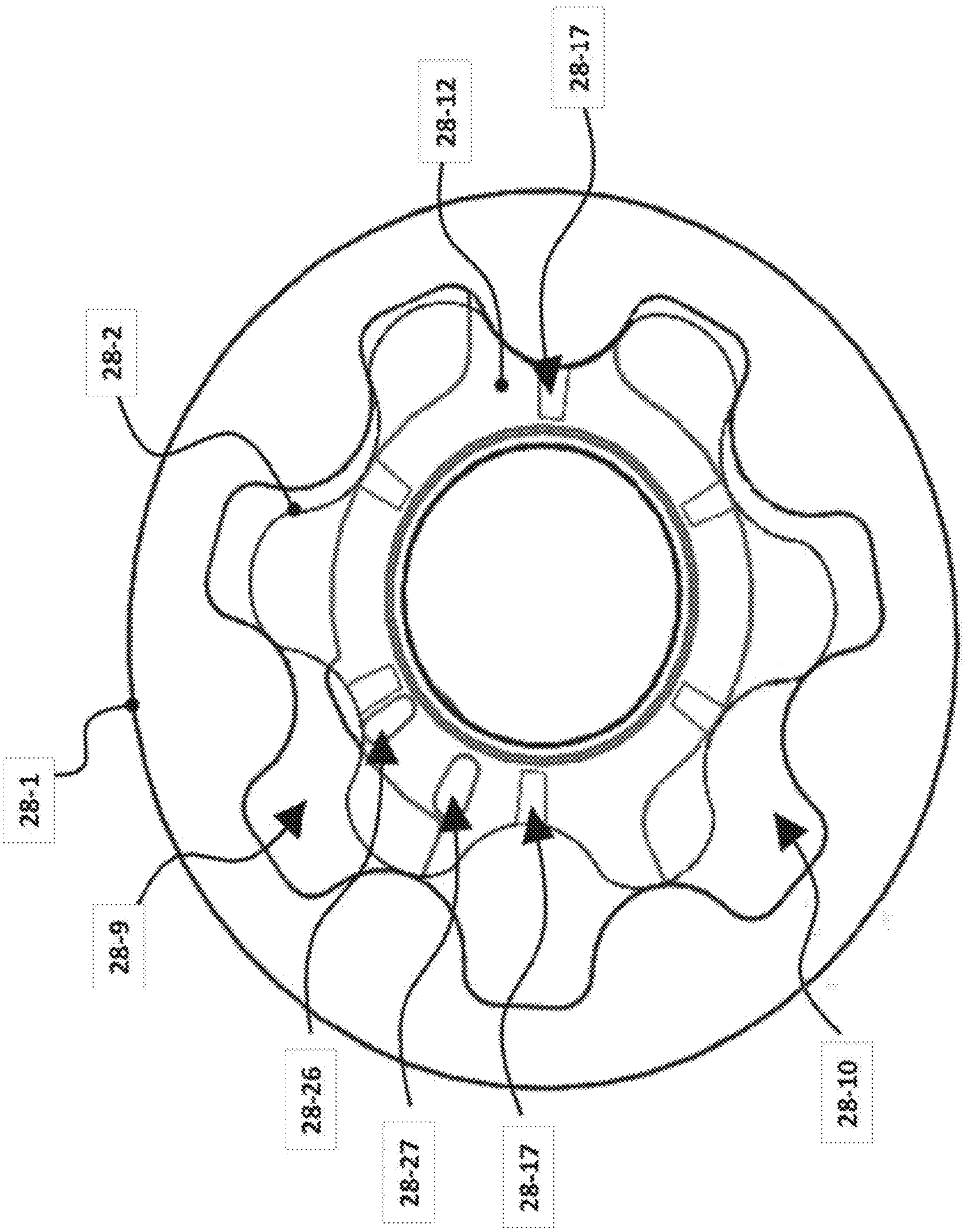

FIG. 151 is a top view of a gerotor set including inner and outer elements with the location of buffer communication ports and element flow notches.

Figure 152:
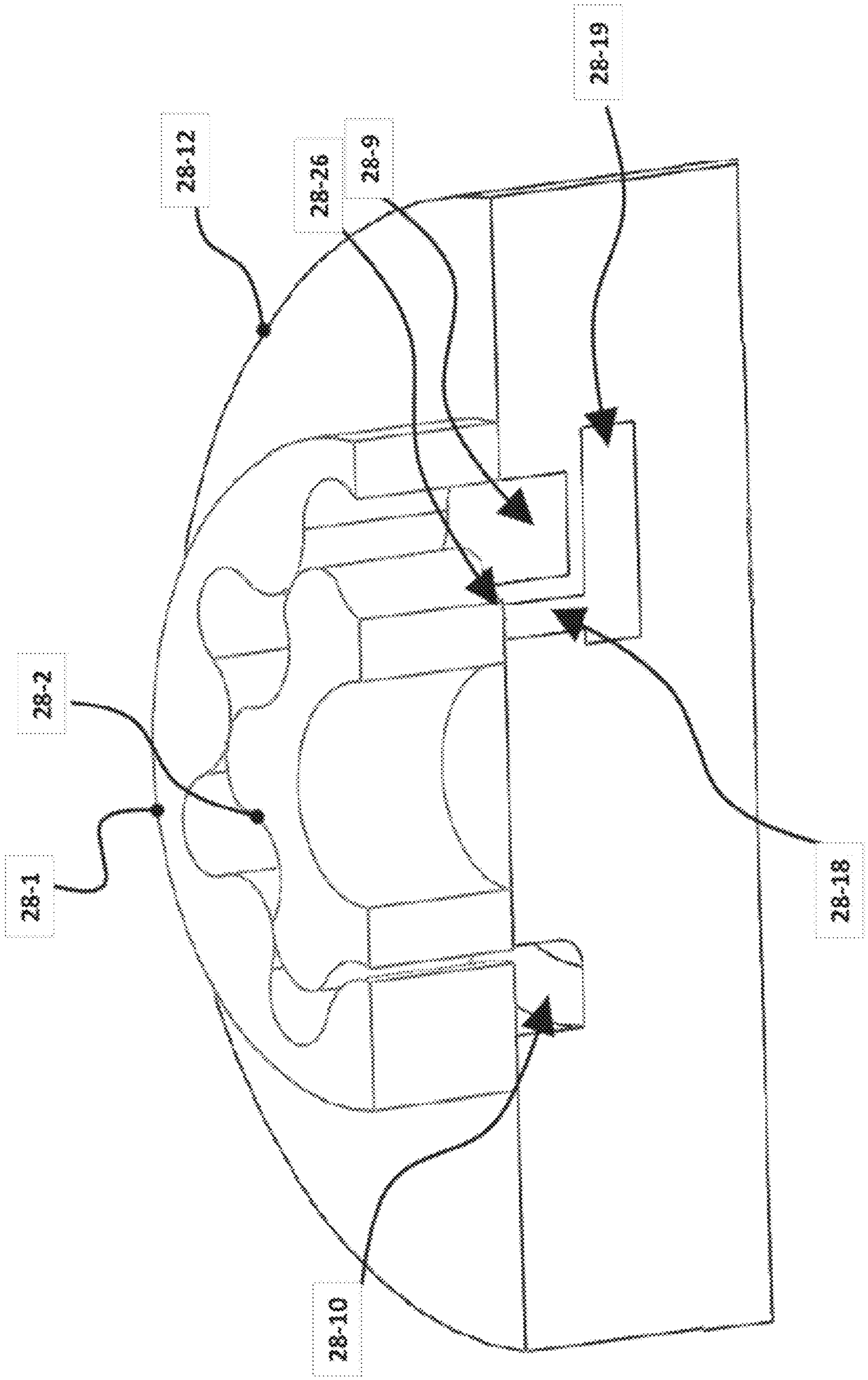

FIG. 152 is a section view of a gerotor set with a buffer in its manifold showing the gerotor inlet and outlet ports as well as buffer ports and fluid passageways to a buffer chamber located in the manifold. The gerotor lobes seal and expose the buffer ports.

Figure 153:
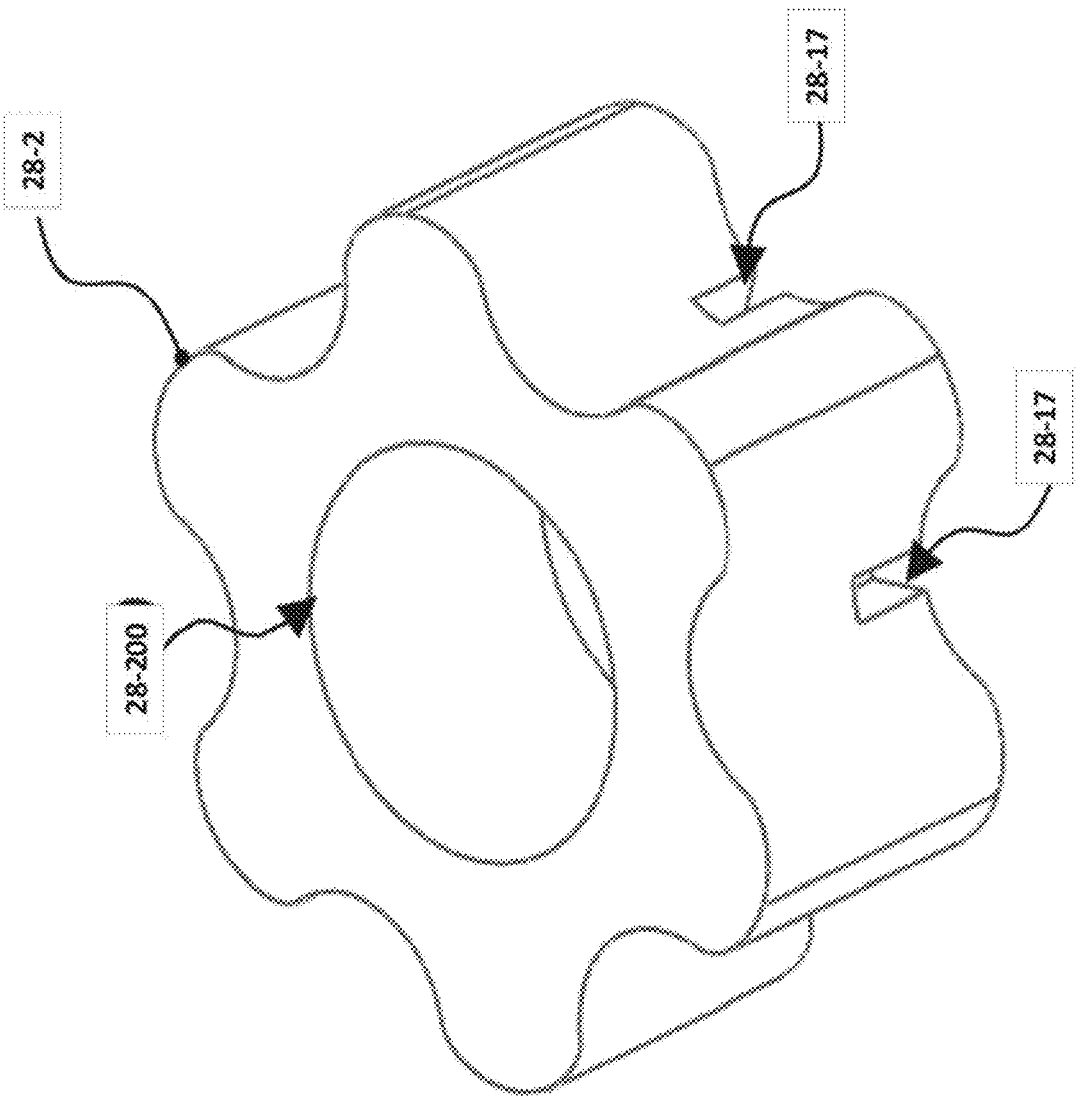

FIG. 153 depicts the inner element of a gerotor with flow notches. The size and location of these notches is approximate and not meant to be precise.

Figure 154:
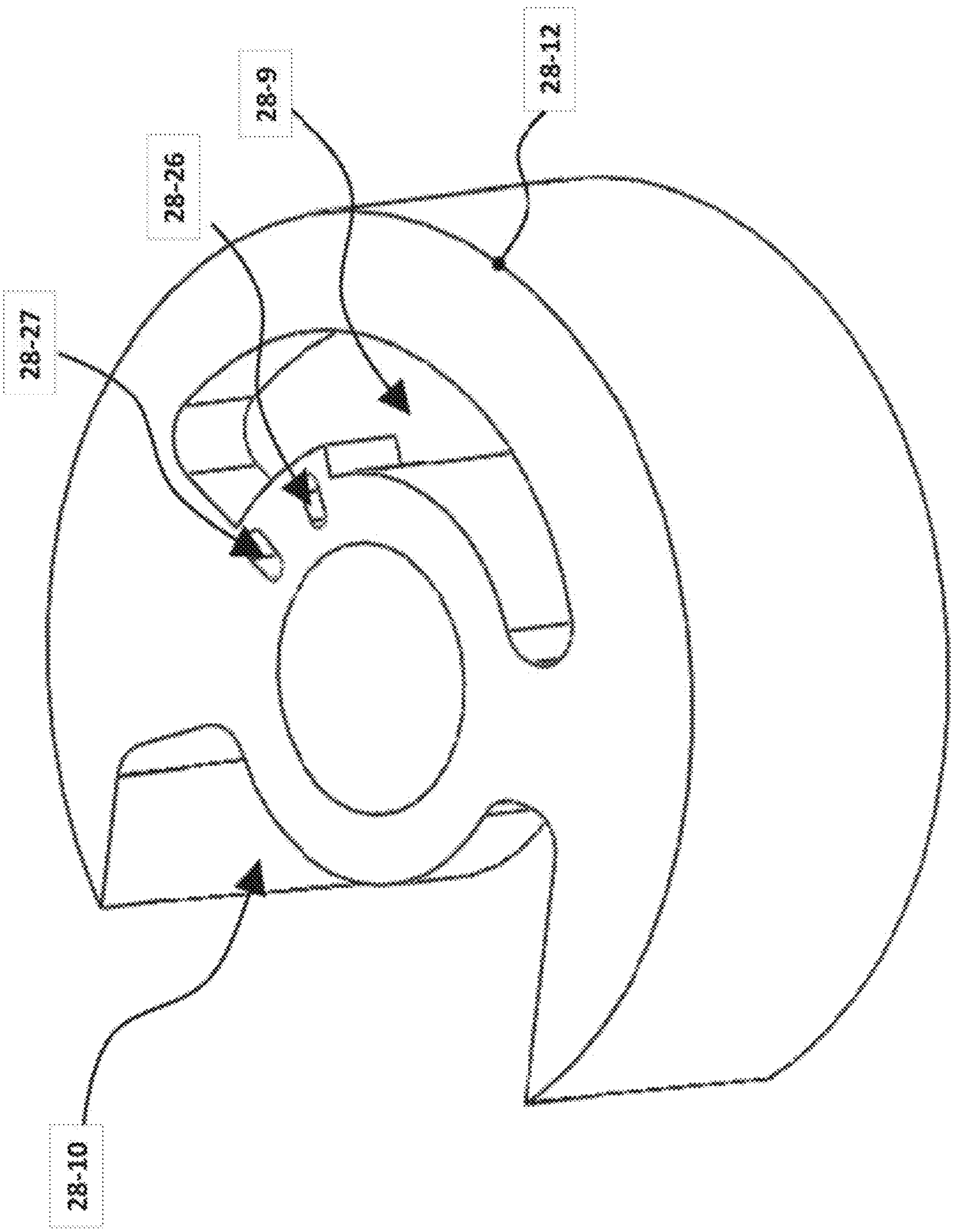

FIG. 154 depicts a flow manifold that includes the main gerotor ports as well as buffer notches in its axial face.

Figure 155:
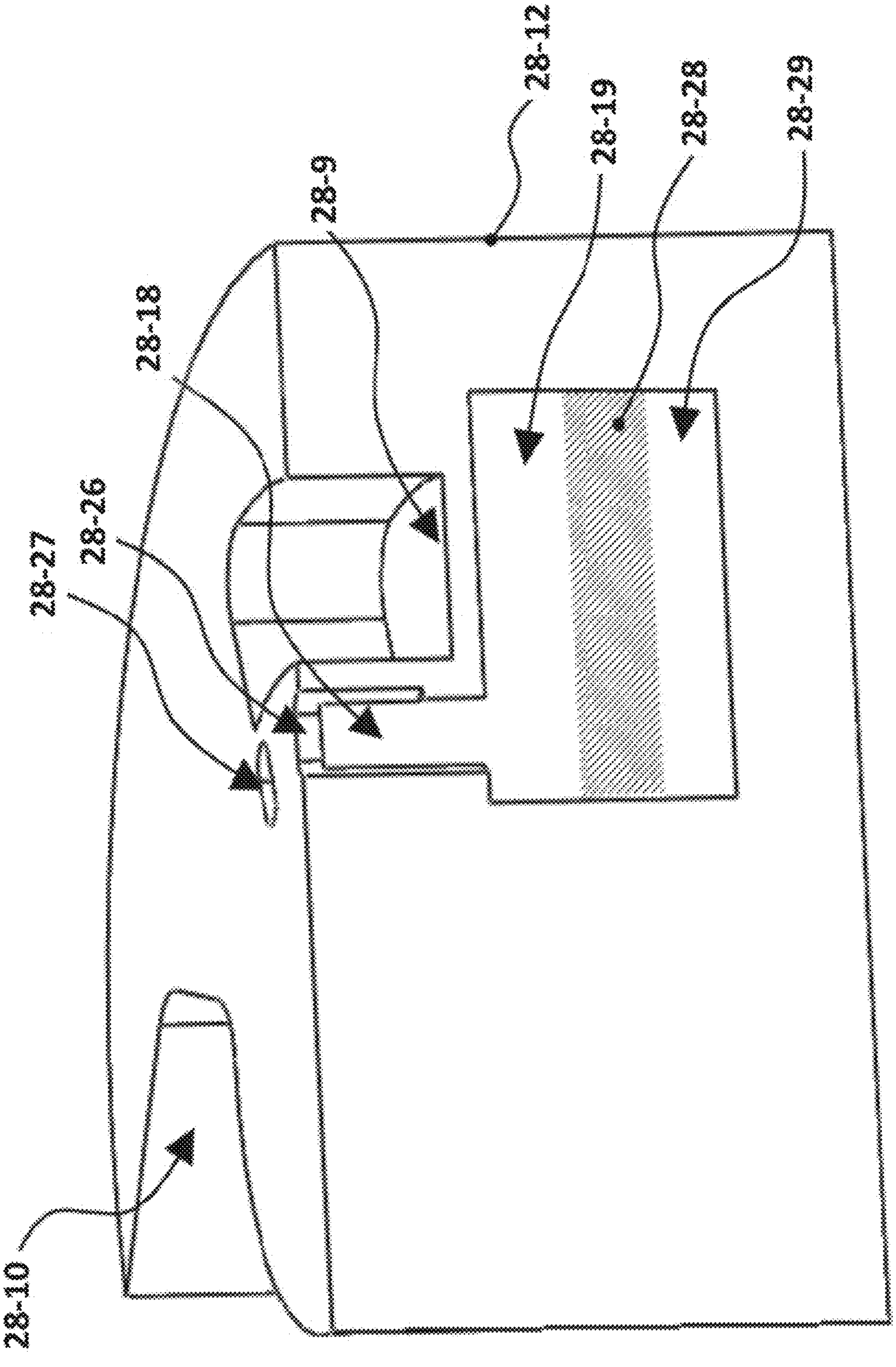

FIG. 155 is a section view of a flow manifold showing the connection of the buffer ports and flow passages to the buffer chamber.

Figure 156:
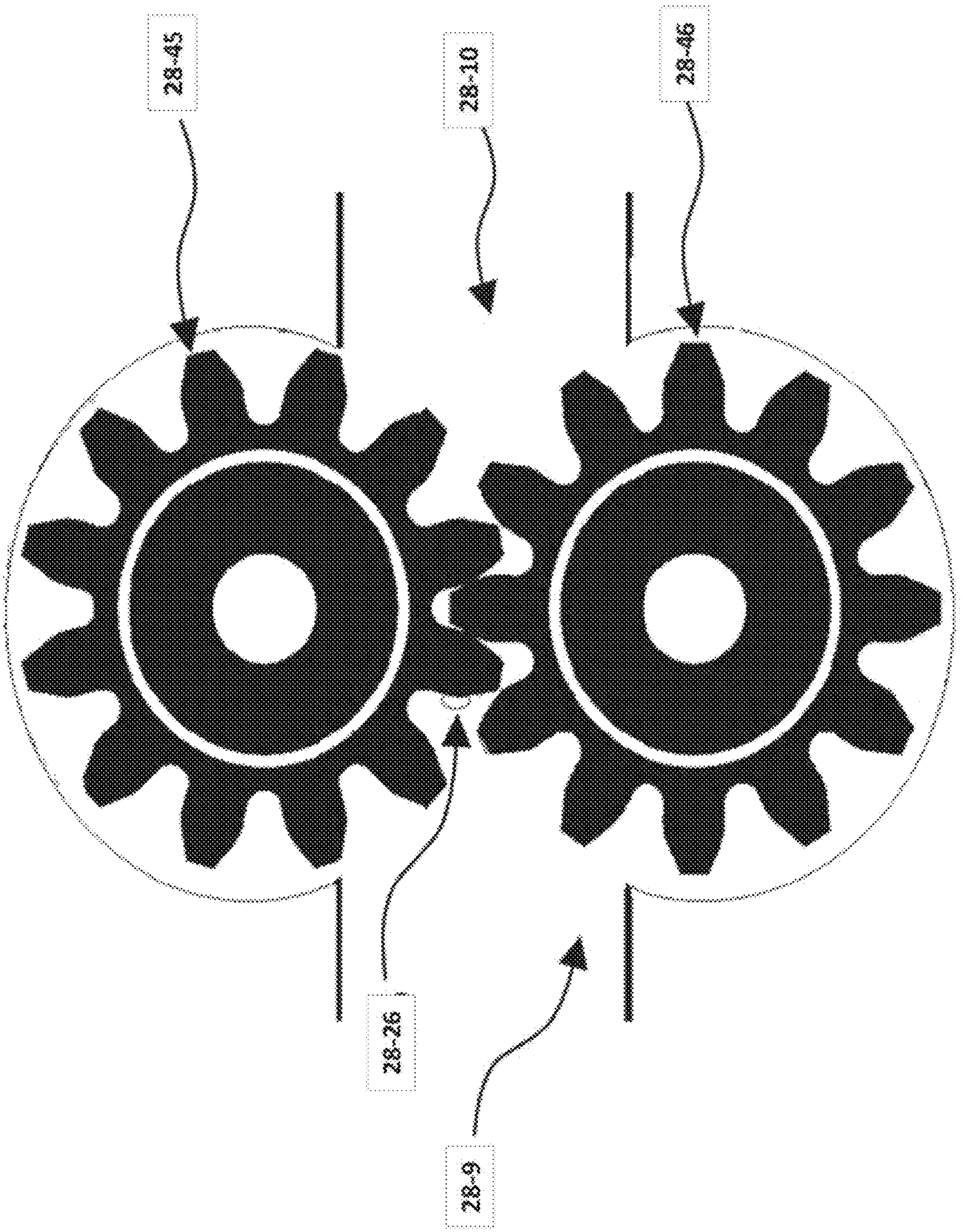

FIG. 156 depicts an external gear pump/motor with buffer ports highlighted.

Figure 157:
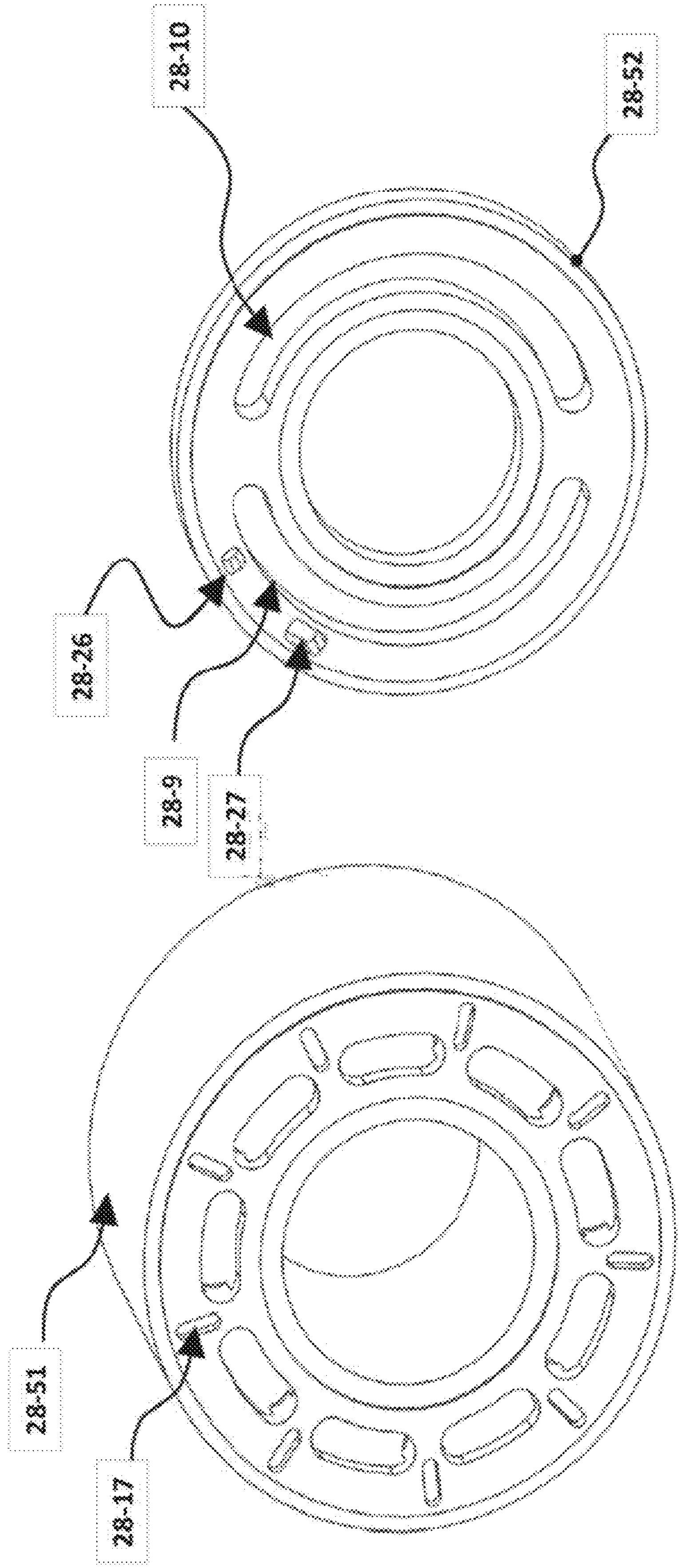

FIG. 157 depicts an axial pump/motor cylinder block and port plate with buffer ports highlighted.

Figure 158:
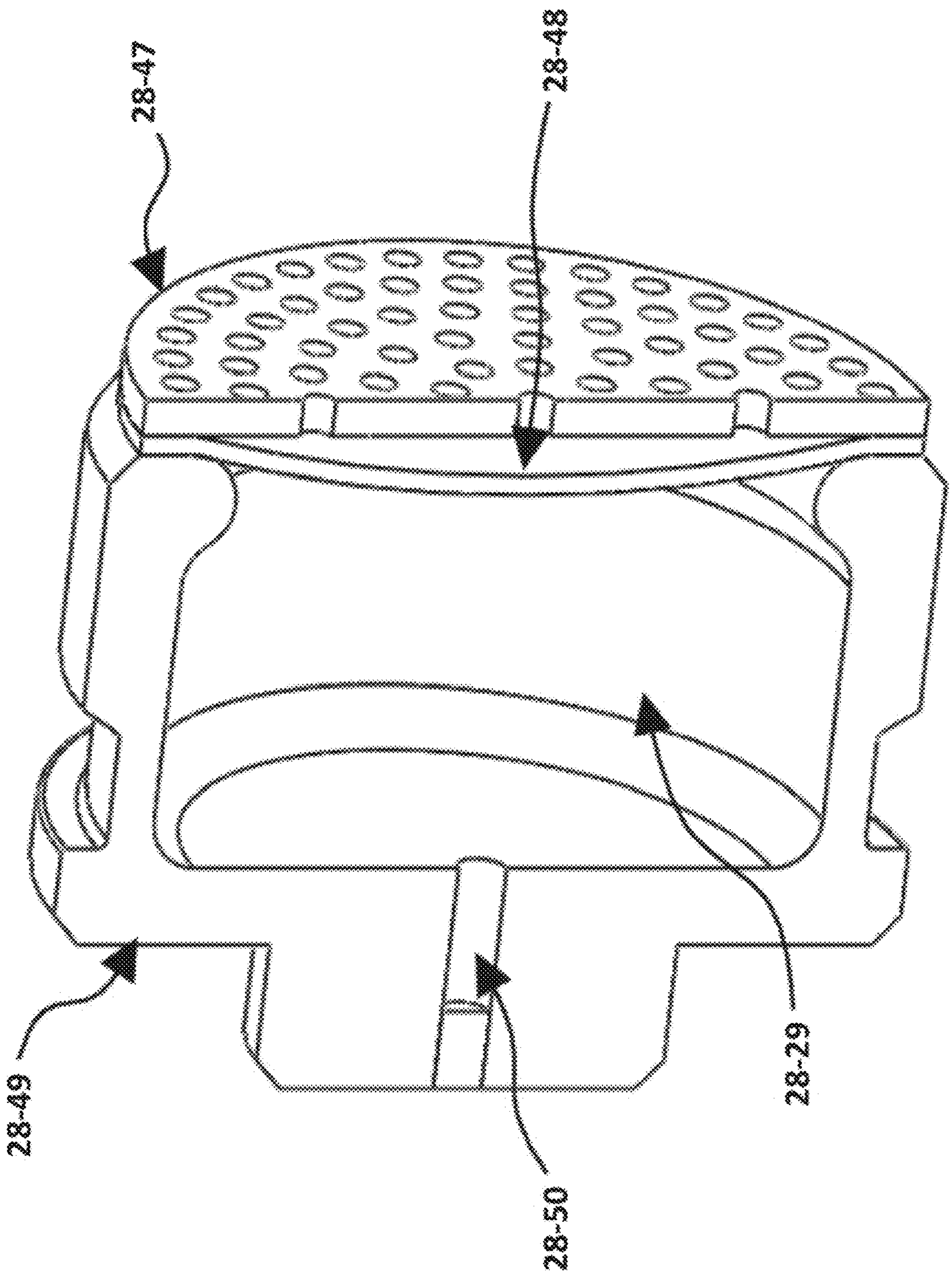

FIG. 158 depicts a buffer with a compliant material and a porous bounding surface allowing for pre-charge pressure. The diaphragm is configured as a drum-like bladder.

Figure 159:
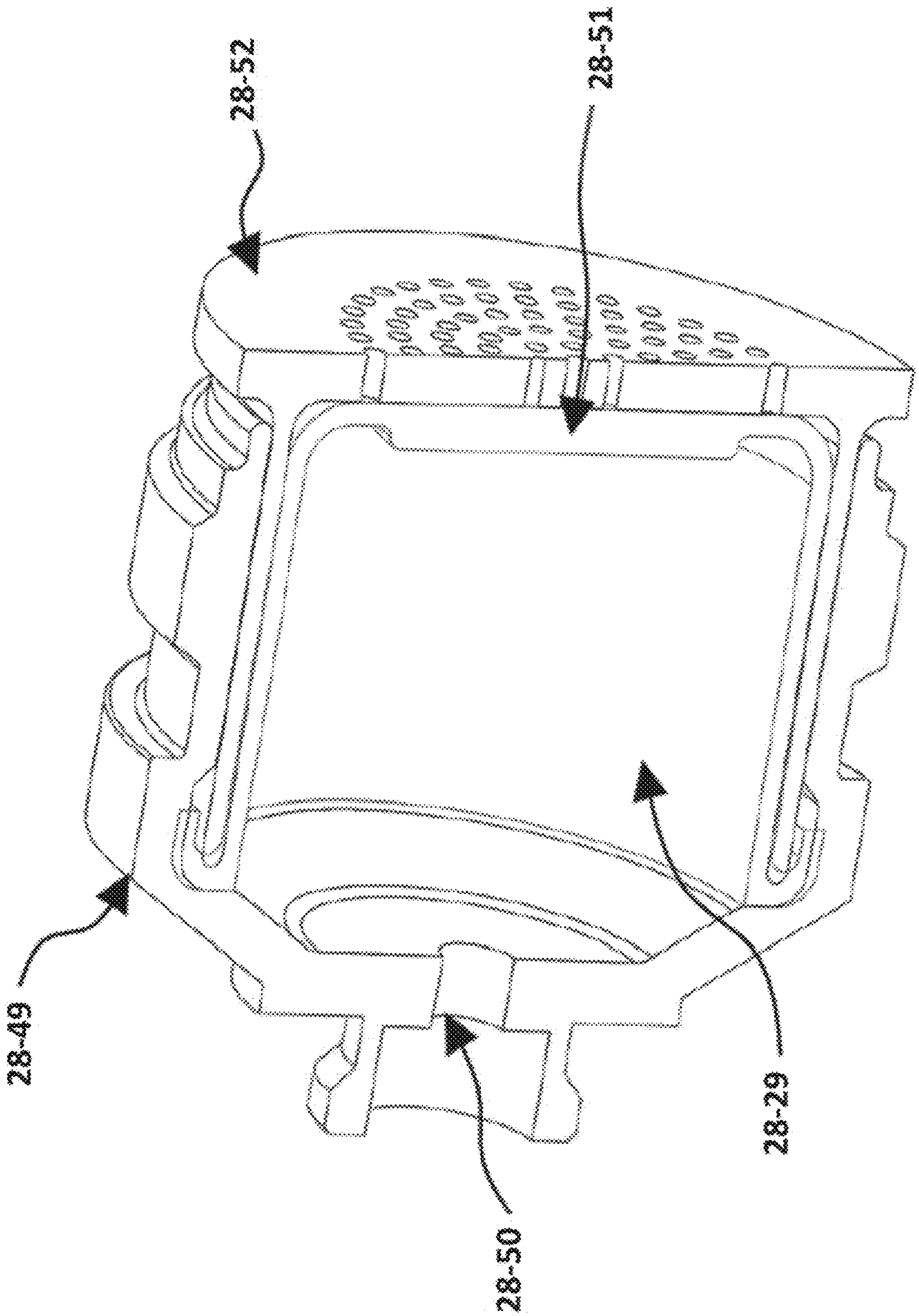

FIG. 159 depicts a buffer with a compliant material and a porous bounding surface allowing for pre-charge pressure. The diaphragm is configured as a rubber gas bag that may fold in on itself.

Figure 160:
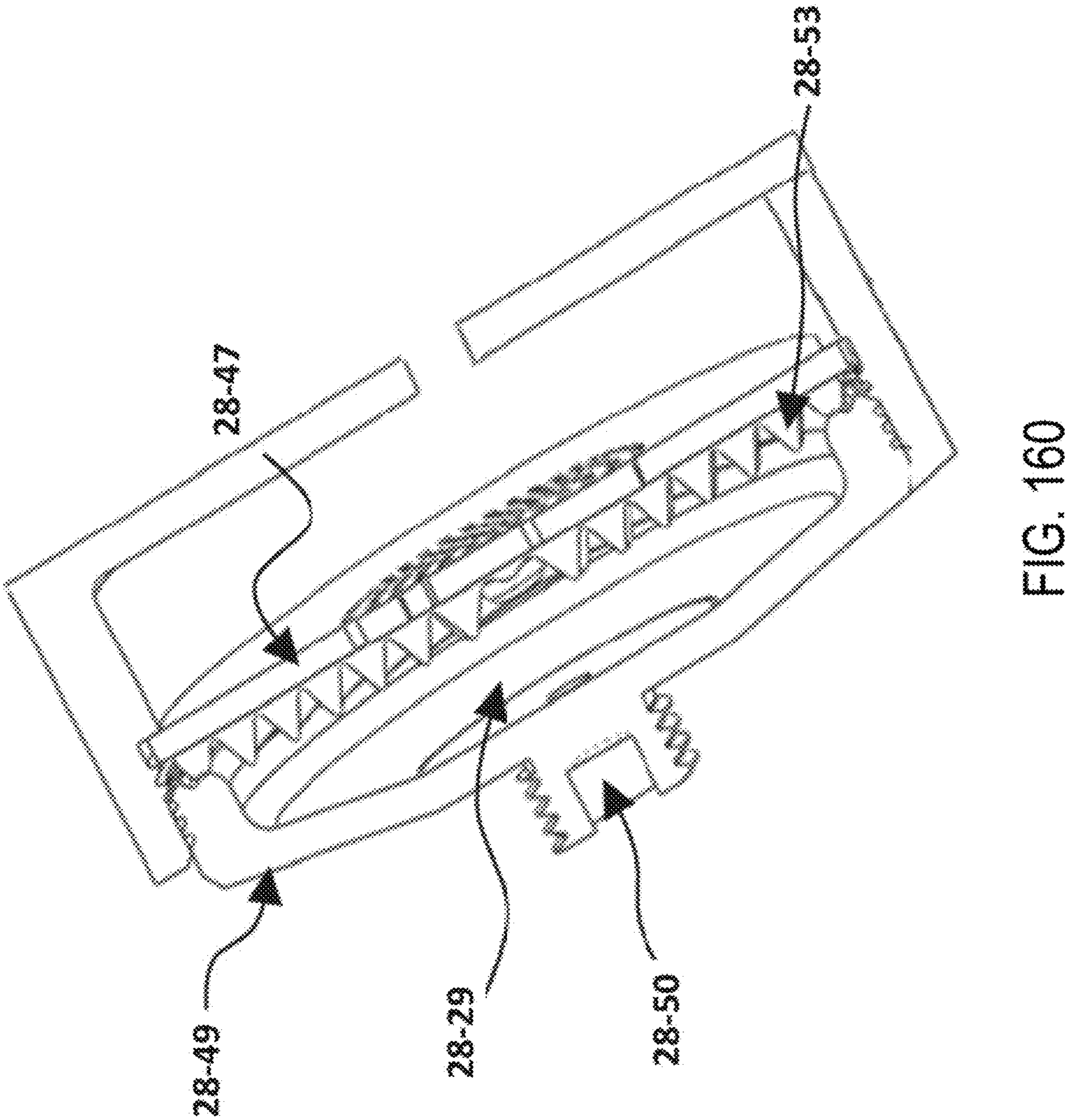

FIG. 160 depicts a buffer with a compliant material and a porous bounding surface allowing for pre-charge pressure. The diaphragm is configured as a metal bellow.

Figure 161:
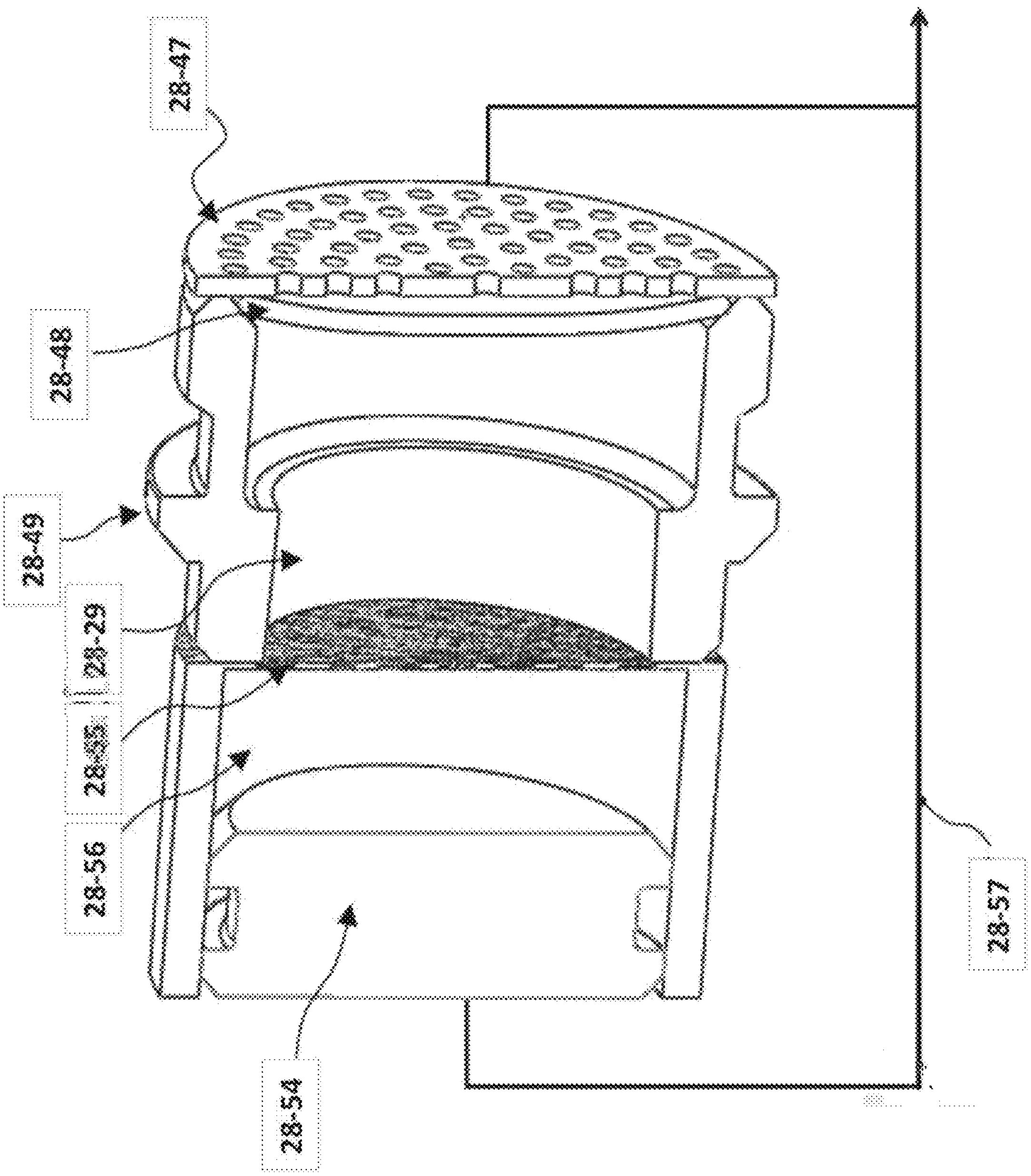

FIG. 161 depicts a pressure-compensated buffer wherein ambient (DC) system pressure moves a floating piston to change pressure in the buffer without changing volume of the buffer for high frequency content. A pneumatic damping device provides this low pass filter operation.

Figure 162:
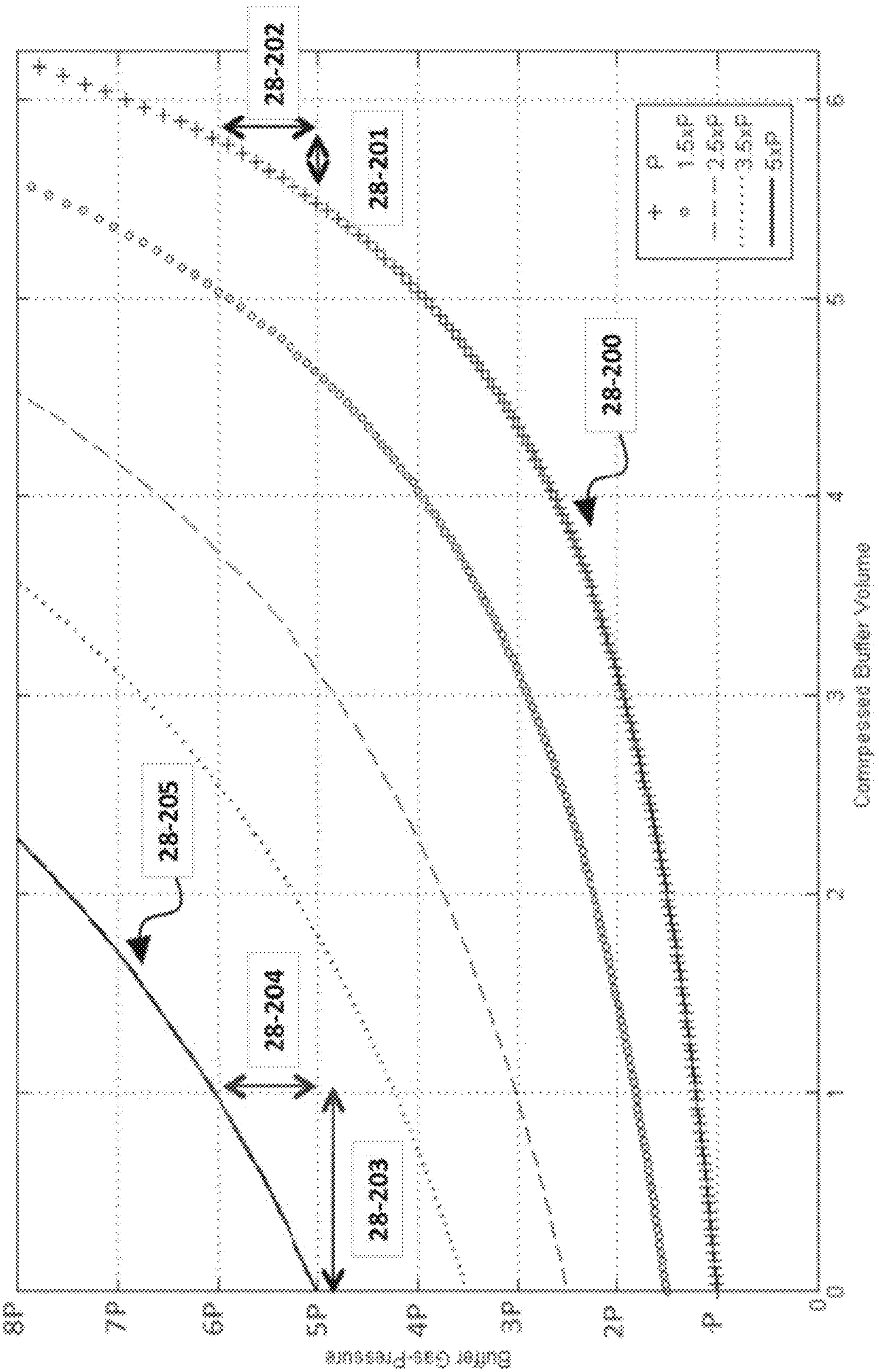

FIG. 162 depicts buffer gas pressure as a function of buffer compressed volume.

Figure 163:
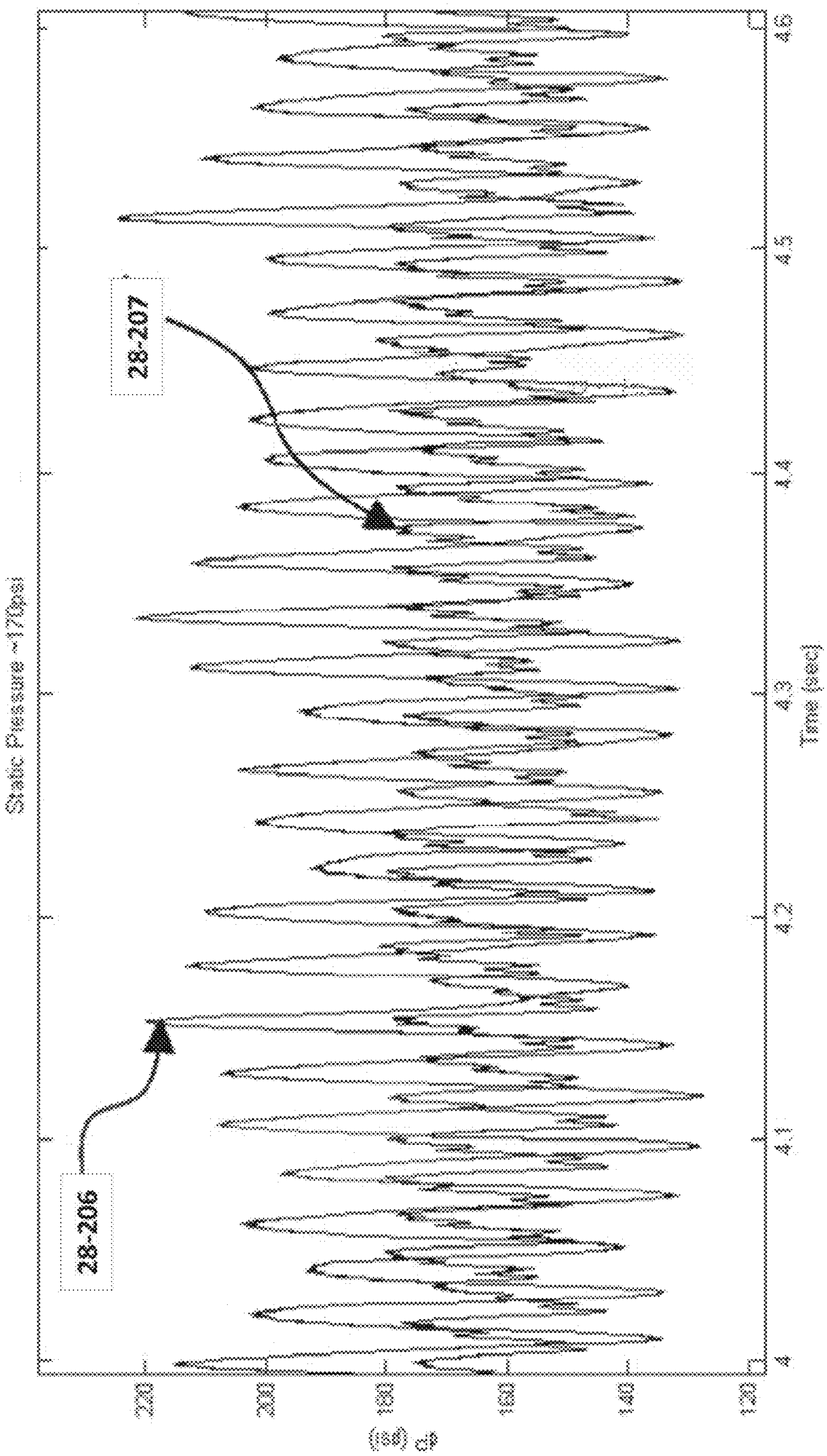

FIG. 163 depicts actual test data of buffer operation showing gerotor pressure ripple attenuation vs. a baseline gerotor.

Figure 164:
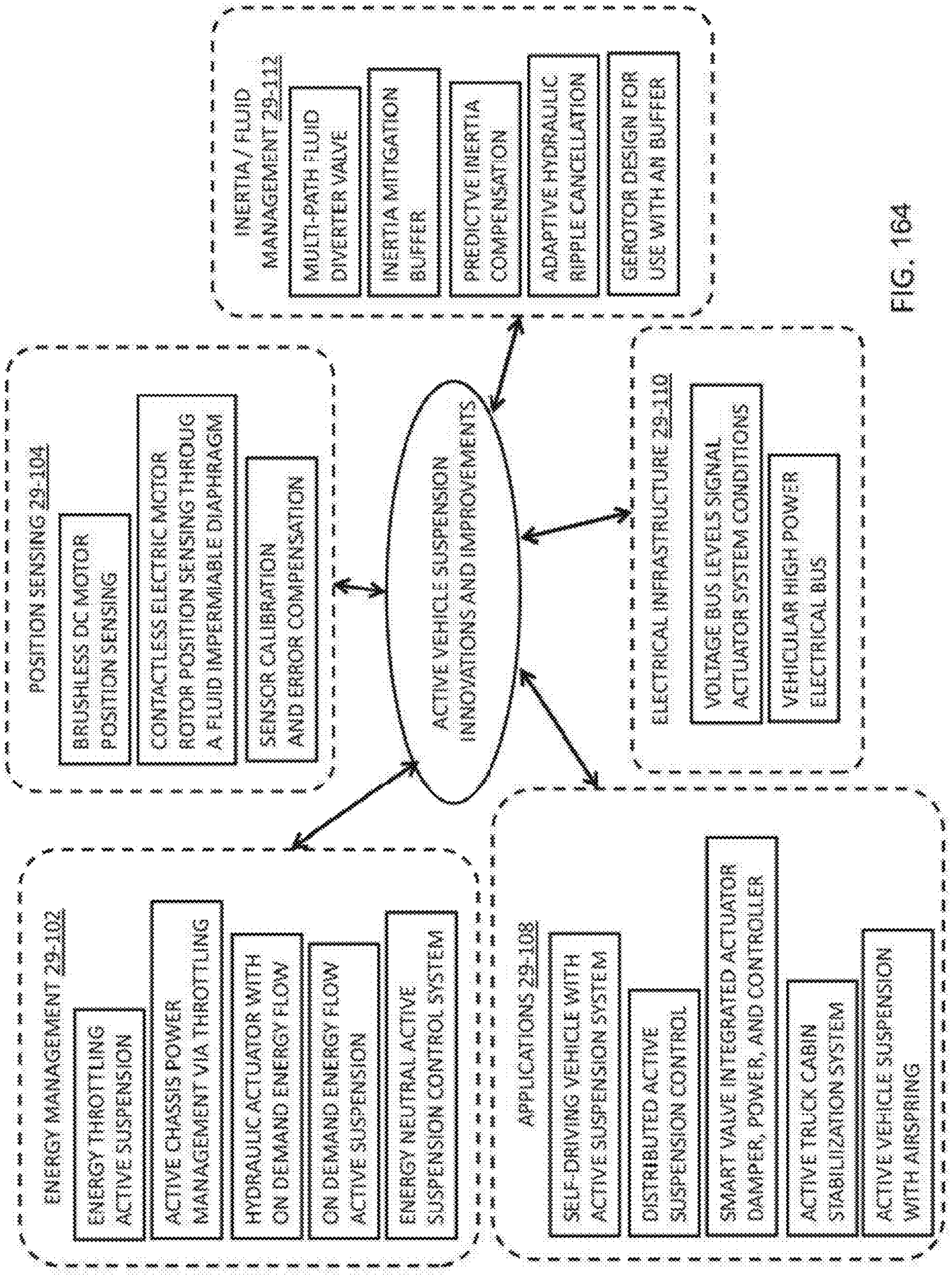

FIG. 164 is a block diagram of the methods and systems of vehicle suspension improvement described herein.

DETAILED DESCRIPTION

This disclosure includes a variety of technologies, methods, systems, applications, use cases, and the like related to electro-hydraulic actuators, such as those used in vehicle suspension systems and the like. Also in this disclosure the reader will find a range of actuator control protocols, architectures, algorithms, and the like to address control, energy management, performance, and many other aspect of actuator uses, including vehicle suspension system uses. Likewise, this disclosure covers a wide range of hydraulic-related elements for managing and facilitating fluid flow to further optimize actuator response and performance, among other things. This disclosure also provides examples of complete suspension actuator systems, including integrated systems, distributed systems, special use systems, and the like. Other examples and embodiments relate to integration with and energy management of vehicle-wide actuators. Yet other examples cover coordination of control of autonomous vehicle suspension systems to manage vehicle motion-related performance, and the like.

Various embodiments of a hydraulic actuator with on-demand energy flow are described herein, including an efficient integrated hydraulic actuator system utilizes on demand energy flow to reduce energy consumption and complexity. The system comprises a hydraulic actuator body, a hydraulic pump, an electric motor, and an on-demand energy controller. The pump is in lockstep with the hydraulic actuator such that energy delivery to the electric motor creates a rapid and direct response in the hydraulic actuator without the need for ancillary electronically controlled valves. A self-contained, on-demand hydraulic actuator that can operate in all four quadrants of the force/velocity domain, which has low startup torque and low rotational inertia with a high bandwidth controller, is disclosed. A hydraulic actuator operatively coupled to a hydraulic pump, an electric motor, and an on-demand energy motor controller may be in lockstep, at least during certain modes, with actuator. The pump may control the actuator over at least three quadrants without valves. These embodiment may also include an on demand energy controller that allows the actuator to be controlled in at least three quadrants and facilitates changing torque in the motor in response to an external sensor input to create a force response in the hydraulic actuator. Torque control may in lockstep (at least for the majority of operation) with kinematic response of the actuator. Optionally, features may include the pump, motor, controller, and actuator being integrated. A rotary position sensor and control based on the sensed rotary position may be included. Control schemes may include solutions to reduce rotary inertia and may include predictive algorithms, lightweight rotary materials for inertia mitigation, and the like. These embodiments may include torque control occurs at a rate faster than 1 Hz and may support bidirectional energy flow.

These embodiments of hydraulic on-demand energy flow actuators may relate to on demand energy flow mechanisms and schemes for active vehicle suspension. An energy-efficient active suspension system that takes advantages of on-demand energy flow may include a hydraulic actuator that is in direct coupling with a pump, which is in direct coupling with an electric motor. As an example the electric motor torque may be instantaneously controlled by a controller to create an immediate force change on the hydraulic actuator without the need for electronically controlled valves while only consuming energy when it is needed, thus reducing overall power consumption of the active suspension. In this way, the concepts of on-demand energy flow of a hydraulic actuator are extended to vehicle wheel and vehicle dynamics control with timely energy demand.

A further extension of on-demand energy flow concepts for actuators and vehicle suspension may include energy neutral active suspension control. An active suspension control system configured for energy neutrality may harvest energy during a regenerative cycle by withdrawing energy from the active suspension and storing it for later use by the active suspension. Energy neutrality comes in part from adjusting control parameters of the suspension, within a safety and comfort range to, over time, require no more energy than that harvested by the control system. Likewise energy generation can be controlled so that overall energy flow in to and out of the suspension system is substantially neutral. Although an active suspension-dedicated energy storage facility may be available, the vehicle electrical system may also be a target storage facility for harvested energy.

The techniques of energy management for individual actuators, and or for groups of actuators configured as vehicle suspension systems can be extended to facilitate vehicle wide active chassis power throttling. Techniques for vehicle active chassis power throttling may use of a power limit (power throttle) as a non-linear control mechanism for reducing the average power used for chassis actuators such as active suspension without unduly affecting the performance increase that such actuators provide. One or more controllers may dynamically measure power into each actuator, and keep a running average over time. Based on instantaneous and time averaged energy use as well as vehicle state, each actuator is throttled with a maximum power limit. Through use of external feed-forward inputs such as the knowledge of the upcoming road disturbance rather than or combined with a feedback signal such as the vehicle vertical acceleration, vehicle state and actuator need may be estimated such that particular devices are biased for more energy when critically needed, while targeting overall energy management through various actuator power throttling techniques.

Along the lines of energy management, various energy management and controls schemes are described herein. Of particular relevance for vehicle applications is the trade off of energy and comfort, yet these two factors are not typically directly related and any relationship may vary with conditions. Therefore described herein are concepts related to active and semi-active suspension control for consciously and constantly weighing the benefit of an active suspension intervention, determining its cost in terms of power consumption, and taking action to intervene in the way to best balance those two effects (benefit and cost). This approach reduces the power consumption requirements for the active suspension, thereby facilitating improvements in energy management. Described herein is an algorithm and method for reducing energy consumption in an active vehicle suspension system consisting of an event detector scheme coupled with a cost/benefit analysis of each event. This cost/benefit analysis may comprise of any of a number of methods, with optimizing power consumption only being one such method. These concepts include detection and classification of discrete wheel events or body events (either as they occur or in a predictive fashion), a method for calculating the expected cost and benefit for each event, and an algorithm for acting on the expected cost and benefit to provide the highest performance at the lowest cost. Once a detectable event is located by the algorithm, a calculation is made to determine the amount of active control performance to apply.

Infrastructure elements that relate to energy management, such on-demand energy flow and energy neutrality include power supply sources and delivery systems, among others. To facilitate transfer of knowledge regarding an energy state of a system, such as a vehicle suspension system to facilitate energy management techniques, such as those described herein, systems and methods of using the voltage of a loosely regulated DC bus in a vehicle to signal the state of an active chassis subsystem are also described. Energy management by power generators such as a DC-DC converter and regenerative suspension systems, and power consumers such as an active suspension actuators may be able to determine the state of their counterpart energy environment and the system as a whole by measuring voltage on the bus. It is described that by using the natural change in DC bus voltage to indicate system conditions without deliberately changing the bus voltage energy management techniques can be readily accomplished by the actuators, controllers and the like described herein.

A power bus may also be used more efficiently in high energy demand applications when the bus voltage is raised. Increasing suspension system bus voltage, and for that matter applying a higher voltage to other vehicle system modules, may facilitate better meeting peak power demands. Such as system may be configured with the various actuators described herein to facilitate distributing high power in a vehicle by using a uni- or bidirectional DC-DC converter connected between a low voltage vehicle batter bus (e.g. 12V) and a high voltage, high power bus (e.g. 48V). Such a system can be configured with multiple sources and sinks and energy storage optimized to meet the peak power and energy capacity requirements of powered devices, such as vehicle suspension systems, while minimizing size and cost.

Other aspects of electro-hydraulic actuators that are described herein that may benefit energy management, power utilization, efficient operation, improved performance and the like include electric motor-related sensing and control. These include, among other things measuring rotor position or velocity in an electric motor disposed in hydraulic fluid. Through use of a contactless position sensor that measures electric motor rotor position via magnetic, optical, or other means through a diaphragm that is permeable to the sensing means but impervious to the hydraulic fluid, data from the motor rotor position can be collected and used in various control schemes. The techniques of contactless position detection described herein may apply to motors, such as brushless DC motors that may be used in high pressure fluid environments such as electro-hydraulic vehicle suspension actuators.

However, for even greater accuracy and thereby improved performance across a range of actuator uses, applying sensor calibration techniques may effectively improve usefulness of relatively low cost position sensors. Therefore, described herein are techniques for improving accuracy of a sensor by calibrating it against one of the derivatives of the sensor signal. The process allows for the use of a lower accuracy sensor in a high accuracy environment, since the calibrated sensor will effect performance that is significantly better than the specified raw detection accuracy of the actual sensor. Of course these techniques of sensor calibration can be applied to a variety of sensor technologies, environments, applications, and uses.

In addition to improving performance through sensor calibration, bus voltage management, energy management, and the like, techniques that deal directly with the operations of the hydraulics in electro hydraulic actuators are also described and depicted. One area of hydraulics that can be addressed is the effect of ripple induced by operation of element such as the hydraulic motor, actuators, valves, and the like. In particular, hydraulic pumps/motors are used to convert between rotational motion/power and fluid motion/ power. Pressure differential is achieved across the pump/motor by applying torque to either aid or impede rotation which generally results in either a pressure rise or pressure drop respectively across the unit. This torque is often supplied by an electric motor/generator. Especially in positive displacement pumps/motors this pressure differential is not a smooth value but rather it contains high frequency fluctuations known as pressure ripple that are largely undesirable. With thorough analysis it can be discovered that these fluctuations occur in a predictable manner with respect to the position (angular or linear) of the pump/motor. Using a model that contains this information, a feed-forward method of high-frequency motor torque control can be implemented directly on the hydraulic pump/motor by adding to the nominal torque, a model-based torque signal that is linked to rotor position. This high-frequency signal acts directly on the hydraulic pump/motor to reduce or cancel the pressure/flow ripple of the pump/motor itself without the need for any secondary flow generating devices. In addition to ripple effects impeding electro-hydraulic actuator performance, inertial effects of moving components impact actuator responsiveness and other key aspects of vehicle suspension operation. Therefore, methods to compensate for the effects of rotary inertia in an actuator are addressed in this disclosure. Through use of advance information from sensors upstream with respect to a disturbance affecting the actuator to predict the effects of inertia, and to compensate for the disturbance, a control protocol can be established to create an effect of a more ideal actuator. The advance information allows for a fast reaction to these events. The advance information can come from a multitude of types sensors, that may facilitate sensing information upstream in a disturbance path and thus may sense information about an upcoming disturbance input before that input is felt at the ends of the actuator. The advance information is sent to a model, which calculates inertia compensation force commands. These are then added to other force commands, for example those coming from other parts of the control system such as the active control loop designed to isolate the target system from disturbance inputs.

Inertia mitigation can be accomplished in other ways, such as through use of fluid accumulators within the hydraulic fluid flow domain of an electro hydraulic actuator. Therefore, described herein is an inertia mitigation accumulator that reduces the effects of undesirable inertial forces to reduce damper harshness during high acceleration, low amplitude events. This inertia mitigation accumulator takes in fluid during high acceleration fluid flow, low amplitude pressure spikes to compensate for the hydraulic motor providing high impedance to this fluid flow. The inertia mitigation accumulate can also soften an impact of these spikes by outputting the fluid at a time when the hydraulic motor provides lower impedance to fluid flow. This economical system reduces the overall undesirable inertial effect on the damper and therefore reduces damper harshness during these high acceleration, low amplitude events.

Looking further at operation of the actuator elements, including hydraulic fluid flow and it's impact on vehicle suspension performance, valving techniques that conditionally effect fluid flow direction are considered. One such consideration has to do with fluid diversion based on fluid flow velocity and the like. In order to provide active damping authority with reasonable sized electric motor/generator and hydraulic pump/motor, a high motion ratio is preferred between damper velocity and motor rotational velocity. Although this may allow for accurate control of the damper at low to medium damper velocities, this ratio can cause overly high motor speeds and unacceptably high damping forces at high velocity damper inputs. To avoid this, passive valving can be used in parallel and in series with a hydraulic active or semi-active damper valve. Such passive valving techniques may include a diverter valve used to allow fluid to freely rotate a hydraulic pump/motor up to a predetermined velocity and then approximately hold the hydraulic motor at the predetermined velocity even as fluid flow into the diverter valve increases. A diverter valve may alternatively be used to allow fluid to freely rotate a hydraulic pump/motor up to a predetermined flow velocity into the hydraulic motor and then approximately hold the flow velocity into the hydraulic motor at the predetermined flow velocity even as fluid flow into the diverter valve increases. To effect such fluid velocity based directional control, various diverter valve configurations, materials, valve designs, force profiles, preload elements, and the like are described.

In addition to diverter valve design and operational consideration, details such as shape, size, and features of a gerotor and it's accompanying fluid buffer used in an electro-hydraulic actuator system can impact actuator performance, energy efficiency, inertia profile, and the like. Configuring aspects of a gerotor, such as lobe shape, fluid port size and location, relative to corresponding fluid buffer ports and the like can have a sizable impact on inertia mitigation due to fluid flow. Gerotor features, configuration, buffer interfacing, operational aspects, materials, and the like are described herein.

Individually these many techniques, features, algorithms, methods and systems related to electro-hydraulic actuator design and operation are powerful for effecting the desired outcomes. Together they raise electro-hydraulic actuator performance to a level not yet realized. An integrated vehicle suspension system can embody any of these innovations in a system configuration that is size and interface compatible with existing vehicle wheel well-based suspension devices. A fully integrated suspension actuator and controller has distinct advantages, particularly for active suspension systems that require operation in all four quadrants of a vehicle suspension force-velocity graph (e.g. rebound damping, compression damping, rebound pushing, and compression pulling). Hydraulic energy must be supplied to, or taken from, the wheel damper in order to provide suspension control in all four quadrants of operation. This hydraulic energy must be supplied from an energy source such as a hydraulic pump/motor controlled by an electric motor/generator and must be present or provided at an appropriate time in response to a wheel event (e.g. movement of the wheel relative to the vehicle or a force required by the suspension on the wheel that is not correlated with wheel motion, such as what is required during handling maneuvers or changing loads). Although it is possible to supply the hydraulic energy via a remotely located power supply connected to the damper, via hydraulic hoses etceteras, for reasons of packaging, cost and complexity it is advantageous to have the hydraulic power source as an integrated device with the damper. It is also advantageous to have the integrated hydraulic power source be self-contained whereby the hydraulic pump/motor is close coupled and housed with the electric motor/generator and contains the electric motor controller and any required sensors for motor control. In this integrated configuration the hydraulic pump/motor can apply the required hydraulic energy to the damper to affect the required suspension control directly without the use of valves. Such an integrated hydraulic power supply can be termed as a 'Smart Valve' and is disclosed.

The features of electro-hydraulic actuators, including such Smart Valve systems also facilitate deployment in important and valuable applications including active truck cabin stabilization, vehicle suspension with an air spring, self driving vehicles, and distributed vehicle suspension control, each of which is described herein.

One such application is an active suspension system for a truck cabin, which actively responds to and mitigates mechanical inputs between the truck chassis and the cab. The system greatly reduces pitch, roll, and heave motions, which lead to driver discomfort. The system can include two or more self-contained actuators that respond to commands from one or more electronic suspension controllers that command the actuators based on feedback from one or more sensors on the cabin and/or chassis.

Another such application is an active air suspension system comprising an air spring and an active damper that may be configured with the features and aspects of electro-hydraulic actuators described herein. Torque in the electric motor may be instantaneously controlled by a controller to create an immediate force change on the hydraulic actuator. This operates in conjunction with an air spring operatively connected in parallel to the active damper, whereby the air spring is actively controlled via an air compressor and valve(s) so as to actively vary the ride height of the suspension system. The control of the active damper and the air spring may be coupled such that they operate in a coordinated fashion.

Yet another application suitable for benefiting from the electro-hydraulic actuator advancements described herein is a self-driving vehicle. Such a self-driving vehicle can be integrated with a fully-active suspension system that utilizes data from one or more sensors typically used for autonomous driving (e.g. vision, lidar, GPS) in order to anticipate road conditions in advance. The fully-active suspension pushes and pulls the suspension in three or more suspension operational quadrants in order to deliver superior ride comfort, handling, and/or safety of the vehicle. Suspension and road data can also be delivered back to the vehicle in order to change autonomous driving behavior, such as to avoid large road disturbances ahead.

Any vehicle-based application of an active suspension system as variously described herein may benefit from being configured as a distributed active suspension control environment, such as one that has independently operable suspension systems at each wheel that are networked for cooperative vehicle dynamics control. A distributed controller for active suspension control can be a processor-based subsystem coupled to an electronic suspension actuator. The controller can process sensor data at a distributed node, making processing decisions for the wheel actuator it is associated with. Concurrently, multiple distributed controllers communicate over a common network such that vehicle-level control (such as roll mitigation) may be achieved. Local processing at the distributed controller has the advantage of reducing latency and response time to localized sensing and events, while also reducing the processing load and cost requirements of a central node. The topology of the distributed active suspension controller described herein has been designed to respond to failure modes with fail-safe mechanisms that prevent node-level failure from propagating to system-level failure, as well as preventing system level failure (e.g. failure of the communications network) from preventing each node from operating properly. Systems, algorithms, and methods for accomplishing this distributed and fail-safe processing are disclosed.

Figure 1:
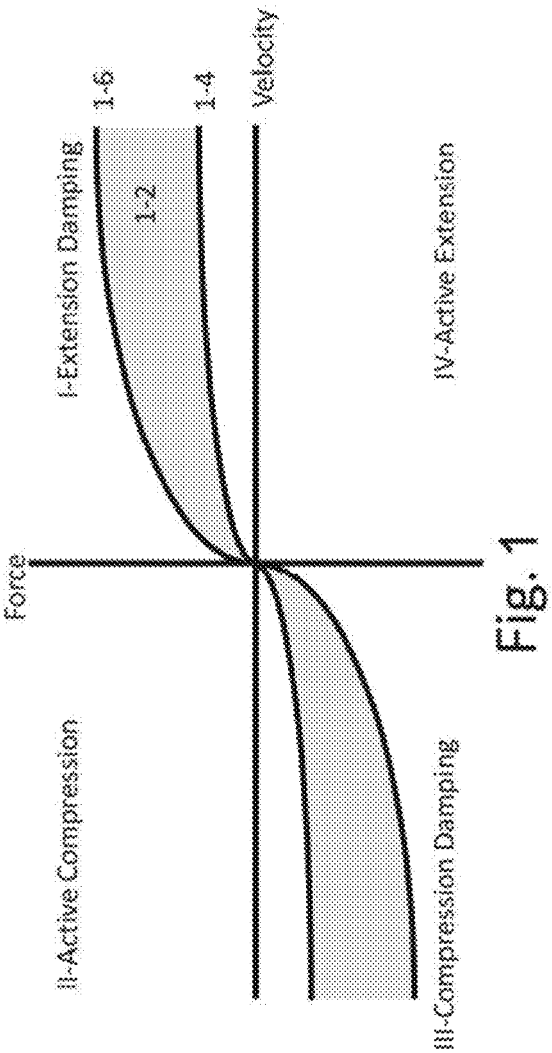
FIG. 1 is an exemplary graph of a conventional semi-active suspension force/velocity range.
Figure 29:
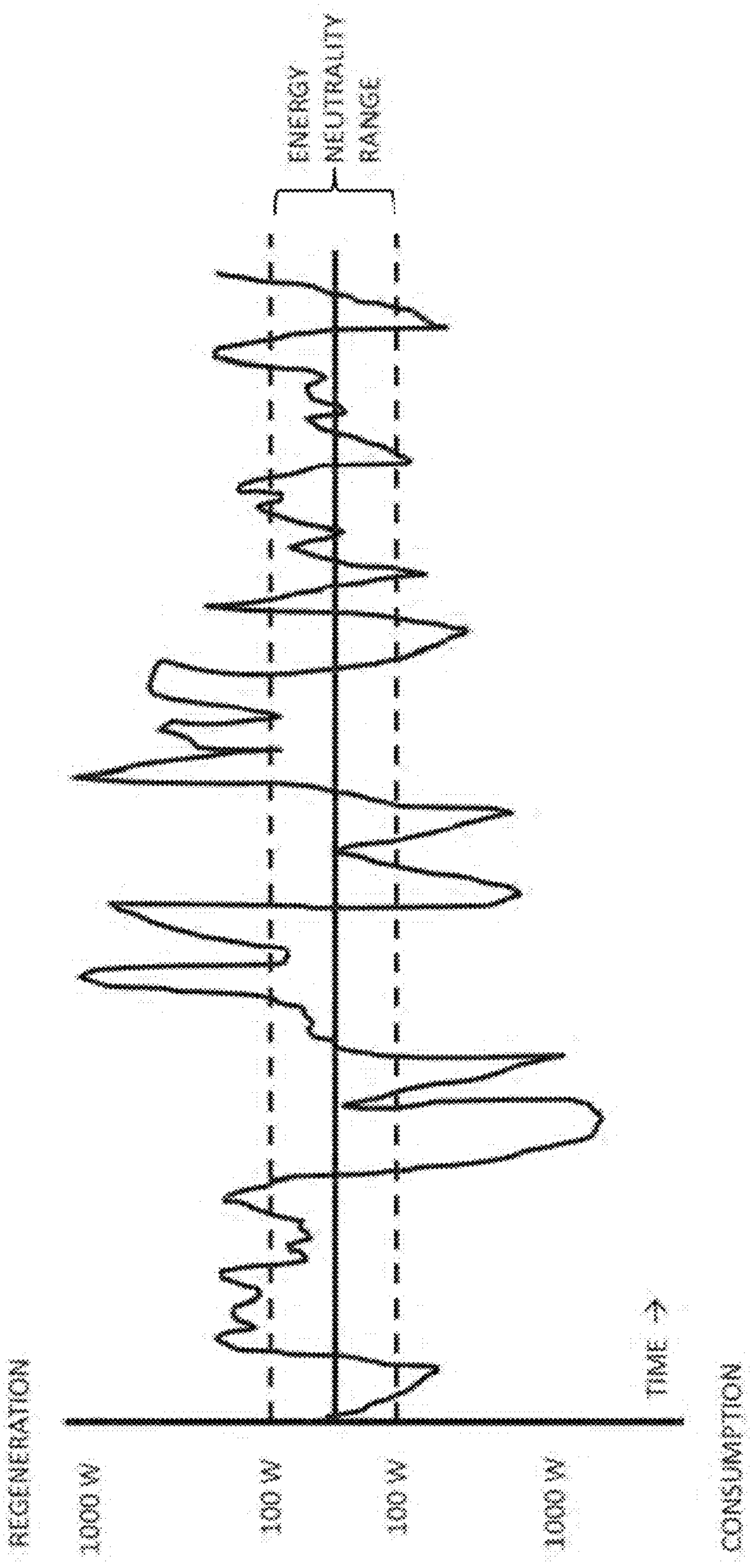
FIG. 29 is a waveform of energy flow in an exemplary active vehicle suspension system.

Referring to FIG. 29-1, the methods and systems of energy management 29-102, position sensing 29-104, applications 29-108, electrical infrastructure 29-110, and inertia/fluid management 29-112 can be utilized individually in various combinations, or in total to deliver active vehicle suspension innovations and improvements that are described, depicted, and claimed herein. Although the logical groups depicted in FIG. 164 generally indicate various innovations that may have similarities, these groups are merely for reference only and do not indicate any particular or required relationship among the innovations. In addition, as described and/or claimed herein, combinations of innovations within or from different logical groups are contemplated and included herein. Likewise, any aspect of an innovation, such as a sensor calibration algorithm may be combined with any other aspect of the same innovation or any other innovation such as a super capacitor configured for use in electrical infrastructure. While specific combinations are described and/or claimed herein any other combination of two or more elements, features, algorithms, systems, methods, systems and the like described herein are possible and recognized as included herein even when such combination is not explicitly described in text, depicted in figures, or claimed. In addition, outputs of one aspect, such as fluid flow from a valve may be combined into an operative embodiment with another aspect, such as inertia mitigation algorithms to effect claimable technical implementations implicitly disclosed herein.

Hydraulic Actuation Systems and Controls

The inventors have recognized several drawbacks associated with typical hydraulic actuator systems and hydraulic suspension systems. More specifically, the costs associated with hydraulic power systems used with typical hydraulic actuators and hydraulic suspension systems can be prohibitively expensive for many applications. Further, the packaging associated with remotely located hydraulic power systems necessitates the use of multiple hydraulic hoses and/or tubing over relatively long lengths which can present installation challenges and reliability issues. Additionally, as noted above applications requiring energy to be constantly available require the use of a continuously running pump. However, the inventors have recognized that requiring a pump to continuously operate requires energy to be applied to the pump even when no hydraulic energy is actually needed thus decreasing system efficiency. While some systems use variable displacement pumps to increase efficiency of the system, the systems tend to be more expensive and less reliable than corresponding systems using fixed displacement pumps which can limit their use for many applications. Additionally, systems which adjust the speed of the pump also face several technical challenges limiting their use including, for example, startup friction, rotational inertia, and limitations in their electronic control systems.

In view of the above, as well as other considerations, the inventors have recognized the benefits associated with decentralizing a hydraulic system in order to provide self-contained or partially self-contained hydraulic actuation systems. For example, and as described in more detail below, instead of including a remotely located hydraulic power system, a hydraulic power system, or some portion of a hydraulic power system, may be integrated with, or attached to, a hydraulic actuator. Depending on the particular construction, this may reduce or eliminate the need for external hydraulic connections between the hydraulic power system and the hydraulic actuator. This may both provide increased reliability as well as reduced installation costs and complexity associated with the overall hydraulic system.

The inventors have also recognized the benefits associated with providing a hydraulic actuator and/or an active suspension system capable of providing on demand power which may reduce energy consumption since it does not require continuously operating a pump. A hydraulic system capable of providing on demand power may include a hydraulic actuator body, a hydraulic motor-pump, an associated electric motor operatively coupled to the hydraulic motor-pump, and a controller. Additionally, the hydraulic motor-pump may be operated in lockstep with the hydraulic actuator such that energy delivery to the electric motor may rapidly and directly control a pressure applied to, and thus response of, the hydraulic actuator without the need for ancillary electronically controlled valves. A hydraulic system capable of providing on demand power may also reduce the complexity of a system while providing a desired level of performance.

In addition to the above, the inventors have recognized the benefits associated with providing a hydraulic actuator and/or suspension system capable of being controlled at a sufficiently fast rate to enable the system to respond to individual events as compared to control in a system based on average behavior over time. This may be especially beneficial in use for a vehicle suspension system responding to individual wheel and/or body events which may enable enhanced vehicle performance and comfort. Additionally, depending on the particular application, a hydraulic system may also provide control within three or more quadrants of a force velocity domain as described in more detail below. However, it should be understood that the hydraulic system may also operate in one, two, or any appropriate number of quadrants of the force velocity domain as the disclosure is not so limited.

In embodiments implementing the disclosed hydraulic actuator and suspension systems, the inventors have recognized that a response time to supply a desired force and/or displacement by the hydraulic system may be limited due to inherent delays associated with compliances and inertias various components in the system. Consequently, in embodiments where it is desired to have a particular response time, the inventors have recognized that it may be desirable to design the compliances and inertias of a hydraulic system to enable a desired level of performance as described in more detail below.

While issues with typical hydraulic actuators and suspension systems as well as several possible benefits associated with various embodiments have been noted, the embodiments described herein should not be limited to only addressing the limitations noted above and may also provide other benefits as neither the disclosure nor the claims are limited in this fashion.

For the purposes of this application, the term hydraulic motor-pump may refer to either a hydraulic motor or a hydraulic pump.

In one embodiment, a hydraulic system includes a hydraulic actuator, a hydraulic motor-pump, an electric motor, and an associated controller. The hydraulic actuator includes an extension volume and a compression volume located within the housing of the hydraulic actuator. The extension volume and the compression volume are located on either side of a piston constructed and arranged to move through an extension stroke and a compression stroke of the actuator. The hydraulic actuator housing may correspond to any appropriate structure including, for example, a hydraulic actuator housing including multiple channels defined by one or more concentric tubes. The hydraulic actuator is associated with a hydraulic motor-pump that is in fluid communication with the extension volume and the compression volume of the hydraulic actuator to control actuation of the hydraulic actuator. More specifically, when the hydraulic motor-pump is operated in a first direction, fluid flows from the extension volume to the compression volume and the hydraulic actuator undergoes an extension stroke. Correspondingly, when the hydraulic motor-pump is operated in a second direction, fluid flows from the compression volume to the extension volume and the hydraulic actuator undergoes a compression stroke. Additionally, in at least some embodiments, the hydraulic motor-pump may operate in lockstep with the hydraulic actuator to control both extension and compression of the hydraulic actuator. It should be understood that any appropriate hydraulic motor-pump might be used including devices capable of providing fixed displacements, variable displacements, fixed speeds, and/or variable speeds as the disclosure is not limited to any particular device. For example, in one embodiment, the hydraulic motor-pump may correspond to a gerotor.

As noted above, the hydraulic system also includes an electric motor which is operatively coupled to the hydraulic motor-pump. The electric motor may either be directly or indirectly coupled to the hydraulic motor-pump as the disclosure is not so limited. In either case, the electric motor controls force applied to the hydraulic motor-pump. Further, depending on how the electric motor is controlled, the hydraulic motor-pump may either actively drive the hydraulic actuator or it may act as a generator to provide damping to the hydraulic actuator while also generating energy that may either be stored for future use or dissipated. In instances where the electric motor is back driven as a generator, the hydraulic motor-pump is driven in a particular direction by fluid flowing between the compression volume and the extension volume of a hydraulic actuator in response to an applied force. In turn, the hydraulic motor-pump drives the electric motor to produce electrical energy. By controlling an impedance, or other appropriate input, applied to the electric motor during generation, the damping force applied to the hydraulic actuator may be electronically controlled to provide a range of forces. In some embodiments, the hydraulic motor-pump is operated in lockstep with the hydraulic actuator.

The above-noted controller is electrically coupled to the electric motor and controls a motor input of the electric motor in order to control a force applied to the hydraulic actuator as well as the particular mode of operation. The motor input may correspond to any appropriate parameter including, for example, a position, a voltage, a torque, an impedance, a frequency, and/or a motor speed of the electric motor. The electric motor may be powered by any appropriate energy source including, for example external energy sources such as an external power supply, a battery on a car, and other appropriate sources as well as internal sources which might be integrated with a controller and/or a hydraulic actuator such as batteries, super capacitors, hydraulic accumulators, flywheels, and other appropriate devices. In view of the above, the pressure supplied to the hydraulic actuator may be controlled by the electric motor connected to the hydraulic motor-pump without the need for separately controlled valves.

The hydraulic motor-pump may also be operated in a bidirectional manner, though embodiments in which the hydraulic motor-pump is only operated in a single direction is also possible through the use of appropriate valving. In such an embodiment, a position of the hydraulic actuator may be determined by a position of the electric motor. Consequently, depending on how the electric motor is controlled, the associated hydraulic actuator may be held still, actively extended, or actively compressed. Alternatively, the hydraulic actuator may be subjected to either compression damping or extension damping as well. Thus, a hydraulic system constructed and operated as described above may be used to control the hydraulic actuator in either direction without the use of complex valving arrangements and power is only applied to the system when needed as contrasted to a continuously operating pump. For example, in one specific embodiment, over half of the fluid pumped by the hydraulic motor-pump may be used to actuate a hydraulic actuator instead of bypassing the actuator through one or more valves.

In instances where a hydraulic actuator is used in load holding applications, such as in off-highway lifting applications, forklifts, lift booms or robotics applications for example, it may be desirable to incorporate load holding valves to hydraulically lock the actuator in place until the actuator is commanded to move. Load holding devices may also be desirable for safety and/or fail safe reasons. In one embodiment, a load holding device is one or more load holding valves. These one or more load holding valves may either be passive in nature, e.g. pilot operated check valves, or they may be active such that they require a control input, e.g. solenoid operated valves. In other embodiments, the load holding device is a mechanical device constructed and arranged to lock the hydraulic actuator in place. For example, the load holding device may be a mechanical brake constructed and arranged to grip the piston rod. In such an embodiment, the mechanical device may be hydraulically, mechanically, and/or electrically deactivated when it is desired to move the hydraulic actuator. While several possible load holding devices are described above, it should be understood that any appropriate device capable of limiting and/or preventing actuation of a hydraulic actuator might be used.

While a specific embodiment is described above, it should be understood that embodiments integrating various types of valving and/or a continuously operating pump are also possible as the disclosure is not so limited.

In one embodiment, a hydraulic actuation system and/or a suspension system includes an electric motor, a hydraulic motor-pump (which may be a hydrostatic unit commonly referred to as an HSU), a hydraulic actuator, and a motor controller. Depending on the embodiment, the various ones of the above-noted components may be disposed in, or integrated with, a single housing. Additionally, the electric motor and the hydraulic motor-pump may be closely coupled to one another. The ability to combine the electric motor, hydraulic motor-pump, and motor controller into a compact, self-contained unit, where the electric motor and the hydraulic motor-pump are closely coupled on a common shaft may offer many advantages in terms of size, performance, reliability and durability. In some embodiments, the motor controller has the ability for bi-directional power flow and has the ability to accurately control the motor by controlling either the motor voltage, current, resistance, a combination of the above, or another appropriate motor input. This may permit the motor controller to accurately achieve a desired motor speed, position, and/or torque based upon sensor input (from either internal sensors, external sensors or combination both). The above combination of elements may be termed a 'smart valve' as the unit can accurately control hydraulic flow and/or pressure in a bi-directional manner. Additionally, this control may be achieved without the need for separate passive or actively controlled valves. Though embodiments in which additional valves may be used with the smart valve are also contemplated.

As noted above, an electric motor and hydraulic motor-pump within the smart valve may be close coupled on a common shaft. Additionally, these components may be disposed in a common fluid-filled housing, thereby eliminating the need for shafts with seals. This may increase the valve's durability and performance. Additionally, some embodiments a smart valve also includes an integrated electronic controller which may combine both power and logic capabilities and may also include sensors, such as a rotary position sensors, accelerometers, or temperature sensors and the like. Integrating the electronic controller into the smart valve minimizes the distance between the controller power board and the electric motor windings, thereby reducing the length of the power connection between the electric motor and the power board section of the integrated electronic controller. This may reduce both power loss in the connection and electromagnetic interference (EMI) disturbances from within the vehicle.

The combination of a smart valve and a hydraulic actuator into a single body unit may provide a sleek and compact design that offers multiple benefits. For example, such an embodiment reduces integration complexity by eliminating the need to run long hydraulic hoses, improves durability by fully sealing the system, reduces manufacturing cost, improves response time by increasing the system stiffness, and reduces loses both electrical and hydraulic from the shorter distances between components. Such a system also allows for easy integration with many suspension architectures, such as monotubes, McPherson struts or air-spring systems. For ease of integration into the vehicle, it is desirable for the integrated active suspension smart valve and hydraulic actuator to fit within the constraints of size and/or shape of typical passive damper-based suspension systems. Therefore, in some embodiments a smart valve is sized and shaped to conform to the size, shape, and form factor constraints of a typical passive damper-based suspension system which may, among other things, permit the smart valve based actuator to be installed in existing vehicle platforms without requiring substantial re-design of those platforms.

According to one aspect a smart valve may include an electronic control unit or controller, an electric motor operatively coupled to a hydraulic motor-pump, and one or more sensors configured into a single unit. The hydraulic motor-pump includes a first port and a second port. The first port is in fluid communication with an extension volume of a hydraulic actuator and the second port is in fluid communication with a compression volume of the hydraulic actuator. In such an embodiment, the smart valve may be controlled to create controlled forces in multiple (e.g., typically three or four) quadrants of a vehicle suspension force velocity domain, whereby the four quadrants of the force velocity domain of the hydraulic actuator correspond to compression damping, extension damping, active extension, and active compression. Various embodiments of a smart valve are possible and may optionally include the items identified above including a piston disposed within the hydraulic actuator. The piston is movably positioned between the first chamber and a second chamber within the actuator. The first chamber may be an extension volume and the second chamber may be a compression volume.

According to another aspect, a smart valve may again include a controller, an electric motor, a hydraulic motor-pump, and one or more sensors. The smart valve may be operated by the electronic controller to provide a motor output such as a desired speed or torque of the electric motor by controlling a motor input of the electric motor such as the voltage or current through the motor windings. This may create a torque that resists rotation of the motor.

According to another aspect the controller may control an electric motor by a motor input of at least one of position, voltage, torque, impedance or frequency. Additionally, the various components of a smart valve may be disposed in or integrated with a single housing or body. Alternatively the controller, electric motor, and sensors may be housed in a housing that can be assembled to a housing for the hydraulic motor-pump to facilitate communication among the active suspension system components.

In another embodiment, a smart valve may include an electric motor, electric motor controller, and hydraulic pump in a housing. Depending on the embodiment, the housing is fluid filled. An alternate configuration of a smart valve may include a hydraulic pump, an electric motor that controls operation of the hydraulic pump, an electric motor controller, and one or more sensors in a single body housing. In yet another configuration of a smart valve, the smart valve may include an electric motor, a hydraulic motor-pump, and a piston equipped hydraulic actuator in fluid communication with the hydraulic motor-pump.

According to another aspect, a smart valve may be sized and shaped to fit in a vehicle wheel well. In such an embodiment, a smart valve may include a piston rod disposed in an actuator body, a hydraulic motor, an electric motor, and an electric controller for controlling the electric motor. The smart valve may also include one or more passive valves disposed in the actuator body. The passive valves may either operate in either series or parallel with the hydraulic motor.

According to another aspect, a smart valve incorporated into an active suspension system may be configured so that the electronic controller that controls the electric motor is closely integrated with the smart valve and/or electric motor. This may beneficially minimize the length of a high current path from the control electronics to the electric motor.

According to another aspect, it may be desired to integrate one or more smart valves and/or hydraulic actuators with a vehicle active suspension system that controls all wheels of the vehicle. Such a system may include a plurality of smart valves, each being disposed proximal to a vehicle wheel so that each smart valve is capable of producing wheel-specific variable flow and/or pressure for controlling the associated wheels. This may be accomplished by controlling the flow of fluid through the smart valve. Similar to the above, the flow of fluid through the individual smart valves may be controlled using the electric motor associated with the hydraulic motor-pump of each smart valve. Depending on the particular embodiment, it may be desirable for the electric motor to be coaxially disposed with the hydraulic motor-pump.

While several possible embodiments of a smart valve are described herein, it should be understood that a smart valve may be configured in a variety of other ways. Some exemplary ways may include: an electronic motor controller integrated with a motor housing so that there are no exposed or flexing wires that carry the motor current to the motor controller; a smart valve's components that are fully integrated with or connected to an actuator body or housing; a smart valve's components that are integrated with our connected to a hydraulic shock absorber body; a smart valve's electronics may be mounted to an actuator; a hydraulic pump and electric motor of a smart valve are disposed on the same shaft; a smart valve that requires no hydraulic hoses; a hydraulic motor that is roughly axially aligned with a piston rod of an actuator; a hydraulic motor that is roughly perpendicular to a piston rod travel direction; as well as a smart valve that is mounted between the top of a strut and a lower control arm of a vehicle wheel assembly to name a few.

According to another aspect, particular applications a smart valve may require particular size, shape, and/or orientation limitations. Exemplary smart valve embodiments for various applications are now described. In one embodiment, a smart valve is incorporated with a suspension and occupies a volume and shape that can fit within a vehicle wheel well and between the actuator top and bottom mounts. In another embodiment, smart valve integrated with a suspension and occupies a volume and shape such that during full range of motion and articulation of an associated actuator in the suspension system, adequate clearance is maintained between the smart valve and all surrounding components. In yet another embodiment, a suspension actuator supports a smart valve co-axially with the actuator body and connects to an actuator top mount. In another embodiment, a suspension actuator supports a smart valve co-axially with the actuator body and occupies a diameter substantially similar to that of an automotive damper top mount and spring perch. An active suspension control of motor-pump may be configured to be less than 8 inches in diameter and 8 inches in depth, and even in some cases, substantially smaller than this footprint.

According to another aspect, a smart valve may be self-contained and may not require externally generated knowledge, sensor input, or other data from a vehicle. A smart valve with an integrated processor-based controller may function independently of other systems. This may include functions such as self-calibration regardless of whether there are other smart valves (e.g. corner controllers) operating on other wheels of the vehicle. A smart valve may deliver a wide range of suspension performance which may include operating as a passive damper, a semi-active suspension/regenerative actuator, a variable suspension, and/or as a fully active suspension and the like. This functionality is facilitated because it is self-contained and all of the required power, logic control, and all hydraulic connections are contained within the actuator assembly. A self-contained smart valve may be combined with a wide range of advanced vehicle capabilities to deliver potentially more value and/or improved performance. Combining a smart valve with predictive control, GPS enabled road condition information, radar, look-ahead sensors, and the like may be readily accomplished through use of a vehicle communication bus, such as a CAN bus. Algorithms in the smart valve may incorporate this additional information to adjust suspension operation, performance, and the like. In an example, if a rear wheel smart valve had knowledge of actions being taken by a front wheel smart valve and some knowledge of vehicle speed, the suspension system of the rear wheel could be prepared to respond to a wheel event before the wheel experiences the event.

According to another aspect, a flexible membrane, or compliant electrical connections combined with other pressure sealed barriers, may be used to mechanically decouple motion of the membrane or barrier from a controller located within a hydraulically pressurized housing. The hydraulically pressurized housing may include a separate pressurized fluid filled portion and an air filled portion. Decoupling the movement from the controller may help to prevent the braking of solder joints between the motor connections passing through the membrane or pressure sealed barrier connected to the controller's printed circuit board. According to another aspect, co-locating a controller electronics within a hydraulically pressurized housing, also eliminates the need for complex mechanical feed-throughs and provides a more predictable thermal environment.

According to another aspect hydraulic pressure ripple from a hydraulic motor-pump is reduced by using a rotary position sensor to supply signals for a hydraulic ripple cancellation algorithm, and/or using a port timed accumulator buffer.

The above-described hydraulic actuation system may be used in any number of applications. For example, a hydraulic system may be constructed and arranged to be coupled to an excavator arm, the control surfaces of an aircraft (e.g. flaps, ailerons, elevators, rudders, etc.), forklifts, lift booms, and active suspension systems to name a few. Therefore, while a specific embodiment of a control system directed to an active suspension system as described in more detail below, it should be understood that the noted control methods and systems described below may be integrated into any appropriate system and should not be limited to only an active suspension system.

Figure 2:
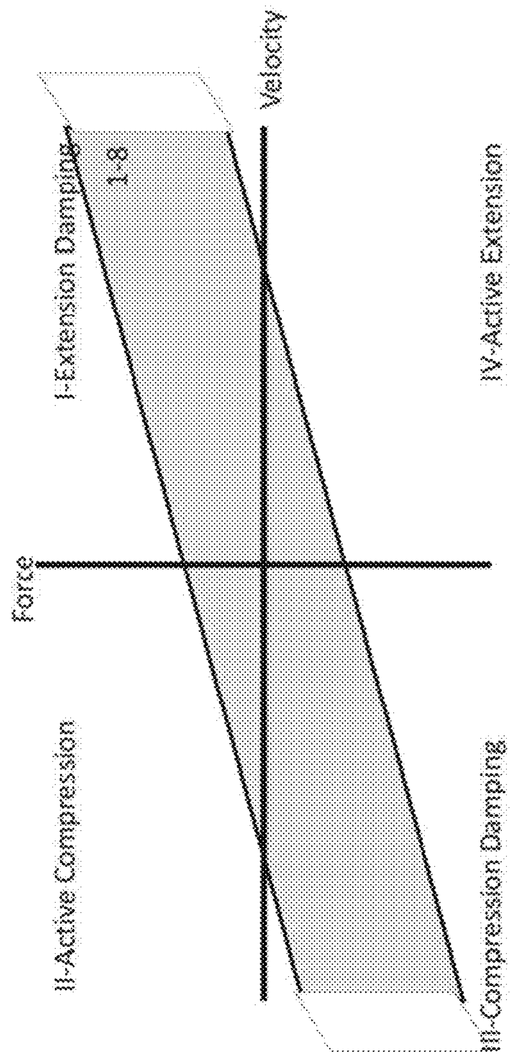
FIG. 2 is an exemplary graph of an active suspension using four-quadrant control.

FIGS. 1 and 2 present plots of various ways to control a hydraulic actuator integrated into a suspension system within a force velocity domain. As illustrated in the figure, the force velocity domain includes a first quadrant I corresponding to extension damping where a force is applied by the hydraulic actuator to counteract extension of hydraulic actuator. Similarly, quadrant III corresponds to compression damping where a force is applied by the hydraulic actuator to counteract compression of the hydraulic actuator a compressive force. In contrast, quadrants II and IV correspond to active compression and active extension of the hydraulic actuator where it is driven to a desired position.

FIG. 1 is a representative plot of the command authority 1-2 of an actuator integrated into a typical semi-active suspension. As illustrated in the figure, the command authority 1-2 of the semi-active suspension is located within quadrants I and III corresponding to extension and compression damping. Therefore, such a system only applies forces to counteract movement (i.e. reactive forces). Typically, performance of a semi-active suspension may be varied between damping characteristic curves corresponding to full soft 1-4 and full stiffness 1-6 through opening and closing of a simple electronically controlled valve to regulate fluid flow through the system. Systems incorporating electrically controlled valves typically consume energy in order to operate and energy associated with damping of the hydraulic actuator is dissipated as heat. In addition, the operating range of a semi-active system is limited due to leakage at high forces and would be subject to fluid losses and frictional effects at lower forces.

A hydraulic actuator as described herein might be operated to emulate the performance of a semi-active system as shown in FIG. 1. However, such a system would regenerate energy instead of consuming energy. For example, if the terminals of an electric motor operatively coupled to a hydraulic motor-pump were left in an open circuit state (e.g. a relatively high impedance state), a damping curve similar to the full soft 1-4 curve may be achieved. If instead the terminals of the electric motor were connected to a low impedance, a damping curve similar to the full stiff 1-6 curve may be achieved. For damping curves between these bounds, a hydraulic actuator such as those described herein may generate energy from wheel movement. Description of the high and low impedance states is a functional description; in some embodiments this may be achieved with a switching power converter such as an H-bridge motor controller, where the switches are controlled to achieve the desired torque characteristic. However, it should be understood that any appropriate mechanism capable of controlling the applied impedance or other appropriate motor input might be used. In either case, the output torque even in a semi-active mode may be controlled in direct response to a wheel event to create force only when necessary and without the need to continuously provide energy to the system from a continuously operating pump.

While it may be possible to emulate the performance of a semi-active suspension system, in some embodiments it is desirable to operate a hydraulic actuator in a full active mode. In such an embodiment, a controller associated with an electric motor controls an input of the electric motor in order to provide controlled forces using the hydraulic actuator in at least three quadrants of the force velocity domain as described in more detail below. However, in at least one embodiment, the hydraulic actuator may be operated to create a controlled force in all four quadrants as the disclosure is not so limited.

FIG. 2 is a representative plot of the command authority 1-8 of a hydraulic actuator incorporated into a full active suspension system. In the first quadrant I, the system is able to provide extension damping which might correspond to a reactive force to rebound of a vehicle wheel. In the third quadrant III the system is able to provide compression damping which might correspond to a reactive force to compression of a vehicle wheel. As previously described, a hydraulic system may be adapted to generate energy in at least part of quadrants I and III though embodiments in which this energy is dissipated are also possible. However, unlike the semi-active systems described above, the system is also able to create a force in at least one of the two remaining quadrants corresponding to active compression II which might correspond to applying a force to pull a vehicle wheel up and/or active extension IV which may correspond to applying a force to push a wheel down. In these quadrants, the system may consume energy to apply the desired force. This energy may come from any appropriate source including, for example: electrical energy from a vehicle or energy storage device such as a capacitor or battery; hydraulic energy storage from devices such as an accumulator or similar device; and/or mechanical means of energy storage such as a flywheel.

In light of the above description, in some embodiments a full active system operated in at least three of the four quadrants of a force velocity domain provides bidirectional energy flow. More specifically, in quadrants I and III energy is regenerated by the electric motor being driven during compression damping and extension damping, and in quadrants II and IV energy is applied to and consumed by the electric motor to actively extend or compress the hydraulic actuator. Such a hydraulic actuation system may be particularly beneficial as compared to previous hydraulic actuation systems integrated with a suspension system because it does not require the use of separate actively controlled valves to control the flow of fluid to and from various portions of the hydraulic actuator body.

While embodiments of a hydraulic actuator as described herein are capable of operating in all four quadrants of the force velocity domain, as noted above, the energy delivered to the hydraulic actuator is controlled by the force, speed and direction of operation of the electric motor and hydraulic motor-pump. More specifically, the electric motor and the hydraulic motor-pump as well, as well as other associated components, continuously reverse operation directions, accelerate from one operation speed to another, and go from a stop to a desired operation speed throughout operation of the hydraulic actuator. Consequently, a response time of the hydraulic actuator will include delays associated with the ability of these various components to quickly transition between one operation state and the next. This is in comparison to systems that simply open and close valves associated with a hydraulic line including a constant flow of fluid and/or pressure to control an associated hydraulic actuator. Therefore, in some embodiments, it is desirable to design a system to provide a desired response time in order to achieve a desired system performance while taking into account response delays associated with other devices as well. While several types of events are noted above, it should be understood that other types of behavior associated with operation of the electric motor and the hydraulic motor-pump are also possible.

While a fast response time is desirable in any number of applications, as described in more detail below, in one embodiment a system including an associated hydraulic actuator, electric motor, and hydraulic motor-pump is designed with a sufficiently fast response time in order to function in an active suspension system. In such an embodiment, the response time may be selected such that the active suspension system is capable of responding to individual events. While these events may correspond to any appropriate control input, in some embodiments, these events are individual body events and/or wheel events. In one such embodiment, a sensor is configured and arranged to sense wheel events and/or body events of a vehicle. The sensor is electrically coupled to the controller of a hydraulic actuator integrated into a suspension system. Upon sensing a wheel event and/or a body event, the controller applies a motor input to the electric motor which is coupled to the hydraulic motor-pump. This in turn directly controls the flow of fluid within the hydraulic actuator as the hydraulic motor-pump applies a force to the hydraulic actuator. Therefore, the hydraulic actuator is able to be controlled in response to the individual sensed wheel events and/or body events that result in either wheel or body movement. As described in more detail below, individual body events and/or wheel events typically occur at frequencies greater than 0.5 Hz, 2 Hz, 8 Hz, or any other appropriate frequency. Individual body events and/or wheel events also typically occur at frequencies less than about 20 Hz. Therefore, in one embodiment, a hydraulic actuation system integrated into a suspension system is engineered to respond to individual body events and/or wheel events occurring at frequencies between about 0.5 Hz to 20 Hz inclusively.

In view of the rate at which individual body events and/or wheel events occur, in some embodiments, it is desirable that a response time of the hydraulic system be at least equivalent in time to these events. In some embodiments, it may be desirable that the response time is faster than the rate at which individual events occur due to other delays present in the system which may be taken into account when responding to individual events. In view of the above, in some embodiments, a response time of the hydraulic system may be less than about 150 ms, 100 ms, 50 ms, or any other appropriate time period. The response times may also be greater than about 1 ms, 10 ms, 20 ms, 50 ms, or any other appropriate time period. For example, a response time of the hydraulic system may be between about 1 ms and 150 ms, 10 ms and 150 ms, 10 ms and 100 ms, or 10 ms and 50 ms. It should be understood that response times greater than or less than those noted above are also possible. Additionally, it should be understood that hydraulic actuators exhibiting fast response times such as those noted above may be used in applications other than a suspension system as the disclosure is not limited to any particular application.

As described in more detail in the examples, and without wishing to be bound by theory, the response time of a hydraulic actuation system is proportional to the natural frequency of the hydraulic actuation system. Therefore, in order to provide the desired response times, a natural frequency of the hydraulic actuation system may be greater than about 2 Hz, 5 Hz, 10 Hz, 20 Hz, or any other appropriate frequency. Additionally, the natural frequency may be less than about 100 Hz, 50 Hz, 40 Hz. For example, in one embodiment, the natural frequency of the hydraulic actuation system is between about 2 Hz and 100 Hz inclusively.

Without wishing to be bound by theory, design considerations that impact the natural frequency of a hydraulic actuation system include the reflected inertia as well as the compliance of the hydraulic actuation system. As noted in the examples, the natural frequency of the hydraulic actuation system may be defined using the formula:

$$2\pi f = \sqrt{\frac{K}{Jn^2}}$$

where f is the natural frequency of the hydraulic actuation system, 1/K is the total compliance of the hydraulic actuation system, J is the total hydraulic actuation system inertia, and n is the motion ratio of the hydraulic actuation system. The quantity $Jn^2$ is the hydraulic actuation system reflected inertia.

A hydraulic actuation system's reflected inertia $Jn^2$ includes the rotary moment of inertia J of all the components rotating in lockstep with the motion of the actuator, multiplied by the square of the motion ratio n translating rotation of the electric motor into linear motion of the actuator. For example, the reflected inertia can include the moment of inertia of: the rotor; the coupling shaft between the electric motor and hydraulic motor-pump; any bearings coupled with the rotor, shaft, and/or pump; the hydraulic motor-pump; as well as other appropriate components. In one embodiment, the motion ratio n in a hydraulic actuation system as described herein is characterized by the annular area of the piston around the piston rod in the hydraulic piston, divided by the displacement volume of the hydraulic motor-pump per revolution. However, other ways of defining the motion ratio n as would be known in the art are also contemplated. In a system where linear motion is prevalent, or where the transmission components moving linearly in response to actuation of the hydraulic motor-pump have significant mass, the total reflected inertia may also include the mass of the linearly moving components.

The total quantity $Jn^2$ can also be composed of multiple components moving in lockstep with the motion of the piston, each with their own rotating moment of inertia and their own transmission ratio n. For example, a bearing system constraining the in-plane motion of the motor shaft has components that rotate at a different angular velocities from that of the motor shaft. Depending on their total contribution to the reflected system inertia, it may be desirable to include these contributions in the reflected system inertia used for the design of the system using their respective moments of inertia and transmission ratios. For example, and without wishing to be bound by theory, if the bearing system is a roller type bearing, then the rollers will move in lockstep with the shaft but at an angular velocity that is close to half that of the shaft itself. At the same time, the individual rollers move at a much faster angular velocity, while still in lockstep with the shaft. Thus each of these components may be accounted for using their own moments of inertia and their own motion ratios.

In a system where linear motion is prevalent, and where the transmission between actuation force and motor force uses a linear lever, the linear mass of the moving components in the motor may also be accounted for through their linear motion ratio n translating motion at the actuator end to motion at the motor end of the lever. In this sense, the expression $Jn^2$ is intended more generally as the sum of all the rotating moments of inertia and all the moving masses, each multiplied by the square of the motion ratio translating the linear or rotary motion at the actuator into linear or rotary motion of the particular moving element.

The hydraulic actuation system compliance 1/K is the compliance of all the elements that are in series with the electric motor and located between the electric motor and a force output point of the hydraulic actuator (e.g. the moving shafts of the actuator). Various contributions to the hydraulic actuation system compliance can include: a total compressibility of a fluid column between the hydraulic motor-pump and a piston of the hydraulic actuator; a flexibility of the hoses, tubes, or structures connecting the hydraulic motor-pump to the hydraulic actuator; a flexibility of the mounting surfaces of the hydraulic actuator to a force application point; and other appropriate considerations which may contribute to the total compliance of the hydraulic actuation system. It should be noted that an inverse of the hydraulic actuation system compliance is the hydraulic actuation system stiffness K.

In view of the above, in order to provide the desired natural frequencies, and thus response times, a hydraulic actuation system may be designed using the interplay between the compliance and reflected inertia. More specifically, a product of the reflected inertia and the compliance of the hydraulic actuation system $Jn^2/K$, which may also be viewed as a ratio of the reflected inertia to the stiffness of hydraulic actuation system, may be designed according to the following design ranges. In some embodiments, the product of the reflected inertia and the compliance of the hydraulic actuation system may be less than $6.3\times10^{-3}$ s$^2$, $1.0\times10^{-3}$ s$^2$, $2.5\times10^{-4}$ s$^2$, $6.3\times10^{-5}$ s$^2$, $2.8\times10^{-5}$ s$^2$, $1.6\times10^{-5}$ s$^2$, or any other appropriate value. Additionally, the product of the reflected inertia and the compliance of the hydraulic actuation system may be greater than $1.6\times10^{-5}$ s$^2$, $1.0\times10^{-5}$ s$^2$, $2.5\times10^{-6}$ s$^2$, or any other appropriate value. For example, in one embodiment, the product of the reflected inertia and the compliance of the hydraulic actuation system is between about $2.5\times10^{-6}$ s$^2$ and $6.3\times10^{-3}$ s$^2$ inclusively. However, it should be understood that hydraulic actuation systems designed with values both greater than and less than those noted above are also contemplated. Using the above design criteria, a designer may use the inertia of the various components in the system as well as translation ratio and compliance of the system to provide a desired response time. While any of the parameters may be varied to obtain a desired response, it is worth noting that the design parameter has a linear dependence on the inertia of the components and the compliance of the hydraulic actuation system and a dependence on the square of the translation factor. Consequently, changes in the translation factor may provide correspondingly larger changes in the overall response of the system. An example of the interplay of these parameters in designing a hydraulic actuation system are provided in more detail in the examples.

Figure 3:
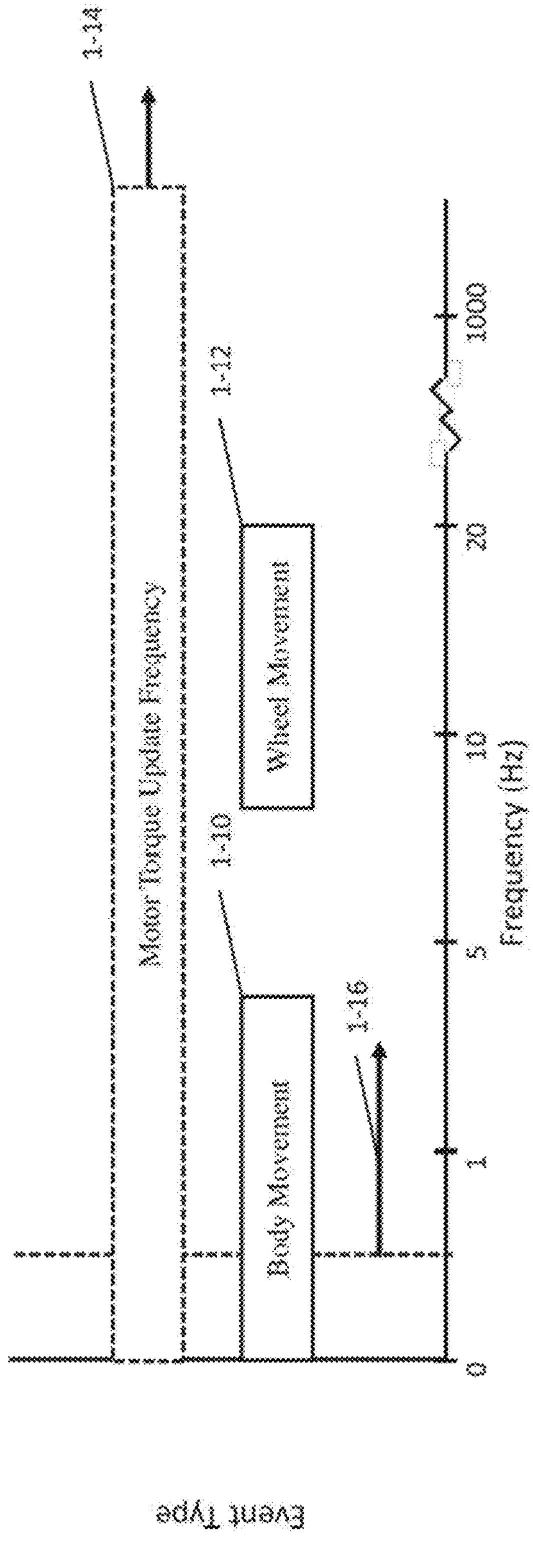
FIG. 3 is an exemplary graph of frequency-domain for various inputs and motor control of an active suspension system.

In addition to providing an appropriate response time of a hydraulic actuation system, in some embodiments, it is desirable to control the hydraulic actuation system at frequency that is similar to or greater than the frequency of a control event such as a body and/or wheel event. FIG. 3 shows a frequency plot relating motor torque updates 1-14 with body control and wheel control frequency bands associated with the typical frequencies of body movement 1-10 and wheel movement 1-12 of a vehicle. For a typical passenger vehicle, body movements 1-10 occur between 0 Hz and 4 Hz is, although higher-frequency body movement may occur well beyond this band. Wheel movement often occurs between 8 Hz and 20 Hz, and is roughly centered around 10 Hertz. However, it should be understood that the body and wheel movement frequencies will differ from vehicle to vehicle and based on road conditions. A wheel event and/or body event may be defined as any input into the wheel or body that causes a wheel and/or body movement (including the result of a steering input). From a frequency perspective, wheel events and body events often occur at roughly 0.5 Hertz and above, see 1-16, and may even occur at frequencies in excess of one thousand Hertz. Consequently, the motor input update frequency may vary from frequencies as low as 0.5 Hz up to, and even possibly greater than, 1,000 Hz, see 1-14. From a functional perspective, any change in a commanded motor input, such as motor torque, in response to a wheel event and/or a body event (as measured by one or more sensors) may be considered a response to a wheel event and/or body event.

In view of the above, in some embodiments, it is desirable that the hydraulic actuator be controlled at a frequency that is similar to or greater than the frequency at which the individual body events and/or wheel events occur. Therefore, in at least one embodiment, a controller is electrically coupled to an electric motor used to operate the hydraulic actuator, and the controller updates a motor input of the electric motor at a rate that is faster than individual body events and/or wheel events. The motor input may be updated with a frequency that is greater than about 0.5 Hz, 2 Hz, 8 Hz, 20 Hz, or any appropriate frequency that the controller and associated electric motor are capable of being operated at. In some embodiments, the motor input may be updated with a frequency that is less than about 1 kHz, though other frequencies are also possible. Therefore, in one exemplary embodiment, a motor input is controlled with a frequency between about 0.5 Hz and 1 kHz inclusively.

In one exemplary embodiment, a control system commands a motor input, such as motor torque, to be updated at 10 Hz, though other frequencies are possible. At each update, the commanded motor input is set to be the current vertical body velocity (body acceleration put through a software integrator) multiplied by a scaling factor k such that the actuator creates a force opposite to the body velocity. Such an embodiment may improve the body control of a vehicle. In another embodiment regarding wheel control, the commanded motor input, such as motor torque, is set to be the current actuator velocity (differential movement between the wheel and body) and multiplied by a factor k in order to counteract movement. Here, the system responds much like a damper. It should be understood that the above embodiments might be used together to provide both body control and wheel control in order to provide full vehicle control. In other embodiments the commanded motor input is updated at slower rates such as 0.5 Hz or faster rates such as 1 kHz. More complex control systems may also utilize other sensor data in addition to, or instead of, body acceleration as noted previously, and may include proportional, integral, derivative, and more complex feedback control schemes as the disclosure is not so limited.

Figure 4:
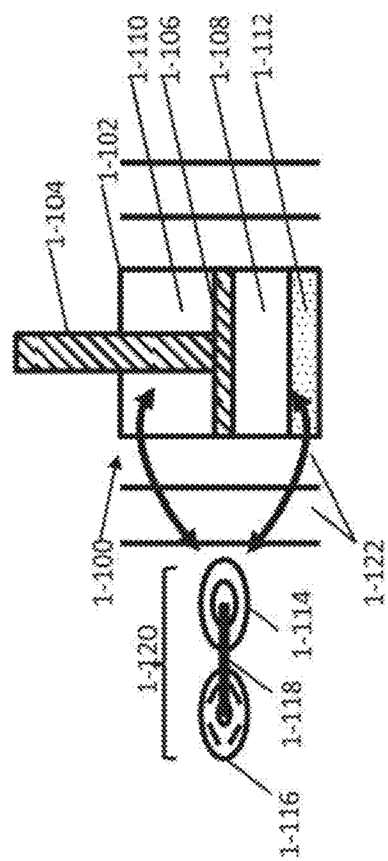
FIG. 4 is a schematic representation of a hydraulic actuator.

FIG. 4 depicts an embodiment of a hydraulic actuator 1-100 capable of being operated in all four-quadrants of the force velocity domain as a fully active actuator. A piston including a piston rod 1-104 and piston head 1-106 is disposed in a fluid-filled housing 1-102. Upon movement of the piston, a piston head 1-106 forces fluid into and out of an extension volume 1-110 located on one side of the piston head and a compression volume 108 located on the opposing side of the piston head through one or more concentric fluid flow tubes 1-122 or other appropriate connection. The fluid flow tubes 1-122, or other appropriate connection or port arrangement, are connected to a hydraulic motor-pump 1-114. Therefore, the hydraulic motor-pump 1-114 is in fluid communication with the compression volume 1-108 and the extension volume 1-110 of the hydraulic actuator as indicated by the arrows in the figure. The hydraulic motor-pump 1-114 is operatively coupled to an electric motor 1-116 via an appropriate coupling 1-118.

Depending on the particular embodiment, the electric motor 1-116 and/or the hydraulic motor-pump 1-114 may either be disposed on, integrated with, or remotely located from the hydraulic actuator 1-100 as the disclosure is not so limited. Alternatively, as described else where the hydraulic motor-pump 1-114, electric motor 1-116, and the coupling 1-118 may be integrated into a single smart valve capable of controlling the flow of fluid between the extension volume in the compression volume of hydraulic actuator without the need for separately operated valves. However, embodiments including separate valves are contemplated.

It should be understood that any hydraulic motor-pump, electric motor, and coupling might be used. For example, the hydraulic motor-pump may be any device capable of functioning as a hydraulic pump or a hydraulic motor including, for example, a gerotor, vane pump, internal or external gear pump, gerolor, high torque/low speed gerotor motor, turbine pump, centrifugal pump, axial piston pump, or bent axis pump. In embodiments where the hydraulic motor-pump is a gerotor, the assembly may be configured so that the root and/or tip clearance can be easily adjusted so as to reduce backlash and/or leakage between the inner and outer gerotor elements. However, embodiments in which a gerotor does not include an adjustable root and/or tip clearance are also contemplated.

In addition to the above, the electric motor 1-116 may be any appropriate device including a brushless DC motor such as a three-phase permanent magnet synchronous motor, a brushed DC motor, an induction motor, a dynamo, or any other type of device capable of converting electricity into rotary motion and/or vice-versa. However, in some embodiments the electric motor may be replaced by an engine-driven hydraulic motor-pump. In such an embodiment, it may be desirable to provide an electronically controlled clutch or a pressure bypass in order to reduce engine load while high active actuator forces are not needed. Similar to rapidly controlling the motor inputs of the electric motor (e.g. rapid torque changes of the electric motor), the hydraulic motor drive (either through an electronic clutch, an electronically-controlled hydraulic bypass valve, or otherwise), may be rapidly controlled on a per wheel event basis in order to modulate energy usage in the system.

In addition to the various types of hydraulic motor-pumps and electric motors, the coupling 1-118 between the electric motor and the hydraulic-pump motor may be any appropriate coupling. For example, a simple shaft might be used, or it may include one or more devices such as a clutch (velocity, electronically, directionally, or otherwise controlled) to alter the kinematic transfer characteristic of the system, a shock-absorbing device such as a spring pin, a cushioning/damping device, a combination of the above, or any other appropriate arrangement capable of coupling the electric motor to the hydraulic motor-pump. In some embodiments, in order to decrease response times, it may be desirable to provide a relatively stiff coupling 1-118 between the electric motor and the hydraulic motor-pump. In one such embodiment, a short close-coupled shaft is used to connect the electric motor to the hydraulic motor-pump. Depending on the particular embodiment, the coupling of the hydraulic motor-pump to the shaft may also incorporate spring pins and/or drive key features so as to reduce backlash between them.

When energy is applied to the terminals of the electric motor 1-116, the coupling 1-118 transfers the output motion to the hydraulic motor-pump 1-114. In some embodiments, the hydraulic motor-pump 1-114 and the electric motor 1-116 may also be back driven. Therefore, rotation of the hydraulic motor-pump due to an applied pressure from an associated hydraulic actuator may be transferred via the coupling 1-118 to rotate an output shaft of the electric motor 1-116. In such an embodiment, the electric motor may be used as a generator in which case the rotation of the electric motor by the hydraulic motor-pump may be used to regenerate energy. In such an embodiment, the effective impedance of the electric motor may be controlled using any appropriate method including, for example, pulse width modulation amongst several different loads, in order to control the amount of energy recovered and the damping force provided.

In view of the above, operation of the electric motor 1-116 and/or the hydraulic motor-pump 1-114 results in movement of fluid between the extension volume and the compression volume through the hydraulic motor-pump which results in movement of the piston rod 1-104 during different modes of operation. More specifically, in a first mode, rotation of the hydraulic motor-pump 1-114 in a first direction forces fluid from the extension volume 1-110 to the compression volume 1-108 through the one or more fluid flow tubes 1-122 and hydraulic motor-pump 1-114. This flow of fluid increases a pressure of the compression volume applied to a first side of the piston head 1-106 and lowers a pressure of the extension volume applied to a second side of the piston head 1-106. This pressure differential applies a force on the piston rod 1-104 to extend the actuator. In a second mode, rotation of the hydraulic motor 1-114 in a second direction such that fluid is moved from the compression volume 1-108 to the extension volume 1-110. Similar to the above, this flow of fluid increases a pressure of the extension volume 1-110 applied to the second side of the piston head 1-106 and lowers a pressure of the compression volume 1-108 applied to the first side of piston head 1-106. This pressure differential applies a force to the piston rod 1-104 to compress, or retract, the actuator. In yet another mode of operation, the hydraulic motor 1-114 opposes the movement of fluid between the compression volume 1-108 and the extension volume 1-110 such that it provides a damping force to the piston rod 1-104.

In view of the above, when a force generated by the pressure provided by the hydraulic motor-pump (caused by torque from the electric motor acting on the hydraulic motor-pump), is sufficient to overcome the force applied to the piston rod 1-104, the hydraulic actuator is actively driven. In contrast, when a force generated by pressure provided by the hydraulic motor-pump is less than a force acting on the piston rod 1-104, the hydraulic actuator is back driven and may be subjected to a damping force. Therefore, in some embodiments, the hydraulic motor-pump is a positive displacement hydraulic motor constructed and arranged to be back driven. While an embodiment including a hydraulic motor-pump and electric motor that may be back driven is described above, embodiments in which the hydraulic actuation system is not back drivable are also contemplated. In addition, in some embodiments secondary passive or electronic valving is included in the hydraulic actuation system which may in certain modes decouple piston movement from electric motor movement (i.e., movement of the piston head might not create an immediate and correlated movement of the electric motor).

Since fluid volume in the fluid-filled housing 1-102 changes as the piston 1-104 enters and exits the housing, the embodiment of FIG. 3 includes an accumulator 1-112 to accept the piston rod volume. In one embodiment, the accumulator 1-122 is a nitrogen-filled chamber with a floating piston able to move in the housing and sealed from the hydraulic fluid. While an internal accumulator has been depicted, any appropriate structure, device, or compressible medium capable of accommodating a change in the fluid volume present within the housing 1-102, including an externally located accumulator, might be used as the disclosure is not so limited.

Figure 123:
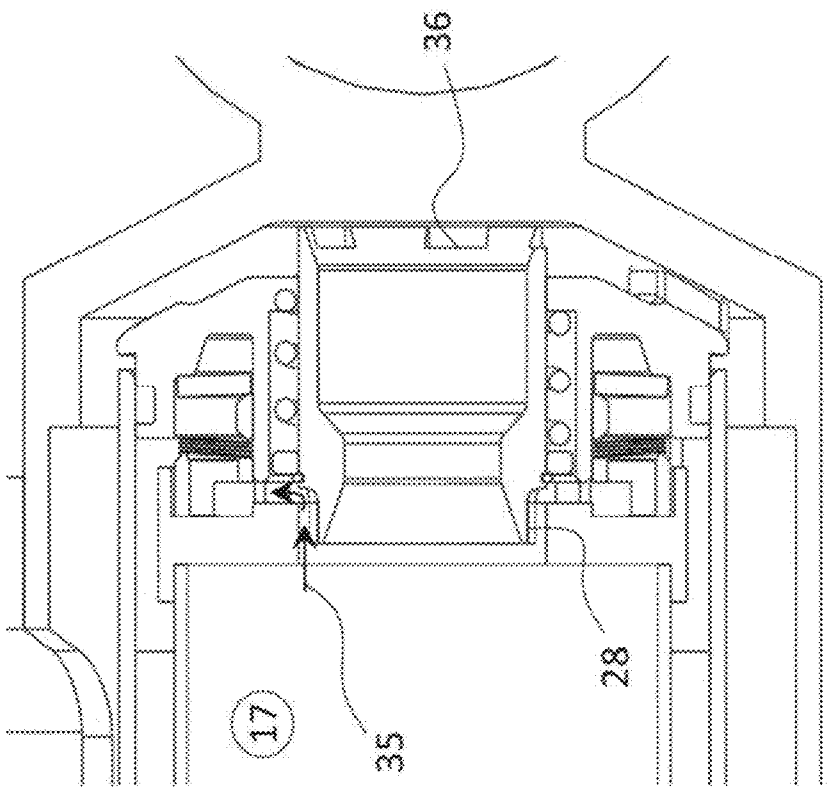

The embodiment depicted in FIG. 123 may be adapted in order to accommodate a number of different fluid flow paths and should not be limited to any particular arrangement or method of providing fluid flow between various portions of the housing and the hydraulic motor-pump. For example, in one embodiment, the fluid flow tubes 1-122 may be pipes or hydraulic hoses. In another embodiment, the fluid flow tubes 1-122 may be the concentric area between the inner and outer tubes of a twin-tube damper or the concentric area between each of the three tubes of a triple-tube damper. In the above embodiments, fluid may flow in both directions through the hydraulic motor-pump. In embodiments where a monotube damper architecture is used, a high gas pre-charge, for example, greater than 35 bar, may be used to increase the hydraulic fluid stiffness and hence reduce lag and latency. In other embodiments a gas pre-charge around 25 bar, or any other appropriate pressure, may be used. The hydraulic actuator may also be beneficially combined with various damper tube technologies including, but not limited to: McPherson strut configurations and damper bodies; de-aeration devices for removing air that may be introduced during filling or otherwise without requiring a dedicated air collection region inside the vibration damper; high pressure seals for a damper piston rod and/or piston head; a low cost low inertia floating piston tube (e.g. monotube); and the like.

Figure 5:
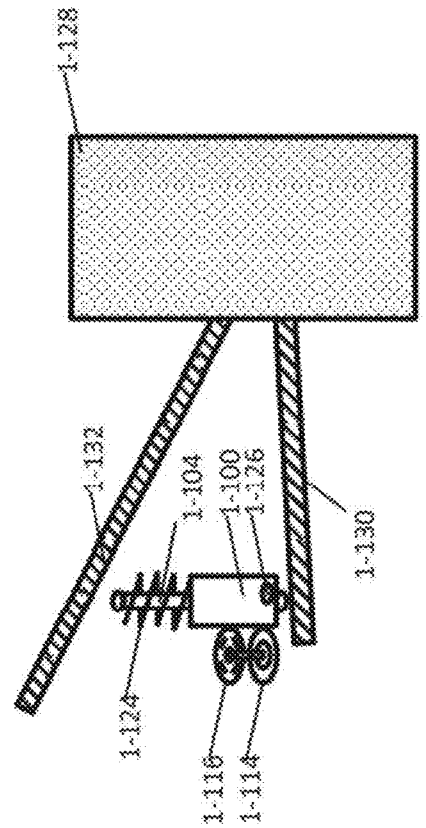
FIG. 5 is a schematic representation of a hydraulic actuator integrated into a vehicle suspension.

FIG. 5 presents one embodiment of a hydraulic actuation system integrated into a suspension system which includes a hydraulic actuator 1-100, hydraulic motor-pump 1-114, and electric motor 1-116 integrated into a suspension system, which may be an active suspension system. The suspension system is connected to a wheel 1-128 and located within the wheel-well of a vehicle. As depicted in the figure, the actuation system is located where a damper is typically located and is constructed and arranged to be coupled to the suspension system between the lower 1-130 and upper 1-132 suspension members. The upper and lower suspension members may be an upper top mount and lower control arm in a suspension system though other configurations are possible. As depicted in the figure, the hydraulic actuator housing 1-102 is connected to the lower suspension member 1-130 on one side of the hydraulic actuator and the piston, and the piston rod 1-04 is connected to the upper suspension member 1-132 on an opposing side of the hydraulic actuator. However, it should be understood that the hydraulic actuator could be oriented in the opposite direction as well. Additionally, the connections between the hydraulic actuator and the suspension members might correspond to any appropriate connection including for example, a bushing. In some embodiments, a bushing constructed to reduce noise and resonance vibrations associated with actuator movement might be used. Similar to the above, the hydraulic actuator 1-100 is also operatively connected to a hydraulic motor-pump 1-114 and electric motor 1-116. As depicted in the figure, the hydraulic motor-pump and electric motor may be connected to, or integrated with, the hydraulic actuator. In the depicted embodiment, the hydraulic motor-pump 1-114 and electric motor 1-116 are located between the suspension members 1-130 and 1-132. However, embodiments in which the hydraulic motor-pump 1-114 and/or electric motor are remotely located from the hydraulic actuator 1-100 are also contemplated.

As illustrated in the figure, in some embodiments, a spring 1-124 is disposed coaxially around the piston rod 1-104 and extends between the upper suspension member 1-132 and the hydraulic actuator body 1-102. Therefore, the spring will apply a force to the upper suspension member 1-132 that is dependent on the amount of compression. In such a configuration, the spring 1-124 is located in parallel to the hydraulic actuator. However, embodiments in which the spring is located in series with the hydraulic actuator are also contemplated. For example, a spring might be located between the piston rod 1-104 and the upper suspension member 1-132 or between the hydraulic actuator housing 1-102 and the lower suspension member 1-130. When the spring is located in series with the hydraulic actuator, a separate actuator and/or damper may be located in parallel with the spring and in series with the hydraulic actuator.

Depending on the embodiment, a hydraulic actuator may include one or more passive and/or electronically controlled valves 1-126 integrated with the hydraulic actuator housing 1-102, see FIG. 5. Types of valves that might be associated with the hydraulic actuator include, but are not limited to, at least one of progressive valving, multi-stage valving, flexible discs, disc stacks, amplitude dependent damping valves, volume variable chamber valving, proportional solenoid valving placed in series or in parallel with the hydraulic pump, electromagnetically adjustable valves for communicating hydraulic fluid between a piston-local chamber and a compensating chamber, and pressure control with adjustable limit valves. Additionally, a baffle plate for defining a quieting duct for reducing noise related to fluid flow might be used. A diverter valve constructed and arranged to divert a portion of the fluid flow between the compression volume and the extension volume past the hydraulic motor-pump might also be used to limit either a pressure, flow, and/or amount of energy applied to the hydraulic motor-pump. Depending on the embodiment, the hydraulic actuator force may be at least partially controlled by the one or more valves 1-126. Additionally the one or more valves 1-126 may be pressure-operated, inertia-operated, acceleration-operated, and/or electronically controlled.

The above-noted active suspension system may also incorporate any number of other associated components and/or alterations. For example, in one embodiment the active suspension system is integrated with at least one of:

an inverted actuator, a telescoping actuator, an air spring, a self-pumping ride height adjustable device, and/or other appropriate device. Additionally, the hydraulic actuation system may include various types of thermal management such as: thermal isolation between the actuator body and control/electronics; airstream cooling of electronics; and other appropriate thermal management devices and/or methods. In another embodiment, the hydraulic actuation system includes an appropriate connection for connecting to either a smart valve including a hydraulic motor-pump and electric motor or to separate hydraulic motor-pump and electric motor combination. While any appropriate connection might be used, in one embodiment the connection corresponds to one of direct wiring, flexible cables, and/or one or more modular connectors for connecting to a vehicle wiring harness, externally mounted power switches, and other appropriate power and/or control sources.

Figure 6:
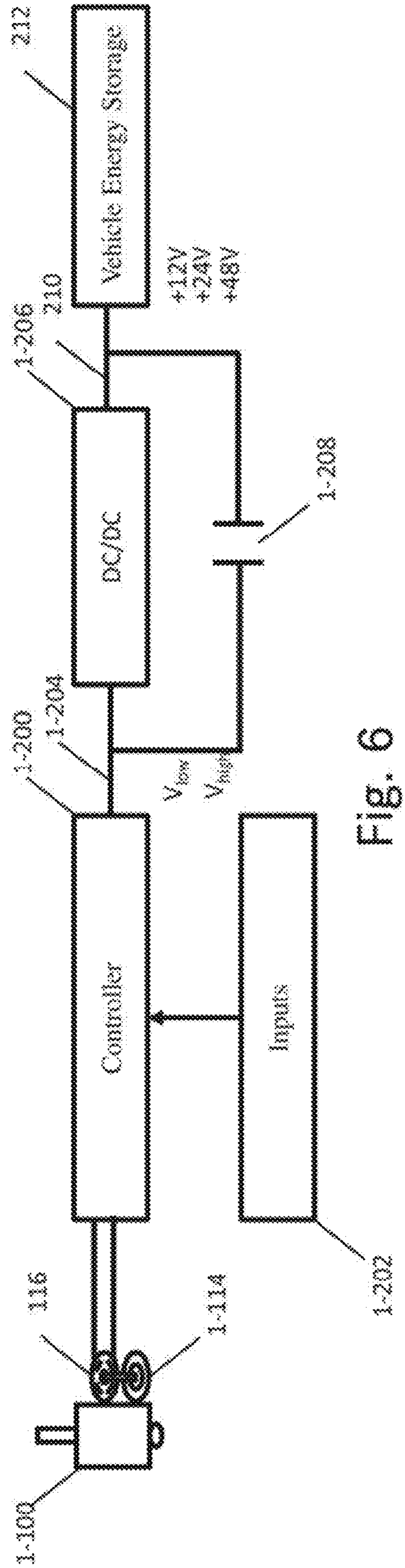
FIG. 6 is an exemplary block diagram of an active suspension system.

As noted above, in some embodiments a hydraulic actuation system is capable of responding on a per wheel and/or body event basis. Therefore, it is desirable that the motor input to an electric motor controlling hydraulic actuation either changes at an update rate greater than or equal to the frequency at which events occur, or that it occurs in direct response to a sensed event. FIG. 6 demonstrates a generic control architecture for controlling such a hydraulic actuation system. Depending on the particular embodiment, the various components may either be provided separately, or one or more of them may be integrated or attached together as the disclosure is not so limited. In the depicted embodiment, the hydraulic actuation system includes an electronic controller 1-200. In some embodiments, the controller is a corner controller configured to control an active suspension system associated with a single wheel. As depicted in the figure, the controller is electrically coupled to an electric motor 1-116, which is a three-phase electric motor with an encoder in the current embodiment. One possible electrical topology of such an embodiment includes a three-phase bridge, with six MOSFET transistors where each motor phase is connected to the junction between two MOSFETs in series. In such an embodiment, the high side MOSFET is connected to the voltage rail and the low side MOSFET is connected to ground and the controller rapidly pulse-width-modulates a control signal to the gate of each MOSFET in order to drive the motor for 1-116. However, other types of electric motors and control methods might also be used including, for example, a sensorless control instead of an encoder.

The controller 1-200 is configured to receive signals from one or more inputs 1-202 corresponding to various different information sources in order to determine how to control a motor input of the electric motor 1-200 and thus the hydraulic actuator. These sensors may provide information related to sensing individual wheel events, body events, and/or other pertinent information. The controller 1-200 may receive inputs from sensors that are external to the hydraulic actuator or from sensors that are integrated with, or disposed on, the hydraulic actuator. Sensors located external to the hydraulic actuator may either be sensors dedicated to the hydraulic actuator, or they may be sensors integrated with the vehicle body as the disclosure is not so limited. The above noted sensors correspond to one or more of the following sensor architectures: wheel acceleration sensing; body acceleration sensing, fluid pressure sensing; position sensing; smart valve local sensing; motor position sensing; multi-sensor whole vehicle sensing; centralized inertial measurement unit sensor architecture; the vehicle CAN bus, one or more sensors associated with a wheel (e.g. accelerometers), and one or more sensors associated with an axle (e.g. accelerometers). In another embodiment, the input received by the controller 1-200 is a signal from a central controller associated with one or more other controllers and hydraulic actuators and may provide information related to other body events, wheel events, or other relevant information sensed by the other controllers, or input to the central controller.

In one particular embodiment, the inputs received by the controller 1-200 include information from a rotor position sensor that senses the position and/or velocity of the electric motor. This sensor may be operatively coupled to the electric motor directly or indirectly. For example, motor position may be sensed without contact using a magnetic or optical encoder. In another embodiment, rotor position may be measured by measuring the hydraulic pump position, which may be relatively fixed with respect to the electric motor position. This rotor position or velocity information may be used by a controller connected to the electric motor. The position information may be used for a variety of purposes such as: motor commutation (e.g. in a brushless DC motor); actuator velocity estimation (which may be a function of rotor velocity for systems with a substantially positive displacement pump); electronic cancellation of pressure fluctuations and ripples; and actuator position estimation (by integrating velocity, and potentially coupling the sensor with an absolute position indicator such as a magnetic switch somewhere in the actuator stroke travel such that activation of the switch implies the actuator position is in a specific location). Without wishing to be bound by theory, by coupling an active suspension containing an electric motor and/or hydraulic pump with a rotary position sensor coupled to it, the system may be more accurately and efficiently controlled.

Other possible embodiments of inputs 1-202 include information such as global positioning system (GPS) data, self-driving parameters, vehicle mode setting (i.e. comfort/sport/eco), driver behavior (e.g. how aggressive is the throttle and steering input), body sensors (accelerometers, inertial measurement units, gyroscopes from other devices on the vehicle), safety system status (e.g. ABS braking engaged, electronic stability program status, torque vectoring, airbag deployment), and other appropriate inputs. For example, in one embodiment, a suspension system may interface with GPS on board the vehicle and the vehicle may include (either locally or via a network connection) a map correlating GPS location with road conditions. In this embodiment, the active suspension may control hydraulic actuation system within the suspension to react in an anticipatory fashion to adjust the suspension in response to the location of the vehicle. For example, if the location of a speed bump is known, the actuators can start to lift the wheels immediately before impact. Similarly, topographical features such as hills can be better recognized and the system can respond accordingly. Since civilian GPS is limited in its resolution and accuracy, GPS data can be combined with other vehicle sensors such as an inertial measurement unit (or accelerometers) using a filter such as a Kalman Filter in order to provide a more accurate position estimate and/or any other appropriate device.

By integrating an active suspension with other sensors and systems on the vehicle, the ride dynamics may be improved by utilizing predictive and reactive sensor data from a number of sources (including redundant sources, which may be combined and used to provide greater accuracy to the overall system). In addition, the active suspension may send commands to other systems such as safety systems in order to improve their performance. Several data networks exist to communicate this data between subsystems such as CAN (controller area network) and FlexRay.

While several types of sensors and control arrangements are noted above, it should be understood that other appropriate types of inputs, sensors, and control schemes are also contemplated as the disclosure is not so limited. The inputs 1-202 indicated in FIG. 6 may also include information derived from the electric motor including, for example, calculating actuator velocity by measuring electric motor velocity as well as calculating actuator force by measuring electric motor current to name a few. In other embodiments, the inputs 1-202 include information from look-ahead sensors, such as controllers associated with actuators on the rear axle of a vehicle receiving information from the front wheels to adjust control of the hydraulic actuator before an event occurs.

In the system-level embodiment of FIG. 6, energy flows into and out of the controller on the suspension electrical bus 1-204. The suspension electrical bus 1-204 may be direct current, though embodiments using alternating current are also contemplated. While not shown in FIG. 6, in one embodiment multiple actuators 1-100 and controllers 1-200 share a common suspension electrical bus 1-204. In this way, if one actuator and/or controller pair is regenerating energy, another pair can be consuming this regenerated energy. In some embodiments the voltage of the suspension electrical bus 1-204 is held at a voltage $V_{high}$ higher than that of the vehicle's electrical system, such as 48 volts, 380 volts, or any other appropriate voltage. Without wishing to be bound by theory, such an embodiment may enable the use of smaller wires with lower currents providing a potential cost, weight, and integration advantage. In other embodiments this voltage is substantially similar to the vehicle's electrical system voltage (12, 24 or 48 volts), which may eliminate or reduce the need for a DC-DC converter 1-206. However, in some embodiments it may be desirable to use a voltage $V_{low}$ lower than the vehicle's electrical system to reduce the need for a super capacitor, In the embodiment of FIG. 6, the suspension electrical bus 1-204 interfaces with the vehicle's electrical system 1-210 and the vehicle's energy storage 1-212, for example, the main battery, or other appropriate energy storage, through a bidirectional DC-DC converter 1-206. Appropriate bidirectional converters include both galvanically isolated and non-galvanically isolated converters. However, other devices capable of converting the electrical signal between the suspension electrical bus 1-204 and the vehicle's electrical system 1-210 might be used. A few possible topologies include a synchronous buck converter (where the freewheeling diode is replaced with a transistor), a transformer with fast-switching DC/AC converters on each side, and resonant converters, and other appropriate devices.

Modern vehicles are typically limited in their capacity to accept regenerative electrical energy from onboard devices, and to deliver large amounts of energy to onboard devices. Without wishing to be bound by theory, in the former, regenerated energy may cause a vehicle's electrical system voltage to rise higher than allowable, and in the latter, large power draws may cause a voltage brownout, or undervoltage condition for the vehicle. In order to deliver sufficient power to an active suspension, or to capture a maximal amount of regenerated energy, a form of energy storage associated with the suspension system itself may be used. Energy storage may be in the form of batteries such as lithium ion batteries with a charge controller, ultra-capacitors, or other forms of electrical energy storage. In the embodiment of FIG. 6, the negative terminal of one or more ultra-capacitors 1-208 are connected to a positive terminal of a vehicle electrical system 1-212, and the positive terminal is connected to the suspension electrical bus 1-204 running at a voltage higher than the vehicle electrical system voltage. In such an embodiment, the ultra-capacitor, or other appropriate storage device located on the part bus, may be sized to accommodate regenerative and/or expected consumption spikes, in order to effectively control wheel movement and regenerate energy during damping (bidirectional energy flow) and limit the impact of such a suspension system on the overall vehicle electrical system. However, as noted above, other embodiments are also possible including, for example, the energy storage may be placed directly on the suspension electrical bus or the vehicle electrical system.

Due to the ability to store regenerated energy locally on the super capacitor 1-208 or other appropriate device, as well as the vehicle energy storage device 1-212, the above described embodiments may be either self-powered or at least partially self-powered by the regenerated energy. Several advantages may be achieved by combining an active suspension with a self-powered architecture. An active suspension may be failure tolerant of a power bus failure, wherein the system can still provide damping, even controlled damping with a bus failure. Another advantage is the potential for a retrofittable semi-active or fully active suspension that may be installed OEM or aftermarket on vehicles and not require any wires or power connections. Such a system may communicate with each actuator device wirelessly or through hard connections such as the vehicle CAN. Energy to power the system may be obtained through recuperating dissipated energy from damping. This has the advantage of being easy to install and lower cost. Another advantage is that such a system may function as an energy efficient active suspension. More specifically, by utilizing the regenerated energy in the active suspension, DC/DC converter losses can be minimized such that recuperated energy is not delivered back to the vehicle, but rather, stored and then used directly in the suspension at a later time. Though as noted above, embodiments in which energy is delivered back to the vehicle are also contemplated.

While in some embodiments a hydraulic actuation system incorporated into a suspension system may be a net consumer or producer of energy, in other embodiments, it may be desirable to provide a hydraulic actuation system that is substantially energy neutral during use to provide an energy efficient suspension system. In such an embodiment, a controller associated with a hydraulic actuation system controls the motor inputs associated with the electric motor in response to road conditions, wheel events, and/or body events such that the energy harvested during regenerative cycles (e.g. during damping) and the energy concerned during active cycles of the suspension system (on-demand energy delivery) are substantially equal over a desired time period. As noted previously, the regenerated energy intended for subsequent usage may be stored in any appropriate manner including local energy storage associated with individual hydraulic actuators, or energy might be stored at the vehicle level. Appropriate types of energy storage include, but are not limited to, super capacitors, batteries, flywheels, hydraulic accumulators, or any other appropriate mechanism capable of storing the recaptured kinetic energy and subsequently providing it for use by the system for reconversion into kinetic energy in a desired amount and at a desired time.

Referring to the embodiment of FIG. 6, in some embodiments using a neutral energy control, the controller 1-200 may control the energy flow such that energy captured via regeneration from small amplitude and/or low frequency wheel and/or body events is stored in the super capacitor 1-208. Once the super capacitor is fully charged, additional regenerated energy is either transferred to the vehicle electrical bus 1-210 to either charge the vehicle energy storage device 1-212, be consumed by loads connected to the vehicle electrical bus 1-210, and/or dissipated as heat on a dissipative resistor. When the suspension control system requires energy, such as to resist movement of a wheel or to encourage movement of a wheel in response to a sensed event, energy is drawn from the super capacitor 1-208 and/or from the vehicle electrical bus 1-210 via the bidirectional power converter 1-206. Energy that is consumed to manage various sensed events is replaced during subsequent regenerative events as described above. When the relative amounts of regeneration and active actuation are appropriately controlled, the controller provides a substantially energy neutral suspension control over a desired time period. In other embodiments, the controller controls the relative amounts of regeneration over a desired time period to provide an average power with a magnitude that is less than or equal to 75 watts, 50 watts, or any other desired average power. This average power may either be positive corresponding to energy consumption, and/or negative corresponding to energy regeneration. Such a control system is not limited to a fully active system including regenerative and practice control. Instead, limiting an average power of the system may also be applied to purely active systems and purely regenerative systems such as might be seen in a hydraulic actuation system and/or a semi-active suspension system.

Figure 7:
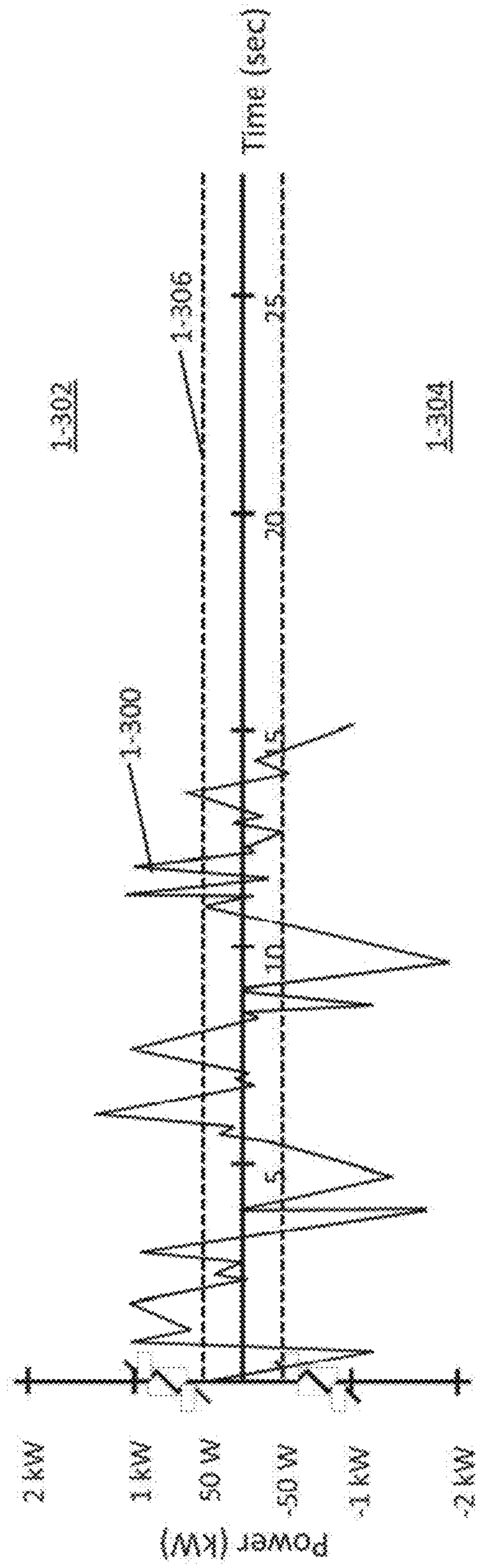
FIG. 7 is an exemplary graph of an energy flow of an active suspension system.

FIG. 7 illustrates an exemplary implementation of energy neutral control of a suspension system. The figure shows power flow 1-300 over time. Positive y-axis values 1-302 correspond to regenerated energy during damping and negative y-axis values 1-304 correspond to energy consumed during active actuation. In the depicted embodiment, a controller regulates the force of a full active suspension and the resulting power flow curve 1-300 such that average power is within a window 306 substantially close to zero such as, for example, 75 W or 50 W of regeneration and/or consumption over an extended period of time. Such a control system may be considered an energy neutral control system.

The control system of an active suspension system such as that shown in FIG. 4 may involve a variety of parameters such as wheel and body acceleration, steering input, braking input, and look-ahead sensors such as vision cameras, planar laser scanners, and the like. In one embodiment of an energy neutral control system, the controller calculates a running average of power (consumed or regenerated) though embodiments in which the power is tracked from ignition might also be used. In one embodiment, the average powers calculated by taking the total power equal to the integral of the power flow curve 1-300 over the desired time period and dividing it by the time period. The controller may then alter a gain parameter in a control algorithm to bias control of the suspension system more towards either the regenerative region if excess power consumption has occurred or the active actuation region if excess power regeneration has occurred in order to keep the average power within the neutral band 1-306, which may also be referred to as an active control demand threshold. For example, during an extended high lateral acceleration turn, a control algorithm may slowly allow the vehicle to roll, thus reducing the instantaneous power consumption, and over time will reduce the energy consumed (a lower average power). While in energy neutral system has been described above with regards to an electrical system, embodiments of a control system implementing an active control demand threshold with a mechanical system are also contemplated. For example, hydraulic energy may be dissipated using an appropriate element and/or captured using a hydraulic accumulator. One such embodiment that may be controlled in such a manner as described above involving the use of two electronically controlled valves and three check valves.

While embodiments described above are directed to providing an average power flow of a single hydraulic actuator that is energy neutral, the disclosure is not so limited. Instead, in some embodiments an average power flow may be taken as the sum of all the hydraulic actuators located within a vehicle or other system. Additionally, the average power flow might be determined for a subset of the hydraulic actuators located within the vehicle or system. The average may also be over all time, between vehicle ignition starts, over a small time window, or over any other appropriate time period.

In some situations, it may be desirable to override the energy neutral limits described above. For example, during a safety mode associated with sensing events such as avoidance, braking, fast steering, and/or other safety-critical maneuver, the power limits associated with the energy neutral system are overridden. One embodiment of a safety maneuver detection algorithm is a trigger if the brake position is depressed beyond a certain threshold, and the derivative of the position (i.e. the brake depression velocity) also exceeds a threshold. Other embodiments of a safety maneuver detection algorithm include the use of longitudinal acceleration thresholds, steering thresholds, and/or other appropriate inputs. In one specific embodiment, a fast control loop compares a threshold emergency steering threshold to a factor derived by multiplying the steering rate and a value from a lookup table indexed by the current speed of the vehicle. The lookup table may contain scalar values that relate maximum regular driving steering rate at each vehicle speed. For example, in a parking lot a quick turn is a conventional maneuver. However, at highway speeds the same quick turn input is likely a safety maneuver where the suspension should disregard energy limits in order to keep the vehicle stabilized. In another exemplary embodiment, a vehicle rollover model for SUVs may be utilized that incorporates a number of sensors such as lateral acceleration to change the suspension dynamics if an imminent rollover condition is detected. In many real-world applications, a number of these heuristics (braking, steering, lane-departure/traffic detection sensors, deceleration, lateral acceleration, etc.) may be fused together (such as by using fuzzy logic) to come to a desired control determination in order to control the suspension system. Depending on the embodiment, the control determination might not be binary, but rather may be a scaling factor on the power limits.

In another embodiment, a controller of suspension system adjusts how it responds to sensed wheel and/or body events based on the availability of energy reserves within the energy storage, such as a super capacitor, present within the hydraulic actuation system. More specifically, as energy reserves begin to diminish, responses to some wheel events might transition from consuming energy to harvesting energy from the actuator movements. In an example of self-powered adaptive suspension control, energy captured via regeneration from small amplitude and/or low frequency wheel events may be stored in the super capacitor of FIG. 6]. When the suspension control system requires energy, such as to resist movement of a wheel at very low velocities substantially close to zero velocity, or to actively move a wheel, in response to a wheel event, energy may be drawn from the super capacitor. As energy reserves in the super capacitor, or other appropriate device, are diminished, the controller biases the system responses towards regeneration and energy conservation until the energy reserves are sufficiently replenished to resume "normal" active suspension operation.

Combining a suspension capable of adjusting its power consumption over time using energy optimizing algorithms and/or energy neutral algorithms may enhance the efficiency of the suspension. In addition, it may allow an active suspension to be integrated into a vehicle without compromising the current capacity of the alternator. For example, the suspension may adjust to reduce its instantaneous energy consumed in order to provide enough vehicle energy for other subsystems such as an anti-lock braking system (ABS brakes), electric power steering, dynamic stability control, and engine control units (ECUs).

In another exemplary embodiment, a suspension system as described herein may be associated with an active chassis power management system adapted to control power throttling of the suspension system. More specifically, a controller responsible for commanding the active suspension responds to energy needs of other devices on the vehicle such as active roll stabilization, electric power steering, other appropriate devices, and/or energy availability information such as alternator status, battery voltage, and/or engine RPM. Further, when needed the controller may reduce the power consumption of the suspension system when power is required by other devices and/or when there is low system energy as indicated by the alternator status, battery voltage, and/or engine RPM. For example, in one embodiment, a controller of a suspension reduces its instantaneous and/or time-averaged power consumption if one of the following events occur: vehicle battery voltage drops below a certain threshold; alternator current output is low, engine RPM is low, the battery voltage is dropping at a rate that exceeds a preset threshold; a controller (e.g. an engine control unit) on the vehicle commands a power consumer device (such as electric power steering) at a relatively high power (for example, during a sharp turn at low speed); an economy mode setting for the active suspension is activated, and/or any other appropriate condition where a reduced power consumption would be desired occurs.

In addition to neutral energy control, FIG. 7 also provides an example of on-demand energy delivery for an active suspension system. When an on-demand energy delivery-capable active suspension system experiences positive energy flow 1-302 (when the graph is above the center line), an electric motor, or other appropriate associated device, capable of acting as a generator may utilize this energy to generate electricity. This may occur when fluid flows past the hydraulic motor 1-114 in FIG. 4 due to wheel rebound action or compression. This flow of fluid is used to turn the electric generator, thereby producing electricity that may be stored for on-demand consumption, or it may be instantaneously consumed by another associated device within a vehicle or another suspension system including a hydraulic actuator. In contrast to regeneration, when an on-demand energy delivery capable suspension system experiences negative energy flow 1-304 (when the graph is below the center line), energy is being consumed as needed (e.g. on-demand). The consumed energy may either be used to actively actuate the hydraulic actuator in a desired direction, or it may be used applied as a counter acting current into the generator, thereby resisting the rotation of the hydraulic motor which in turn increases pressure in the actuator causing the wheel movement driving the demand to be mitigated. The consumed power may correspond to energy harvested during a previous regeneration cycle. Alternatively, the energy can be consumed from a variety of different sources including, for example, energy storage devices associated with the suspension system, a vehicle's 12V or 48V electrical system, and/or any other applicable energy storage system capable of delivering the desired power flow to and from the suspension system.

In one example of a suspension system and controlled to provide on-demand energy, energy consumption might be required throughout a wheel event, such as when a vehicle encounters a speed bump. Energy may be required to lift the wheel as it goes over a speed bump (that is, reduce distance between the wheel and vehicle) and then push the wheel down as it comes off of the speed bump to keep the vehicle more level throughout. However, rebound action, such as the wheel returning to the road surface as it comes down off of the speed bump may, fall into the positive energy flow cycle by harnessing the potential energy in the spring, using extension damping to regenerate energy.

While embodiments directed to suspension systems capable of both regeneration and active actuation are described above, embodiments of suspension systems that do not regenerate power, and/or dissipate regenerated power are also contemplated.

Figure 13:
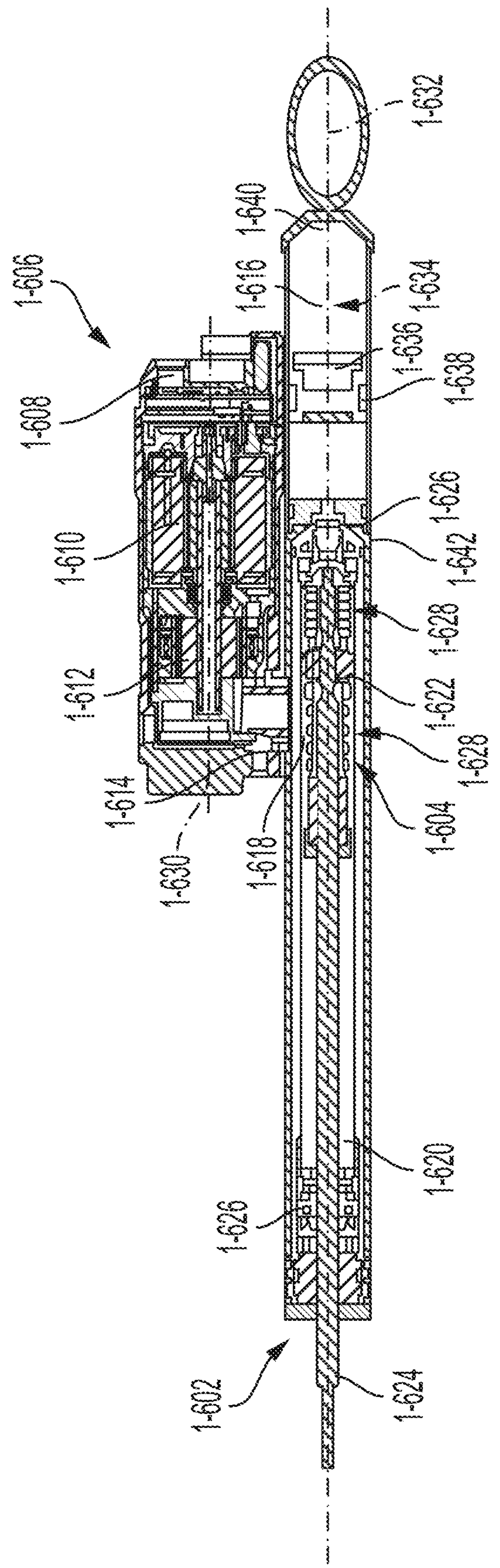
FIG. 13 is a cross-sectional view of an active suspension actuator including a hydraulic actuator and smart valve.

FIG. 13 shows an embodiment of asuspension actuator that includes a smart valve. The active suspension actuator 1-602 includes an actuator body (housing) 1-604 and a smart valve 1-606. The smart valve 1-606 is close coupled to the actuator body 1-604 so that there is a tight integration and short fluid communication between the smart valve and the fluid body, and is sealed so that the integrated active suspension smart valve assembly becomes a single body (or housing) active suspension actuator. In the embodiment shown in FIG. 13 the smart valve 1-606 is coupled to the actuator body 1-604 so that the axis of the smart valve (i.e. the rotational axis of the integrated hydraulic motor-pump and electric motor) 1-630 is parallel with the axis of actuator body 1-632. It should be understood that while a close coupled connection with an actuator body has been depicted, embodiments in which the smart valve is integrated into the same housing as the actuator body, connected to the actuator through the use of hoses or other similar mechanisms, as well as other connection arrangements are also contemplated.

The integrated smart valve 1-606 includes an electronic controller 1-608, an electric motor 1-610 that is close coupled to hydraulic motor (e.g. an HSU) 1-612. The hydraulic motor-pump has a first port 1-614 that is in fluid communication with a first chamber 1-616 in the actuator body 1-604 and a second port 1-618 that is in fluid communication with a second chamber 1-620 in the actuator body 1-604. The first port and second port include a hydraulic connection constructed and arranged to place the smart valve in fluid communication with the actuator In one embodiment, the hydraulic connection includes a first tube inside a second tube. The first port corresponds to the first tube, and the second port corresponds to the annular area between the first tube and second tube. In an alternate embodiment the hydraulic connection may simply correspond to two adjacent ports. Hydraulic seals may be used to contain the fluid within the first and second hydraulic connections as well as to ensure that fluid is sealed within the actuator. It should be understood that many other permutations of hydraulic connection arrangements can be constructed and the disclosure is not limited to only the connection arrangements described herein.

In the embodiment disclosed in FIG. 13 the first chamber is an extension volume and the second chamber is a compression volume, however, these chambers and volumes may be transposed and the disclosure is not limited in this regard. The hydraulic motor-pump 1-612 is in hydraulic communication with the first and second chambers located on opposing sides of a piston 1-622 which is connected to a piston rod 1-624. Therefore, when the piston and piston rod move in a first direction (i.e. an extension stroke) the hydraulic motor-pump rotates in a first direction, and when the piston and piston rod move in a second direction (i.e. a compression stroke) the hydraulic motor rotates in a second rotation. The close coupling of the hydraulic motor-pump through the first and second ports with the extension and compression chambers of the actuator may allow for a very stiff hydraulic system which may desirably improve the responsiveness of the actuator. As described previously, a fast response time for the actuator system is highly desirable, especially for active suspension systems where it may need to respond to wheel events acting at 20 Hz and above. As detailed previously, the response time of a second order system is directly proportional to its natural frequency and the system depicted in FIG. 13, has a natural frequency of about 30 Hz (resulting in a response time of less than 10 ms). In view of the above, similar systems should be able to readily provide natural frequencies anywhere in the range of about 2 Hz to 100 Hz though other frequencies are also possible.

The active suspension actuator 1-602 may have a high motion ratio from the linear speed of the piston 1-622 and piston rod 1-624 to the rotational speed of the close coupled hydraulic motor-pump and electric motor. Therefore, during high velocity suspension events, extremely high rotational speeds may be achieved by the close coupled hydraulic motor-pump and electric motor. This may cause damage to the hydraulic motor-pump and electric motor. To overcome this issue and allow the actuator to survive high speed suspension events, in some embodiments, passive valving may be incorporated to act hydraulically in either parallel, in series, or a combination of both with the hydraulic motor-pump. Such passive valving may include a diverter valve(s) 1-626. The diverter valve(s) 1-626 is configured to activate at a preset fluid flow rate (i.e. a fluid diversion threshold) and will divert hydraulic fluid away from the hydraulic motor-pump 1-612 in response to the hydraulic fluid flowing at a rate that exceeds the fluid diversion threshold. The fluid diversion threshold may be selected so that the maximum safe operating speed of the hydraulic motor-pump and motor is never exceeded, even at very high speed suspension events. When the diverter activates and enters the diverted flow mode, restricting fluid flow to the hydraulic motor-pump, a controlled split flow path is created so that fluid flow can by-pass the hydraulic pump in a controlled manner, thereby creating a damping force on the actuator so that wheel damping is achieved when the diverter valve is in the diverted flow mode. A diverter valve may be incorporated in at least one of the compression and extension stroke directions. The diverter valve(s) may be located in the extension volume and compression volume as shown in the embodiment of FIG. 13 or elsewhere in the hydraulic connection between the actuator body 1-604 and the hydraulic motor-pump 1-612 as the disclosure is not limited in this regard. Other forms of passive valving may also be incorporated to act hydraulically in either parallel, in series, or a combination of both, with the hydraulic motor-pump. For example, a blow-off valve(s) 1-628 might be used. The blow off valve(s) can be adapted so that they can operate when a specific pressure drop across the piston 1-622 is achieved, thereby limiting the maximum pressure in the system. The blow off valve(s) 1-628 may be located in the piston as shown in the embodiment of FIG. 13 or elsewhere in the hydraulic connection between the actuator body 1-604 and the hydraulic motor-pump 1-612.

The passive valving used with the active suspension actuator 1-602 can be adapted so as to provide a progressive actuation, thereby minimizing any noise vibration and harshness (NVH) induced by their operation. The passive valving that may be incorporated in the active suspension actuator may comprise at least one of progressive valving, multi-stage valving, flexible discs, disc stacks, amplitude dependent damping valves, volume variable chamber valving, and a baffle plate for defining a quieting duct for reducing noise related to fluid flow. Other forms of controlled valving may also be incorporated in the active suspension actuator, such as proportional solenoid valving placed in series or in parallel with the hydraulic motor-pump, electromagnetically adjustable valves for communicating hydraulic fluid between a piston-local chamber and a compensating chamber, and pressure control with adjustable limit valving. While particular arrangements and constructions of passive and controlled valving are disclosed above, other arrangements and constructions are also contemplated.

Since fluid volume in the actuator body 1-604 changes as the piston 1-624 enters and exits the actuator, the embodiment of FIG. 13 includes an accumulator 1-634 to accept the piston rod volume. In one embodiment, the accumulator is a nitrogen-filled chamber with a floating piston 1-636 able to move in the actuator body and sealed from the hydraulic fluid with a seal 1-638. In the depicted embodiment, the accumulator is in fluid communication with the compression chamber 1-616. The nitrogen in the accumulator is at a pre-charge pressure, the value of which is determined so that it is at a higher value than the maximum working pressure in the compression chamber. The floating piston 1-636 rides in the bore of an accumulator body 1-640 that is rigidly connected to the actuator body 1-604. A small annular gap 1-642 exists between the outside of the accumulator body 1-640 and the actuator body 1-604 that is in fluid communication with the compression chamber, and hence is at the same pressure (or near same pressure) as the accumulator, thereby negating or reducing the pressure drop between the inside and outside of the accumulator body. This arrangement allows for the use a thin wall accumulator body, without the body dilating under pressure from the pre-charged nitrogen.

While an internal accumulator has been depicted, any appropriate structure, device, or compressible medium capable of accommodating a change in the fluid volume present within the actuator 1-604, including an externally located accumulator, might be used, and while the accumulator is depicted as being in fluid communication with the compression chamber, the accumulator could be in fluid communication with the extension chamber, as the disclosure is not so limited.

The compact nature and size of the integrated smart valve and active suspension actuator of the embodiment of FIG. 13 occupies a volume and shape compatible with vehicle suspension damper wheel well clearances. This may enable easy integration into a vehicle wheel well. The smart valve occupies a suitable volume and shape such that during full range of motion and articulation of the active suspension actuator, a predetermined minimum clearance is maintained between the smart valve and all surrounding components of a conventional vehicle wheel well. The size of the smart valve as disclosed in FIG. 13 is less than 8" (203 mm) in diameter and is less than 8" (203 mm) in length. However, other sizes, dimensions, and orientations are also possible.

Figure 14:
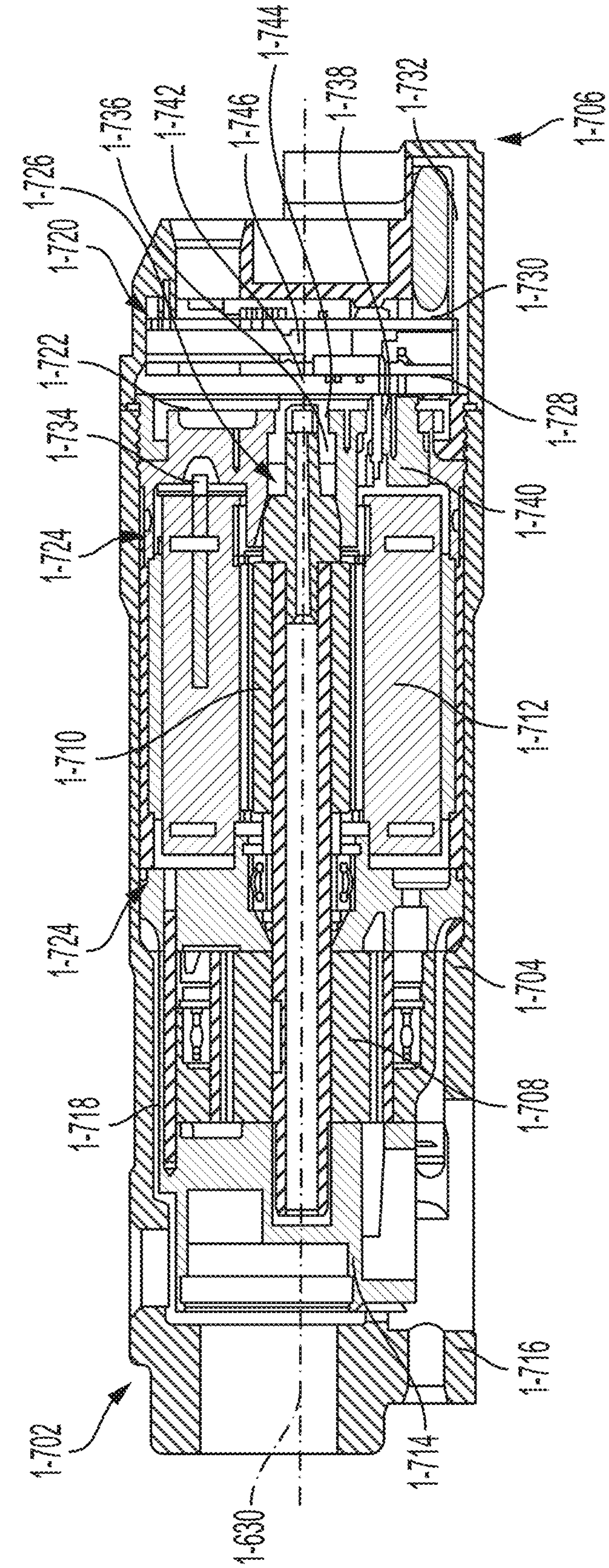
FIG. 14 is a cross-sectional view of a smart valve.

FIG. 14 shows one embodiment of a smart valve 1-702. As disclosed in the embodiment of FIG. 13, a fluid filled housing 1-704 is coupled with the control housing 1-706. The control housing is integrated with the smart valve 1-702. The smart valve assembly includes a hydraulic motor-pump assembly (HSU) 1-708 closely coupled and operatively connected to a rotor 1-710 of an electric motor/generator. The stator 1-712 of the electric motor/generator is rigidly located to the body of the electro-hydraulic valve assembly 1-702. The hydraulic motor-pump includes a first port 1-714 that is in fluid communication with a first chamber of the actuator and a second port 1-716 that is in fluid communication with a second chamber of the actuator. The second port 1-716 is also in fluid communication with fluid 1-718 that is contained within the volume of the housing 1-704. The hydraulic motor-pump and electric motor/generator assembly is contained within and operates within the fluid 1-718 contained in the fluid filled housing 1-704.

For reasons of reliability and durability the electric motor/generator may a brushless DC motor and electric commutation may be carried out via the electronic controller and control protocols, as opposed to using mechanical means for commutation (such as brushes for example), which may not remain reliable in an oil filled environment. However, embodiments using brush motors and other types of motors are also contemplated. As the fluid 1-718 is in fluid communication with the second port 1-716 of the hydraulic motor-pump 1-708, any pressure that is present at the second port of the hydraulic motor-pump will also be present in the fluid 1-718. The fluid pressure at the second port may be generated by the pressure drop that exists across the hydraulic motor-pump (and hence across the piston of the actuator of the embodiment of FIG. 13) and may change accordingly with the pressure drop (and hence force) across the piston. The pressure at the second port may also be present due to a pre-charge pressure that may exist due to a pressurized reservoir (that may exist to account for the rod volume that is introduced or removed from the working volume of the actuator as the piston and piston rod strokes, for example). This pre-charge pressure may fluctuate with stroke position, with temperature or with a combination of both. The pressure at the second port may also be generated as a combination of the pressure drop across the hydraulic motor-pump and the pre-charge pressure.

The control housing 1-706 is integrated with the smart valve body 1-702 and contains a controller cavity 1-720. The controller cavity 1-720 is separated from the hydraulic fluid 1-718 that is contained within the housing 1-704 by a bulkhead 1-722, or other pressure sealed barrier. The pressure within controller cavity 1-720 is at atmospheric (or near atmospheric) pressure. The bulkhead 1-722 contains the fluid 1-718 within the fluid-filled housing 1-704, by a seal(s) 1-724, acting as a pressure barrier between the fluid filled housing and the control cavity. The control housing 1-706 contains a controller assembly 1-726 which may be an electronic controller assembly including a logic board 1-728, a power board 1-730, and a capacitor 1-732 among other components. In some embodiments, the controller assembly is rigidly connected to the control housing 1-706. The electric motor/generator stator 1-712 includes winding electrical terminations 1-734 that are electrically connected to a flexible electrical connection (such as a flex PCB for example) 1-736 that is in electrical communication with an electronic connector 1-738. The electronic connector 1-738 passes through the bulkhead 1-722 while still isolating the controller cavity from the fluid filled portion of the housing through the use of a sealed pass-through 1-740.

Since the bulkhead 1-722 contains the fluid 1-718 within the fluid filled housing 1-704, the bulkhead is subjected to the pressure variations of the fluid 1-718 due to the pressure from the second port 1-716 of the hydraulic motor-pump. On the opposing side of the bulk head the bulkhead is subjected to atmospheric (or near atmospheric) pressure. This may create a pressure differential across the bulkhead which may cause the bulkhead to deflect. Even if the bulkhead is constructed from a strong and stiff material (such as steel for example), any change in the pressure differential between the fluid 1-718 and the controller cavity 1-720 may cause a change in the deflection of the bulkhead. As the sealed pass-through 1-740 passes through the bulkhead, any change in deflection of the bulkhead may impart a motion to the sealed pass-through, which may in turn impart a motion to the electronic connector 1-738 that is contained within the sealed pass-through. The flexible electrical connection 1-736 is adapted so that it can absorb, or otherwise accommodate, motions between the electrical connector 1-738 and the winding electrical terminations 1-734. Therefore, the connections between the winding electrical terminations 1-734 and the flexible electrical connection 1-736 and between the flexible electrical connection 1-736 and the electronic connector 1-738 may be protected from fatigue which could lead to failure.

The electrical connector 1-738 may be in electrical communication with the power board 1-730 via another compliant electrical member (not shown). The compliant electrical member is adapted so that it can absorb any motions that may exist between the electrical connector 1-738 and the power board 1-730 so that the connections between the power board 1-730 and the compliant electrical member and between compliant electrical member 1-742 and the electronic connector 1-738 do not become fatigued over time which may cause these connections to fail as well.

The control housing 1-706 contains the control assembly 1-726 which may include a logic board, a power board, capacitors and other electronic components such as FETs or IGBTs. To offer an efficient means of heat dissipation for the control assembly 1-726, the control housing 1-706 may act as a heat sink, and may be constructed from a material that offers good thermal conductivity and mass (such as an aluminum or heat dissipating plastic for example). To ensure that an efficient heat dissipating capability is achieved by the control housing 1-706, the power components of the control assembly 1-726 (such as the FETs or IGBTs) may be mounted flat and in close contact with the inside surface of the control housing 1-706 so that it may utilize this surface as a heat sink. The construction of the control housing 1-706 may be such that the heat sink surface may be thermally isolated from the fluid filled housing 1-704, by constructing the housing from various materials and using methods such as overmolding the heat sink surface material with a thermally nonconductive plastic that is in contact with the housing 1-704. Alternatively, the control housing 1-706 may be constructed so that the heat sink surface is thermally connected to the fluid filled housing 1-704. As a smart valve may be disposed in a wheel well of a vehicle, the heat sink feature of the control housing 1-706 may be adapted and optimized to use any ambient air flow that exists in the wheel well to cool the thermal mass of the heat sink.

In some embodiments, a rotary position sensor 1-742, that measures the rotational position of a source magnet 1-744 that is drivingly connected to the electric motor/generator rotor 1-710, is mounted directly to the logic board 1-728. The rotary position sensor may be of a Hall effect type or other type. A non-magnetic sensor shield 1-746 is located within the bulkhead and lies in between the source magnet 744 and the rotary position sensor 1-742. Consequently, the sensor shield contains the fluid 1-718 that is in the fluid filled housing while allowing the magnetic flux of the source magnet 1-744 to pass through unimpeded so that it can be detected by the rotary position sensor 1-742 in order to detect the angular position of the rotor 1-710.

The signal from the rotary position sensor 1-742 may be used by the electronic controller for commutation of the BLDC motor as well as for other functions such as for the use in a hydraulic ripple cancellation algorithm (or protocol). Without wishing to be bound by theory, all positive displacement hydraulic pumps and motors (e.g. HSUs) produce a pressure pulsation that is in relation to its rotational position. This pressure pulsation is generated because the hydraulic motor-pump does not supply an even flow per revolution. Instead, the hydraulic motor-pump produces a flow pulsation per revolution, whereby at certain positions the hydraulic motor-pump delivers more flow than its nominal theoretical flow per revolution (i.e. an additional flow), and at other position the hydraulic motor-pump delivers less flow than its nominal theoretical flow per revolution (i.e. a negative flow). The profile of the flow pulsation (or ripple) is known with respect to the rotary position of the hydraulic motor-pump. This flow ripple then in turn generates a pressure ripple in the system due to the inertia of the rotational components and the mass of the fluid etc. and this pressure pulsation can produce undesirable noise and force pulsations in downstream actuators etc. Since the profile of the pressure pulsation can be determined relative to the pump position, which may be measured from the rotor position using the source magnet position, it is possible for the controller to use a protocol that can vary the motor current and hence the motor torque based upon the rotor position signal to counteract these pressure pulsations. This may help to mitigate or reduce the pressure pulsations and hence reduce the hydraulic noise and improve the performance of the system. Another method of reducing hydraulic ripple from the hydraulic motor-pump may be in the use of a port timed accumulator buffer. In this arrangement the hydraulic motor-pump contains ports that are timed in accordance with the hydraulic motor-pump flow ripple signature so that in positions when the hydraulic motor-pump delivers more flow than its nominal (i.e. an additional flow) a port is opened from the hydraulic motor-pump first port to a chamber that contains a compressible medium so that there is fluid flow from the hydraulic motor-pump to the chamber to accommodate this additional flow, and at positions when the hydraulic motor-pump delivers less flow than its nominal (i.e. a negative flow) a port is opened from the hydraulic motor-pump first port to the reservoir that contains a compressible medium so that the fluid can flow from the reservoir to the hydraulic motor-pump first port, to make up for the negative flow. The chamber with the compressible medium thereby buffers out the flow pulsations and hence the pressure pulsations from the hydraulic motor-pump. It is possible to use the hydraulic ripple cancellation algorithm described earlier with the port timed accumulator buffer described above to further reduce the pressure ripple and noise signature of the hydraulic motor-pump thereby further improving the performance of the smart valve.

Figure 15:
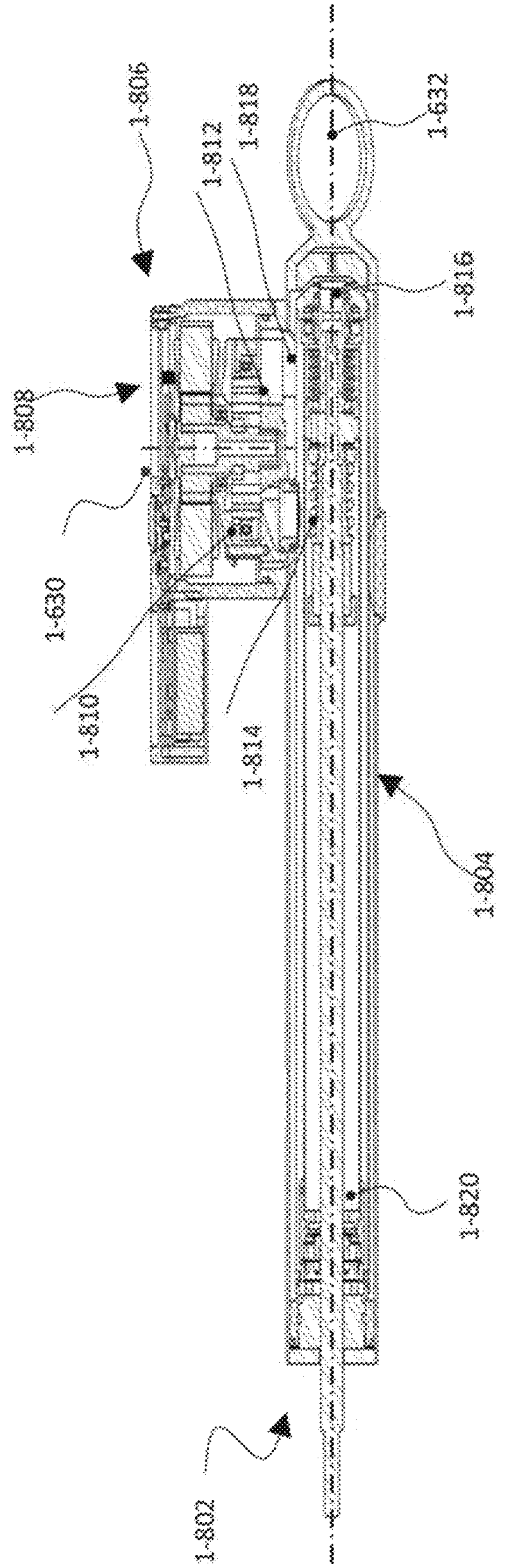
FIG. 15 is a cross-sectional view of an active suspension actuator including a hydraulic actuator and smart valve.

FIG. 15 which shows an embodiment of a suspension system 1-802 including an actuator body (housing) 1-804 and a smart valve 1-806. The smart valve 1-806 is close coupled to the actuator body 1-804 so that there is a tight integration and short fluid communication between the smart valve and the fluid body, and is sealed so that the integrated active suspension smart valve assembly either is, or may function as, a single body (or housing) suspension system. The integrated smart valve 1-806 includes an electronic controller 1-808 and an electric motor 1-810 that is close coupled to a hydraulic motor-pump (e.g. an HSU) 1-812. The hydraulic motor-pump has a first port 1-814 that is in fluid communication with a first chamber 1-816 in the actuator body 1-804 and a second port 1-818 that is in fluid communication with a second chamber 1-820 in the actuator body 1-804. The first port and second port include hydraulic connections to the actuator. The hydraulic connection may include a first tube inside a second tube such that the first port is the first tube, and the second port is the annular area between the first tube and second tube. In an alternate embodiment the hydraulic connection may include two adjacent ports. However, other types and arrangements of connections could also be used.

The embodiment of FIG. 15 is similar to that of the embodiment of FIG. 13 with the difference that the smart valve 1-806 is coupled to the actuator body 1-804 so that the axis of the smart valve (i.e. the rotational axis of the integrated hydraulic motor-pump and electric motor) 1-630 is perpendicular, or near perpendicular with the axis of the actuator body 1-632 as opposed to parallel to the axis of the actuator body 1-632. It is of course possible to mount the smart valve with its axis 1-630 at any angle between the parallel and perpendicular with that of the actuator body axis 1-632. Therefore, it should be understood that the hydraulic motor-pump may be coupled to the actuator body in any appropriate orientation and at any appropriate location.

Figure 16:
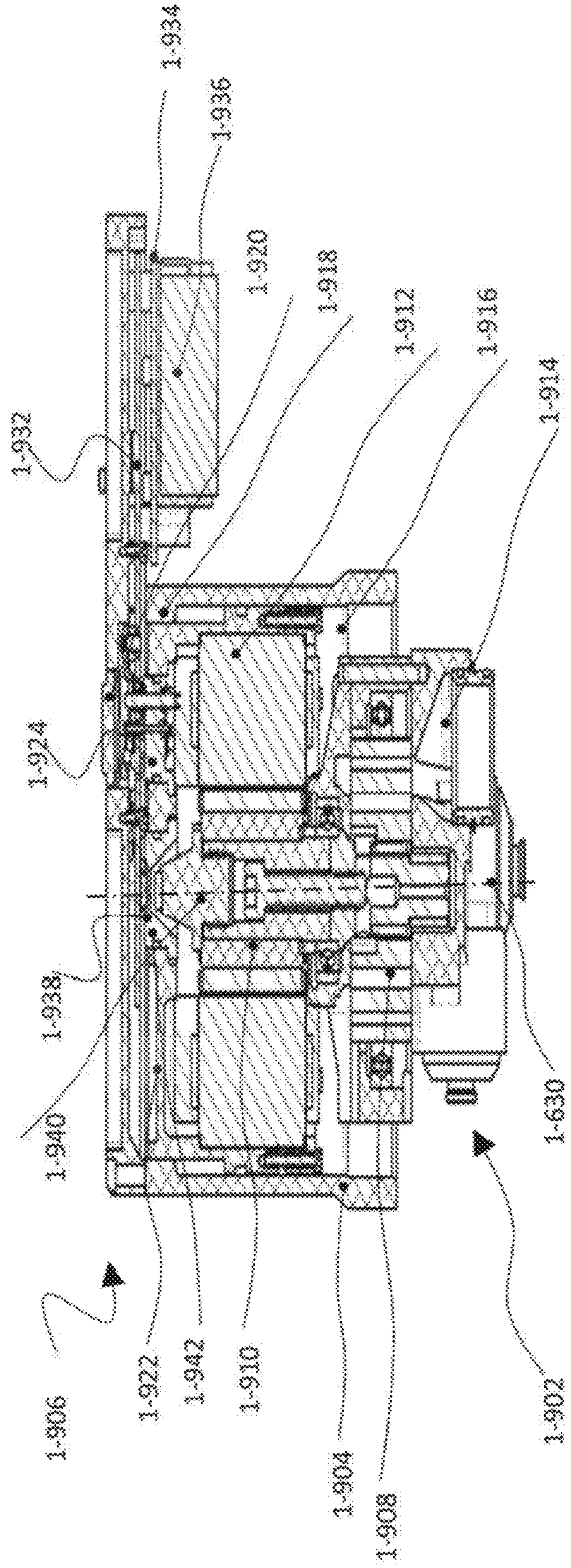
FIG. 16 is an enlarged cross-sectional view of the smart valve of FIG. 15.

FIG. 16 shows an embodiment of a smart valve 1-902 similar to that disclosed in FIG. 15. This embodiment shows a smart valve 1-902 including a housing 1-904 coupled with a controller module 1-906. The controller module is situated on the top of the smart valve 1-902. The smart valve assembly includes a hydraulic motor-pump assembly (e.g. an HSU) 1-908 closely coupled to a rotor 1-910 of an electric motor/generator. The stator 1-912 of the electric motor/generator is rigidly connected to the housing 1-904 of the electro-hydraulic valve assembly 1-902. The hydraulic motor-pump includes a first port 1-914 that is in fluid communication with a first chamber of the actuator and a second port 1-916 that is in fluid communication with a second chamber of the actuator. The second port 1-916 is also in fluid communication with fluid 1-918 that is contained within the volume of the housing 1-904. The hydraulic motor-pump and electric motor/generator assembly are contained and operated within the fluid 1-918 contained in the fluid filled housing 1-904.

The controller module 1-906 is connected to the electric motor/generator via an electronic connection 1-920 and is separated from the hydraulic fluid by a bulkhead 1-922, or other appropriate pressure sealed barrier. The electronic connection 1-920 is isolated from the hydraulic fluid via a pass through 1-924. Within the controller cavity is a logic subassembly 1-932, a power pack 1-934, and a capacitor 1-936. In another embodiment the power pack 1-934 can be mounted to a dedicated heat sink that is thermally decoupled from the hydraulic valve assembly 1-902. A power storage unit is mounted on the side of the hydraulic valve assembly 1-902, or it can be integrated with the power pack 1-934. In yet another embodiment, the power pack 1-934 is split into three subunits with each subunit housing a single leg (half bridge) of the power pack. However, other arrangements are also possible. For the purpose of minimizing thermal load and volume, the logic subassembly may be subdivided into a logic power module, a sensor interface module, and a processor module. In one embodiment the logic subassembly 1-932 uses a position sensor 1-938. The position sensor may share the same printed circuit board (PCB) that is used for housing FETs (IGBTs) or may be mounted on a flex cable. In another embodiment the logic subassembly 1-932 may be completely sensorless. Furthermore, while a subdivided controller has been described above, it should be understood that all the components of the controller module 1-906 can be integrated into a single assembly and produced on a single PCB.

In one embodiment, a rotary Hall effect position sensor 1-938 that measures the rotational position of a source magnet 1-940 that is drivingly connected to the electric motor/generator rotor 1-910, is mounted directly to the logic board 1-932. The Hall effect position sensor may also be protected from the working hydraulic fluid of the electro-hydraulic valve assembly 1-902 by a sensor shield 1-942.

Figure 17:
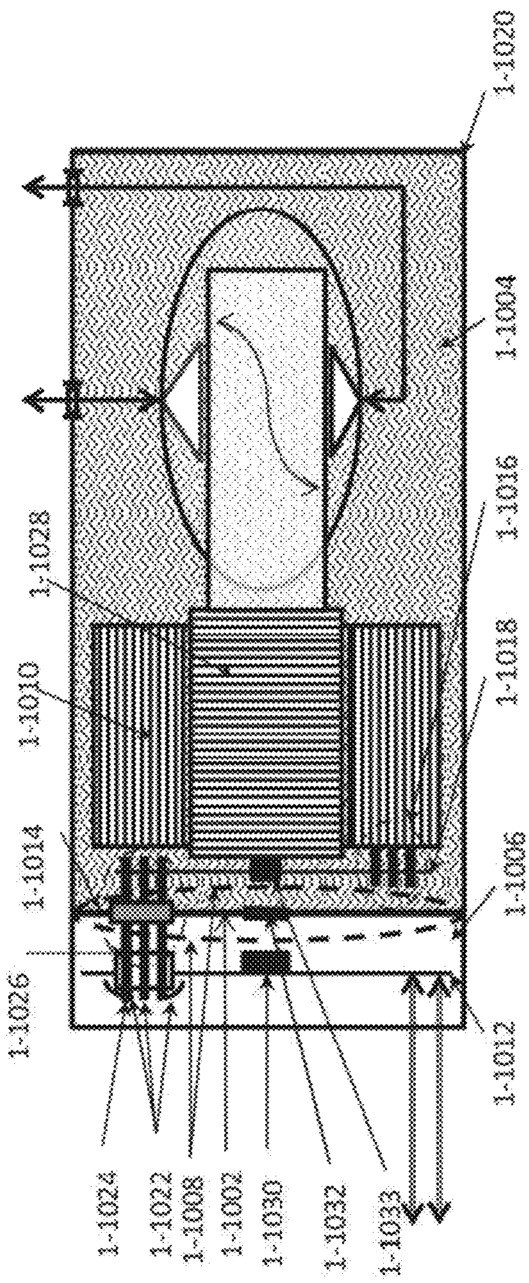
FIG. 17 is a schematic representation of a controller-valve integration.

FIG. 17 depicts one embodiment of a controller-valve integration in schematic form. A pressure barrier 1-1002 separates a fluid-filled pressurized reservoir 1-1004 from air-filled controller compartment 1-1006 that is exposed to atmospheric pressure. The pressure barrier 1-1002 deflects within the boundaries 1-1008 under the influence of variable pressure within volume 1-1004 while motor 1-1010 and a controller board 1-1012 remain stationary. A feed-through 1-1014 and a motor connection 1-1016 are electrically connected to opposite ends of a flexible printed circuit board 1-1018. When the pressure barrier 1-1002 flexes under the influence of a variable pressure, it pulls feed-through 1-1014 with it which may apply a force to a flexible printed circuit board 1-1018 which bends to accommodate this movement without transferring the force to a motor connection 1-1016. This may help to ensure reliable operation of the corresponding solder joints. A controller board 1-1012 may be rigidly attached to a valve housing 1-1020 and is restricted from motion while feed-through 1-1014 moves in conjunction with the motions of the pressure barrier 1-1002 (e.g. a membrane or other construction). Flexible leaves 1-1022 are welded 1-1024 or otherwise electrically connected to feed-through pins 1-1026. Flexible leaves 1-1022 may accommodate motions of a feed-through 1-1014 and prevent transfer of reciprocal forces to the controller board 1-2. A radially magnetized magnet 1-1033 may transfer angular position of a rotor 1-1028 to a transducer module device 1-1030 via magnetic flux permeable window 1-1032.

In some embodiments, flexible leaves 1-1022 may be solder joined with feed-through pins 1-1026 using a low-temperature solder joint 1-1024. This may enable a self-healing behavior of flexible high current connections. Specifically, when 1-1024 develops micro-cracks, resistance of the corresponding solder joint increases causing a localized temperature rise and re-melting of the low temperature solder. This may be combined with non-wetting plating applied to the surrounding solder and connection pads outside of the solder joint to prevent reflow of the molten solder away from the designated solder area.

Figure 18:
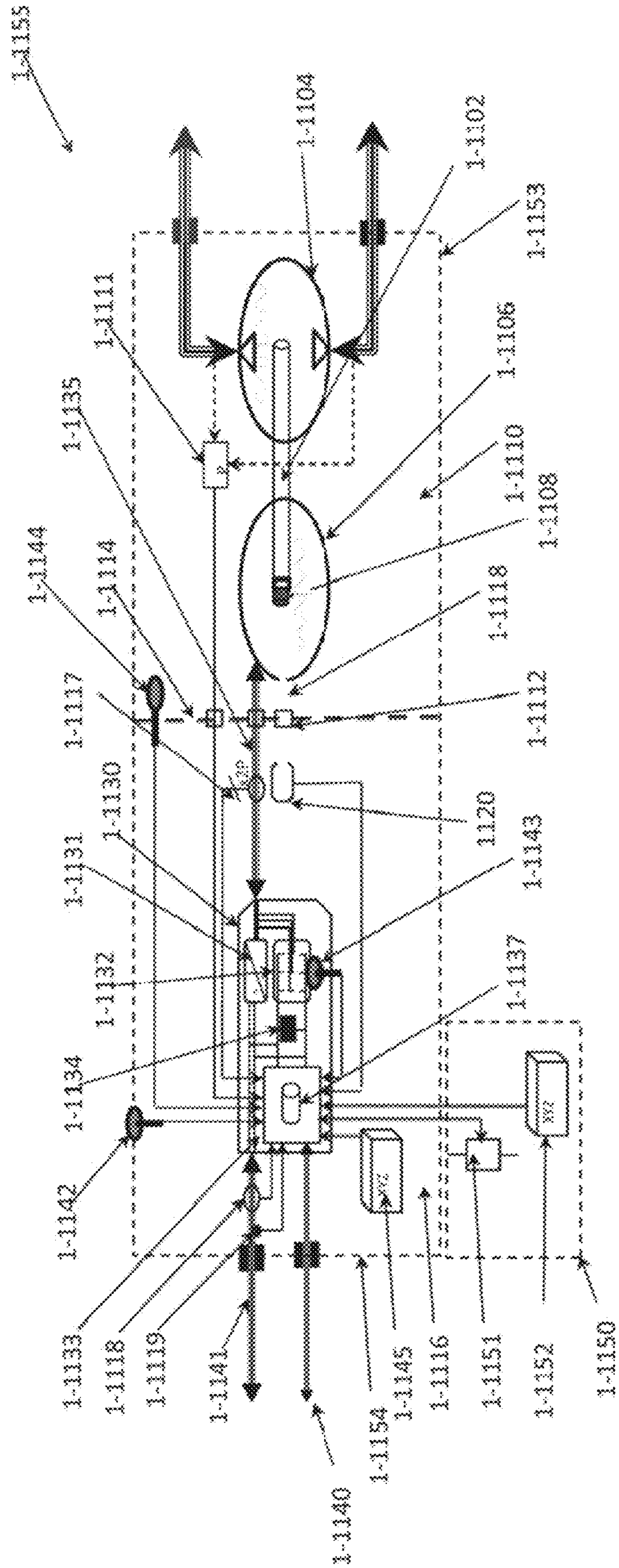
FIG. 18 is a schematic representation of a generic electro-hydraulic valve architecture.

FIG. 18 is a schematic of one embodiment of a smart valve architecture. The rotor shaft 1-1102 is operatively coupled to the shaft of a hydraulic motor-pump 1-1104 that may be both bidirectional and backdrivable. However, embodiments in which the hydraulic motor-pump is unidirectional and/or pumping only are also contemplated. The angular position of a rotor shaft 1-1102 that is rigidly connecting a hydraulic pump 1-1104 to a motor 1-1106 may be used in a motor control loop as described elsewhere. The aforementioned position measurement is derived from a radially magnetized permanent magnet inducer 1108 which is rigidly attached to a rotor shaft 1-1102 that is operationally located in fluid-filled reservoir 1-1110. A magnetic field flux induced by an axially rotated magnet 1-1108 penetrates through a magnetically transparent window 1-1112 that is built into a membrane 1-1114. The membrane separates the fluid filled reservoir 1-1110 from the electronic enclosure 1-1116 that is exposed to atmospheric pressure. It should be noted that the membrane 1-1114 is exposed to a variable differential pressure between the fluid-filled and air exposed enclosures resulting in a variable membrane deflection. Magnetic flux 1-1118 interacts with a field sensitive transducer 1-1120 that translates a strength of the measured magnetic flux 1-1-1118 into an angular position of a rotor shaft 1-1102.

In one embodiment, a controller module 1-1130 includes a processor module 1-1133, a storage capacitor 1134, a three-phase rectifier 1-1131 and a 3-Phase power bridge 1-1132. A three-phase rectifier 1131 and a 3-Phase power bridge 1-1132 are operatively connected to a motor 1106 via a bidirectional 3-Phase feed 1-1135. A controller 1-1130 is powered by a direct voltage power source via a power feed 1-1141 and may be in communication with at least one other similar controller or a central vehicle suspension controller via a communication bus 1-1140. Though other types of communication including wireless communication might also be used. The specifics of the aforementioned architecture, algorithm, and corresponding implementation are described elsewhere. During regenerative events associated with vertical wheel motions, or other appropriate motions of a hydraulic actuator, fluid is forced through the hydraulic motor-pump 1-1104 producing rotary motion of an electric motor 1-1106 that results in generation of back electromotive force (BEMF) on the electric motor's terminals. In case of a power bus failure, which may be manifested in "starving" a DC power feed 1-1141, the BEMF is rectified in 1-1131 and its energy is stored in a capacitor 1-1134 that is connected between positive and negative terminals of a power source. Therefore, charging of the capacitor 1-1134 results in developing a sufficient voltage to power logic of a controller 1-1130 that is also connected between positive and negative terminals of the capacitor 1-1134. A control algorithm implemented on a processor 1-1133 responds to a failure by either closing all switches in the bridge 1-1132 or by modulating the duty cycle of the bridge to maintain a desired current through the windings of a motor 1-1106 and producing a minimum fail-safe torque resulting in a safe damping force. Similarly, in case of a failure of a communication bus 1-1140, the controller rolls-back to a passive damping mode and maintains a desired passive damping characteristic of a suspension system. Furthermore, in case of a catastrophic failure of a controller 1-1130, the motor-pump assembly 1-1106, 1-1102, and 1-1104 may spin out of control resulting in voltage rise on a DC bus indicating an unacceptable suspension failure; a shunt relay connected across a DC bus as described elsewhere detects an "above safe voltage level" condition and closes the circuit shorting a DC bus and effectively guaranteeing safe suspension damping.

A processor module 1-1133 of a controller module 1-1130 may receive a plurality of intrinsic, extrinsic and vehicle related information. The intrinsic information may originate from within the smart valve housing 1-1153 and/or the controller housing 1-1154 forming a complete smart valve 1-1155.

An intrinsic sensors suite may include, but is not limited to at least two motor current sensors 1-1117, a bus voltage 1-1119 and current 1-1118 sensors, a differential pressure sensor 1-1111, an actuator body accelerometer 1-1145, an ambient 1-1142, fluid 1-1144, and a FET temperature sensor 1-1143. An extrinsic sensor suite 1-1150 may also include for example a suspension position sensor 1-1151 and a body acceleration sensor 1-1152, where a suspension position sensor 1-1151 which communicates a longitudinal position of a wheel in reference to the vehicle's body, and a body accelerometer 1-1152 which communicates vehicle body motions in reference to an inertial reference system that may include a body translational and/or rotational motion.

In the preferred embodiment vehicle related information may include, but is not limited to, steering, throttle, brake inputs, yaw rate, longitudinal acceleration, lateral acceleration, driver preferences, as well as a plurality of inputs such as calculated instantaneous force-velocity requirements. These inputs may be communicated to a controller via communication bus 1-1140. The specifics of the implementation have been described elsewhere. However, it should be understood that the above signals can be communicated to a controller 1-1130 using any other suitable means including a direct routing of individual signals or utilizing a data over power lines protocol. Furthermore, suspension actuators are effectively a link between an independently moving wheel and a vehicle body collectively affected by a plurality of actuator motions. Therefore, and without wishing to be bound by theory, an onset of a dynamic event in any wheel actuator assembly affects the behavior of all actuators connected between their corresponding wheels and the vehicle's body. Consequently, it may be beneficial from a control perspective to have a predictive signaling of any suspension event to all actuator controllers 1-1130. Thus, the actuator controllers in a vehicle may desirably be connected to a network to enable communicating the desired information. The networking can be achieved in a centralized fashion when each actuator uploads all information, including but not limited to time sensitive information like pressure ripples to a central controller, which in turn distributes this information downstream to all actuator controllers in the network to take an appropriate action. Alternatively, this may be accomplished in a decentralized manner by homogeneously connecting all controllers in the vehicle using any appropriate connection which may include, but is not limited to, a CAN bus, a Token Ring bus or a Data Over Power Bus interface.

Without wishing to be bound by theory, at any given moment in time the performance of an electro-hydraulic actuator primarily depends on a hydraulic motor-pump and electric motor performance characteristics as well as on power bus limitations, ambient temperature, electronic components, and hydraulic fluid temperatures. Recoverable thermal dependencies and non-recoverable age-related degradations due to mechanical wear-out and chemical changes in fluid composition may be taken into account by a control algorithm or protocol. Specifically, on a short-term time scale current-to-torque conversion curves may be adjusted based on fluid viscosity change due to temperature variations as well as on power handling capabilities of the electronics due to the rising temperature of electronic components and the amount of available energy stored in the system. On a long-term time scale the adaptive control algorithm may take into account an increased leakage due to mechanical wear out of a hydraulic pump 1-1104 components and/or a long term viscosity change (due to chemical degradation) of a hydraulic fluid. The same sensor suites noted above, including, but not limited to a differential pressure sensor 1-1111, temperature sensors 1-1144, 1-1142 and 1-1143 as well as the commanded and actual force-velocity response received from extrinsic sensors may be utilized to adjust both short-term and long-term parameters of the actuator model. Long-term parameter adjustments may be stored in a FLASH memory unit 1137.

In the depicted embodiment, a first input of a differential pressure sensor 1-1111 is connected to a first port of a pump 1-1104, while a second input of a sensor 1-1111 is operatively connected to a second port of a pump 1-1104. Power and output leads of a differential pressure sensor 1-1111 penetrate from a fluid-filled reservoir 1-1110 through a hermetically-sealed path-into a controller compartment 1-1116 and conveys a voltage representation of a differential pressure across a pump 1-1104 to a processor module 1-1133. A differential pressure value is correlated with a fluid temperature and a plant's (i.e. the object of control) force-velocity to calculate new system parameters that represent short-term and long-term system drift while long-term model changes may be saved in the FLASH memory l-1137.

In addition to the above, a differential pressure variation may be used as an early forward-looking signal to indicate a pending reversal in a plant's motion direction. The latter usually happens when the electric motor/hydraulic motor-pump assembly is crossing a zero RPM point and rotational speed cannot be calculated based on rotor position sensing alone. Additionally, being a direct indication of a force applied to a plant, a differential pressure provides an unambiguous input to a controller 1-1130 involved in a fast control loop in response to an instantaneous pressure variation.

Figure 19A:
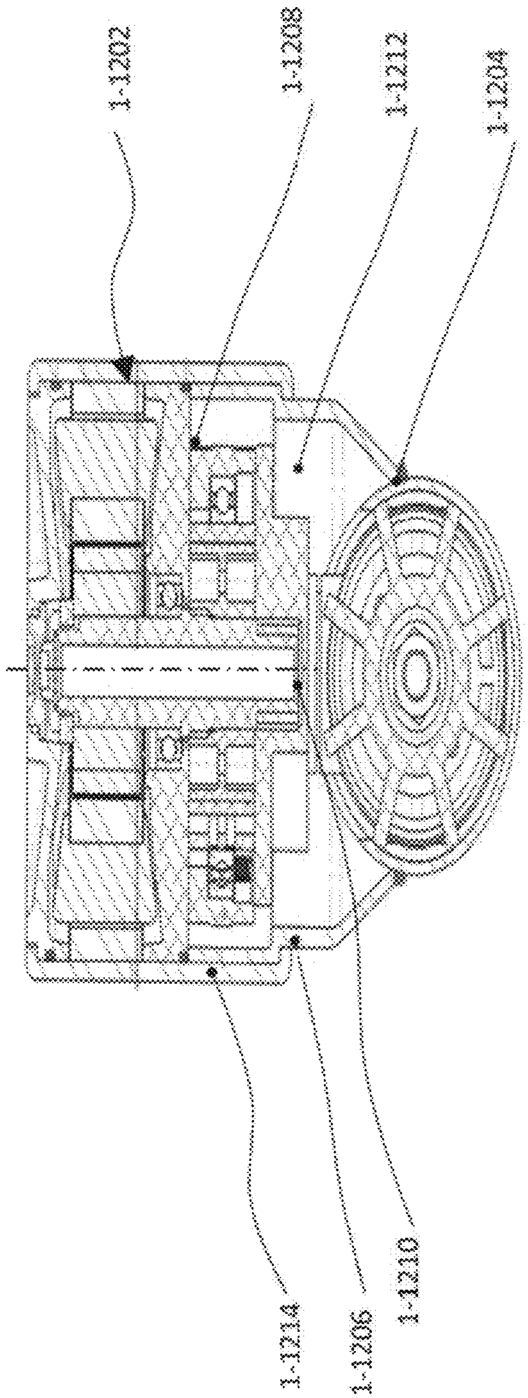
FIGS. 19A-19F depict various attachment methods for connecting a smart valve to an actuator body.

FIGS. 19A-19F show various embodiments of connection methods for integrating the smart valve with the active suspension actuator body. In the embodiment of FIG. 19A a cross section through a smart valve 1-1202 and actuator body 1-1204 is shown where the actuator body has a protrusion 1206 extending out from the actuator body. The protrusion 1-1206 is formed so that it can accept and locate the body of the hydraulic motor-pump 1-1208 such that the hydraulic connection between the first port of the hydraulic motor-pump and first chamber of the actuator body is made via tube 1-1210. The protrusion 1-1206 may be constructed by various means such as fixing a separate member to the actuator body (by welding for example), or by constructing the actuator body so that the protrusion is integrally formed with the actuator body (e.g. by utilizing a casting or a sheet metal forming process for example). The open cavity 1-1212 created by the protrusion 1-1206 is in fluid communication with the second port of the hydraulic motor-pump and the second chamber of the actuator body when connected thereto and serves to make the hydraulic connection between the two. An external member 1-1214 encloses the smart valve assembly 1-1202 and serves to rigidly secure the smart valve assembly to the actuator body and to contain the fluid therein. The external member 1-1214 can be assembled and secured after the smart valve assembly is connected to the actuator body by a suitable metal forming process (such as rolling or crimping for example) or by other means such as being secured by fasteners for example.

Figure 19C:
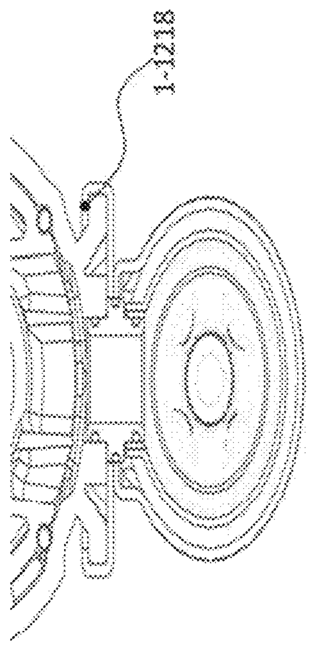
Figure 19B:
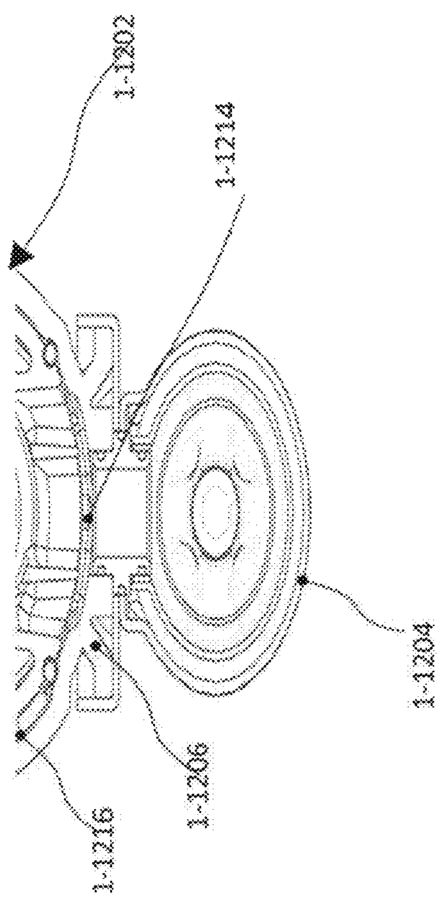
Figure 19D:
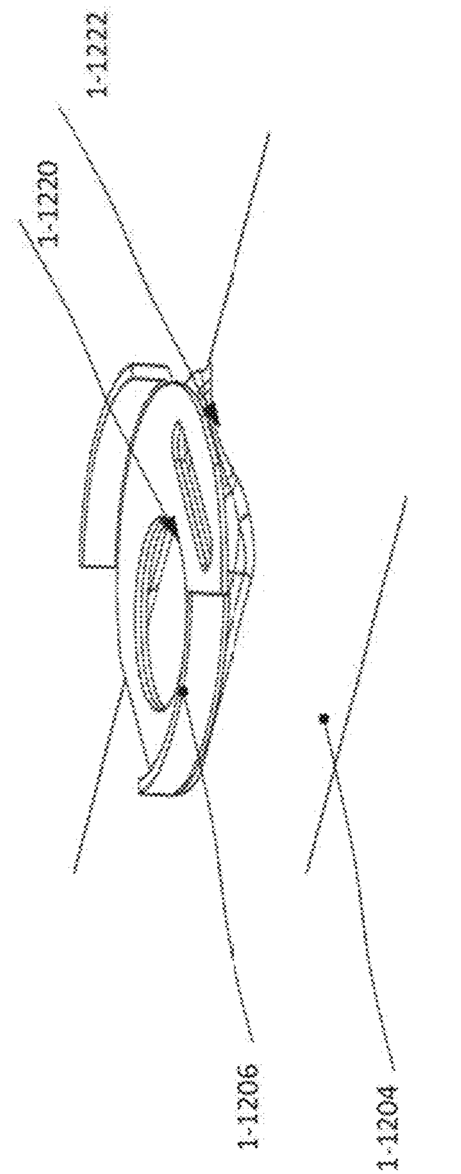
Figure 19F:
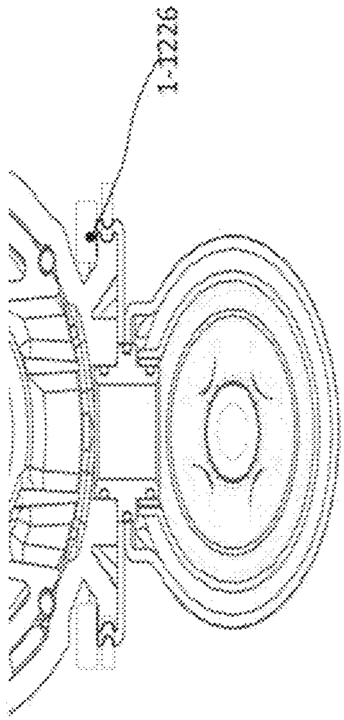
Figure 19E:
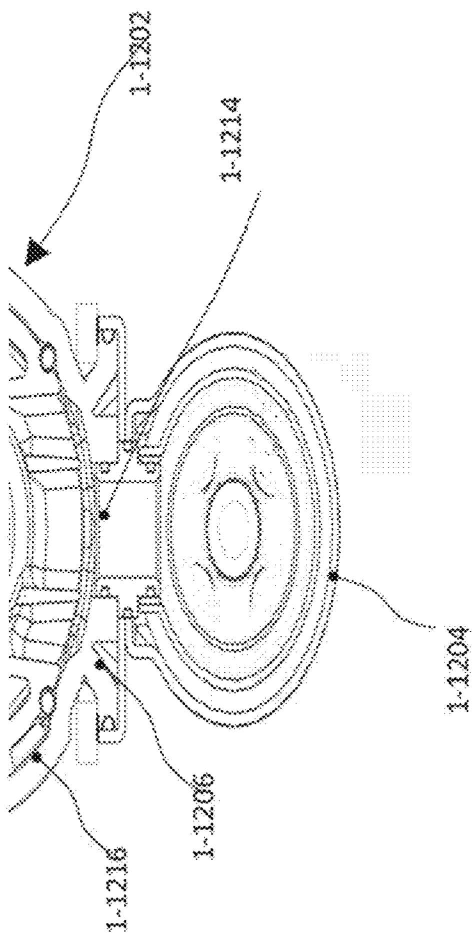

FIG. 19B shows an alternate embodiment of connecting the smart valve 1-1202 to the actuator body 1-1204. In the depicted embodiment, the actuator body has a protrusion 1-1206 extending out from the actuator body which is configured to accept and locate the fluid filled housing of the hydraulic motor-pump 1-1216 so that the hydraulic connection between the first port of the hydraulic motor-pump and first chamber of the actuator body is made via an encapsulated connector tube 1-1214. The protrusion 1-1206 may be constructed by various means such as fixing a separate member to the actuator body (by welding for example), or by constructing the actuator body so that the protrusion is integrally formed with the actuator body, (by utilizing a casting or a sheet metal forming process for example). A second cavity 1-1218 (shown in FIG. 19C) is created in the protrusion 1-1206 and is in fluid communication with the second port of the hydraulic motor-pump and the second chamber of the actuator body and serves to make the hydraulic connection between the two. The protrusion 1-1206 can be secured after the smart valve assembly is connected to the actuator body by a suitable metal forming process such as a rolling process or crimping for example. The unformed state of the protrusion 1-1206 is shown in FIG. 19B and is shown in the secured, formed state in FIG. 19C. In the embodiment of FIGS. 19B and 19C, the protrusion 1-1206 is formed over tabs 1-1218 that are formed into the fluid filled housing 1-1216. In FIG. 19D the actuator body 1-1204 is shown without the smart valve so that the openings 1-1220 and 1-1222 in the actuator body can be seen as well as to show the protrusion 1-1206 in the unformed state. The opening 1-1220 in the actuator body 1-1204 encases the connector tube connector tube 1-1214 and the opening 1-1222 connects to the second port in the hydraulic motor-pump via the fluid filled housing 1-1216. The opening 1-1220 is also in fluid communication with the second chamber of the actuator. A seal or gasket (not shown) may be placed between the actuator body and the smart valve so as to seal the hydraulic fluid internally from the openings 1-1220 and 1-1222 as well as to contain the fluid so that it cannot leak externally. An alternate securing shape of the protrusion 1-1206 is shown in FIGS. 19E and 19F. In the depicted embodiments, the protrusion 1-1206 is formed into a groove 1-1226 that is formed into the fluid filled housing 1-1218. The protrusion 1-1206 is shown in the unformed state in FIG. 19E and in the secured, formed state in FIG. 19F. It is possible to incorporate a thermally insulating member between the actuator body and the smart valve if desired.

While particular methods and arrangements are described above for securing a smart valve to an actuator body, it should be understood that that other methods of securing a smart valve to an actuator body are also contemplated.

Figure 20:
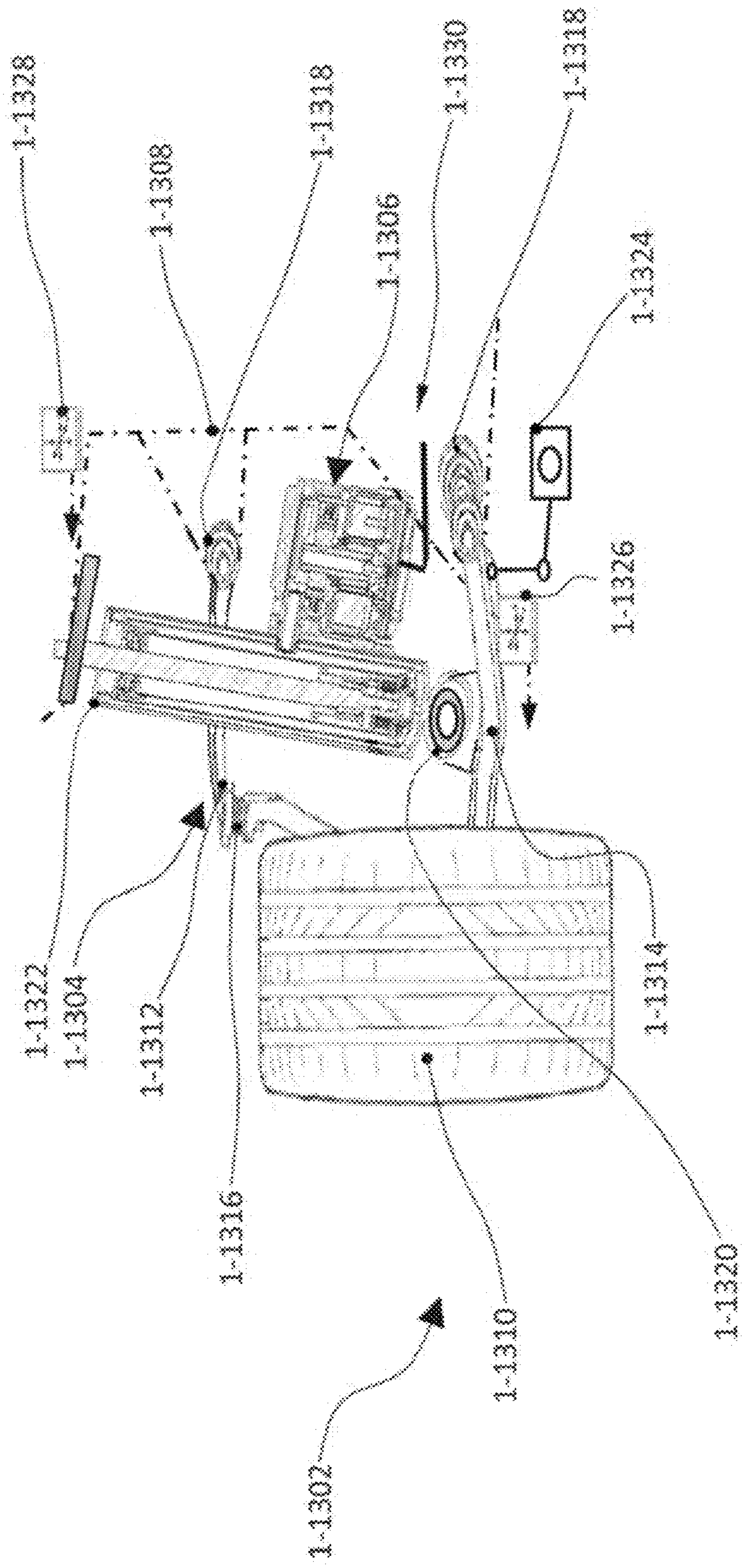
FIG. 20 is a cross sectional view of a hydraulic actuator connected with a smart valve disposed in a wheel well at one corner of a vehicle.

FIG. 20 depicts an embodiment of a suspension installation 1-1302 of an active suspension actuator 1-1304 within a wheel well at one corner of a vehicle. The suspension system 1-1302 includes an active suspension actuator 1-1304 integrated with a smart valve 1-1306 that is coupled between the chassis 1308 and the wheel 1310. Generally, the chassis is commonly referred to as a sprung mass, while the wheel and mounting assembly are commonly referred to as an unsprung mass. As illustrated, the wheel 1-1310 is coupled to the chassis and actuator 1-1302 by an upper control arm 1-1312, a lower control arm 1-1314 and a mounting member 1-1316 (which is commonly referred to as the knuckle). The upper control arm 1-1312 and lower control arm 1-1314 are coupled to the chassis at connection points 1-1318, while the actuator is coupled to the lower control arm 1-1314 via a lower mounting member 1-1320 and to the chassis at an upper mounting member 1-1322. The mounting members 1-1320 and 1-1322 may be in the form of elastomeric bushings or other types of suspension mounts, such as hydramounts or active suspension bushings for example, that can be adapted to reduce noise or resonances that may be associated with operation of the active suspension actuator being transmitted to the vehicle or to improve the vehicle NVH characteristics. As depicted in the figure, a position sensor 1-1324 may be located between the suspension mounting assembly and the chassis so that wheel position relative to the chassis can be monitored and used for control of the active suspension actuator. An accelerometer 1-1326 may be mounted on the unsprung mass so as to monitor wheel acceleration and an accelerometer(s) 1-1328 may be mounted on the sprung mass so as to monitor chassis accelerations. An accelerometer, rotary position sensor, and/or pressure sensors may be contained within the active suspension housing and may be combined and adapted with the vehicle sensors to sense a wheel and/or body event. These signals may be used for control of the active suspension actuator. Many combinations of vehicle and actuator based sensors can be constructed and arranged to sense a wheel and/or body event and used for the control of the active suspension actuator. For example, appropriate sensor inputs may be related to wheel acceleration sensing, pressure sensing, position sensing, smart valve local sensing, rotary motor position sensing, multi-sensor whole vehicle sensing, a centralized IMU sensor architecture, utilizing combinations of sensors per wheel and axle, as well as other appropriate types of sensors.

The depicted smart valve is electrically connected to the vehicle electrical power, control, and sensor systems via a connection 1-1330. The compact integrated active suspension actuator 1-1304 occupies a similar volume as a typical passive and semi active damper, which facilitates installation of the integrated system into a vehicle wheel well. In the embodiment shown in FIG. 20, the smart valve 1-1306 is positioned with its axis 1-630 parallel to the axis of the actuator body 1-632. However, other positions and orientations of the smart valve are also contemplated inorder to facilitate installation in other vehicle locations as well as other possible applications.

Figure 21:
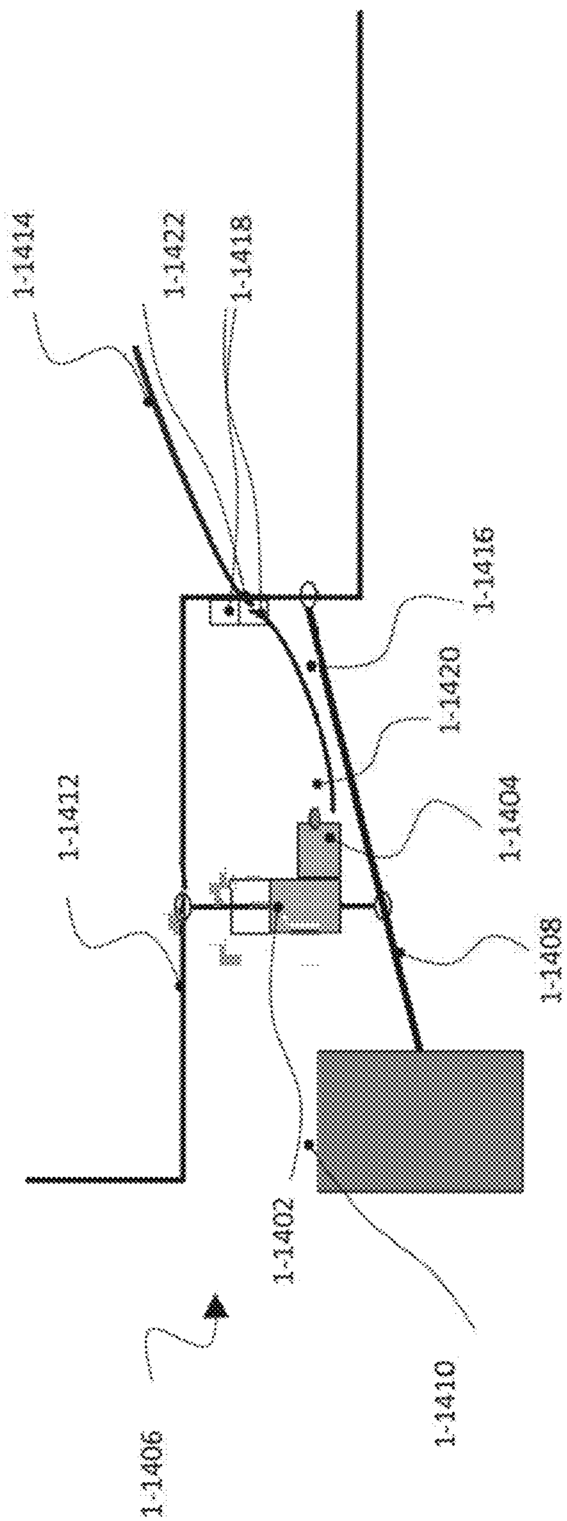
FIG. 21 is a schematic representation of a hydraulic actuator connected with a smart valve disposed in the wheel well at one corner of a vehicle employing a flex cable connection system.

FIG. 21 shows a schematic implementation of an embodiment of an active suspension actuator 1-1402 with an integrated smart valve 1-1404 with chassis mounted power and signal wire connections. As depicted in the figure, the actuator and smart valve are disposed in a vehicle wheel well 1-1406. In this embodiment, the active suspension actuator with integrated smart valve, 1-1402 and 1-1404, is attached to the unsprung portion of the suspension 1-1408, which connects the wheel 1-1410 to the vehicle chassis 1-1412, such that during operation, there is relative motion between the smart valve 1-1404 and the chassis of the vehicle 1-1412. The smart valve's controller is connected to the chassis-mounted wiring harness 1-1414 via one or more flex cable pigtails 1-1416 and mating pair(s) of connectors 1-1418. The pigtails exit the controller housing through one or more lead-out glands 1-1420 that provide strain relief as well as environmental sealing. Both sides of the mated pair of connectors are attached to a chassis-mounted bracket 1-1422 and their cables include strain reliefs connected to the same bracket to minimize any motion across the connection, whether it be due to shock, vibration, or cable flexing. The same approach can be used to wire local sensors and other components to the actuator-mounted smart valve controller as well.

Figure 22:
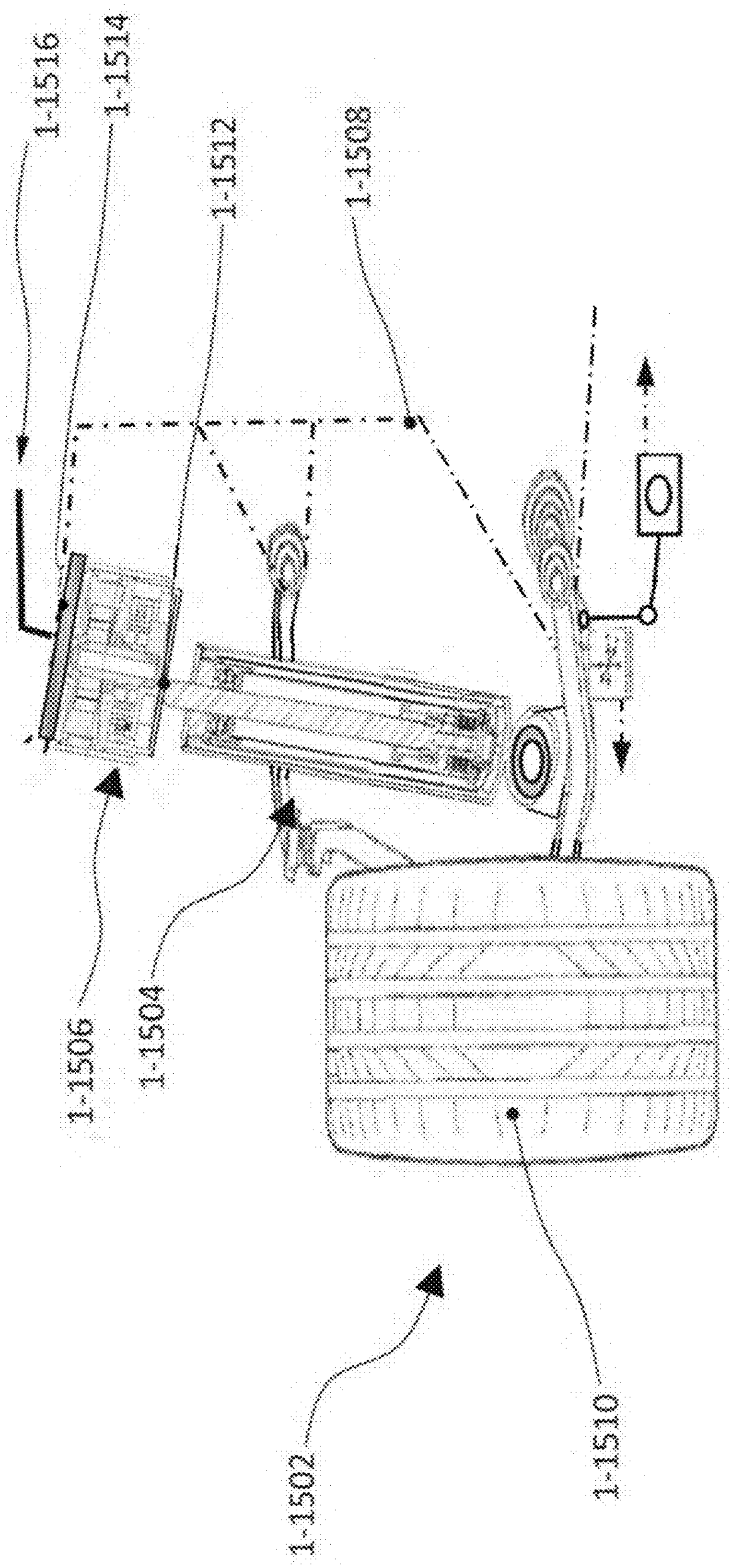
FIG. 22 is a cross sectional view of a hydraulic actuator connected with a top mounted smart valve disposed in a wheel well at one corner of a vehicle.

FIG. 22 depicts an alternate location of a smart valve on an actuator body. In the embodiments of FIGS. 13, 15, and 20 the smart valve is located on the side of the actuator body. However, the smart valve may be mounted in other locations on the active suspension actuator as well. One such location may be at the external end of the piston rod where it is fixed to the chassis member. The embodiment of FIG. 22 depicts the suspension installation 1-1502 of an active suspension actuator 1-1504 within the wheel well at one corner of a vehicle. The suspension system 1-1502 includes an active suspension actuator 1-1504 integrated with a smart valve 1-1506 that is coupled between the chassis 1-1508 and the wheel 1-1510. In the embodiment depicted in FIG. 22 the smart valve 1-1506 is located at the external end of the piston rod 1-1512. The axis of the hydraulic motor-pump 1-630 may be co-axial with the axis of the actuator 1-632, and may be fixed to a suspension mount 1-1514 which is connected to the chassis 1-1508. In this arrangement the first port and second port of the hydraulic motor-pump contained within the smart valve is in fluid communication with the first chamber and second chamber of the actuator via hydraulic flow passages formed in the piston rod 1-1512. The smart valve is electrically connected to the vehicle electrical power, control and sensor systems via a connection 1-1516.

The arrangement depicted in FIG. 22 may be advantageous as the smart valve now occupies the space at the top of the suspension where the top suspension mount normally connects to the chassis, and as such many vehicle chassis construction have adequate clearance in this area. Another advantage is that the smart valve is not connected to the chassis and does not move with the wheel, thereby reducing the unsprung mass of the suspension, as well as mitigating a possible need for flex cables. While an embodiment where the smart valve is located coaxially with, and adjacent the top suspension mount of, the hydraulic actuator, embodiments in which the smart valve is located at or adjacent to a bottom mount of the hydraulic actuator are also contemplated.

The embodiments shown in FIGS. 20 and 15 depict a suspension arrangement where an upper and lower suspension member is used to locate the wheel assembly relative to the chassis. However, in an alternative embodiment, the active suspension actuator with integrated smart valve may be adapted into a McPherson strut arrangement, not depicted. In such an arrangement, the actuator body and piston rod may become a locating member of the wheel assembly. It is also possible to adapt the active suspension actuator to incorporate other arrangements such as an integral air spring, coil spring, torsion spring leaf/beam springs, an inverted actuator, a telescoping actuator, a self-pumping ride height adjustable device, or to incorporate alternate actuator arrangements such as monotube, twin tube, and/or triple tube configurations as the disclosure is not so limited.

Figure 23:
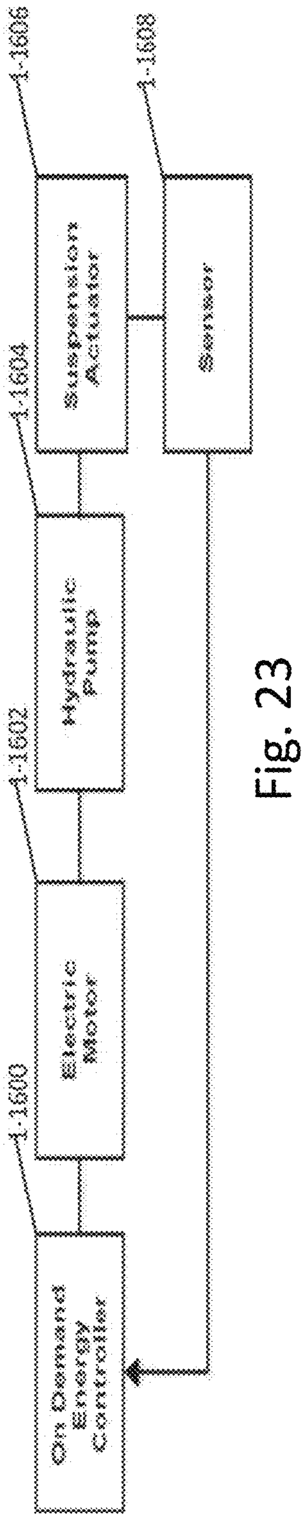
FIG. 23 is an exemplary block diagram of an active suspension with on-demand energy flow.

FIG. 23 is a schematic representation of one embodiment of a suspension system adapted to provide on demand energy. As illustrated in the figure, an on-demand energy controller 1-1600 is operatively coupled to an electric motor 1-1602 such that it controls a motor input of the electric motor. The electric motor 1-1602 is operatively coupled to a hydraulic motor-pump 1-1604 which is coupled to a hydraulic actuator 1-1606. Actuation of the hydraulic motor-pump 1-1604 controls a fluid flow into and out of the various portions of the actuator 1-1606 to create an actuation force of the actuator. The system also includes at least one sensor 1-1608 which is in electrical communication with the on-demand energy controller 1-1600. The sensor is adapted to detect one or more system conditions and provide that information to the on-demand energy controller so that the controller can control the overall suspension system to respond to that sensor input. While this system has been described with regards to an on-demand energy suspension system, it should be understood that any hydraulic actuator could also implement an on-demand energy control system as described elsewhere.

Figure 25:
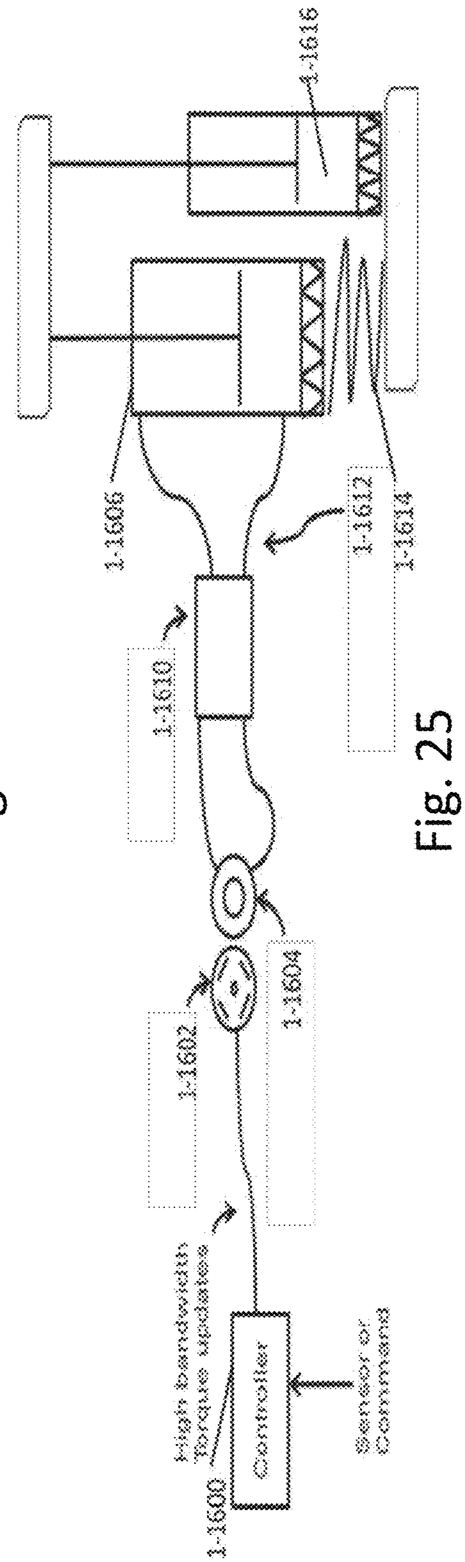
FIG. 25 is a schematic representation of an active suspension with a series spring and parallel damper adapted to provide on-demand energy.
Figure 99B:
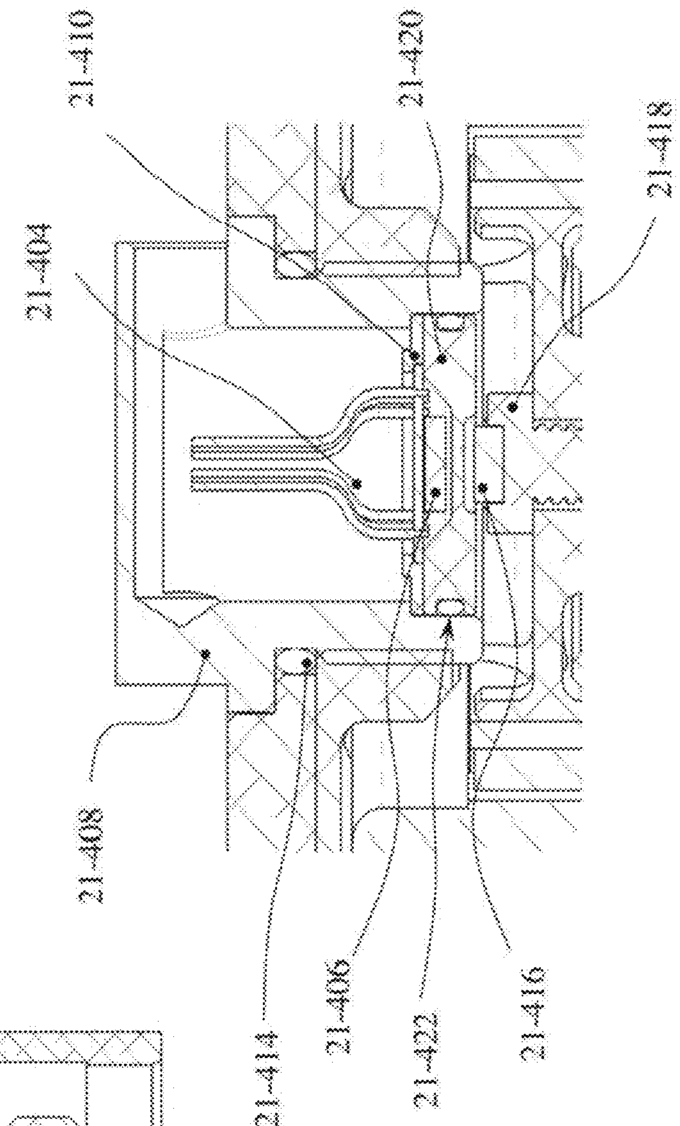
FIG. 99B is a detail view of the alternate embodiment of the BLDC motor rotor position sensor, sensing magnet and diaphragm.
Figure 99A:
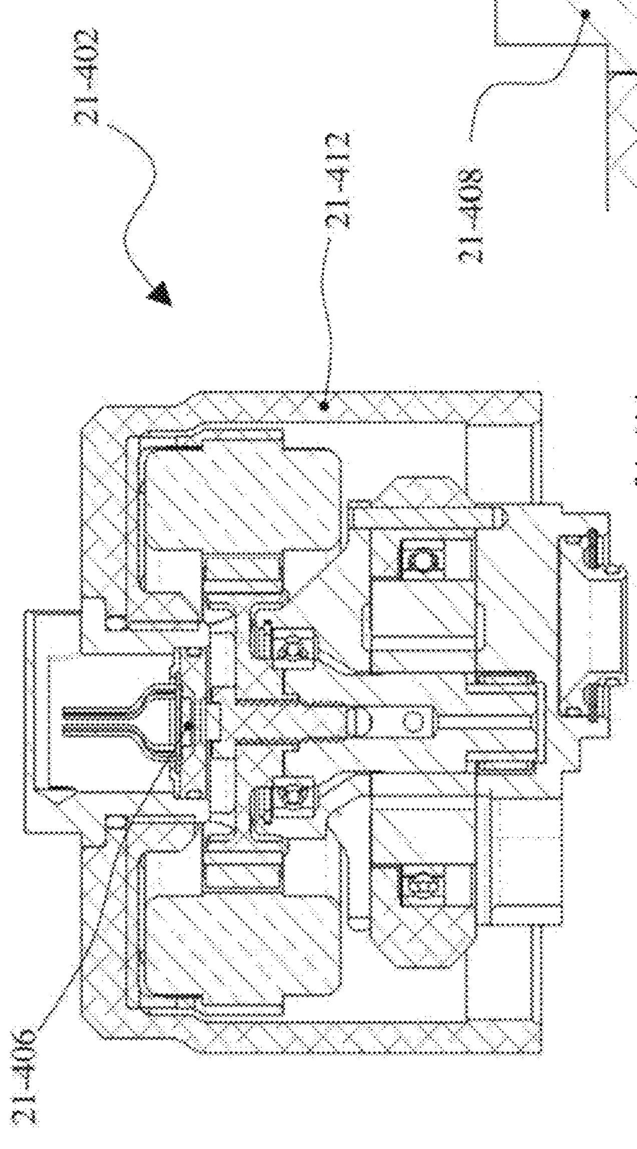
FIG. 99A is a cross section of an alternate embodiment of a hydraulic pump, BLDC motor containing a motor rotor position sensor and controller assembly as used in an active suspension actuator.

FIGS. 99A and 25 are directed to embodiments of a suspension system that again includes a controller 1-1600, an electric motor 1-1602, a hydraulic motor-pump 1-1604, and a hydraulic actuator 1-1606. However, as depicted in the figures, unlike previous embodiments where they are directly connected, or closely coupled to one another, a fluid connection between the hydraulic actuator 1-1606 and the hydraulic motor-pump 1-1604 may include one or more valves 1-1610 as well as hydraulic tubes or hoses 1-1612. Depending on the particular embodiment, the hydraulic motor-pump 1-1604 may still be located near, or be attached to, the hydraulic actuator 1-1606 and include valves 1-1610 within or proximal to the hydraulic actuator 1-1606. However, embodiments in which the hydraulic motor-pump is remotely located from the hydraulic actuator 1-1606 are also contemplated. Regardless of the use of the one or more valves 1-1610 and the hydraulic tubes or hoses 1-1612, the electric motor 1-1602 may still be controlled in a manner as noted previously in order to dynamically control the system and provide on-demand energy and/or control within three or more quadrants of a force velocity domain.

In addition to the above, FIG. 25 also includes a compliant mechanism 1-1614 located in series with the hydraulic actuator 1-1606, as well as a damper 1-1616 located in parallel with the hydraulic actuator 1-1606. The compliant mechanism may be a spring (e.g. a coil spring, air spring, or other appropriate spring) or an elastomeric bushing (e.g. a suspension top mount or bottom mount) or any other appropriate mechanism capable of functioning like a spring. Additionally, the damper 1-1616, which is located in parallel with both the hydraulic actuator 1-1606 and the compliant mechanism 1-1614, may either be a semi-active damper or a passive damper as the disclosure is not so limited. Again, the electric motor 1-1602 may still be controlled in a manner as noted previously in order to dynamically control the system and provide on-demand energy and/or control within three or more quadrants of a force velocity domain. In one embodiment the controller may control the motor 1-1602 and one or more semi-active valves in the damper 1-1616 such that they are coordinated to operate in unison to affect body and/or wheel control. In some embodiments one or more valves 1-1610 are included that are electronically controlled and/or coordinated by the controller. Additionally, in certain embodiments, additional passive valves such as compression and rebound blowoff valves, which may reside on the piston head, not depicted, may also be included.

Figure 24:
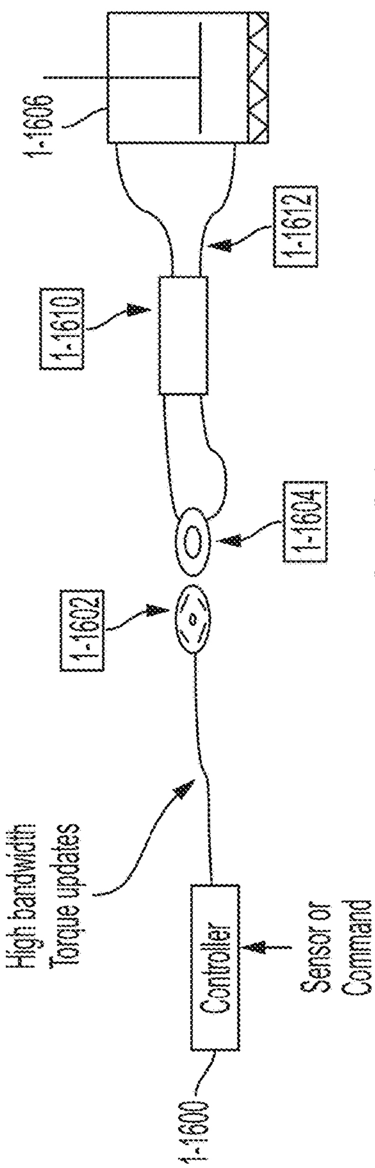
FIG. 24 is a schematic representation of an active suspension adapted to provide on-demand energy.

In some embodiments, the one or more valves 1-1610 depicted in FIGS. 24 and 25 and described above may correspond to the specific valving arrangements shown in FIGS. 26A-26D and as described in more detail below.

Figure 26A:
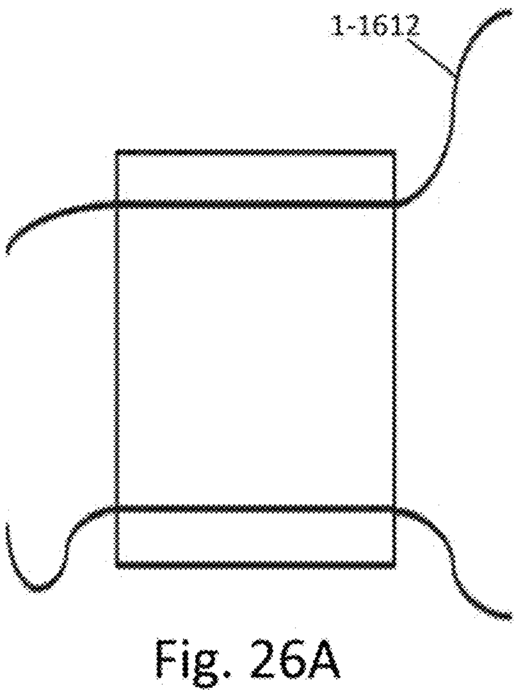
FIGS. 26A-26D are schematic representations of an active suspension including valves and dampers adapted to provide on-demand energy.

FIG. 26A depicts an embodiment where the hydraulic tubes or hoses 1-1612 are direct connections and the one or more valves 1-1610 are not used.

Figure 26B:
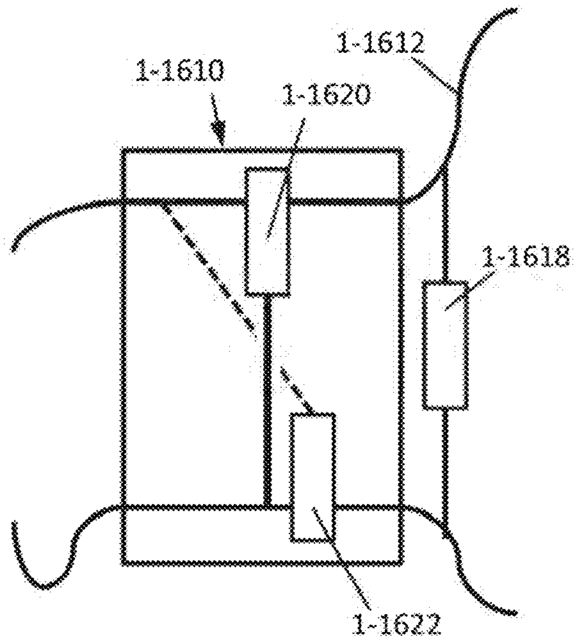

FIG. 26B The diverter valves provide fluid communication between the actuator volumes and the hydraulic motor-pump when fluid velocity is below a threshold, and provide dual communication between both the hydraulic motor-pump and a bypass channel when the fluid flow velocity threshold is exceeded. The bypass channel may further comprise a tuned restrictive valve to provide damping.

Figure 26C:
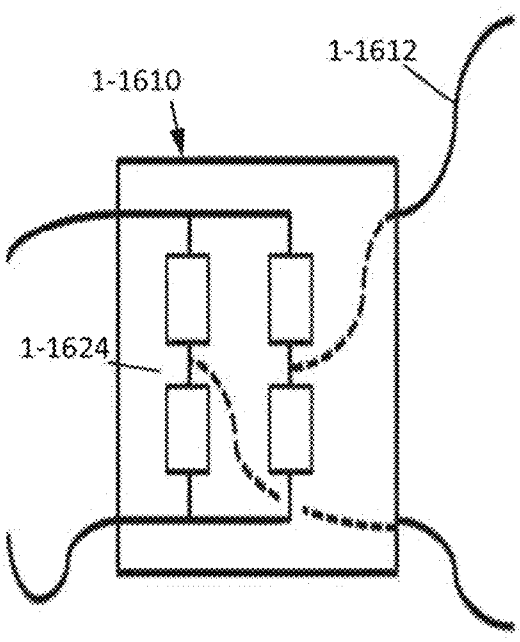

FIG. 26C depicts an embodiment where the one or more valves 1-1610 correspond to a controlled H-bridge rectifier 1-1624 that controls the fluid flow through the hydraulic hoses or tubes 1-1612. The H bridge rectifier 1-1624 includes electronically controlled valves, such as a solenoid valve or other appropriate valve. Additionally, a check valve may be located in parallel to each electronically controlled valve, not depicted, such that external movement into the hydraulic actuator 1-1606 may allow fluid to flow from the actuator body, through the check valves, towards the hydraulic motor-pump. These reverse check valves provide regenerative operation such that external input to the actuator creates a rotation of the hydraulic motor-pump 1-1604.

Figure 26D:
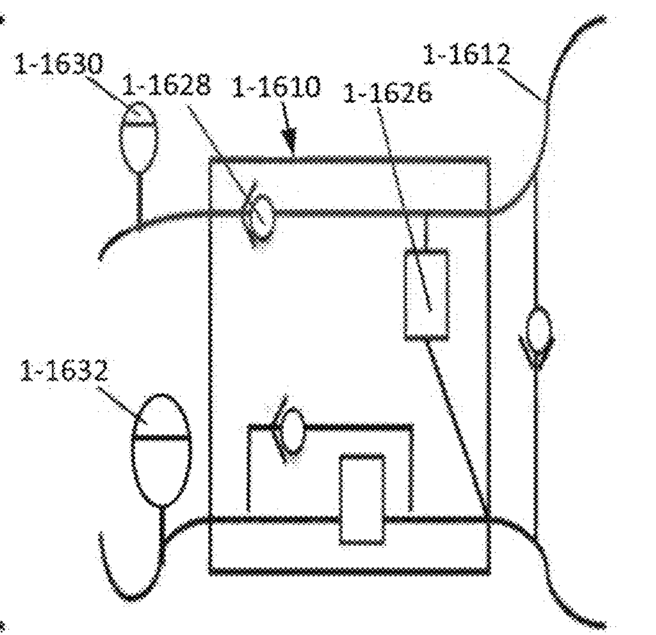

FIG. 26D depicts an embodiment of the one or more valves 1-1610 including an electrically controlled valve 1-1626 located on one hydraulic tube or hose 1-1612 and another electrically controlled valve 1-1626 controlling flow of fluid between both of the hydraulic tubes or hoses 1-1612. The embodiment also includes several passive check valves 1-1628 to control fluid relative to the electrically controlled valves 1626 and the two hydraulic hoses or tubes 1-1612 so that in an actuated compression stroke, on-demand fluid pressure acts on the annular area (piston area minus the piston rod area), and in an actuated extension stroke, on-demand fluid pressure acts on the piston rod area. The presence of such valving in addition to on-demand energy control may improve inertia response of the system, provide unidirectional flow, and improve harshness characteristics of some embodiments. In such embodiments force on the actuator may be created by a pressure in the actuator 1-1606 that is at least partially decoupled from the pressure created by the hydraulic motor-pump. The hydraulic motor-pump may be operated at high bandwidth (such as on a per wheel or body event basis), while the electronically controlled valving may also operates at at least this frequency. While specific valving arrangements are described above, it should be understood that embodiments using other types of valving arrangements and/or no separate valving other than that provided by a smart valve are also contemplated.

Figure 27:
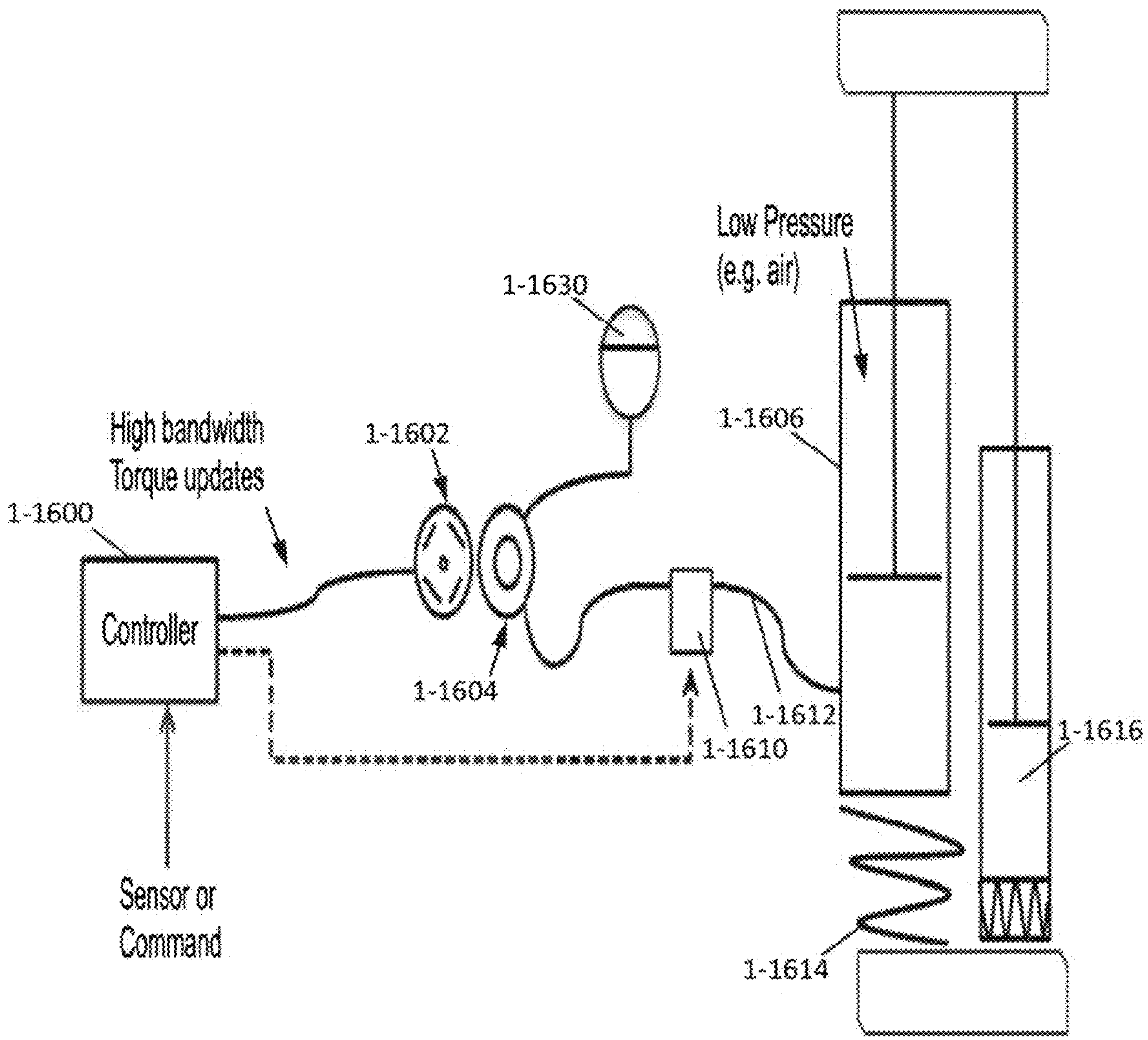
FIG. 27 is a schematic representation of an active suspension comprising a single acting actuator adapted to provide on-demand energy.

FIG. 27 is directed to an embodiment of a suspension system that again includes a controller 1-1600, an electric motor 1-1602, a hydraulic motor-pump 1-1604, and a hydraulic actuator 1-1606. The embodiment also includes a low pressure reservoir or accumulator 1-1630 in fluid connection with a first port of the hydraulic motor-pump 1-1604. A fluid connection between the hydraulic actuator 1-1606 and a second port of the hydraulic motor-pump 1-1604 may include one or more valves 1-1610 as well a hydraulic tube or hose 1-1612. Depending on the particular embodiment, the hydraulic motor-pump 1-1604 may still be located near, or be attached to, the hydraulic actuator 1-1606. However, embodiments in which the hydraulic motor-pump is remotely located from the hydraulic actuator 1-1606 are also contemplated. Regardless of the use of the one or more valves 1-1610 and the hydraulic tube or hose 1-1612, the electric motor 1-1602 may still be controlled in a manner as noted previously in order to dynamically control the system and provide on-demand energy and/or control within three or more quadrants of a force velocity domain. In the embodiment depicted the actuator is a single acting actuator, wherein the one or more valves may contain a check valve that checks against flow of fluid from the single acting actuator to the hydraulic motor-pump. This check valve may be in parallel to an electrically controlled valve that controls flow of fluid from the single acting actuator to the hydraulic motor-pump. In another embodiment, a single electrically controlled valve may control flow of fluid to and from the single acting actuator and the hydraulic motor-pump. The non-controlled side of the single acting actuator may be open to atmospheric pressure or may contain a low pressure gas. The hydraulic connection 1-1612 may connect to a compression side of the actuator or to the extension side of the single acting actuator.

In some embodiments, the system depicted in FIG. 27 may be controlled as follows: to create an active extension force, the controller 1-1600 creates a torque in the electric motor 1-1602, which puts a torque on the hydraulic motor-pump 1-1604, creating pressure. The pump may operate in a forward direction, wherein pressure from the hydraulic motor-pump moves fluid in a first direction from the hydraulic motor-pump, through the valve 1-1610 (such as a check valve free flow path), and into the controlled side of the actuator thus creating an extension force. This extension force operates on a compliant mechanism 1-1614 that will be described below. To create a compression compliance, during which the actuator provides a substantially low force, the valve 1-1610 may be controlled by the controller 1-1600 to open (such as an electronically controlled solenoid or servo valve), allowing fluid to flow from the controlled side of the actuator to the hydraulic motor-pump 1-1604, and into the reservoir 1-1630. In this case, the electric motor is backdriven such that energy may flow from the motor into the controller in a regenerative mode of operation. In one control mode, the electric motor may control the hydraulic motor-pump to actively pump fluid from the controlled side of the actuator to the reservoir 1-1630. By controlling torque in the motor dynamically (and in some embodiments in conjunction with valves in 1-1610), an instantaneous force may be provided to the suspension.

In another embodiment, the system of FIG. 27 may be accomplished without any valve 1-1610, such that holding force is accomplished by directly controlling the electric motor 1-1602. One possible benefit of using valving, however, is to provide low energy holding force operation.

In addition to the above, FIG. 27 also includes a compliant mechanism 1-1614 located in series with the hydraulic actuator 1-1606, and a damper 1-1616 located in parallel with the hydraulic actuator 1-1606. The compliant mechanism may be a spring (e.g. a coil spring, air spring, or other appropriate spring) or an elastomeric bushing (e.g. a suspension top mount or bottom mount) or any other appropriate mechanism capable of functioning like a spring. Additionally, the damper 1-1616, which is located in parallel with both the hydraulic actuator 1-1606 and the compliant mechanism 1-1614, may either be a semi-active damper or a passive damper as the disclosure is not so limited. Again, the electric motor 1-1602 may still be controlled in a manner as noted previously in order to dynamically control the system and provide on-demand energy and/or control within three or more quadrants of a force velocity domain.

Figure 28:
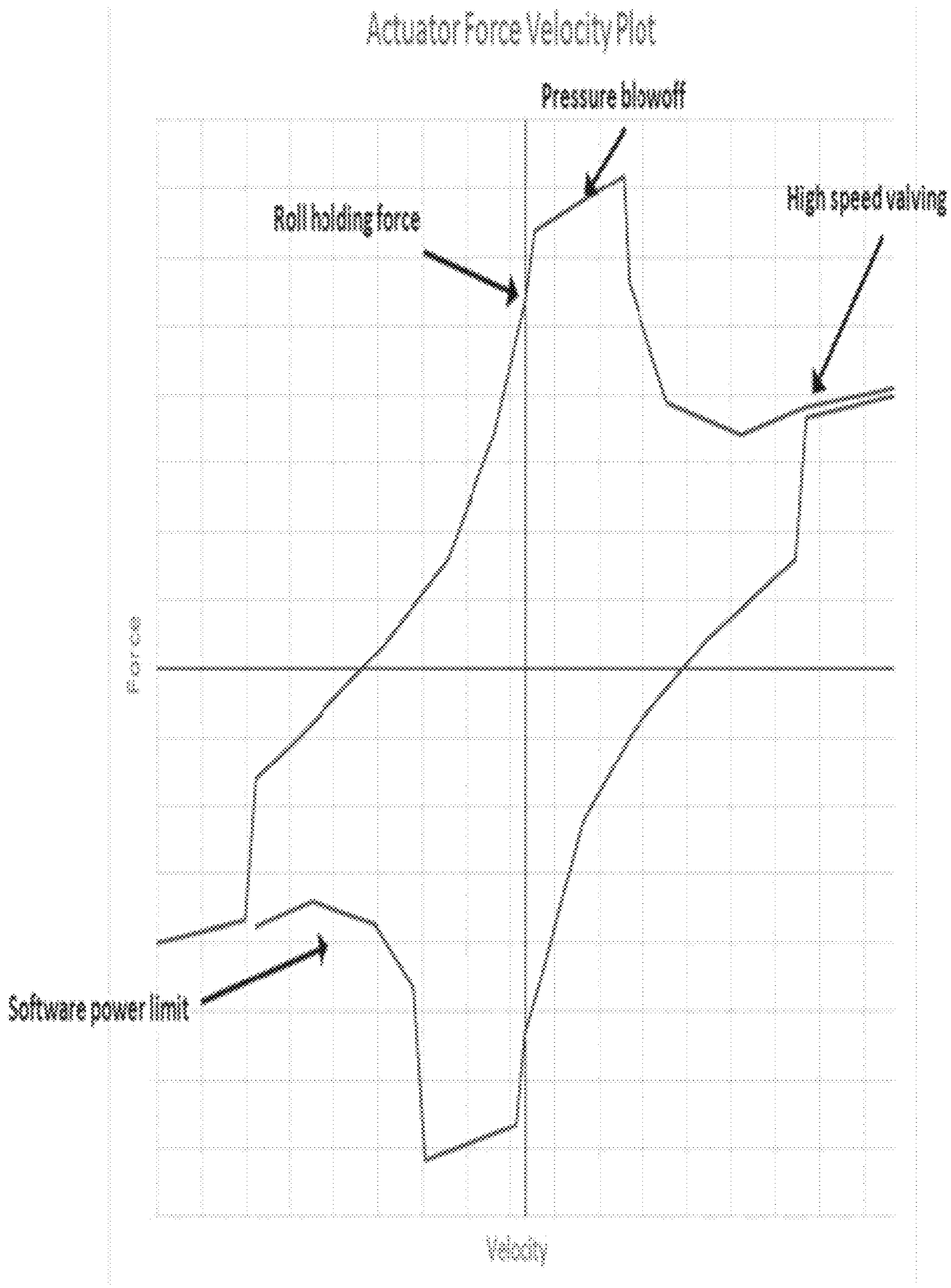
FIG. 28 is a graph of a four operational quadrant force velocity domain for an active suspension system.

FIG. 28 is a graph showing the control and tuning regimes for one embodiment of an active suspension system capable of providing on demand energy flow as described herein. In addition to operating within the four quadrants of the force velocity domain, the graph also indicates regions corresponding to roll holding force, pressure blowoff (which may be individual valves for each of compression and rebound), high-speed valving (such as a diverter valve described elsewhere in this specification), and software power limits (such as controlling a maximum current or a maximum current times velocity in the motor controller). These various concepts are described in more detail elsewhere.

In some embodiments, a hydraulic actuator and/or suspension system is associated with an electronics architecture that uses an energy bus with voltage levels that can be used to signal active suspension system conditions. For example, an active suspension with on demand energy delivery may be powered by a loosely regulated DC bus that fluctuates between about 40 and 50 volts. When the bus is below a lower threshold, for example, 42 volts, the active suspension controller for each actuator may reduce its energy consumption by operating in a more efficient state, reducing the amount of force it commands, and/or reducing how long it commands a force (e.g. during a roll event, the controller allows the vehicle to increasingly lean by relaxing the anti-roll mitigation to save energy). Additionally, a lower voltage may signal the active suspension actuators to bias towards a regenerative mode if the actuator is capable of energy recovery. Similarly, when a high voltage is detected, the actuators may reduce energy recovery or dissipate damping energy in the windings of a motor in order to prevent an overvoltage condition. While this example was described using thresholds, it may also be implemented in a continuous manner wherein the active suspension is simply controlled as some function of the voltage of its power bus. Such a system may have several advantages. For example, allowing the voltage to fluctuate increases the usable capacity of certain energy storage mechanisms such as super capacitors on the bus. It may also reduce the number of data connections in the system, or reduce the amount of data that needs to be transmitted over data connections such as CAN. In some embodiments the power bus may even be used to transmit data through a variety of communication of power line modulation schemes in order to transmit data such as force commands and sensor values.

In another embodiment, an active suspension as described above is associated with a vehicular high power electrical system that operates at a voltage different from (e.g. higher than) the vehicle's primary electrical system. For example, multiple active suspension power units may be energized from a common high power electrical bus operating at a voltage such as 48 volts, with a DC/DC converter between the high power bus and the vehicle's electrical system. Several devices in addition to the active suspension may be powered from this bus, such as, for example, the electric power steering (EPS). In such an embodiment, the high power bus is galvanically isolated from the vehicle's primary electrical system using a transformer-based DC/DC converter between the two buses. In some embodiments the high power electrical system may be loosely regulated, with devices allowing voltage swing within some range. In some embodiments the high power electrical system may be operatively connected to an appropriate form of energy storage such as capacitors and/or rechargeable batteries. These energy storage devices can be directly connected to the bus and referenced to ground; connected between the vehicle electrical system and the high power electrical system; or connected via an auxiliary DC/DC converter. Certain other connections may also exist, including, for example, a split DC/DC converter connecting the vehicle electrical system, the high power bus, and the energy storage.

Without wishing to be bound by theory, combining an active suspension with a power bus that is independent of the vehicle's electrical system may provide several advantages. First, the vehicle's electrical system may be isolated from voltage spikes and electrical noise from high power consumers such as suspension actuators. The DC/DC converter may be also be adapted to employ dynamic energy limits so that too many loads do not overtax the vehicle's electrical system. By running the high power bus at a voltage higher than the vehicle's electrical system, the system may also operate more efficiently by reducing current flow in the power cables and the motor windings. In addition, the active suspension actuators may be able to operate at higher velocities for a given motor winding.

In some embodiments, the suspension systems described above, are associated with an active safety system adapted to control the suspension system to improve the safety of the vehicle during a collision or dangerous vehicle state. In one exemplary embodiment, the suspension system is controlled to deliver a vehicle height adjustment when an imminent crash is detected in order to ensure the vehicle's bumper collides with the obstacle (for example, a stopped SUV ahead) so as to maximize the crumple zone or minimize the negative impact on the driver and passengers in the vehicle. In such an embodiment, the suspension may adjust to a set ride height to optimize performance during any sort of pre or post-crash scenario. In another embodiment, the suspension system can adjust wheel force and tire to road dynamics in order to improve traction during ABS braking events or electronic stability program (ESP) events. For example, the wheel can be pushed towards the ground to temporarily increase the contact force (by utilizing the vertical inertia of the vehicle). This may either be sustained for a predetermined duration or it may be pulsed over multiple shorter durations as the disclosure is not so limited.

In the above noted embodiments, the suspension systems as described herein can be utilized to rapidly change the energy and performance delivered by the suspension on a per event basis in order to respond to an imminent safety threat. By exploiting the fast response time characteristics of these suspension systems in combination with an active safety system, where corrective action often has to occur in about 100 ms or less, vehicle dynamics such as height, wheel position, and wheel traction, may be rapidly adjusted and can operate in unison with other safety systems and controllers on the vehicle to increase vehicle safety.

In one specific embodiment, a suspension as described herein is used as an active truck cab stabilization system to improve comfort, among other benefits. In one embodiment geared towards European-design trucks, four hydraulic actuation systems are disposed between the chassis of a heavy truck and the cabin. A spring sits in parallel with each actuator (i.e. coil spring, air spring, or leaf spring, etc.), similar to the spring and actuator depicted in FIG. 5, and each assembly is placed roughly at the corner of the cabin. Sensors on the cabin and/or the chassis sense movement, and a control loop controlling the active suspension commands the actuators to keep the cabin roughly level. In an embodiment for North American-design trucks, two actuators are used at the rear of the cabin, with the front of the cabin hinged to the chassis. In some embodiments such a suspension may contain modified hinges and bushings to allow greater compliance in yaw, pitch, and/or roll. In a related embodiments, a suspension system incorporating this type of hydraulic actuators may be applied in other appropriate applications, such as, for example, on an isolated truck bed or trailer to reduce vibration transferred to the truck load. Here, the system might employ two active actuators to stabilize the cab. The system uses a plurality of sensors (e.g. accelerometers) and/or vehicle data (e.g. steering angle) in order to sense or predict cab movement, and a control system sends commands to the actuators in order to stabilize the cab. Such cab stabilization provides significant improvement in comfort and may reduce maintenance requirements in the truck.

In another related embodiment, a single hydraulic actuator may be coupled to a suspended seat such as, for example, a truck seat. In this embodiment, the seat rides on a compliant device such as an air spring, and the actuator is connected in parallel to this complaint device. Sensors measure acceleration and control the seat height dynamically to reduce heave input to the individual sitting on the seat. In some instances the actuator may be placed off the vertical axis in order to affect motion in a different direction. By using a mechanical guide, this motion might not be limited to linear movement. In addition, multiple actuators may be used to provide more than one degree of freedom for controlling movement of the seat.

A long haul truck containing an active suspension may especially benefit by improving driver comfort and reducing driver fatigue. By using an active suspension with on demand energy delivery, the system can be smaller, easier to integrate, faster response time, and more energy efficient.

In another embodiment, a suspension system as described herein is associated with an air spring suspension in which static ride height is nominally provided by a chamber containing compressed air. In such one embodiment, the hydraulic actuator of the suspension system is incorporated in a standard hydraulic triple tube damper, with a side-mounted hydraulic motor-pump and electric motor, which may or may not be integrated with the housing as described above. The hydraulic motor-pump and electric motor may be placed towards the base of the actuator body such that an airbag with folding bellows can fit around the actuator on an upper portion of the housing. In such an embodiment, a standard air suspension airbag can be placed about the actuator body towards the top of the unit. In another embodiment, the suspension system includes hoses exiting the hydraulic actuator housing near the bottom and leading towards an external power pack containing a hydraulic motor-pump and an electric motor. As such, the physical structures of the active suspension actuator and the air spring can again be joined on the top of the housing.

In a related embodiment, the control systems for a suspension system and an air suspension system may either be in electrical communication with one another or integrated together. In such an embodiment, air pressure in the air suspension may be controlled in conjunction with the commanded force in the hydraulic actuator of the suspension system. This combined control may either be for the entire air spring system, or it may be implemented on a per-spring (per wheel) basis. The frequency of this control may be on a per event basis and/or based on general road conditions. Generally, the response time of the active suspension actuator is faster than the air spring, but the air spring may be more effective in terms of energy consumption at holding a given ride height or roll force. As such, a controller may control the active suspension for rapid events by increasing the energy instantaneously in the on-demand energy system, while simultaneously increasing or decreasing pressure in the air spring system, thus making the air spring effectively an on-demand energy delivery device, albeit at a lower frequency. By combining the controlled aspects of an active suspension that uses on-demand energy with an air spring that can also be controlled to dynamically change spring force, greater forces may be achieved in the suspension, adjustments can be made more efficiently, and the overall ride experience can be improved.

In some embodiments, a suspension system as described herein is coupled with one or more anti-roll bars in a vehicle. In one specific embodiment, a standard mechanical anti-roll bar is attached between the two front wheels and a second between the two rear wheels. In another embodiment a cross coupled hydraulic roll bar (or actuator) is attached between the front left and the rear right wheels, and then another between the front right and the rear left wheels. Since the active suspension will often counteract the roll bar during wheel events, it may be desirable for efficiency and performance reasons to completely eliminate the roll bar (wherein the active suspension with on demand energy acts as the only vehicular roll bar), or to attach a novel roll bar design. In one embodiment, a downsized anti roll bar is disposed between the wheels, such that there is a large amount of spring compliance in the bar. In another embodiment, an anti roll bar with hysteresis is disposed between the two front and/or the two rear wheels. Such a system may be accomplished with a standard roll bar that has a rotation point in the center of the roll bar, wherein between two limits the two ends of the bar can twist freely. When the twist reaches some angle, a limit is reached and the twist becomes stiff. As such, for certain angles between some negative twist and some positive twist from level, the bar is able to move freely. Once the threshold on either side is reached, the twist becomes more difficult. Such a system can be further improved by using springs or rotary fluid dampers such that engagement of the limit is gradual (for example, prior to reaching the limit angle a spring engages and twist resistance force increases), and/or it is damped (e.g. using a dynamic mechanical friction or fluid mechanism).

In another embodiment, a suspension system may be coupled with an active roll stabilizer system. The active roll stabilizer system may either be hydraulic, electromechanical, or any other appropriate structure.

Use of anti-roll bar technologies and/or active roll stabilizer systems in connection with the suspension system, and especially an active suspension, as described herein may be especially beneficial when a vehicle experiences high lateral accelerations where roll force is greatest and may exceed a maximum force capability of the suspension actuator. Thus, by implementing anti-roll bar technologies and/or active roll stabilizer systems that primarily operate at higher accelerations, roll force levels, and/or roll angles as compared to the suspension system, roll performance can be improved. While several technologies are disclosed to assist in mitigating vehicle roll, the disclosure is not limited in this regard as there are many suitable devices and methods of providing an anti-roll force to supplement a suspension.

As noted above, it is desirable to provide a fast response time for either a hydraulic actuation system and/or a suspension system. However, without wishing to be bound by theory, inertia of the actuation system itself and components associated with it may impact the ability to respond quickly due to inertial forces limiting the response of the system. Consequently, in some embodiments, it is desirable to mitigate the impact of the system inertia on a response of the system. As described in more detail below, this may be accomplished in a variety of ways.

In one embodiment, a hydraulic actuation system and/or a suspension system includes rotary elements made from low inertia materials in order to reduce the amount of energy needed to accelerate these elements and thus increase the response time of the system. For example, the hydraulic pump and/or motor shaft may be produced from an engineered plastic with a lower mass in order to reduce rotary inertia. This may also have an additional benefit for systems including a positive displacement pump by reducing the transmissibility of high frequency inputs into the actuator (i.e. a graded road at high speed input on the wheel). In another exemplary embodiment, a system might include a low-inertia hydraulic motor-pump such as a gerotor. In addition, the electric motor coupled to the hydraulic pump may also have a low inertia, such as by using an elongated but narrow diameter rotor of the motor. In one such embodiment, the diameter of the rotor is less than the height of the rotor. Additionally, a system may use features such as bearings, a low startup torque hydraulic motor-pump, or hydrodynamic bearings in order to reduce startup friction of the rotating assembly.

In another embodiment, a hydraulic actuation system or suspension system includes an inertia buffer located in series to help mitigate inertial effects. The inertia buffer may either be located externally to hydraulic actuator, or it may be integrated into the hydraulic actuator as the disclosure is not so limited. An inertia buffer may be embodied in a number of different ways. For example, an inertia buffer may be embodied as fluid leakage around the hydraulic motor-pump, an appropriately sized orifice arranged in parallel with the hydraulic motor-pump, an elastic coupling between the hydraulic motor-pump and electric motor, a damper and spring combination located between the piston head and actuator body, an active bushing, and/or any other appropriate device or configuration capable of at least partially decoupling movement of the electric motor, hydraulic motor-pump, and/or hydraulic actuator from one another.

In yet another embodiment, the hydraulic actuation system and/or a suspension system is controlled using an algorithm to both predict and compensate for inertia of the system. In such an embodiment, the algorithm predicts inertia of the electric motor and/or hydraulic motor-pump and controls the a motor input of the electric motor, e.g. a motor torque, to at least partially reduce the effect of inertia on a response of the system. For example, for a hydraulic active suspension including a hydraulic motor-pump operatively coupled to an electric motor, a fast pothole hit to a wheel will create a surge in hydraulic fluid pressure and accelerate the hydraulic motor-pump and electric motor. However, an inertia of the rotary elements, which are the hydraulic motor-pump and electric motor in this case, will resist this acceleration, creating a force in the actuator. This force will counteract compliance of the wheel. This may create harshness in the ride of the vehicle, and may be undesirable. In contrast, a system employing predictive analytic algorithms may factor inertia of the various rotary elements into the active suspension control and may command a motor torque that is lower than the desired torque during acceleration events, and at a higher torque that the desired torque during deceleration events. The delta between the command torque of the motor and the desired torque (such as the control output from a vehicle dynamics algorithm) is a function of the rotor or actuator acceleration. Additionally, the mass and physical properties of the rotor may be incorporated in the algorithm. In some embodiments acceleration is calculated from a rotor velocity sensor (by taking the derivative), or by one or two differential accelerometers on the suspension. In some cases the controller employing inertia mitigation algorithms may actively accelerate the mass.

Without wishing to be bound by theory, certain hydraulic motors-pumps, such as a gerotor, produce a pressure ripple during operation. Depending upon the frequency of operation, this pressure ripple may result in vibrations that are either audibly or physically noticeable. Consequently, in some embodiments, a hydraulic actuation system and/or a suspension system may include an appropriate ripple cancellation method and/or device. For example, a motor input of the electric motor may be controlled to produce a varying pressure with a profile similar to the pressure ripple but 180° out of phase. In another exemplary embodiment, position-timed ports communicating with a chamber containing a compressible medium is used to reduce the pressure ripple. Other methods of reducing a pressure ripple might also be used as the disclosure is not so limited.

Example: Controlling an Active Suspension System in Response to Wheel Events

Figure 8:
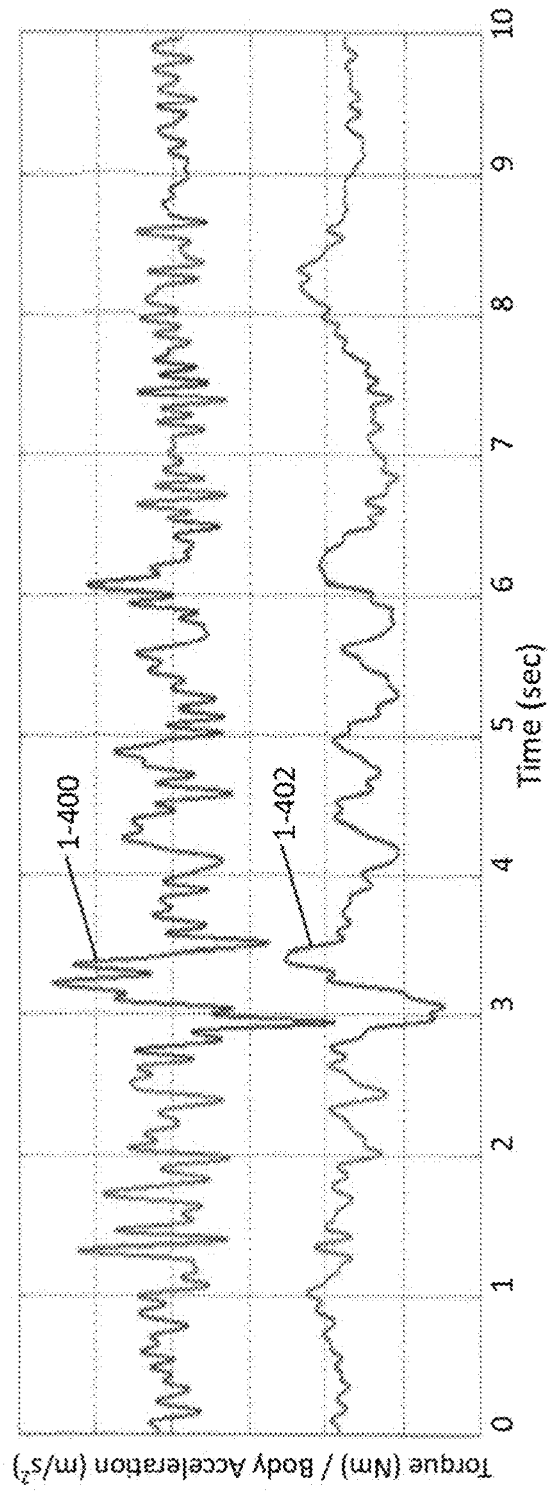
FIG. 8 is a graph of body acceleration and motor torque illustrating active suspension control on a per-event basis.

FIG. 8 demonstrates an active suspension motor torque 1-402 control system that updates in response to wheel events determined from sensed body acceleration 1-400. As can be seen in the chart, changes to the commanded motor torque 1-402 occur at a similar frequency over the presented time period to body acceleration 1-400, which is caused by wheel events such as bumps, hills, and potholes, and driver inputs such as turns, braking, etc.

Figure 9:
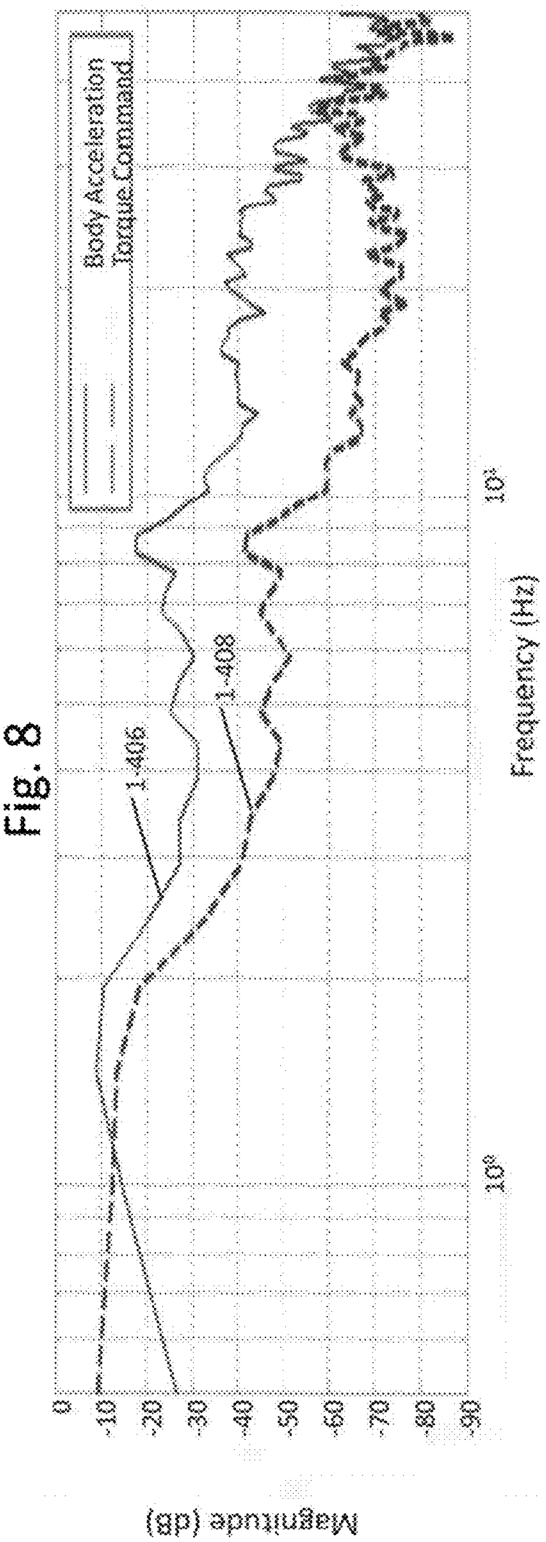
FIG. 9 is a Bode diagram of frequency versus magnitude of torque command correlated to body acceleration.

FIG. 9 shows the same data in terms of frequency instead of time. The shape of the motor torque 1-408 magnitude command with respect to frequency roughly traces the shape of the body acceleration 1-406 magnitude with respect to frequency. This trace of the control algorithm demonstrates that not only is commanded motor torque updated at frequencies at least as high as wheel events are occurring, but also that there is high correlation between the motor torque magnitude and the body acceleration magnitude.

Example: System Natural Frequency Derivation

As noted above in some embodiments, it is desirable for a hydraulic actuation system and/or suspension system to respond quickly to commands because it directly affects the ability of the system to operate in a closed-loop control system.

Figure 10:
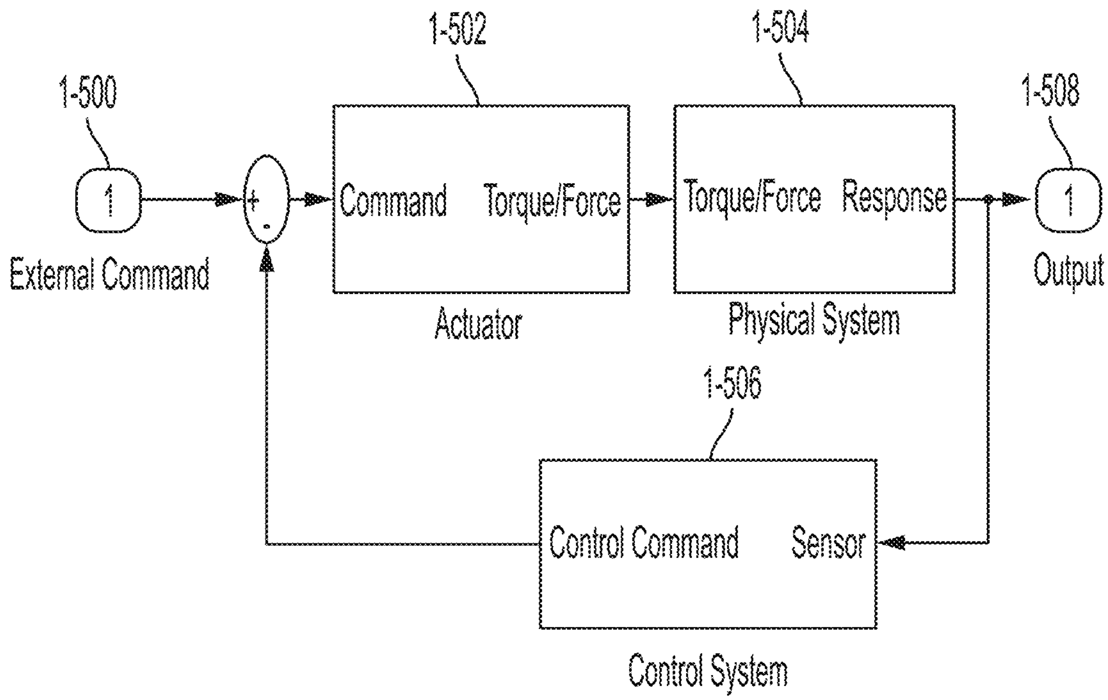
FIG. 10 is an exemplary block diagram of a feedback loop of an active suspension system.

Referring to FIG. 10, in a feedback loop, the time from receiving an external command 1-500, commanding a desired output 1-502, and the physical system subsequently responding at 1-504 affects the maximum frequency at which the overall system can be controlled (its bandwidth). This is in addition to response times associated with subsequent sensing and commands at 1-506 to obtain a desired output at 1-508 using the closed loop command structure. Therefore, and without wishing to be bound by theory, the ability of a closed-loop system to respond to high frequency inputs (by either rejecting them or following them), will be limited in part by the actuator's response time.

The system response time can be characterized in many different ways, but is most often described as the time between a command change, and the time when the resulting actuator output reaches that command.

Figure 11:
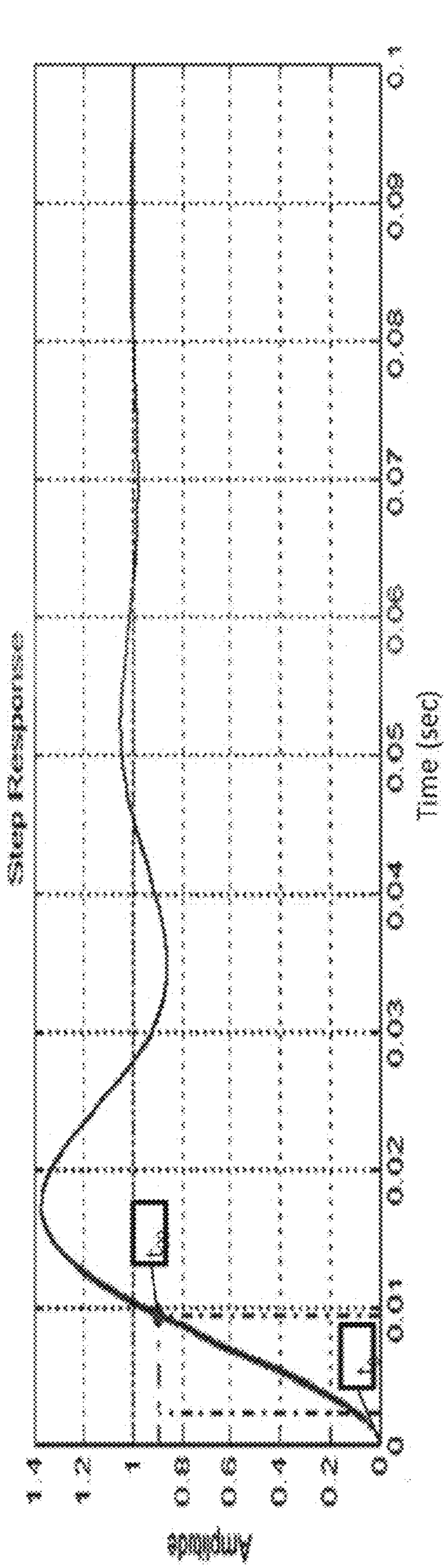
FIG. 11 is a calculated force response illustrating a response time, an overshoot, and subsequent force oscillation.

As illustrated in FIG. 11, a response time of a physical system is commonly characterized as the time between the command change (t0) and the time the output reaches 90% of its steady-state value as a result of that command change (t90).

Many common types of actuators can be characterized at least as a second-order system, where the force or torque output of the actuator, divided by the commanded input, can be characterized as a function of frequency by the following equation $$\frac{\text{Response}}{\text{Command}} = \frac{\text{gain}}{s^2 + 2\xi\omega s + \omega^2}$$

Where s is the complex frequency variable, is the system damping, and w is the natural frequency of the system. While a second-order system has been described above, it should be understood that this has been done for modeling convenience and other models including higher order models might also be used.

Figure 12:
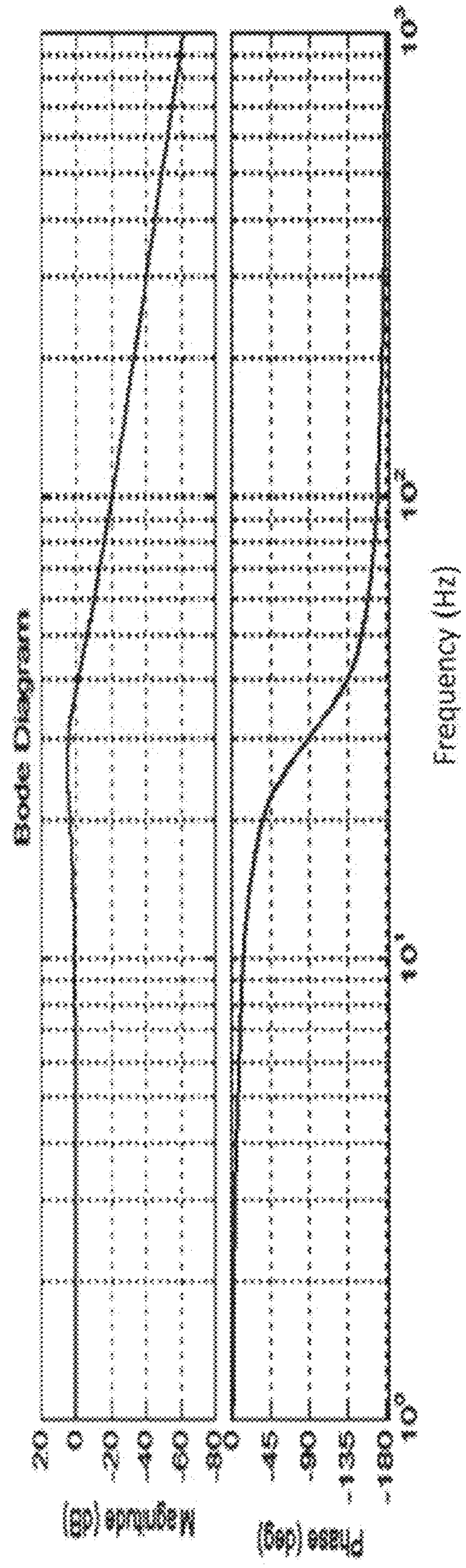
FIG. 12 is a calculated Bode diagram.

An exemplary Bode diagram is presented in FIG. 12 and illustrates the predicted frequency response for a simple second order system.

As an example, in an electro-hydraulic active suspension actuator, including an electric motor, operatively coupled to a back-drivable hydraulic motor-pump, and coupled to a hydraulic piston, the system can be characterized through its reflected inertia, its system compliance, and the inherent system damping.

The system's transfer function now becomes $$\frac{\text{Force}}{\text{Torque}} = \frac{n}{s^2 + 2B\sqrt{\frac{K}{Jn^2}}s + \frac{K}{Jn^2}}$$

Where s is again the complex frequency vector, B is the inherent system damping, 1/K is the total compliance (i.e. the inverse of the system stiffness K), J is the total system inertia, and n is the motion ratio. Typically, the ratio $$\sqrt{\frac{K}{Jn^2}}$$

Without wishing to be bound by theory, this ratio typically is defined as being equal to $2\pi f$ where f is the natural frequency. The ratio is also defined as the frequency at which the total kinetic energy and the total potential energy in the system are equal in magnitude and can thus trade off during the response of the system to an input or a disturbance. Additionally, it can be shown that the response time of a second order system is directly proportional to the natural frequency, and that the response time increases with the system damping while the overshoot decreases. In a current active suspension system design, a natural frequency of about 30 Hz gives a response time of less than about 10 ms.

As noted above, in some embodiments, response times for a hydraulic actuation system and/or an active suspension system may be less than about 150 ms to provide a desired performance, which implies a system natural frequency greater than about 2 Hz, or a product of system compliance times reflected system inertia, or alternatively a ratio of the reflected system inertia to the system stiffness, of less than about 0.0063.

Example: Natural Frequency Design Variations

Tables I-III present the ratio of reflected system inertia to system stiffness for natural frequencies ranging between about 2 Hz to 100 Hz. Additionally, the tables present different design variations for the desired natural frequencies given a particular reflected system inertia, stiffness, and/or motion ratio. Specifically, Table I presents variations in system stiffness for a given reflected system inertia of 20 kg for various natural frequencies. Table II presents variations in system inertia for a given motion ratio of 600 radians/m and a system stiffness of $5\times10^5$ N/m. Table III presents variations in motion ratio for a given system stiffness of $5\times10^5$ N/m and system inertia of $5\times10^{-5}$ kg m$^2$. While particular exemplary combinations of these design criteria are presented below, it should be understood that the disclosure is not limited to only these parameters and that systems including system inertias, motion ratios, and stiffnesses both greater than and less than those presented below are also contemplated.

TABLE I

| Natural Freq. (Hz) | $Jn^2/K$ ($s^2$) | $Jn^2$ (kg) | K (N/m) |
|---|---|---|---|
| 2 | 6.3E−03 | 20 | 3.2E+03 |
| 5 | 1.0E−03 | 20 | 2.0E+04 |
| 10 | 2.5E−04 | 20 | 7.9E+04 |
| 20 | 6.3E−05 | 20 | 3.2E+05 |
| 30 | 2.8E−05 | 20 | 7.1E+05 |
| 40 | 1.5E−05 | 20 | 1.3E+06 |
| 50 | 1.0E−05 | 20 | 2.0E+06 |
| 100 | 2.5E−06 | 20 | 7.9E+06 |

TABLE II

| Natural Freq. (Hz) | $Jn^2/K$ ($s^2$) | n (rad/m) | K (N/m) | J (kg $m^2$) |
|---|---|---|---|---|
| 2 | 6.3E−03 | 600 | 5.0E+05 | 8.8E−03 |
| 5 | 1.0E−03 | 600 | 5.0E+05 | 1.4E−03 |
| 10 | 2.5E−04 | 600 | 5.0E+05 | 3.5E−04 |
| 20 | 6.3E−05 | 600 | 5.0E+05 | 8.8E−05 |
| 30 | 2.8E−05 | 600 | 5.0E+05 | 3.9E−05 |
| 40 | 1.6E−05 | 600 | 5.0E+05 | 2.2E−05 |
| 50 | 1.0E−05 | 600 | 5.0E+05 | 1.4E−05 |
| 100 | 2.5E−06 | 600 | 5.0E+05 | 3.5E−06 |

TABLE III

| Natural Freq. (Hz) | $Jn^2/K$ ($s^2$) | K (N/m) | J (kg $m^2$) | n (rad/m) |
|---|---|---|---|---|
| 2 | 6.3E−03 | 5.0E+05 | 5.0E−05 | 7962 |
| 5 | 1.0E−03 | 5.0E+05 | 5.0E−05 | 3185 |
| 10 | 2.5E−04 | 5.0E+05 | 5.0E−05 | 1592 |
| 20 | 6.3E−05 | 5.0E+05 | 5.0E−05 | 796 |
| 30 | 2.8E−05 | 5.0E+05 | 5.0E−05 | 531 |
| 40 | 1.6E−05 | 5.0E+05 | 5.0E−05 | 398 |
| 50 | 1.0E−05 | 5.0E+05 | 5.0E−05 | 318 |
| 100 | 2.5E−06 | 5.0E+05 | 5.0E−05 | 159 |

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Energy Neutral Active Suspension Control

Modern vehicles are limited in their capacity to deliver power to active vehicle suspension actuators and are limited in their ability to accept regenerative power from same. Large power draws may cause a voltage brownout, or under-voltage condition for the vehicle. Excessive regenerated energy may cause vehicle electrical system voltage to rise higher than allowable.

Figure 30:
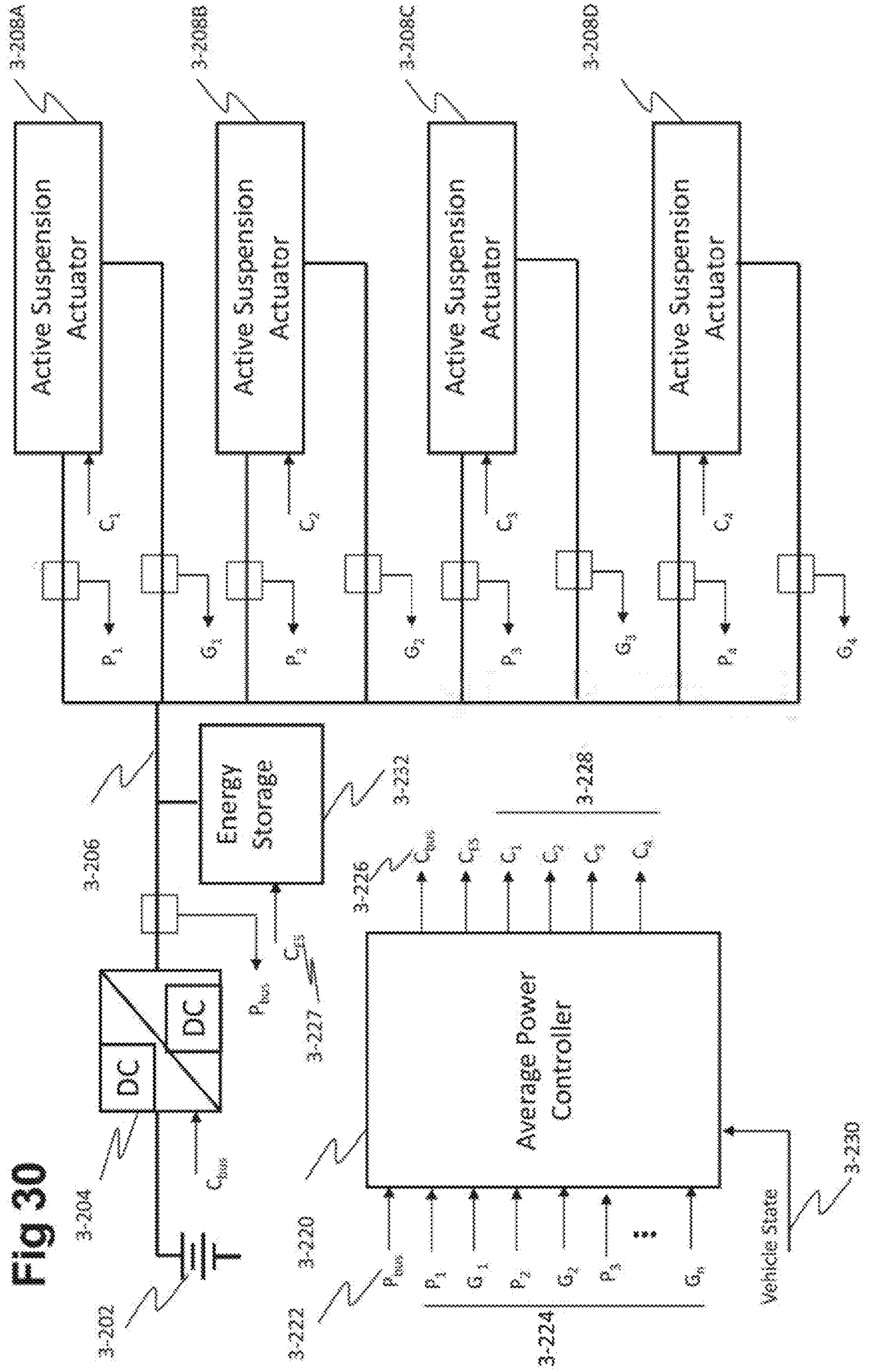
FIG. 30 is a block diagram showing a plurality of active vehicle suspension actuators powered from an independent voltage bus.

Referring to FIG. 29, which depicts an example of energy flow in an active suspension, by being aware of this energy flow it is possible to extract and utilize (either through storage or consumption) at least a portion of energy produced by the suspension while in a regeneration mode. This stored energy can then be available on-demand when the suspension system function in response to a wheel event requires consumption. Stored energy can be harvested and provided by, for example, an electronic suspension system as depicted in FIG. 30 that incorporates bi-directional energy transfer between a suspension system and a vehicle electrical network as well as optional energy storage via a an energy storage apparatus, such as a super capacitor that spans the two electrical networks. The bidirectional nature of such an electronic suspension system may effectively permit return of consumed energy to the vehicle electrical system thereby, causing the suspension system to be nearly energy neutral over time.

In an example of energy neutral active suspension control, energy captured via regeneration from small amplitude and/or low frequency wheel events may be stored in the energy storage apparatus 3-232 of FIG. 30. Once the energy storage apparatus is fully charged, additional energy generated can either be transferred to the vehicle power network (e.g. to charge the vehicle battery 3-202) or merely dissipated as heat. When the suspension control system requires energy, such as to resist movement of a wheel or to encourage movement of a wheel in response to a wheel event, energy may be drawn from the energy storage and from the vehicle power network via the bidirectional power converter 3-204. Energy that is consumed to manage various wheel events may be replaced through the charging functionality described above, effectively resulting in energy neutral active suspension control. In another example of energy neutral active suspension control, the amount of energy flow is measured over time and the actuator forces are biased such that the total average consumed power is less than or equal to +/−100 watts (consumed or regenerated). Such a control system is not limited to regenerative capable systems, and can be accomplished by biasing suspension forces in the semi-active “regenerative” zones as average consumed power approaches a number substantially close to zero such as 100 watts.

The suspension system described herein whereby energy flow from the suspension is stored and at a later time used to create force or motion in the suspension can also be realized with other means of energy storage, e.g. hydraulic accumulators or flywheels. In this embodiment, the energy never enters the electrical domain and is simply transferred from kinetic energy into potential energy stored through a mechanism enabling its gradual reconversion into kinetic energy at a precise instant in time and to a precise amount.

Referring to FIG. 30, which shows a plurality of active vehicle suspension actuators powered by a common power bus 3-206. This power bus is at least partially generated by a DC/DC converter 3-204 from the vehicle electrical system (shown as battery 3-202.) Typical active vehicle suspension actuators 3-208(A-D) are shown. Other vehicle systems may also operate on this bus.

Also shown is an average power controller 3-220 with power measurement inputs (Pbus) from the bus 3-222 as well as power consumption (Px) and power generation (Gx) from each actuator 3-208, and power control outputs (C) for the DC/DC converter 3-226, the energy storage 3-227 and for each actuator 3-228. The power inputs could be calculated from voltage, current and/or power measurements, or estimated using actuator models but the methods and systems described herein are not limited in this regard. Any method of estimating power will suffice. The average power controller 3-220 may also take in vehicle power/energy state data 3-230.

A number of methods of controlling power consumption are depicted in FIG. 30. The average power controller 3-220 can either use the total bus power 3-222 to control the DC/DC converter 3-204 or to control all of the actuators in parallel. Controlling the actuators in parallel does not necessarily mean that each receives the same identical control signal. Controlling actuators in parallel as described herein may mean that a single estimate of power is used as the basis for one or more actuator control signals. Each individual signal may be scaled differently for each actuator according to a control protocol that may be based on actuator relative priority, vehicle state, and the like. Alternatively, the individual actuator powers 3-224 could be used to individually control the associated actuator, or could be analyzed (e.g. summed together) to derive the total bus power and used as described previously. Although controller 3-220 is depicted as a single controller for each actuator, alternatively each actuator could have its own controller 3-220 and these individual controllers could be configured into a network to exchange power and control data to achieve suspension system power neutrality. Such embodiments are within the scope of this disclosure.

In an alternate embodiment of FIG. 30, an energy storage device 3-232 on the bus can be used in conjunction with the power throttling methods and systems described herein. The energy storage device 3-232 provides a storage location for regenerated energy from regenerative actuators and facilitates allowing this energy to be returned to the plurality of actuators to cover at least some of the power load when the actuators are operating as power consumers. In this way, the average power neutrality constraint may potentially be met more easily than for an embodiment without such energy storage, such as without having to throttle actuator power usage as much, thus potentially improving actuator performance while meeting a target average power neutrality constraint.

Figure 31:
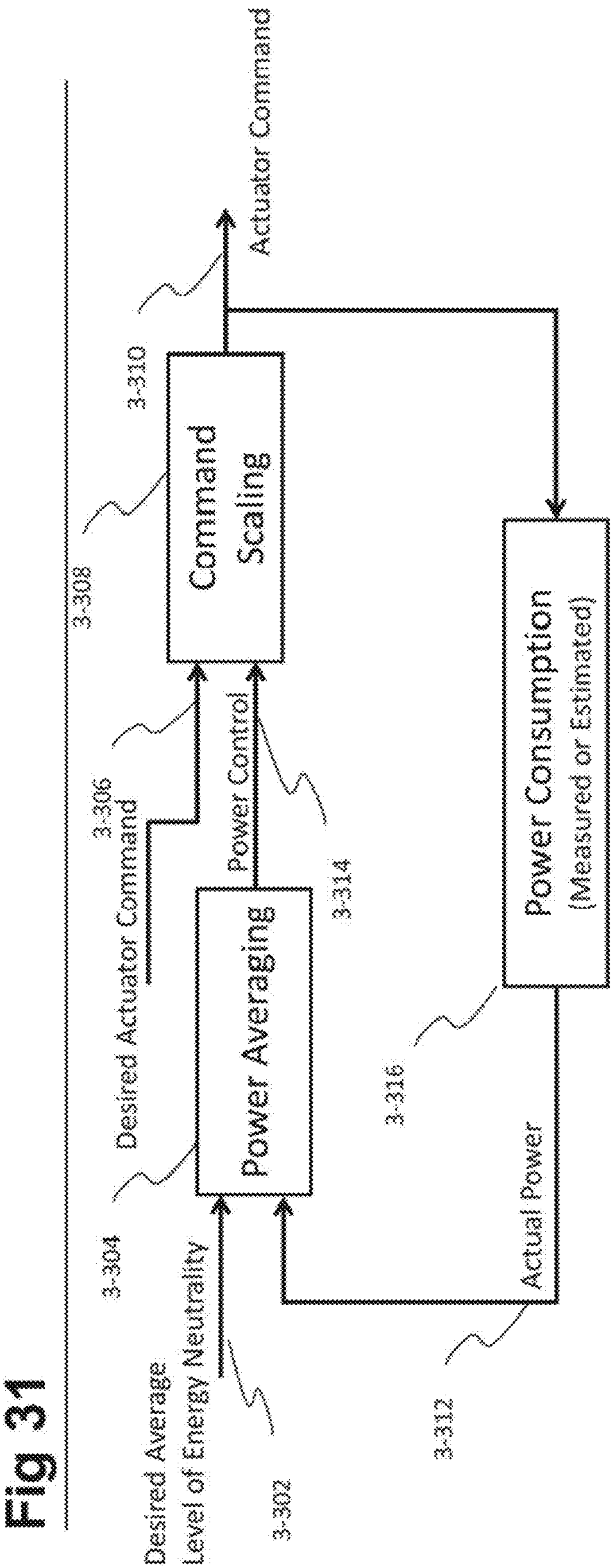
FIG. 31 is a power neutrality control block diagram for a single actuator.

FIG. 31 is an embodiment of an individual actuator throttling algorithm. The desired average power 3-302 is compared in the power averaging block 3-304 to a calculated quantity correlated with the actual power 3-312 used by and/or generated, calculated or measured, of the actuator. In one implementation, this calculated quantity is a filtered moving average of the power, thus providing a low-noise representation of the mean power over the past period of time. The difference between the two determines a power control variable 3-314, which is used as input into the command scaling block 3-308 along with the desired actuator command 3-306.

In one implementation, the actuator command is adapted to adjust power consumption and/or generation as derived from the power control input variable. High power control input variable values may allow the actuator to use as much power as needed to achieve maximum performance while low power control input variable values may throttle the actuator command resulting in lower actuator power consumption measured or estimated in the power consumption block 3-316. Once the actual actuator power output 3-312 reaches the desired level of average energy neutrality 3-302, the power control input variable value may increase slightly which may result in the actuator command throttling being relieved. The actuator command may include control of the actuator for consuming power as well as for generating power.

Command scaling can be done in many ways that allow for a good correlation of power control input values with average power output. These include but are not limited to: limiting short or medium term output power in the actuator, increasing short or medium term allowable regeneration in actuators that regenerate, or a combination thereof. For active suspension actuators, modifying the torque command consistent with other strategies for finding a best possible approximation to the desired command while reducing the power output such as for example reducing the commanded actuator torque to its nearest point to the equal power line.

In a different embodiment, the power control variable can also be used to modify the control gains inside the actuator controller to increase its power efficiency without degrading its performance too much. For example, in an active suspension with regenerative actuators, reducing the overall gain on the body control (which requires power during large portion of its control range) or increasing the gain on the wheel control (which in large part dampens the wheels and regenerates power) results in lower average power consumption. Variations of this algorithm can be used with regenerative active vehicle suspension actuators. Throttling the gains of the actuator controller to bias the power flow towards the regenerative region results in reduced overall power consumption and increased energy generation.

Figure 32:
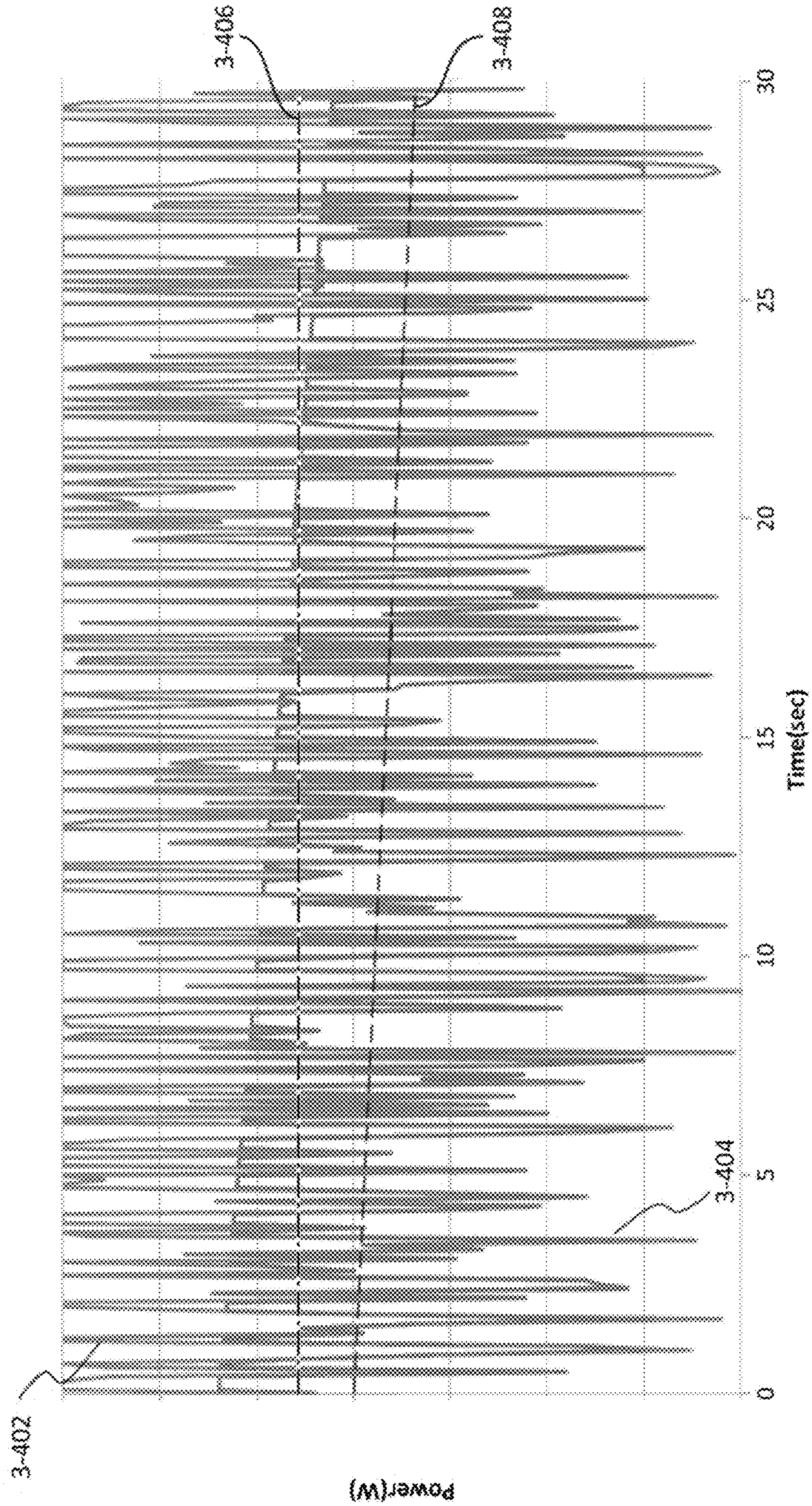
FIG. 32 shows two time traces of active suspension power with and without command limits.

FIG. 32 shows two superimposed time traces of the sum of the consumed power for four active suspension actuators in a vehicle. The first trace 3-402 is without power throttling while the second trace 3-404 is with power throttling. The y-axis is power consumed where positive values are when the actuator is consuming power and negative values are when it is regenerating power. In this embodiment, the power control input results in clamping the peak active and peak regenerative power to values that can vary over time in order to achieve energy neutrality over the longer term. Two trendlines are also shown: 3-406 for the trace without power throttling and 3-408 for the trace with power throttling. The trendlines show that for regenerative active suspension actuators, throttling by clamping peak power reduces the longer term average power consumption substantially and can even result in a system that is substantially energy neutral.

Figure 33:
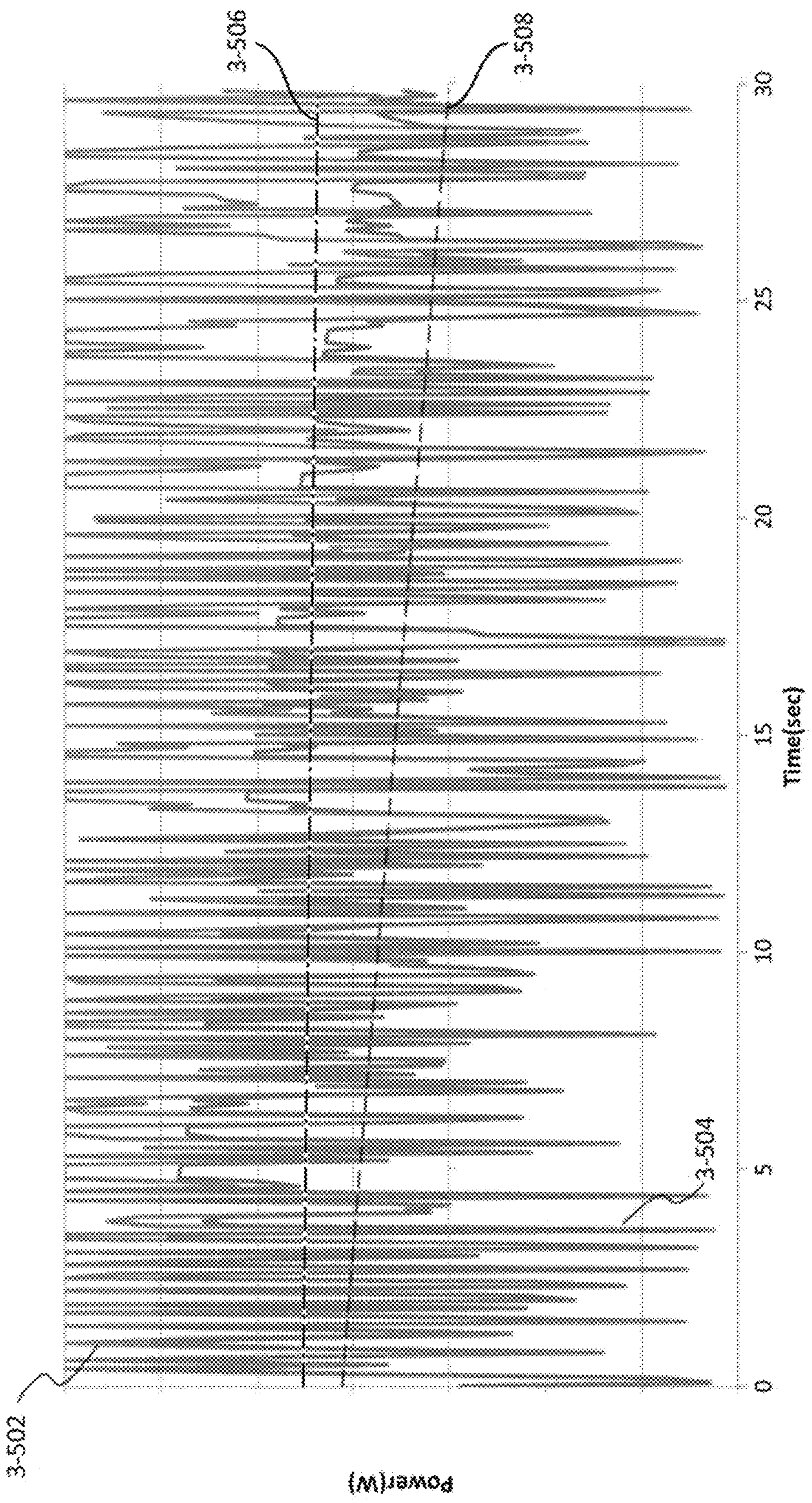
FIG. 33 shows two time traces of active suspension power with and without varying control gains.

FIG. 33 shows two superimposed time traces of the sum of the consumed power for four active suspension actuators in a vehicle. The first trace 3-502 is without power throttling while the second trace 3-504 is with power throttling. The y-axis is power consumed where positive values are when the actuator is consuming power and negative values are when it is regenerating power. In this embodiment, the power control reduces the gains of the actuator controllers over time in order to reduce the longer term average power in the actuators. Two trendlines are also shown: 3-506 for the trace without power throttling and 3-508 for the trace with power throttling. The trendlines show that for a regenerative active suspension actuator, throttling by reducing gains can also reduce power consumption to the point where the longer term average is substantially zero and the plurality of actuators used for active suspension become energy neutral.

The applicability of this method is not limited to active suspension actuators. In fact, it is possible to throttle any plurality of actuators disposed on a vehicle low enough to produce a system that is substantially energy neutral while still maintaining a non-zero level of actuator performance. The level of remaining performance may depend on the amount of energy regenerated.

Throttling algorithms may use both past power consumption history as well as predictive power-consumption related information based on a range of data sources such as GPS route, weather and road conditions, information from a forward camera about pedestrians, stop signs and other vehicles as well as direct driver input such as steering, braking and throttle position. In one embodiment a trendline of past power consumption can be used as a factor in a prediction of future power consumption.

Figure 34:
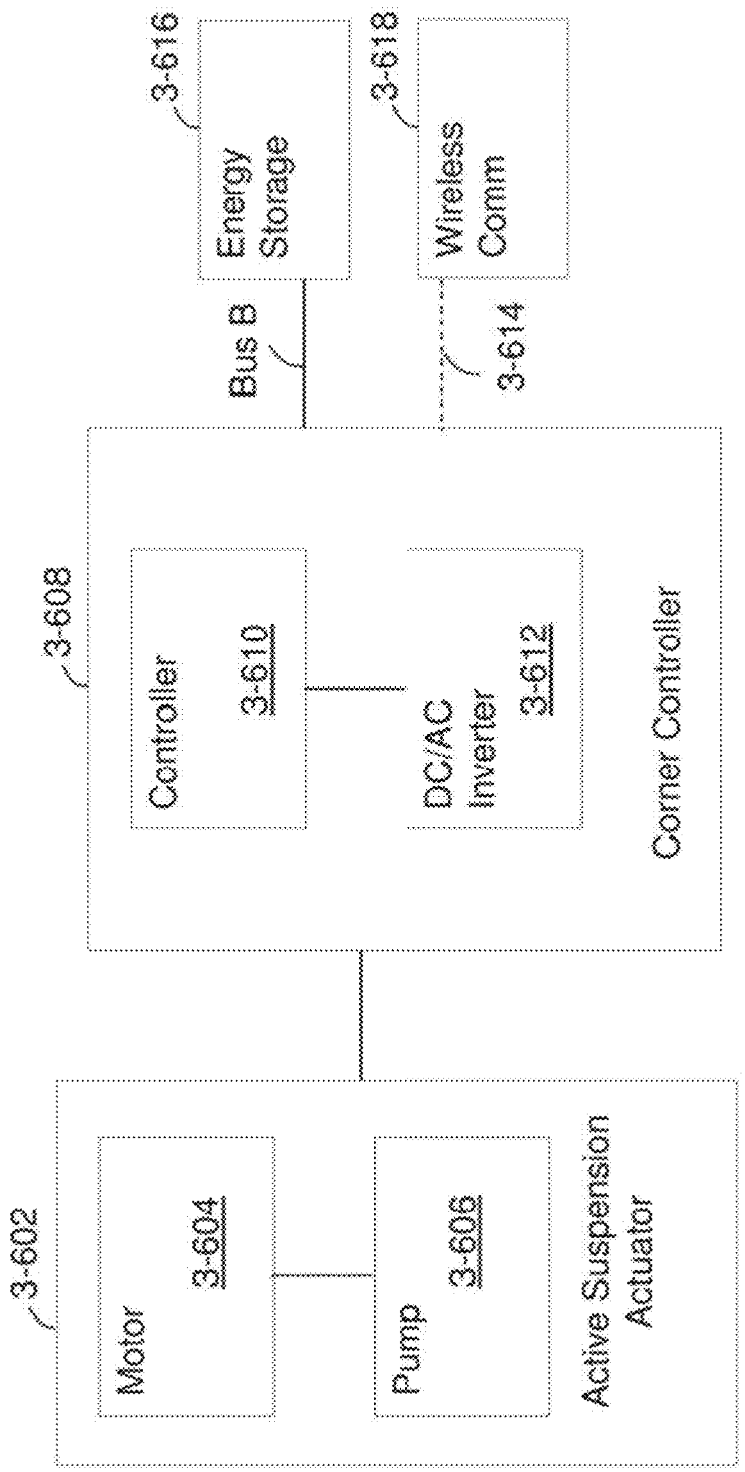
FIG. 34 shows a wireless self-powered fully-active suspension system.

FIG. 34 shows a block diagram of a self-powered active suspension actuator 3-602 and corner controller 3-608. Active suspension actuator 3-602 may be mechanically coupled to the wheel of a vehicle and may dampen wheel movements. Active suspension actuator 3-602 may actively control wheel movements, drawing power from bus B to drive motor 3-604 (e.g., optionally a three-phase brushless motor) which actuates pump 3-606 to displace and/or change the pressure of fluid in a hydraulic damper mechanically connected to the wheel. In response to wheel and/or vehicle movement, active suspension actuator 3-602 may generate power based on the movement and/or change of pressure of fluid in the damper, thereby actuating pump 3-606 and allowing motor 3-604 to produce regenerated power which may be supplied to bus B. Bus B contains an energy storage device 3-616 such as a super capacitor, a lithium ion battery, a combination of the two, or some other energy storage apparatus that provides storage and bidirectional energy flow. Corner controller 3-608 controls the active suspension actuator 3-602, and may control the amount of power applied from bus B to the active suspension actuator 3-602 and/or the amount of power provided from active suspension actuator 3-602 to bus B. Corner controller 3-608 may include a DC/AC inverter 3-612 that converts the DC voltage at bus B into an AC voltage to drive motor 3-604. DC/AC inverter 3-612 may be bidirectional, and may enable providing power from motor 3-604 to bus B when motor 3-604 is operated as a generator. The DC/AC inverter may comprise a standard H-bridge motor controller such as a three-phase bridge that uses six MOSFET transistors. In this sense, motor 3-604 may be an electric machine capable of operating either as a motor or a generator, depending on the manner in which is controlled by corner controller 3-608.

Corner controller 3-608 includes a controller 3-610 that determines how to control the DC/AC inverter 3-612 and/or the active suspension actuator 3-602. Controller 3-610 may receive information from one or more sensors of the active suspension actuator 3-602, the motor 3-604 and/or pump 3-606 regarding an operating parameter of the active suspension actuator 3-602. Such information may include information regarding movement of the damper, force on the damper, hydraulic pressure of the damper, motor speed of motor 3-604, etc. In some embodiments, controller 3-610 may receive information from a communications bus 3-614 from another corner controller 3-608 and/or an optional centralized vehicle dynamics processor. In this embodiment the communications bus 3-614 is connected to a wireless communication gateway 3-618 such as a Zigbee, Bluetooth, WiFi, FM or AM communication, or other wireless link which may be full duplex or half duplex. Controller 3-610 may measure the voltage of bus B and/or the rate of change of the voltage of bus B to obtain information regarding the state of the energy storage device 3-616. Controller 3-610 may process any or all of such information and determine how to control active suspension actuator 3-602 and/or DC/AC inverter 3-612. For example, corner controller 3-608 may "throttle" power to the active suspension actuator 3-602 by reducing power and/or a maximum power of the active suspension actuator 3-602 based upon the voltage of bus B falling below a threshold. This threshold may take into account a minimum voltage needed to operate the control electronics on the corner controller 3-608. When the voltage recovers, corner controller 3-608 may throttle power to the active suspension actuator 3-602 by increasing power and/or a maximum power of the active suspension actuator 3-602 based upon the voltage of bus B rising above a threshold. When energy levels are low, which may be indicated by a voltage reading on bus B, the controller 3-610 may bias the self-powered active suspension actuator into semi-active quadrants in order to regenerate energy.

An active chassis power management system for power throttling may be associated with an energy-neutral active suspension control system where the goal is to balance the active suspension's regeneration with its use of active power such that the average power drawn from the vehicular high power electrical system over a period of time is substantially zero. This approach has the advantage of allowing the vehicular high power electrical system to be designed for high peak power without the size or cost required to provide high average power.

An active chassis power management system for power throttling may be associated with a vehicular high power electrical system incorporating energy storage, such as supercapacitors or high-performance batteries, to provide the peak power required by the actuators. This allows the actuators to have a high instantaneous power limit for high performance and only require throttling to reduce power consumption over longer time periods.

Using supercapacitors for energy storage is especially advantageous as their voltage directly indicates the energy state or state of charge (SOC) of the energy storage device. Energy neutrality of the plurality of active vehicle suspension actuators can be achieved over time by throttling so that the voltage on the bus stays constant. A similar approach may be taken when using high-performance batteries but may require a different method of estimating SOC.

Energy neutral active suspension control methods and systems may be combined with on-demand energy delivery active suspension systems, wherein energy is consumed to create an immediate force response in the actuator (such as due to a specific wheel or body event). By rapidly controlling the motor to both affect a vehicle dynamics algorithm and an energy neutrality goal, the system may be highly energy efficient.

Energy neutral active suspension control systems may be combined with passive valving such as a diverter valve that limits speed into a hydraulic motor-pump such that speed does not exceed a preset threshold. Once fluid velocity exceeds the threshold, fluid partially bypasses the hydraulic motor-pump in order to maintain a roughly constant fluid flow into the hydraulic motor-pump. Such a passive valve is especially advantageous for backdriveable systems that can regenerate energy, as a fast wheel input may create a fluid flow velocity that creates a rotational velocity of the hydraulic motor-pump that exceeds a safe rotational velocity of the hydraulic motor-pump and electric motor.

Energy neutral active suspension control methods and systems may be combined with predictive analytic algorithms that mitigate inertia using a model-based controller and an advanced information sensor (such as a wheel-mounted accelerometer). Such a system may control an electric motor so that inertia is counteracted during acceleration and deceleration. Since some energy neutral embodiments require direct coupling of the electric motor/generator and hydraulic motor-pump combination to the actuator, rotational inertia may manifest as ride harshness. Controlling motor torque to counteract inertia reduces this harshness. Such techniques also work with energy neutral active suspension control methods and systems that utilize linear motors, ball screws connected to electric motors, and other suitable means of linear actuation.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

System and Method for Using Voltage Bus Levels to Signal System Conditions

In some embodiments, a vehicle electrical system may include a high-power electrical bus that is controlled independently of an electrical bus connected to the vehicle battery. The high-power electrical bus may be supplied at least partially by a power converter (e.g., a DC/DC converter) that draws power from the vehicle battery, and which can at least partially decouple the high-power electrical bus from the vehicle battery. High-power electrical loads, such as an active suspension system, for example, may be powered by the high-power electrical bus.

The techniques described herein relate to controlling the high-power electrical bus and one or more loads coupled thereto. The techniques described herein can facilitate quickly supplying significant power to high-power electrical loads, such as an active suspension system, for example, connected to the high-power electrical bus, a technique referred-to herein as supplying "on-demand energy." In some embodiments, an energy storage apparatus is coupled to the high-power electrical bus to facilitate supplying on-demand energy. A significant amount of power may be provided to a load connected to the high-power electrical bus while limiting the amount of power drawn from the vehicle battery, thereby mitigating the effect on the remainder of the vehicle electrical system of providing on-demand energy.

In some embodiments, one or more regenerative systems, such a regenerative suspension system or regenerative braking system, for example, may be coupled to the high-power electrical bus and may supply power to the high-power electrical bus. In some embodiments, an active suspension system may be "energy-neutral" in the sense that over time the amount of energy generated while in performing regeneration may be substantially equal to the amount of power consumed when actively driving the active suspension actuator.

Figure 35:
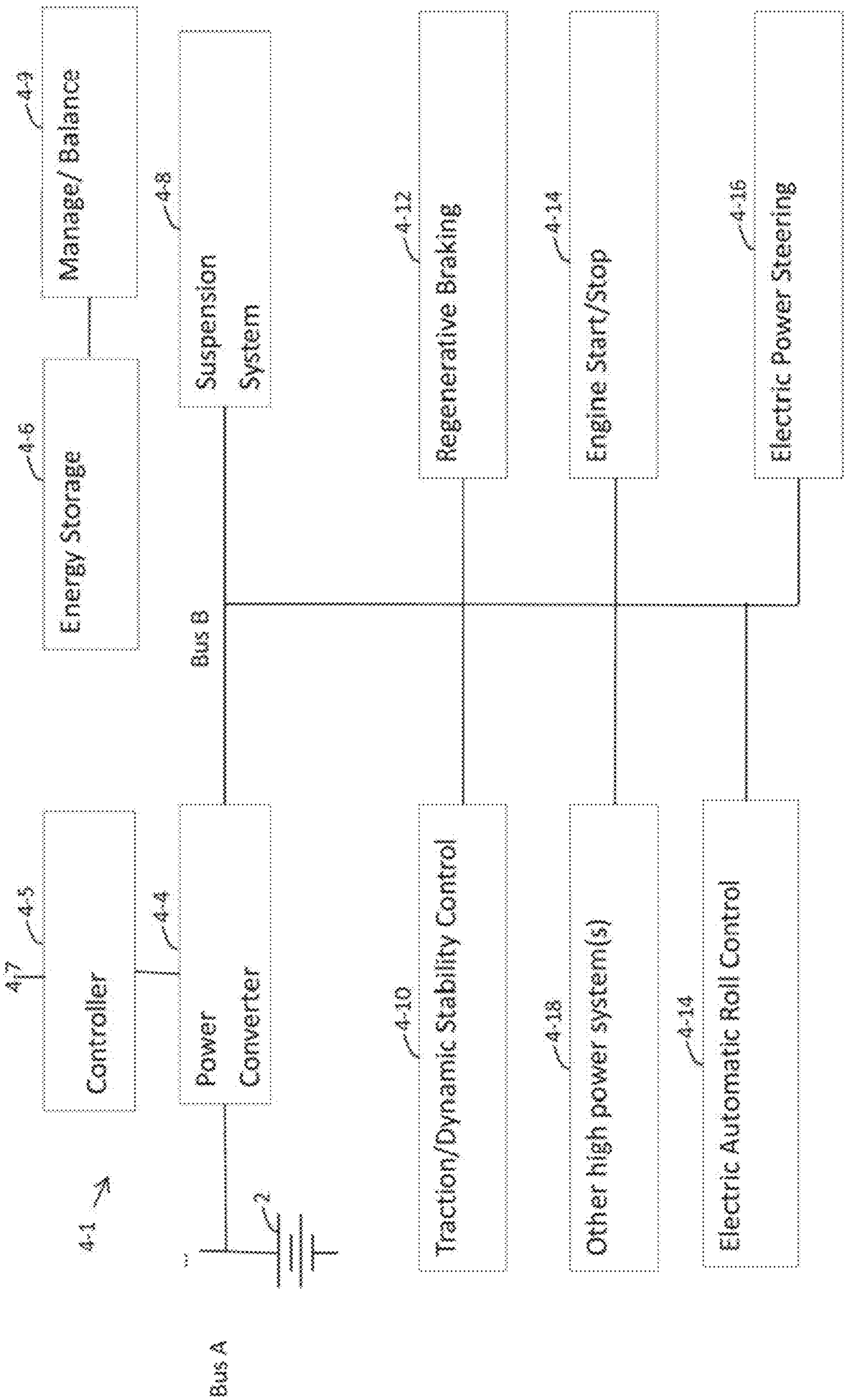
FIG. 35 shows a vehicle electrical system having two electrical buses, according to some embodiments.

FIG. 35 shows a vehicle electrical system 4-1, according to some embodiments. As shown in FIG. 35, vehicle electrical system 4-1 has two electrical buses: bus A and bus B. Bus A and bus B may be at the same voltage or at different voltages. In some embodiments, bus A and bus B are DC buses supplying a DC voltage. Bus A may be connected to the positive terminal of a vehicle battery 4-2. The negative terminal of the vehicle battery 4-2 may be connected to "ground" (e.g., the vehicle chassis). In a typical vehicle electrical system, vehicle battery 4-2 (and bus A) has a nominal voltage of 12V. In some embodiments, bus B may be at a higher voltage than bus A (with reference to "ground"). In some embodiments, bus B may have a nominal voltage of 24V, 42V, or 48 V, by way of example. However, the techniques described herein are not limited in this respect, as bus A bus B may be at any suitable voltages. The voltages of busses A and B may vary during operation of the vehicle, as discussed further below. Vehicle battery 4-2 may provide power to one or more vehicle systems (not shown) connected to bus A, as in conventional automotive electrical systems.

Vehicle electrical system 4-1 includes a power converter 4-4 to transfer energy between bus A and bus B. Power converter 4-4 may be a switching power converter controlled by one or more switches. In some embodiments, power converter 4-4 may be a DC/DC converter. Power converter 4-4 may be unidirectional or bidirectional. If power converter 4-4 is unidirectional, it may be configured to provide power from bus A to bus B. If power converter 4-4 is bidirectional, it may be configured to provide power from bus B to bus A and from bus A to bus B. For example, as mentioned above, in some embodiments one or more loads on bus B may be regenerative, such as a regenerative suspension system or regenerative braking system. If power converter 4-4 is bidirectional, power from a regenerative system coupled to bus B may be provided from bus B to bus A via power converter 4-4, and may charge the vehicle battery 4-2. Power converter 4-4 may have any suitable power conversion topology, as the techniques described herein are not limited in this respect.

In some embodiments, a bidirectional power converter 4-4 allows energy to flow in both directions. The power transfer capability of power converter 4-4 may be the same or different for different directions of power flow. For example, in the case of a configuration comprising directionally opposed buck and boost converters, each converter may be sized to handle the same amount of power or a different amount of power. As an example in a 12V to 46V system with different power conversion capabilities in different directions, the continuous power conversion capability from 12V to 46V may be 1 kilowatt, while from 46V to 12V in the reverse direction the power conversion capability may only be 100 watts. Such asymmetrical sizing may save cost, complexity, and space. These factors are especially important in automotive applications. In some embodiments, the power converter 4-4 may be used as an energy buffer/power management system without raising or lowering the voltage, and the input and output voltages may be roughly equivalent (e.g., a 12V to 12V converter). In some embodiments the power converter 4-4 may be connected to a DC bus with a voltage that fluctuates, for example, between 24V and 60V or 300V and 450V (e.g., for an electric vehicle).

Vehicle electrical system 4-1 may include a controller 4-5 (e.g., an electronic controller) configured to control the manner in which power converter 4-4 performs power conversion. Electronic controller 4-5 may be any type of controller, and may include a control circuit and/or a processor that executes instructions. Controller 4-5 may control the direction and/or magnitude of power flow in power converter 4, as discussed further below. Controller 4-5 may be integrated with power converter 4 (e.g., on the same board) or separate from power converter 4-5. Another aspect of the techniques described herein is the ability for an external energy management control signal to regulate power. To do so, controller 4-5 may receive, via a communication network 4-7, information (e.g., a maximum power and/or current) and/or instructions that may be used by controller 4-5 to control power converter 4-4. The network 4-7 may be any suitable type of communication network. For example, in some embodiments the network 4-7 may be a wired or wireless communications bus that allows communications among different systems in the vehicle. If the information is provided to the controller 4-5 for via a wired connection, it may be provided via a wire or a communication bus (e.g., a CAN bus). In some embodiments, an external CAN bus signal from the vehicle is able to send commands to controller 4-5 in order to dynamically manage and change directional power limits in each direction, or to download voltage limits and charge curves. In some embodiments, controller 4-5 may be within the same module as power converter 4, and coupled to the power converter 4-4 via a wire and/or another type of communications bus.

As shown in FIG. 35, one or more vehicle systems may be connected to bus B. In some embodiments, bus B may be a high-power electrical bus. As mentioned above, a vehicle system connected to bus B may be a power source or a power sink (e.g., a load). Some vehicle systems may act as power sources at some times and power sinks at other times.

Non-limiting examples of vehicle systems that may be connected to bus B include a suspension system 4-8, a traction/dynamic stability control system 4-10, a regenerative braking system 4-12, an engine start/stop system 4-14, an electric power steering system 4-16, and an electric automatic roll control system 4-17. Other systems 4-18 may be connected to bus B. Any one or more systems may be connected to bus B to source and/or sink power to/from bus B.

As mentioned above, one or more systems connected to bus B may act as a power source. For example, suspension system 4-8 may be a regenerative suspension system configured to generate power in response to wheel and/or vehicle movement. Regenerative braking system 4-12 may be configured to generate power when the vehicle's brakes are applied.

One or more systems connected to bus B may act as a power sink. For example, traction/dynamic stability control system 4-10 and/or power steering system 4-16 may be high-power loads. As another example, suspension system 4-8 may be an active suspension system that has power provided by bus B to power an active suspension actuator.

One or more systems connected to bus B may act as a power source and as a power sink at different times. For example, suspension system 4-8 may be an active/regenerative suspension system that generates power in response to wheel events and draws power when an active suspension actuator is actively driven.

Figure 37:
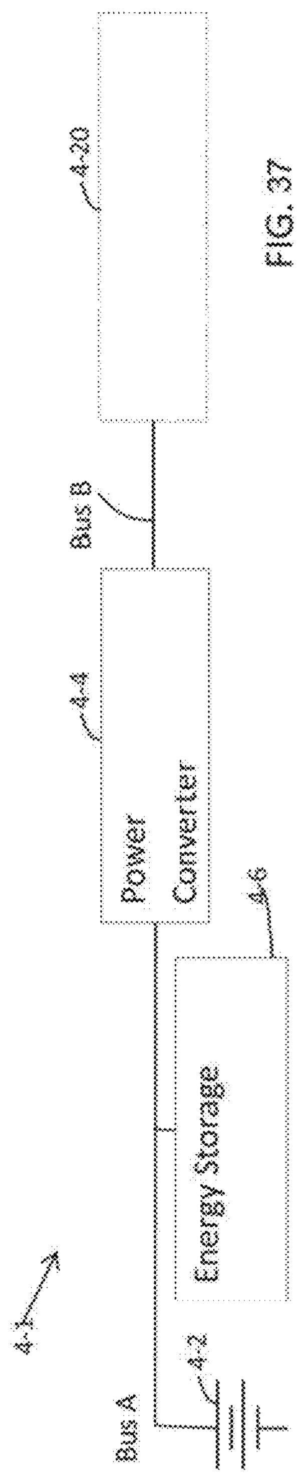
FIG. 37 shows a vehicle electrical system having an energy storage apparatus connected to bus A, according to some embodiments.
Figure 38:
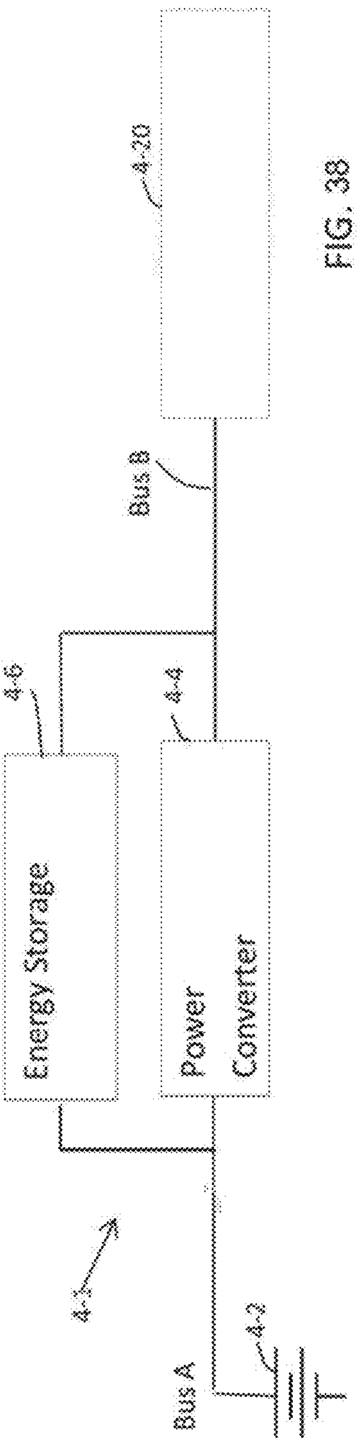
FIG. 38 shows a vehicle electrical system having an energy storage apparatus connected to bus A and bus B, according to some embodiments.

In some embodiments, vehicle electrical system 4-1 may have an energy storage apparatus 6. Energy storage apparatus 4-6 may be coupled to bus B, either directly or indirectly, to provide power to one or more vehicle systems 4-20 connected to bus B. For example, as shown in 4-2, a terminal of energy storage apparatus 4-6 may be directly connected to bus B (i.e., by a conductive connection such that a terminal of energy storage apparatus 4-6 is at the same electrical node as bus B). Alternatively or additionally, energy storage apparatus 6 may be indirectly connected to bus B. For example, as shown in FIG. 37, energy storage apparatus 4-6 may be directly connected to bus A (i.e., by a conductive connection such that a terminal of energy storage apparatus 4-6 is at the same electrical node as bus A), and indirectly connected to bus B via the power converter 4. As illustrated in FIG. 38, in some embodiments energy storage apparatus 4-6 may be connected to both bus A and bus B. As shown in FIG. 38, a first terminal of energy storage apparatus 4-6 may be directly connected to bus B and a second terminal of energy storage apparatus 4-6 may be directly connected to bus A. However, energy storage apparatus 4-6 may be connected in any suitable configuration, as the techniques described herein are not limited in this respect.

In some embodiments, energy storage apparatus 4-6 may provide power to a load coupled to bus B instead of or in addition to power provided by the vehicle battery 4-2. In some embodiments, energy storage apparatus 4-6 may supply power in response to a load, thereby reducing the amount of power that needs to be drawn from vehicle battery 4-2 in response to the load. Providing at least a portion of the power by energy storage apparatus 4-6 in response to a large load may avoid drawing a large amount of power from the vehicle battery 4-2. Drawing an excessive amount of power from vehicle battery 2 may cause the voltage of bus A to droop to an unacceptably low voltage or reduce the state of charge of vehicle battery 4-2. Thus, there is a limit to the amount of power that can be drawn from vehicle battery 4-2. Providing power from energy storage apparatus 6 in response to the load may enable providing a higher amount of power to a load than would be possible in the absence of energy storage apparatus 4-6.

Energy storage apparatus 4-6 may include any suitable apparatus for storing energy, such as a battery, capacitor or supercapacitor, for example. Examples of suitable batteries include a lead acid battery, such as an Absorbent Glass Mat (AGM) battery, and a lithium-ion battery, such as a Lithium-Iron-Phosphate battery. However, any suitable type of battery, capacitor or other energy storage apparatus may be used. In some embodiments, energy storage apparatus 4-6 may include a plurality of energy storage apparatus (e.g., a plurality of batteries, capacitors and/or supercapacitors). In some embodiments, the energy storage apparatus 4-6 may include a combination of different types of energy storage apparatus (e.g., a combination of a battery and a supercapacitor). In some embodiments, energy storage apparatus 4-6 may include an apparatus that can quickly provide a significant amount of power to the at least one system 4-20 coupled to bus B. For example, in some embodiments, energy storage apparatus 4-6 may be capable of providing greater than 0.5 kW, greater than 1 kW, or greater than 2 kW of power. In some embodiments, energy storage apparatus 4-6 may have an energy storage capacity of 1 kJ to several hundred kJ (e.g., 100 to 200 kJ or greater). If energy storage apparatus 4-6 includes one or more supercapacitor(s), the supercapacitor(s) may have an energy storage capacity of between 1 kJ and 10 kK, or greater than 10 kJ. Supercapacitors are capable of very high peak powers. By way of illustration, a supercapacitor string with 1 kJ of energy storage may provide greater than 1 kW of peak power. If the energy storage apparatus includes one or more batteries, the one or more batteries may have an energy storage capacity of between 10 kJ and 200 kJ, or greater than 200 kJ. In comparison with supercapacitors, a 10 kJ battery string may be limited to about 1 kW of peak power. In some embodiments, energy storage apparatus 4-6 may achieve both high capacity energy storage with high peak power using battery strings connected in parallel and/or using a combination of batteries and supercapacitors.

In some embodiments, the energy storage apparatus 4-6 is provided with a battery management system and/or a balancing circuit 4-9. The battery management system and/or balancing circuit 4-9 may balance the charge among the batteries and/or supercapacitors of energy storage apparatus 4-6.

In an exemplary embodiment, suspension system 4-8 may be an active suspension system for a vehicle that can actively control an active suspension actuator (e.g., to control movement of a wheel). Active control of an active suspension actuator may be performed to anticipate and/or respond to forces exerted by a driving surface on a wheel of the vehicle. The active suspension system may include one or more actuators driven by power supplied from bus B. For example, an actuator may include an electric motor that can drive a fluid pump to actuate a hydraulic damper. An actuator controller may control the actuator in response to motion of the vehicle and/or wheel. For example, an active suspension actuator may raise a wheel in anticipation of or response to a bump to reduce transfer of force to the remainder of the vehicle. As another example, an active suspension actuator may lower a wheel into a pothole to minimize movement of the remainder of the vehicle when the wheel hits the pothole. In some situations, the actuator controller may demand a significant amount of power (e.g., 500 W) be provided quickly from bus B to drive the active suspension actuator. The energy storage apparatus 4-6 coupled to bus B may provide at least a portion of the power demanded by the actuator.

In some embodiments, the controller 4-5 and/or power converter 4-4 may be configured to limit an amount of power provided from bus A (e.g., from vehicle battery 4-2) to bus B no higher than a maximum power. Setting a maximum power that may be drawn from bus A may prevent drawing an excessive amount of energy from the vehicle battery 4-2, and avoid causing a voltage drop on bus A, for example. Any suitable value of maximum power may be chosen depending on the vehicle and factors such as the energy storage capacity and/or the state of charge of vehicle battery 4-2, or other factors, as discussed further below. Controller 5 may control power converter 4-4 based on the maximum power. Controller 4-5 may store information representing the maximum power in a suitable data storage apparatus.

When power is demanded by a system connected to bus B, the power may be supplied by vehicle battery 4-2 (e.g., via bus A and power converter 4-4), energy storage apparatus 6 or a combination of vehicle battery 2 and energy storage apparatus 4-6. When the power drawn from bus A is below the maximum power, power converter 4-4 may allow power to be drawn from bus A. However, the power converter 4-4 may be controlled to prevent the amount of power drawn from bus A from exceeding the maximum. When the amount of power demanded from bus A exceeds the maximum, power converter 4-4 may be controlled to limit the amount of power provided to bus B to the maximum power.

As an example, if power converter 4-4 is configured to limit the power drawn from the vehicle battery 4-2 to no more than a maximum power of 1 kW, and the amount of power demanded by bus B from vehicle battery 4-2 is 0.5 kW, the power converter 4 may supply the required 0.5 kW to bus B. However, if more than 1 kW is required, the power converter 4-4 may provide the maximum power (e.g., 1 kW, in this example) to bus B and the additional power necessary may be drawn from energy storage apparatus 4-6. For example, if the maximum power that can be drawn from the vehicle battery and supplied to bus B is 1 kW, and a load coupled to bus B demands 2 kW, then 1 kW of power may be provided from the vehicle battery 4-2 and the remaining 1 kW of power may be provided by the energy storage apparatus 4-6.

The power converter 4-4 may limit the power provided from bus A to bus B in any suitable manner. In some embodiments, the power converter 4-4 may limit the power provided from bus A to bus B by limiting the current drawn from the vehicle battery 4-2. In some embodiments, the power converter 4-4 may limit the input current (at the bus A side) of power converter 4-4. A maximum current and/or power value may be stored in any suitable data storage apparatus coupled to controller 4-5. In some embodiments, controller 4-5 may set one or more operating parameters of the power converter 4 (e.g., duty cycle, switching frequency, etc.) to limit the amount of power that flows through power converter 4-5 to the maximum power.

In some embodiments, the maximum power that can be provided from bus A to bus B may be limited (e.g., by power converter 4-4) based on the amount of energy and/or the average power transferred from bus A to bus B over a time period. In some embodiments, the amount of energy and/or power provided from bus A to bus B over a period of time may be limited to avoid drawing a significant amount of energy from the vehicle battery 4-2, which may cause a voltage drop on bus A and/or reduce the state of charge of vehicle battery 4-2.

Figure 39:
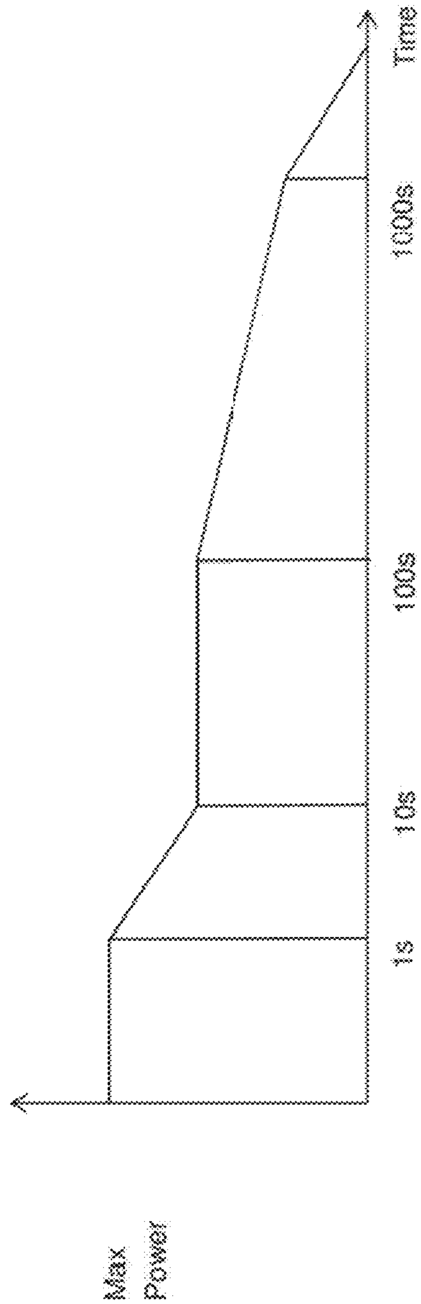
FIG. 39 shows an exemplary plot of maximum power that may be provided based on an amount of energy drawn from the vehicle battery over a time period, according to some embodiments.

FIG. 39 shows an exemplary plot of the maximum power that may be drawn from vehicle battery 4-2 for various time periods. In the example of FIG. 39, if power is drawn from the vehicle battery 4-2 for a relatively small period of time (e.g., one second), a relatively high maximum power may be allowed to be transferred from bus A to bus B by power converter 4-4. However, transferring a significant amount of power for a relatively long period of time may draw a significant amount of energy from the vehicle battery 4-2, potentially causing a drop in the voltage of bus A. Thus, a lower maximum power may be set when drawing power from the vehicle battery for a longer period of time. The maximum power may be gradually reduced for longer periods of time. For example, after power has been drawn from the vehicle battery 4-2 for more than one second, the maximum power may be reduced to avoid overly discharging the vehicle battery 4-2. This may prevent a scenario where the vehicle is idling and the battery becomes fully discharged due to a large amount of power being drawn from bus A to bus B over a significant period of time. The maximum power may be reduced even further if power is drawn from the vehicle battery for longer periods of time (e.g., over 100 seconds). The maximum power may be reduced for such periods of time to maintain vehicle efficiency at an acceptable level. The maximum power may thus change (e.g., be reduced) the longer that current is provided from bus A to bus B. If more power is required from a load coupled to bus B than the maximum power, the additional power necessary to satisfy the load may be provided by energy storage apparatus 4-6, in some embodiments.

The plot shown in FIG. 39 is one example of a way in which the maximum power and/or energy that can be provided from bus A to bus B may be set by power converter 4-4 based upon the amount of time for which power is provided from bus A to bus B. Any suitable maximum power and/or energy may be selected based amount of time that power is drawn, and is not limited to the exemplary curve shown in FIG. 39. In some embodiments, the maximum power and/or energy may be set using a mapping such as a curve or a lookup table stored by controller 4-5.

In some embodiments, the maximum power that may be provided from bus A to bus B may be set based upon the state of the vehicle. The state of the vehicle may be a measure of energy available from bus A. For example, the state of the vehicle may include information regarding the state of charge of vehicle battery 4-2, engine RPM (e.g., which may indicate if the vehicle is at idle), or the status of one or more loads connected to bus A drawing power from the vehicle battery 4-2. If the state of charge of the vehicle battery 4-2 is low, the engine RPM is low, and/or one or more loads connected to bus A are in a state where they are drawing significant power from the vehicle battery 4-2, the maximum power that may be provided from bus A to bus be may be reduced. As another example, the state of the vehicle may include the status of a dynamic stability control (DSC) system connected to bus A. If the dynamic stability control system is currently operating to stabilize the vehicle, and drawing power via bus A, the maximum power that may be provided from bus A to bus B may be reduced so that sufficient energy is available in the vehicle battery 4-2 for the dynamic stability control system connected to bus A. As another example, when the vehicle's headlights or air conditioner are turned on, they may draw significant power from the vehicle battery 4-2. Accordingly, the maximum power that may be provided for bus A to bus B be may be reduced when the headlights and/or air conditioner are turned on to avoid drawing down the vehicle battery 4-2. The maximum power may be set based upon any suitable state of the vehicle representing the amount of energy available on bus A.

As discussed above, the power converter 4-4 may limit the power transferred from bus A to bus B based on the maximum power. Information regarding the state of the vehicle and/or the maximum power may be provided to controller 4-5 by a system coupled to the communication network 4-7. For example, information regarding the state of the vehicle may be provided by an engine control unit, or any other suitable control system of the vehicle that has information regarding the state of the vehicle.

Typical switching DC/DC converters are designed to convert a DC input voltage into a DC output voltage that is substantially constant. Although a switching DC/DC converter has an output voltage ripple, in general typical switching DC/DC converters are designed to minimize the output voltage ripple to produce as constant a DC output voltage as possible. In a conventional switching DC/DC converter, the output voltage ripple may be a very small fraction (e.g., <1%) of the DC output voltage.

The present inventors have recognized and appreciated that allowing the voltage of bus B to vary from its nominal voltage may enable reducing the amount of energy storage capacity of energy storage apparatus 6. In some embodiments, bus B may be a loosely regulated bus that may have significant voltage swings in response to loads and/or regenerated power on bus B. Instead of attempting to fix the voltage of bus B as close as possible to a nominal voltage (e.g., 48V or 42V), the power converter 4 may be configured to allow the output voltage at bus B to vary within a relatively wide range from the nominal voltage. In some embodiments, the voltage of bus be may be allowed to vary within a range that is greater than 5%, up to 10%, or up to 20% of the nominal voltage of bus B (e.g., the average voltage of bus B or the average of the maximum and minimum voltage thresholds). In some embodiments, the voltage of bus B may be kept between a first threshold and a second threshold (e.g., between minimum and maximum voltage values). As an example, if bus B is nominally a 48 V DC bus, the voltage of bus B may be allowed to vary between 40 V and 50 V, in some embodiments. However, the techniques described herein are not limited as to particular range of voltages that are allowable for voltage bus B.

In some embodiments, the techniques described herein may be applied to an electric vehicle. In an electric vehicle, the vehicle battery 4-2 may have a relatively high capacity to enable driving a traction motor to propel the vehicle. For example, in some embodiments, the vehicle battery 4-2 may be a battery pack having a pack voltage of 300-400 V or greater. Accordingly, in an electric vehicle, bus A may be a high voltage bus for driving the traction motor that propels the vehicle, and bus B may be at a lower voltage. Power converter 4 may be a DC/DC converter that converts the high voltage of bus A into a lower voltage at bus B. In some embodiments, bus B may have a nominal voltage of 48 V, as discussed above. However, the techniques described herein are not limited as to the voltage of bus B.

As discussed above, a suspension system 4-8 may be connected to bus B. In some embodiments, the suspension system 4-8 of an electric vehicle may be an active suspension system and/or a regenerative suspension system. If the suspension system 4-8 is configured to operate as an active suspension system, the active suspension system may draw power from vehicle battery 4-2 via the power converter 4-4. If the suspension system 4-8 is configured to operate as a regenerative suspension system, the energy generated by the regenerative suspension system may be stored in energy storage apparatus 4-6 and/or may be transferred to vehicle battery 4-2 via power converter 4-4. The power converter 4-4 may be bidirectional to allow energy transfer from bus B to bus A, as discussed above.

As discussed above, the loads coupled to bus B can be capable of demanding a significant amount of power. The inventors have recognized and appreciated that it would be desirable to predict future driving conditions to predict the amount of energy that will be needed by a load coupled to bus B. Predicting the energy that will be needed may allow the vehicle electrical system to prepare in advance by making enough energy available to meet the expected load. For example, if it is predicted that a significant amount of power will need to be supplied to a load on bus B in the near future, the vehicle electrical system may prepare in advance by charging energy storage apparatus 4-6 to increase the amount of energy that is available to meet the demand. Power converter 4-4 may control the flow of power between bus A and bus B to regulate the state of charge of the energy storage apparatus 4-6 based upon a predicted future driving condition.

They predicted future driving condition may be determined based on information from a sensor or other device that determines information about the vehicle that is indicative of the future driving condition.

As an example, a forward-looking sensor may be mounted on the vehicle and may sense features of the driving surface such as bumps or potholes. The forward looking sensor may be any suitable type of sensor, such as a sensor that senses and processes information regarding electromagnetic waves (e.g., infrared, visual and/or RADAR waves). Information from the forward-looking sensor may be provided to a controller (e.g., controller 4-5) that may determine additional energy should be supplied to energy storage apparatus 4-6 in anticipation of a large load being drawn from the active suspension system when the vehicle is expected to travel over a bump or pothole.

Another example of a device that senses information that may be indicative of future driving conditions is a steering action sensor. A steering action sensor may detect the amount of steering being applied to steer the vehicle. Such information may be provided to a controller (e.g., controller 4-5) that may determine additional energy should be supplied to energy storage apparatus 4-6 in anticipation of a load being drawn from the active suspension system to counter the rolling force of an anticipated turning maneuver.

Information indicative of future driving conditions may be provided by any suitable vehicle system. In some embodiments, such information may be provided by a vehicle system that is powered by bus B or bus A.

An example of a device that senses information that may be indicative of future driving conditions is a suspension system. For example, in a vehicle that includes four wheels, the front two wheels may have active suspension actuators that may be displaced in response to a feature of the driving surface, such as a pothole, bump, etc. Such actuators may detect the amount of displacement produced by such an event at the front wheel(s). Information regarding the event may be provided to controller (e.g., controller 4-5) which may determine that additional energy should be provided to energy storage apparatus 4-6 in anticipation of a load being drawn from the active suspension system when the rear wheels travel over the same feature of the driving surface.

Information that may be indicative of future driving conditions may be obtained from any suitable system coupled to bus A or bus B, such as an electric power steering system, an antilock braking system, or an electronic stability control system, for example.

Another example of a device that senses information that may be indicative of future driving conditions is a vehicle navigation system. A vehicle navigation system may include a device that determines the position of the vehicle, such as a global positioning system (GPS) receiver. Other relevant types of information may be obtained from a vehicle navigation system, such as the speed of the vehicle. The vehicle navigation system may be programmed with a destination, and may prompt the driver to follow a suitable route to reach the destination. Accordingly, the vehicle navigation system may have information that indicates future driving conditions, such as upcoming curves in the road, traffic, and/or locations at which the vehicle is expected to stop (e.g., intersections, the final destination, etc.). Such information may be provided to a controller (e.g., controller 4-5) that determines whether additional energy should be provided to energy storage apparatus 4-6. Controller 4-5 may control power converter 4-4 to regulate the state of charge of energy storage apparatus 4-6 based upon such information. For example, if the navigation system predicts that a turn is upcoming, additional energy may be provided to charge energy storage apparatus 4-6 in anticipation of a large electrical load from the active suspension system to counter the rolling force of the turn.

As illustrated in FIG. 38, in some embodiments energy storage apparatus 6 may have a first terminal connected to bus A and a second terminal connected to bus B. Connecting energy storage apparatus 4-6 between bus A and bus B may reduce the voltage across energy storage apparatus 4-6 as compared with the case where energy storage apparatus 4-6 is connected between bus B and ground (e.g., the vehicle chassis). Energy storage apparatus 4-6 may include a plurality of energy storage devices, such as batteries or supercapacitors, that are stacked together in series to withstand the voltage across the energy storage apparatus 4-6, as each battery cell or supercapacitor may individually only be able to withstand of voltage from less than 2.5V to 4.2V. Reducing the voltage across the energy storage apparatus 4-6 may reduce the number of batteries or supercapacitors that need to be stacked in series, and thus may reduce the cost of the energy storage apparatus 4-6.

Figure 40A:
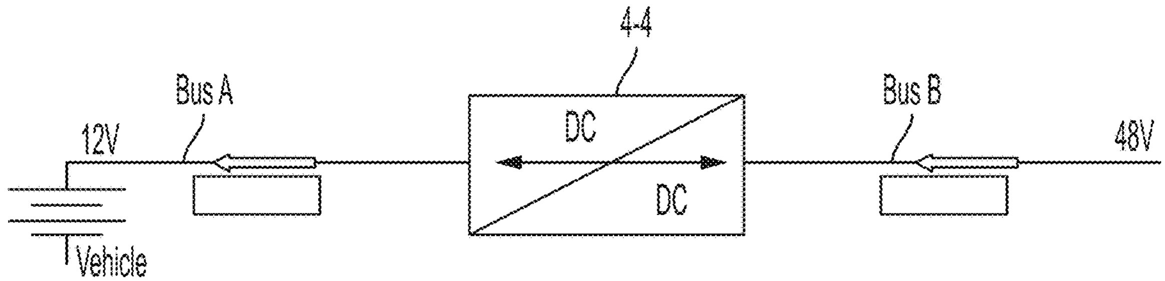
FIGS. 40A-40C illustrate the current flow through the power converter and an energy storage apparatus, according to some embodiments.

FIG. 40A illustrates a system in which power converter 4-4 includes a bidirectional DC/DC converter that can provide power from bus B to bus A to recharge vehicle battery 4-2 based on power generated by a power source coupled to bus B (e.g., a regenerative suspension system or regenerative braking system). In the example of FIG. 40A, 20 A of current is supplied to the DC/DC converter by bus B. Due to the 4:1 voltage ratio between bus B and bus A, the current on bus B is converted into 80 A of current at bus A to charge the vehicle battery 4-2.

Figure 40B:
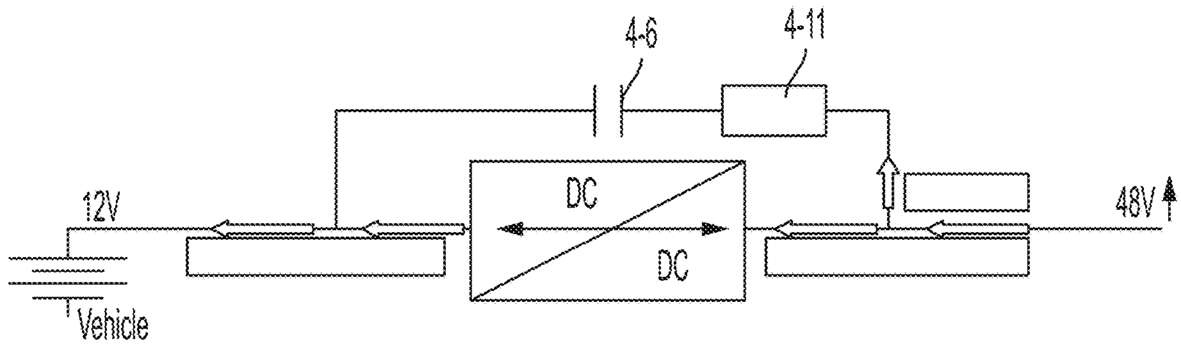

FIG. 40B shows a system in which energy storage apparatus 4-6 is connected to bus A and bus B, in parallel with the power converter 4-4. As illustrated in FIG. 40B, there are two electrical paths for the current to flow from bus B to bus A: through the DC/DC converter; and through the energy storage apparatus 4-6. The magnitude and direction of power and/or current that flows through the electrical paths between bus B and bus A may be controlled by the power converter 4-4, which may set the relative impedances of the power converter 4-4 and/or the energy storage apparatus 4-6. In the example of FIG. 40B, power converter 4-4 is operated such that power flows through power converter 4-4 from bus B to bus A. In this example, 10 A of current flows from bus B into the power converter 4-4, 10 A of current flows from bus B through energy storage apparatus 4-6, and 40 A of current flows from the power converter 4-4 into bus A, thereby providing a total of 50 A of current to charge the vehicle battery 4-2.

Figure 40C:
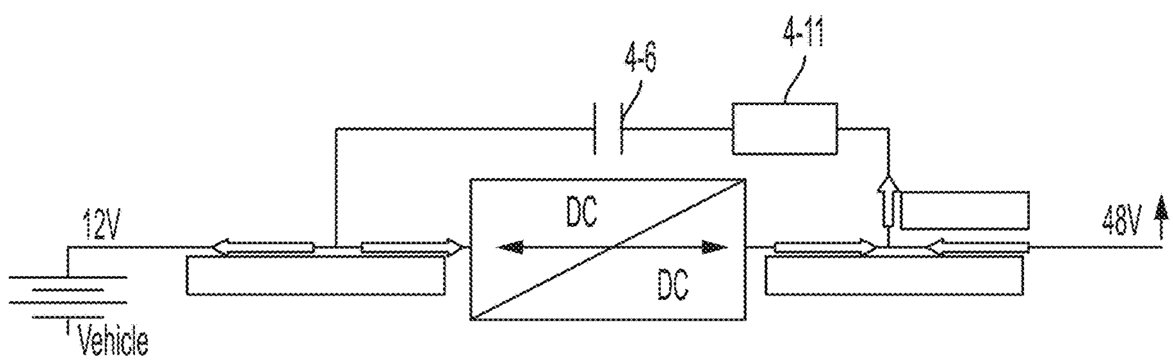

FIG. 40C shows a system as in FIG. 40B, in which the power converter 4-4 is operated to transfer power in the reverse direction, such that power flows through power converter 4-4 from bus A to bus B, while charging the vehicle battery 2 with a lower amount of power. In this example, 20 A of current flows from bus A into the power converter 4-4, and 5 A of current flows out of power converter 4-4 to bus B. The 20 A of current supplied by bus B and the 5 A of current from the power converter 4 combine such that 25 A of current flows through the energy storage apparatus 4-6. As a result, 5 A of current is provided to charge the vehicle battery 4-2. Thus, by controlling the magnitude and/or direction of the power flowing through power converter 4-4, the effective impedance of energy storage apparatus 4-6 and/or the amount of power provided to charge/discharge vehicle battery 4-2 and/or energy storage apparatus 4-6 may be controlled. Such control may be effected by controller 4-5 based on any suitable control algorithm based on factors such as the state of the vehicle (e.g., the amount of power available on bus A and/or bus B), future predicted driving conditions, or any other suitable information.

In some embodiments, an electronically controlled cutoff switch 4-11 may be connected in series with the energy storage apparatus 4-6 to stop the flow of current therethrough. The electronically controlled cutoff switch may be controlled by controller 5.

As discussed above, energy storage apparatus 4-6 may include one or more capacitors (e.g., supercapacitors). However, supercapacitors capable of storing a substantial amount of energy while providing a nominal +48V are very large and expensive. To provide a nominal 48V, a capacitor that can handle as much as 60V may be required, increasing the size and cost even further.

Advantages of connecting the supercapacitors across bus A and bus B may include reducing the number of cells in the supercapacitor, which reduces cost and size, and eases the impedance requirements of the capacitor, because the impedance of a supercapacitor may be proportional to the number of series cells. The result is more efficient charging and discharging of the supercapacitor. Inrush current may be avoided using such a topology, as power converter 4-4 may control the initial charging of the supercapacitors using a controlled current.

In some embodiments, controller 4-5 may use a multi-level hysteretic control algorithm to control power converter 4-4. The multi-level hysteretic control described herein maximizes the energy stored in the supercapacitors, minimizes power lost in the power converter 4-4 by only using it when necessary and keeps the current of the vehicle battery 4-2 as low as possible. Storing energy in the supercapacitors is more efficient than passing it through the power converter 4-4 twice to store energy temporarily in the vehicle battery.

The hysteretic control method described herein uses two levels of hysteretic control with quasi-proportional gain above the second level. Being fundamentally hysteretic, it is robust, stable and insensitive to parameter changes like supercapacitor capacitance and equivalent series resistance (ESR), battery voltage, etc.

The hysteretic control method does not require any real-time knowledge of the instantaneous power requirements of the loads on bus B. It can therefore operate standalone without any means of communications with the rest of the system other than via the DC bus voltage. Additional information such as road condition, vehicle speed, alternator setpoint and active suspension setting (e.g. "eco," "comfort," "sport") can be used to adjust the various setpoints of the hysteretic controller for even better efficiency.

Figure 41:
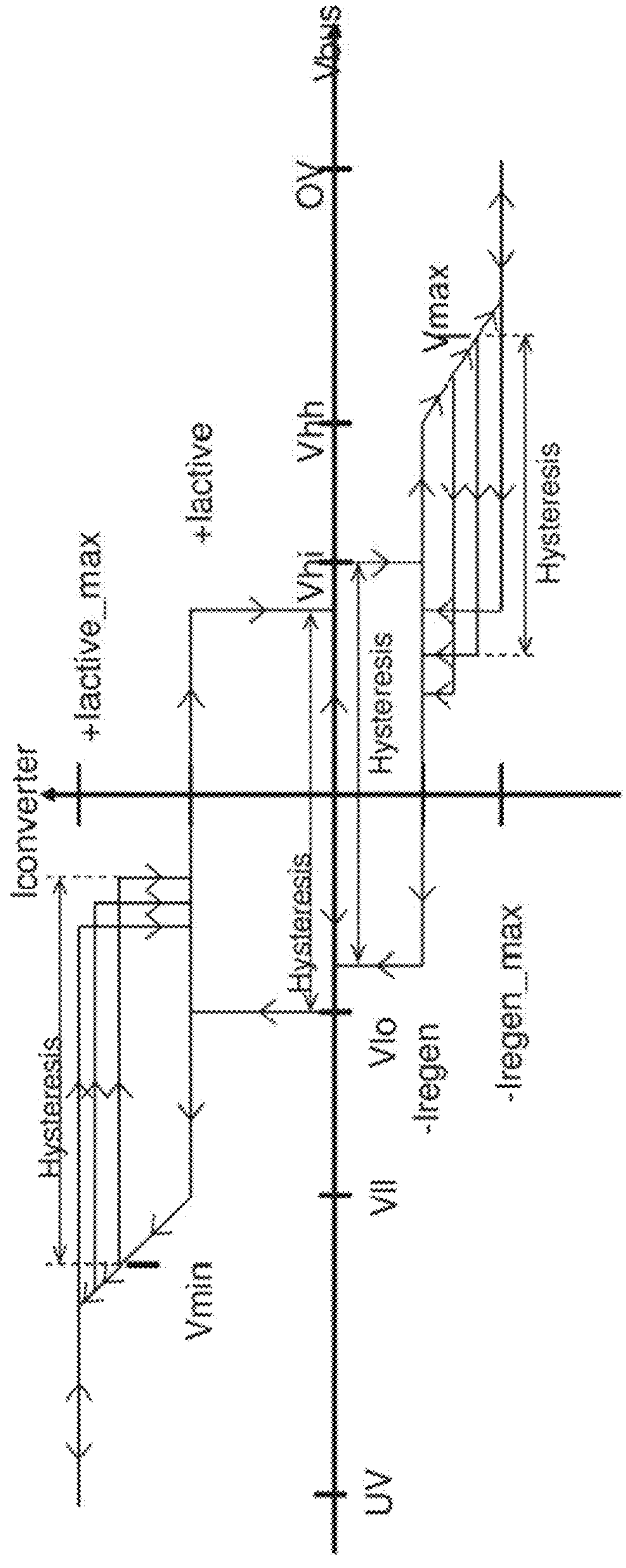
FIG. 41 illustrates hysteretic control of the power converter, according to some embodiments.

FIG. 41 illustrates an embodiment in which multi-level hysteretic current control of the power converter 4 is performed in an embodiment in which energy storage apparatus 6 is connected across bus A and bus B, as shown in FIGS. 38, 40B and 40C. The total current in the vehicle battery 4-2 is the sum of the current through the power converter 4-6 plus the current through the energy storage apparatus 4-6. The graph of FIG. 41 shows the current through the power converter 4-4 (Iconverter) as a function of the DC bus voltage (Vbus) and the direction of change of the bus voltage. It uses multiple voltage thresholds: Vhh, Vhi, (Vhi-Hysteresis), (Vlo+Hysteresis), Vlo, and Vll as well as two sliding thresholds: Vmax and Vmin to control the current optimally within the limits +Iactive_max and −Iregen_max.

For a majority of the time, the bus voltage remains between Vhh and VII and the converter current is limited to +Iactive and −Iregen. For example, when the bus voltage rises above Vhi, the converter regenerates Iregen current to the battery and it keeps draining the bus and regenerating until the bus voltage falls below (Vhi−Hysteresis) at which point the converter current goes to zero. It operates similarly when the bus voltage falls below Vlo by pulling Iactive current from the battery.

However, when the Iregen current is already flowing into the battery and the bus voltage continues to rise and goes above Vhh, the converter increases the regenerative current, up to the limit Iregen_max, in direct proportion to (Vbus−Vhh). A similar overload region exists for bus voltages below Vll. In these overload regions, the highest or lowest voltage reached become the sliding setpoint Vmax and Vmin, respectively. The highest current magnitude reached is held until the bus voltage either falls below (Vmax−Hysteresis) or rises above (Vmin+Hysteresis) at which point, the current returns to Iregen or Iactive level, respectively. The converter then returns to normal, non-overload, operation as described above. All of the current set points and voltage thresholds can be adjusted (within bounds) to optimize the applications. Though only one hysteresis is shown in FIG. 41, it is possible to have as many as four different hysteresis values for the four regions: normal-active, normal-regeneration, overload-active, and overload-regen.

FIG. 42A-42F show examples of topologies including power converter 4 and energy storage apparatus 4-6. Any of the topologies described herein, or any other suitable topology, may be used.

Figures 42A, 42B, 42C, 42D, 42E, 42F:
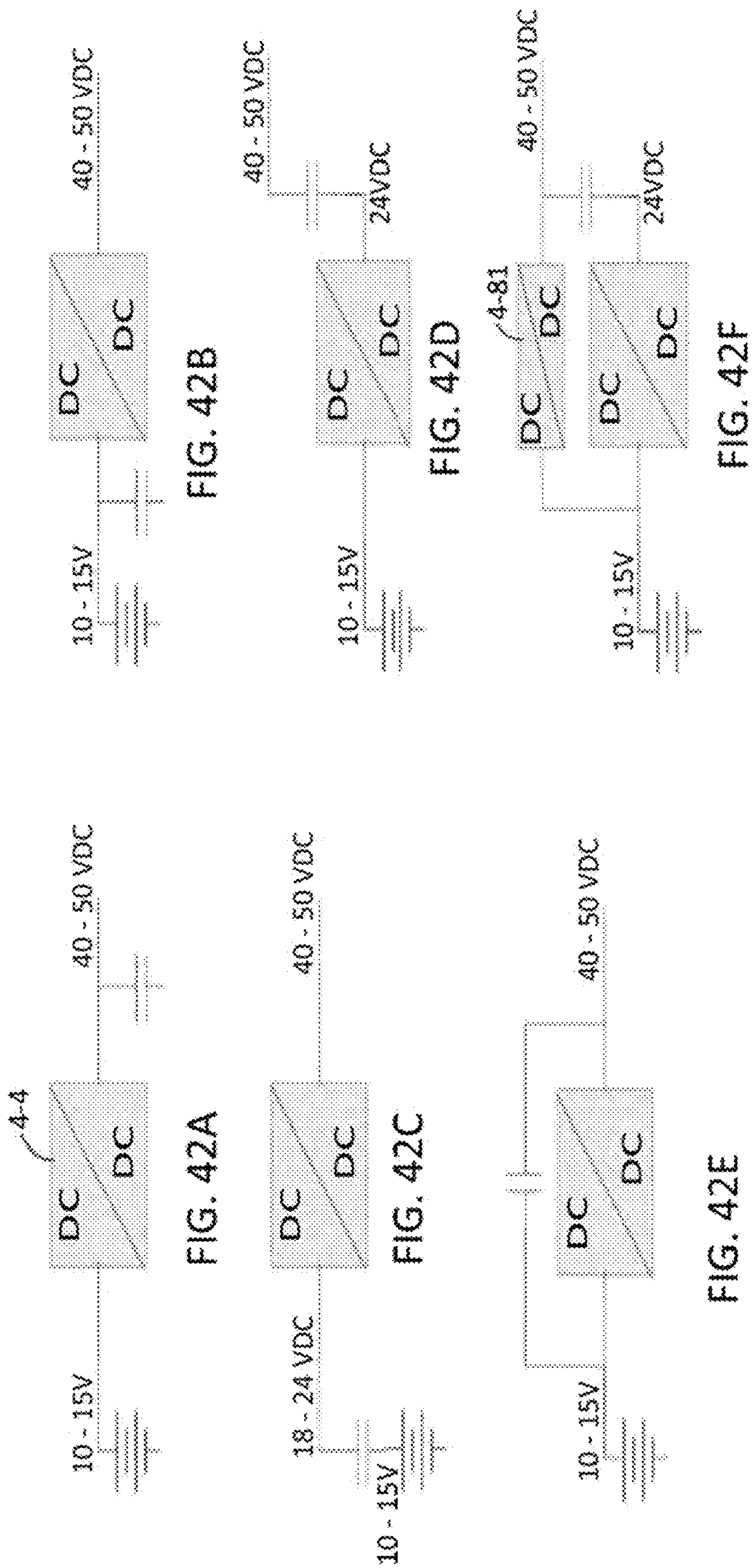
FIGS. 42A-42F illustrate exemplary power conversion and energy storage topologies, according to some embodiments.

FIG. 42A shows the supercapacitor string connected to bus B where the voltage compliance is large but the voltage across the string is also high. Such an embodiment may use a large number of cells (e.g., 20) in series at 2.5V/cell.

FIG. 42B shows the supercapacitor string on bus A in parallel with the vehicle battery 4-2 where the voltage compliance is defined by the vehicle alternator, battery and loads, and is therefore low, but the voltage across the string is also low. Such an embodiment may use 6 to 7 cells in series but the cells may have much larger capacitance and a lower Effective Series Resistance (ESR) than the embodiment of FIG. 42A.

FIG. 42C shows the supercapacitor string in series with the vehicle battery 4-2. This topology can have large voltage compliance but generally works in applications where the current in the supercapacitor string averages to zero. Otherwise uncorrected, the supercapacitor string voltage may drift toward zero or overvoltage. Also, the supercapacitors need to handle higher currents than the embodiment of FIG. 42A and the power converter 4-4 needs to handle the full peak power requirements of bus B.

FIG. 42D shows the supercapacitor string in series with the output of the DC/DC converter. This topology may work in applications in which the current in the supercapacitor string averages to zero.

FIG. 42E shows the supercapacitor string across the DC/DC converter between bus A and bus B. This topology is functionally similar to the topology of FIG. 42A, but it reduces the number of cells needed to meet the voltage requirements from 4-20 to 4-16 by referencing the supercapacitor string to bus A rather than chassis ground, reducing the string voltage requirement by at least 10 V (the minimum battery voltage.)

The topology of FIG. 42F solves the average supercapacitor current limitation of the embodiment of FIG. 42D by adding an auxiliary DC/DC converter 4-81 to ensure that the supercapacitor string current averages to zero even when the DC bus current does not average to zero.

Other combinations of these embodiments, such as adding the auxiliary DC/DC converter 4-81 to the embodiment of FIG. 42C, are also possible. The best topology for a specific application primarily depends on the cost of supercapacitors as compared to power electronics and on the installation space available. Additionally, alternative energy storage devices than supercapacitors such as batteries may be used in the same or similar configurations as those disclosed here.

FIG. 43A-43F show topologies similar to those of FIGS. 42A-42F, respectively, with batteries substituted in place of supercapacitors.

Figure 43A:
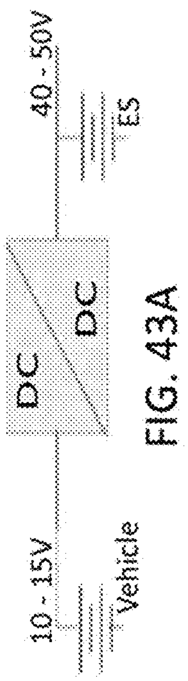
FIGS. 43A-43N illustrate further exemplary power conversion and energy storage topologies, according to some embodiments.
Figure 43B:
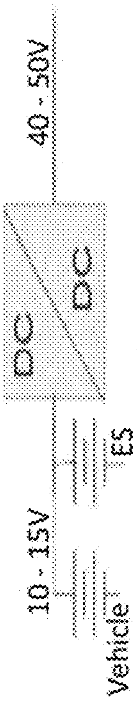
Figure 43C:
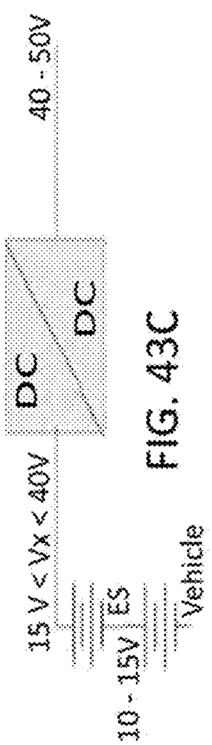
Figure 43D:
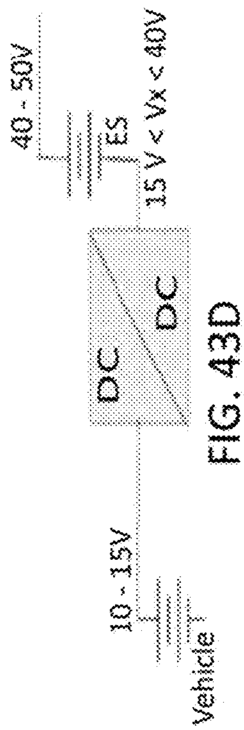
Figure 43E:
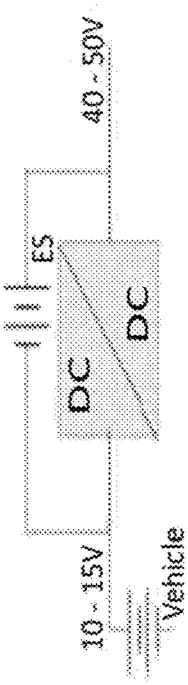
Figure 43F:
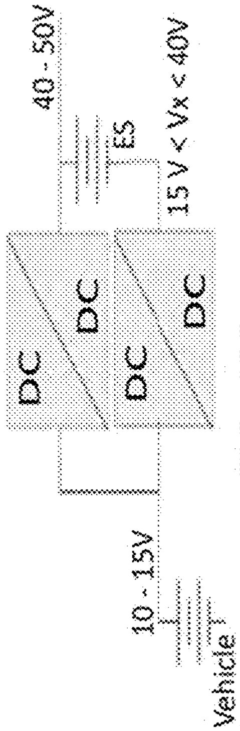
Figure 43G:
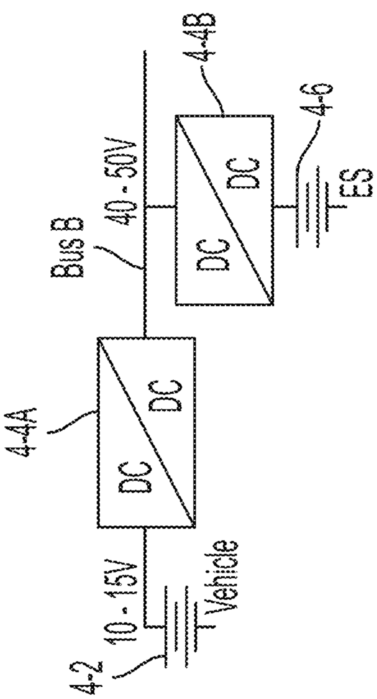

FIG. 43G shows a topology having dual power converters 4-4A and 4-4B. Power converter 4-4A is connected between bus A and bus B. Power converter 4-4B is connected in series with an energy storage apparatus 4-6, between energy storage apparatus 4-6 and bus B. In some embodiments, power converter 4-4A and 4-4B may allow independently controlling the power drawn from energy storage apparatus 4-6 and vehicle battery 4-2.

Figure 43H:
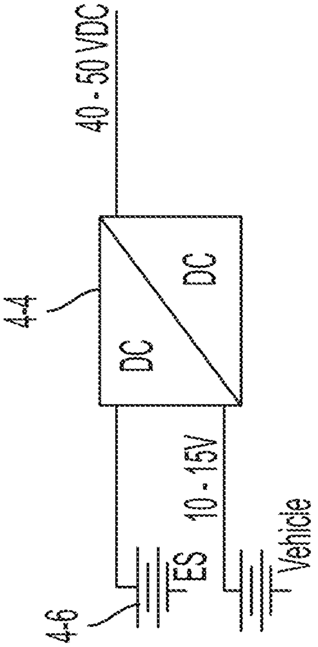

FIG. 43H shows a dual input or "split" converter topology in which the power converter 4-4 has three terminals: a terminal connected to bus A, a terminal connected to bus B, and a terminal connected to energy storage apparatus 4-6. The second terminal of energy storage apparatus 4-6 may be connected to ground.

Figure 43I:
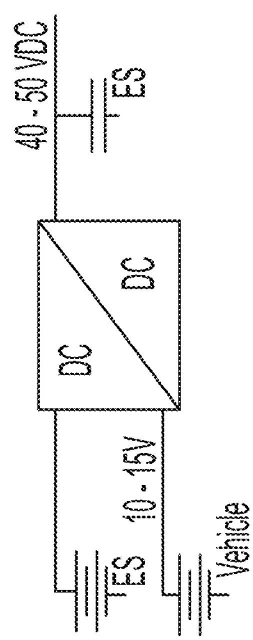

FIG. 43I shows a split converter topology similar to the embodiment of FIG. 43H in which a third energy storage apparatus (e.g., a supercapacitor) is connected to bus B. The second terminal of the third energy storage apparatus may be connected to ground.

Figure 43J:
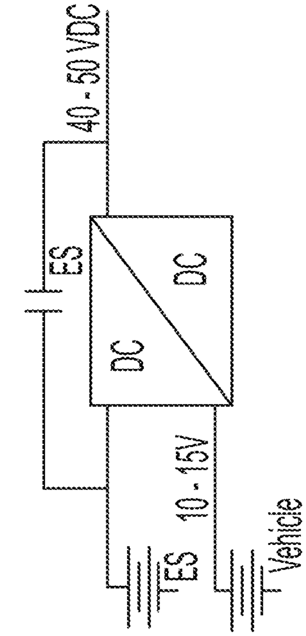
Figure 43L:
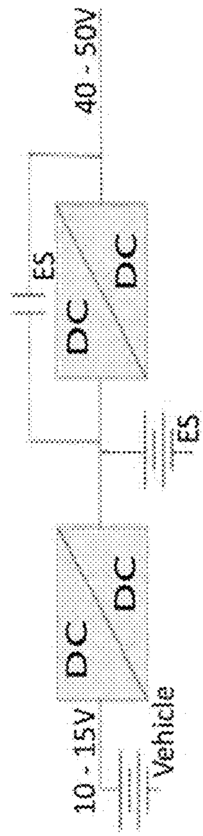
Figure 43N:
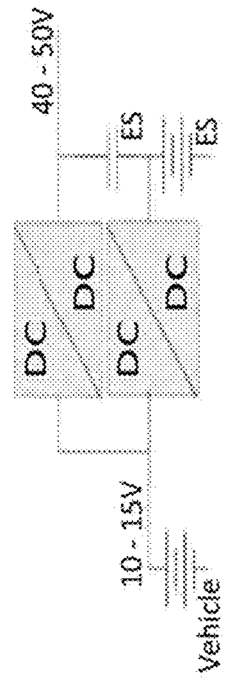
Figure 43K:
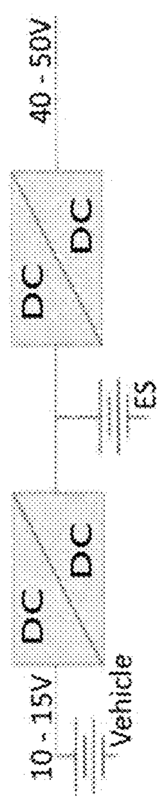
Figure 43M:
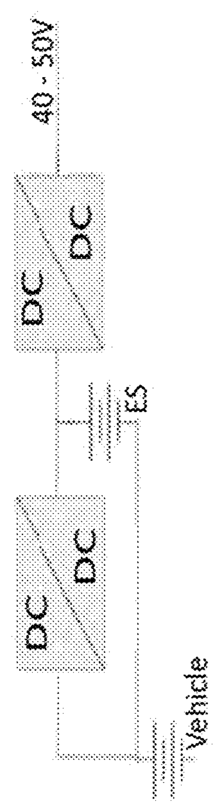

FIG. 43J shows a split converter topology similar to the embodiment of FIG. 4-9H in which the third energy storage apparatus is connected across bus B and the positive terminal of the energy storage apparatus 4-6.

One of the advantages of the dual input or "split" converter topology over using two separate converters is the size, cost and complexity savings of only having a single set of converter output components, such as low impedance capacitors. The split converter topology also allows the switching devices in the two input sections to be switched out of phase resulting in lower ripple current handling requirements for the low impedance output capacitors.

FIGS. 43K-43N show various dual converter topologies in which one or more energy storage apparatus in addition to the vehicle battery 4-2 may be connected in various configurations.

In the embodiments described herein, capacitors may be replaced by batteries, where suitable, and batteries may be replaced by supercapacitors, where suitable.

As discussed above, the voltage of bus B may be allowed to fluctuate in response to loads and/or power generated by systems coupled to bus B. The voltage of bus B may be indicative of the state of the vehicle as it relates to the amount of energy available in an energy storage apparatus 4-6 coupled to bus B. In some embodiments, control of one or more systems coupled to bus B and/or control of the power converter 4-4 may be performed based on the voltage of bus B. For example, if the voltage of bus B drops, it may indicate a state of low energy availability in the energy storage apparatus 4-6. One or more systems coupled to bus B may measure the voltage of bus B, and may determine that the vehicle is in a state of low energy availability on bus B. In response, one or more system(s) coupled to bus B that are not safety-critical may reduce the amount of power that they may draw from bus B. For example, systems such as a power steering system or active suspension system may reduce the amount of power that the can draw from bus B. When the voltage on bus B rises, indicating that the amount of energy available in energy storage apparatus 4-6 has risen to an acceptable level, such systems may resume drawing power from the bus B at a level typical of a state of normal or high energy availability.

In some embodiments, such a technique may be applied to control of an active suspension system. As discussed above, an active suspension system of a vehicle may be powered by a voltage bus (e.g., bus B) that is controllably isolated from a primary vehicle voltage bus (e.g., bus A) to facilitate mitigating impact on the vehicle systems connected to the primary voltage bus (e.g., bus A) as the suspension system's demand for power can vary substantially based on speed, road conditions, suspension performance goals, and the like. As demand on bus B varies, the voltage level of bus B may also vary, generally with the voltage level increasing when demand is low or in the case of regenerative systems when regeneration levels are high, and voltage decreasing when demand is high. By monitoring the voltage level of bus B, it may be possible to determine, or at least approximate, the state of the vehicle as it relates to the energy available on bus B. The energy available on bus B may be affected by the load and/or regenerated power produced by system(s) coupled to bus B. For example, the energy available on bus B may reflect suspension system conditions. As noted above, a decreased voltage level on bus B may indicate a high demand for power by the suspension system to respond to wheel events. This information may in turn allow a determination, or approximation, of other information about the vehicle; for example, a high demand for power due to wheel events may in turn indicate that the road surface is rough or sharply uneven, that the driver is engaging in driving behavior that tends to result in such wheel events, and the like.

Figure 44A:
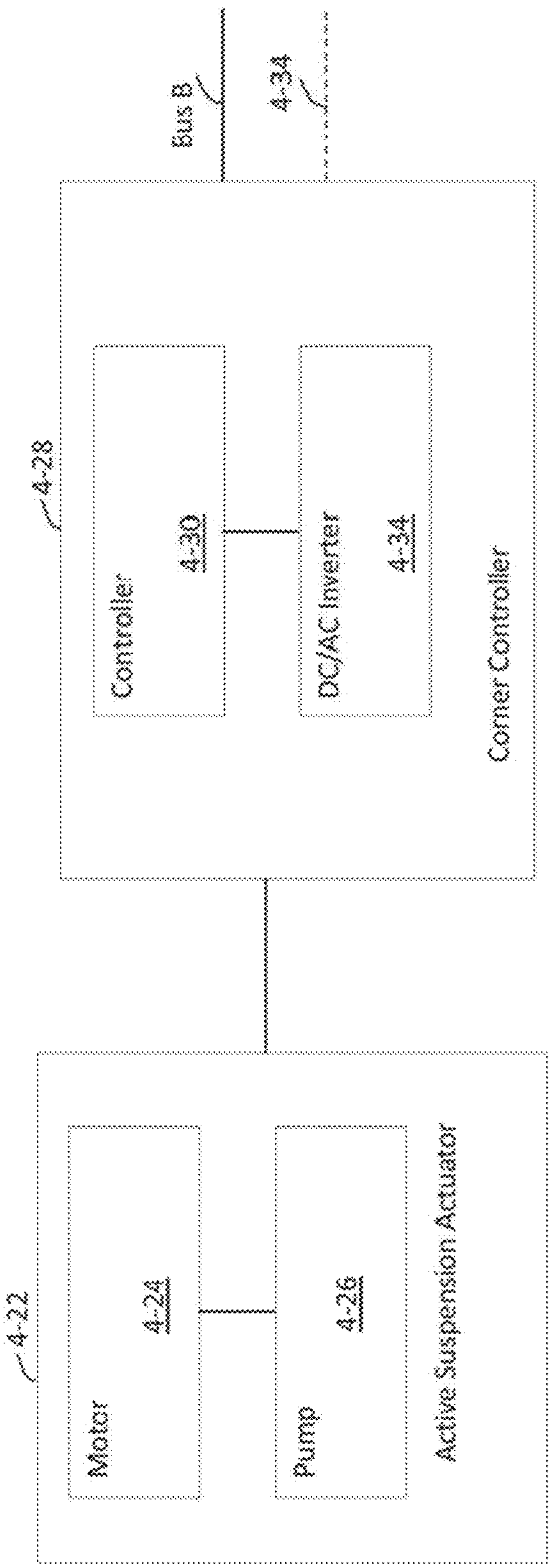
FIG. 44A illustrates an active suspension actuator and a corner controller, according to some embodiments.
Figure 44B:
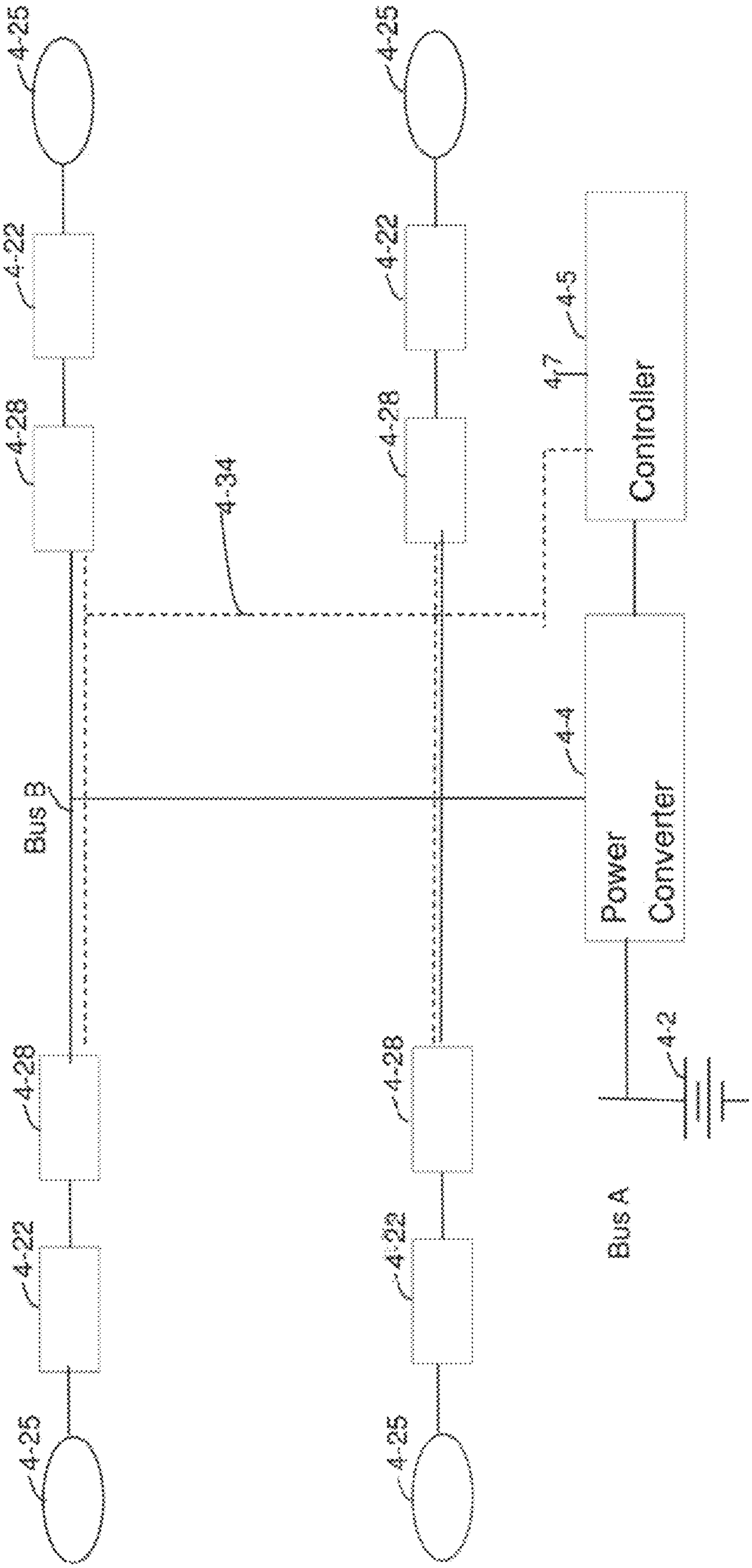
FIG. 44B illustrates a vehicle electrical system having a plurality of loads (e.g., corner controllers and active suspension actuators) connected to bus B, according to some embodiments.

As discussed above, an active suspension system may have an active suspension actuator 4-22 controlled by a corner controller 4-28 for each wheel of the vehicle, as illustrated in FIGS. 44A and 44B. FIG. 44A shows a block diagram of active suspension actuator 4-22 and corner controller 4-28. Active suspension actuator 4-22 may be mechanically coupled to the wheel of a vehicle and may dampen wheel movements. Active suspension actuator 4-22 may actively control wheel movements, drawing power from bus B to drive motor 4-24 (e.g., optionally a three-phase brushless motor) which actuates pump 4-26 to displace and/or change the pressure of fluid in a hydraulic damper mechanically connected to the wheel. In response to wheel and/or vehicle movement, active suspension actuator 4-22 may generate power based on the movement and/or change of pressure of fluid in the damper, thereby actuating pump 4-26 and allowing motor 4-24 to produce regenerated power which may be supplied to bus B. Corner controller 4-28 controls the active suspension actuator 4-22, and may control the amount of power applied from bus B to the active suspension actuator 4-22 and/or the amount of power provided from active suspension actuator 4-22 to bus B. Corner controller 4-28 may include a DC/AC inverter 32 that converts the DC voltage at bus B into an AC voltage to drive motor 4-24. DC/AC inverter 4-32 may be bidirectional, and may enable providing power from motor 4-24 to bus B when motor 4-24 is operated as a generator. In this sense, motor 4-24 may be an electric machine capable of operating either as a motor or a generator, depending on the manner in which is controlled by corner controller 4-8.

Corner controller 4-28 includes a controller 4-30 that determines how to control the DC/AC inverter 4-32 and/or the active suspension actuator 4-22. Controller 4-30 may receive information from one or more sensors of the active suspension actuator 4-4-22, the motor 4-24 and/or pump 4-26 regarding an operating parameter of the active suspension actuator 4-22. Such information may include information regarding movement of the damper, force on the damper, hydraulic pressure of the damper, motor speed of motor 4-24, etc. In some embodiments, controller 4-30 may receive information from a communications bus 4-34 from another corner controller 4-28 and/or an optional centralized vehicle dynamics processor (e.g., which may be implemented by controller 4-5, for example). Communications bus 4-34 may be the same as or different from communications bus 4-7 (discussed above in connection with FIG. 35). Controller 4-30 may measure the voltage of bus B and/or the rate of change of the voltage of bus B to obtain information regarding the state of the vehicle as it relates to the energy available from bus B. Controller 4-30 may process any or all of such information and determine how to control active suspension actuator 4-22 and/or DC/AC inverter 4-32. For example, corner controller 4-28 may "throttle" power to the active suspension actuator 4-22 by reducing power and/or a maximum power of the active suspension actuator 4-22 based upon the voltage of bus B falling below a threshold and/or the rate of change of the voltage on bus B falling below a threshold (e.g., decreasing quickly). When the voltage recovers, corner controller 4-28 may throttle power to the active suspension actuator 4-22 by increasing power and/or a maximum power of the active suspension actuator 4-22 based upon the voltage of bus B rising above a threshold and/or the rate of change of the voltage on bus B rising above a threshold (e.g., increasing quickly enough to signal a recovery).

In some embodiments, bus B may transfer energy among corner controllers 4-28 and power converter 4-4, as can be seen in the exemplary system diagram of FIG. 44B. Each corner controller 4-28 may independently monitor bus B to determine the overall system conditions for taking appropriate action based on these system conditions, as well as monitoring any wheel events being experienced locally for the wheel 4-25 with which the corner controller 4-28 is associated. Alternatively or additionally, controller 4-5 may centrally monitor bus B to determine the overall system conditions and may send commands to one or more corner controllers 4-28. In this sense, control of active suspension actuators 4-22 may be distributed (e.g., performed at the corner controllers 4-28) or centralized (e.g., performed at controller 4-5), or a combination of distributed control and centralized control may be used.

Figure 45:
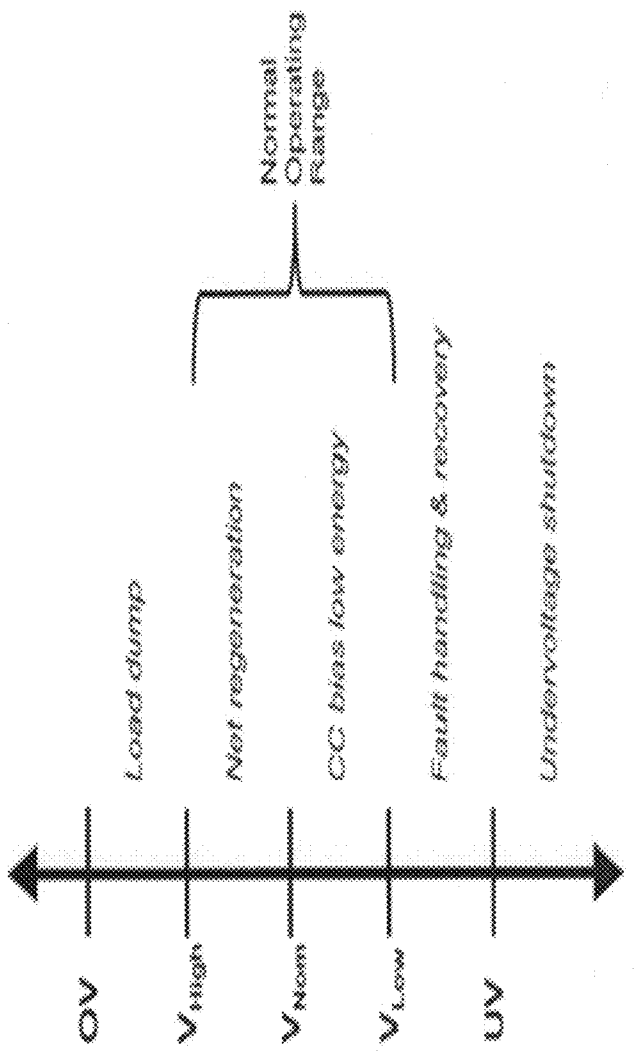
FIG. 45 illustrates exemplary operating ranges for bus B, according to some embodiments.

FIG. 45 shows exemplary operating regions for voltages on bus B, according to some embodiments, which may indicate different operating conditions for the systems connected to bus B (e.g., a corner controller, or a system other than an active suspension system). Exemplary system conditions that may be determined from the voltage of bus B are shown in FIG. 45, which shows the voltage range of bus B divided into operating condition ranges by various thresholds. In some embodiments, a corner controller 4-28 and/or controller 4-5 may measure the voltage on bus B and determine an operating condition based upon one or more thresholds.

In the example of FIG. 45, when the voltage of bus B is below the threshold UV, the bus may be in an operating condition range associated with an under voltage shutdown operating condition. When the voltage of bus B is between the threshold UV and the threshold V Low, the bus may be in an operating condition range associated with a fault handling and recovery operating condition. When the voltage of bus B is between threshold V Low and the threshold VNom, the bus may be in an operating condition range associated with a bias low energy operating condition. When the voltage of bus B is between threshold VNom and VHigh the bus may be in an operating condition range associated with a net regeneration operating condition. When the voltage of bus B is between the threshold VHigh and the threshold OV, a bus may be in an operating condition range associated with a load dump operating condition. However, the techniques described herein are not limited to the operating modes and/or ranges shown in FIG. 45, as other suitable operating ranges or conditions may be used.

As illustrated in FIG. 45, normal operating range conditions may include net regeneration and bias low energy. When the voltage level of bus B signals that the system is in a state of net regeneration, a suspension control system coupled to bus B may measure the voltage to determine the state of the bus B, and upon determining that the state is net regeneration, may activate functions such as supplying power to bus A. A bias low energy condition may indicate to an active suspension system that available energy reserves are being taxed, so preliminary measures to conserve energy consumption may be activated. In an example of preliminary energy consumption mitigation measures, wheel event response thresholds may be biased toward reducing energy demand. Alternatively or additionally, when a bias low energy system condition is detected, energy may be requested from bus A by power converter 4-4 to supplement the power available from the suspension system. A voltage above a normal operating range may indicate a load dump condition. This may be indicative of the suspension system or regenerative braking system regenerating excess energy to such a great degree that it cannot be passed in full or in part to bus A, so that there is a need for at least a portion of the energy to be shunted off. A suspension system controller, such as a corner controller 4-28 for a vehicle wheel 4-25, may detect this system condition and respond accordingly to reduce the amount of energy that is regenerated by the controller's active suspension actuator 4-22. One such response may be to dissipate energy in the windings of an electric motor 4-24 in the active suspension actuator 4-22. Operating states that are below the normal operating range may include fault handling and recovery states, and an under-voltage shutdown state. In some embodiments, operation in a fault handling and recovery state may signal to the individual corner controllers 4-28 to take actions to substantially reduce energy demand. To the extent that each corner controller 4-28 may be experiencing different wheel events, stored energy states, and voltage conditions, the actions taken by each corner controller 4-28 may vary, and in embodiments different corner controllers 4-28 may operate in different operating states at any given time. An under-voltage shutdown condition may be indicative of an unrecoverable condition in the system (e.g. a loss of vehicle power), a fault in one of the independent corner controllers, or a more serious problem with the vehicle (e.g. a wheel has come off) and the like. The under voltage shutdown state may cause the corner controller 4-28 to control the active suspension actuator 4-22 to operate solely as a passive or semi-active damper, rather than a fully active system, in some embodiments.

As noted above, the DC voltage level of bus B may define system conditions. It may also define the energy capacity of the system. By monitoring the voltage of bus B, each system coupled to bus B, such as corner controller 4-28 and/or controller 4-5, can be informed of how much energy is available for responding to wheel events and maneuvers. Using bus B to communicate suspension system and/or vehicle energy system capacity may also provide safety advantages over separated power and communication buses. By using voltage levels of bus B to signify operational conditions and power capacity, each corner controller 4-28 can operate without concern that a corner controller 4-28 is missing important commands that are being provided over a separate communication bus to the other corner controllers. In addition, it may either eliminate the need for a signaling bus (which may include additional wiring), or reduce the communication bus bandwidth requirements.

By providing a common bus B to all, or a plurality of, the corner controllers 4-28, each corner controller 4-28 can be safely decoupled from others that may experience a fault. In an example, if a corner controller 4-28 experiences a fault that causes the power bus voltage level to be substantially reduced, the other corner controllers 4-28 may sense the reduced power bus voltage as an indication of a problematic system condition and take appropriate measures to avoid safety issues. Likewise, with each corner controller capable of operating independently as well as being tolerant of complete power failure, even under severe power supply malfunction, the corner controllers 4-28 still take appropriate action to ensure acceptable suspension operation.

As discussed above, a plurality of systems may be coupled to bus B, as shown in FIG. 35. In some embodiments, each system coupled to bus B may be assigned a priority level. A system that relates to vehicle safety (e.g., anti-lock braking system) may be given a high-priority, and less critical systems may be given a lower priority. The systems coupled to bus B may have thresholds that are compared with the voltage of bus B and/or the rate of change of the voltage of bus B for determining a suitable state of operation based on the available energy. A load may reduce the power that it demands from bus B when the voltage falls below a threshold for example. In some embodiments, the systems with a high priority level may have voltage thresholds set lower than that of a lower priority system. Accordingly, the high-priority systems may draw power under conditions of low energy availability, while low-priority systems may not draw power or may draw reduced power during periods of low energy availability, and may wait until the bus voltage recovers to higher level. The use of different priority levels may facilitate making sure energy is available to high-priority systems.

A loosely regulated bus B can facilitate an effective energy storage architecture. Energy storage apparatus 4-6 may be coupled to bus B, and the bus voltage may define the amount of available energy in energy storage apparatus 4-6. For example, by reading the voltage level of bus B, each corner controller 4-28 of an active suspension system may determine the amount of energy stored in energy storage apparatus 4-6 and can adapt suspension control dynamics based on this knowledge. By way of illustration, for a DC bus that is allowed to fluctuate between 38V and 50V, an energy storage apparatus including a capacitor or supercapacitor with a total storage capacitance C, the amount of available energy (neglecting losses) is:

$$\text{Energy}=\tfrac{1}{2}*C*(50)2-\tfrac{1}{2}*C*(38)\hat{}2=528*C$$

Using this calculation or similar calculations, the corner controllers 4-28 are able to adapt algorithms to take into account the limited storage capacity, along with the static current capacity of a central power converter to supply continuous energy.

In some embodiments, the operating thresholds of bus B (e.g., the operating thresholds illustrated in FIG. 45) may be dynamically updated based on the state of the vehicle or other information. For example, during starting of the vehicle, the voltage thresholds may be allowed to go lower.

The terms "passive," "semi-active" and "active" in relation to a suspension are described as follows. A passive suspension (e.g., a damper) produces damping forces that are in the opposite direction as the velocity of the damper, and cannot produce a force in the same direction as the velocity of the damper. A semi-active suspension actuator may be controlled to change the amount of damping force that is produced. However, as with a passive suspension, a semi-active suspension actuator produces damping forces that are in the opposite direction as the velocity of the damper, and cannot produce a force in the same direction as the velocity of the damper. An active suspension actuator may produce forces on the actuator that are in the same direction or the opposite direction as the velocity of the actuator. In this sense, an active suspension actuator may operate in all four quadrants of a force-velocity plot. A passive or semi-active suspension actuator may operate in only two quadrants of a force-velocity plot for the damper.

The term "vehicle" as used herein refers to any type of moving vehicle such as. a 4-wheeled vehicle (e.g., an automobile, truck, sport-utility vehicle etc.) and vehicles with more or less than four wheels (including motorcycles, light trucks, vans, commercial trucks, cargo trailers, trains, boats, multi-wheeled and tracked military vehicles, and other moving vehicles). The techniques described herein may be applied to electric vehicles, hybrid vehicles, combustion-driven vehicles, or any other suitable type of vehicle.

The embodiments described herein may be beneficially combined with vehicle architectures such as hybrid electric vehicles, plugin hybrid electric vehicles, battery powered electric vehicles. Suitable loads may also include drive by wire systems, brake force amplification, brake assist and boost, electric AC compressors, blowers, hydraulic fuel water and vacuum pumps, start/stop functions, roll stabilization, audio system, electric radiator fan, window defroster, and active steering systems.

In some embodiments the main electrical source for the vehicle (such as a vehicle alternator) may be electrically connected to bus B. In such an embodiment, the power converter (e.g., DC/DC converter) may be disposed to convert energy from bus B to bus A, however in some cases a bidirectional converter may be desirable. In such an embodiment, the alternator charging algorithm or control system may be configured to allow for voltage bus fluctuations in order to utilize voltage bus signaling, energy storage capability, and other features of the system. In some cases the alternator may be connected to bus B and provide additional energy during braking events, such as on a mild hybrid vehicle. Alternator controllers and ancillary controllable loads may be used to prevent transient overvoltage conditions on bus B if the load on the bus suddenly drops when the alternator is in a high current output state.

In many embodiments the bus A and bus B may share a common ground. However, in some embodiments the power converter (e.g., DC/DC converter) may galvanically isolate bus B from bus A. Such a system may be accomplished with a transformer-based DC/DC converter. In some cases digital communication may be isolated as well, such as through optoisolators.

Additional Aspects

In some embodiments, techniques described herein may be carried out using one or more computing devices. Embodiments are not limited to operating with any particular type of computing device.

Figure 46:
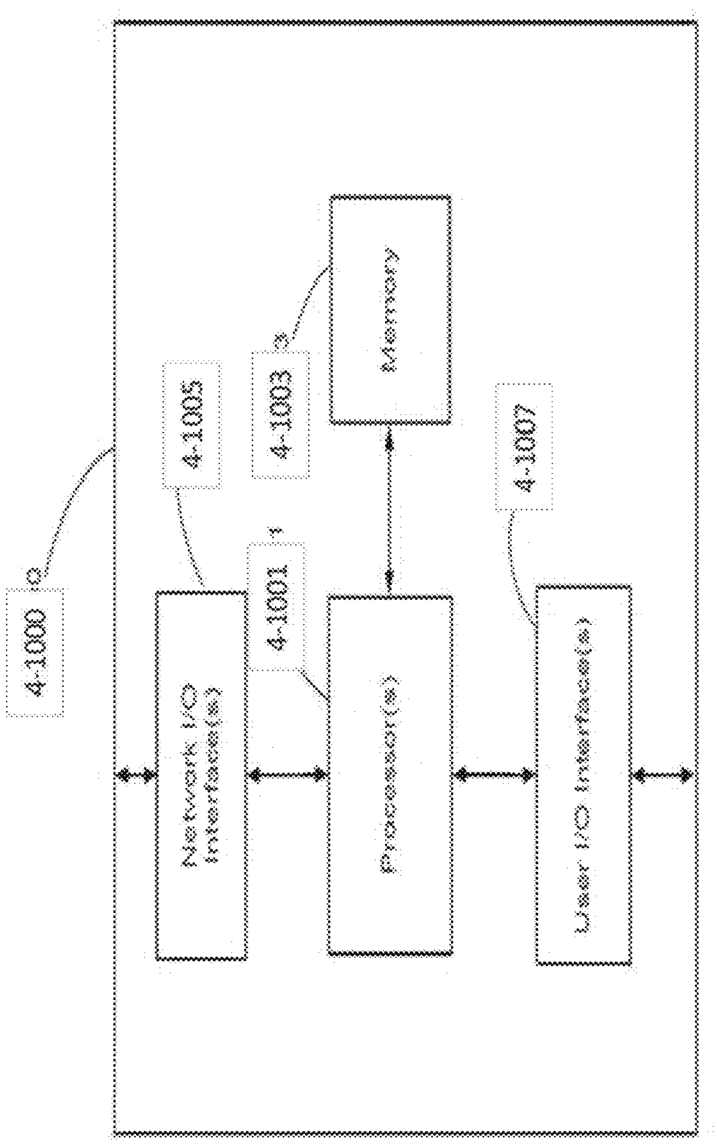
FIG. 46 is a block diagram of an illustrative computing device of a controller.
Figure 47:
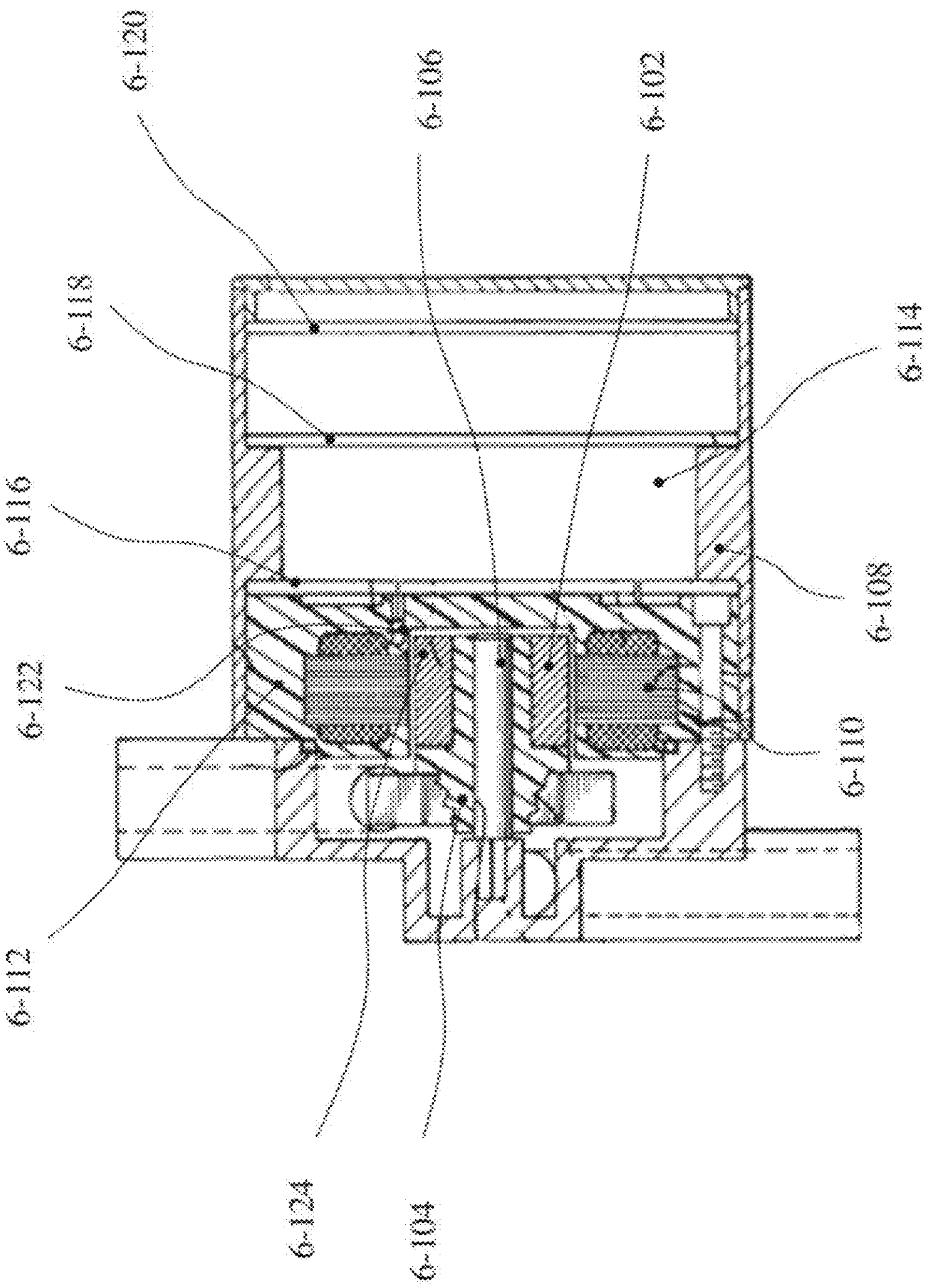
FIG. 47 is a cross section of an integrated pump motor and controller assembly in accordance with the prior art.

FIG. 46 is a block diagram of an illustrative computing device 4-1000 that may be used to implement a controller (e.g., controller 4-5 and/or 4-30) as described herein. Alternatively or additionally, a controller may be implemented by analog or digital circuitry.

Computing device 4-1000 may include one or more processors 4-1001 and one or more tangible, non-transitory computer-readable storage media (e.g., memory 4-1003). Memory 4-1003 may store, in a tangible non-transitory computer-recordable medium, computer program instructions that, when executed, implement any of the above-described functionality. Processor(s) 4-1001 may be coupled to memory 4-1003 and may execute such computer program instructions to cause the functionality to be realized and performed.

Computing device 4-1000 may also include a network input/output (I/O) interface 4-1005 via which the computing device may communicate with other computing devices (e.g., over a network), and may also include one or more user I/O interfaces 4-1007, via which the computing device may provide output to and receive input from a user.

The above-described embodiments can be implemented in any of numerous ways. For example, the embodiments may be implemented using hardware, software or a combination thereof. When implemented in software, the software code can be executed on any suitable processor (e.g., a microprocessor) or collection of processors, whether provided in a single computing device or distributed among multiple computing devices. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments described herein comprises at least one computer-readable storage medium (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or other tangible, non-transitory computer-readable storage medium) encoded with a computer program (i.e., a plurality of executable instructions) that, when executed on one or more processors, performs the above-discussed functions of one or more embodiments. The computer-readable medium may be transportable such that the program stored thereon can be loaded onto any computing device to implement aspects of the techniques discussed herein. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as “first,” “second,” “third,” etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of “including,” “comprising,” or “having,” “containing,” “involving,” and variations thereof herein, is meant to encompass the items listed thereafter and equivalents thereof as well as additional items.

Vehicular High Power Electrical System

In some embodiments, a vehicle electrical system may include a high-power electrical bus that is controlled independently of an electrical bus connected to the vehicle battery. The high-power electrical bus may be supplied at least partially by a power converter (e.g., a DC/DC converter) that draws power from the vehicle battery, and which can at least partially decouple the high-power electrical bus from the vehicle battery. High-power electrical loads, such as an active suspension system, for example, may be powered by the high-power electrical bus.

The techniques described herein relate to controlling the high-power electrical bus and one or more loads coupled thereto. The techniques described herein can facilitate quickly supplying significant power to high-power electrical loads, such as an active suspension system, for example, connected to the high-power electrical bus, a technique referred-to herein as supplying "on-demand energy." In some embodiments, an energy storage apparatus is coupled to the high-power electrical bus to facilitate supplying on-demand energy. A significant amount of power may be provided to a load connected to the high-power electrical bus while limiting the amount of power drawn from the vehicle battery, thereby mitigating the effect on the remainder of the vehicle electrical system of providing on-demand energy.

In some embodiments, one or more regenerative systems, such a regenerative suspension system or regenerative braking system, for example, may be coupled to the high-power electrical bus and may supply power to the high-power electrical bus. In some embodiments, an active suspension system may be "energy-neutral" in the sense that over time the amount of energy generated while in performing regeneration may be substantially equal to the amount of power consumed when actively driving the active suspension actuator.

FIG. 35 shows a vehicle electrical system 4-1, according to some embodiments. As shown in FIG. 35, vehicle electrical system 1 has two electrical buses: bus A and bus B. Bus A and bus B may be at the same voltage or at different voltages. In some embodiments, bus A and bus B are DC buses supplying a DC voltage. Bus A may be connected to the positive terminal of a vehicle battery 4-2. The negative terminal of the vehicle battery 4-2 may be connected to "ground" (e.g., the vehicle chassis). In a typical vehicle electrical system, vehicle battery 4-2 (and bus A) has a nominal voltage of 12V. In some embodiments, bus B may be at a higher voltage than bus A (with reference to "ground"). In some embodiments, bus B may have a nominal voltage of 24V, 42V, or 48 V, by way of example. However, the techniques described herein are not limited in this respect, as bus A bus B may be at any suitable voltages. The voltages of busses A and B may vary during operation of the vehicle, as discussed further below. Vehicle battery 4-2 may provide power to one or more vehicle systems (not shown) connected to bus A, as in conventional automotive electrical systems.

Vehicle electrical system 4-1 includes a power converter 4-4 to transfer energy between bus A and bus B. Power converter 4-4 may be a switching power converter controlled by one or more switches. In some embodiments, power converter 4 may be a DC/DC converter. Power converter 4-4 may be unidirectional or bidirectional. If power converter 4-4 is unidirectional, it may be configured to provide power from bus A to bus B. If power converter 4-4 is bidirectional, it may be configured to provide power from bus B to bus A and from bus A to bus B. For example, as mentioned above, in some embodiments one or more loads on bus B may be regenerative, such as a regenerative suspension system or regenerative braking system. If power converter 4-4 is bidirectional, power from a regenerative system coupled to bus B may be provided from bus B to bus A via power converter 4-4, and may charge the vehicle battery 4-2. Power converter 4-4 may have any suitable power conversion topology, as the techniques described herein are not limited in this respect.

In some embodiments, a bidirectional power converter 4-4 allows energy to flow in both directions. The power transfer capability of power converter 4-4 may be the same or different for different directions of power flow. For example, in the case of a configuration comprising directionally opposed buck and boost converters, each converter may be sized to handle the same amount of power or a different amount of power. As an example in a 12V to 46V system with different power conversion capabilities in different directions, the continuous power conversion capability from 12V to 46V may be 1 kilowatt, while from 46V to 12V in the reverse direction the power conversion capability may only be 100 watts. Such asymmetrical sizing may save cost, complexity, and space. These factors are especially important in automotive applications. In some embodiments, the power converter 4 may be used as an energy buffer/power management system without raising or lowering the voltage, and the input and output voltages may be roughly equivalent (e.g., a 12V to 12V converter). In some embodiments the power converter 4 may be connected to a DC bus with a voltage that fluctuates, for example, between 24V and 60V or 300V and 450V (e.g., for an electric vehicle).

Vehicle electrical system 4-1 may include a controller 4-5 (e.g., an electronic controller) configured to control the manner in which power converter 4-4 performs power conversion. Electronic controller 4-5 may be any type of controller, and may include a control circuit and/or a processor that executes instructions. Controller 4-5 may control the direction and/or magnitude of power flow in power converter 4, as discussed further below. Controller 4-5 may be integrated with power converter 4-4 (e.g., on the same board) or separate from power converter 4-5. Another aspect of the techniques described herein is the ability for an external energy management control signal to regulate power. To do so, controller 4-5 may receive, via a communication network 4-7, information (e.g., a maximum power and/or current) and/or instructions that may be used by controller 4-5 to control power converter 4-4. The network 4-7 may be any suitable type of communication network. For example, in some embodiments the network 4-7 may be a wired or wireless communications bus that allows communications among different systems in the vehicle. If the information is provided to the controller 4-5 for via a wired connection, it may be provided via a wire or a communication bus (e.g., a CAN bus). In some embodiments, an external CAN bus signal from the vehicle is able to send commands to controller 4-5 in order to dynamically manage and change directional power limits in each direction, or to download voltage limits and charge curves. In some embodiments, controller 4-5 may be within the same module as power converter 4, and coupled to the power converter 4-4 via a wire and/or another type of communications bus.

As shown in FIG. 35, one or more vehicle systems may be connected to bus B. In some embodiments, bus B may be a high-power electrical bus. As mentioned above, a vehicle system connected to bus B may be a power source or a power sink (e.g., a load). Some vehicle systems may act as power sources at some times and power sinks at other times.

Non-limiting examples of vehicle systems that may be connected to bus B include a suspension system 4-8, a traction/dynamic stability control system 4-10, a regenerative braking system 4-12, an engine start/stop system 4-14, an electric power steering system 4-16, and an electric automatic roll control system 4-17. Other systems 4-18 may be connected to bus B. Any one or more systems may be connected to bus B to source and/or sink power to/from bus B.

As mentioned above, one or more systems connected to bus B may act as a power source. For example, suspension system 8 may be a regenerative suspension system configured to generate power in response to wheel and/or vehicle movement. Regenerative braking system 4-12 may be configured to generate power when the vehicle's brakes are applied.

One or more systems connected to bus B may act as a power sink. For example, traction/dynamic stability control system 4-10 and/or power steering system 4-16 may be high-power loads. As another example, suspension system 4-8 may be an active suspension system that has power provided by bus B to power an active suspension actuator.

One or more systems connected to bus B may act as a power source and as a power sink at different times. For example, suspension system 4-8 may be an active/regenerative suspension system that generates power in response to wheel events and draws power when an active suspension actuator is actively driven.

Figure 36:
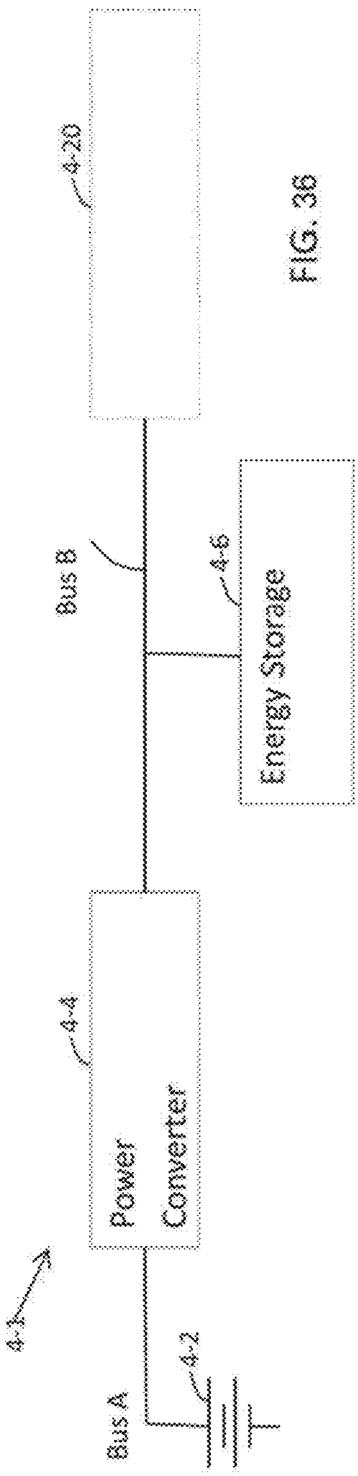
FIG. 36 shows a vehicle electrical system having an energy storage apparatus connected to bus B, according to some embodiments.

In some embodiments, vehicle electrical system 4-1 may have an energy storage apparatus 4-6. Energy storage apparatus 4-6 may be coupled to bus B, either directly or indirectly, to provide power to one or more vehicle systems 4-20 connected to bus B. For example, as shown in FIG. 36, a terminal of energy storage apparatus 4-6 may be directly connected to bus B (i.e., by a conductive connection such that a terminal of energy storage apparatus 4-6 is at the same electrical node as bus B). Alternatively or additionally, energy storage apparatus 4-6 may be indirectly connected to bus B. For example, as shown in FIG. 37, energy storage apparatus 4-6 may be directly connected to bus A (i.e., by a conductive connection such that a terminal of energy storage apparatus 4-6 is at the same electrical node as bus A), and indirectly connected to bus B via the power converter 4-4. As illustrated in FIG. 38, in some embodiments energy storage apparatus 4-6 may be connected to both bus A and bus B. As shown in FIG. 38, a first terminal of energy storage apparatus 4-6 may be directly connected to bus B and a second terminal of energy storage apparatus 4-6 may be directly connected to bus A. However, energy storage apparatus 4-6 may be connected in any suitable configuration, as the techniques described herein are not limited in this respect.

In some embodiments, energy storage apparatus 4-6 may provide power to a load coupled to bus B instead of or in addition to power provided by the vehicle battery 4-2. In some embodiments, energy storage apparatus 4-6 may supply power in response to a load, thereby reducing the amount of power that needs to be drawn from vehicle battery 4-2 in response to the load. Providing at least a portion of the power by energy storage apparatus 4-6 in response to a large load may avoid drawing a large amount of power from the vehicle battery 4-2. Drawing an excessive amount of power from vehicle battery 4-2 may cause the voltage of bus A to droop to an unacceptably low voltage or reduce the state of charge of vehicle battery 4-2. Thus, there is a limit to the amount of power that can be drawn from vehicle battery 4-2. Providing power from energy storage apparatus 6 in response to the load may enable providing a higher amount of power to a load than would be possible in the absence of energy storage apparatus 4-6.

Energy storage apparatus 4-6 may include any suitable apparatus for storing energy, such as a battery, capacitor or supercapacitor, for example. Examples of suitable batteries include a lead acid battery, such as an Absorbent Glass Mat (AGM) battery, and a lithium-ion battery, such as a Lithium-Iron-Phosphate battery. However, any suitable type of battery, capacitor or other energy storage apparatus may be used. In some embodiments, energy storage apparatus 4-6 may include a plurality of energy storage apparatus (e.g., a plurality of batteries, capacitors and/or supercapacitors). In some embodiments, the energy storage apparatus 4-6 may include a combination of different types of energy storage apparatus (e.g., a combination of a battery and a supercapacitor). In some embodiments, energy storage apparatus 4-6 may include an apparatus that can quickly provide a significant amount of power to the at least one system 4-20 coupled to bus B. For example, in some embodiments, energy storage apparatus 4-6 may be capable of providing greater than 0.5 kW, greater than 1 kW, or greater than 2 kW of power. In some embodiments, energy storage apparatus 4-6 may have an energy storage capacity of 1 kJ to several hundred kJ (e.g., 100 to 200 kJ or greater). If energy storage apparatus 4-6 includes one or more supercapacitor(s), the supercapacitor(s) may have an energy storage capacity of between 1 kJ and 10 kK, or greater than 10 kJ. Supercapacitors are capable of very high peak powers. By way of illustration, a supercapacitor string with 1 kJ of energy storage may provide greater than 1 kW of peak power. If the energy storage apparatus includes one or more batteries, the one or more batteries may have an energy storage capacity of between 10 kJ and 200 kJ, or greater than 200 kJ. In comparison with supercapacitors, a 10 kJ battery string may be limited to about 1 kW of peak power. In some embodiments, energy storage apparatus 6 may achieve both high capacity energy storage with high peak power using battery strings connected in parallel and/or using a combination of batteries and supercapacitors.

In some embodiments, the energy storage apparatus 4-6 is provided with a battery management system and/or a balancing circuit 4-9. The battery management system and/or balancing circuit 4-9 may balance the charge among the batteries and/or supercapacitors of energy storage apparatus 4-6.

In an exemplary embodiment, suspension system 4-8 may be an active suspension system for a vehicle that can actively control an active suspension actuator (e.g., to control movement of a wheel). Active control of an active suspension actuator may be performed to anticipate and/or respond to forces exerted by a driving surface on a wheel of the vehicle. The active suspension system may include one or more actuators driven by power supplied from bus B. For example, an actuator may include an electric motor that can drive a fluid pump to actuate a hydraulic damper. An actuator controller may control the actuator in response to motion of the vehicle and/or wheel. For example, an active suspension actuator may raise a wheel in anticipation of or response to a bump to reduce transfer of force to the remainder of the vehicle. As another example, an active suspension actuator may lower a wheel into a pothole to minimize movement of the remainder of the vehicle when the wheel hits the pothole. In some situations, the actuator controller may demand a significant amount of power (e.g., 500 W) be provided quickly from bus B to drive the active suspension actuator. The energy storage apparatus 6 coupled to bus B may provide at least a portion of the power demanded by the actuator.

In some embodiments, the controller 4-5 and/or power converter 4 may be configured to limit an amount of power provided from bus A (e.g., from vehicle battery 4-2) to bus B no higher than a maximum power. Setting a maximum power that may be drawn from bus A may prevent drawing an excessive amount of energy from the vehicle battery 4-2, and avoid causing a voltage drop on bus A, for example. Any suitable value of maximum power may be chosen depending on the vehicle and factors such as the energy storage capacity and/or the state of charge of vehicle battery 4-2, or other factors, as discussed further below. Controller 4-5 may control power converter 4-4 based on the maximum power. Controller 4-5 may store information representing the maximum power in a suitable data storage apparatus.

When power is demanded by a system connected to bus B, the power may be supplied by vehicle battery 4-2 (e.g., via bus A and power converter 4-4), energy storage apparatus 4-6 or a combination of vehicle battery 4-2 and energy storage apparatus 4-6. When the power drawn from bus A is below the maximum power, power converter 4-4 may allow power to be drawn from bus A. However, the power converter 4-4 may be controlled to prevent the amount of power drawn from bus A from exceeding the maximum. When the amount of power demanded from bus A exceeds the maximum, power converter 4-4 may be controlled to limit the amount of power provided to bus B to the maximum power.

As an example, if power converter 4-4 is configured to limit the power drawn from the vehicle battery 4-2 to no more than a maximum power of 1 kW, and the amount of power demanded by bus B from vehicle battery 4-2 is 0.5 kW, the power converter 4-4 may supply the required 0.5 kW to bus B. However, if more than 1 kW is required, the power converter 4-4 may provide the maximum power (e.g., 1 kW, in this example) to bus B and the additional power necessary may be drawn from energy storage apparatus 4-6. For example, if the maximum power that can be drawn from the vehicle battery and supplied to bus B is 1 kW, and a load coupled to bus B demands 2 kW, then 1 kW of power may be provided from the vehicle battery 4-2 and the remaining 1 kW of power may be provided by the energy storage apparatus 4-6.

The power converter 4-4 may limit the power provided from bus A to bus B in any suitable manner. In some embodiments, the power converter 4-4 may limit the power provided from bus A to bus B by limiting the current drawn from the vehicle battery 4-2. In some embodiments, the power converter 4-4 may limit the input current (at the bus A side) of power converter 4-4. A maximum current and/or power value may be stored in any suitable data storage apparatus coupled to controller 4-5. In some embodiments, controller 4-5 may set one or more operating parameters of the power converter 4-4 (e.g., duty cycle, switching frequency, etc.) to limit the amount of power that flows through power converter 4-5 to the maximum power.

In some embodiments, the maximum power that can be provided from bus A to bus B may be limited (e.g., by power converter 4-4) based on the amount of energy and/or the average power transferred from bus A to bus B over a time period. In some embodiments, the amount of energy and/or power provided from bus A to bus B over a period of time may be limited to avoid drawing a significant amount of energy from the vehicle battery 4-2, which may cause a voltage drop on bus A and/or reduce the state of charge of vehicle battery 4-2.

FIG. 39 shows an exemplary plot of the maximum power that may be drawn from vehicle battery 4-2 for various time periods. In the example of FIG. 39, if power is drawn from the vehicle battery 4-2 for a relatively small period of time (e.g., one second), a relatively high maximum power may be allowed to be transferred from bus A to bus B by power converter 4-4. However, transferring a significant amount of power for a relatively long period of time may draw a significant amount of energy from the vehicle battery 4-2, potentially causing a drop in the voltage of bus A. Thus, a lower maximum power may be set when drawing power from the vehicle battery for a longer period of time. The maximum power may be gradually reduced for longer periods of time. For example, after power has been drawn from the vehicle battery 4-2 for more than one second, the maximum power may be reduced to avoid overly discharging the vehicle battery 4-2. This may prevent a scenario where the vehicle is idling and the battery becomes fully discharged due to a large amount of power being drawn from bus A to bus B over a significant period of time. The maximum power may be reduced even further if power is drawn from the vehicle battery for longer periods of time (e.g., over 100 seconds). The maximum power may be reduced for such periods of time to maintain vehicle efficiency at an acceptable level. The maximum power may thus change (e.g., be reduced) the longer that current is provided from bus A to bus B. If more power is required from a load coupled to bus B than the maximum power, the additional power necessary to satisfy the load may be provided by energy storage apparatus 6, in some embodiments.

The plot shown in FIG. 39 is one example of a way in which the maximum power and/or energy that can be provided from bus A to bus B may be set by power converter 4-4 based upon the amount of time for which power is provided from bus A to bus B. Any suitable maximum power and/or energy may be selected based amount of time that power is drawn, and is not limited to the exemplary curve shown in FIG. 39. In some embodiments, the maximum power and/or energy may be set using a mapping such as a curve or a lookup table stored by controller 4-5.

In some embodiments, the maximum power that may be provided from bus A to bus B may be set based upon the state of the vehicle. The state of the vehicle may be a measure of energy available from bus A. For example, the state of the vehicle may include information regarding the state of charge of vehicle battery 4-2, engine RPM (e.g., which may indicate if the vehicle is at idle), or the status of one or more loads connected to bus A drawing power from the vehicle battery 4-2. If the state of charge of the vehicle battery 4-2 is low, the engine RPM is low, and/or one or more loads connected to bus A are in a state where they are drawing significant power from the vehicle battery 4-2, the maximum power that may be provided from bus A to bus be may be reduced. As another example, the state of the vehicle may include the status of a dynamic stability control (DSC) system connected to bus A. If the dynamic stability control system is currently operating to stabilize the vehicle, and drawing power via bus A, the maximum power that may be provided from bus A to bus B may be reduced so that sufficient energy is available in the vehicle battery 4-2 for the dynamic stability control system connected to bus A. As another example, when the vehicle's headlights or air conditioner are turned on, they may draw significant power from the vehicle battery 4-2. Accordingly, the maximum power that may be provided for bus A to bus B be may be reduced when the headlights and/or air conditioner are turned on to avoid drawing down the vehicle battery 4-2. The maximum power may be set based upon any suitable state of the vehicle representing the amount of energy available on bus A.

As discussed above, the power converter 4-4 may limit the power transferred from bus A to bus B based on the maximum power. Information regarding the state of the vehicle and/or the maximum power may be provided to controller 4-5 by a system coupled to the communication network 4-7. For example, information regarding the state of the vehicle may be provided by an engine control unit, or any other suitable control system of the vehicle that has information regarding the state of the vehicle.

Typical switching DC/DC converters are designed to convert a DC input voltage into a DC output voltage that is substantially constant. Although a switching DC/DC converter has an output voltage ripple, in general typical switching DC/DC converters are designed to minimize the output voltage ripple to produce as constant a DC output voltage as possible. In a conventional switching DC/DC converter, the output voltage ripple may be a very small fraction (e.g., <1%) of the DC output voltage.

The present inventors have recognized and appreciated that allowing the voltage of bus B to vary from its nominal voltage may enable reducing the amount of energy storage capacity of energy storage apparatus 4-6. In some embodiments, bus B may be a loosely regulated bus that may have significant voltage swings in response to loads and/or regenerated power on bus B. Instead of attempting to fix the voltage of bus B as close as possible to a nominal voltage (e.g., 48V or 42V), the power converter 4 may be configured to allow the output voltage at bus B to vary within a relatively wide range from the nominal voltage. In some embodiments, the voltage of bus be may be allowed to vary within a range that is greater than 5%, up to 10%, or up to 20% of the nominal voltage of bus B (e.g., the average voltage of bus B or the average of the maximum and minimum voltage thresholds). In some embodiments, the voltage of bus B may be kept between a first threshold and a second threshold (e.g., between minimum and maximum voltage values). As an example, if bus B is nominally a 48 V DC bus, the voltage of bus B may be allowed to vary between 40 V and 50 V, in some embodiments. However, the techniques described herein are not limited as to particular range of voltages that are allowable for voltage bus B.

In some embodiments, the techniques described herein may be applied to an electric vehicle. In an electric vehicle, the vehicle battery 4-2 may have a relatively high capacity to enable driving a traction motor to propel the vehicle. For example, in some embodiments, the vehicle battery 4-2 may be a battery pack having a pack voltage of 300-400 V or greater. Accordingly, in an electric vehicle, bus A may be a high voltage bus for driving the traction motor that propels the vehicle, and bus B may be at a lower voltage. Power converter 4-4 may be a DC/DC converter that converts the high voltage of bus A into a lower voltage at bus B. In some embodiments, bus B may have a nominal voltage of 48 V, as discussed above. However, the techniques described herein are not limited as to the voltage of bus B.

As discussed above, a suspension system 4-8 may be connected to bus B. In some embodiments, the suspension system 4-8 of an electric vehicle may be an active suspension system and/or a regenerative suspension system. If the suspension system 4-8 is configured to operate as an active suspension system, the active suspension system may draw power from vehicle battery 4-2 via the power converter 4-4. If the suspension system 4-8 is configured to operate as a regenerative suspension system, the energy generated by the regenerative suspension system may be stored in energy storage apparatus 4-6 and/or may be transferred to vehicle battery 4-2 via power converter 4-4. The power converter 4-4 may be bidirectional to allow energy transfer from bus B to bus A, as discussed above.

As discussed above, the loads coupled to bus B can be capable of demanding a significant amount of power. The inventors have recognized and appreciated that it would be desirable to predict future driving conditions to predict the amount of energy that will be needed by a load coupled to bus B. Predicting the energy that will be needed may allow the vehicle electrical system to prepare in advance by making enough energy available to meet the expected load. For example, if it is predicted that a significant amount of power will need to be supplied to a load on bus B in the near future, the vehicle electrical system may prepare in advance by charging energy storage apparatus 4-6 to increase the amount of energy that is available to meet the demand. Power converter 4-4 may control the flow of power between bus A and bus B to regulate the state of charge of the energy storage apparatus 4-6 based upon a predicted future driving condition.

They predicted future driving condition may be determined based on information from a sensor or other device that determines information about the vehicle that is indicative of the future driving condition.

As an example, a forward-looking sensor may be mounted on the vehicle and may sense features of the driving surface such as bumps or potholes. The forward looking sensor may be any suitable type of sensor, such as a sensor that senses and processes information regarding electromagnetic waves (e.g., infrared, visual and/or RADAR waves). Information from the forward-looking sensor may be provided to a controller (e.g., controller 4-5) that may determine additional energy should be supplied to energy storage apparatus 4-6 in anticipation of a large load being drawn from the active suspension system when the vehicle is expected to travel over a bump or pothole.

Another example of a device that senses information that may be indicative of future driving conditions is a steering action sensor. A steering action sensor may detect the amount of steering being applied to steer the vehicle. Such information may be provided to a controller (e.g., controller 4-5) that may determine additional energy should be supplied to energy storage apparatus 4-6 in anticipation of a load being drawn from the active suspension system to counter the rolling force of an anticipated turning maneuver.

Information indicative of future driving conditions may be provided by any suitable vehicle system. In some embodiments, such information may be provided by a vehicle system that is powered by bus B or bus A.

An example of a device that senses information that may be indicative of future driving conditions is a suspension system. For example, in a vehicle that includes four wheels, the front two wheels may have active suspension actuators that may be displaced in response to a feature of the driving surface, such as a pothole, bump, etc. Such actuators may detect the amount of displacement produced by such an event at the front wheel(s). Information regarding the event may be provided to controller (e.g., controller 5) which may determine that additional energy should be provided to energy storage apparatus 6 in anticipation of a load being drawn from the active suspension system when the rear wheels travel over the same feature of the driving surface.

Information that may be indicative of future driving conditions may be obtained from any suitable system coupled to bus A or bus B, such as an electric power steering system, an antilock braking system, or an electronic stability control system, for example.

Another example of a device that senses information that may be indicative of future driving conditions is a vehicle navigation system. A vehicle navigation system may include a device that determines the position of the vehicle, such as a global positioning system (GPS) receiver. Other relevant types of information may be obtained from a vehicle navigation system, such as the speed of the vehicle. The vehicle navigation system may be programmed with a destination, and may prompt the driver to follow a suitable route to reach the destination. Accordingly, the vehicle navigation system may have information that indicates future driving conditions, such as upcoming curves in the road, traffic, and/or locations at which the vehicle is expected to stop (e.g., intersections, the final destination, etc.). Such information may be provided to a controller (e.g., controller 4-5) that determines whether additional energy should be provided to energy storage apparatus 4-6. Controller 4-5 may control power converter 4-4 to regulate the state of charge of energy storage apparatus 4-6 based upon such information. For example, if the navigation system predicts that a turn is upcoming, additional energy may be provided to charge energy storage apparatus 6 in anticipation of a large electrical load from the active suspension system to counter the rolling force of the turn.

As illustrated in FIG. 38, in some embodiments energy storage apparatus 4-6 may have a first terminal connected to bus A and a second terminal connected to bus B. Connecting energy storage apparatus 4-6 between bus A and bus B may reduce the voltage across energy storage apparatus 4-6 as compared with the case where energy storage apparatus 4-6 is connected between bus B and ground (e.g., the vehicle chassis). Energy storage apparatus 4-6 may include a plurality of energy storage devices, such as batteries or supercapacitors, that are stacked together in series to withstand the voltage across the energy storage apparatus 4-6, as each battery cell or supercapacitor may individually only be able to withstand of voltage from less than 2.5V to 4.2V. Reducing the voltage across the energy storage apparatus 4-6 may reduce the number of batteries or supercapacitors that need to be stacked in series, and thus may reduce the cost of the energy storage apparatus 4-6.

FIG. 40A illustrates a system in which power converter 4-4 includes a bidirectional DC/DC converter that can provide power from bus B to bus A to recharge vehicle battery 4-2 based on power generated by a power source coupled to bus B (e.g., a regenerative suspension system or regenerative braking system). In the example of FIG. 40A, 20 A of current is supplied to the DC/DC converter by bus B. Due to the 4:1 voltage ratio between bus B and bus A, the current on bus B is converted into 80 A of current at bus A to charge the vehicle battery 4-2.

FIG. 40B shows a system in which energy storage apparatus 4-6 is connected to bus A and bus B, in parallel with the power converter 4-4. As illustrated in FIG. 40B, there are two electrical paths for the current to flow from bus B to bus A: through the DC/DC converter; and through the energy storage apparatus 4-6. The magnitude and direction of power and/or current that flows through the electrical paths between bus B and bus A may be controlled by the power converter 4-4, which may set the relative impedances of the power converter 4-4 and/or the energy storage apparatus 4-6. In the example of FIG. 40B, power converter 4-4 is operated such that power flows through power converter 4-4 from bus B to bus A. In this example, 10 A of current flows from bus B into the power converter 4-4, 10 A of current flows from bus B through energy storage apparatus 4-6, and 40 A of current flows from the power converter 4-4 into bus A, thereby providing a total of 50 A of current to charge the vehicle battery 4-2.

FIG. 40C shows a system as in FIG. 40B, in which the power converter 4-4 is operated to transfer power in the reverse direction, such that power flows through power converter 4-4 from bus A to bus B, while charging the vehicle battery 4-2 with a lower amount of power. In this example, 20 A of current flows from bus A into the power converter 4-4, and 5 A of current flows out of power converter 4-4 to bus B. The 20 A of current supplied by bus B and the 5 A of current from the power converter 4-4 combine such that 25 A of current flows through the energy storage apparatus 4-6. As a result, 5 A of current is provided to charge the vehicle battery 4-2. Thus, by controlling the magnitude and/or direction of the power flowing through power converter 4-4, the effective impedance of energy storage apparatus 4-6 and/or the amount of power provided to charge/discharge vehicle battery 4-2 and/or energy storage apparatus 6 may be controlled. Such control may be effected by controller 4-5 based on any suitable control algorithm based on factors such as the state of the vehicle (e.g., the amount of power available on bus A and/or bus B), future predicted driving conditions, or any other suitable information.

In some embodiments, an electronically controlled cutoff switch 4-11 may be connected in series with the energy storage apparatus 4-6 to stop the flow of current therethrough. The electronically controlled cutoff switch may be controlled by controller 5.

As discussed above, energy storage apparatus 6 may include one or more capacitors (e.g., supercapacitors). However, supercapacitors capable of storing a substantial amount of energy while providing a nominal +48V are very large and expensive. To provide a nominal 48V, a capacitor that can handle as much as 60V may be required, increasing the size and cost even further.

Advantages of connecting the supercapacitors across bus A and bus B may include reducing the number of cells in the supercapacitor, which reduces cost and size, and eases the impedance requirements of the capacitor, because the impedance of a supercapacitor may be proportional to the number of series cells. The result is more efficient charging and discharging of the supercapacitor. Inrush current may be avoided using such a topology, as power converter 4-4 may control the initial charging of the supercapacitors using a controlled current.

In some embodiments, controller 4-5 may use a multi-level hysteretic control algorithm to control power converter 4-4. The multi-level hysteretic control described herein maximizes the energy stored in the supercapacitors, minimizes power lost in the power converter 4-4 by only using it when necessary and keeps the current of the vehicle battery 4-2 as low as possible. Storing energy in the supercapacitors is more efficient than passing it through the power converter 4 twice to store energy temporarily in the vehicle battery.

The hysteretic control method described herein uses two levels of hysteretic control with quasi-proportional gain above the second level. Being fundamentally hysteretic, it is robust, stable and insensitive to parameter changes like supercapacitor capacitance and equivalent series resistance (ESR), battery voltage, etc.

The hysteretic control method does not require any real-time knowledge of the instantaneous power requirements of the loads on bus B. It can therefore operate standalone without any means of communications with the rest of the system other than via the DC bus voltage. Additional information such as road condition, vehicle speed, alternator setpoint and active suspension setting (e.g. "eco," "comfort," "sport") can be used to adjust the various setpoints of the hysteretic controller for even better efficiency.

FIG. 41 illustrates an embodiment in which multi-level hysteretic current control of the power converter 4-4 is performed in an embodiment in which energy storage apparatus 4-6 is connected across bus A and bus B, as shown in FIGS. 38, 40B and 40C. The total current in the vehicle battery 4-2 is the sum of the current through the power converter 4-6 plus the current through the energy storage apparatus 4-6. The graph of FIG. 41 shows the current through the power converter 4-4 (Iconverter) as a function of the DC bus voltage (Vbus) and the direction of change of the bus voltage. It uses multiple voltage thresholds: Vhh, Vhi, (Vhi-Hysteresis), (Vlo+Hysteresis), Vlo, and Vll as well as two sliding thresholds: Vmax and Vmin to control the current optimally within the limits +Iactive_max and −Iregen_max.

For a majority of the time, the bus voltage remains between Vhh and VII and the converter current is limited to +Iactive and −Iregen. For example, when the bus voltage rises above Vhi, the converter regenerates Iregen current to the battery and it keeps draining the bus and regenerating until the bus voltage falls below (Vhi−Hysteresis) at which point the converter current goes to zero. It operates similarly when the bus voltage falls below Vlo by pulling Iactive current from the battery.

However, when the Iregen current is already flowing into the battery and the bus voltage continues to rise and goes above Vhh, the converter increases the regenerative current, up to the limit Iregen_max, in direct proportion to (Vbus−Vhh). A similar overload region exists for bus voltages below Vll. In these overload regions, the highest or lowest voltage reached become the sliding setpoint Vmax and Vmin, respectively. The highest current magnitude reached is held until the bus voltage either falls below (Vmax−Hysteresis) or rises above (Vmin+Hysteresis) at which point, the current returns to Iregen or Iactive level, respectively. The converter then returns to normal, non-overload, operation as described above. All of the current set points and voltage thresholds can be adjusted (within bounds) to optimize the applications. Though only one hysteresis is shown in FIG. 41, it is possible to have as many as four different hysteresis values for the four regions: normal-active, normal-regeneration, overload-active, and overload-regen.

FIG. 42A-42F show examples of topologies including power converter 4 and energy storage apparatus 4-6. Any of the topologies described herein, or any other suitable topology, may be used.

FIG. 42A shows the supercapacitor string connected to bus B where the voltage compliance is large but the voltage across the string is also high. Such an embodiment may use a large number of cells (e.g., 4-20) in series at 2.5V/cell.

FIG. 42B shows the supercapacitor string on bus A in parallel with the vehicle battery 4-2 where the voltage compliance is defined by the vehicle alternator, battery and loads, and is therefore low, but the voltage across the string is also low. Such an embodiment may use 6 to 7 cells in series but the cells may have much larger capacitance and a lower Effective Series Resistance (ESR) than the embodiment of FIG. 42A.

FIG. 42C shows the supercapacitor string in series with the vehicle battery 4-2. This topology can have large voltage compliance but generally works in applications where the current in the supercapacitor string averages to zero. Otherwise uncorrected, the supercapacitor string voltage may drift toward zero or overvoltage. Also, the supercapacitors need to handle higher currents than the embodiment of FIG. 42A and the power converter 4-4 needs to handle the full peak power requirements of bus B.

FIG. 42D shows the supercapacitor string in series with the output of the DC/DC converter. This topology may work in applications in which the current in the supercapacitor string averages to zero.

FIG. 42E shows the supercapacitor string across the DC/DC converter between bus A and bus B. This topology is functionally similar to the topology of FIG. 42A, but it reduces the number of cells needed to meet the voltage requirements from 4-20 to 4-16 by referencing the supercapacitor string to bus A rather than chassis ground, reducing the string voltage requirement by at least 10 V (the minimum battery voltage.)

The topology of FIG. 42F solves the average supercapacitor current limitation of the embodiment of FIG. 42D by adding an auxiliary DC/DC converter 4-81 to ensure that the supercapacitor string current averages to zero even when the DC bus current does not average to zero.

Other combinations of these embodiments, such as adding the auxiliary DC/DC converter 4-81 to the embodiment of FIG. 42C, are also possible. The best topology for a specific application primarily depends on the cost of supercapacitors as compared to power electronics and on the installation space available. Additionally, alternative energy storage devices than supercapacitors such as batteries may be used in the same or similar configurations as those disclosed here.

FIG. 43A-43F show topologies similar to those of FIGS. 42A-42F, respectively, with batteries substituted in place of supercapacitors.

FIG. 43G shows a topology having dual power converters 4-4A and 4-4B. Power converter 4A is connected between bus A and bus B. Power converter 4-4B is connected in series with an energy storage apparatus 4-6, between energy storage apparatus 4-6 and bus B. In some embodiments, power converter 4-4A and 4-4B may allow independently controlling the power drawn from energy storage apparatus 4-6 and vehicle battery 4-2.

FIG. 43H shows a dual input or "split" converter topology in which the power converter 4-4 has three terminals: a terminal connected to bus A, a terminal connected to bus B, and a terminal connected to energy storage apparatus 4-6. The second terminal of energy storage apparatus 6 may be connected to ground.

FIG. 43I shows a split converter topology similar to the embodiment of FIG. 43H in which a third energy storage apparatus (e.g., a supercapacitor) is connected to bus B. The second terminal of the third energy storage apparatus may be connected to ground.

FIG. 43J shows a split converter topology similar to the embodiment of FIG. 43H in which the third energy storage apparatus is connected across bus B and the positive terminal of the energy storage apparatus 4-6.

One of the advantages of the dual input or "split" converter topology over using two separate converters is the size, cost and complexity savings of only having a single set of converter output components, such as low impedance capacitors. The split converter topology also allows the switching devices in the two input sections to be switched out of phase resulting in lower ripple current handling requirements for the low impedance output capacitors.

FIGS. 43K-43N show various dual converter topologies in which one or more energy storage apparatus in addition to the vehicle battery 4-2 may be connected in various configurations.

In the embodiments described herein, capacitors may be replaced by batteries, where suitable, and batteries may be replaced by supercapacitors, where suitable.

As discussed above, the voltage of bus B may be allowed to fluctuate in response to loads and/or power generated by systems coupled to bus B. The voltage of bus B may be indicative of the state of the vehicle as it relates to the amount of energy available in an energy storage apparatus 6 coupled to bus B. In some embodiments, control of one or more systems coupled to bus B and/or control of the power converter 4 may be performed based on the voltage of bus B. For example, if the voltage of bus B drops, it may indicate a state of low energy availability in the energy storage apparatus 6. One or more systems coupled to bus B may measure the voltage of bus B, and may determine that the vehicle is in a state of low energy availability on bus B. In response, one or more system(s) coupled to bus B that are not safety-critical may reduce the amount of power that they may draw from bus B. For example, systems such as a power steering system or active suspension system may reduce the amount of power that the can draw from bus B. When the voltage on bus B rises, indicating that the amount of energy available in energy storage apparatus 4-6 has risen to an acceptable level, such systems may resume drawing power from the bus B at a level typical of a state of normal or high energy availability.

In some embodiments, such a technique may be applied to control of an active suspension system. As discussed above, an active suspension system of a vehicle may be powered by a voltage bus (e.g., bus B) that is controllably isolated from a primary vehicle voltage bus (e.g., bus A) to facilitate mitigating impact on the vehicle systems connected to the primary voltage bus (e.g., bus A) as the suspension system's demand for power can vary substantially based on speed, road conditions, suspension performance goals, and the like. As demand on bus B varies, the voltage level of bus B may also vary, generally with the voltage level increasing when demand is low or in the case of regenerative systems when regeneration levels are high, and voltage decreasing when demand is high. By monitoring the voltage level of bus B, it may be possible to determine, or at least approximate, the state of the vehicle as it relates to the energy available on bus B. The energy available on bus B may be affected by the load and/or regenerated power produced by system(s) coupled to bus B. For example, the energy available on bus B may reflect suspension system conditions. As noted above, a decreased voltage level on bus B may indicate a high demand for power by the suspension system to respond to wheel events. This information may in turn allow a determination, or approximation, of other information about the vehicle; for example, a high demand for power due to wheel events may in turn indicate that the road surface is rough or sharply uneven, that the driver is engaging in driving behavior that tends to result in such wheel events, and the like.

As discussed above, an active suspension system may have an active suspension actuator 4-22 controlled by a corner controller 4-28 for each wheel of the vehicle, as illustrated in FIGS. 44A and 44B. FIG. 44A shows a block diagram of active suspension actuator 4-22 and corner controller 4-28. Active suspension actuator 4-22 may be mechanically coupled to the wheel of a vehicle and may dampen wheel movements. Active suspension actuator 4-22 may actively control wheel movements, drawing power from bus B to drive motor 4-24 (e.g., optionally a three-phase brushless motor) which actuates pump 4-26 to displace and/or change the pressure of fluid in a hydraulic damper mechanically connected to the wheel. In response to wheel and/or vehicle movement, active suspension actuator 24-2 may generate power based on the movement and/or change of pressure of fluid in the damper, thereby actuating pump 4-26 and allowing motor 4-24 to produce regenerated power which may be supplied to bus B. Corner controller 24-8 controls the active suspension actuator 4-22, and may control the amount of power applied from bus B to the active suspension actuator 4-22 and/or the amount of power provided from active suspension actuator 4-22 to bus B. Corner controller 4-28 may include a DC/AC inverter 4-32 that converts the DC voltage at bus B into an AC voltage to drive motor 4-24. DC/AC inverter 4-32 may be bidirectional, and may enable providing power from motor 4-24 to bus B when motor 4-24 is operated as a generator. In this sense, motor 4-24 may be an electric machine capable of operating either as a motor or a generator, depending on the manner in which is controlled by corner controller 4-28.

Corner controller 4-28 includes a controller 4-30 that determines how to control the DC/AC inverter 4-32 and/or the active suspension actuator 4-22. Controller 4-30 may receive information from one or more sensors of the active suspension actuator 4-4-22, the motor 4-24 and/or pump 4-26 regarding an operating parameter of the active suspension actuator 4-22. Such information may include information regarding movement of the damper, force on the damper, hydraulic pressure of the damper, motor speed of motor 4-24, etc. In some embodiments, controller 4-30 may receive information from a communications bus 4-34 from another corner controller 4-28 and/or an optional centralized vehicle dynamics processor (e.g., which may be implemented by controller 4-5, for example). Communications bus 4-34 may be the same as or different from communications bus 4-7 (discussed above in connection with FIG. 1). Controller 4-30 may measure the voltage of bus B and/or the rate of change of the voltage of bus B to obtain information regarding the state of the vehicle as it relates to the energy available from bus B. Controller 4-30 may process any or all of such information and determine how to control active suspension actuator 4-22 and/or DC/AC inverter 4-32. For example, corner controller 4-28 may "throttle" power to the active suspension actuator 4-22 by reducing power and/or a maximum power of the active suspension actuator 4-22 based upon the voltage of bus B falling below a threshold and/or the rate of change of the voltage on bus B falling below a threshold (e.g., decreasing quickly). When the voltage recovers, corner controller 4-28 may throttle power to the active suspension actuator 4-22 by increasing power and/or a maximum power of the active suspension actuator 4-22 based upon the voltage of bus B rising above a threshold and/or the rate of change of the voltage on bus B rising above a threshold (e.g., increasing quickly enough to signal a recovery).

In some embodiments, bus B may transfer energy among corner controllers 4-28 and power converter 4-4, as can be seen in the exemplary system diagram of FIG. 44B. Each corner controller 4-28 may independently monitor bus B to determine the overall system conditions for taking appropriate action based on these system conditions, as well as monitoring any wheel events being experienced locally for the wheel 4-25 with which the corner controller 4-28 is associated. Alternatively or additionally, controller 4-5 may centrally monitor bus B to determine the overall system conditions and may send commands to one or more corner controllers 4-28. In this sense, control of active suspension actuators 4-22 may be distributed (e.g., performed at the corner controllers 4-28) or centralized (e.g., performed at controller 4-5), or a combination of distributed control and centralized control may be used.

FIG. 45 shows exemplary operating regions for voltages on bus B, according to some embodiments, which may indicate different operating conditions for the systems connected to bus B (e.g., a corner controller, or a system other than an active suspension system). Exemplary system conditions that may be determined from the voltage of bus B are shown in FIG. 45, which shows the voltage range of bus B divided into operating condition ranges by various thresholds. In some embodiments, a corner controller 4-28 and/or controller 4-5 may measure the voltage on bus B and determine an operating condition based upon one or more thresholds.

In the example of FIG. 45, when the voltage of bus B is below the threshold UV, the bus may be in an operating condition range associated with an under voltage shutdown operating condition. When the voltage of bus B is between the threshold UV and the threshold V Low, the bus may be in an operating condition range associated with a fault handling and recovery operating condition. When the voltage of bus B is between threshold V Low and the threshold VNom, the bus may be in an operating condition range associated with a bias low energy operating condition. When the voltage of bus B is between threshold VNom and VHigh the bus may be in an operating condition range associated with a net regeneration operating condition. When the voltage of bus B is between the threshold VHigh and the threshold OV, a bus may be in an operating condition range associated with a load dump operating condition. However, the techniques described herein are not limited to the operating modes and/or ranges shown in FIG. 45, as other suitable operating ranges or conditions may be used.

As illustrated in FIG. 45, normal operating range conditions may include net regeneration and bias low energy. When the voltage level of bus B signals that the system is in a state of net regeneration, a suspension control system coupled to bus B may measure the voltage to determine the state of the bus B, and upon determining that the state is net regeneration, may activate functions such as supplying power to bus A. A bias low energy condition may indicate to an active suspension system that available energy reserves are being taxed, so preliminary measures to conserve energy consumption may be activated. In an example of preliminary energy consumption mitigation measures, wheel event response thresholds may be biased toward reducing energy demand. Alternatively or additionally, when a bias low energy system condition is detected, energy may be requested from bus A by power converter 4 to supplement the power available from the suspension system. A voltage above a normal operating range may indicate a load dump condition. This may be indicative of the suspension system or regenerative braking system regenerating excess energy to such a great degree that it cannot be passed in full or in part to bus A, so that there is a need for at least a portion of the energy to be shunted off. A suspension system controller, such as a corner controller 4-28 for a vehicle wheel 4-25, may detect this system condition and respond accordingly to reduce the amount of energy that is regenerated by the controller's active suspension actuator 4-22. One such response may be to dissipate energy in the windings of an electric motor 4-24 in the active suspension actuator 4-22. Operating states that are below the normal operating range may include fault handling and recovery states, and an under-voltage shutdown state. In some embodiments, operation in a fault handling and recovery state may signal to the individual corner controllers 4-28 to take actions to substantially reduce energy demand. To the extent that each corner controller 4-28 may be experiencing different wheel events, stored energy states, and voltage conditions, the actions taken by each corner controller 4-28 may vary, and in embodiments different corner controllers 4-28 may operate in different operating states at any given time. An under-voltage shutdown condition may be indicative of an unrecoverable condition in the system (e.g. a loss of vehicle power), a fault in one of the independent corner controllers, or a more serious problem with the vehicle (e.g. a wheel has come off) and the like. The under voltage shutdown state may cause the corner controller 28 to control the active suspension actuator 22 to operate solely as a passive or semi-active damper, rather than a fully active system, in some embodiments.

As noted above, the DC voltage level of bus B may define system conditions. It may also define the energy capacity of the system. By monitoring the voltage of bus B, each system coupled to bus B, such as corner controller 4-28 and/or controller 4-5, can be informed of how much energy is available for responding to wheel events and maneuvers. Using bus B to communicate suspension system and/or vehicle energy system capacity may also provide safety advantages over separated power and communication buses. By using voltage levels of bus B to signify operational conditions and power capacity, each corner controller 4-28 can operate without concern that a corner controller 4-28 is missing important commands that are being provided over a separate communication bus to the other corner controllers. In addition, it may either eliminate the need for a signaling bus (which may include additional wiring), or reduce the communication bus bandwidth requirements.

By providing a common bus B to all, or a plurality of, the corner controllers 4-28, each corner controller 4-28 can be safely decoupled from others that may experience a fault. In an example, if a corner controller 4-28 experiences a fault that causes the power bus voltage level to be substantially reduced, the other corner controllers 4-28 may sense the reduced power bus voltage as an indication of a problematic system condition and take appropriate measures to avoid safety issues. Likewise, with each corner controller capable of operating independently as well as being tolerant of complete power failure, even under severe power supply malfunction, the corner controllers 4-28 still take appropriate action to ensure acceptable suspension operation.

As discussed above, a plurality of systems may be coupled to bus B, as shown in FIG. 35. In some embodiments, each system coupled to bus B may be assigned a priority level. A system that relates to vehicle safety (e.g., anti-lock braking system) may be given a high-priority, and less critical systems may be given a lower priority. The systems coupled to bus B may have thresholds that are compared with the voltage of bus B and/or the rate of change of the voltage of bus B for determining a suitable state of operation based on the available energy. A load may reduce the power that it demands from bus B when the voltage falls below a threshold for example. In some embodiments, the systems with a high priority level may have voltage thresholds set lower than that of a lower priority system. Accordingly, the high-priority systems may draw power under conditions of low energy availability, while low-priority systems may not draw power or may draw reduced power during periods of low energy availability, and may wait until the bus voltage recovers to higher level. The use of different priority levels may facilitate making sure energy is available to high-priority systems.

A loosely regulated bus B can facilitate an effective energy storage architecture. Energy storage apparatus 4-6 may be coupled to bus B, and the bus voltage may define the amount of available energy in energy storage apparatus 4-6. For example, by reading the voltage level of bus B, each corner controller 4-28 of an active suspension system may determine the amount of energy stored in energy storage apparatus 4-6 and can adapt suspension control dynamics based on this knowledge. By way of illustration, for a DC bus that is allowed to fluctuate between 38V and 50V, an energy storage apparatus including a capacitor or supercapacitor with a total storage capacitance C, the amount of available energy (neglecting losses) is:

$$\text{Energy}=\tfrac{1}{2}*C*(50)2-\tfrac{1}{2}*C*(38)\hat{}2=528*C$$

Using this calculation or similar calculations, the corner controllers 4-28 are able to adapt algorithms to take into account the limited storage capacity, along with the static current capacity of a central power converter to supply continuous energy.

In some embodiments, the operating thresholds of bus B (e.g., the operating thresholds illustrated in FIG. 45) may be dynamically updated based on the state of the vehicle or other information. For example, during starting of the vehicle, the voltage thresholds may be allowed to go lower.

The terms “passive,” “semi-active” and “active” in relation to a suspension are described as follows. A passive suspension (e.g., a damper) produces damping forces that are in the opposite direction as the velocity of the damper, and cannot produce a force in the same direction as the velocity of the damper. A semi-active suspension actuator may be controlled to change the amount of damping force that is produced. However, as with a passive suspension, a semi-active suspension actuator produces damping forces that are in the opposite direction as the velocity of the damper, and cannot produce a force in the same direction as the velocity of the damper. An active suspension actuator may produce forces on the actuator that are in the same direction or the opposite direction as the velocity of the actuator. In this sense, an active suspension actuator may operate in all four quadrants of a force-velocity plot. A passive or semi-active suspension actuator may operate in only two quadrants of a force-velocity plot for the damper.

The term “vehicle” as used herein refers to any type of moving vehicle such as. a 4-wheeled vehicle (e.g., an automobile, truck, sport-utility vehicle etc.) and vehicles with more or less than four wheels (including motorcycles, light trucks, vans, commercial trucks, cargo trailers, trains, boats, multi-wheeled and tracked military vehicles, and other moving vehicles). The techniques described herein may be applied to electric vehicles, hybrid vehicles, combustion-driven vehicles, or any other suitable type of vehicle.

The embodiments described herein may be beneficially combined with vehicle architectures such as hybrid electric vehicles, plugin hybrid electric vehicles, battery powered electric vehicles. Suitable loads may also include drive by wire systems, brake force amplification, brake assist and boost, electric AC compressors, blowers, hydraulic fuel water and vacuum pumps, start/stop functions, roll stabilization, audio system, electric radiator fan, window defroster, and active steering systems.

In some embodiments the main electrical source for the vehicle (such as a vehicle alternator) may be electrically connected to bus B. In such an embodiment, the power converter (e.g., DC/DC converter) may be disposed to convert energy from bus B to bus A, however in some cases a bidirectional converter may be desirable. In such an embodiment, the alternator charging algorithm or control system may be configured to allow for voltage bus fluctuations in order to utilize voltage bus signaling, energy storage capability, and other features of the system. In some cases the alternator may be connected to bus B and provide additional energy during braking events, such as on a mild hybrid vehicle. Alternator controllers and ancillary controllable loads may be used to prevent transient overvoltage conditions on bus B if the load on the bus suddenly drops when the alternator is in a high current output state.

In many embodiments the bus A and bus B may share a common ground. However, in some embodiments the power converter (e.g., DC/DC converter) may galvanically isolate bus B from bus A. Such a system may be accomplished with a transformer-based DC/DC converter. In some cases digital communication may be isolated as well, such as through optoisolators.

Additional Aspects

In some embodiments, techniques described herein may be carried out using one or more computing devices. Embodiments are not limited to operating with any particular type of computing device.

FIG. 46 is a block diagram of an illustrative computing device 4-1000 that may be used to implement a controller (e.g., controller 4-5 and/or 4-30) as described herein. Alternatively or additionally, a controller may be implemented by analog or digital circuitry.

Computing device 4-1000 may include one or more processors 4-1001 and one or more tangible, non-transitory computer-readable storage media (e.g., memory 4-1003). Memory 4-1003 may store, in a tangible non-transitory computer-recordable medium, computer program instructions that, when executed, implement any of the above-described functionality. Processor(s) 4-1001 may be coupled to memory 4-1003 and may execute such computer program instructions to cause the functionality to be realized and performed.

Computing device 4-1000 may also include a network input/output (I/O) interface 4-1005 via which the computing device may communicate with other computing devices (e.g., over a network), and may also include one or more user I/O interfaces 4-1007, via which the computing device may provide output to and receive input from a user.

The above-described embodiments can be implemented in any of numerous ways. For example, the embodiments may be implemented using hardware, software or a combination thereof. When implemented in software, the software code can be executed on any suitable processor (e.g., a microprocessor) or collection of processors, whether provided in a single computing device or distributed among multiple computing devices. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments described herein comprises at least one computer-readable storage medium (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or other tangible, non-transitory computer-readable storage medium) encoded with a computer program (i.e., a plurality of executable instructions) that, when executed on one or more processors, performs the above-discussed functions of one or more embodiments. The computer-readable medium may be transportable such that the program stored thereon can be loaded onto any computing device to implement aspects of the techniques discussed herein. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as “first,” “second,” “third,” etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of “including,” “comprising,” or “having,” “containing,” “involving,” and variations thereof herein, is meant to encompass the items listed thereafter and equivalents thereof as well as additional items.

Contactless Sensing of Electric Generator Rotor Position Through a Diaphragm

In certain applications, an electric motor is used to provide torque and speed to a hydraulic pump to provide force and velocity to a hydraulic actuator, and conversely, the hydraulic pump may be used as a motor to be used to back-drive the electric motor as a generator to produce electricity from the force and velocity inputted into the actuator.

For reasons of performance and durability, these electric motors are of the BLDC type and may be mounted inside a housing, close coupled with the pump, where they may be encased in the working fluid under high pressure. In order to provide adequate hydraulic system performance, accurate control of the torque and speed of the BLDC motor is required, which may require a rotary position sensor for commutation. Although rotary position sensors for BLDC motor commutation/control currently exist, certain applications, such as the use in active suspension actuators or high performance aerospace actuators, for example, are particularly challenging due to the fact that the BLDC motor may be mounted inside a housing, where it is encased in the working fluid under high pressures.

An electric motor/generator may be applied in an active suspension system to work cooperatively with a hydraulic motor to control movement of a damper in a vehicle wheel suspension actuator. The electric generator may be coaxially disposed and close coupled with the hydraulic motor, and it may generate electricity in response to the rotation of the hydraulic motor, while also facilitating rotational control of the hydraulic motor by applying torque to deliver robust suspension performance over a wide range of speeds and accelerations. It may be desirable to precisely control the electric motor/generator. To achieve precise control, precise rotor position information may be needed. In particular, determining the position of the rotor relative to the stator (the windings) is important to precisely control currents passing through the windings based on the rotor position for commutation. To precisely and dynamically control the currents through the windings (depending on where the rotor is in its rotation, what direction it is turning, its velocity, and acceleration), a fairly precise reading of rotor position is required. To achieve precisely determining the rotor position, a sensor is used. By applying position determination algorithms that are described below, a low cost sensor (e.g. with accuracy of one degree) may be used. Rotor position may also be used for a variety of reasons other than that for commutation. For example, position may be used for determining fluid flow velocity from the coupled hydraulic motor. Also, the motor controller may be applied in an active suspension that senses wheel and body events through sensors, such as a position sensor or body accelerometer, etc., and senses the rotational position of the rotor with the position sensor and in response thereto sources energy from the energy source for use by the electric motor to control the active suspension. In embodiments the response to the position sensor comprises a vehicle dynamics algorithm that uses at least one of rotor velocity, active suspension actuator velocity, actuator position, actuator velocity, wheel velocity, wheel acceleration, and wheel position, wherein such value is calculated as a function of the rotor rotational position. Another such use of the rotary position sensor may be for the use in a hydraulic ripple cancellation algorithm; positive displacement hydraulic pumps and motors typically produce a pressure pulsation, or ripple, that is in relation to its rotational position. This pressure pulsation can produce undesirable noise and force pulsations in downstream actuators, etc. Since the profile of the pressure pulsation can be determined relative to the pump position, and hence the rotor and hence the source magnet position, it is possible for the controller to use an algorithm that can vary the motor current and hence the motor torque based upon the rotor position signal to counteract the pressure pulsations, thereby mitigating or reducing the pressure pulsations, reducing the hydraulic noise and improving the performance of the system.

In some configurations described herein, portions of the BLDC motor (or the complete BLDC motor) may be submerged in hydraulic fluid. This may present challenges to sensing a precise position of the rotor. Therefore, a magnetic target (source magnet) attached on the rotor shaft may be detected by a sensor disposed so that it is isolated from the hydraulic fluid. One such arrangement may include disposing a sensor on a dry side of a diaphragm that separates the fluid from the sensor. Because magnetic flux passes through various materials, such as a nylon, plastic or aluminum etc., it is possible to use such materials for a diaphragm so that the sensor can read the rotor position while keeping the sensor out of the fluid. While a low cost magnetic sensor may provide one-degree resolution with one to two degrees of linearity, which may be sufficient simply for determining rotor position, to precisely control the currents flowing through the windings, additional information about the rotor may be needed, such as acceleration of the rotor. One approach would be to use a more accurate sensor, although this increases costs and may not even be practical when the rotor is immersed in fluid. Therefore, a filter that correlates velocity with position may be utilized. The filter may perform notch filtering with interpolation of any filtered positions. By performing notch filtering, harmonics of the filtered frequency are also filtered out, thereby improving results. By using a combination of filtering, pattern sensing, and on-line auto-calibration, precise calibration steps during production or deployment are eliminated, thereby reducing cost, complexity, and service issues. Methods and systems of rotor position sensing may include magnetically sensing electric generator rotor position of a fluid immersed electric generator shaft through a diaphragm. Other methods and systems may include processing the sensed position data to determine rotor acceleration with a low-cost magnetic sensor. Other methods may include processing a series of sensor target detections with at least one of a derivative and integration filter and an algorithm that uses velocity over time to determine position and acceleration of the rotor. Other methods may include detecting the magnetic sensor target each time it passes proximal to the rotary position sensor, resulting in a series of detections that each represent a full rotation of the rotor and then detecting electric motor voltages and/or currents to determine a rotor velocity (as is known in the art of sensorless control of a BLDC motor by measuring the back EMF in the undriven coils to infer the rotor position), then processing the series of detections with an algorithm that calculates rotor position by integrating rotor velocity and resetting absolute position each time the magnetic sensor target passes the magnetic sensor.

By using a single target magnet attached to the center of the rotor shaft the magnet length and the associated 'back iron' of the rotor need only extend to the length required so as to achieve the maximum possible torque of the motor, not extending further so as to provide rotor magnet length for sensing with Hall effect sensors. This will reduce the required inertia of the rotor assembly as compared to prior art approaches. One such arrangement locates the target magnet about the center of the rotor shaft by a non-magnetic, light-weight component that not only allows for the flux of the target magnet to adequately penetrate the non-magnetic diaphragm, but also reduces the rotating inertia of the rotor assembly, thereby improving the responsiveness and performance of the system.

Figure 48A:
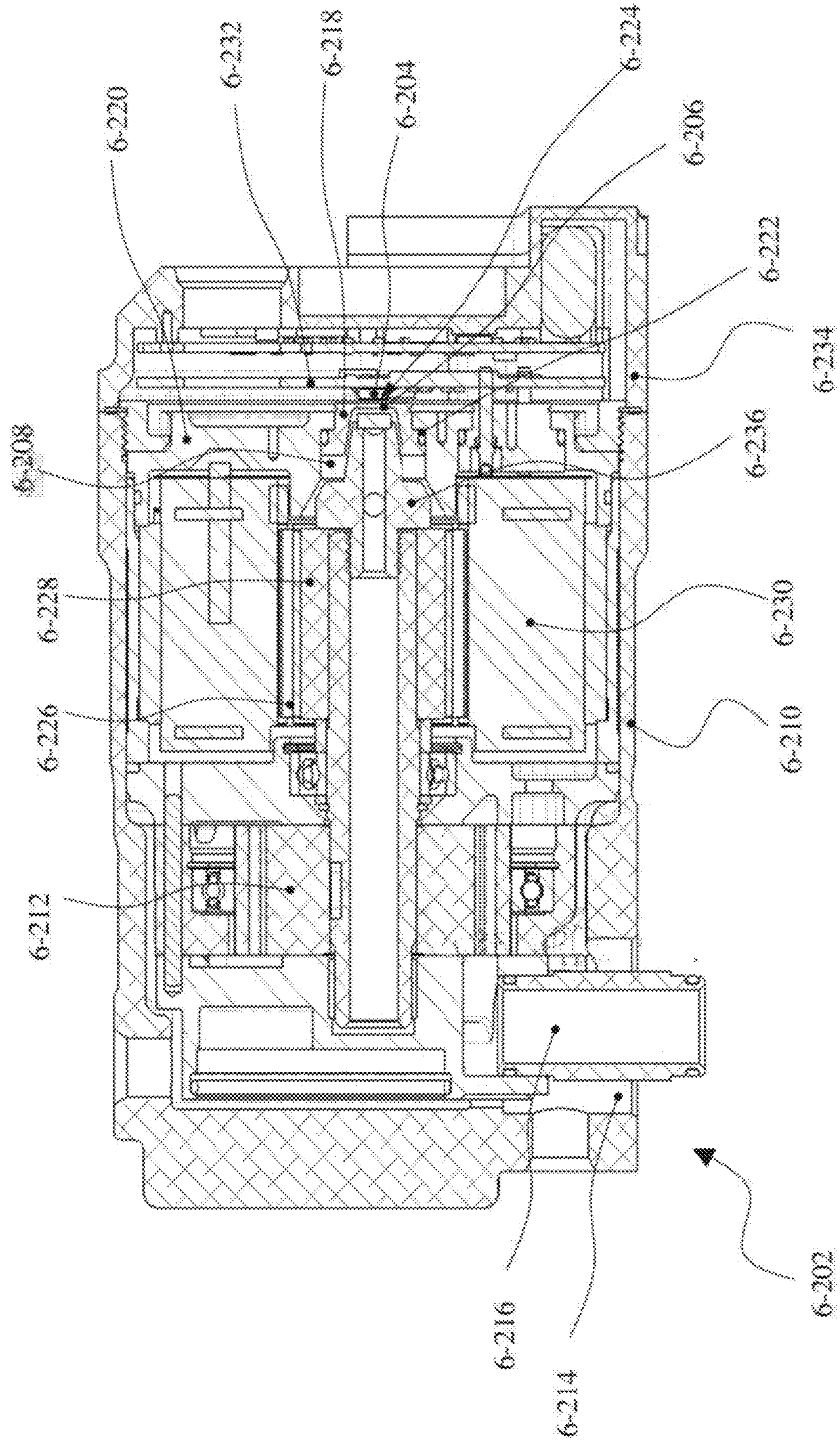
FIG. 48A is a cross section of an integrated pump motor and controller comprising a motor rotor contactless position sensor and controller assembly.
Figure 48B:
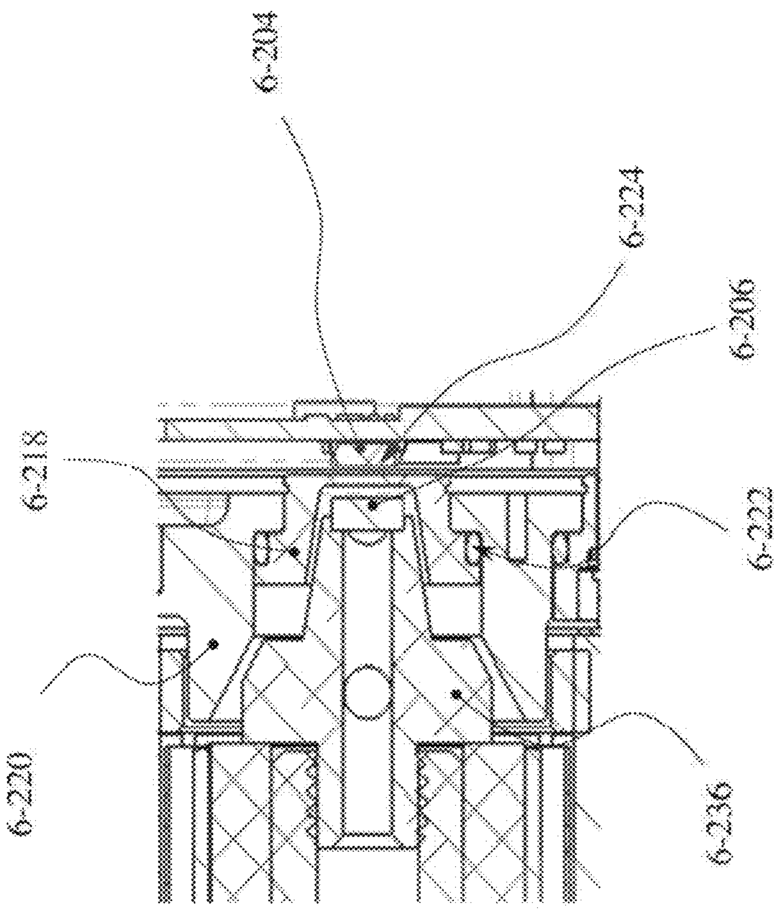
FIG. 48B is a detail view of the BLDC motor rotor position sensor, sensing magnet and diaphragm.

Turning now to the figures, FIGS. 48A and 48B the integrated pump motor and controller comprising a motor rotor position sensor and controller assembly 6-202 is shown. In the embodiment of FIG. 48A, a rotary position sensor 6-204, that measures the rotational position of a source magnet 6-206 and is protected from the working hydraulic fluid 6-208 under pressure that is contained within the housing 6-210, is shown. In the embodiment shown, the rotary position sensor may be a contactless type sensor, wherein the rotary position sensor comprises of an array of Hall effect sensors that are sensitive to magnetic flux in the axial direction relative to the axis of rotation of the source magnet and can sense the flux of a diametrically magnetized two-pole source magnet to determine absolute position and a relative position. The array of Hall effect sensors may be connected to an on-board microprocessor that can output the absolute position and a relative position signal as a digital output. This type of sensor allows for a degree of axial compliance of the sensor to the source magnets as well as for radial mis-alignment of the source magnet to the sensor without degrading sensor output performance, thereby allowing the sensor to operate under normal manufacturing tolerances for position and rotation. This type of sensor may comprise of an on-board temperature sensor that can correct for errors due to temperature variance.

In the embodiment shown, the first port 6-214 of the hydraulic pump 6-210 is in fluid connection with the fluid 6-208 that is contained within the housing 6-210 and the first fluid connection port 6-214. Therefore the pressure of the fluid 6-208 is at the same pressure as the first port of the pump 6-212. The second port of the hydraulic pump 6-212 is in fluid connection with the second fluid connection port 6-216. Depending upon the use of the integrated pump motor and controller assembly 6-202, the first and second fluid connection port may the inlet and outlet of the hydraulic pump, and vice versa, and the first and second fluid connection port may be at high or low pressure or vice versa. As such, the fluid 6-208 contained in the housing 6-210 could be at the maximum working pressure of the pump. In certain applications, such as active suspension actuators or aerospace actuators for example, this could reach 150 BAR or above. It is therefore necessary to protect the rotary position sensor 6-204 from such pressures. Although prior teaches that Hall effect sensors can be protected from working system pressure by encasing them in an EPOXY molding for example, this type of arrangement is typically suitable for low pressure systems, as it would be impractical to encapsulate the sensor deep enough inside of the EPOXY molding so that the strain induced upon the relatively week structure of EPOXY did not act upon the sensor resulting in its failure. As such, in the embodiment shown in FIG. 48A, the rotary position sensor 6-204 is protected from the pressure of the fluid 6-208 by a sensor shield or diaphragm 6-218. The sensor shield 6-218 is located within a bulkhead 6-220, in front of the sensor. The sensor shield 6-218 is exposed to the pressure of the hydraulic fluid 6-208. As shown in FIG. 48B, the sensor shield is sealed to the bulkhead by means of a hydraulic seal 6-222 (although an elastomeric seal is disclosed, a mechanical seal or adhesive etc. may be used, and the technology is not limited in this regard) such that the hydraulic fluid cannot pass by the sensor shield. The bulkhead 6-220 is sealed to the housing 6-210. A small air gap 6-224 exists between the sensor shield and the sensor so that any deflection of the sensor shield, due to the hydraulic fluid pressure acting on it, does not place any load onto the sensor itself. The sensor shield 6-218 is constructed of a non-magnetic material so that the magnetic fluxes of the source magnet 6-206 can pass through the sensor shield unimpeded. The sensor shield may be constructed from many types of non-magnetic material, such as aluminum or an engineered performance plastic etc., and the technology is not limited in this regard. An example of the selection criteria for the sensor shield material being that it is preferably able to contain the pressure of the fluid 6-208 without failure, it preferably does not deflect enough under pressure so that it will contact the rotary position sensor causing failure of the sensor, it preferably does not impede the magnetic flux of the source magnet so as to create sensing errors, and it is preferably cost effective for the application. The rotary position sensor 6-204 may be adequately shielded from other external magnetic fluxes such as that from the magnets 6-226 on the motor rotor 6-228 or from the motor stator windings 6-230, so as not impair its ability to accurately sense the position of the magnetic flux of the source magnet. In the embodiment shown the rotary position sensor 6-204 may be shielded from these disturbing magnetic fluxes by the bulkhead 6-220. The bulkhead 6-220 may be constructed from a material, such as steel, for example, that tends to prevent errant magnetic fluxes from passing through to the rotary position sensor.

In the embodiment shown in FIG. 48A, the rotary position sensor 6-204 is mounted directly on the motor controller printed circuit board (PCB) 6-232. The PCB 6-232 is supported in a controller housing 6-234 that forms a sensing compartment that is free from the working fluid 6-208. The source magnet 6-206 may be located in a magnet holder 6-236 that locates the source magnet coaxially with the BLDC motor rotational axis and the rotary position sensor axis, and in close axial proximity to the sensor shield 6-218. The source magnet and magnet holder are operatively connected to the BLDC motor rotor 6-228. In the embodiment shown the magnet holder 6-236 is constructed of a non-magnetic material so as not to disturb the magnetic flux of the source magnet 6-206. In the highly dynamic application of an active suspension actuator, where there are rapid rotational accelerations and reversals of the motor rotor it is preferable to reduce the inertia of the rotating components and for this reason the magnet holder may be constructed of a light weight, non-magnetic material, such as aluminum, or an engineered performance plastic, etc.

Figure 49B:
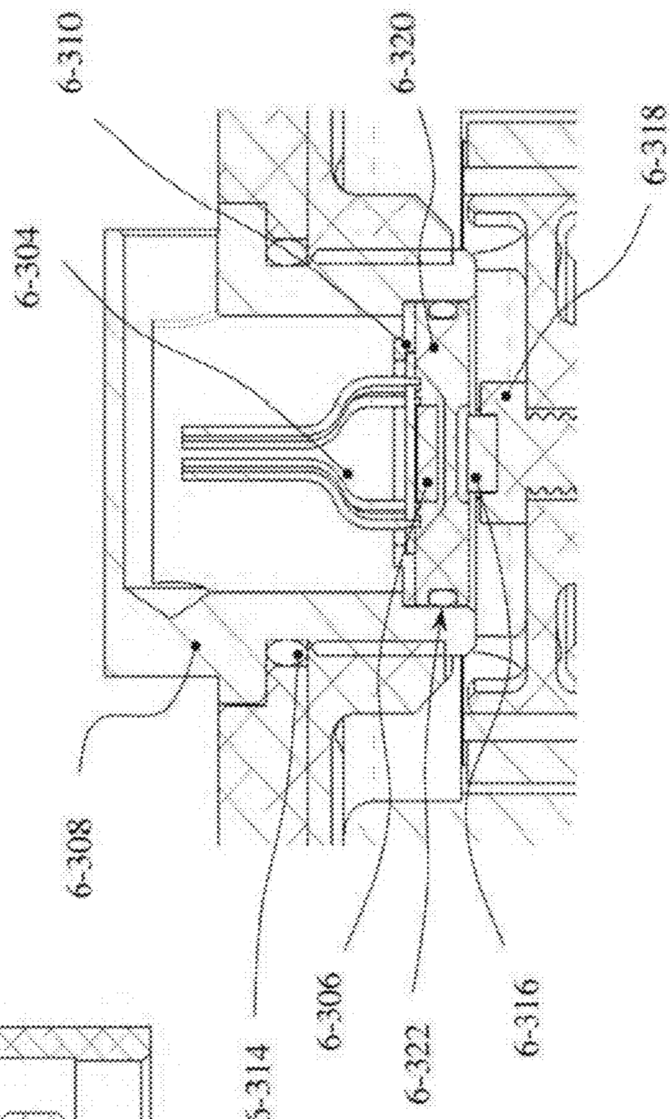
FIG. 49B is a detail view of the alternate embodiment of the BLDC motor rotor position sensor, sensing magnet and diaphragm.
Figure 49A:
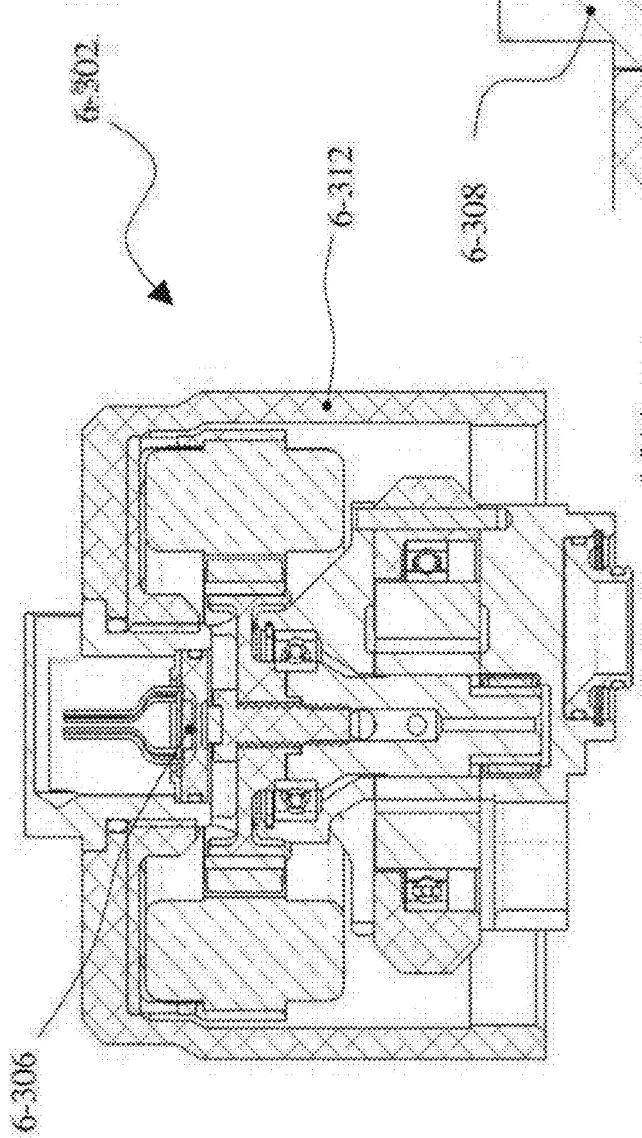
FIG. 49A is a cross section of an alternate embodiment of a hydraulic pump, BLDC motor containing a motor rotor position sensor and controller assembly.

In FIG. 49A an alternative embodiment of an integrated pump motor controller 6-302 is shown. This embodiment is similar to that of the embodiment of FIG. 48A with the exception that the rotary position sensor is mounted remotely from the motor controller PCB, and the sensor is electrically connected to the motor controller via wires 6-304. This arrangement may be advantageous when locating the motor controller in the proximity of the rotary position sensor and source magnet is not practical.

Referring to FIGS. 49A and 49B, a rotary position sensor 6-306 is located in a sensor body 6-308 via a sensor holder 6-310. The sensor body and sensor are held in rigid connection to the housing 6-312, and there is a seal 6-314 between the housing and the sensor body. The sensor body is constructed of a magnetic material (such as steel for example) so as to shield the sensor from external unwanted magnetic fluxes (from the BLDC motor rotor magnets or from the stator windings for example) that may degrade the sensor accuracy. In the embodiment shown, the sensor is located coaxially with the rotational axis of the BLDC motor rotor axis. A source magnet 6-316 is located in a magnet holder 6-318 that locates the source magnet coaxially with the BLDC motor rotational axis and the sensor axis, and in close axial proximity to a sensor shield 6-320. The source magnet and magnet holder are operatively connected to the BLDC motor rotor. The sensor shield is constructed so that it has a thin wall section that allows the face of the source magnet to be located close to the working face of the sensor so as to provide sufficient magnetic flux strength to penetrate the sensor so as to provide accurate position signal. The sensor shield 6-320 is exposed to the pressure of the ambient hydraulic fluid. As shown in FIG. 49B, the sensor shield is sealed to the bulkhead by means of a hydraulic seal 6-322 (although an elastomeric seal is disclosed, a mechanical seal or adhesive etc. could be used, and the technology is not limited in this regard) such that the hydraulic fluid cannot pass by the sensor shield. A small air gap exists between the sensor shield and the sensor so that any deflection of the sensor shield, due to the hydraulic fluid pressure acting on it, does not place a load onto the sensor itself. The sensor shield is constructed of a non-magnetic material so that the magnetic fluxes of the source magnet can pass through the sensor shield unimpeded.

The source magnet holder 6-318 is constructed of a low density, non-magnetic material, such as aluminum or an engineered performance plastic etc. so as not to degrade the source magnetic flux strength and to reduce rotational inertia. The sensor wires 6-304 are sealed to the sensor body (by means of a hydraulic seal, mechanical seal, or adhesive etc.) so as to protect the rotary position sensor from the environment.

Figure 50:
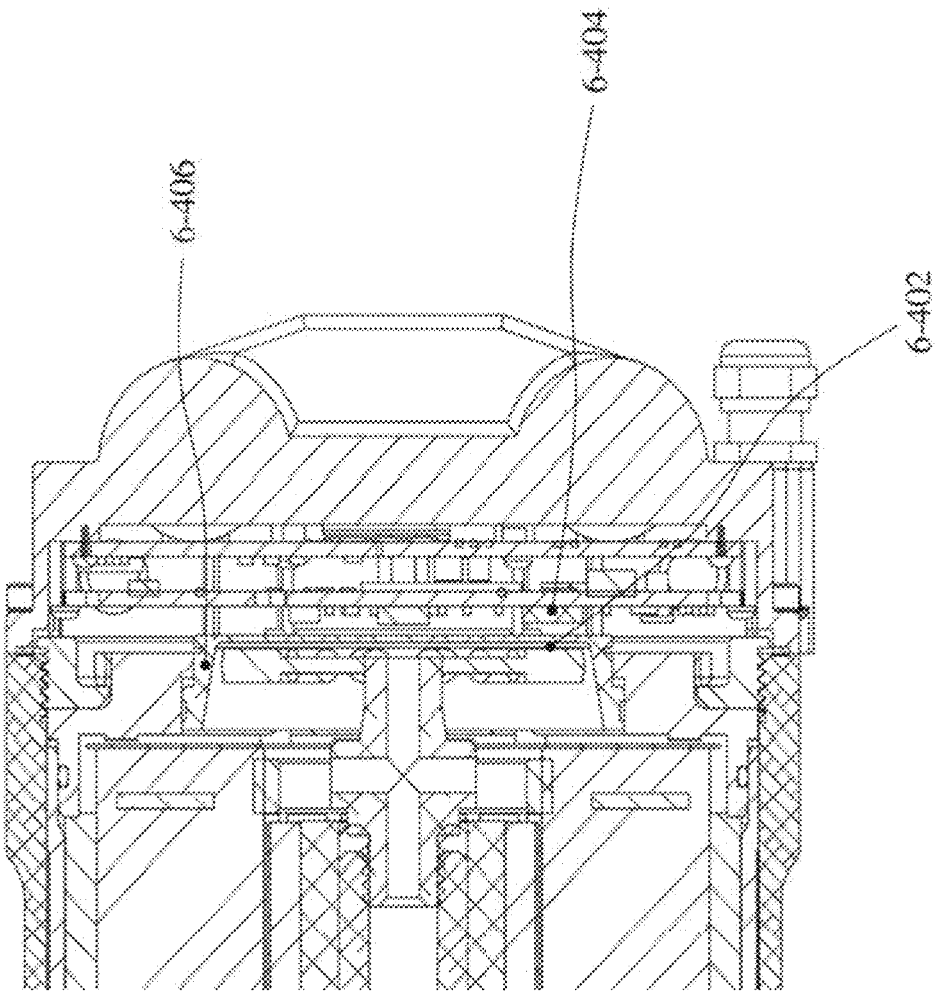
FIG. 50 is a cross section of the integrated pump motor and controller comprising a motor rotor position sensor and controller assembly using an annular type source magnet.

In an alternative embodiment as shown in FIG. 50 the source magnet 6-402 is of an annular type and the rotary position sensor 6-404 is mounted eccentrically to the rotor rotational axis and a and senses the flux of the source magnet 6-402 through the non-magnetic sensor shield 6-406. The functioning and arrangement of this configuration is similar to that as disclosed in the embodiments of FIGS. 48A-48B and 49A-49B. This arrangement may be advantageous by offering finer sensing resolution without a significant increase in cost due to the increased number of poles in the annular source magnet.

In an arrangement similar to the embodiment of the Hall effect rotary position sensor shown in FIG. 50, an alternative embodiment is to use an optical rotary position sensor that measures the rotational position of a reflective disc which is protected from the working hydraulic fluid under pressure in a similar manner to that described in the embodiment of FIG. 50, wherein the optical rotary position sensor comprises of a light transmitter/receiver and a reflective disc.

In this embodiment the Hall effect rotary position sensor is replaced by a light transmitter/receiver is mounted onto the controller PCB located off-axis with the rotational axis of the BLDC motor. A sensor shield is located in front of the light transmitter and receiver and is exposed to the hydraulic fluid under pressure in the housing. The sensor shield is sealed such that the hydraulic fluid does not enter the sensor cavity. The sensor shield is constructed of an optically clear material such as an engineered plastic or glass etc., so that the light source can pass through the sensor shield unimpeded. A small air gap exists between the sensor shield and the light transmitter and receiver so that any deflection of the sensor shield, due to the hydraulic fluid pressure acting on it, does not place a load onto the light transmitter and receiver itself. The annular type source magnet as shown in the earlier embodiment FIG. 50 is replaced in this embodiment by reflective disc that is is drivingly connected to, and coaxial with, the BLDC motor, and that is located near the light transmitter and receiver so that light emitted from the light transmitter is reflected back to the light receiver via the optically clear sensor shield.

The reflective disc may contain markings so as to produce a reflected light signal as the disc rotates; the light transmitter receiver then reads this signal to determine the BLDC motor position. From this position motor speed and acceleration can also be determined. The wavelength of light source used is such it can pass through the sensor shield, the oil within the valve and any contaminants contained within the oil, unimpeded, so that the light receiver can adequately read the light signal reflected from the reflective disc.

Although the embodiments of FIGS. 48A-48B, 49A-49B and 50 refer to an electric motor rotary position sensor for use in certain types integrated electric motors and hydraulic pumps for use in high performance actuators, these embodiments can also be incorporated into any electric motor-hydraulic pump/motor arrangement whereby the electric motor is encased in the working fluid (as in compact hydroelectric power packs etc.), and the inventive methods and systems are not limited in this regard.

Although the embodiments show the use of a rotary Hall effect position sensor and optical rotary position sensor, various other types of rotary position sensor, such as encoders, potentiometers, fiber optic and resolvers etc. may be accommodated in a similar manner, for example the Hall effect rotary position sensor could be replace by a metal detector and the source magnet could be replaced by a an element that is adapted to be detected thru the non-metallic sensor shield or the rotary position sensor could be a radio frequency detector and the sensor target be adapted detectable by the sensor and as such, the patent is not limited in this regard.

As sensor technology progresses, it may be possible to use a rotary position sensor that can withstand a high fluid pressure, temperature environment with external magnetic fields, and as such could be incorporated to sense the rotational position of a suitable sensor target, and the patent is not limited in this regard.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Active Adaptive Hydraulic Ripple Cancellation

Some aspects relate to a system and feed-forward control method of electronically attenuating pressure ripple in a positive displacement pump/motor. Other aspects relate to a method of adapting a model based feed-forward control on the basis of output sensor information.

Figure 51:
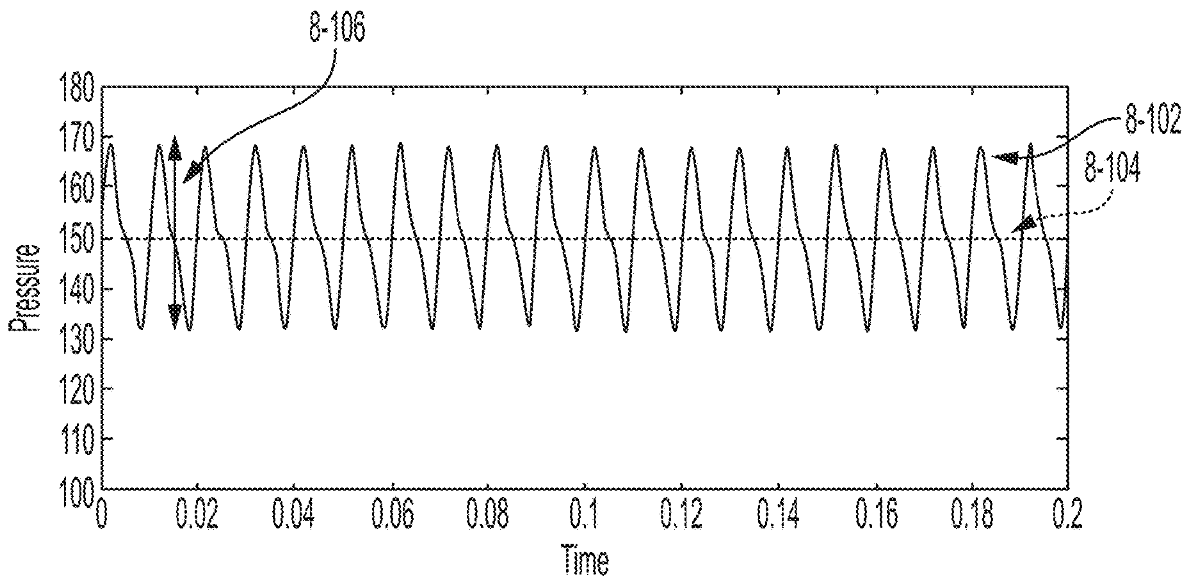
FIG. 51 is a representative plot of hydraulic pump/motor pressure ripple about a nominal average pressure under constant electric motor/generator torque.

Regarding FIG. 51, a representative plot of steady state pressure ripple in the time domain is shown for a hydraulic pump/motor operating at constant frequency under a constant torque application. A generated pressure differential signal 8-102 fluctuates in time about a mean pressure differential 8-104 which is substantially constant throughout time. The peak-to-peak amplitude 8-106 of this fluctuating pressure differential signal 8-102 is substantially consistent throughout time as the geometric pattern of the hydraulic pump/motor is symmetric. The peak-to-peak amplitude 8-106 is determined by many characteristics of the hydraulic pump.

Figure 52A:
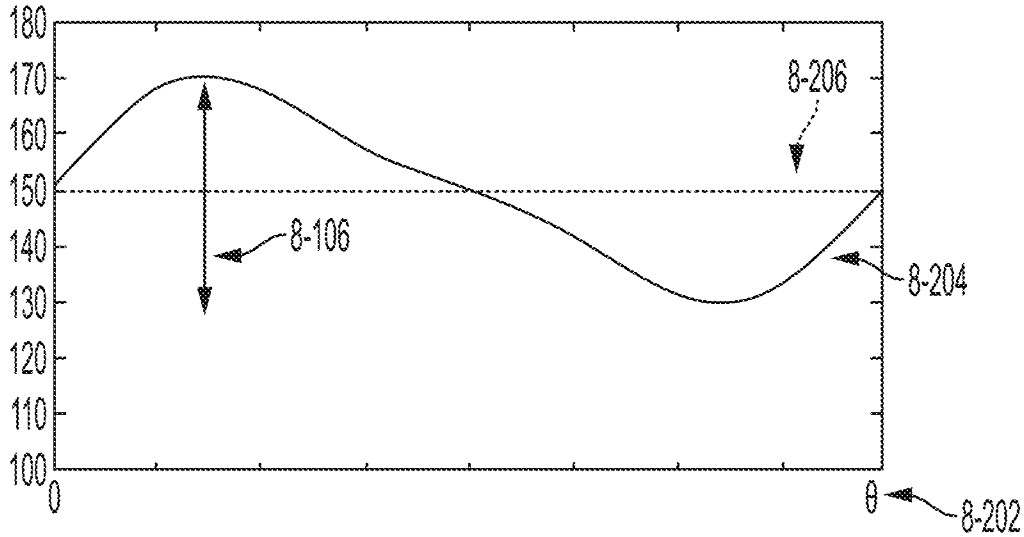
FIG. 52A is a representative plot of hydraulic pump/motor pressure ripple about a nominal average pressure under constant electric motor/generator torque over one repeating hydraulic pump/motor cycle.

In FIG. 52A a representative plot of steady state pressure ripple in the position domain is shown for a hydraulic pump operating at constant frequency under a constant torque application. The position theta 8-202 defines the geometric period in position over which the pump is geometrically repeating; the average periodic pressure ripple 8-204 over this position period is consistent. The mean pressure differential 8-206 is substantially constant over one periodic cycle and therefore constant throughout operation. The peak-to-peak amplitude 8-106 of the fluctuating pressure signal is consistent from cycle to cycle as the system is nominally periodic in geometry.

Figure 52B:
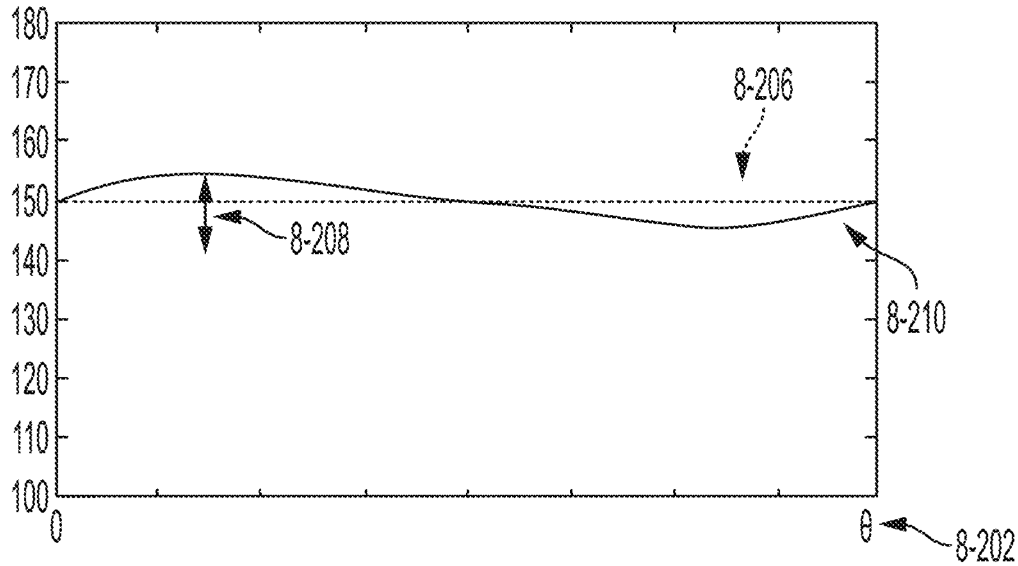
FIG. 52B is a representative plot of hydraulic pump/motor pressure ripple about a nominal average pressure under fluctuating and controlled motor/generator torque over the same repeating hydraulic pump/motor cycle as 8-2A. The fluctuating torque compensates natural pressure variations in the hydraulic system thereby attenuating the resulting system pressure fluctuations.

In FIG. 52B a representative plot of pressure ripple in the position domain is shown for a pump/motor under torque application from a model based feed forward torque controller. The mean pressure differential 8-206 remains at the same value as in FIG. 52A. The peak-to-peak amplitude 8-108 of the fluctuating pressure signal 8-210 is consistent from cycle to cycle and is considerably smaller than the peak-to-peak amplitude 8-106 in the constant torque application case of FIG. 52A. The average repeating pressure ripple 8-210 retains periodicity over the same geometric period theta 8-202.

Figure 53A:
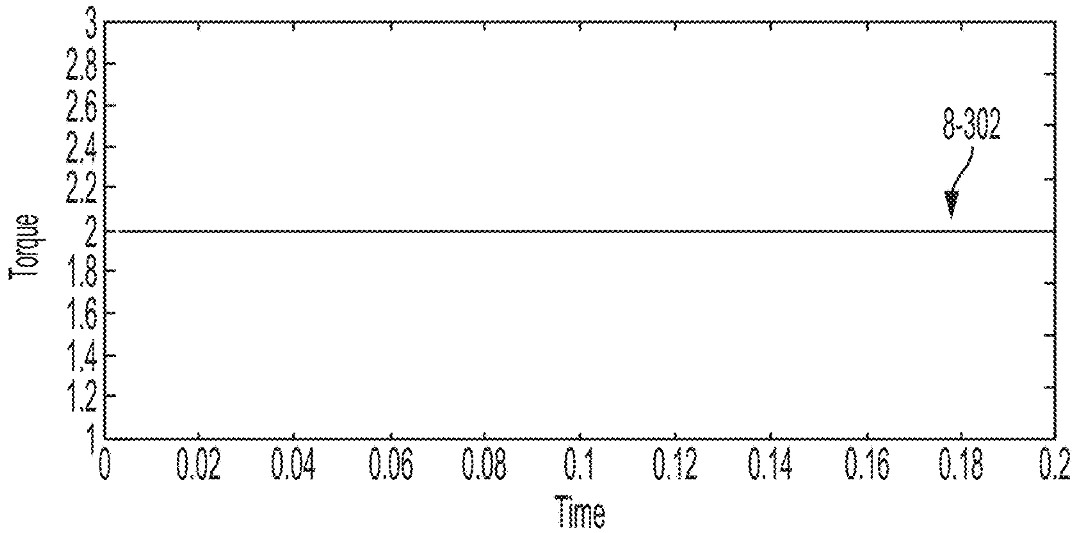
FIG. 53A is a representative plot of the necessary electric motor/generator torque to produce the pressure ripple shown in FIG. 52A.

In FIG. 53A a steady state time domain representation of the constant torque application to achieve the pressure ripple in FIG. 52A is shown. The torque value 8-302 is constant throughout time and is a DC value with some offset from zero.

Figure 53B:
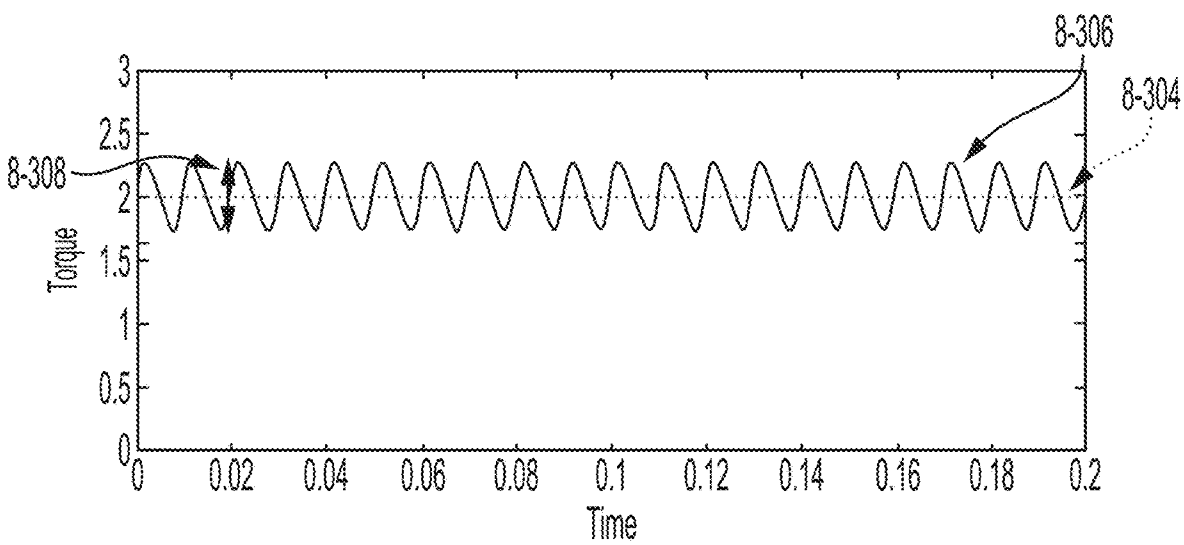
FIG. 53B is a representative plot of the necessary electric motor/generator torque to produce the attenuated pressure ripple shown in FIG. 52B.

In FIG. 53B a steady state time domain representation of a fluctuating torque output from a model-based feed forward controller is shown. The mean torque 8-304 is constant throughout time and equal to the constant torque 8-302 from the case shown in FIG. 53A. The torque signal 8-306 fluctuates above and below the mean torque 8-304. The peak-to-peak amplitude 8-308 of the torque signal has a magnitude that is an output of the ripple model.

Figure 54:
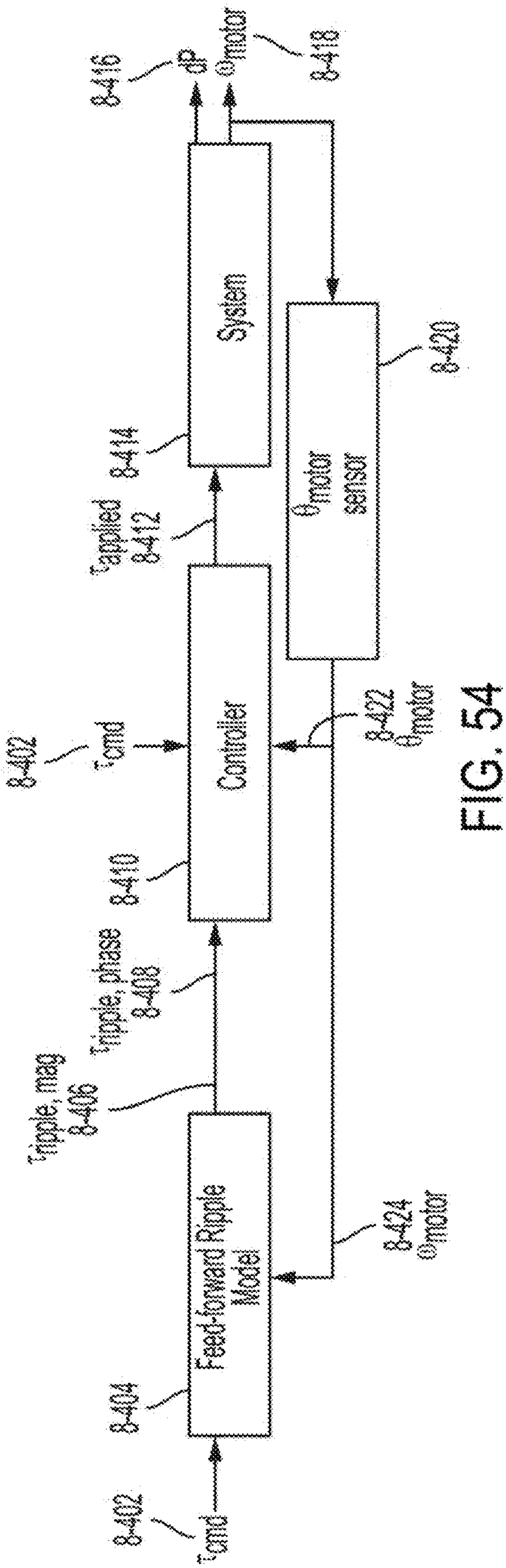
FIG. 54 is an embodiment of the control block diagram of a model-based feed-forward ripple cancelling control system for a hydraulic pump/motor with rotor position sensing. (The nominal torque command may be the output of a vehicle control model.)

In FIG. 54 a control block diagram of a model-based feed-forward ripple cancelling torque control system for a hydraulic pump is shown. A nominal torque command 8-402, which is an output of a separate system level control system, is an input to the feed-forward ripple model 8-404. Along with the nominal torque command 8-402, the rotational speed of the hydraulic pump 8-424 is fed into the feed-forward ripple model 8-404 which in turn outputs a ripple torque magnitude 8-406 and a ripple torque phase offset 8-408 with respect to rotor position 8-422. The ripple torque magnitude 8-406 and ripple torque phase offset 8-408 are fed into the motor controller 8-410 which also takes as input the nominal torque command 8-402 and in turn outputs an overall applied torque 8-412 to the system 8-414 which refers to the hydraulic pump. The applied torque 8-412 results in a generated pressure differential 8-416 across the hydraulic pump 8-414 as well as a rotational speed 8-418 of the hydraulic pump. A position sensor 8-420 monitors the position 8-422 of the pump 8-414 from which rotor speed 8-424 can be derived. The resulting rotor speed 8-424 is again fed into the feed-forward ripple model 8-404. Note that the control variable of interest in this system is pressure differential 8-416 yet there is no corresponding pressure sensor or feedback on this signal.

Figure 55:
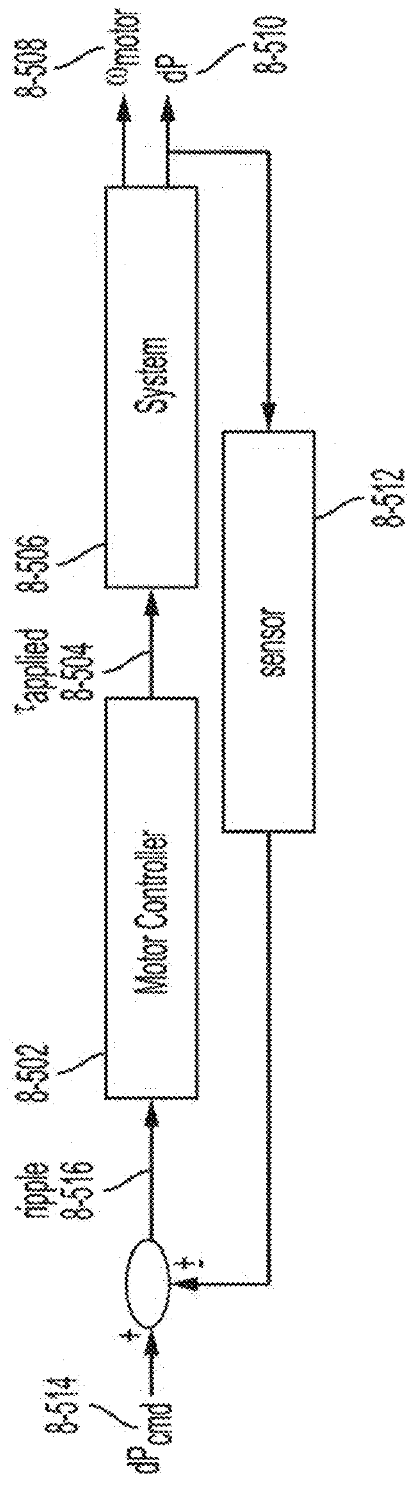
FIG. 55 is an embodiment of the control block diagram of a feedback based ripple cancelling torque control system for a hydraulic pump/motor based on load feedback (pressure, force, acceleration etc.). (The nominal pressure/force/acceleration command may be the output of a vehicle control model.)

In FIG. 55 a control block diagram of a closed-loop feedback based ripple cancelling torque control system is shown. The motor controller 8-502 outputs an applied torque 8-504, which acts on the system 8-506, which refers to the hydraulic pump. The torque applied 8-504 results in a rotational speed 8-508 of the hydraulic pump system 8-506 as well as a generated pressure differential 8-510 across the pump 8-506. A pressure sensor 8-512 feeds the pressure differential signal 8-510 into a block where it is summed with a nominal pressure differential command 8-514 which itself is an output of a separate system level control system. The result of this summation or subtraction is the error of the system or the hydraulic ripple 8-516. This ripple 8-516 is fed into the motor controller 8-502, which in turn adjusts its applied torque 8-504 in order to minimize the magnitude of the ripple 8-516.

Figure 56:
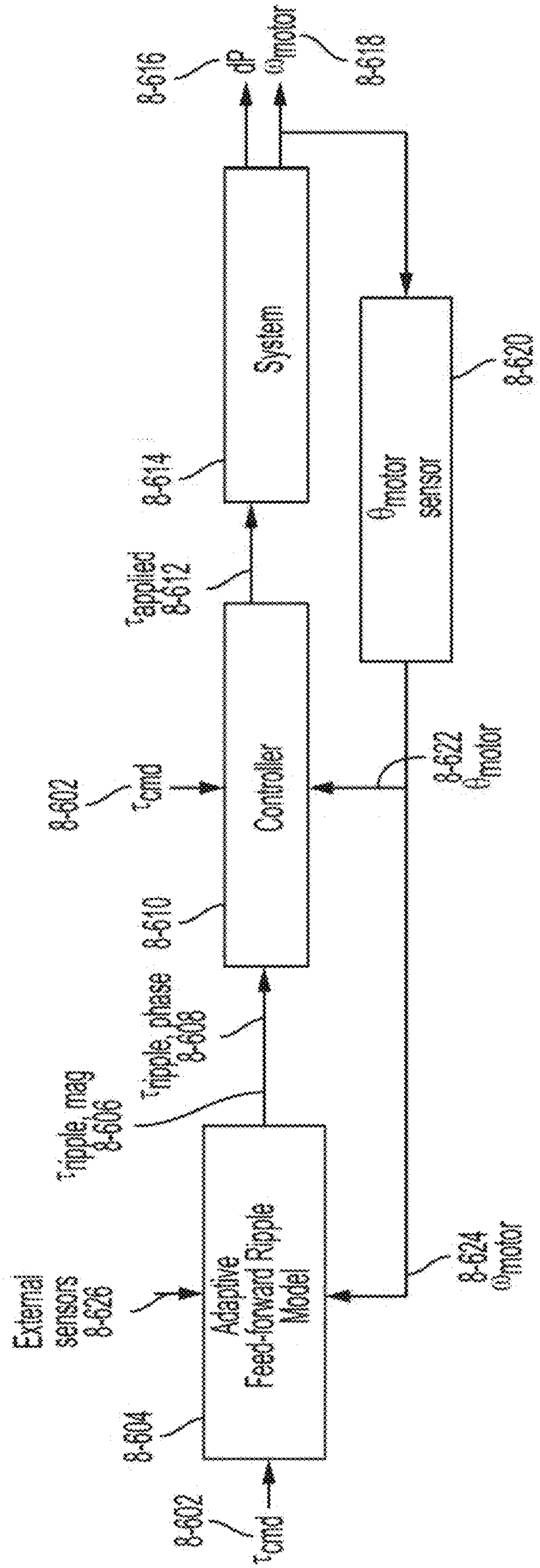
FIG. 56 is an embodiment of the control block diagram of an adaptable model-based feed-forward torque ripple canceling control system for a hydraulic pump/motor. External sensors provide input to the controller and the model is updated semi-continuously during the course of operation. Direct feedback control is not implemented.

In FIG. 56 a control block diagram of an adaptive mode-based feed-forward ripple cancelling torque control system for a hydraulic pump is shown. A nominal torque command 8-602, which is an output of a separate system level control system, is an input to the feed-forward ripple model 8-604. Along with the nominal torque command 8-602, the rotational speed of the pump 8-624 is fed into the feed-forward ripple model 8-604 which in turn outputs a ripple torque magnitude 8-606 and a ripple torque phase offset 8-608 with respect to pump position. The ripple torque magnitude 8-606 and ripple torque phase offset 8-608 are fed into the motor controller 8-610 which also takes as input the nominal torque command 8-602 and the motor position 8-622 and in turn outputs an overall torque applied 8-612 to the system 8-614 which refers to the hydraulic pump. The torque applied 8-612 results in a generated pressure differential 8-616 across the hydraulic pump system 8-614 as well as a rotational speed 8-618 of the hydraulic pump 8-614. A position sensor 8-620 monitors the position 8-622 of the pump/motor 8-614 from which rotor speed 8-624 can be calculated. The resulting speed 8-624 is again fed into the feed-forward ripple model 8-604. External sensors 8-626, which monitor system, ripple response but are not directly used in closed-loop feedback are fed into and used to update and adapt the feed-forward ripple model 8-604. This updating may generally occur over a time period that is substantially longer than the time constant of the system.

Active Stabilization System for Truck Cabin

The secondary vehicle stabilization system detailed herein uses a feed forward approach to receiving road inputs and triggering actuator response prior to the mechanical road input reaching the operator cabin. The system is able to accurately predict the motion of the operator cabin with ample time to apply force responses to the actuators. The system detailed herein provides for optimal stabilization of an operator cabin on a truck. The electro-hydraulic actuators included in the system are detailed below.

Figure 57:
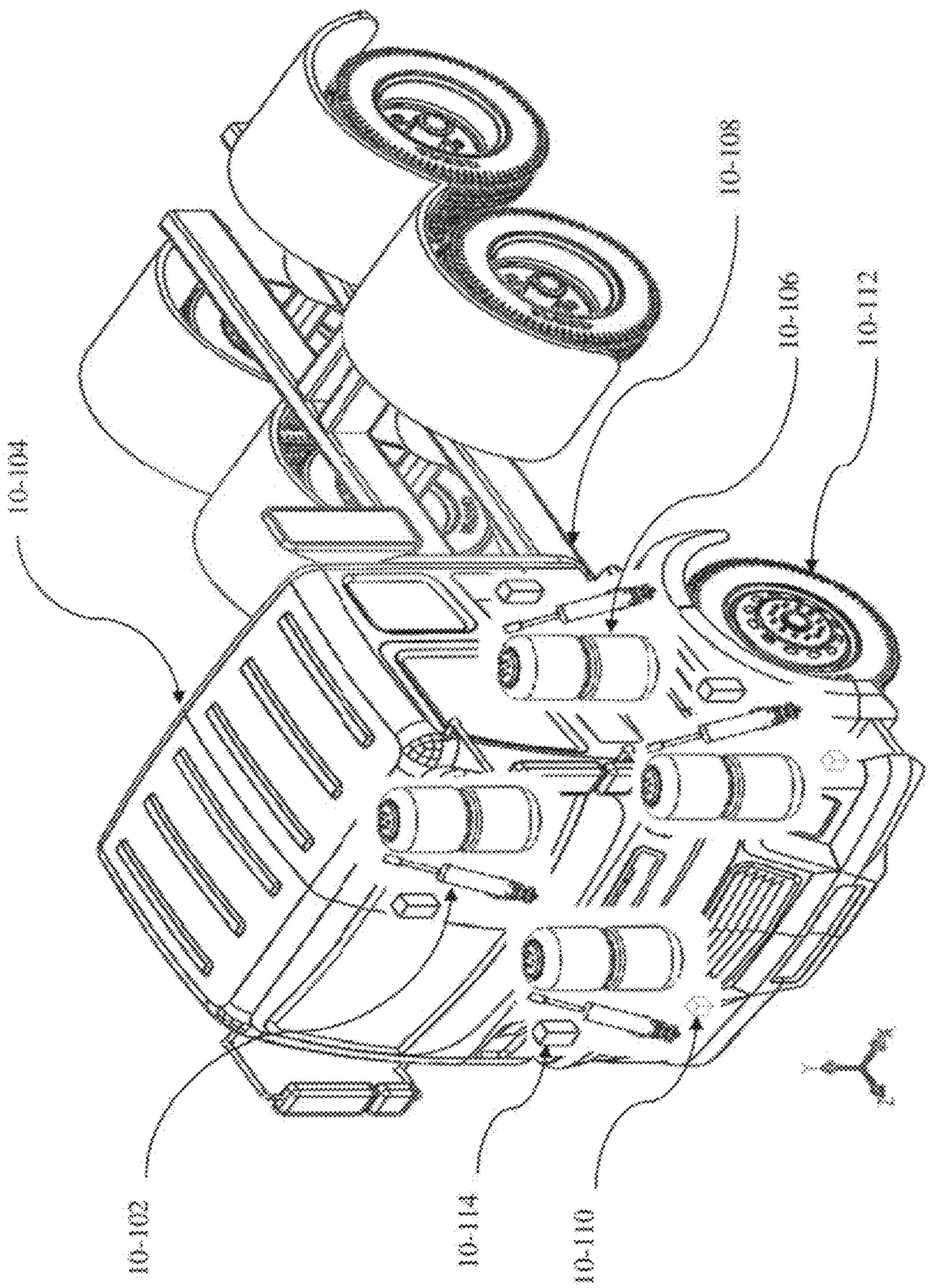
FIG. 57 is a schematic representation of a four point active truck cabin stabilization system. Shown in the breakout view are four electro-hydraulic actuators, four springs (represented here as air springs but can be any type of self-contained device acting as a spring), a plurality of sensors, a plurality of controllers, and the main structures that make up the vehicle.

Referring to FIG. 57, as a truck drives over a road event such as a pothole or unevenness in the road, a mechanical force input is introduced into the chassis of the vehicle 10-108 through the wheel 10-112. By placing sensors (accelerometers, position sensors, gyroscopes, etc.) 10-110 on the vehicle chassis 10-108 or on the suspension to measure wheel motion, the mechanical input is registered by a controller(s) 10-114. By sensing these external force inputs on the vehicle chassis or suspension, the sensors provide information to the controller pertaining to the forces that may generate cabin disturbances, before they can affect the cabin and far enough in advance of the input being transmitted to the cabin 10-104 that the system is able to predict the pitch, roll, and heave motions that will be transmitted to the operator cabin. This allows ample time for one or more controllers 10-114 to deliver commands for force outputs to one or more electro-hydraulic actuators 10-102. The system is therefore able to eliminate the pitch, roll, and heave motions felt by the vehicle operator, making the active stabilization system a feed-forward system.

The electro-hydraulic actuator 10-102 comprises an electric motor operatively coupled to a hydraulic pump and a closed hydraulic circuit that is able to create controlled forces in multiple (e.g., typically three or four) quadrants of a damper/actuator force-velocity curve, whereby the four quadrants of the force-velocity profile of the hydraulic actuator correspond to compression damping, extension damping, active extension, and active compression. When an active force output is commanded to an actuator, energy is consumed by the actuator; conversely, when the actuator is operating in the damping regime, the actuator is regenerative, and energy is generated by the actuator that can be stored or used by the system.

In the embodiment shown in FIG. 57 the electro-hydraulic actuators 10-102 are coupled between the chassis 10-108 and the cabin 10-104. Springs 10-106 are also coupled between the chassis and the cabin and operate mechanically in parallel with the actuators 10-102. The electro-hydraulic actuators 10-102 and the springs 10-106 may be the only structural members between the chassis 10-108 and the cabin 10-104, or there may be additional supporting structures that do not inhibit the actuation of the actuators 10-102 or the springs 10-106.

The actuators 10-102 may be disposed such that they are oriented perpendicular to the chassis 10-108 and the cabin 10-104, for example along the y axis as it is shown in FIG. 10-1. When installed in this orientation, the actuators 10-102 may impart force outputs on the chassis 10-108 and the cabin 10-104 in the direction of the y axis. In some embodiments, this orientation may be sufficient to mitigate the effects of external force inputs on the cabin such as pitch, roll, and heave. In other embodiments where this may not be sufficient the actuators 10-102 may be disposed such that they are oriented at a non-perpendicular angle between the chassis 10-108 and the cabin 10-104. In this orientation, the actuators 10-102 may impart a force output with some component in any of the x, y, or z directions, which may further assist in controlling fore and aft motions of the cabin.

The electro-hydraulic actuator 10-102 may comprise of an integral (or dedicated) motor controller 10-114, wherein the electronic controller 10-114 may comprise of both power and logic capabilities and may also include sensors, such as a rotary position sensor, accelerometer, gyroscopes, or temperature sensors etc. The controller may comprise a control program (or protocol) whereby the controller executes a program in response to the sensed vehicle movement or other input that causes current to flow through the electric motor to either induce rotation of the hydraulic motor thereby inducing hydraulic fluid flow through the actuator or to retard rotation of the hydraulic motor thereby reducing movement of the actuator to isolate at least a portion of pitch, roll, and heave motions of the cabin from the determined vehicle movement.

The electronic controller 10-114 may utilize signals from the integral sensors and/or utilize signals from external sensors such as suspension position sensors, chassis accelerometers, wheel accelerometers, vehicle speed sensors and the like to isolate at least a portion of pitch, roll, and heave motions of the cabin from the determined vehicle movement. The electronic controller may also have the capability to communicate with other vehicle systems (via the controller area network (CAN) bus, FLEXRAY or other communication protocols). These systems may include the other electro-hydraulic actuator controllers installed on the vehicle, an electro-hydraulic actuator central controller etc., as well as non-suspension related vehicle systems such as steering, brake and throttle systems etc. The system may use at least one of the accelerometers, position sensors or gyroscopes for monitoring chassis disturbances from wheel events or inertial effects on the cabin in any combination of axes, whereby any of these sensors may be able to detect vehicle acceleration in at least two axes. Other sensors may assist in predicting the movement of the vehicle or portions of the vehicle, which can aid in the mitigation of the sensed movements on the cabin 10-104. These sensors can be mounted in various locations, wherein sensors mounted on the wheels or suspension members that are coupled to the wheels may be the first to experience external force inputs from the road. Sensors mounted on the chassis 10-108 or the cabin 10-104 can monitor the inputs felt by their respective structures. Sensors mounted on the operator's seat may provide an accurate mapping of the inputs felt by the operator. Sensors mounted on the controlling instrumentation of the vehicle such as the steering system, the braking system, or the throttle system can provide input which might allow the system to predict disturbances that may affect the cabin. Sensors mounted near the actuators 10-102 can provide realistic data pertaining to the appropriate force output that should be commanded to the respective actuator 10-102. The term "sensor" should be understood, except where context indicates otherwise, to encompass all such analog and digital sensors, as well as other data collection devices and systems, such as forward-looking cameras, navigation and GPS systems that provide advance information about road conditions, and the like that may provide input to the controllers described herein.

The system may comprise of a plurality of self-controllable electro-hydraulic actuators 10-102, wherein a self-controllable actuator 10-102 may comprise an integral sensor 10-110, a controller 10-114, accumulator, hydraulic pump, and electric motor, and may further comprise local power storage. The controller 10-114 may comprise an independent control algorithm to control the actuator 10-102 based solely on input gathered by the integrated sensor, thereby each actuator 10-102 may operate independently of the other actuators 10-102 in the system. In some embodiments, the self-controllable actuators 10-102 may operate in unison to improve the ability of the system to mitigate cabin 10-104 movement.

In the embodiment of FIG. 57 a four point active stabilization system is disclosed. The system comprises four electro-hydraulic actuators 10-102, four springs 10-106 (in the embodiment disclosed the springs are represented as air springs, but these may be mechanical springs such as coil springs, torsion springs leaf springs etc. as the disclosure is not limited in this regard), at least one controller(s) 10-114, and at least one sensor(s) 10-110 (accelerometers, etc.), wherein the four electro-hydraulic actuators may be located proximal to the four corners of the cabin 10-104, wherein the four springs operate mechanically in parallel with the actuators.

An actuator(s) 10-102 may be mounted between the operator's seat (not shown) and the vehicle cabin 10-104. These actuators 10-102 can be self-controllable or they can communicate with the actuators disposed between the cabin 10-104 and the chassis 10-108. In the latter case, the actuators 10-102 located at the operator's seat can be substantially more predictive of the movements that will be experienced by the operator and can respond appropriately. The seat actuators 10-102 may be coupled to a spring 10-106 in a similar fashion to the cabin actuators 10-102.

Figure 58:
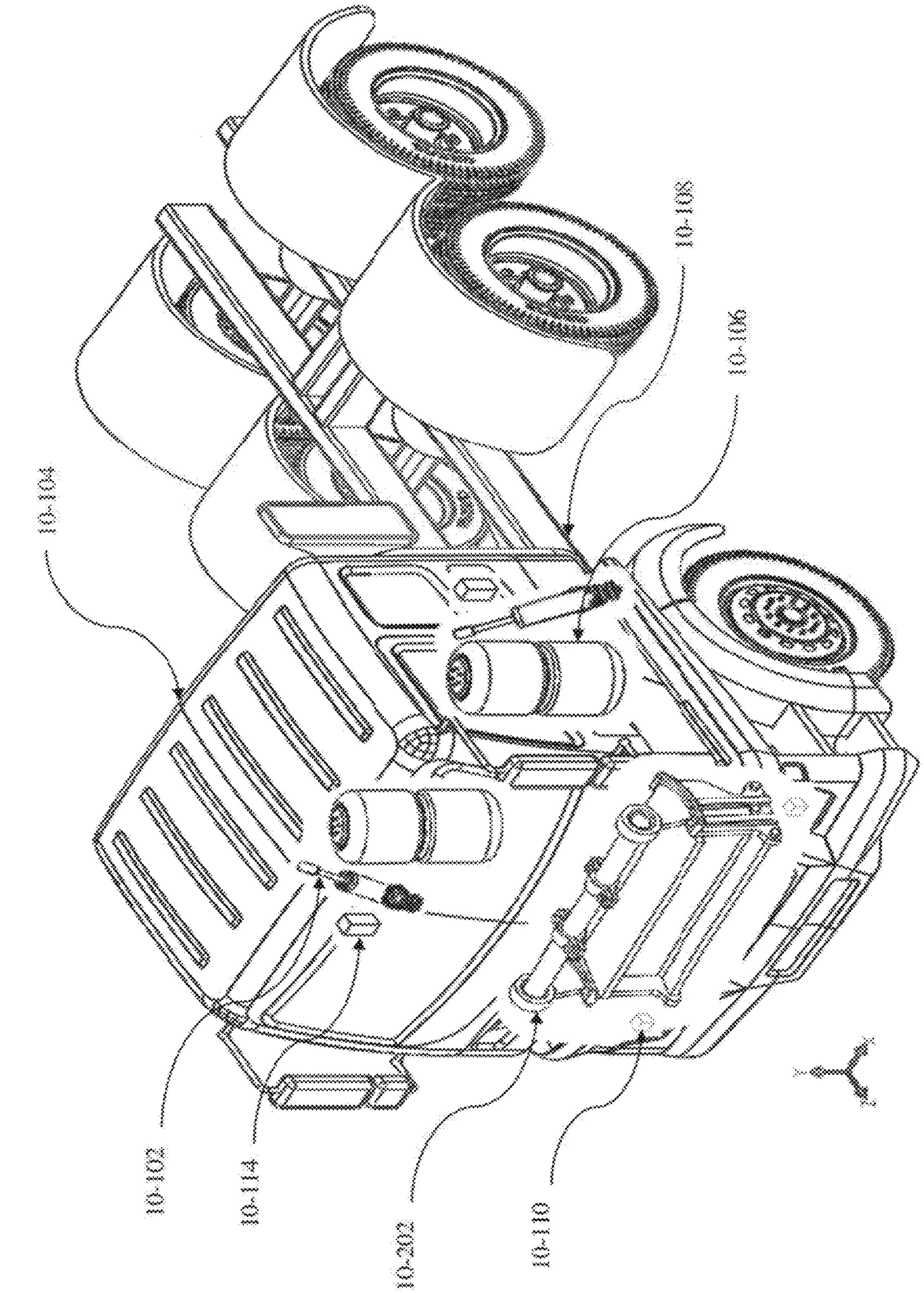
FIG. 58 is a schematic representation of a three point active truck cabin stabilization system. Shown in the breakout view are two electro-hydraulic actuators, two springs (represented here as air springs but can be any type of self-contained device acting as a spring), a plurality of sensors, a plurality of controllers, a hinge mechanism, and the main structures that make up the vehicle.

FIG. 58 depicts an embodiment of a truck with three point assembly active stabilization system, wherein the system comprises of two electro-hydraulic actuators 10-102 coupled between the chassis and the cabin, two springs 10-106 operating mechanically in parallel with the actuators (in the embodiment disclosed these are represented as air springs but may be any form of spring), at least one and at most three controllers 10-114, and at least one and at most four sensors 10-110 (e.g. accelerometers, position sensors, gyroscopes etc.), wherein the two rear corners of the vehicle operator cabin 10-104 are coupled to the vehicle chassis 10-108 via actuators 10-102 and springs 10-106, wherein the front of the vehicle operator cabin 10-104 is pivotally connected to the vehicle chassis 10-108 via a hinge mechanism 10-202, whereby the cabin 10-104 has the ability to translate and rotate in at least one of the x, y, and z axes.

Actuators 10-102 may be mounted between the operator's seat (not shown) and the vehicle cabin 10-104. These actuators 10-102 can be self-controllable or they can communicate with the actuators disposed between the cabin 10-104 and the chassis 10-108. In the latter case, the actuators 10-102 located at the operator's seat can be substantially more predictive of the movements that will be experienced by the operator and can respond appropriately. The seat actuators 10-102 may be coupled to a spring 10-106 in a similar fashion to the cabin actuators 10-102.

Figure 59:
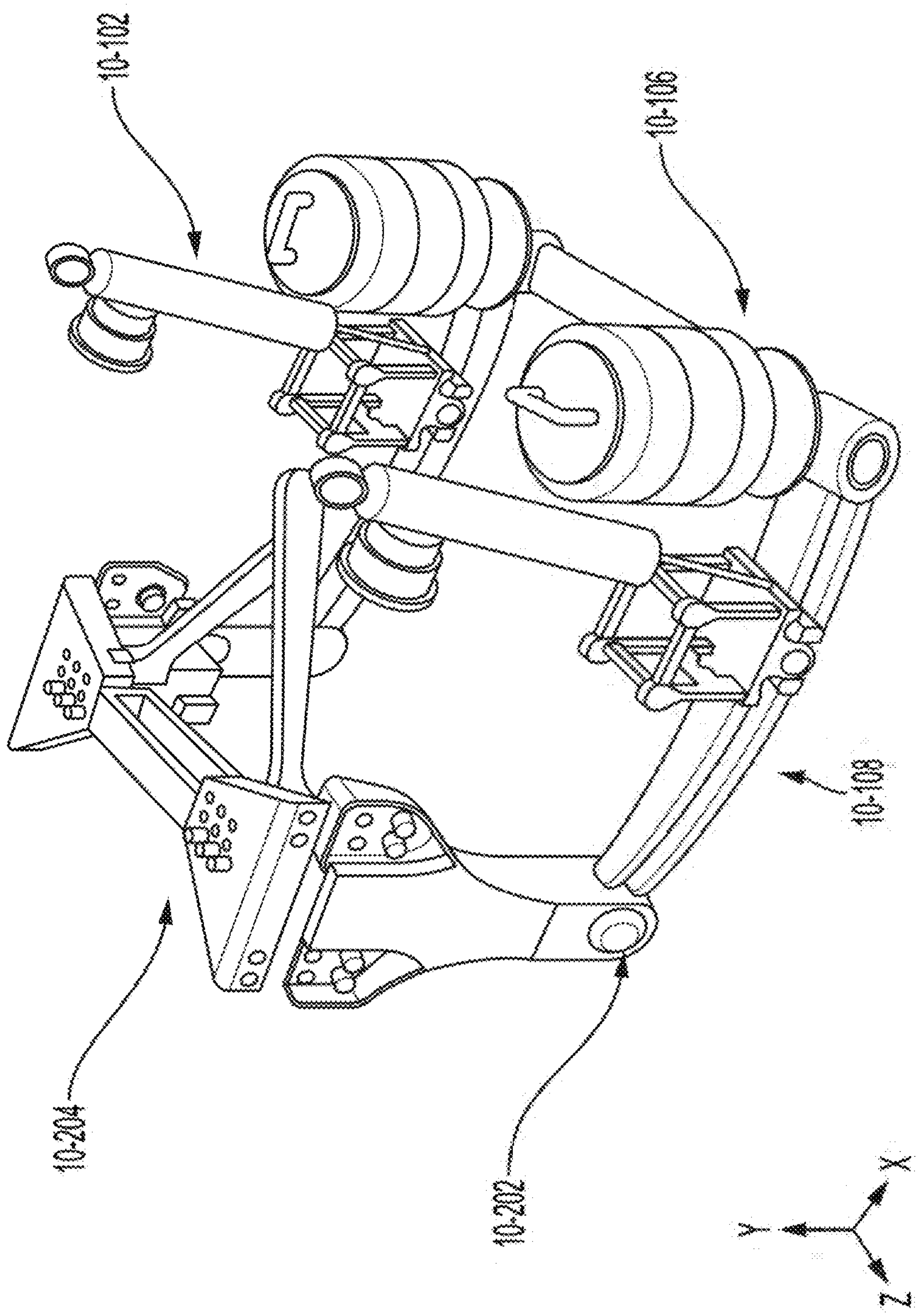
FIG. 59 is an isometric view of an isolated assembly of a three point active truck cabin stabilization system.

In FIG. 59 is an isometric view of an isolated assembly of a three point active truck cabin stabilization system is disclosed showing the two electro-hydraulic actuators 10-102, the two air springs 10-106, a vehicle chassis member10-108, the pivoting hinge mechanism 10-202 and an articulating cabin support member 10-204.

Figure 60:
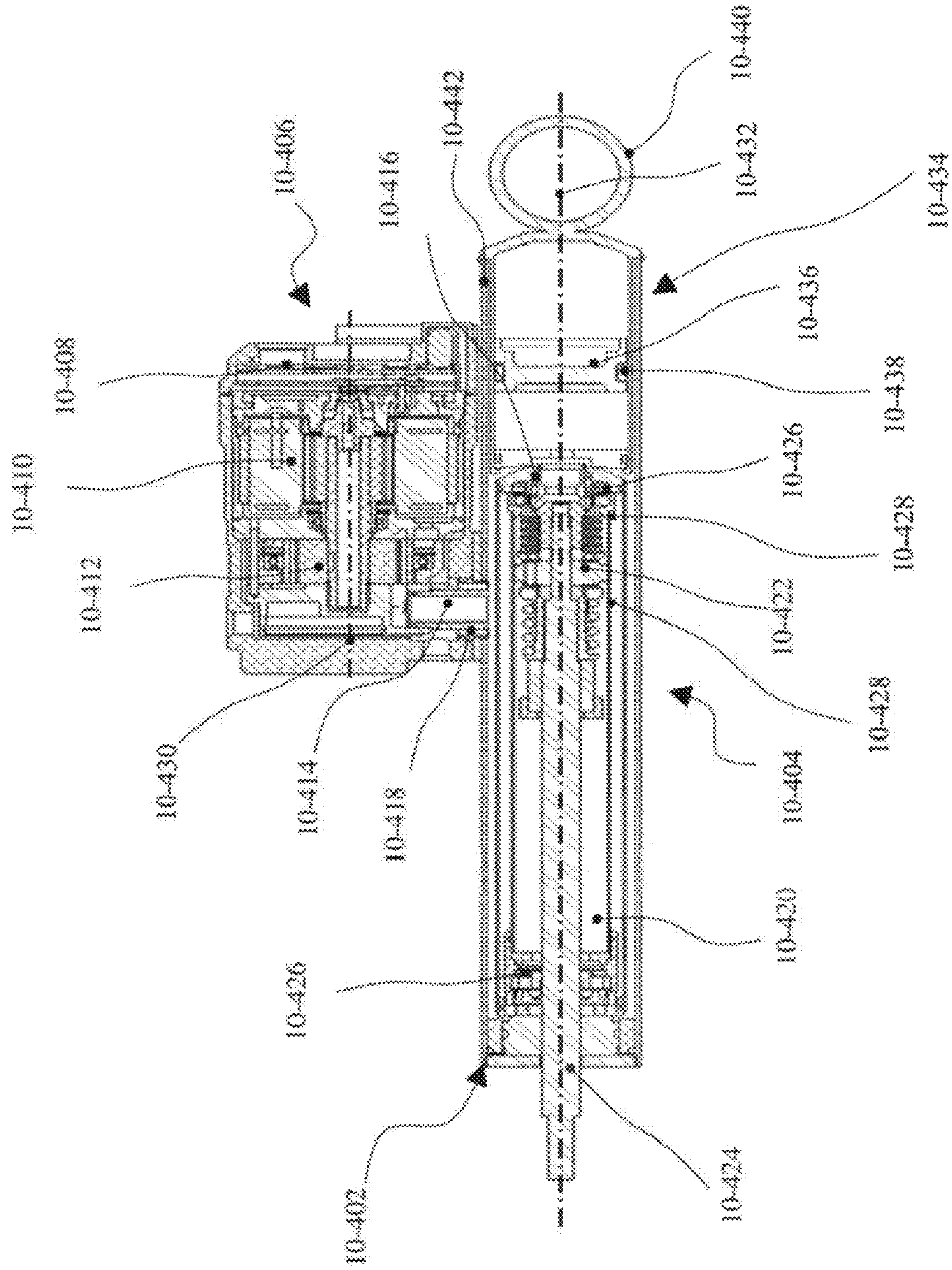
FIG. 60 is an embodiment of an active suspension actuator that comprises a hydraulic regenerative, active/semi-active damper smart valve.

In FIG. 60 an example of an actuator 10-102 utilized in a three point and four point active truck cabin stabilization system is disclosed. The actuator 10-102 is driven by a hydraulic pump that is coupled to an electric motor. The actuator 10-102 has a central axis of actuation 10-432. As a current is applied to the electric motor by the controller 10-114, to either assist or resist in the rotation of a hydraulic pump. This rotation causes the hydraulic pump to channel fluid through the actuator 10-102. Depending on the direction of the applied rotational torque, the channeling of hydraulic fluid causes the piston of the actuator 10-102 to translate in either the compression stroke or the rebound stroke along the central axis of actuation 10-432. The actuator 10-102 is coupled between the vehicle operator cabin 10-104 and the vehicle chassis 10-108 by means of a top mounting mechanism and a bottom mounting mechanism. An example of a top mounting mechanism is provided for mounting to the vehicle operator cabin. An example of a bottom mounting mechanism is provided for mounting to the vehicle chassis. The location of the mounting point on the vehicle operator cabin for affixing the top mounting mechanism and the location of the mounting point on the vehicle chassis for affixing the bottom mounting mechanism may be located such that the central axis of actuation 10-432 has some component in each of the x, y, and z axes. This enables each actuator 10-102 to affect the movement of the vehicle operator cabin in each of the aforementioned axes.

FIG. 60 shows an embodiment of the electro-hydraulic actuator that comprises a hydraulic regenerative, active/semi-active smart valve 10-406 and a hydraulic actuator 10-402. The hydraulic actuator 10-402 comprises an actuator body (housing) 10-404. The smart valve 10-406 is close coupled to the actuator body 10-404 so that there is a tight integration and short fluid communication between the smart valve and the actuator body, and is sealed so that the electro-hydraulic smart valve assembly becomes a single body actuator. In the embodiment shown in FIG. 10-4 the smart valve 10-406 is coupled to the actuator body 10-404 so that the axis of the smart valve (i.e. the rotational axis of the integrated HSU and electric motor) 10-430 is parallel with the actuator body, although the smart valve may be orientated with its axis 10-430 perpendicular to the actuator axis 10-432 or at some angle in between.

The integrated smart valve 10-406 comprises of an electronic controller 10-408, an electric motor 10-410 that is close coupled to a hydraulic pump/motor (HSU) 10-412. The HSU has a first port 10-414 that is in fluid communication with a first side 10-416 in the actuator body 10-404 and a second port 10-418 that is in fluid communication with a second side 10-420 in the actuator body 10-404. The first port and second port comprises a fluid connection to the actuator wherein, the hydraulic connection comprises a first tube inside a second tube, wherein the first port is via the first tube, and the second port is via the annular area between the first tube and second tube. In an alternate embodiment the hydraulic connection may comprise of two adjacent ports. Hydraulic seals are used to contain the fluid within the first and second hydraulic connections as well as to ensure that fluid is sealed within the actuator. It is well understood to anyone skilled in the art that many other permutations of hydraulic connection arrangements can be constructed and the patent is not limited in this regard.

In the embodiment disclosed in FIG. 60 the first side represents an extension volume and the second side represents a compression volume; however, these chambers and volumes may be transposed and the disclosure is not limited in this regard. The HSU 10-412 is in hydraulic communication with a piston 10-422 and piston rod 10-424 so that when the piston and piston rod moves in a first direction (i.e. an extension stroke) the HSU rotates in a first rotation, and when the piston and piston rod moves in a second direction (i.e. a compression stroke) the hydraulic motor rotates in a second rotation. The close coupling of the HSU first and second ports with the extension and compression chambers of the actuator allows for a very stiff hydraulic system, which is very favorable for the responsiveness of the active suspension actuator.

The active suspension actuator 10-402 may have a high motion ratio from the linear speed of the piston 10-422 and piston rod 10-424 to the rotational speed of the close coupled HSU and electric motor, and during high velocity events extremely high rotational speeds may be achieved by the closely coupled HSU and electric motor, which may cause damage to the HSU and electric motor. To overcome this issue and allow the actuator to survive high speed suspension events, passive valving may be incorporated to act hydraulically in either parallel, in series, or combination of both, with the HSU. Such passive valving may include a diverter valve(s) 10-426. The diverter valve(s) 10-426 is configured to activate at fluid flow rate (i.e. a fluid diversion threshold) and will divert hydraulic fluid away from the HSU 10-412 that is operatively connected to the hydraulic actuator in response to the hydraulic fluid flowing at a rate that exceeds the fluid diversion threshold. The fluid diversion threshold may be selected so that the maximum safe operating speed of the HSU and motor is never exceeded, even at very high speed suspension events. When the diverter activates and enters the diverted flow mode, restricting fluid flow to the hydraulic pump, a controlled split flow path is created so that fluid flow can by-pass the hydraulic pump in a controlled manner, thereby creating a damping force on the actuator so that wheel damping is achieved when the diverter valve is in the diverted flow mode. A diverter valve may be incorporated in at least one of the compression and extension stroke directions. The diverter valve(s) may located in the extension volume and compression volumes as shown in the embodiment of FIG. 60 or elsewhere in the hydraulic connection between the actuator body 10-404 and the HSU 10-406, and the disclosure is not limited in this regard. Other forms of passive valving may be incorporated to act hydraulically in either parallel, in series (or combination of both) with the HSU, such as a blow-off valve(s) 10-428. The blow off valve(s) can be adapted so that can operate when a specific pressure drop across the piston 10-422 is achieved, thereby limiting the maximum pressure in the system. The blow off valve(s) 10-428 may located in the piston as shown in the embodiment of FIG. 60 or elsewhere in the hydraulic connection between the actuator body 10-404 and the HSU 10-406, and the disclosure is not limited in this regard. The passive valving used the active suspension actuator 10-402 can be adapted so as to provide a progressive actuation, thereby minimizing any NVH (noise, vibration, or harshness) induced by their operation. The passive valving that may be incorporated the in the active suspension actuator may comprise of at least one of progressive valving, multi-stage valving, flexible discs, disc stacks, amplitude dependent damping valves, volume variable chamber valving, baffle plate for defining a quieting duct for reducing noise related to fluid flow. Other forms of controlled valving may also be incorporated the in the active suspension actuator, such as proportional solenoid valving placed in series or in parallel with the HSU, electromagnetically adjustable valves for communicating hydraulic fluid between a piston-local chamber and a compensating chamber, and pressure control with adjustable limit valving. These types of arrangements and constructions of passive and controlled valving are well known in the art, and anyone skilled in the art could construct and adapt such arrangements, and as such the patent is not limited in this regard.

Since fluid volume in the actuator body 10-404 changes as the piston 10-424 enters and exits the actuator, the embodiment of FIG. 60 includes an accumulator 10-434 to accept the piston rod volume. In one embodiment disclosed, the accumulator is a nitrogen-filled chamber with a floating piston 10-436 able to move in the actuator body and sealed from the hydraulic fluid with a seal 10-438. In the embodiment shown the accumulator is in fluid communication with the compression chamber 10-416. The nitrogen in the accumulator is at a pre-charge pressure, the value of which is determined so that it is at a higher value than the maximum working pressure in the compression chamber. The floating piston 10-436 rides in the bore of an accumulator body 10-440 that is rigidly connected to the actuator body 10-404. A small annular gap 10-442 may exist between the outside of the accumulator body 10-440 and the actuator body 10-404 that is in fluid communication with the compression chamber, and hence is at the same pressure (or near same pressure) as the accumulator, thereby negating or reducing the pressure drop between the inside and outside of the accumulator body. This arrangement allows for the use a thin wall accumulator body, without the body dilating under pressure from the pre-charged nitrogen.

While an internal accumulator has been depicted, any appropriate structure, device, or compressible medium capable of accommodating a change in the fluid volume present within the actuator 10-404, including an externally located accumulator, might be used, and while the accumulator is depicted being in fluid communication with the compression chamber, the accumulator could be in fluid communication with the extension chamber, as the disclosure is not so limited.

The compact nature and size of the electro-hydraulic actuator enables the electro-hydraulic actuator to be readily installed into a cabin stabilization application.

Figure 61:
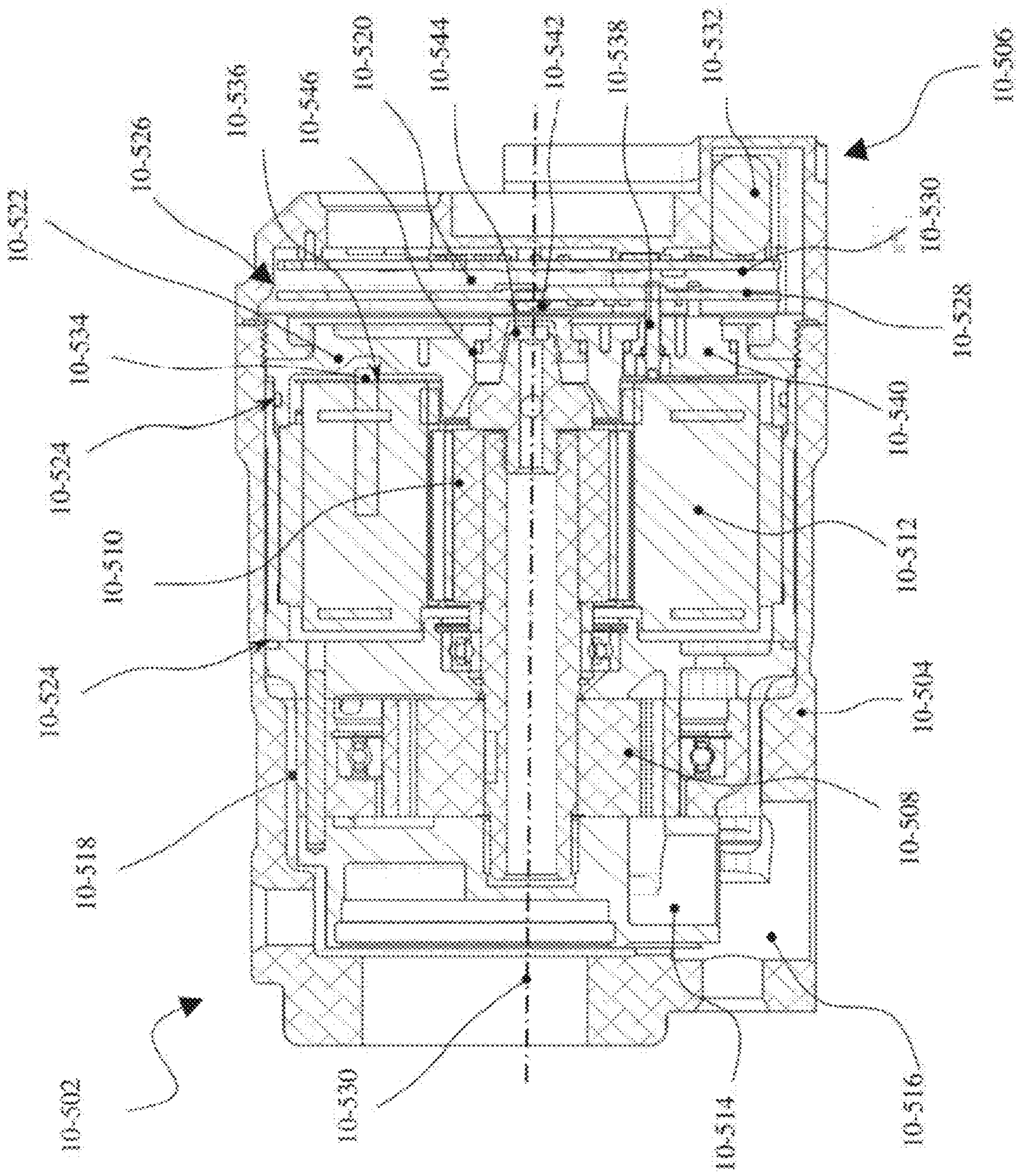
FIG. 61 is an embodiment of a regenerative active/semi-active smart valve.

FIG. 61 shows an embodiment of an electro-hydraulic regenerative/active smart valve 10-502, as disclosed in the embodiment of FIG. 60, comprising a fluid filled housing 10-504 coupled with the control housing 10-506, wherein the control housing is integrated with the electro-hydraulic regenerative/active smart valve 10-502. The smart valve assembly comprises a hydraulic pump/motor assembly (HSU) 10-508 closely coupled and operatively connected to a rotor 10-510 of an electric motor/generator, wherein the stator 10-512 of the electric motor/generator is rigidly located to the body of the smart valve assembly 10-502. The HSU comprises of a first port 10-514 that is in fluid communication with a first chamber of the actuator and a second port 10-516 that is in fluid communication with a second chamber of the actuator, wherein the second port 10-516 is also in fluid communication with fluid 10-518 that is contained within the volume of the housing 10-504. The HSU and electric motor/generator assembly is contained within and operates within the fluid 10-518 that is within the fluid filled housing 10-504. For reasons of reliability and durability the electric motor/generator may be of the BLDC type (although other type of motor are anticipated), whereby electric commutation is carried out via the electronic controller and control protocols, as opposed to using mechanical means for commutation (such as brushes for example), which may not remain reliable in an oil filled environment. As the fluid 10-518 is in fluid communication with the second port 10-516 of the HSU 10-508, any pressure that is present at the second port of the HSU will also be present in the fluid 10-518. The fluid pressure at the second port may be generated by the pressure drop that exists across the HSU (and hence across the piston of the actuator of the embodiment of FIG. 60) and may change accordingly with the pressure drop (and hence force) across the piston. The pressure at the second port may also be present due to a pre-charge pressure that may exist due to a pressurized reservoir (that may exist to account for the rod volume that is introduced or removed from the working volume of the actuator as the piston and piston rod strokes, for example). This pre-charge pressure may fluctuate with stroke position, with temperature or with a combination of both. The pressure at the second port may also be generated as a combination of the pressure drop across the HSU and the pre-charge pressure.

The control housing 10-506 is integrated with the smart valve body 10-502 and comprises a controller cavity 10-520. The controller cavity 10-520 is separated from the hydraulic fluid 10-518 that is contained within the housing 10-504 by a bulkhead 10-522 whereby the pressure within controller cavity 10-520 is at atmospheric (or near atmospheric) pressure. The bulkhead 10-522 contains the fluid 10-518 within the fluid-filled housing 10-504, by a seal(s) 10-524, acting as a pressure barrier between the fluid-filled housing and the control cavity. The control housing 10-506 comprises a controller assembly 10-526 wherein, the electronic controller assembly may comprise of a logic board 10-528, a power board 10-530, and a capacitor 10-532 among other components. The controller assembly is rigidly connected to the control housing 10-506. The electric motor/generator stator 10-512 comprises winding electrical terminations 10-534, and these terminations are electrically connected to a flexible electrical connection (such as a flex PCB for example) 10-536 that is electrical communication with an electronic connector 10-538. The electronic connector 10-538 passes through the bulkhead 10-522, while containing the hydraulic fluid 10-518 that is in the fluid filled housing via a sealed pass-through 10-540.

As the bulkhead 10-522 contains the fluid 10-518 within the fluid filled housing 10-504, the bulkhead is subjected to the pressure of the fluid 10-518, and hence the pressure of the second port 10-516 of the HSU, on the fluid side of the bulkhead, and the bulkhead is subjected to atmospheric (or near atmospheric) pressure on the controller cavity side of the bulkhead. This may create a pressure differential across the bulkhead which may cause the bulkhead to deflect. Even if the bulkhead is constructed from a strong and stiff material (such as steel for example), any change in the pressure differential between the fluid 10-518 and the controller cavity 10-520 may cause a change in the deflection of the bulkhead. As the sealed pass-through 10-540 passes through the bulkhead, any change in deflection of the bulkhead may impart a motion on the sealed pass-through, which may in turn impart a motion on the electronic connector 10-538, that is contained within the sealed pass-through. The flexible electrical connection 10-536 is adapted so that it can absorb any motions that may exist between the electrical connector 10-538 and the winding electrical terminations 10-534 so that the connections between the winding electrical terminations 10-534 and the flexible electrical connection 10-536 and between flexible electrical connection 10-536 and the electronic connector 10-538 do not become fatigued over time which may cause these connections to fail.

The electrical connector 10-538 is in electrical connection with the power board 10-530 via another compliant electrical member (not shown). The compliant electrical member is adapted so that it can absorb any motions that may exist between the electrical connector 10-538 and the power board 10-530 so that the connections between the power board 10-530 and the compliant electrical member and between compliant electrical member and the electronic connector 10-538 do not become fatigued over time which may cause these connections to fail.

The control housing 10-506 comprises the control assembly 10-526 which may be comprised of a logic board, a power board, capacitors and other electronic components such as FETs or IGBTs. To offer an efficient means of heat dissipation for the control assembly 10-526, the control housing 10-506 may act as a heat sink, and may be constructed from a material that offers good thermal conductivity and mass (such as an aluminum or heat dissipating plastic for example). To ensure that an efficient heat dissipating capability is achieved by the control housing 10-506, the power components of the control assembly 10-526 (such as the FETs or IGBTs) may be mounted flat and in close contact with the inside surface of the control housing 10-506 so that it may utilize this surface as a heat sink. The construction of the control housing 10-506 may be such that the heat sink surface may be in thermal isolation from the fluid filled housing 10-504, by constructing the housing from various materials by such methods as over-molding the heat sink surface material with a thermally nonconductive plastic that is in contact with the housing 10-504. Or conversely the control housing 10-506 may be constructed so that the heat sink surface may be thermally connected to the fluid filled housing 10-504. The heat sink feature of the control housing 10-506 may be adapted and optimized to use any ambient air flow that exists in the cabin installation to cool the thermal mass of the heat sink.

A rotary position sensor 10-542, that measures the rotational position of a source magnet 10-544 that is drivingly connected to the electric motor/generator rotor 10-510, is mounted directly to the logic board 10-528. The rotary position sensor may be of a Hall effect type or other type. A non-magnetic sensor shield 10-546 is located within the bulkhead and lies in between the source magnet 10-544 and the rotary position sensor 10-542, whereby the sensor shield contains the fluid 10-518 that is in the fluid filled housing while allowing the magnetic flux of the source magnet 10-544 to pass through unimpeded so that it can be detected by the rotary position sensor 10-542 so that it can detect the angular position of the rotor 10-510.

The signal from the rotary position sensor 10-542 may be used by the electronic controller for commutation of the BLDC motor as well as for other functions such as for the use in a hydraulic ripple cancellation algorithm (or protocol); all positive displacement hydraulic pumps and motors (HSUs) produce a pressure pulsation that is in relation to its rotational position. This pressure pulsation is generated because the HSU does not supply an even flow per revolution, the HSU produces a flow pulsation per revolution, whereby at certain positions the HSU delivers more flow than its nominal theoretical flow per rev. (i.e. an additional flow) and at other position the HSU delivers less flow than its nominal theoretical flow per rev. (i.e. a negative flow). The profile of the flow pulsation (or ripple) is known with respect to the rotary position of the HSU. This flow ripple then in turn generates a pressure ripple in the system due to the inertia of the rotational components and the mass of the fluid etc. and this pressure pulsation can produce undesirable noise and force pulsations in downstream actuators etc. Since the profile of the pressure pulsation can be determined relative to the pump position, and hence the rotor and hence the source magnet position, it is possible for the controller to use a protocol that can vary the motor current and hence the motor torque based upon the rotor position signal to counteract these pressure pulsations, thereby mitigating or reducing the pressure pulsations and hence reducing the hydraulic noise and improving the performance of the system. Another method of reducing hydraulic ripple from the HSU may be in the use of a port timed accumulator buffer. In this arrangement the HSU comprises ports that are timed in accordance with the HSU flow ripple signature so that in positions when the HSU delivers more flow than its nominal (i.e. an additional flow) a port is opened from the HSU first port to a chamber that comprises a compressible medium so that there is fluid flow from the HSU to the chamber to accommodate this additional flow, and at positions when the HSU delivers less flow than its nominal (i.e. a negative flow) a port is opened from the HSU first port to the reservoir that comprises a compressible medium so that the fluid can flow from the reservoir to the HSU first port, to make up for the negative flow. The chamber with the compressible medium thereby buffers out the flow pulsations and hence the pressure pulsations from the HSU. It is possible to use the hydraulic ripple cancellation algorithm described earlier with the port timed accumulator buffer described above to further reduce the pressure ripple and noise signature of the HSU thereby further improving the performance of the smart valve.

Active Vehicle Suspension with Air Spring

Utilizing an air spring mechanically coupled in parallel with a fast reacting high bandwidth hydro-electric active/regenerative actuator allows for improved performance and vehicle dynamics. Aspects relate to the compact single body design of the active suspension actuator with an integrated electric motor/hydraulic pump and controller (e.g., a smart valve or a smart shock absorber) that not only facilitates ease of vehicle installation but also allows for an easy integration of the air spring whereby the air spring can be installed co-axially around the actuator body. Other aspects relate to applications where packaging of the air spring around the actuator body is impractical wherein the air spring is positioned adjacent to the actuator, mechanically coupled in parallel, again wherein the compact arrangement of the single body actuator and integrated smart valve facilitates the close placement of the air spring adjacent to the damper minimizing the impact on the suspension geometries to incorporate such an arrangement.

According to another aspect a mechanical spring is used in conjunction with the air spring system and the single body actuator and integrated smart valve. Many designs and configurations of air springs are well known in the art, such as bellows type, sleeve piston type, rolling lobe piston type, etc. This include both fixed air and controlled active air systems, and any of these types can be used in conjunction with the single body actuator and integrated smart valve. This disclosure is not limited to particular types of air springs provided as examples herein. There are also several arrangements of the single body actuator and integrated smart valve, such as monotube and MacPherson type active/regenerative, and triple tube semi-active/regenerative types for example, and these arrangements are suitable to be used in conjunction with the various air spring systems as described above. The disclosure is not limited to the particular types of actuators provided as examples herein. Flexibility of coupling the integrated smart valve to the single body actuator allows for many orientations and position for mounting of the smart valve so as to allow for operative clearance between the actuator and the air spring in full compression and full extension, and all stroke positions in between, as well as to accommodate for operative clearance between the single body actuator with integrated smart valve, the air spring and the wheel assembly mechanism and the vehicle chassis. In one embodiment, the axis of the hydraulic pump/electric motor is perpendicular to the axis of the actuator. In another embodiment the axis of the hydraulic pump/electric motor is parallel to the axis of the actuator. Further still, in another embodiment the axis of the hydraulic pump/electric motor is at some angle between perpendicular and parallel to the axis of the actuator. In order to fully obtain the benefits of utilizing an air spring system with a high bandwidth single body active suspension actuator with integrated smart valve, it is desirable to be able to vary the gas pressure or the gas volume inside of the air spring, and one aspect relates to an air spring system with a (simplified) schematic of an air spring system, disclosing an air compressor, a gas control valve and pressure sensor and a controller adapted to control the gas pressure or the gas volume within the air spring. The schematic for active air spring control is well known in the art and the disclosed schematic is to demonstrate how such a system may be integrated into the active suspension system. The gas control valve may be of the solenoid type and may be of an at least a two position valve, a proportional valve, or other type of valve. These devices are well known in the art, and any such valve may be incorporated into the system. The disclosure is not limited to these particular types of valve, which are provided as examples among many possible types. In embodiments, the gas pressure sensor can be used by the active suspension system to calculate spring force.

In the exemplary embodiment the response time of active suspension actuator is substantially faster than that of the air spring, and in order to obtain suitably quick response characteristics from the air spring, so that can respond to the rapid varying road conditions and vehicle dynamics, it is desirable to reduce the latency period between the time of commanding a desired gas pressure and the time of achieving that gas pressure in the air spring. The response time may be measured as the time in creating a position change of the suspension, or the time in creating a force change in the suspension. This may necessitate the gas control valve being close coupled to the air spring so as to reduce latency generated by varying the pressure in the volume of gas contained in any interconnecting passage between the gas control valve and the air spring, and aspects relates to a schematic of an active suspension actuator with an air spring wherein the gas control valve is close coupled to the air spring. In embodiments, the integrated active suspension actuator controller may also supply the power and control for the solenoid gas control valve that controls the gas pressure inside of the air spring. This may offer benefits of reduced wiring and negating the need for a separate gas control valve controller, thereby reducing the impact of integration active suspension actuator with an air spring into the vehicle, increasing durability and reducing cost.

The ability to control the gas pressure within the air spring in concert with controlling the active forces of the active suspension actuator enables many novel control strategies, and aspects disclosed herein relate to such control strategies, which can greatly improve the dynamics, road holding and ride quality of the vehicle. One aspect allows for individual control of the active forces from each individual active suspension actuator and control the gas pressure of each of the corresponding air spring at each wheel, so that, for example, each active suspension actuator and air spring can respond to its individual wheel event.

Figure 62:
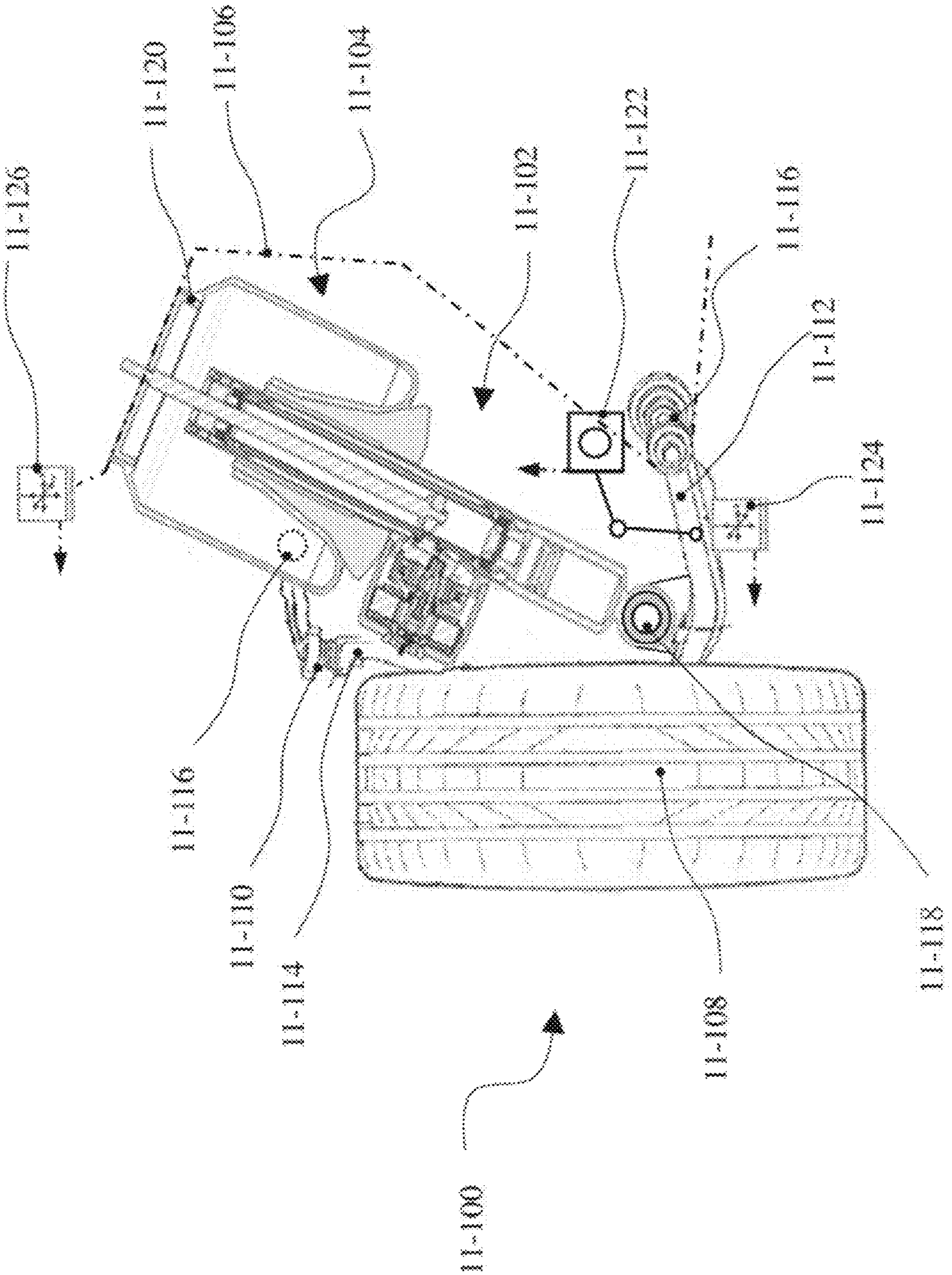
FIG. 62 is a side view of the single body actuator and integrated smart valve with air spring in a vehicle suspension system.

Turning now to the figures, FIG. 62 depicts a side view of the single body actuator and integrated smart valve with air spring in a vehicle suspension system. The suspension system 11-100 includes an active suspension actuator 11-102 integrated with an air spring 11-104 that is coupled between the chassis 11-106 and the wheel(s) 11-108. Generally, the chassis is commonly referred to as a sprung mass, while the wheel and mounting assembly are commonly referred to as an unsprung mass. As illustrated, the wheel 11-108 is coupled to the chassis and actuator 11-102 by an upper control arm 11-110, a lower control arm 11-112 and a mounting member 11-114 (which is commonly referred to as the knuckle). The upper control arm 11-110 and lower control arm 11-112 is coupled to the chassis at connection points 11-116, while the actuator is coupled to the lower control arm 11-112 via a lower mounting member 11-118 and to the chassis at an upper mounting member 11-120. A position sensor 11-122 may be located between the suspension mounting assembly and the chassis so that wheel position relative to the chassis can be monitored and used by for control of the active suspension actuator and/or air spring. An accelerometer 11-124 may be mounted on the unsprung mass so as to monitor wheel acceleration and an accelerometer(s) 11-126 may be mounted on the sprung mass so as to monitor chassis accelerations, the signals of which may also be used for control of the active suspension actuator and/or air spring. In the embodiment shown in FIG. 62, the air spring is depicted as an integral member of the active suspension actuator, mounted co-axially with the actuator axis, in an alternate embodiment the air spring may however, be a separate member from the actuator body, whereby the air spring is coupled directly to the chassis 11-106 and lower control arm 11-112 the, and the disclosure is not limited in this regard. In the embodiment disclosed in FIG. 62 an air spring is the primary force supporting the mass of the vehicle. In an alternate embodiment the air spring may, however, be a mechanical spring, such as a coil spring or leaf spring, etc., which may be also be coupled in parallel with the active suspension actuator that works in conjunction with the air spring to support the vehicle mass.

Figure 63:
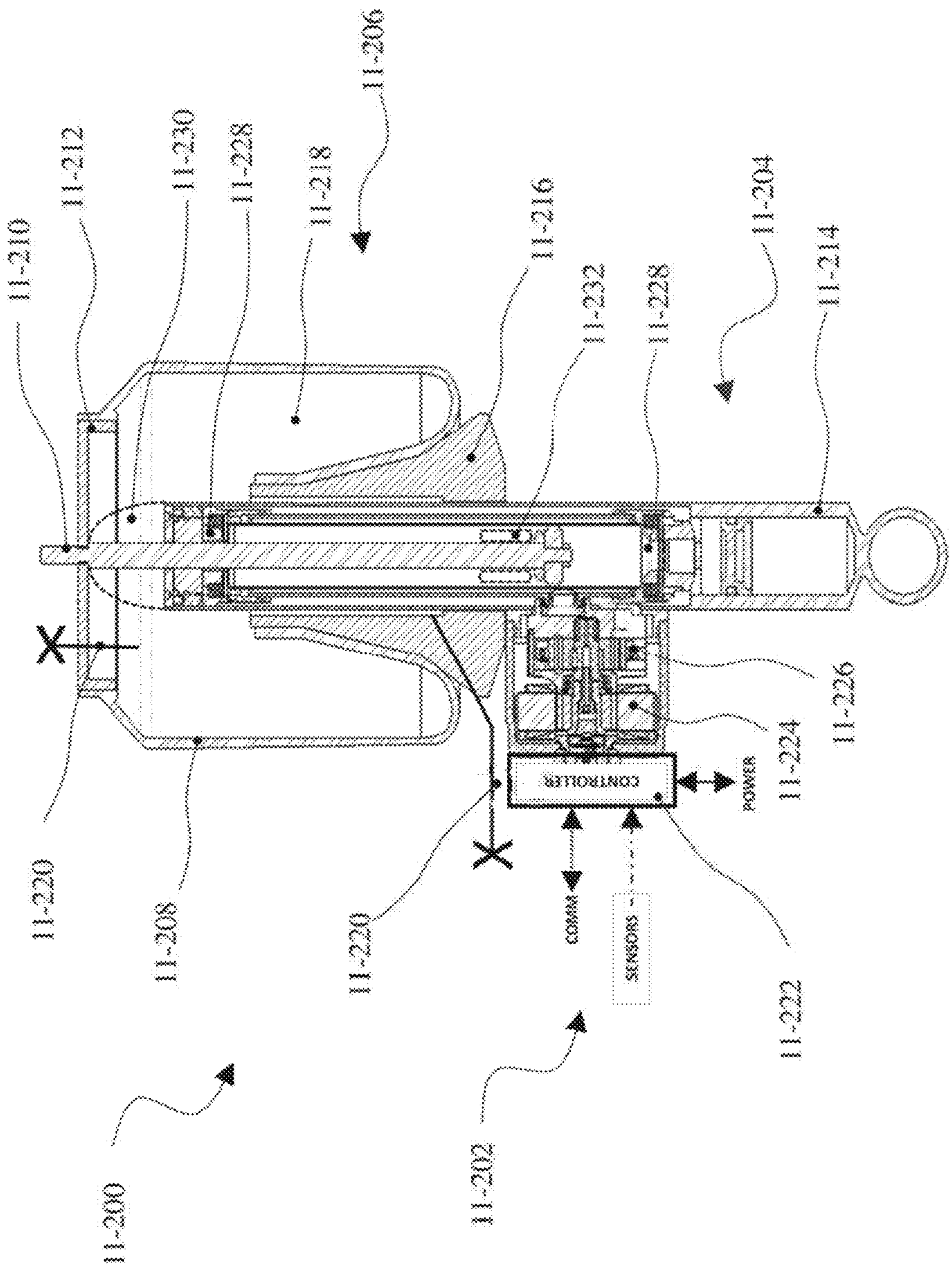
FIG. 63 is a cross section of the single body actuator with integrated smart valve and integrated air spring wherein the integrated smart valve is mounted with its axis perpendicular to the actuator axis

FIG. 63 depicts a cross section of the single body actuator with integrated smart valve and integrated air spring 11-200, wherein the integrated smart valve 11-202 is mounted with its axis perpendicular to the active suspension actuator 11-204 axis. In the embodiment of FIG. 63 the active suspension actuator is an electro-hydraulic device that comprises of an integrated smart valve 11-202 close coupled to a hydraulic actuator 11-204. The integrated air spring 11-206 is in the form of what is commonly known in the art as a piston-type, rolling lobe air spring. This comprises a flexible member 11-208 that is at one end rigidly connected to the damper piston rod 11-210, via a mounting member 11-212 and at the other end connected to the damper body 11-214 via the air spring piston 11-216, thereby enclosing a gas volume 11-218 within the elastomeric bladder 11-208. Gas pressure within the flexible member exerts a force between the piston rod 11-210 and piston 11-216, and hence the damper body 11-214. As the suspension travel changes and the actuator compresses and extends, the flexible member rolls along the surface of the piston 11-216. As depicted in the embodiment of FIG. 63, the piston 11-216 may contain a variable diameter profile so as to give a variable spring force that is position dependent at any given pressure within the air spring. In alternate embodiments, however, the piston may have a constant diameter profile, and the disclosure is not limited in this regard. A gas port connection 11-220 may be located in the mounting member 11-212 or in the piston 11-216. The gas port connection may connect to a gas line (or hose) or contain a port to accept a gas control valve (such as a solenoid control valve for example) directly into the mounting member or piston. Installing the gas control valve directly into the mounting member or air spring piston may be advantageous by reducing the gas volume in any passages between the gas control valve and the gas volume 11-218, thereby improving the response time of the air spring system. A gas pressure sensor may also be located in the mounting member or piston.

The integrated smart valve 11-202 comprises an electronic controller 11-222 and an electric motor 11-224 that is close coupled to a hydraulic pump 11-226. The hydraulic pump 11-226 is in hydraulic communication with the piston rod 11-210, so that when the piston rod moves in a first direction (e.g. a compression stroke) the hydraulic motor rotates in a first rotation, and when the piston rod moves in a second direction (e.g. an extension stroke) the hydraulic motor rotates in a second rotation. The active suspension actuator 11-204 may have a high motion ratio from the linear speed of the piston rod 11-210 to the rotational speed of the close coupled pump and motor, and during high velocity suspension events extremely high rotational speeds may be achieved by the close coupled pump and motor. In some cases this may cause damage to the pump and motor. To overcome this issue and allow the actuator to survive high-speed suspension events, a diverter valve(s) 11-228 may be used. The diverter valve(s) 11-228 is configured to activate at fluid flow rate (e.g., a fluid diversion threshold rate) and will divert hydraulic fluid away from the hydraulic pump 11-226 that is operatively connected to the hydraulic actuator in response to the hydraulic fluid flowing at a rate that exceeds the fluid diversion threshold. The fluid diversion threshold may be selected so that the maximum safe operating speed of the pump and motor is not exceeded, even at very high-speed suspension events. When the diverter activates and enters the diverted flow mode, restricting fluid flow to the hydraulic pump, a controlled split flow path is created so that fluid flow can by-pass the hydraulic pump in a controlled manner, thereby creating a damping force on the actuator so that wheel damping is achieved when the diverter valve is in the diverted flow mode. A diverter valve may be incorporated in at least one of the compression and extension stroke directions.

The active suspension actuator may contain an internal compression bump stop 11-230 that may engage to limit the stroke in the compression direction thereby reducing impact forces as the final compression stroke position is approached. The compression bump stop may be used to prevent over-compression of the air spring as well as to prevent collision and damage to internal components of the actuator at the maximum compression stroke position. The active suspension actuator may also contain an internal extension bump stop 11-232 that may engage to limit the stroke in the extension direction thereby reducing impact forces as the final extension stroke position is approached. The extension bump stop may be used to prevent over-extension of the air spring as well as to prevent collision and damage to internal components of the actuator at the maximum extension stroke position. Compression and extension bump stops may also be mounted external to the actuator relying upon other members of the suspension assembly to limit and reduce impact of the maximum compression and extension stroke positions.

The controller 11-222, is an electronic controller that controls the speed and/or torque of the electric motor 11-224 by applying a current and/or voltage through the motor windings, to generate or resist a force on the actuator, wherein changes of torque in the electric motor create changes in force in the hydraulic actuator of the active suspension actuator. In the passive quadrants of a vehicle suspension force-velocity curve, the active suspension actuator provides wheel damping via a back EMF from the electric motor, which is operatively coupled to the hydraulic pump/motor of the actuator. In embodiments, an integrated electronic controller 11-222 of a smart actuator may comprise both power and logic capabilities and may also include sensors, like a rotary position sensor, accelerometer, or temperature sensors etc. The electronic controller may also utilize signals from external sensors, such as suspension position sensors and chassis accelerometers, wheel accelerometers, air spring pressure sensors and the like. The electronic controller may also have the capability to communicate with other vehicle systems (via a bus, such as the controller area network (CAN) bus of a vehicle, FLEXRAY or other communication protocols, including wireless communication protocols), and these systems may include the other active suspension integrated controllers (including smart valve controllers and others) installed on the vehicle, an active suspension central controller, air spring controllers as well as non-suspension related vehicle systems such as steering, brake and throttle systems etc. The integrated electronic controller may also have the capability to supply power to and control the air spring gas control valve. In the embodiment of FIG. 63, the integrated smart valve 11-202 is mounted with the axis of the valve (e.g., the axis of close-coupled electric motor 11-224 and hydraulic pump 11-226) perpendicular, or substantially perpendicular, to the axis of the active suspension actuator 11-204.

Figure 64A:
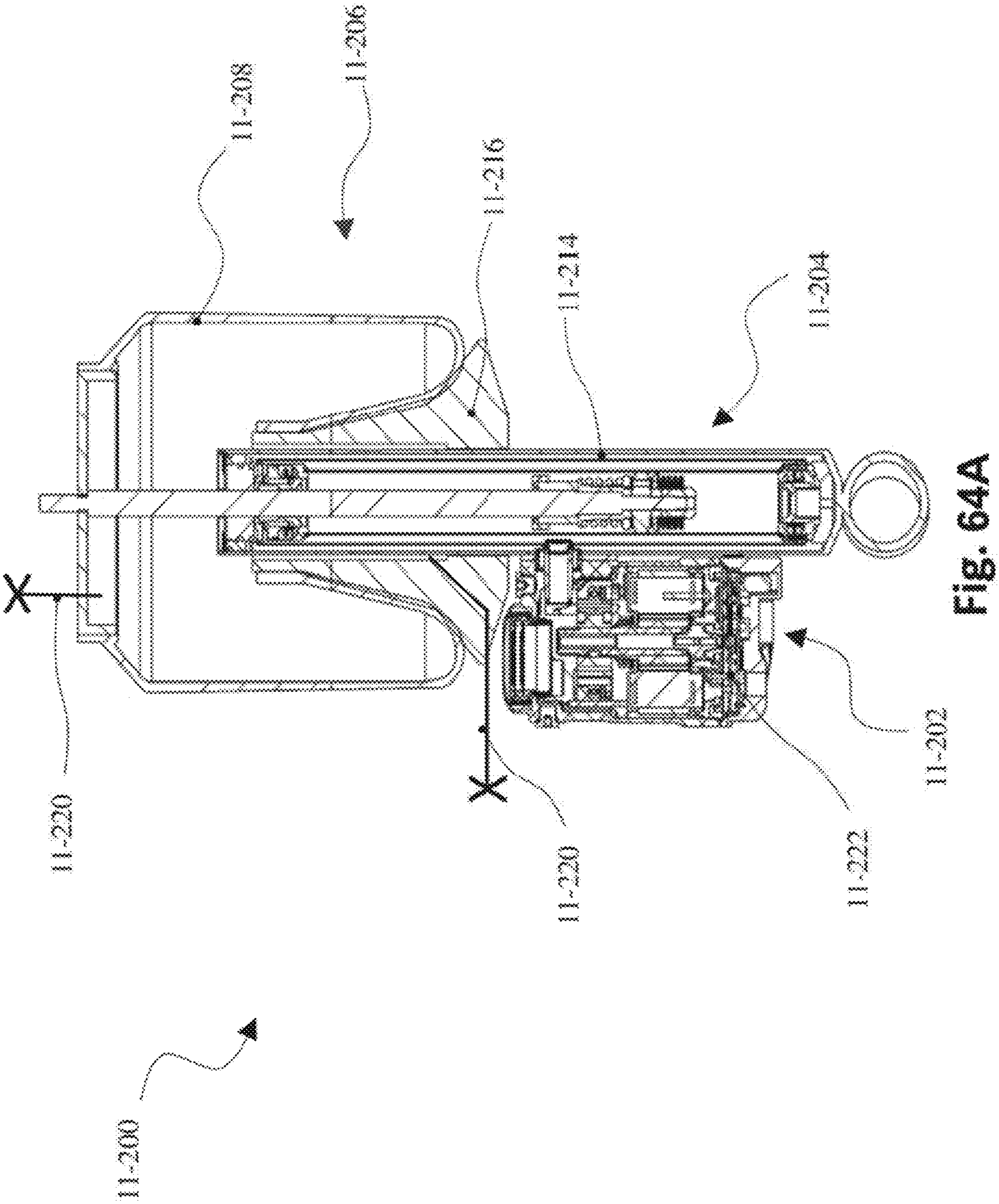
FIG. 64A is a cross section of the single body actuator with integrated smart valve and integrated air spring wherein the integrated smart valve is mounted with its axis parallel to the actuator axis.
Figure 64B:
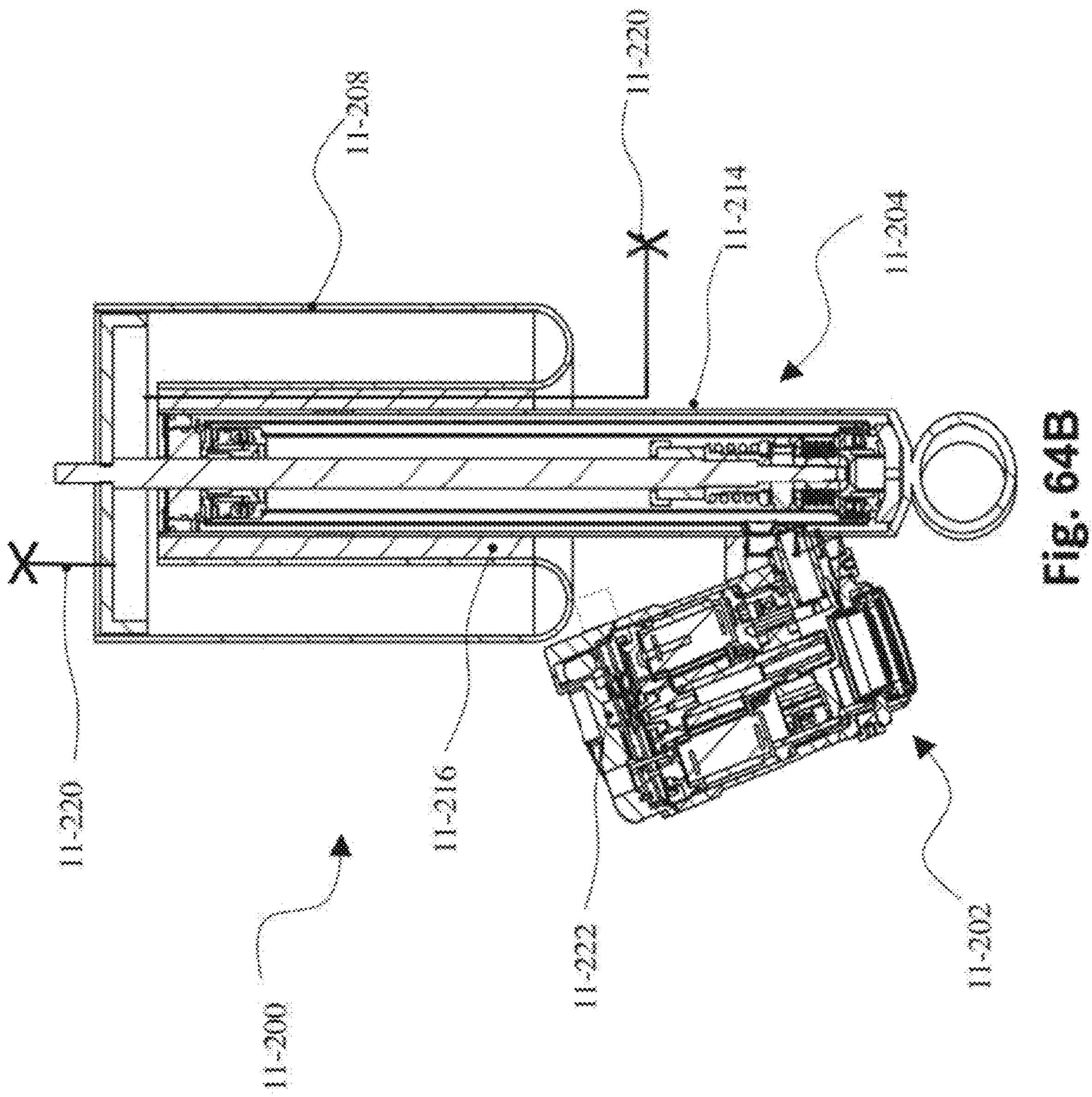
FIG. 64B is a cross section of the single body actuator with integrated smart valve and integrated air spring wherein the integrated smart valve is mounted with its axis at some angle to the actuator axis

In the embodiments shown in FIGS. 64A and 64B a cross section of the single body actuator with integrated smart valve and integrated air spring wherein the integrated smart valve is mounted with its axis parallel to the actuator axis and at some angle to the actuator axis respectively, is depicted. In certain applications, to ease the integration of the air spring onto the actuator, or to ease the integration of the active suspension actuator and air spring into the suspension system of a vehicle, it may be beneficial to mount the smart valve so that the orientation of the smart valve (e.g., the axis of the close coupled hydraulic pump/electric motor) is parallel or at some angle between parallel and perpendicular to the axis of the active suspension actuator. Due to the flexibility of the mounting arrangement between the active suspension actuator and the smart valve, it is possible to mount the smart valve in many orientations and positions on the actuator body, with the axis of the smart valve at any angle relative to the axis of the actuator body, thereby allowing the volume occupied by the smart valve to be positioned in an orientation where it will not interfere with either the air spring installation or any of the suspension members or chassis members, at any position of the actuator stroke, from full compression to full extension. In FIG. 64A the smart valve 11-202 is mounted with its axis parallel to that of the actuator axis 11-214.

In certain applications, such as in applications where the diameter of the air spring piston 11-216 is close to the diameter of the actuator body 11-214, as shown in FIG. 64B the flexible member of the air spring may encroach upon the smart valve as the actuator compresses. In such applications it is possible to orient the smart valve in a position and orientation so as to clear the flexible member of the air spring. In FIG. 64B the smart valve 11-202 is mounted with its axis at some inclination angle between perpendicular and parallel to that of the actuator axis 11-214 so that the smart valve clears the flexible member 11-208 of the air spring 11-206. The smart valve may also be extended away from actuator body in combination (or instead of) inclining the angle of the smart valve axis, to gain operating clearance.

Figure 65:
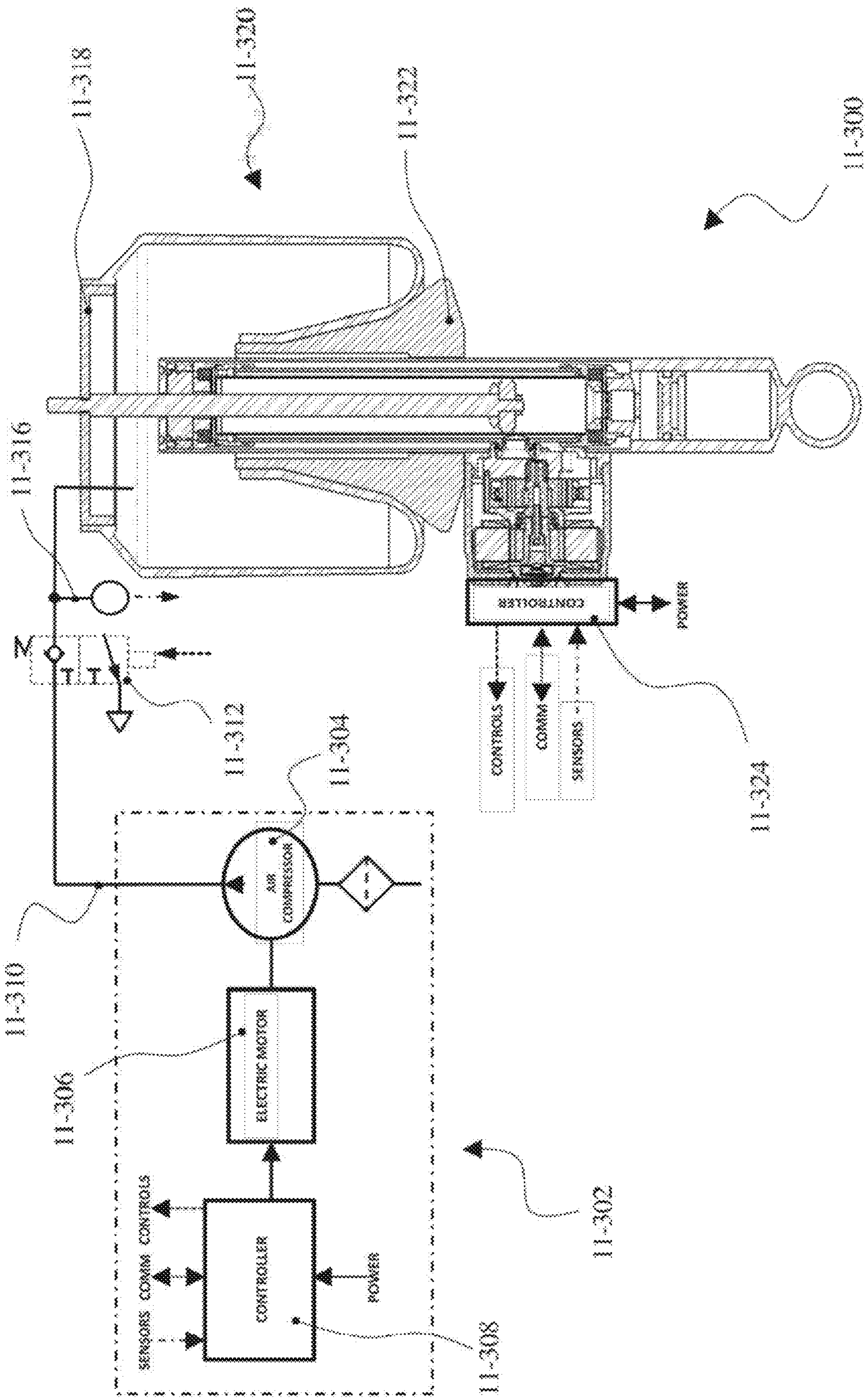
FIG. 65 is a single body actuator with integrated smart valve with air spring and schematic of the air and electrical systems.

In the embodiment shown in FIG. 65 an active suspension actuator with an integrated air spring 11-300 and air supply system is shown in schematic form. The air supply system comprises of an air compressor assembly 11-302, which itself may comprise of an air pump 11-304, an electric motor 11-306, and an electric motor controller 11-308. The air compressor assembly may also comprise of other components such as air filters, air dryers, air regulator and relief valves and pressure sensors/switches etc., which are not shown, as this arrangement is well known in the art and the disclosure is not limited in this regard. The air compressor supplies air pressure and flow to a supply line 11-310 that is in fluid connection with the gas control valve 11-312. The response time of the active suspension actuator 11-324 is substantially faster than that of the air spring 11-320, and in order to obtain suitably quick response characteristics from the air spring, it is desirable to reduce the latency from commanding a desired gas pressure to achieving that gas pressure in the air spring. This may necessitate the gas control valve being close coupled to the air spring so as to reduce latency generated by varying the pressure in the volume of gas contained in any interconnecting passage between the gas control valve and the air spring, and aspects relate to a schematic of an active suspension actuator with an air spring wherein the gas control valve is closely coupled to the air spring. In the embodiment shown, the gas control valve 11-312 and an air spring pressure sensor 11-316 are shown proximal the top mounting plate 11-318 of the air spring 11-320. In an alternative embodiment the gas control valve 11-312 and air spring pressure sensor 11-316 may be proximal to the air spring piston 11-322. In this arrangement the gas control valve will be in fluid connection with the air compressor via a flexible line (or hose). In an alternative arrangement, the gas control valve 11-312 may be proximal to the mounting plate 11-318, while the gas pressure sensor 11-316 may be proximal to the air spring piston 11-322, and vice versa.

The motor controller 11-308 may comprise both power and logic capabilities and may also include sensors such as gas pressure sensors and the like. The motor controller may also utilize signals from external sensors, such as suspension position sensors and chassis accelerometers, air spring pressure sensors, and the like. The motor controller 11-308 may also contain the logic and power to control the gas control valve 11-310 that controls the pressure inside of the air spring 11-312. The motor controller 11-308 may also have the capability to communicate with other vehicle systems (via CAN bus, FLEXRAY or other communication protocols, including wireless communication protocols), these systems may include the active suspension integrated smart valve controller(s) 11-324 installed on the vehicle, an active suspension central controller, as well as non-suspension related vehicle systems such as steering, brake and throttle systems, etc. The motor controller may also serve as a vehicle active suspension central controller, in communication with the active suspension integrated smart valve controllers and gas control valves and all required sensors and systems so as to act as the primary logic source to control both the active suspension actuators and the active air spring systems. In an alternative embodiment, the motor controller 11-308 may only control power to the electric motor that drives the air compressor, and rely upon communication from other controllers such as the individual active suspension smart valve controllers or the active suspension central controller, etc., for logic control. In an alternative embodiment, the active suspension integrated smart valve controllers may supply power and control for the gas control valve 11-312 and may utilize the signal from the gas pressure sensor 11-316 for logic control. The gas pressure sensor 11-316 may be used by the active suspension system to calculate spring force.

The level of power and control that is shared between the various controllers described herein may be at any combination of the arrangements described above and anyone skilled in the art can design and implement such systems accordingly and therefore the patent is not limited in this regard.

Figure 66:
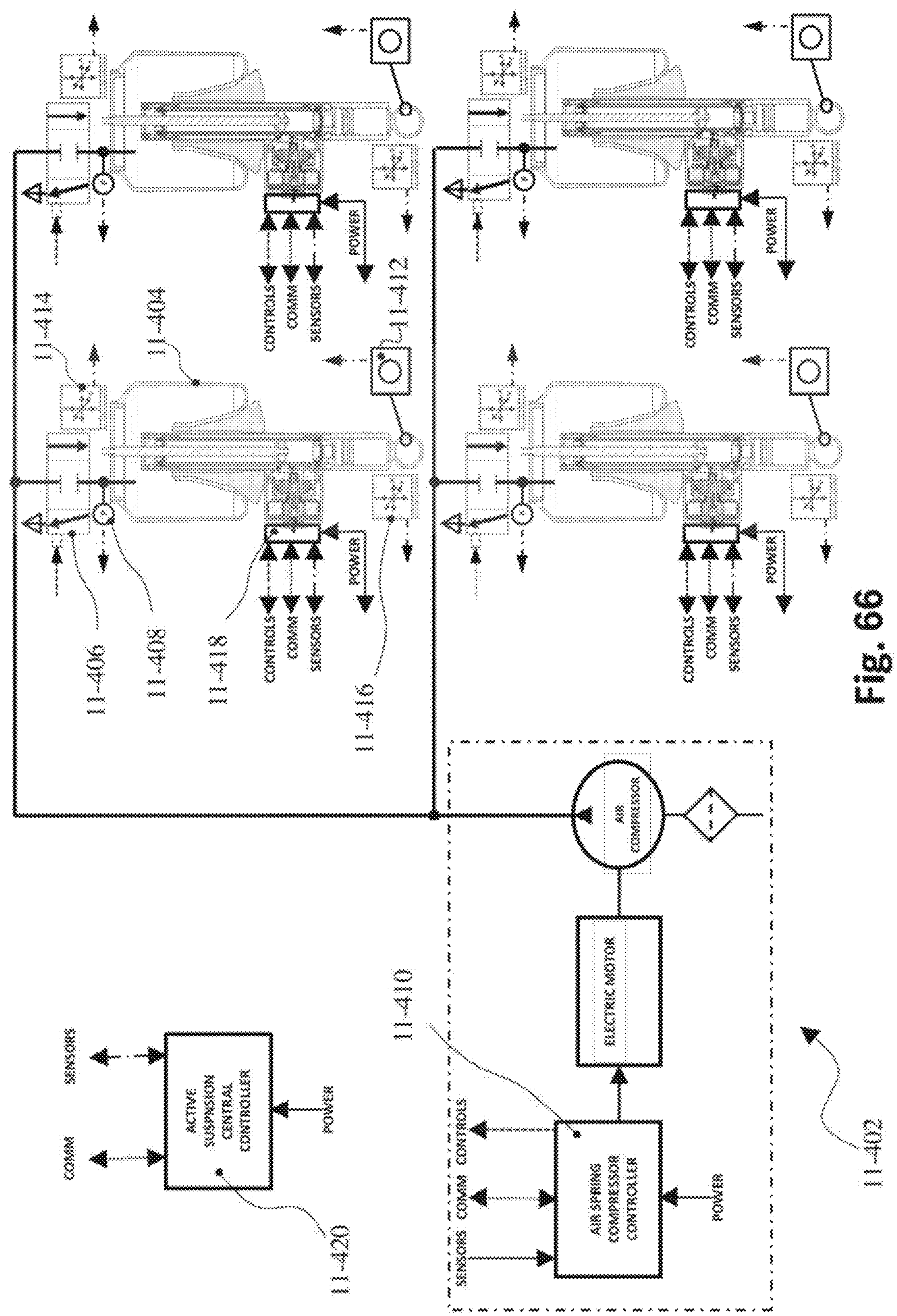
FIG. 66 is a schematic of four single body actuators with integrated smart valves and air springs as used in a vehicle installation.

In the embodiment shown in FIG. 66 a schematic of four single body actuators with integrated smart valves and air springs as used in four corners of a two-axle, four wheeled vehicle installation is disclosed. The schematic may of course be expanded or reduced to suit vehicles with more or fewer wheels accordingly. The four active suspension actuators with air springs are mounted at the four wheel locations of a vehicle and are connected to the wheel assembly and chassis as disclosed in the embodiment of FIG. 62. In this arrangement the air supply system 11-402 is configured so that it can supply four individual air springs 11-404, whereby the gas pressure inside of each air spring can be controlled individually or in unison. Each air spring may have a dedicated gas control valve 11-406 and gas pressure sensor 11-408. The locations of these may be proximal to either the mounting plates or the air spring pistons as described in the embodiment of FIG. 65.

The air compressor of the air supply system may be controlled by the motor controller 11-410, which may comprise of both power and logic capabilities and may also include sensors such as gas pressure sensors etc. The motor controller may also utilize signals from external sensors such as suspension position sensors 11-412, chassis accelerometers 11-414, wheel accelerometers 11-416, air spring pressure sensors 11-408 and the like. The motor controller 11-410 may also contain the logic and power to control the gas control valves 11-408 that control the pressure inside of the air springs 11-404. The motor controller 11-410 may also have the capability to communicate with other vehicle systems (via a vehicle bus, such as the CAN bus, by FLEXRAY or by other communication protocols, including wireless communication protocols), these systems may include the active suspension integrated smart valve controllers 11-418 installed on the vehicle, an active suspension central controller 11-420, as well as non-suspension related vehicle systems such as steering, brake and throttle systems etc.

The system of the embodiment of FIG. 66 may contain an active suspension central controller 11-420 that may be in communication with the active suspension integrated smart valve controllers 11-418 and the air spring motor controller 11-410 and may utilize signals from external sensors such as the suspension position sensors 11-412, the chassis accelerometers 11-414, the wheel accelerometers 11-416, the air spring pressure sensors 11-406, and the like, and may also contain the logic and power to control the gas control valves 11-408 that control the pressure inside of the air springs 11-404. The controller 11-420 may also have the capability to communicate with other non-suspension related vehicle systems such as steering, brake and throttle systems, etc., and it may contain the required protocols to control the active suspension actuator controllers 11-418 and the active air spring systems controller 11-410.

The motor controller 11-410 may also serve as a vehicle active suspension central controller, as described above. In an alternative embodiment, the motor controller 11-410 may only control power to the electric motor that drives the air compressor, and rely upon communication from other controllers such as the individual active suspension smart valve controllers 11-418 or the active suspension central controller 11-420, etc., for logic control. In an alternative embodiment, the active suspension integrated smart valve controller(s) may supply power and control for their connected gas control valve(s) and may utilize the signal from each corresponding gas pressure sensor for logic control.

The level of power and control that is shared between the various controllers described herein may be at any combination of the arrangements described above, and one skilled in the art can design and implement such systems accordingly. The disclosure is not limited in this regard.

The controllers may contain protocols and be adapted, and the active air system and active suspension system may be adapted, such that each air spring and actuator may be controlled individually, independent of the other or may be controlled in unison, and can be adapted so that the various control strategies can be achieved as describe below.

In embodiments, the force from the air spring may work in conjunction with the force from that of the actuator or may work against that of the actuator, regardless of the input to the suspension assembly from the wheel due to road inputs.

In embodiments, the control of the individual air springs may be configured so that when a roll event is detected roll mitigation control can be achieved by controlling the either the air pressure and/or the air volume in the air springs of the two outside wheels to the turn so that it is larger than the pressure and/or the air volume of the two inside wheels, and the active suspension actuator creates a downward force on the outside wheels, and an upward force on the inside wheels, wherein the vehicle has at least two modes of operation, wherein stiffness of the air spring and average damping force of the hydraulic actuator change in unison.

In embodiments, when a sport (a first) mode is selected, a stiffer air spring and higher actuator damping is commanded and when a comfort (a second) mode is selected, a softer air spring rate and lower actuator damping is commanded.

In embodiments at least one of the hydraulic actuators and the air springs is configured to recuperate energy, and when an economy mode is selected, energy is captured.

In embodiments the spring constant of the air spring changes with respect to at least one of air volume and pressure in the air spring.

In embodiments the air spring and the active suspension actuator are controlled by separate processor-based controllers that coordinate changes to ride height and wheel force to mitigate impact of at least one of wheel events and vehicle events on occupants of the vehicle.

In embodiments the air spring and the active suspension actuator share a common controller for controlling ride height and wheel force.

In embodiments at least one of vehicle ride height actions and wheel force actions taken by the air spring are coordinated with at least one of vehicle ride height actions and wheel force actions taken by the active suspension system.

In embodiments the actuator and the air spring create force in the same direction during a first mode, and opposite directions during a second mode.

In embodiments the actuator force changes at a first frequency, and air spring force/height changes at a lower, second frequency.

In embodiments the response of the active suspension actuator changes based on selected ride height of the air spring.

In embodiments a method for calculating wheel force in an active suspension on a vehicle, comprising of a pneumatic air spring disposed between the wheel and the vehicle chassis; an actuator generating force on the air spring, with at least one pressure sensor operatively connected to the air spring; and at least one position sensor measuring one at least of vehicle ride height, air spring displacement, and suspension positions. In embodiments a controller for the active suspension system calculates wheel force based on the actuator force, the air spring force, and the inertial force from the unsprung mass. In embodiments the actuator is driven by an electric motor and the actuator force is a function of measured current in the electric motor. In embodiments the air spring force is calculated by multiplying measured air pressure with the effective area of the air spring at the current displacement, which is calculated based on the position sensor data. In embodiments the inertial force of the unsprung mass is calculated by multiplying the mass of the unsprung mass by the acceleration of the unsprung mass. In embodiments acceleration of the unsprung mass is measured with one of an accelerometer and at least one position sensor by double differentiating the position. In embodiments the wheel force is calculated for low frequencies, and used by the control protocol for the active suspension actuator.

In embodiments the vehicle suspension system comprises of an air spring that causes low frequency changes to a vehicle ride height in response to commands of a controller; and the integrated four-quadrant capable active suspension system having a hydraulic actuator that causes high frequency changes to wheel force via applying at least one of torque commands and velocity commands applied to an electric motor that is coupled to a hydraulic pump that affects fluid flow that changes a position of a piston in a hydraulic actuator, wherein the hydraulic actuator is operatively in parallel to the air spring.

In embodiments a method of mitigating impact of wheel events on vehicle occupants, comprises; identifying a first set of frequency components of a wheel/body event; identifying a second set of frequency components of the wheel/body event; controlling an air spring with a computerized controller to mitigate impact of the first set of frequency components; and controlling active suspension actuator with a computerized controller to mitigate impact of the second set of frequency components, wherein the air spring and the actuator are operatively disposed substantially between a vehicle and a wheel of the vehicle such that they are operatively in parallel.

In embodiments the first set of frequency components comprise frequencies that are lower than the second set of frequency components.

In embodiments the first set of frequency components are selectable from a range of frequencies that are associated with low frequency vehicle motion and the second set of frequency components are selectable from a range of frequencies that are associated with high frequency wheel motion.

In embodiments a vehicle suspension controller for a wheel of a vehicle comprises a first protocol for determining electric motor commands of an electro-hydraulic suspension actuator; a second protocol for determining commands for the pneumatic valves and air compressor of a suspension air spring; and a processor for executing the first protocol and the second protocol to control the electro-hydraulic suspension actuator and the air-spring to cooperatively control position and rate of movement of the wheel, wherein the electro-hydraulic suspension actuator and the air spring are operatively disposed in parallel between the wheel and the vehicle.

In embodiments the controller executes the first protocol when presented with data indicative of at least one of a wheel event and a vehicle event that is suitable for being mitigated by the air spring.

In embodiments the controller executes the second protocol when presented with data indicative of at least one of a wheel event and a vehicle event that is suitable for being mitigated by the electro-hydraulic suspension actuator.

In embodiments the controller adjusts displacement of the air spring when presented with data indicative of at least one of a wheel event and a vehicle event that is suitable for being mitigated by the air spring.

In embodiments the controller adjusts displacement of the electro-hydraulic suspension actuator when presented with data indicative of at least one of a wheel event and a vehicle event that is suitable for being mitigated by the electro-hydraulic suspension actuator.

In embodiments the controller is adapted to control at least one of air pressure and air volume of the air spring and the force from the linear actuator such that the controller adjusts average ride height of the vehicle; and a command from the controller wherein during a fast ride height increase event, both the air spring air volume is increased and the actuator force is increased in the extension direction.

In embodiments after a threshold of time the active suspension actuator force is decreased and at least one of the air spring pressure and the air spring volume remains constant.

In embodiments a threshold is a function of the air spring system response time, such that the actuator provides the dominant vehicle lift force immediately after the fast ride height increase event, and the air spring provides the dominant vehicle lift force at time greater than the response time of the air spring.

An active roll mitigation system for a vehicle having a first side and a second side, and comprises of; at least one active suspension actuator operatively disposed between at least one first side of the vehicle wheel and the chassis of the vehicle; at least one air spring operatively disposed between at least one first side of the vehicle wheel and the chassis of the vehicle, such that it operates in parallel to the active suspension actuator; at least one active suspension actuator operatively disposed between at least one second side of the vehicle wheel and the chassis of the vehicle; at least one air spring operatively disposed between at least one second side of the vehicle wheel and the chassis of the vehicle, such that it operates in parallel to the active suspension actuator; at least one air compressor configured such that static air pressure may be uniquely selected for each of at least one first side air spring and at least one second side air spring; at least one sensor to detect vehicle roll; and a controller adapted to control air pressure of the air spring and force from the linear actuator such that during detected vehicle roll, the controller increases air pressure in at least one air spring on the first side and creates an extension force on at least one actuator on the first side, and decreases air pressure in at least one air spring on the second side and creates a compression force on at least one actuator on the second side.

In embodiments the air spring system further comprises a range of air spring pressures having a minimum and a maximum pressure limit, and when the limit is reached the controller does not exceed the maximum pressure limit. In embodiments the pressure is measured using at least one of a pressure sensor and a position height sensor.

In embodiments the air spring system further comprises a range of air spring volumes having a minimum and a maximum volume limit, and when the limit is reached the controller does not exceed the maximum volume limit. In embodiments the volume is measured using at least one of a volume sensor and a position height sensor.

In embodiments the active suspension actuator further comprises a minimum and a maximum force limit, and when the limit is reached the controller does not exceed the operational force range.

In embodiments during a detected roll event at least one of the linear actuator and air spring are further controlled by a body/wheel control protocol that further comprises at least one electronically controlled valve that can set different air pressures in the first side and second side air springs.

In embodiments air spring pressure and the active suspension actuator forces are controlled independently in all four corners of a two axle, four wheeled vehicle, wherein a first side constitutes a left side of the vehicle, and a second side constitutes a right side of the vehicle and adapted to create pitch control, wherein the first side constitutes a front axle of the vehicle, and the second side constitutes a rear axle of the vehicle.

In embodiments during a roll mitigation event wheel damping is still effected to control wheel motion even though the forces for wheel control may be contrary to those required for wheel control.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Predictive Analytic Algorithm and System for Inertia Compensation

In many applications an actuator is used to isolate a target system from unwanted disturbance inputs. For many types of actuators, including for example ballscrew actuators, rack-and-pinion actuators, hydraulic actuators, and similar, the mechanical impedance of the actuator itself is a real concern for its applicability, since it often introduces harshness at frequencies outside of the desired control bandwidth.

An actuator with high rotary or linear inertia cannot behave like a pure force source unless that inertia is electronically or otherwise mitigated. For the purposes of a feedback system, it is ideal to have a pure force source as an actuator since any mechanical impedance of the actuator will create a force that is correlated with the motion of the actuator. For this purpose, many attempts have been made to compensate for the inherent inertia present in many types of actuators, such as rotary electric motors.

The present invention describes a predictive algorithm used to mitigate inertia effects. The term "algorithm" should be understood to encompass, except where context indicates otherwise, enabling modules, components, computer models, data structures, computer-based methods and systems for enabling a series of steps to determine an output based on a set of input parameters, and execution of a series of data input, calculation and transformation steps, and the like. A pure feedback compensation scheme is limited in its performance by any delays in the system, and will typically only be able to compensate for inertia at low frequency while decreasing the performance of the system at higher frequency. In a typical application on the other hand the high frequency behavior of the system is crucial to the commercial viability, for example in an automotive suspension the high frequency impedance of an actuator will create unacceptable harshness even if the low frequency performance of the system is good.

In the current invention, a predictive algorithm uses advance information from sensors upstream with respect to the disturbance from the actuator's force source to mitigate the expected effects of this inertia, and thus create a more backdriveable system.

The way to solve this is to use advance information from a sensor upstream with respect to the disturbance, for example an accelerometer on an element closer to the road in a suspension system, or a laser- or camera-based look-ahead system, or an algorithm predicting the rear wheel motion based on the front wheel, to feed a model of the physical elements. The resulting expected acceleration can then be compensated in a feed-forward way to significantly reduce the effects of the inertia of the system.

The data from the sensor is fed into a computer model, which may faciliate execution of a model-based control algorithm that takes into account the physical and operational parameters of the actuator, the vehicle in which it is disposed, and the environment in which the vehicle operates, and produces an inertial compensation control force, which is added to the overall control command, and which at least partially mitigates the measured inertia when the system is back-driven.

In a rotary actuator, the compensation command can be calculated by using the predicted acceleration of the system and multiplying it by the known rotational inertia of the rotating components of the actuator. In one instantiation, this rotary actuator could be an electric brushless direct current (BLDC) motor, coupled to a linear motion device through a transmission mechanism, such as a rack-and-pinion or a ballscrew. In this case the rotary inertia would include the rotor, and the components of the mechanism that rotate with the rotor, scaled by their respective motion ratio.

According to one aspect, a method for inertia compensation in a back-drivable hydraulic actuator, comprises a back-drivable hydraulic actuator in fluid coupling with a hydraulic pump. The hydraulic pump is operatively coupled to an electric motor and the hydraulic pump and electric motor comprise of a rotatable element that has a moment of inertia. At least one sensor disposed to sense a disturbance before said disturbance causes angular acceleration of the rotatable element of the electric motor and pump is used to generate an inertial compensation force with a model-based algorithm that takes into account physical parameters of the hydraulic actuator, and information from the sensor. The resulting inertial compensation force is then used to modify a force command on the actuator (e.g., by adding the compensation force to the force command that would otherwise be applied on the actuator).

In some embodiments, the hydraulic actuator is compliant, and the hydraulic pump exhibits a leakage. In other embodiments, the system comprises at least one passive hydraulic valve allowing fluid to at least partially bypass the hydraulic motor. On other embodiments, the model and model-based algorithm comprise a non-linear control scheme for inertia cancellation. The model and model-based algorithm can also contain at least one variable that adapts as a function of vehicle state. Sensing elements can in some embodiments be vision cameras, wheel accelerometers, or tire pressure sensors. The physical parameters may in some embodiments comprise moment of inertia data of rotating elements that are controllable by the electric motor. In other embodiments, the moment of inertia data comprises data representative of a mass of an electric motor rotor and the rotatable portion of the hydraulic pump. The rotating elements can comprise an electric motor, a hydraulic pump, or other. At least one sensor comprises sensing data consisting of at least one of wheel motion that is detected before a force command to mitigate the wheel motion is applied to the suspension actuator, look-ahead data that provides information about upcoming road conditions, data from an algorithm that predicts rear wheel motion based on front wheel motion, and data indicative of tire deflection as the tire makes rotational contact with a road. In some embodiments, adding the inertia compensation force to the force command facilitates high frequency operation of the active suspension system that is improved over use of the raw force command to operate the back-drivable hydraulic actuator.

According to one aspect, a back-drivable hydraulic actuator controller, comprises a back-drivable hydraulic actuator in fluid coupling with a hydraulic pump, an electric motor operatively coupled to the hydraulic pump, wherein the rotatable component of the electric motor and hydraulic pump have a moment of inertia, at least one sensor, wherein the sensor is disposed to sense a disturbance before said disturbance causes angular acceleration of the rotatable element of the electric motor and pump, and an electronic controller that controls at least one of torque and velocity of the electric motor, wherein the electronic controller calculates an inertial compensation force with a model-based algorithm that takes into account physical parameters of the hydraulic actuator, and information from the sensor, and adds the generated inertial compensation force to a force command on the actuator.

In some embodiments, the hydraulic actuator is compliant, and the hydraulic pump exhibits a leakage. In some embodiments, the system comprises at least one passive hydraulic valve allowing fluid to at least partially bypass the hydraulic motor. In some embodiments, the model-based algorithm comprises a non-linear control scheme for inertia cancellation. In other embodiments, the model and model-based algorithm contain at least one variable that adapts as a function of vehicle state. The at least one sensor may be at least one of: a vision camera, a wheel accelerometer, and a tire pressure sensor. In some embodiments, the force command is the output of an actuator control algorithm, wherein the actuator control algorithm may reside on the electronic controller.

According to one aspect, a method of predictive inertia compensation in an active suspension system, comprises generating an inertial compensation force with a model-based algorithm that takes into account physical parameters of a vehicle suspension actuator and information indicative of an upcoming actuator acceleration event; and adjusting a torque/velocity applied to an electric motor of the vehicle suspension system actuator by adding the generated inertial compensation force to a present torque/velocity force command applied to the electric motor.

In some embodiments, the torque/velocity is adjusted by adding the inertia compensation force to the present torque/velocity force command facilitates high frequency operation of the active suspension system that is improved over use of the torque/velocity force command alone to operate the active suspension system. In other embodiments, the physical parameters comprise both moment of inertia data of a rotating element of the electric motor and actuator compliance data. The actuator compliance data may relate to at least one of a parameter of a hydraulic pump and a parameter of at least one passive valve. In some embodiments, the model and model-based algorithm facilitate calculating compensation forces for rotating inertia of rotating elements of the vehicle suspension actuator. In other embodiments, the model and model-based algorithm facilitate calculating compensation forces for linear inertia of linear-movement elements of the vehicle suspension actuator. In yet other embodiments, the model-based algorithm is adaptive to at least one change in vehicle state.

The predictive algorithm works well in conjunction with frequency-dependent damping algorithms in an active suspension by separating the effects of the actuator inertia from the dynamics of the wheel. In a typical application, the frequency-dependent damping must be tuned to also cancel any effects of inertia on the system response. In systems with high rotary inertia, the effects on wheel motion can be dramatic since the inertia will look like an added mass to the wheel in some frequency ranges, and will lower the wheel resonance and create uneven road contact force when the system is excited. Using frequency-dependent damping algorithms alone to mitigate these effects is impractical as it runs into the same limits described in this patent for pure feed forward or feedback cancellation of the inertia. Working in conjunction with the predictive algorithm for inertia mitigation described here, the frequency dependent wheel damping can be tuned to provide the best wheel damping performance, without causing large body motion.

The predictive algorithm can be used in a compact hydraulic actuator mounted in the wheel well on a damper. A compact hydraulic actuator will typically exhibit large inertia effects since in order to maintain the size of the actuator small, a large mechanical advantage is often used to gear up the motor torque to provide high actuator force. The side effect of this is an increased effect of the rotating inertia of the system (as described above, it goes with the square of the motion ratio), which leads to not being able to use these kinds of actuators in many applications without the use of the predictive algorithm for inertia cancellation.

The predictive algorithm can be a component of the adaptive controller for hydraulic power packs, where the hydraulic actuator's inertia is important. An adaptive control system for hydraulic power packs, where the hydraulic power pack exhibits large inertia, cannot be used in many automotive applications unless it can also mitigate the effects of inertia in the system.

Figure 67:
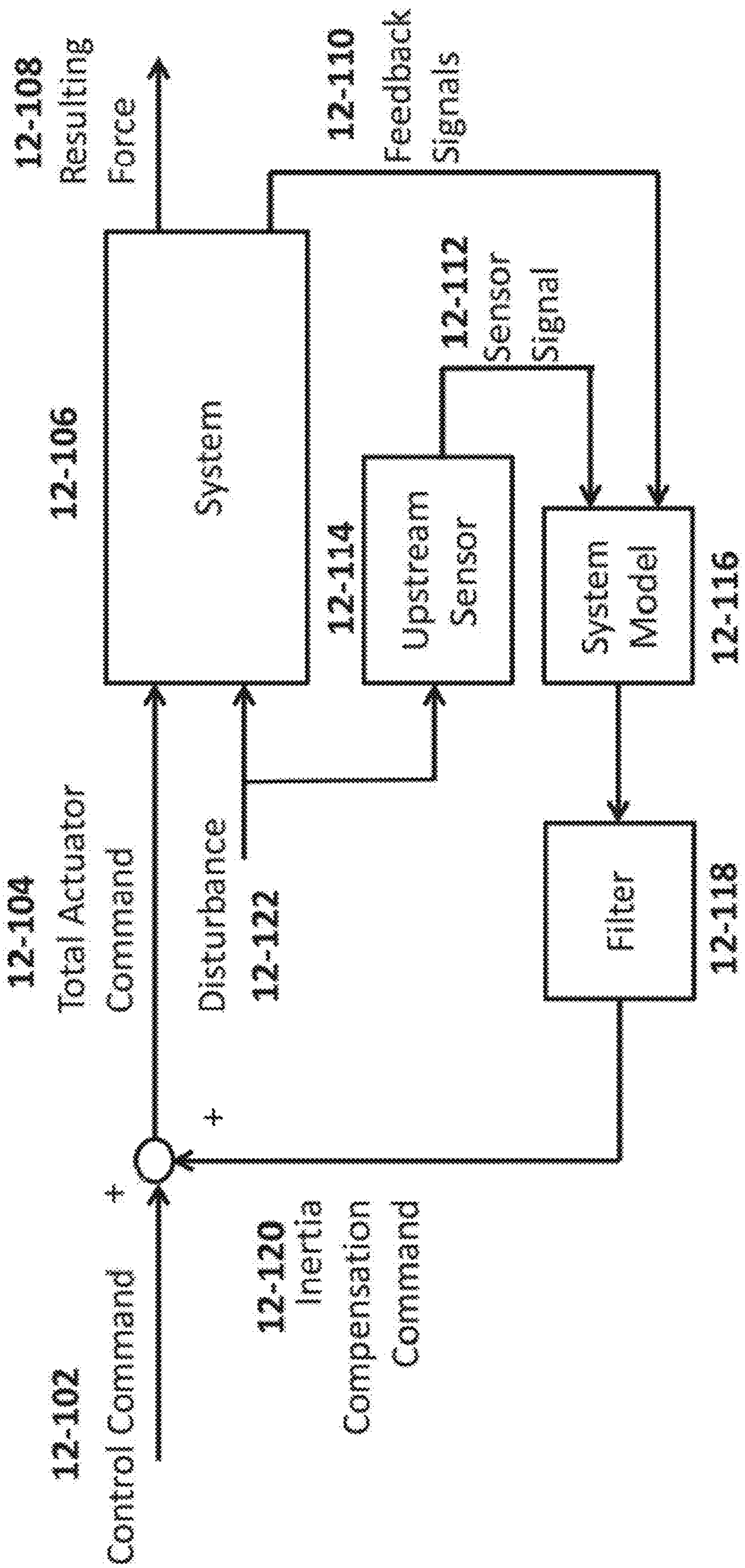
FIG. 67 shows the general schematic layout of the system.

FIG. 67 shows the general schematic layout of the system.

A disturbance [12-122] impacts a system [12-106], and together with a total actuator command [12-104] creates a system response. The response specifically is important in that it creates a resulting force [12-108], and measured feedback signals [12-110] that can comprise acceleration, velocity, position, or other measurable quantities. The system is also driven by a control command [12-102], which can be an open or closed loop command signal with specific goals for system behavior, for example isolating the system from disturbances or following a desired motion path.

The inertia of the system will originate a component of the resulting force [12-108] that is causally related to the disturbance [12-122], and which in many cases is difficult to control through classic feedback control techniques.

In the current system, one or more upstream sensors [12-114] are used to create a sensor signal [12-112], which in conjunction with the feedback signals [12-110] is fed into a system model [12-116]. The model predicts the effects of the inertia, and through a control filter [12-118] the desired inertia compensation command [12-120] is calculated and added to the control command [12-102].

Figure 68:
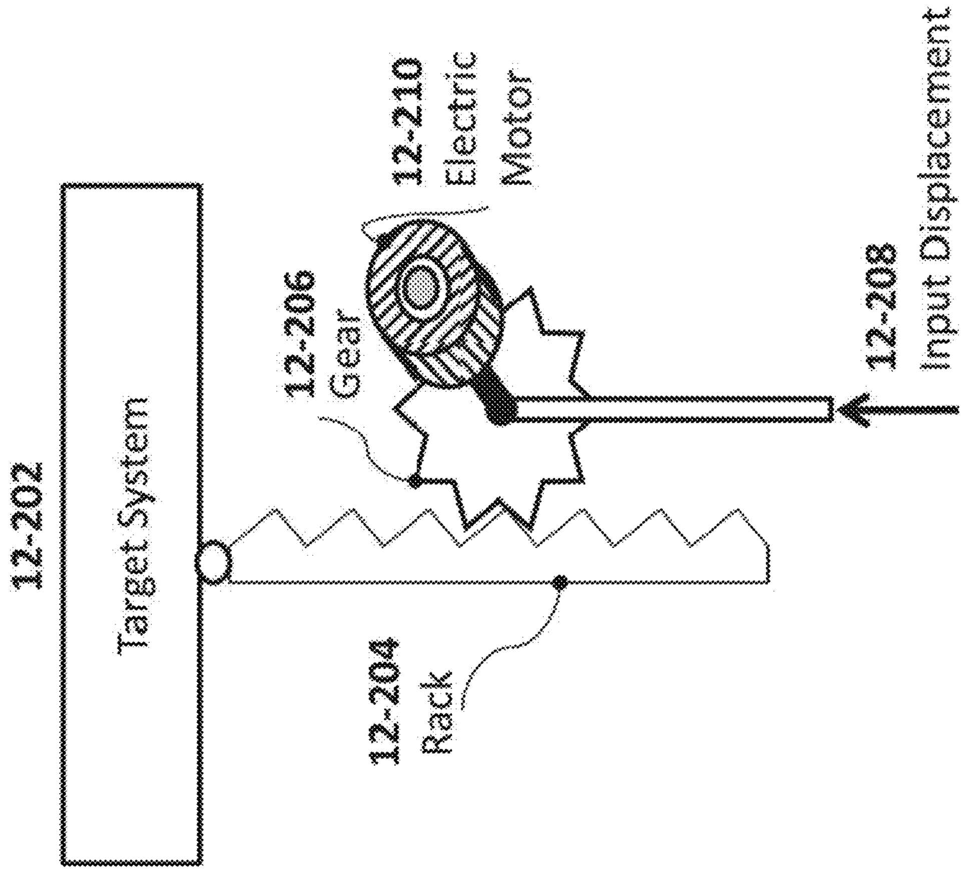
FIG. 68 shows an example of a system benefiting from the method claimed herein.

FIG. 68 shows an example of a system benefiting from the invention described here.

In this system, a rack [12-204] is coupled with a gear [12-206], which in turn is connected to an electric motor [12-210] and also rigidly connected to an input displacement source [12-208] in such a way that vertical motion of the input causes the gear to move up, while allowing it to rotate freely.

At the top of the rack [12-204] is a target system [12-202], which could for example be a vehicle's superstructure, or an instrumentation platform, or a patient gurney, amongst other target systems where desired motion or lack thereof benefits from the use of one or more actuators.

In this system, an acceleration of the input displacement source [12-208], which for example could be the road or the motion of the transporting vehicle will cause a force on the target system [12-202] that is equal to $$F_{target}-J_{system}n^2_{system}(\ddot{z}_{target}-\ddot{z}_{input})$$

Where $F_{target}$ is the resulting force on the target, and is positive if operating to pull the target system toward the base, $J_{system}$ is the total rotary inertia of the system comprising the gear [12-206], the electric motor [12-210], and any connecting mechanism that rotates in synchronicity with the gear and motor, $n_{system}$ is the motion ratio of the gear system converting linear motion of the rack and gear center into rotary motion of the gear, $\ddot{z}_{target}$ is the vertical acceleration of the target system [12-202], and $\ddot{z}_{input}$ is the vertical acceleration of the input source [12-208]. Both acceleration signals are positive if the acceleration is directed upward in the drawing.

In this example, the motion of the input displacement [12-208] will result in significant motion of the target system [12-202] if the system inertia and motion ratio are significant. This will result in less than desirable performance of the system.

Figure 69:
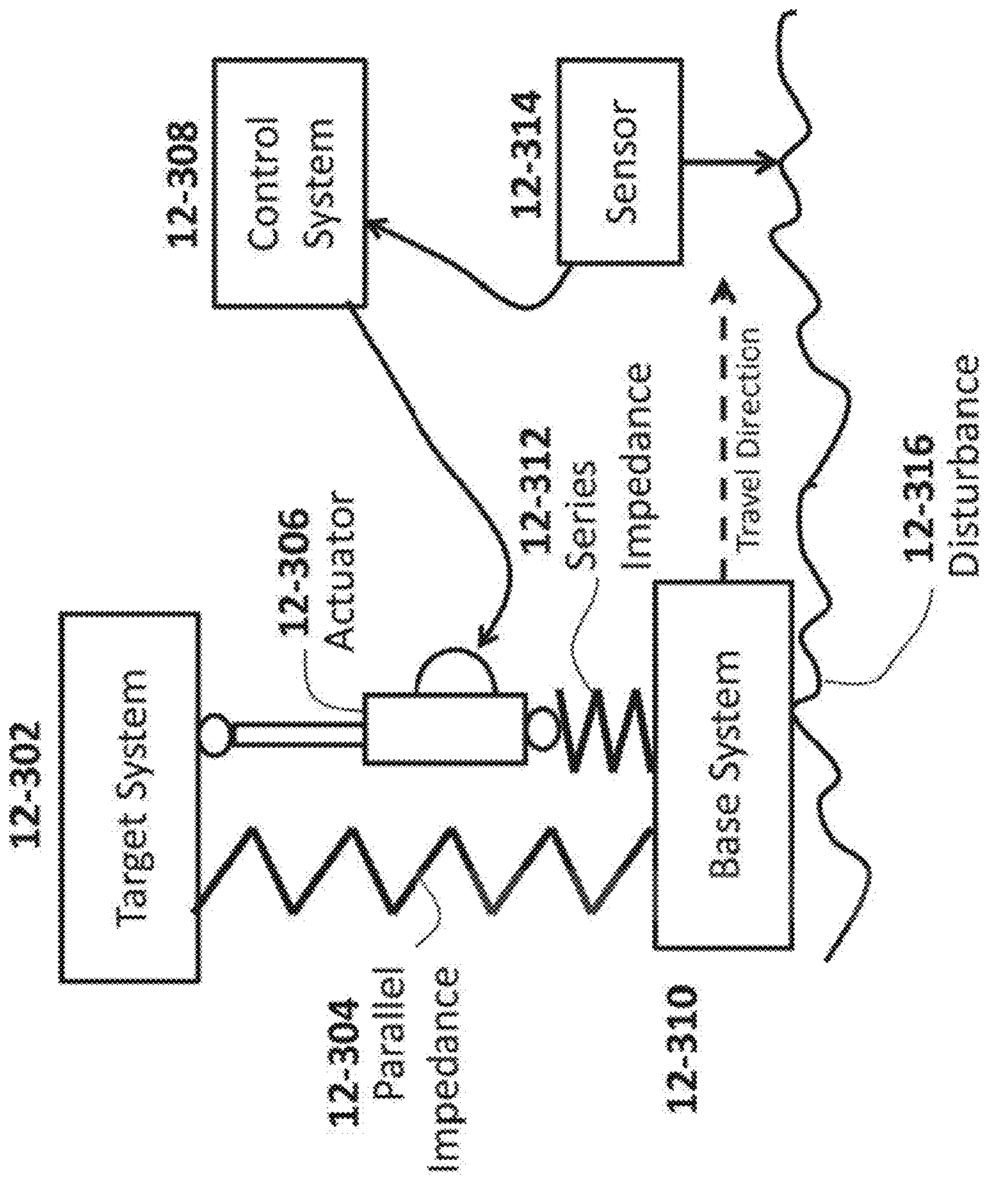
FIG. 69 shows an example system in an automotive suspension, with a look-ahead sensor and a control system.

FIG. 69 shows an example of a system where this invention applies. The figure shows a target system [12-302], suspended from a base system [12-310] by means of a parallel impedance [12-304], a series impedance [12-312], and an actuator [12-306].

The target system could for example be a vehicle body, and the base system a wheel. If the base system is a wheel, ti will typically be connected to the disturbance, represented by the road, through a tire compliance. The direction of travel in this figure is to the right, meaning the target system, base system, and connecting elements all travel from left to right in the picture.

A parallel impedance can be composed of any mechanical element or elements, including but not limited to, springs, dampers, and inertias, mechanically arranged such that the force exerted by them between the base and target systems is additive in nature to the force created by the actuator [12-306]. The series impedance represents all system compliance arranged such that the force exerted by them is always the same as the force exerted by the actuator.

The actuator in this figure could be any back-drivable suspension actuator with rotating inertia, such as an electro-hydraulic actuator as described in this patent, a ballscrew actuator, a rack-and-pinion actuator, or others.

The base system travels in such a way that it is impacted by a disturbance [12-316], for example the road surface a vehicle is traveling on or the movement of the base of an inertial platform.

A Sensor [12-314] is placed such that it can measure, or such that it allows to estimate, the disturbance value before such disturbance creates relative motion in the actuator. This sensor can be a look-ahead sensor like a radar, laser, lidar, sonar, or vision-based system, or it could also be an accelerometer on an upstream component such as the front wheels of a vehicle when applying this to the rear wheels, or it could be an accelerometer on a part of the structure that first sees the influence of, and thus allows for estimation of the magnitude and timing of, the disturbance. This could for example include an accelerometer on the wheel or a pressure sensor in the tire, for systems where the lag between sensor and motion across the actuator is longer than the response time of the actuator.

The sensor signal is then fed to a control system [12-308], which in turn generates the optimal control signal to feed to the actuator [12-306].

Figure 70:
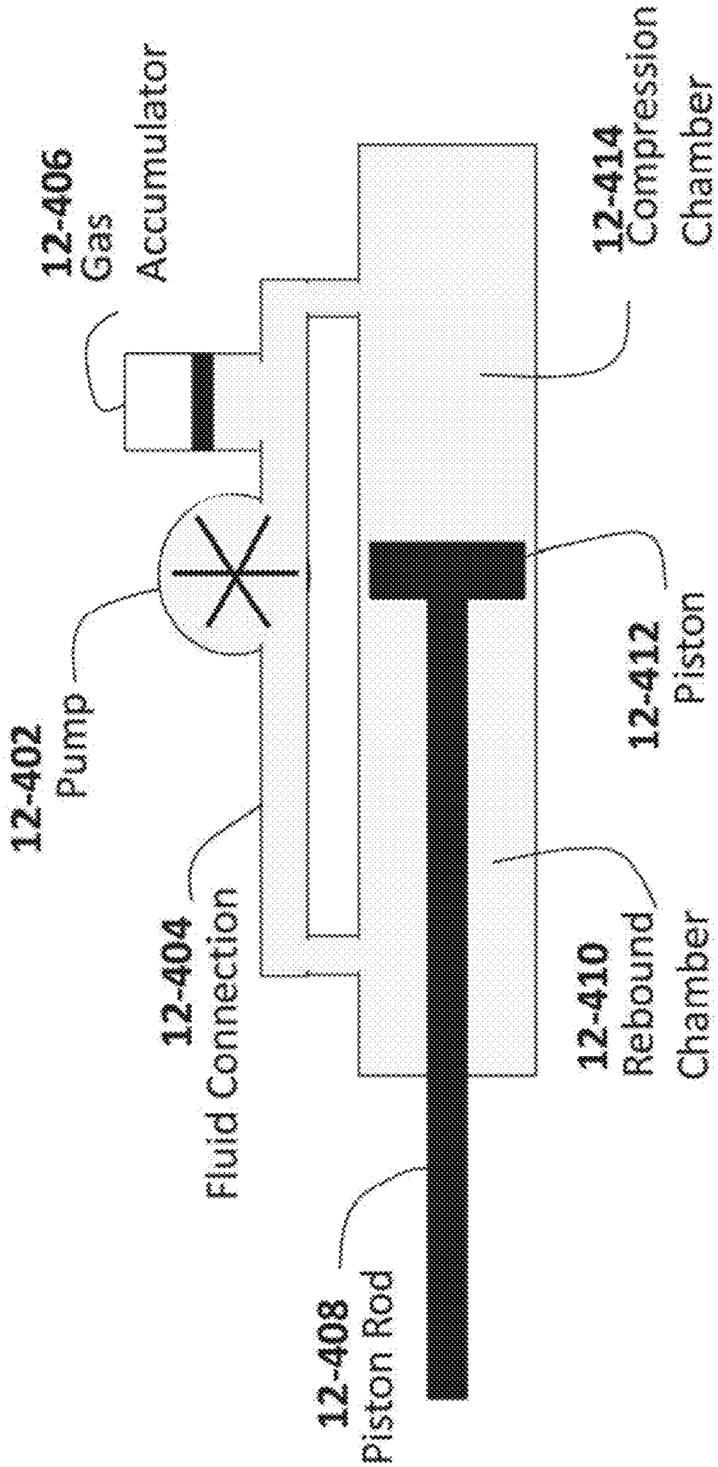
FIG. 70 shows an example electro-hydraulic actuator.

An example of an electro-hydraulic actuator is described in FIG. 70. The actuator consists of a pump [12-402], which is operatively coupled to an electric motor (not shown in the picture), and which communicates with a column of fluid connecting the pump, through a fluid connection [12-404], to the rebound chamber [12-410] on one side, and the compression chamber [12-414] on the other, of a hydraulic actuator consisting of a piston [12-412], attached to a piston rod [12-408] and sliding in a damper tube between the compression [12-414] and rebound [12-410] chambers.

In order to absorb the volume of fluid displaced by the rod, such a system may utilize a gas accumulator [12-406], shown here communicating with the compression chamber [12-414].

Figure 71A:
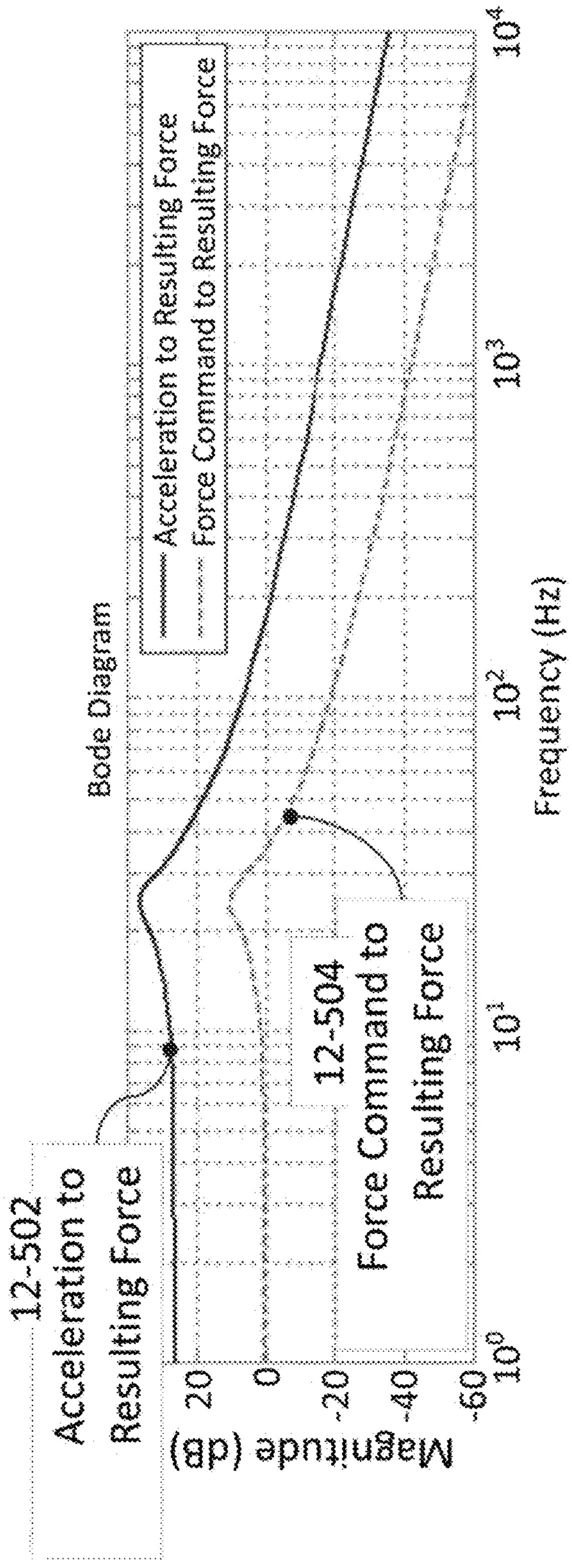
FIGS. 71A-71B show the transfer functions calculated for a simple example system from input acceleration and force command to the resulting force (FIG. 71A) and phase (FIG. 71B).
Figure 71B:
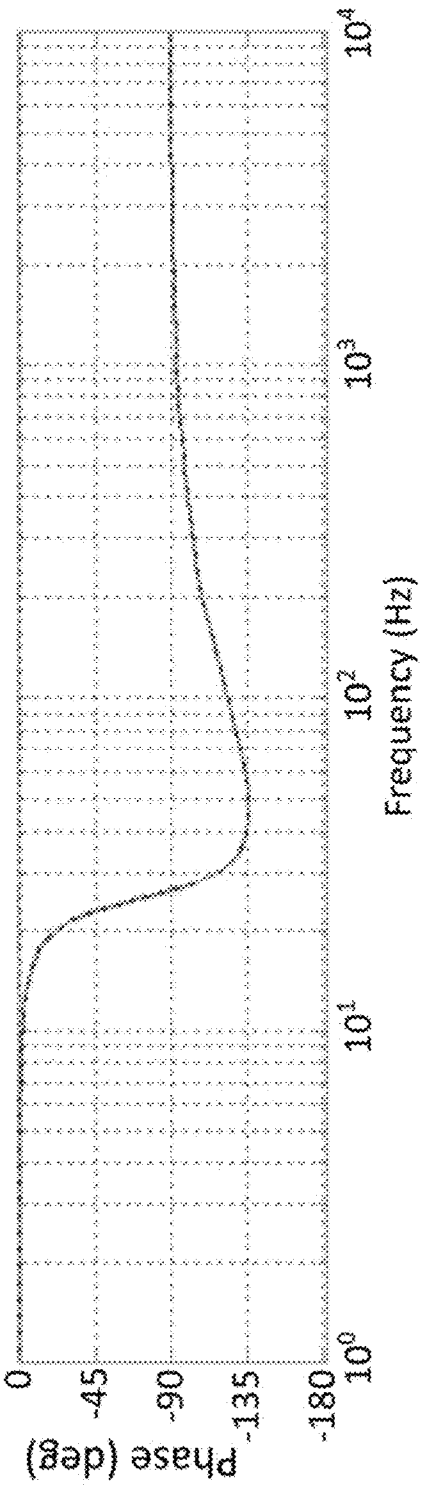

FIGS. 71A-71B show the transfer functions for a simple example system. The example system is the one shown in FIG. 69, where the actuator has a given reflected mass or inertance, m, and a certain series impedance $Z_s$. For the purposes of this example, we are neglecting the parallel impedance $Z_p$. The system can be written as $$F_r = \frac{Z_s m}{ms^2 + Z_s}\ddot{q} + \frac{Z_s}{ms^2 + Z_s}F_a$$

Where $F_r$ is the resulting force at the ends of the actuator, and thus the force acting on the target system through the actuator, $F_a$ is the actuator force, and q is the relative acceleration between the target and base systems. The transfer functions in FIGS. 71A-71B show the two components in the equation above, the force resulting due to relative acceleration in curve [12-502], and the force resulting due to commanded force in the actuator in curve [12-504]. It should be mentioned again that the figure represents a sample system with a given dimension and frequency response, to illustrate the concepts explained herein. The first curve is especially important, since it represents parasitic undesired force resulting purely due to motion of the suspension, and since it is very difficult to control.

Figure 72:
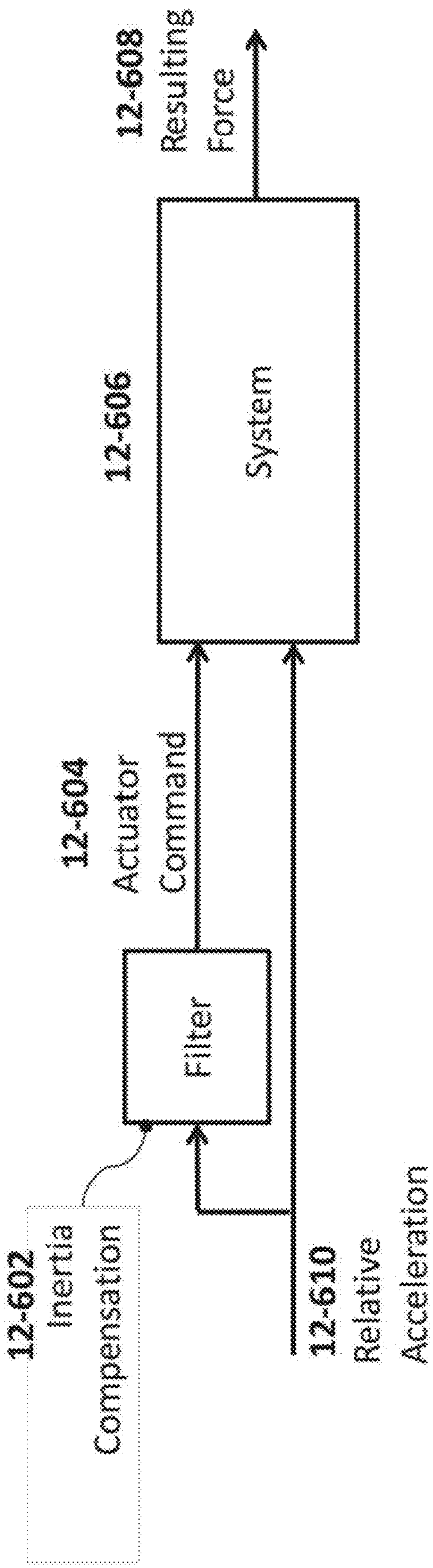
FIG. 72 shows a simple inertia compensation scheme used in the example for FIG. 73.

FIG. 72 shows an example of a simple inertia compensation scheme on the system described in FIGS. 69 and 71A-71B, as it would be typically applied by persons skilled in the art. In this compensation scheme, the relative acceleration between the base and target systems [12-610] is used to estimate the effects of inertia on the system through the inertia compensation filter [12-602]. The output of this filter is a desired force, which is fed as an actuator command [12-604] into the system [12-606]. This actuator force in combination with the relative acceleration provides the total resulting force [12-608].

Figure 73:
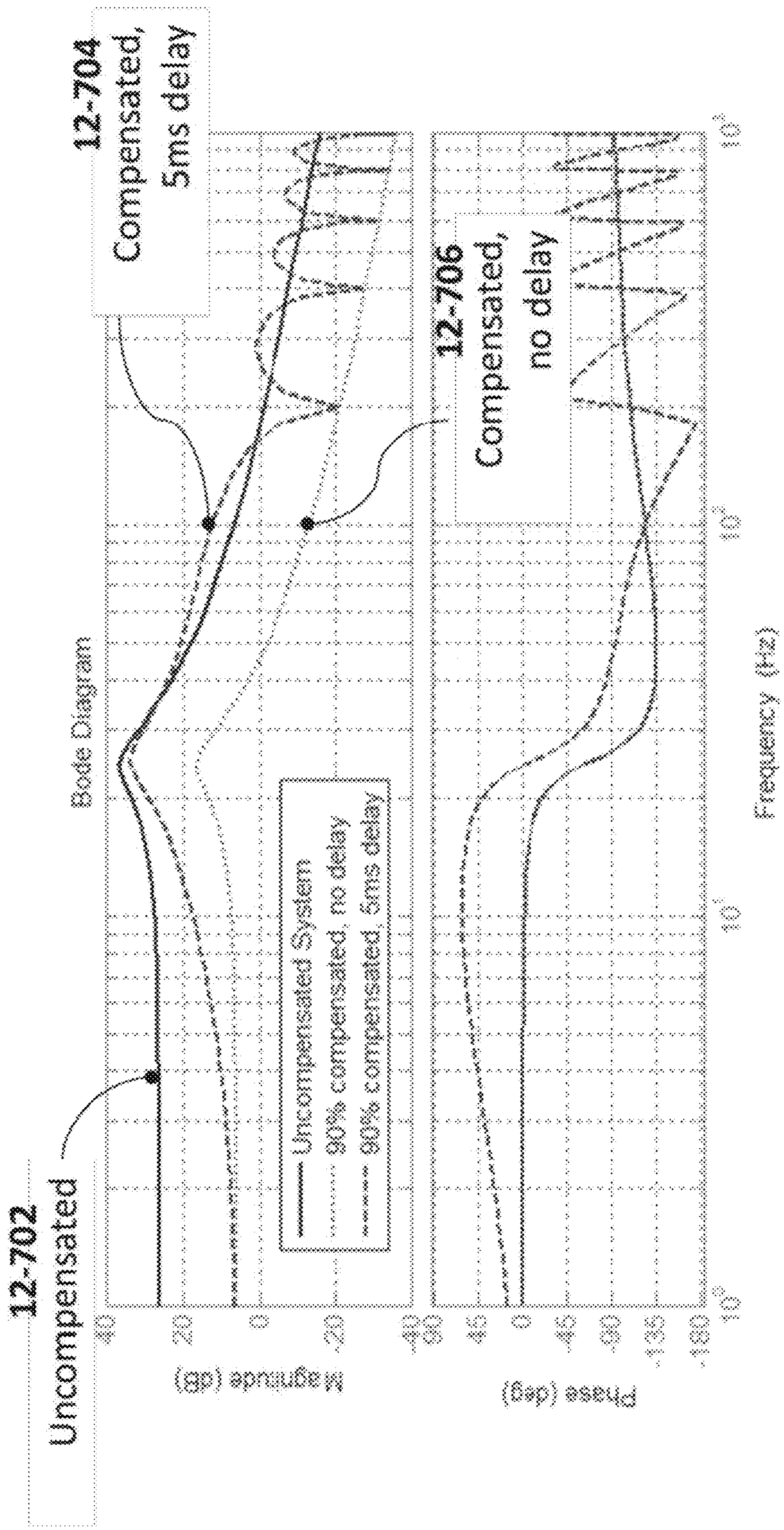
FIG. 73 shows the transfer functions calculated for a simple example system from input acceleration to resulting force without compensation and with 90% inertia compensation for a system with no delay and with some realistic delay in the feed-forward loop.

FIG. 73 shows the result of this simple inertia compensation scheme, which highlights the need for more sophisticated compensation methods. The figure shows the resulting force, as a function of the input acceleration, for the uncompensated system in curve [12-702], compared to two systems. In the first one, resulting in curve [12-706], the rotating inertia of the actuator is estimated to 90%, and compensated in an ideal system where neither the actuator, nor the inertia compensation filter and calculation, have any delay, resulting in a very nice reduction in total resulting force. The second system uses the same method, but also applies a realistic 5 ms delay to the actuation and control scheme, immediately resulting in dramatic loss of performance as can be seen in curve [12-704].

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Integrated Active Suspension System for Self-Driving Vehicle

While self-driving vehicles and active suspension systems exist in the prior art, such systems have traditionally been separated stand-alone technologies. Significant ride benefits can be delivered to passengers by combining the sensing and command functions of self-driving vehicles with the command authority to change vehicle dynamics that a fully-active suspension provides.

Some aspects relate to vehicle systems that utilize topographical maps of the road surface. Such maps include positional information as well as road surface information such as road height. These maps may be highly granular in detail, showing individual road imperfections, bumps, potholes, and the like. These maps may be generated by a variety of means, including vision camera sensors, LIDAR, radar, and other planar or three-dimensional scanning sensors, and the like. The maps may also be generated by sensor information post-encounter, such as the front suspension actuators determining information about the road as they traverse terrain. These topographical maps may also be communicated from vehicle to vehicle over a network, or may be downloaded from servers in communication with the vehicle such as over a cellular network. The topographical maps may be used for a variety of control purposes, such as: adapting driving behavior (changing speed such as slowing down on a rough road; changing vehicle course such as choosing a less bumpy road to reach the destination, etc.); adapting active suspension system behavior (controlling actuator force/position in a predictive manner in response to road perturbations ahead, changing actuator force/position in the rear dampers to anticipate sensed events from the front dampers, etc.). Aspects also relate to plotting a trajectory of the vehicle and its elements (e.g. individual wheels) across the topographical map.

Other aspects relate to adapting driving behavior and route planning as a function of road roughness and the impact a road might have on the vehicle, and of collecting such data for future planning use.

Other aspects relate to the use of energy storage onboard a self-driving vehicle, wherein the energy storage is used to power electrical loads such as active suspension actuators, the drive motor of an electric car, EPS, ESP, ABS braking, etc. These aspects relate to predictively charging the energy storage based on an estimate of future energy needs of the vehicle. In some embodiments, this also relates to controlling electrical loads based on an estimate of future energy needs of the vehicle. According to one aspect, another input to such algorithms is energy availability, which may be a vehicle imposed current limit, or an overall energy storage capacity of an electric vehicle for a given trip.

Other aspects relate to controlling an active suspension to enhance comfort during acceleration and cornering of a self-driving vehicle. By controlling a compensation attitude of the vehicle using active suspension actuators, the vehicle may lean into a turn or acceleration, and lean back from a deceleration event.

Figure 74:
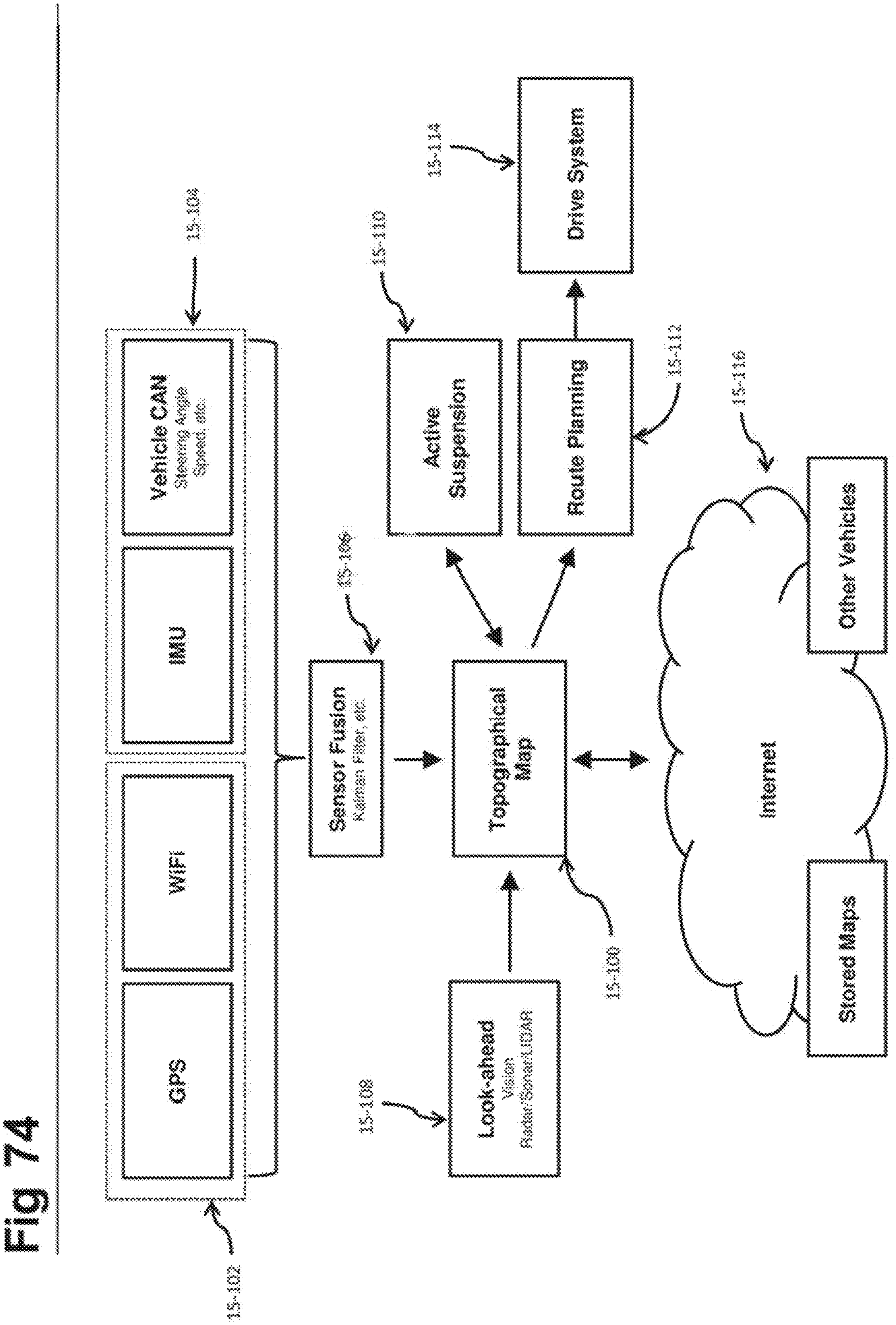
FIG. 74 is a diagram of a topographical road mapping system.

FIG. 74 shows an embodiment of a topographical mapping system for a vehicle. A topographical map 15-100 comprises high-resolution terrain data for the vehicle. In some embodiments high resolution would encompass being able to detect road perturbations large enough to create a human-distinguishable impact on the vehicle if driven over. In other embodiments the resolution may be lower. The map may be represented as a relative map about the vehicle (for example, XY Cartesian distances from the vehicle or a polar coordinate system), as multiple relative maps about parts of the vehicle (for example, relative maps about each wheel), an absolute map comprising absolute positions (for example, GPS coordinates), or any other means of associated terrain height Z information or similar. In addition to or instead of terrain height data, the topological map may contain a generalized roughness metric or a correction metric for an active suspension. It may also be implemented as a pipelined control system, wherein such information is clocked through a control loop based on position changes of the vehicle. Any suitable means of representing topographical information may be used.

In this embodiment, the topographical map 15-100 is indexed by the current position. This map may start as populated, unpopulated, or partially populated. In order to use a high resolution topographical map, the vehicle needs an accurate method of localizing with respect to the map. Location sensors 15-102 are used to determine a location. Such sensors may include coordinates from a GPS receiver, WiFi access point recognition, honing beacon, DGPS triangulation methods, and/or other suitable sensors. In addition, the vehicle has at least one relative position sensor 15-104 such as an IMU, accelerometers, steering angle, vehicle speed, and/or other suitable sensors onboard. A sensor fusion system 15-106 processes the absolute position data using the relative position data to determine an accurate estimate of current location. One such method of sensor fusion is a Kalman Filter to recursively process the stream of noisy data from the location and relative position sensors to yield an accurate estimate of absolute position. Such a filter may contain data representing a physical model of the vehicle and its movement, and compare a prediction of vehicle location to actual measurement. Output from the sensor fusion system is a position metric that serves as either an index to the topographical map 15-100, or serves to transform the topographical map at each time update. For example, if the topographical map is a relative matrix of Z values ahead of the vehicle, the filtered position information may shift the current map XY position.

In another embodiment, the topographical map 15-100 may be purely relative to the vehicle, and only relative position sensors 15-104 are used in the sensor fusion system. In such an embodiment, the topographical map represents a local measure of terrain about the vehicle, and a method for accurately interpreting and using results from look-ahead sensors 15-108 by the active suspension system 15-110.

In the embodiment of FIG. 74, an active suspension system 15-110 is equipped on the vehicle. The fully active suspension is capable of operating in at least three operational quadrants of a force/velocity plot, which means it is capable of both damping movement and actively pushing or pulling the wheel. In one embodiment, the active suspension system receives data from the topological map and determines an incidence time and correction. In a simple implementation, a path may be calculated that represents a path through a plurality of points in the topographical map 15-100. This path may be a function of current steering angle and speed, or be based on a planned route. The planned route may be a combination of GPS/maps route planning and any obstacle avoidance procedures being employed by the self-driving vehicle to plan vehicle travel. The path may comprise of a single trajectory in a lower resolution map, of two paths, each representing a path of travel of the left and right sides of the vehicle respectively, or four paths, with each representing a path of travel of a wheel of the vehicle (in the case of a two axle vehicle). The active suspension then calculates an incidence time to each point corresponding with each wheel of the vehicle for which an active suspension actuator is disposed. The active suspension then calculates a correction, which comprises a force or position setting of the actuator at each wheel so as to mitigate impact of the event on the trajectory. In a simple embodiment example, if there were a twenty-five millimeter bump 300 milliseconds away from the left front wheel (the incent time could be calculated using current or planned vehicle speed), then the left front wheel might lift twenty-five millimeters just before impact of the event. A system model is used to calculate actuator response time so that it can prepare the actuator a suitable period of time prior to the wheel encountering the event. The active suspension system may employ several algorithms related to wheel damping, body control during turns, saturation handling, and other metrics that may require the active suspension to deviate from this simplified model, however, in many embodiments that use the topographical map, the terrain data is utilized as an input to the active suspension control system.

In addition to reacting in response to the topographical map 15-100, the active suspension system 15-110 may also share information with the topographical mapping system. Such data may comprise accelerometer data representing wheel or body movement, actuator position information, or any other metric that represents road input. In an illustrative embodiment, the front actuators of the vehicle encounter a bump, which moves the actuators a certain distance at a given force. The system then estimates topographical information from this and inserts it into the topographical map so that the rear actuators can use the data to respond to and so that future drive events can benefit from the knowledge. In an embodiment with this later implementation, the vehicle effectively employs a learning algorithm wherein it learns the road terrain as new roads are traversed, and then the next time it is driven the system can respond more effectively. This may be coupled with algorithms that adapt an already populated map as the same terrain is driven over multiple times so that a best estimate map is created. This learning function may be particularly important with topographical information because road surface condition changes frequently with wear/tear, road repairs, snow storms, etc.

The topographical map may also be used to modify route planning 15-112 and drive system 15-114 commands. For example, if a large obstruction in the road is detected (such as a pothole), the vehicle route planning 15-112 may navigate around the obstruction in order to reduce impact to the vehicle. On a road that exhibits a particularly rough road (which can be determined with various means from the topographical map such as looking at the frequency content and amplitude of perturbations), the route planning system may avoid the road and reroute to another suitable road with a smoother topographical footprint. In another example, the drive system 15-114 may simply reduce speed over a detected rough road.

In addition to the active suspension system in some embodiments communicating information to build/update the topographical map, the use of one or more look-ahead sensors 15-108 is similarly helpful. These are particularly useful due to their ability to sense road conditions prior to encountering them with the wheels of the vehicle. Several suitable look-ahead systems exist such as mono or stereo vision camera systems, radar, sonar, LIDAR, and other planar or three dimensional scanning systems. In some embodiments multiple look-ahead sensors are used in conjunction through a secondary fusion system in order to obtain a more accurate estimate of road conditions. These sensors may build a topographical map that expands beyond road surface conditions: they may detect curbs, edges of roads, street signs, other vehicles, pedestrians, buildings, etc. In some embodiments the system building the topological map may be the same system that is performing real-time autonomous driving and navigation. This subsystem may identify obstacles that are mobile objects and would be differentiated from in the topological map. For example, the vision sensor may detect a pedestrian in a crosswalk or another vehicle. Several methods are known in the art for differentiating such objects. A couple methods include object recognition systems that can detect human faces, outlines of vehicles, and such, or an algorithm that can detect if an object is moving with respect to an absolute coordinate system (i.e. the ground). In this way, non-permanent obstacles can be removed from or not inserted into the topographical map data.

In embodiments where the vehicle has a communications interface with external data sources, topographical map information may be shared. In one embodiment the vehicle has a cellular connection to the internet and dynamically uploads and downloads topographical map information from one or more servers. In another embodiment there is vehicle-to-vehicle communication wherein a vehicle ahead may communicate topographical or road surface information to the vehicle which can seed the topographical map 15-100 with a priori estimates. This topographical information can be stored with road map databases, and may even be directly coupled with road map systems such that road maps index terrain information. This can be at the overall road granularity level, or may be a matrix of data representing terrain information across the road at a higher resolution. The amount of topographical information stored can vary. A topographical map containing an entire route or even an entire region can be stored on the vehicle, or only a small window buffered onto local memory.

While the above embodiments have been described in the context of a self-driving vehicle, several inventions may equivalently or similarly relate to human-driven vehicles as well, including, without limitation, navigation-guided vehicles.

Figure 75:
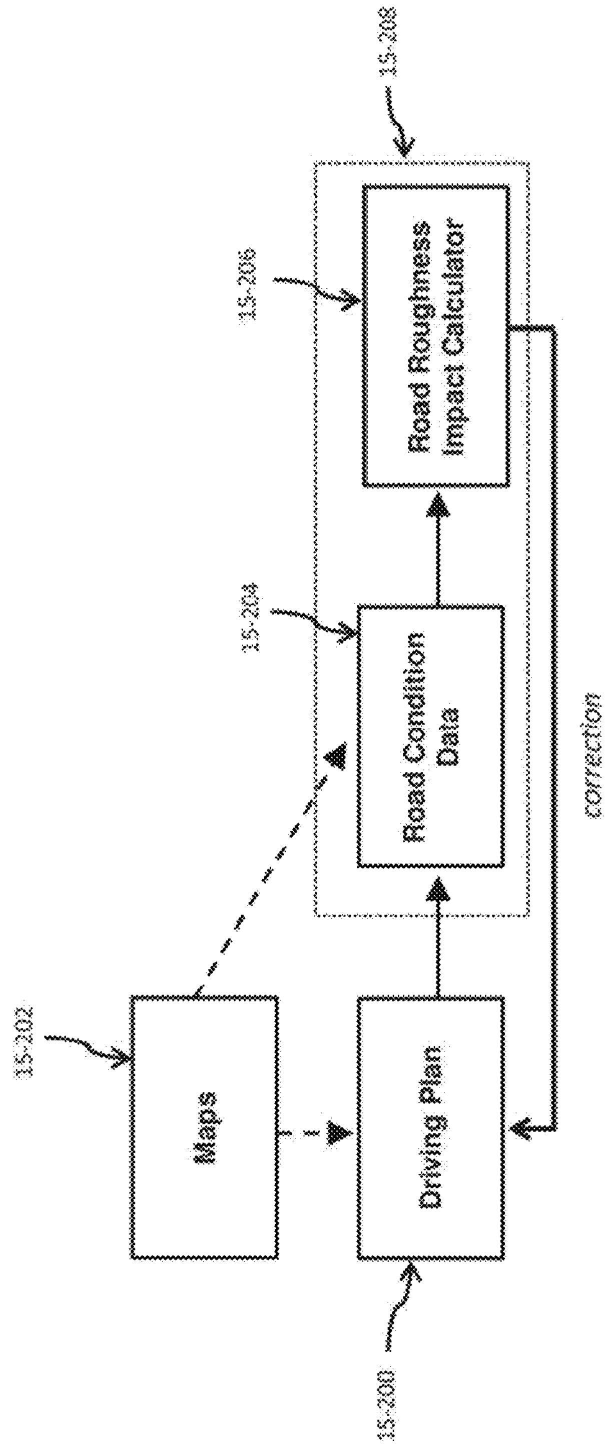
FIG. 75 is a block diagram of a route planning system that is responsive to road conditions.

FIG. 75 shows an embodiment of a route planning system that is responsive to road conditions. Based on a driver input destination, the vehicle retrieves data from a maps database 15-202 and computes a driving plan 15-200. The driving plan may comprise of a specific route and may further include target vehicle speeds. FIG. 75 shows the generalized system which can be used in a priori route planning or in real-time a posteriori driving.

For the embodiment with an advanced route planning correction, the a priori driving plan 15-200 is calculated based on a route planning algorithm such as an A* algorithm or any other suitable route planning method. This is then compared to road condition data 15-204 that has been stored from previous driving data, from other vehicles, or from a database. The road condition data is processed or has already been processed and stored to include a road roughness impact 15-206 metric. In some embodiments this metric may comprise a measure of vertical acceleration on the chassis of the vehicle. In one embodiment, vertical acceleration on the vehicle chassis or in the passenger compartment may be band-pass filtered to cut out frequencies significantly below body frequency and frequencies significantly above wheel frequency. For example, a band-pass filter may have a lower cutoff around 0.5 Hz and an upper cutoff around 20 Hz in order to eliminate extraneous noise that does not impact road roughness impact. Based on the measure of road roughness, the driving plan 15-200 is altered to either bias against rough roads by employing a weight factor directly in the route-planning algorithm, or by avoiding roads that have a road roughness above a certain threshold. In another embodiment, it may result in setting target speeds for each section of road. Several implementation methods exist using weight factors, thresholds, biases, and other algorithms. The road condition data 15-204 and road roughness impact calculator 15-206 may represent a single unit 15-208 that simply represents the road roughness. In general, the a priori system determines a driving plan at least partially in response to anticipated road roughness impact to the vehicle over the roads in the route.

For the a posteriori embodiment, the system operates in real time while executing (i.e. driving) the driving plan 15-200. A driving plan 15-200 is calculated based on a route planning algorithm and using stored maps 15-202. As the vehicle traverses terrain, road condition data 15-204 is acquired such as vertical accelerometer data, road surface information from a forward-looking vision system, data from a stored topographical map, GPS-indexed data, data from other vehicles, and a measure of at least one state variable from an electronic suspension system (such as accelerometer, velocity, and position data from each actuator or semi-active damper). With this road condition data, a road roughness impact calculation 15-206 is performed. This may be a simple root mean squared (RMS) value of acceleration, a comfort heuristic that is a frequency-weighted function of chassis acceleration, or some other means of processing the road condition data to yield a result coupled with road impact to the vehicle and passengers.

Road roughness impact data 15-206 (either current data of the terrain being traversed, a running average of past data, or future data ahead) is used to correct the driving plan 15-200. Adjusting the driving plan may cause the vehicle to choose an alternative route course in order to avoid the road being traversed. Alternatively, it may cause the driving plan to change the vehicle speed over the rough terrain.

Figure 76:
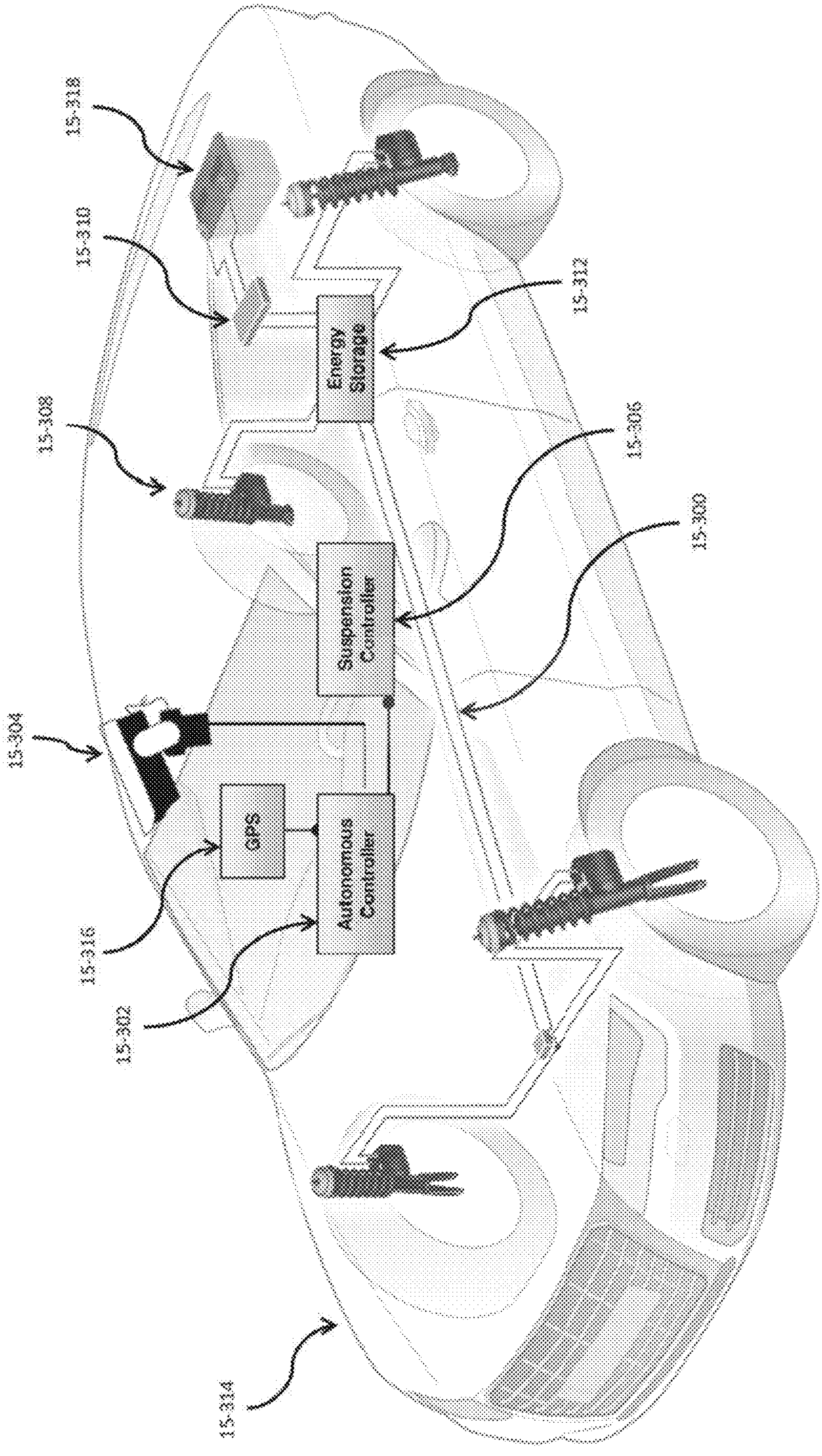
FIG. 76 is an autonomous vehicle with a predictive energy storage subsystem and an integrated active suspension.

FIG. 76 shows an autonomous vehicle with a predictive energy storage subsystem and an integrated active suspension. An electrical bus 15-300 delivers power to a plurality of connected electrical loads. In the embodiment of FIG. 76, the electrical loads comprise of four active suspension actuators 15-308 connected to the bus 15-300. In other embodiments this may comprise of electric power steering systems, electronic stability control actuators, electronic air compressors, ABS braking actuators, rear wheel steering actuators, and other power consumers. An energy storage apparatus 15-312 such as a battery (lead acid, AGM, lithium-ion, lithium-phosphate, etc.), a bank of capacitors (e.g. super capacitors), a flywheel, or any other suitable energy storage device is attached to the electrical bus 15-300. The energy storage device can be characterized by a state of charge. For example in a capacitor, a voltage level would indicate this. For some rechargeable batteries, this could be measured using a coulomb counting battery management system, although with many battery technologies a state of charge can be determined by a voltage reading. In this embodiment, the energy storage system is disposed to provide energy to at least a portion of the electrical loads on the bus. A power converter 15-310, in this embodiment a bi-directional DC-DC converter that transfers power between the vehicle's electrical system and the electrical bus 15-300, is configured to provide power to the energy storage apparatus and the connected electrical loads. By controlling the electrical loads and the power converter, a state of charge of the energy storage apparatus can be set. In some embodiments the power converter 15-310 can set a state of charge of the energy storage apparatus 15-312 without knowing the state of charge. For example, the power converter can provide more energy than the loads are consuming in order to increase a state of charge, and likewise the power converter can provide less energy than the loads are consuming in order to decrease the state of charge.

Disposed on the vehicle of FIG. 76 is a forward-looking stereo vision camera (or LIDAR, radar, side sensor, rear sensor, etc.) 15-304 that is able to detect road obstacles and obstructions. This camera system may connect with the autonomous control system 15-302, which may comprise of one or a plurality of devices such as processor-based controllers. The sensor may also connect directly to the suspension controller, although in this embodiment the autonomous controller uses the stereo vision system for vehicle navigation tasks as well. The autonomous controller 15-302 calculates a driving plan for an anticipated route of the vehicle by mapping a route to a user-defined destination. This driving plan may change dynamically, for example it may be responsive to changing traffic conditions. The driving plan may be highly granular such as taking a specific line or lane along a road. Based on sensed data such as through the vision camera 15-304, this driving plan may dynamically change such as to avoid an emergency-braking vehicle in the vehicle's lane ahead.

The power converter 15-310 may regulate the state of charge of the energy storage 15-312 during the route. Several such exemplary circumstances where the energy storage might be used are given:

In one circumstance, the GPS unit 15-316 detects the vehicle's position is approaching a known rough road that is on the driving plan and the vehicle is in an economy mode, where a significant amount of energy might be regenerated by a regenerative suspension system. This processing may occur in a controller outside the GPS unit that may have access to the topographical map with road roughness criteria. The power converter can be controlled to deliver energy from the electrical bus 15-300 to the vehicle's electrical system in order to reduce the state of charge of the energy storage so that it can accommodate at least some of the regenerated energy. Once the road is being traversed, regenerated energy may be provided to both the energy storage apparatus as well as to the vehicle's electrical system through the power converter.

In another circumstance, the GPS unit 15-316 detects that the vehicle's position is approaching a winding road that is on the driving plan of the vehicle. An algorithm calculates needed energy for the active suspension actuators to provide active roll control and for the electric power steering to provide steering input, and charges the energy storage apparatus such that while the winding road is being traversed, peak power demand from both devices is delivered by both the energy storage apparatus and the power converter from the vehicle's electrical system 15-318 such that the power converter does not exceed a vehicle electrical system maximum current threshold.

In another circumstance, the vehicle 15-314 is an electric or hybrid car with a high voltage battery pack as an energy storage device. For example, the vehicle may be an autonomous electric vehicle with a rear mounted drive motor and a 400-volt battery pack. In this embodiment, the energy storage may comprise the battery pack, and the electrical bus may comprise the high voltage bus the battery is connected to. The vehicle calculates a driving route and estimates energy usage from connected loads (for example, the main drive motor and an active suspension system). Such an estimate may comprise a measure of road roughness and cornering to determine an active suspension system consumption, and a measure of acceleration, stop lights, vehicle speeds, terrain incline and distance to determine a main drive motor consumption and regeneration. In the event of an electric vehicle, for example, the vehicle may want to further control the loads such as the active suspension and main drive motor to ensure that the autonomous vehicle may reach its destination with the amount of energy on board the vehicle. In other electric vehicle embodiments, the active suspension system may run off an intermediate voltage bus on the vehicle such as a 48V bus that communicates with the high voltage system through a DC-DC converter.

In another circumstance, the vehicle determines a driving plan for the vehicle and target speeds. It estimates energy usage that each device on the electrical bus 15-300 will use for each location of travel, which may be a function of target speed and other parameters. During execution of the driving plan, the energy storage state of charge may be predictively set in advance of the energy usage event.

The above examples are illustrative, but many such conditions may exist where the energy storage is regulated in order to anticipate upcoming conditions.

In the event of an active suspension, two major energy consumption factors are the condition of the road and the amount of body roll and heave motion. These factors among others can be used to estimate the energy consumption from an active suspension system.

In some embodiments, the energy storage apparatus operates most durably when maintained between a lower threshold voltage and an upper threshold voltage. This may be accomplished by executing regulation of the power converter and regulation of at least a portion of the plurality of connected loads. For example, a controller may reduce energy consumption in a load so that the energy storage does not drop below a lower threshold. In other embodiments this may be accomplished by applying switches such as MOSFET or IGBT transistor based switches to the energy storage apparatus.

Figure 77:
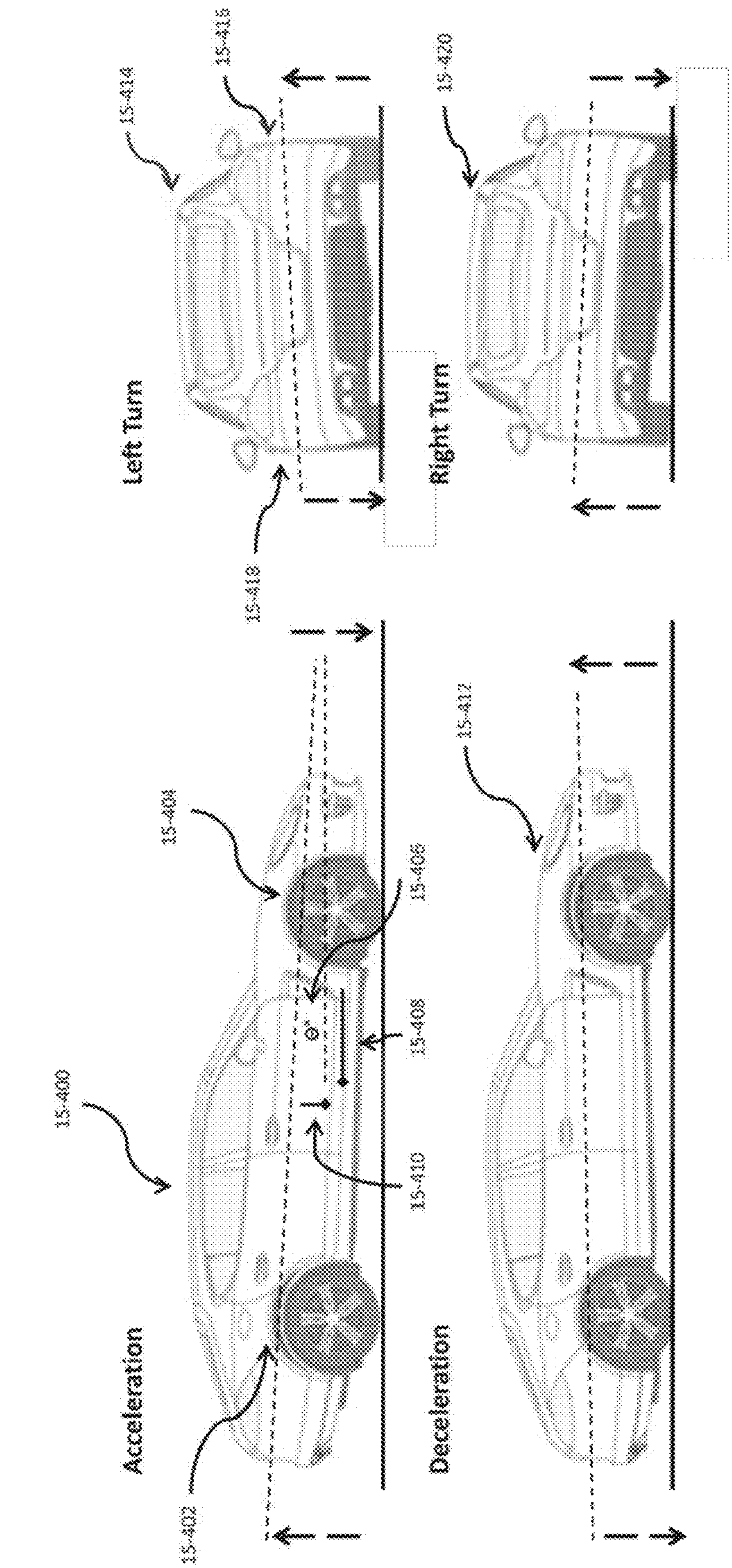
FIG. 77 is an adaptive pitch/roll system that creates a compensation attitude in response to feed-forward drive commands.

FIG. 77 demonstrates an active suspension control system for a vehicle that mitigates fore/aft and lateral acceleration and deceleration feel by pitching and tilting the vehicle. The vehicle comprises active suspension actuators at each wheel of the vehicle. A self-driving controller creates command signals that accelerate/decelerate the vehicle and create steering events that yield a lateral acceleration.

During forward acceleration, the vehicle 15-400 pitches forward (pitch down attitude wherein the front of the vehicle is below the vehicle centerline) by creating an extension force from the rear actuators 15-402 and a compression force from the front actuators 15-404. Force is provided in order to set a compensation attitude 15-406 in pitch that is greater than zero degrees and related to the acceleration of the vehicle. Acceleration of the vehicle creates a longitudinal force 15-408 on the passengers that is equal to their mass multiplied by the vehicle's acceleration. By tilting the vehicle with a compensation attitude 15-406, the longitudinal force from the vehicle acceleration is multiplied by the cosine of the compensation angle 15-406, and a component of gravitational force 15-410 acts to counteract the acceleration force by operating in the opposite direction. This longitudinal force component from gravity on the passengers is equal to their mass multiplied by the acceleration of gravity (9.8 m/s/s) multiplied by the sine of the compensation attitude. To equalize forces so there is no longitudinal net force, the tangent of the compensation attitude must equal the vehicle acceleration divided by gravity. Therefore, a compensation attitude to create equal forces would be the arctangent of the quotient of the vehicle acceleration and (divided by) the acceleration of gravity.

In an illustrative example, the zero net longitudinal force compensation attitude during a 0.3 g vehicle acceleration is approximately 17 degrees pitch forward. In real world-application, it is desirable for energy savings and for practical suspension design considerations to create a compensation attitude that is oftentimes less than this net force balance. Therefore, the compensation angle 15-406 may be less than the arctangent of the quotient of vehicle acceleration and the acceleration of gravity.

During deceleration, the vehicle 15-412 pitches backward (pitch up attitude wherein the front of the vehicle is above the vehicle centerline). In this instance, force from the actuators operates in a similar but opposite fashion. Compensation attitudes can be found using similar methodologies as during acceleration, but by referencing a compensation attitude angle from the rear of the vehicle instead of the front.

During a left turn of the vehicle 15-414, the actuators 15-418 on the inside of the turn radius create a compression force, while the actuators 15-416 on the outside of the turn create an extension force, such that the vehicle leans into the turn. Similarly, this compensation attitude in roll may be greater than zero, but less than or equal to the arctangent of the quotient of lateral acceleration and gravity.

During a right turn of the vehicle 15-420, force from the actuators operates in a similar but opposite fashion. Compensation attitudes can be found using similar methodologies as during a left turn, but by referencing a compensation attitude angle from the right side of the vehicle instead of the left for roll angle.

During both turn events the roll in attitude comprises of the side of the vehicle on the inside radius of the turn being below the roll centerline as shown in FIG. 77. In more aggressive turns, the actuators may become force limited (in saturation), and this performance may not be met.

By employing these compensation attitudes in advance of the vehicle response by employing a feed-forward control strategy, a self-driving vehicle may mitigate discomfort associated with autonomous acceleration, deceleration, and steering. Such a feed-forward strategy may be employed by connecting the autonomous controller or driving system with the active suspension such that a compensation attitude is commanded based on an acceleration/steering signal from the controller. A compensation attitude can be calculated as a function of the signal. In some embodiments entry into the compensation attitude is gradual and occurs over an extended period of time that is a function of the feed-forward signal from the self driving controller. Exit from the compensation attitude may also be gradual and occur over time. In some embodiments that active suspension actuators have a maximum force limit which may be a physical limit or a software parameter (including a dynamic software parameter that is updatable in real time), and a target compensation attitude is not fully reached during high acceleration, deceleration, and roll events. This is called a force-limited mode. Since compensation attitude performance may be jarring to some passengers, in some embodiments it may be desirable to turn the feature on and off, or into different modes of operation (for example, that set different levels of compensation attitudes) based on a vehicle operator selected operational mode.

Figure 78:
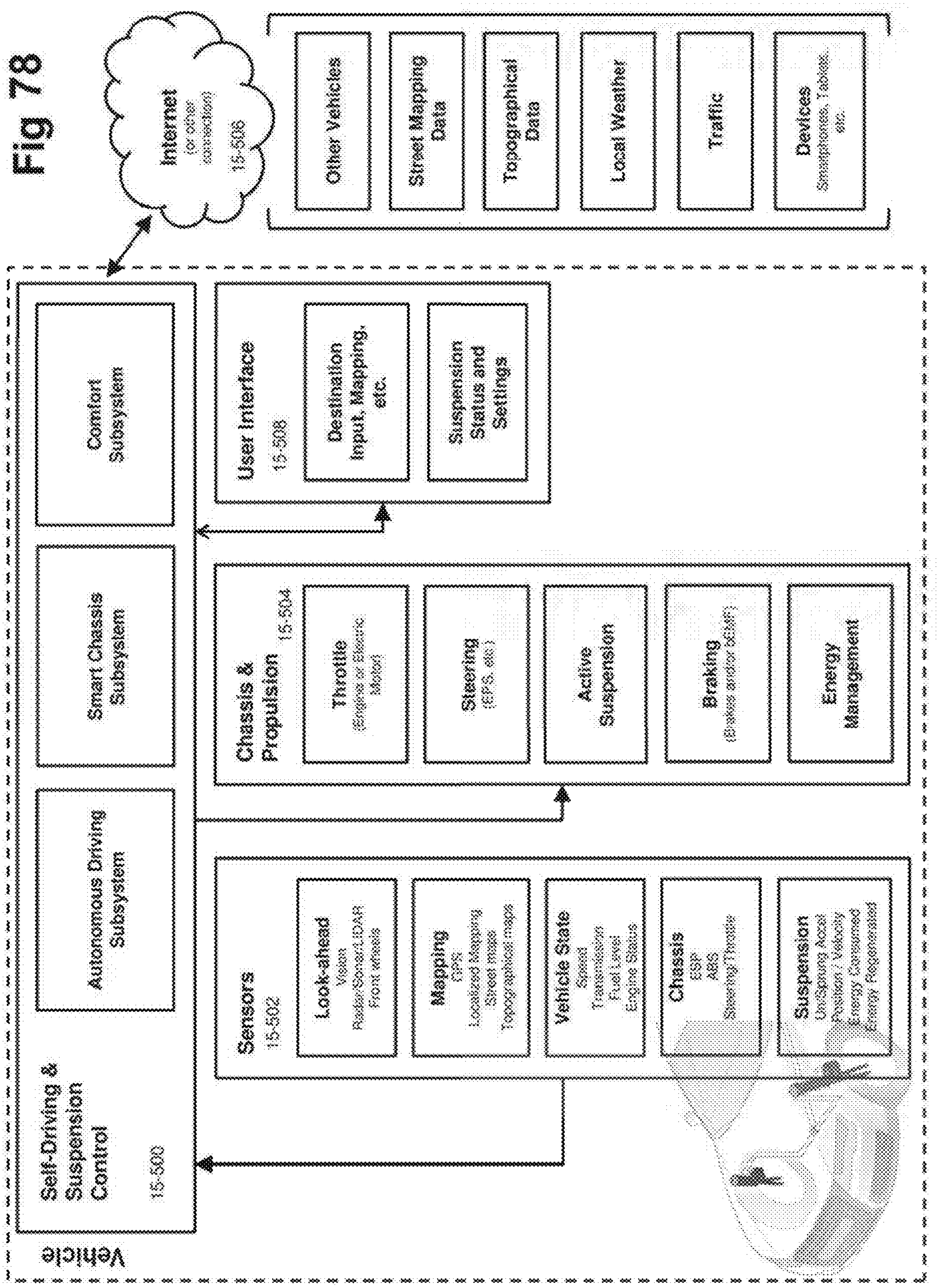
FIG. 78 is a block diagram of a self-driving vehicle with integrated adaptive chassis systems.

In FIG. 78 a self-driving vehicle with an integrated active suspension system is shown. The main control system 15-500 comprises controllers for the autonomous driving subsystem, the smart chassis subsystem, and the comfort subsystem. These controllers may be on a single controller or a plurality of controllers distributed about the vehicle. The autonomous driving subsystem is responsible for navigation, route planning, obstacle avoidance, and other driving related tasks. The smart chassis subsystem is an integrated control system that combines control tasks for a number of chassis and propulsion technologies. The comfort subsystem may provide control to a number of comfort systems such as controlling the active suspension system, interior cabin amenities, and may provide settings to the propulsion system to adjust throttle and steering response. The self-driving vehicle may have a number of sensor technologies on-board 15-502 which may be beneficially coupled with other vehicle systems such as an active suspension. These sensors include look ahead sensors (vision, radar, sonar, LIDAR, front wheel movement), mapping (GPS, localized mapping, street maps, topographical maps), vehicle state (speed, transmission state, fuel level, engine status), chassis sensors (ESP status, ABS status, steering/throttle position), and suspension sensors (unsprung and sprung mass acceleration, suspension position, velocity, energy consumed/regenerated). The chassis and propulsion systems 15-504 such as throttle, steering, active suspension, braking, energy management for the vehicle, and other chassis related technologies may be operatively controlled by the main control system blocks. A user interface 15-508 may be used to accept vehicle operator inputs such as destination inputs to compute a route or driving plan such as on an LCD touchscreen. In addition, suspension status may be viewed and algorithm settings may be programmed via the user interface. Finally, the self-driving vehicle may be connected via a network connection 15-506 such as to the internet. This network may connect the vehicle with data from other vehicles, with street mapping data, stored topographical data, local weather information, traffic information, and vehicle operator devices such as smartphones, tablets, etc. Vehicle operator devices may be used to further control the vehicle, such as allowing a destination input via a smartphone. Many of the above systems may be combined together and operatively communicate with one another in order to improve overall system performance. In addition, many of the technologies discussed in this specification may be operatively combined with features and modules shown in FIG. 78.

Figure 79:
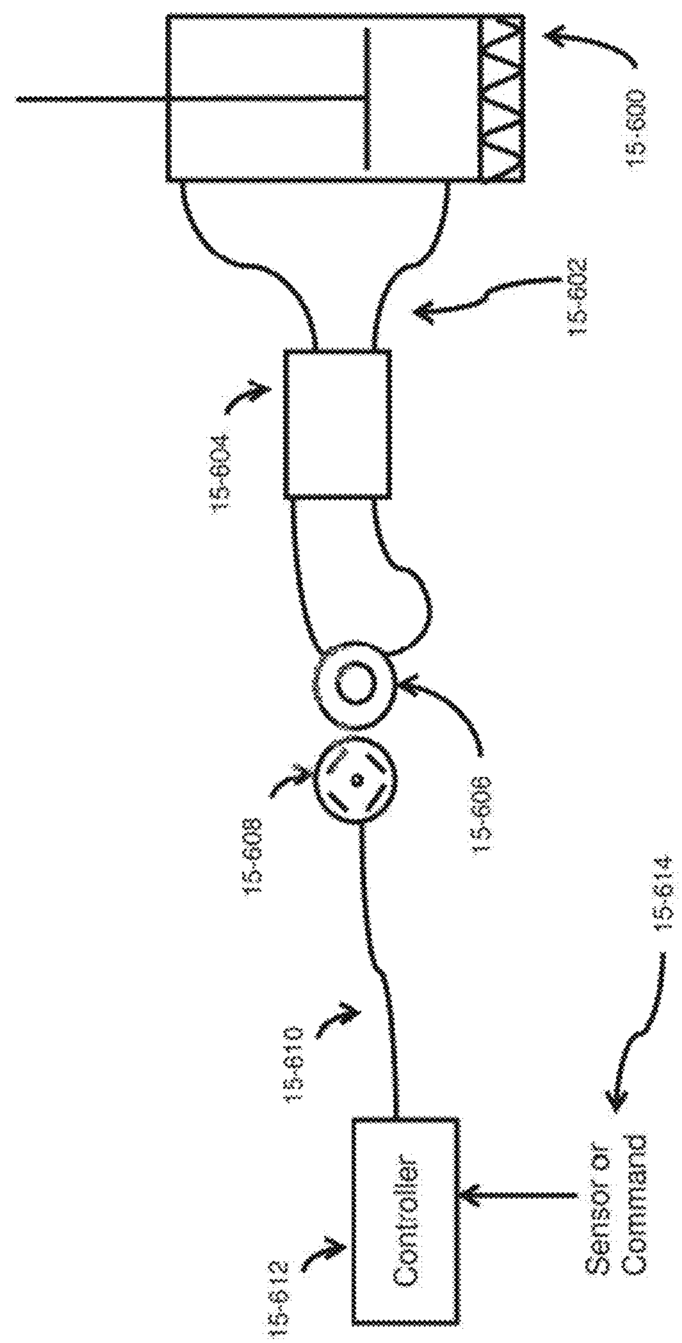
FIG. 79 is a drawing of an on-demand energy flow active suspension embodiment.

FIG. 79 demonstrates one embodiment of an active suspension actuator that operates in at least three operational quadrants of a force-velocity plot (with respect to the actuator). A hydraulic actuator 15-600 comprising a piston rod and piston head disposed in a housing, along with a gas filled accumulator (which may be inside the hydraulic actuator housing or in fluid communication externally), is connected via fluid communication channels 15-602 to a hydraulic motor/pump 15-606 (which may be a pump, a motor, or both). The fluid communication may pass through one or more valves 15-604 that are configured either in series with the fluid, in parallel with the pump, some combination of the two, or this may be a straight connection without any valving. In one embodiment this valving may include a fluid-velocity responsive diverter valve that opens a bypass path around the hydraulic motor at a predetermined fluid velocity, while still allowing some fluid to enter the hydraulic motor during the diverted bypass stage.

The hydraulic motor/pump is operatively coupled to an electric motor 15-608 such that rotation of the electric motor in a first direction causes fluid to pump into a compression volume of the hydraulic actuator, and rotation of the electric motor in a second direction causes fluid to pump into an extension volume of the hydraulic actuator. The electric motor is electrically connected via at least one wire 15-610 to a controller 15-612 that controls the motor. Motor control may comprise of torque control, velocity control, or some other parameter. The controller is responsive to algorithms operating the active suspension and/or to sensors or commands 15-614. For example, commands for actuator force or position may come from a vehicle system. An example of a suitable sensor is an accelerometer. The system is controlled in an on-demand energy manner such that energy is consumed or regenerated in the motor to rapidly create a force on the actuator.

Figure 80:
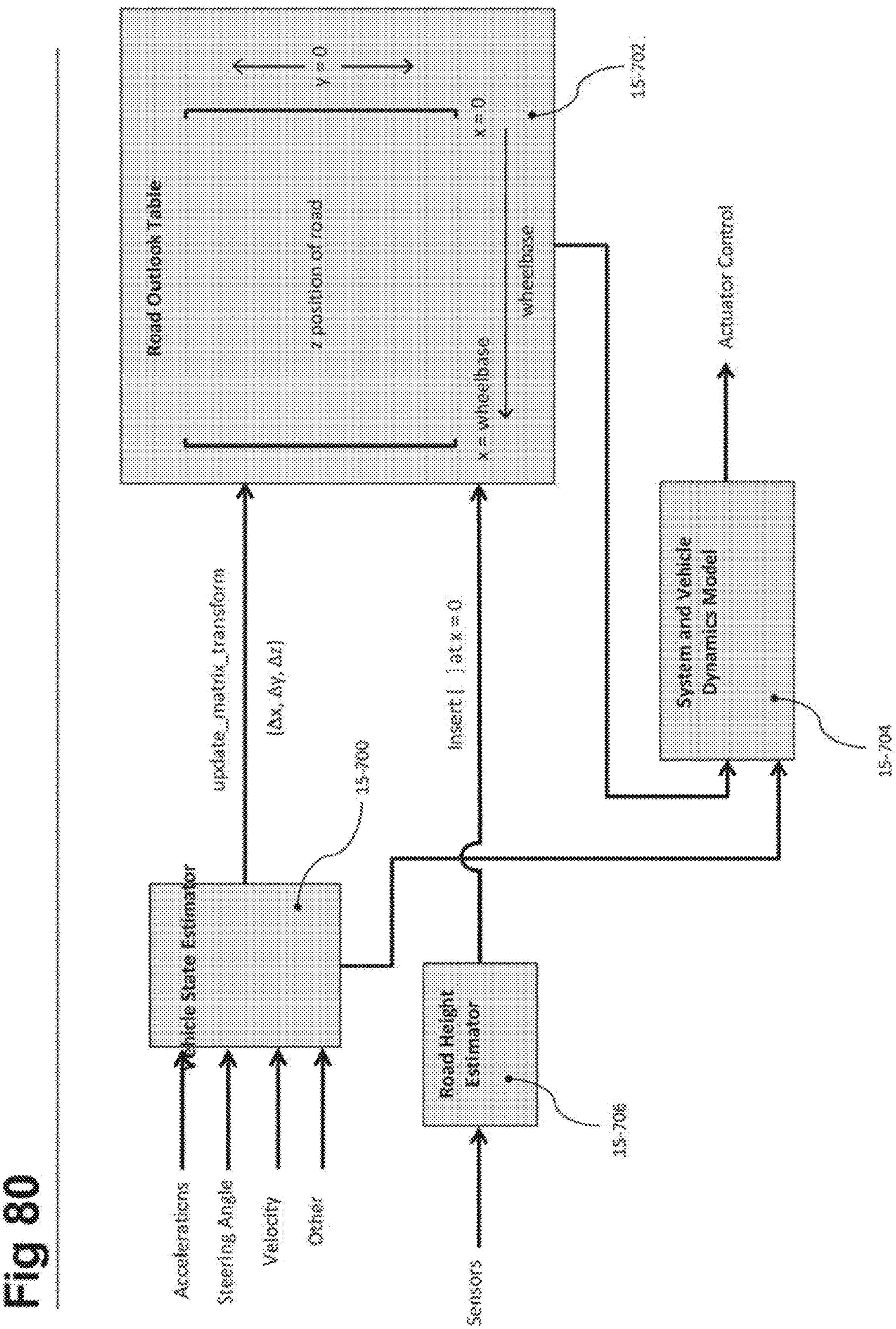
FIG. 80 is an embodiment using a topographical road mapping system that uses front wheels as a predictive sensor for rear wheels to control an active suspension system.

FIG. 80 is one embodiment of a topographical map that is specific to using data from the front wheels to provide improved response with the rear wheels of an active suspension. This may be beneficially combined with several technologies discussed in conjunction with sections discussing topographical maps, and shows one potential implementation of such a map. This may also be combined with several other elements in this specification, and is not limited to vehicles that are self-driving (i.e. it applies to human-operated vehicles).

In FIG. 80, a vehicle state estimator 15-700 determines a vehicle's kinematic state based on a number of sensors such as accelerometers, steering angle, vehicle velocity (wheel speed sensors, GPS, etc.). This functional unit calculates how the vehicle is moving across the terrain, and outputs a change in (x, y, z) coordinates for each time step. These coordinate deltas serve as a relative matrix transformation vector that is used to transform a topographical map, and may further comprise a rotation vector if the vehicle is turning. The topographical map in this embodiment is a road outlook table 15-702 that comprises a two dimensional matrix indexed by x values and y values, and containing z positions (heights) of the road for each relative coordinate. At the zero value of x is the terrain direction below the front axle, while the maximum value of x is the rear axle. The center of y is shown as the center of the car, with positive and negative values stretching to the track width of the vehicle. Therefore, the road outlook table 15-702 comprises a topographical map relative to the car and encompassing the road underneath the vehicle from front axle to rear axle, left side to right side of the vehicle. In other embodiments this road outlook table could be larger. For example, it could extend far in front of the vehicle and be seeded with data using look-ahead sensors, or it could extend past the sides of the vehicle. The road outlook table is fed into a system and vehicle dynamics model 15-704 that calculates a model-based open loop correction signal based on the upcoming z position of the road to each wheel, and creates an actuator control to mitigate the event. Meanwhile, sensors such as the front accelerometers or position sensors (or any sensor that indicates road information) are fed into a road height estimator 15-706, which estimates a z position of the road. For example, the wheel and body response to a certain bump may be measured using sensors and then an estimate determined of road height that caused the bump. In this embodiment where the sensors comprise the front wheels, this data is inserted at x equals zero, however it would be whatever corresponding position for the topographical map at hand. Since sensor data is not all encompassing across the x, y plane, a secondary method may operate to fill blank data slots with estimated road height. A number of methods can be used to accomplish this, but linear or quadratic interpolation between measured data points is one suitable method.

Using the methodology of FIG. 80, the vehicle can use information from the front wheels in an accurate manner that accounts for vehicle movement including steering and other effects. In addition, it can be robustly integrated with multiple predictive sensors including look-ahead sensors, GPS data, and front wheel sensors. All of these may dynamically update the topographical map, and where there is redundant data a best estimate between the multiple values is used.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Distributed Active Suspension Control System

Disclosed herein is a distributed active suspension control system consisting of highly-integrated, distributed, fault-tolerant actuator controllers, wherein the controllers implement a suspension protocol that is split into wheel-specific and vehicle-wide suspension protocols. The advantages of the distributed nature of the methods and systems of distributed active suspension control described herein include improved system performance through reduced latency and faster response time to wheel-specific localized sensing and events, and reduced processing load requirements of a central node, freeing up vehicle-wide resources. Additionally the fault-tolerant nature of the distributed actuators and controllers improves on the reliability and safety of the prior art.

Figure 81:
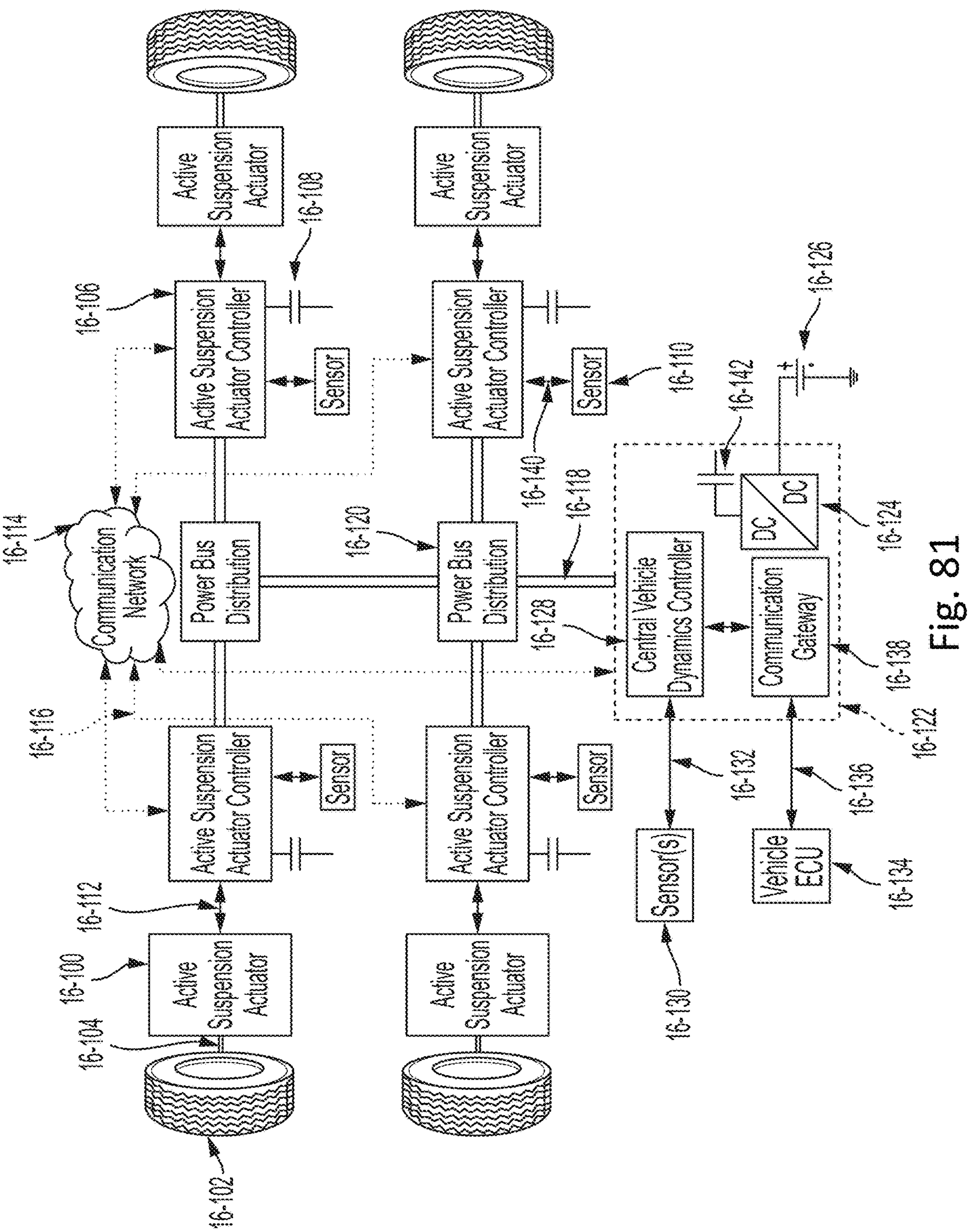
FIG. 81 is an embodiment of an active suspension system topology that includes a distributed active suspension actuator and controller per wheel, power conversion and bus distribution, a communication network and gateway, energy storage, central vehicle processing, and local and central sensors.

Referring to FIG. 81, an embodiment of an active suspension system topology is shown. In the embodiment shown in FIG. 81, the active suspension topology has four distributed active suspension actuators 16-100 disposed throughout the vehicle such that each actuator is associated with and proximal to a single vehicle wheel 16-102. The actuators could be valveless, hydraulic, a linear motor, a ball screw, valved hydraulic, or of another actuator design. The actuators are mechanically coupled 16-104 to the vehicle wheel and vehicle chassis such that actuation provides displacement between the vehicle wheel and vehicle chassis. The actuators are individually controlled by separate distributed active suspension actuator controllers 16-106 through a control interface 16-112. The controller processes local sensor 16-110 information 16-140 and communication 16-116 received over the communication network 16-114 that connects all of the distributed controllers. The active suspension actuators receive electrical power from a power bus 16-118 through power bus distribution 16-120. The distribution may be any combination of electrical wiring, fuse boxes, and connectors.

In the embodiment shown in FIG. 81 the active suspension system has a set of components 16-122 that are not specifically located in a distributed manner on a per vehicle wheel basis. These components include a DC-DC switching power converter 16-124 that converts a vehicle battery 16-126, such as the primary vehicle 12V battery, to a higher voltage for the power bus 16-118. The power converter may be a bi-directional DC-DC switching power converter, which would allow it to pass energy in both directions. The power converter in this embodiment utilizes centralized energy storage 16-142, such as supercapacitors or batteries, to buffer energy to the power bus. When the electrical load on the power bus exceeds the power converter's capabilities, the centralized energy storage can deliver buffered electrical energy. During periods of lighter electrical load, the power converter can recharge the energy storage in anticipation of a future heavy loading. Additionally, the centralized energy storage may serve to buffer electrical energy generated from the actuators in regenerative mode. Energy flowing out of electric motors in the actuators behaving as generators will be stored in the centralized energy storage. The stored energy may be used by the actuators or be transferred to the primary vehicle 12V battery through the power converter.

The set of components 16-122 also includes a central vehicle dynamics controller 16-128 that processes external sensor information 16-130 through a sensor interface 16-132, communications received through a communication gateway 16-138 from the vehicle ECU 16-134 over 16-136, and information received over suspension's communication network 16-114. The central vehicle dynamics controller is responsible for executing vehicle-wide suspension protocols that may include skyhook control, active roll control, and pitch control.

Figure 82:
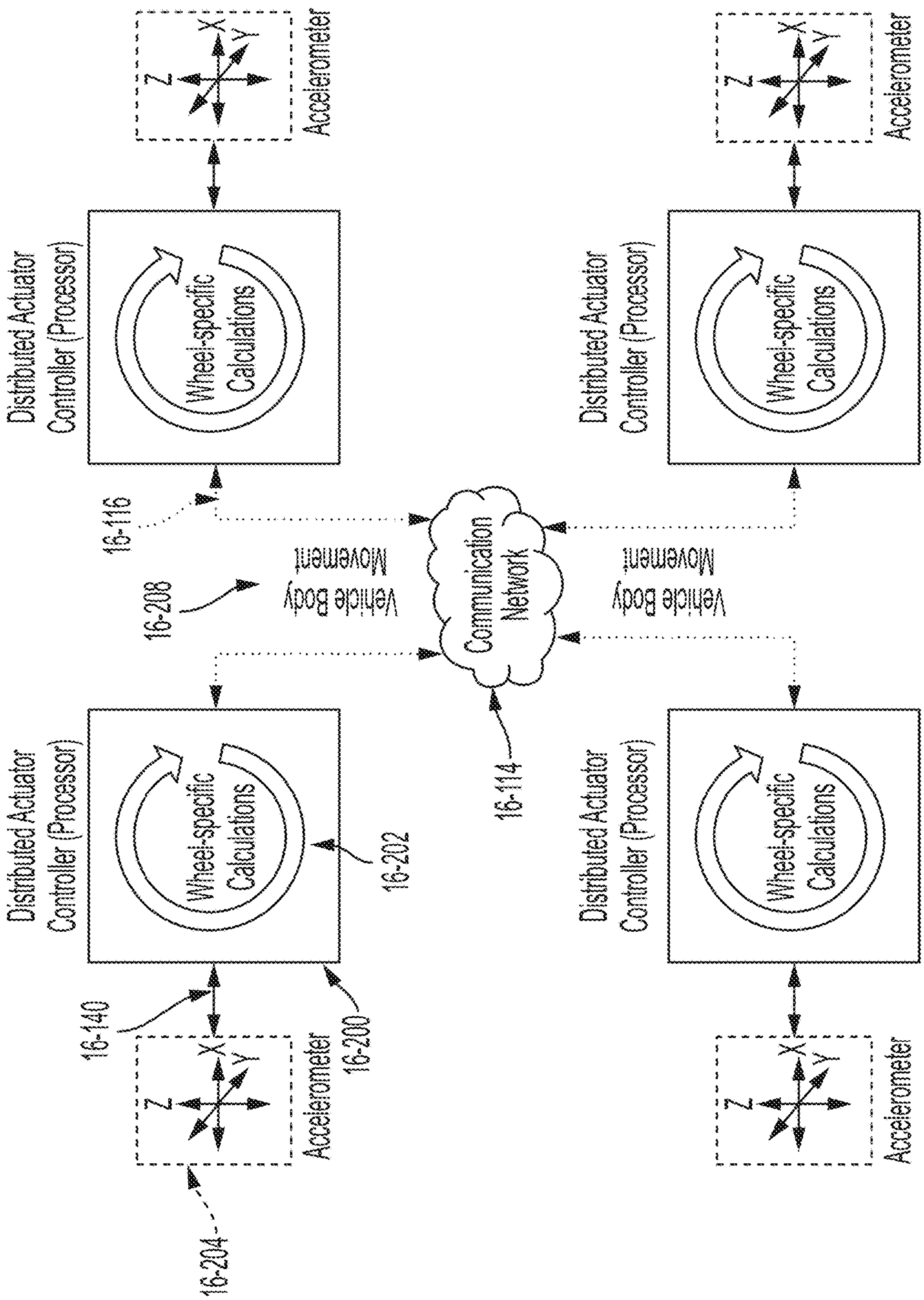
FIG. 82 is an embodiment of an active suspension system topology that shows distributed actuator controller processors utilizing local sensors to run wheel-specific suspension protocols and a communication network for communicating wheel-specific and vehicle body information.

FIG. 82 shows an embodiment of wheel-specific processing in an active suspension topology. The processor 16-200 is a subcomponent of the distributed actuator controller 16-106. The processor is typically a microcontroller, FPGA, DSP, or other embedded processor solution, capable of executing software implementing suspension protocols. In the embodiment of FIG. 82, the processor receives sensor information 16-140 from a three-axis accelerometer 16-204, which is one example of the local sensing element 16-110, and executes wheel-specific calculations 16-202 for a wheel-specific suspension protocols that may include groundhook control or wheel damping. The processor simultaneously receives vehicle body movement 16-208 and communication 16-116 from other distributed controller processors or a central vehicle dynamics controller over the active suspension communication network 16-114. In this embodiment, the overall active suspension protocol is comprised of two sub protocols, a distributed wheel-specific suspension protocol for calculating wheel control decisions and a vehicle-wide suspension protocol for calculating vehicle-wide decisions. The advantages of dividing the protocol into these two sub protocols include the reduced latency and faster response time with which the wheel-specific control can respond to localized sensing and events, and the reduced processing load requirements of a central node in the distributed network. Thus vehicle-wide decisions such as active roll mitigation can be arbitrated and executed by multiple controllers in conjunction with one another. The distributed actuator controllers are all in communication with each other and the central vehicle controller.

In the embodiment shown in FIG. 82, the wheel-specific calculations may include a preset, semi-active, or fully active force/velocity dynamic. The advantage of this approach is that in the event of a communication fault whereby any of the controllers lose communication capabilities, the controller is able to provide suspension actions and does not adversely impact operation of the other controllers in this fault-tolerant distributed network. The remaining controllers in the distributed network can respond to the fault by managing the remaining nodes of the distributed communication network and the behavior of the faulty controller can be monitored through local and central sensor information.

Figure 83:
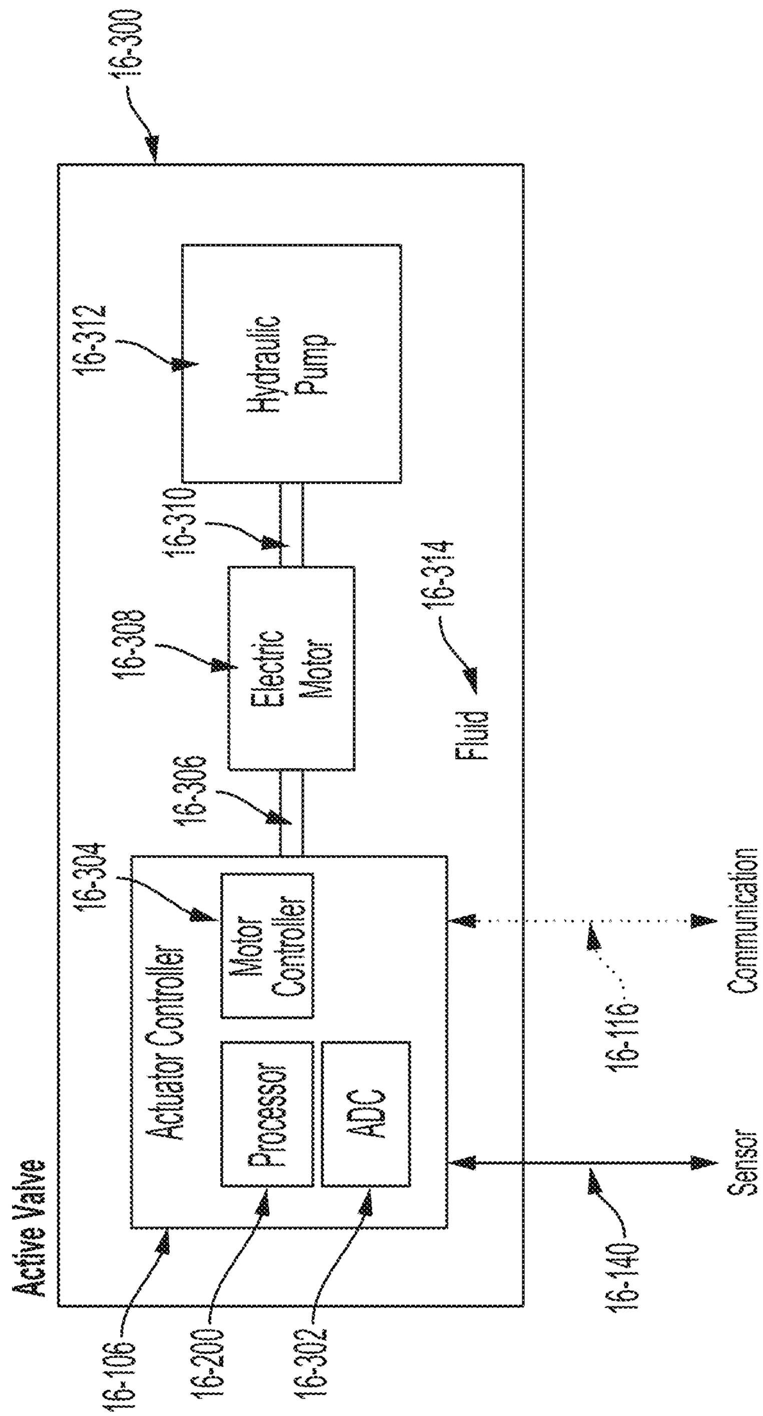
FIG. 83 is an embodiment of a highly-integrated, distributed active valve that includes a controller, electric motor and hydraulic pump located in fluid, a sensor interface, and a communication interface.

FIG. 83 shows an embodiment of a highly integrated, active valve 16-300. The active valve combines the actuator 16-100 and controller 16-106 into an integrated, fluid-filled 16-314 form factor that is compact and more easily disposed in close proximity to the vehicle wheel 16-102. In the embodiment shown in FIG. 83, the controller 16-106 is electrically coupled 16-306 to an electric motor 16-308. The electric motor is mechanically coupled 16-310 to the hydraulic pump 16-312 such that hydraulic flow through the pump results in rotation in the electric motor. Conversely, rotation of the electric motor results in hydraulic flow through the pump. In some embodiments of the methods and systems of distributed active suspension control described herein, the electric motor and hydraulic pump are in lockstep whereby position sensing of the electric motor provides displacement information of the hydraulic actuator and velocity sensing of the electric motor provides velocity information of the vehicle wheel 16-102.

The controller in the embodiment of FIG. 83 is comprised of the processor 16-200, a motor controller 16-304, and an analog-to-digital converter (ADC) 16-302. The motor controller is an electrical circuit that receives a control input signal from the processor and drives an electrical output signal to the electric motor for control of any one of the motor's position, rotational velocity, torque, or other controllable parameter. For a multi-phase brushless DC electric motor, the motor controller has an element per phase for controlling the flow of current through that phase. The controller receives sensor information 16-140 and communication 16-116 that is used to execute wheel-specific and vehicle-wide suspension protocols. The ADC may be used to condition the sensor information into a form that this interpreted by the processor if the processor cannot do so directly.

Figure 84A:
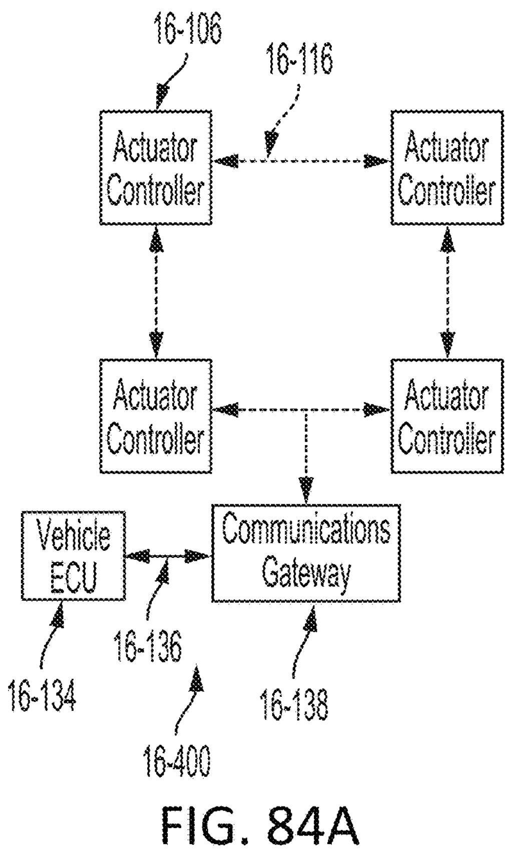
FIGS. 84A-84D show embodiments of communication network topologies for a four node distributed active suspension system with four distributed actuator controllers.
Figure 84B:
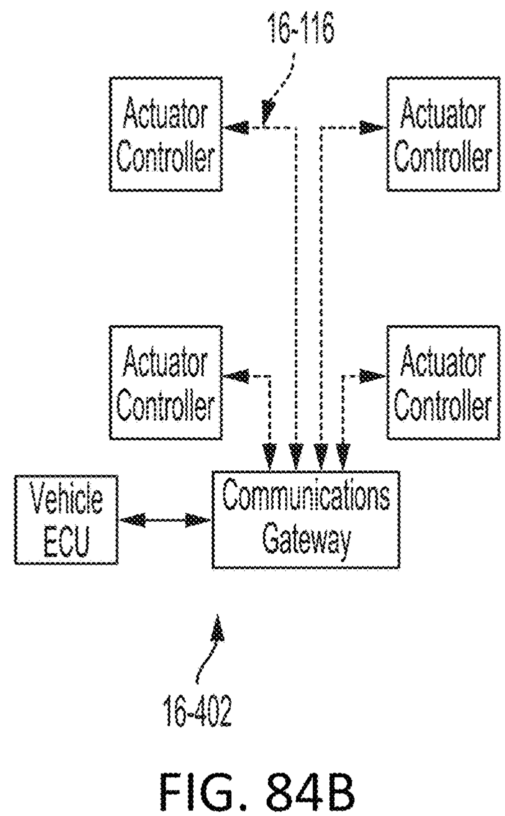
Figure 84C:
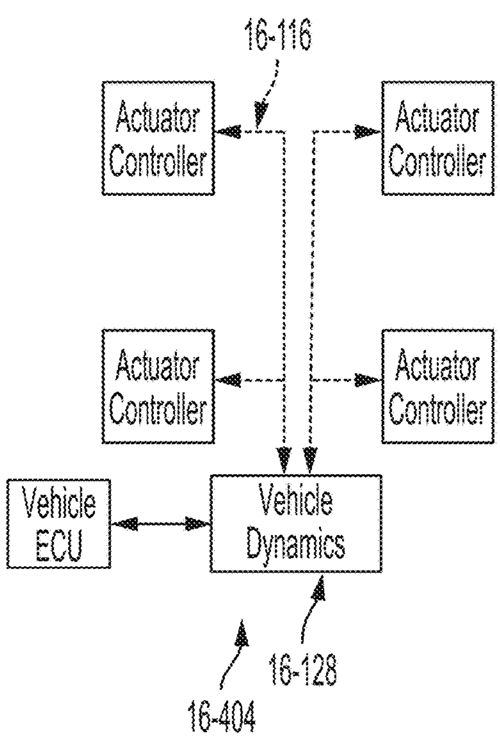
Figure 84D:
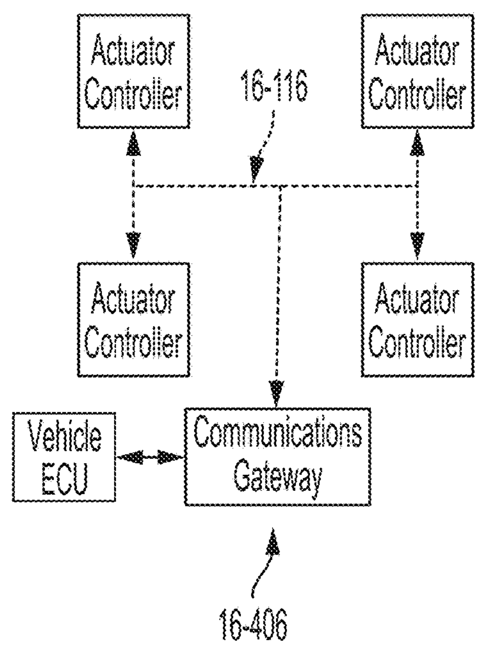

FIGS. 84A-84D 16-4 shows embodiments of communication network topologies for a four node distributed active suspension system with four distributed actuator controllers 16-106. The key aspect of all network topologies is that all distributed actuators and any central vehicle dynamics controller are capable of communicating with each other. FIG. 84A 16-400 shows a ring network topology whereby the communication 16-116 is passed from controller to controller with a single connection to a communication gateway 16-138. A disadvantage of this topology is that it relies on the distributed nodes to relay messages around the ring, whereby a fault-tolerant controller must be designed to maintain basic forwarding capability. It also limits the bandwidth of communication between the gateway and any of the distributed nodes. FIG. 84B 16-402 shows a network topology whereby the communication 16-116 to each distributed node passes through a communications gateway to the vehicle ECU. An advantage of this topology is the communication isolation provided such that the nodes are no dependent on each other in their communication to the vehicle ECU. FIG. 84C 16-404 shows a network topology whereby each communication connection is shared by two distributed nodes. This topology may be implemented in a vehicle where both wheels on a given side, both wheels in the front or back form the two distributed nodes sharing the communication connection. FIG. 84D 16-406 shows a shared network topology whereby every node of the distributed network is connected to the same physical interface. For each embodiment 84A-84D the present methods and systems of distributed active suspension control described herein may interchange the communication gateway 16-138 and central vehicle dynamics 16-128 components, or use them both in combination, to achieve the desired suspension functionality.

Figure 85:
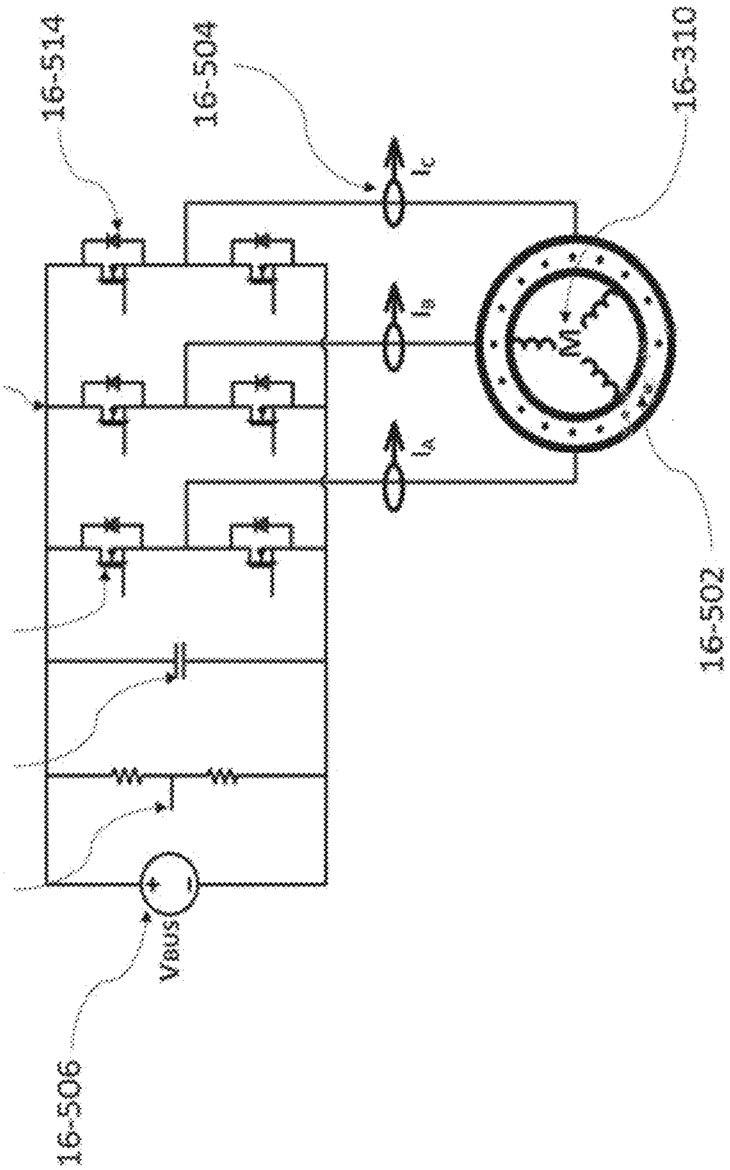
FIG. 85 is an embodiment of a three-phase bridge driver circuit and an electric motor with an encoder, phase current sensing, power bus, voltage bus sensing, and a power bus storage capacitor.

FIG. 85 shows an embodiment of a three-phase bridge circuit 16-500 and an electric motor 16-310 with an encoder 16-502, a power bus 16-506, phase current sensing 16-504, voltage bus sensing 16-508, and a storage capacitor 16-510. Each phase of the bridge circuit contains a half-bridge topology with two N-channel power MOSFETS 16-512 and its output stage for controlling the voltage on its respective motor phase.

A three-phase bridge circuit as shown in FIG. 85 is typically driven by a set of MOSFET gate drivers capable of switching the low-side and high-side MOSFETs on and off. The gate drivers are typically capable of outputting sufficient current to quickly charge a MOSFET's gate capacitance, thereby reducing the amount of time the MOSFET spends in the triode region where power dissipation and switching losses are greatest. The gate drivers take pulse-width modulated (PWM) inputs signals from a processor running motor control software.

The body diode 16-514 on each N-channel MOSFET 16-512 of the three-phase bridge circuit as shown in FIG. 85 plays a key role in the regenerative behavior of the circuit and distributed actuator described in the methods and systems of distributed active suspension control described herein. When the motor rotates and the MOSFETs are not driven, these body diodes act to rectify the back electromotive force (EMF) voltage generated by the motor acting as a generator. The electrical energy that is rectified can be stored in the bus storage capacitor 16-510 and can be used to self-power the circuit.

Figure 86:
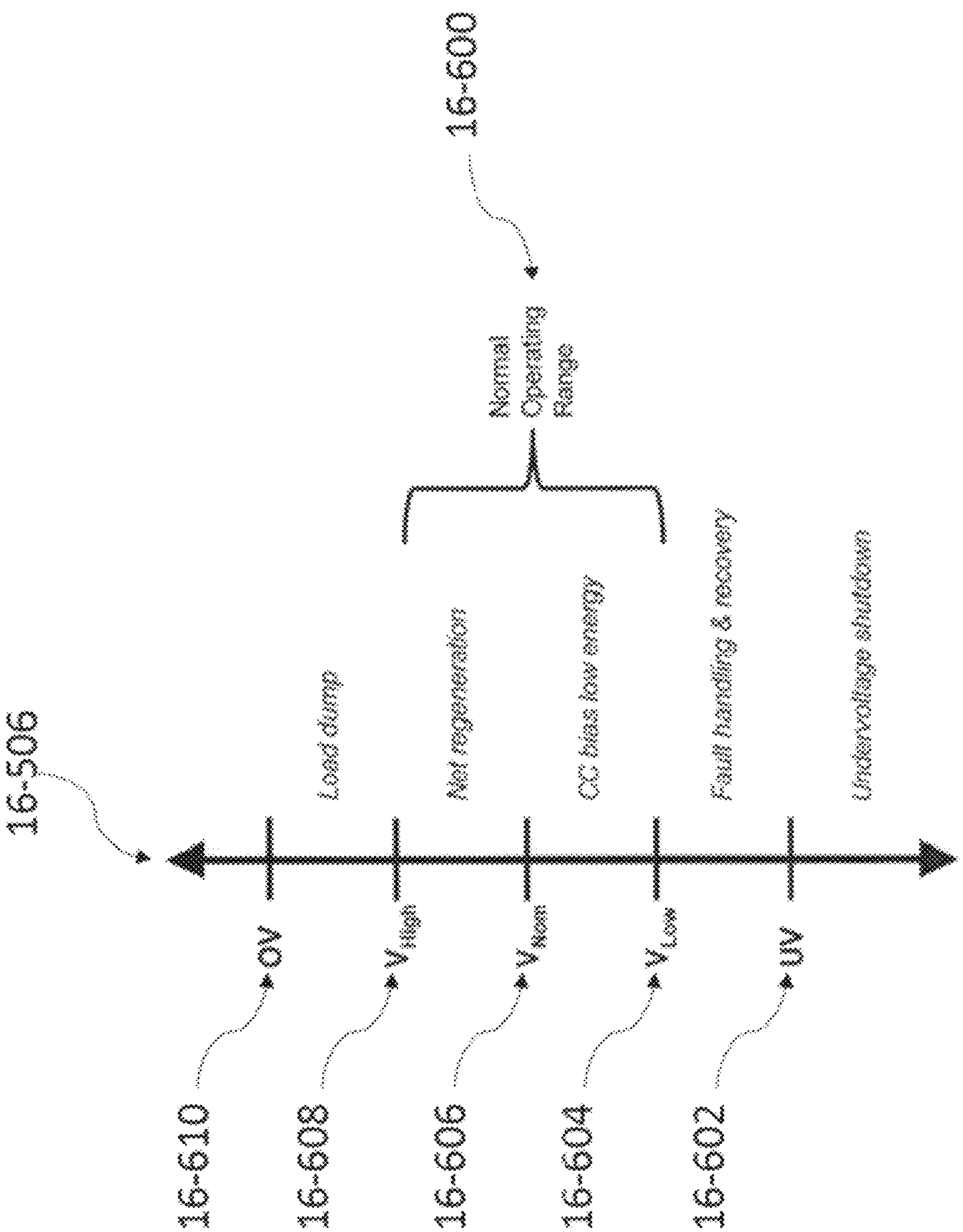
FIG. 86 shows an embodiment of a set of voltage operating ranges for a power bus in an active suspension architecture.

FIG. 86 shows an embodiment of a set of voltage operating ranges for a power bus 16-506 in an active suspension architecture. The voltage levels of the bus are important to the operation of the actuators and controllers. On the lowest end of the voltages shown in FIG. 86, undervoltage (UV) 16-602 is a threshold below which the system cannot operate. $V_L$ow 16-604 is a threshold that indicates a low, but still operational system. Dropping the power bus voltage below $V_{Low}$ begins a fault response in preparation for a possible undervoltage shutdown. $V_{Nom}$ 16-606 indicates the center of the normal operating range 16-600. This is the desired range over which to operate the electrical system. $V_{High}$ 16-608 is a threshold that indicates a high, but still operational system. Exceeding $V_{High}$ and approaching the overvoltage threshold (OV) 16-610 begins a load dump response to remove electrical energy from the power bus and reduce the voltage.

Figure 87B:
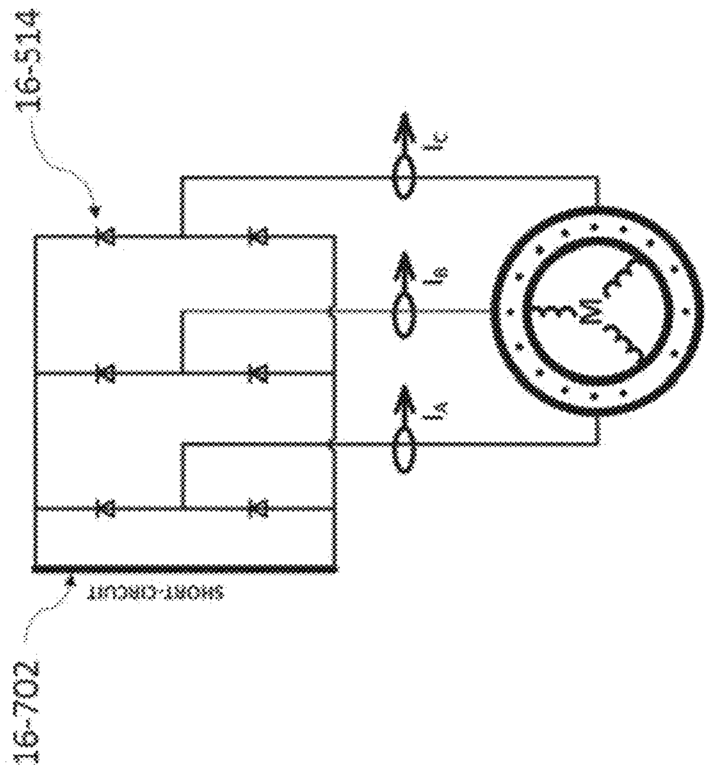
FIGS. 87A-87B show embodiments of open-circuit and short-circuit bus fault modes and the equivalent circuit models for the respective modes.
Figure 87A:
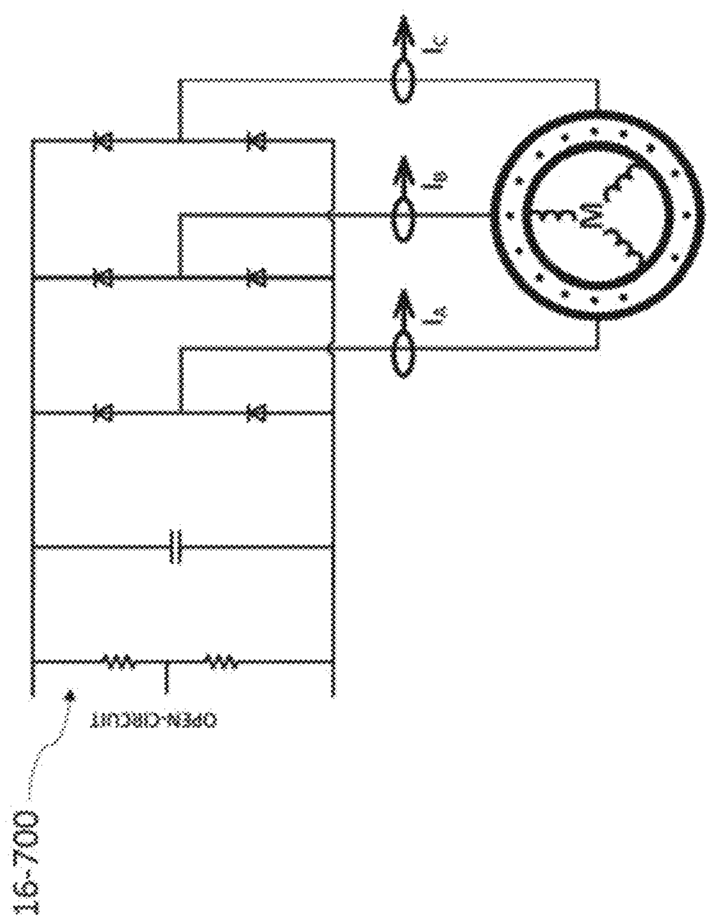

FIGS. 87A-87B show an embodiment of two power bus 15-506 fault modes, labelled as open-circuit 16-700 and short-circuit 16-702. In the open-circuit fault mode, the power bus has become disconnected from the shared power bus of the active suspension system 16-118. Under these circumstances, the actuator and controller's performance depend on the state of energy stored on the power bus and the amount of regenerative energy harvested. If the power bus voltage can remain in the normal operating range 16-600 based on stored and regenerated energy, the motor controller will continue to operate. In the short-circuit fault mode, the power bus has its positive and negative terminals shorted, collapsing the bus voltage. Under these circumstances, the motor controller is below the undervoltage threshold 16-602 and the motor performance is fixed.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Context Aware Active Suspension Control System

An important drawback of traditional active suspension systems is the fact that they often have very high energy consumption. Many of these systems use control algorithms similar to those used in semi-active suspensions, which in a fully-active system consume large amounts of energy.

In order to achieve the goals set above, the system must fight compliances and loss mechanisms inherent in the vehicle, such as friction, suspension spring stiffness and roll bar stiffness, hydraulic losses, and damping in the various rubber elements (e.g., bushings), for a high percentage of its operating cycle. This leads to a large consumption of power in even the most efficient active systems. By focusing on the more important performance goals only, or by watering down performance in general, existing systems may be made more efficient, though oftentimes at the cost of significant reduction in the benefits the system brings to the end consumer.

A better approach to solve this dilemma is "situational" active control, whereby the amount of active control used is dictated directly by the situation at hand. These methods are distinct from the traditional control strategies used with past semi-active and active systems.

The sensor set used for this may include any of the many signals available in a modern car, including acceleration sensors and rotational rates of the car body (gyroscopes), position or velocity of the suspension, vehicle speed, steering wheel position, and other sensor information such as look-ahead cameras. Estimated signals may include estimated (current or upcoming) road vertical position, estimated road roughness, position of the vehicle on the road, and other available signals.

The methods and systems disclosed herein relate to reducing energy consumption in an active suspension system. A set of detectable wheel events and vehicle events is defined, where wheel events are defined as inputs into the wheel that cause the wheel or the body to move, especially where they cause the wheel or body to move in a way that exceeds a perception threshold for the occupants of the vehicle, or that exceeds the thresholds defined for an instrumentation platform, weapons system, video camera platform, medical operation table, or other device that represents the target system.

The operation of the active suspension system is then adjusted such that the interventions of the system in response to events not defined consume substantially less power, but that the interventions of the active suspension system to events that are in the set defined require more power, but provide noticeably more benefit to the occupants or target system, to maintain vehicle or platform movement below a perception threshold defined for the system.

In another embodiment, methods and systems are disclosed for reducing energy consumption in an active suspension system, where a set of detectable events is defined in a way that they produce movement greater than a perception threshold specified for the occupants or the target system. The active suspension system reacts to the detected events in the set of events described above by increasing power demand to a level that is sufficient to maintain motion of the suspended body below a perception threshold defined for the vehicle's occupants or the target system.

In one embodiment, the suspended body may be a passenger or transport vehicle, and the active suspension system is disposed between the vehicle body and at least one of the wheels. In another embodiment, the suspended body is an inertial weapons platform, and the suspension system is disposed between the platform and the platform support structure. In another embodiment, the suspended body is a medical procedure table and the suspension system is disposed to mitigate events generated by movement of the table or a surface that the table contacts. In another embodiment, the suspended body is a video camera stabilization platform, rig, or gimbal and the suspension system is one or more links disposed to mitigate events generated by movement of the platform, rig, or gimbal.

A different aspect of the invention relates to a method for reducing energy consumption in an active suspension system whereby the expected benefit in terms of perception or comfort level associated with each desired intervention of the active suspension system is calculated continuously. At the same time, the cost in terms of energy or power consumption of each desired intervention is also calculated, and the two are weighed against each other to find the optimal level of intervention required to maintain a minimum level of comfort at a small cost in terms of energy consumption.

The intervention is scaled with the expected benefit-to-cost ratio, with a function that may range from a simple threshold to non-linear target thresholds, to a function including minimum or maximum thresholds, to a fully nonlinear continuous function.

In one embodiment, the expected benefit is calculated based on a model of the suspension system and the suspended body, including other physical parameters, allowing for pre-establishment of the expected benefit and cost once an event is detected.

In one embodiment, the expected benefit calculation may use sensor information from any sensor on the vehicle or a wheel in order to detect and classify events. In another embodiment, the benefit calculation uses advanced sensor information from forward-looking sensors, cloud-based road profile information in conjunction with global positioning, information from other vehicles driving the same road, or which have driven the same road in the past, or historical data from previously having driven the same road in the same vehicle.

In another embodiment, the benefit calculation is done using statistical analysis of the road and previous events to predict future events and the result of desired interventions. For example, the system may record the result of interventions at a given performance parameter value on a given event type, and thus improve its performance every time the vehicle encounters an event of that type.

Another aspect of the invention relates to a method for reducing energy consumption in an active suspension vehicle by calculating the desired roll or pitch force command in a maneuver. This desired roll or pitch force command in general may be such that it allows the system to partially or fully compensate for the effects of lateral or longitudinal inertial force acting on the vehicle body as a result of in-plane motion of the vehicle. The desired force command may be calculated based on a model, or based on measured quantities.

The method may calculate the actual roll or pitch force command in such a way that it initially follows the desired roll force command at least partially, and after a first period of time starts slowly decreasing from the initial value. After a second period of time, and if the input remains constant during that time, the actual roll or pitch force command reaches a predetermined or adapted steady-state value that allows power consumption to be reduced but maintains a vehicle motion response that is deemed acceptable and safe by the occupants. The final energy consumption value may be at or below a threshold for power consumption, or the final vehicle roll angle may be at a limit value deemed acceptable.

If the input changes during the period of time before the first time cutoff threshold, where the actual roll command force at least partially follows the desired roll force command, the active suspension system responds by following all input changes rapidly. If a portion of the input remains constant, and a portion changes after the period of time where the actual command at least partially follows the desired roll force command, then the system responds by quickly following the changes in desired roll force command, but keeps slowly decreasing the component of the roll force command that is due to the unchanged component of the input.

If at any time the input reverses direction, then in one embodiment the system may behave as if the previous inputs had not existed, and as if this was the first turn encountered.

A method to reduce active suspension energy consumption, such as described here, may be particularly effective in conjunction with open loop driver input correction algorithms. These algorithms allow estimating the desired roll force commands based on a model of the system by using measured or estimated driver commands as the inputs. For example, they may use the steering angle and the vehicle speed in combination with brake pedal force, or any sensors suitable to measure or estimate those quantities, to predict the vehicle motion and thus anticipate the inertial forces on the vehicle. This allows for an estimate of the desired roll and pitch force command that is not sensitive to the actual motion of the vehicle, and may be used as a stable reference signal to calculate the actual roll force command as a function of time. This allows for more stable operation of the algorithm described above, which might be more sensitive if it used measured lateral acceleration as its input. It also allows using the estimated lateral acceleration as an input for the desired roll force command in vehicles where no lateral acceleration sensor is present.

Open loop driver input correction may also serve as a great event classification method for driver inputs, for example by categorizing steering and handling events by the calculated lateral acceleration based on the open loop vehicle model, or by other less measurable parameters in the model such as the lateral tire force built up in each axle. The system also allows detecting events due to handling in the absence of a lateral acceleration sensor in the vehicle.

A method for reducing active suspension energy consumption may work well in conjunction with frequency-dependent damping, whereby the frequency at which the roll force commands are applied, which is generally in the body frequency range of up to 6 Hz, is separated from the frequency at which wheel damping events happen, which is generally around 10 Hz. The frequency-dependent damping may serve to maintain a minimum level of energy regeneration in a regenerative active suspension system, and thus may help reduce energy consumption overall. Frequency-dependent damping also helps by improving the detectability of wheel events, and reducing the requirements on the event detector to be able to focus more heavily on wheel events around body frequency. In addition, it may allow suspension control protocols to be distributed about the vehicle across a plurality of controllers such as actuator specific controllers and central vehicle controllers.

The method for reducing active suspension energy consumption may be associated with an active suspension with on-demand energy flow, whereby the energy required to act on an event that was detected is drawn instantaneously from the active suspension system without constant energy consumption between events. This allows maximizing potential of the event detector scheme by allowing it to reduce energy consumption between events to a very low level. With an active suspension with on-demand energy flow, the suspension may be in a very low power or even a regenerative mode during driving times where the disturbance to the occupant is low, and only consume power during times when the disturbance to the occupant may be high without the active suspension system. In an active suspension system with substantial continuous power draw, this benefit may be much less marked. By controlling the energy consumption source in an active suspension to rapidly create a force response, many of the methods, systems, algorithms, and protocols described herein may be enhanced so that the system may throttle energy consumption dynamically.

The methods and systems for reducing active suspension energy consumption may be associated with an active safety method for active suspensions. The active safety method for active suspensions acts on various safety aspects of operating a vehicle, such as for example impending crashes, roll-overs, or vehicle skid situations. When operating in conjunction with a static active suspension algorithm, the active safety system has to fight the normal operation of the active suspension if it tries to move the vehicle, for example to raise the front end or entire vehicle in an impending crash. When operating in conjunction with an event detector scheme, the system may be used in synergy. The event detector may identify and classify safety events, as described in this patent, and communicate those to the active safety algorithms, which may in turn act on them to raise occupant safety. Sensors used in the event detector protocols may be shared with the active safety system. Vice-versa, the active safety system may provide information to the event detector to qualify safety events as events where the benefit calculation is maximized, and the cost is neglected. The event detector scheme may then again act to provide safe driving functionality at all costs, and improve the safety outlook for the occupants.

Figure 88:
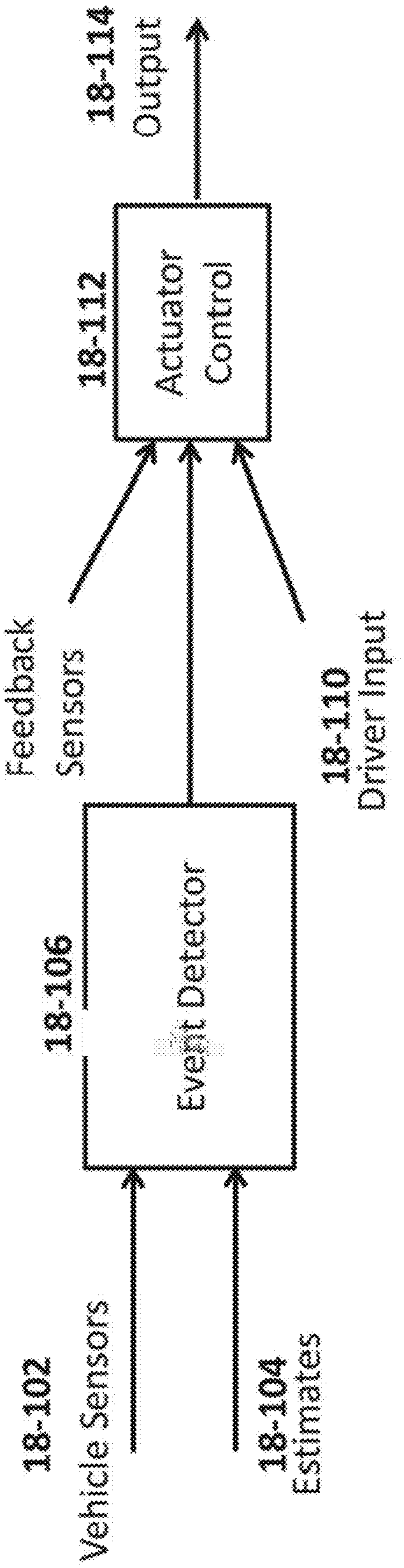
FIG. 88 shows the general logic for an event detecting control scheme, where sensors and estimates generate events that change the behavior of the energy management control system.

FIG. 88 shows one possible embodiment of an energy throttling active suspension control scheme, where an event detector 18-106 reacts to inputs from sensors 18-102 and estimates 18-104 to decide if an event requiring high amounts of active control has happened, is in process, or is about to happen.

The sensors may include vehicle motion sensors such as acceleration sensors, velocity sensors, position sensors, and rate gyros, but may also include look-ahead information from vision-based systems, radar, sonar, and other similar technologies. They may include measured quantities related to driver input, such as steering angle or torque, brake apply pressure, and manual transmission status, and measured quantities related to vehicle status, such as actual brake pressure, automatic transmission status, engine parameters such as crankshaft angular velocity, and vehicle or wheel speed. They may include the status of other vehicle systems, such as anti-lock braking, stability control, or traction control, and of vehicle systems such as electronic power steering or air suspension. The sensors also may include measurements representing the electrical states of the system, such as power, current, or voltage measurements. They may also include sensors measuring other physical quantities such as tire pressure, airspring pressure, temperature, road surface texture, and others.

The estimates represent quantities that are estimated based on combination of measured quantities and calculated quantities from models or equations. These may include for example road roughness, road coefficient of friction, vehicle motion state derived from a vehicle model, as well as estimates of power consumption and general vehicle power state. The estimates may also include statistical or projected future parameters, such as expected road profile in cases where we may extrapolate road profiles from past history of the road, expected road roughness or vehicle attitude, expected driver actions based on historical information, and others. These estimates may be calculated internal to the controller where the event detector resides, or via external electronic control units of the vehicle such as the stability control ECU or another state predictor controller.

For the rear wheels, information gathered from the front wheels, such as estimated road position, input harshness, suspension travel history, or other useful signals, may be used to improve the event detection.

The output of the event detector may be in the form of a command when the information is accurate, or in the form of a parameter adjustment (such as a response to rough road or to driver input, where the response may be a change in the control strategy going forward), and may in general be accompanied by a "confidence" factor. This output, along with vehicle feedback sensors 18-108 and measured driver input 18-110 is the input to the actuator control logic 18-112, which determines the required output command.

FIG. 89 shows a possible implementation of an intervention cost-benefit table that may be used to determine the output performance factor for the general active suspension algorithms. The first column lists the event types, which are recognized through an event detector scheme. Event detector schemes are detailed in this disclosure, but may include identification algorithms that process forward-looking data or measured body/wheel data (e.g. accelerometers) in order to determine a characteristic situation the vehicle is in. For example, a rough road might be detected by a high average RMS wheel acceleration, and a driveway entrance may be detected by a detected downslope and immediately following rising slope. While the embodiment of FIG. 89 shows discrete event types, some embodiments may classify using continuous functions such as a road roughness severity factor or traversed obstacle height factor.

The second column lists the calculated intervention benefit for a given event type. This benefit may be calculated ahead of time for a given event type, but may also be calculated instantaneously for a specific upcoming intervention. For example, when driving on a road that has been smooth but is getting rougher, we may estimate that the benefit from increasing the active control is more aligned with a medium-rough road, and may thus decide to increase the performance factor to be used. The benefit can be scaled from 0 to 100%, with 100% being the most beneficial intervention.

The benefit to the consumer may be measured using an algorithm that may be one of many widely accepted performance metrics for human perception of vibration, and it may be modified through the use of specific information about passenger vehicles (where for example roll motion of the vehicle is more widely felt than pitch motion), and through the use of historic information from past events in the vehicle or in similar vehicles.

The third column shows the projected or pre-calculated cost of the intervention. This cost may be in terms of energy expended for the event, or average power if the event is ongoing. While this embodiment demonstrates a predetermined intervention cost, the invention is not limited in this regard. Several embodiments calculate cost as incurred. For example, the control algorithm may attempt to mitigate the rough road event, measure a running average of consumed energy, determine the intervention cost is exceeding a threshold, and due to the low intervention benefit gradually reduce mitigation of the event.

Figures 90A, 90B, 90C:
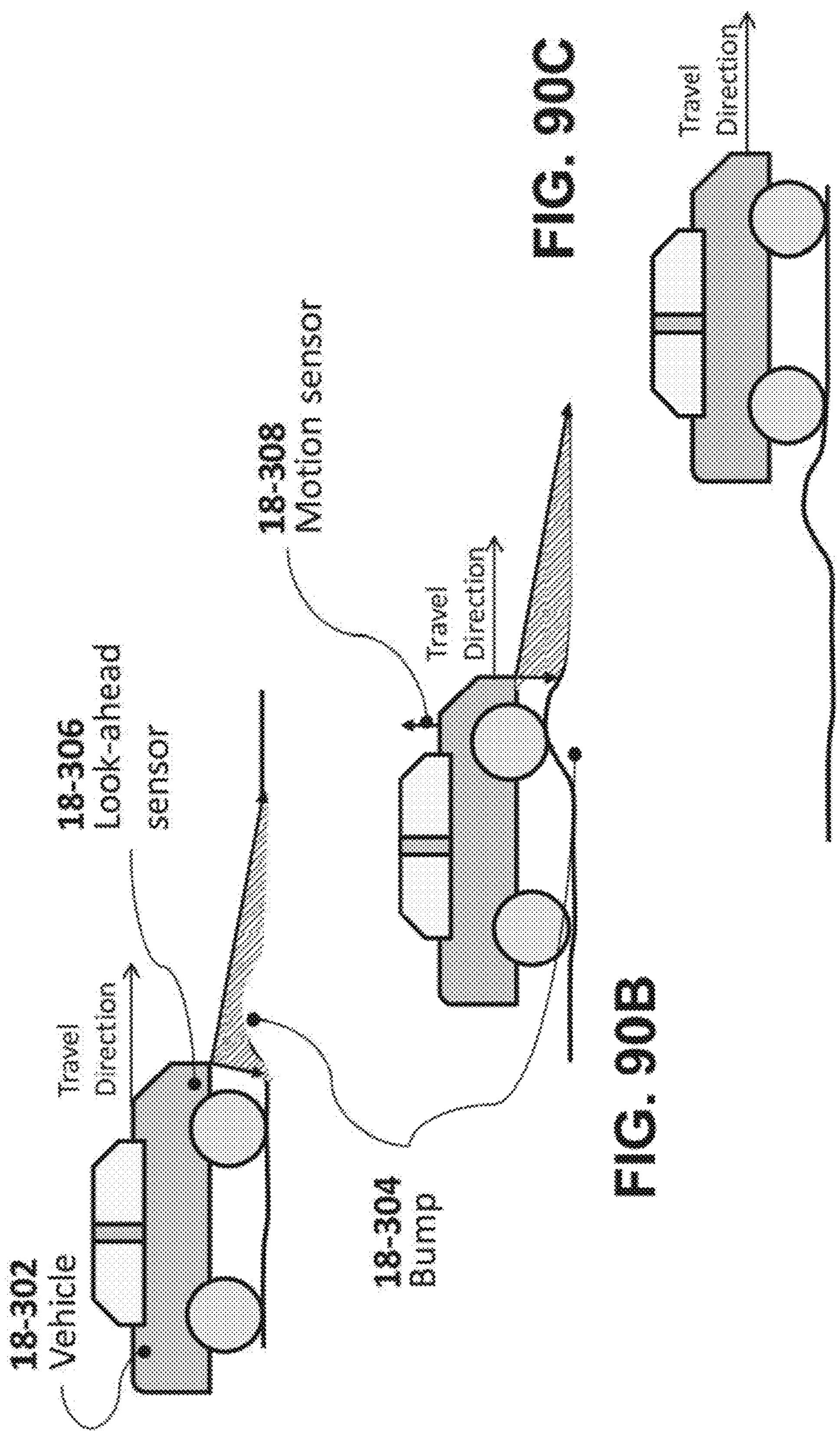
FIG. 90A-90C shows an example of the event detector in operation, where the vehicle hits a bump, detects the event, and switches into high performance mode during the event only.

FIGS. 90A-90C shows an example of the event detector scheme in operation. The vehicle 18-302 is traveling from left to right in the figure. The road profile is smooth under the vehicle in FIG. 90A, and thus the benefit to the occupants of a high performance active suspension system is low. Thus, in this situation the active suspension system is in a low energy mode.

The event detector may now recognize an event 18-304, possibly ahead of the event if the vehicle uses a look-ahead sensor 18-306, or at the onset of the event as shown in FIG. 90B if the vehicle employs a motion sensor 18-308 (such as an accelerometer or displacement sensor). In response to the event detection, the active suspension switches to a high performance mode, thus maintaining optimal comfort for the occupants.

Once the event is completed, as shown in FIG. 90C, the active suspension system switches back into a low energy mode. Modes such as low energy and high performance are general labels, and the system may be implemented in a continuous fashion where gain factors, thresholds, and other parameters are modified to affect low energy, high performance, and the like.

Figure 91:
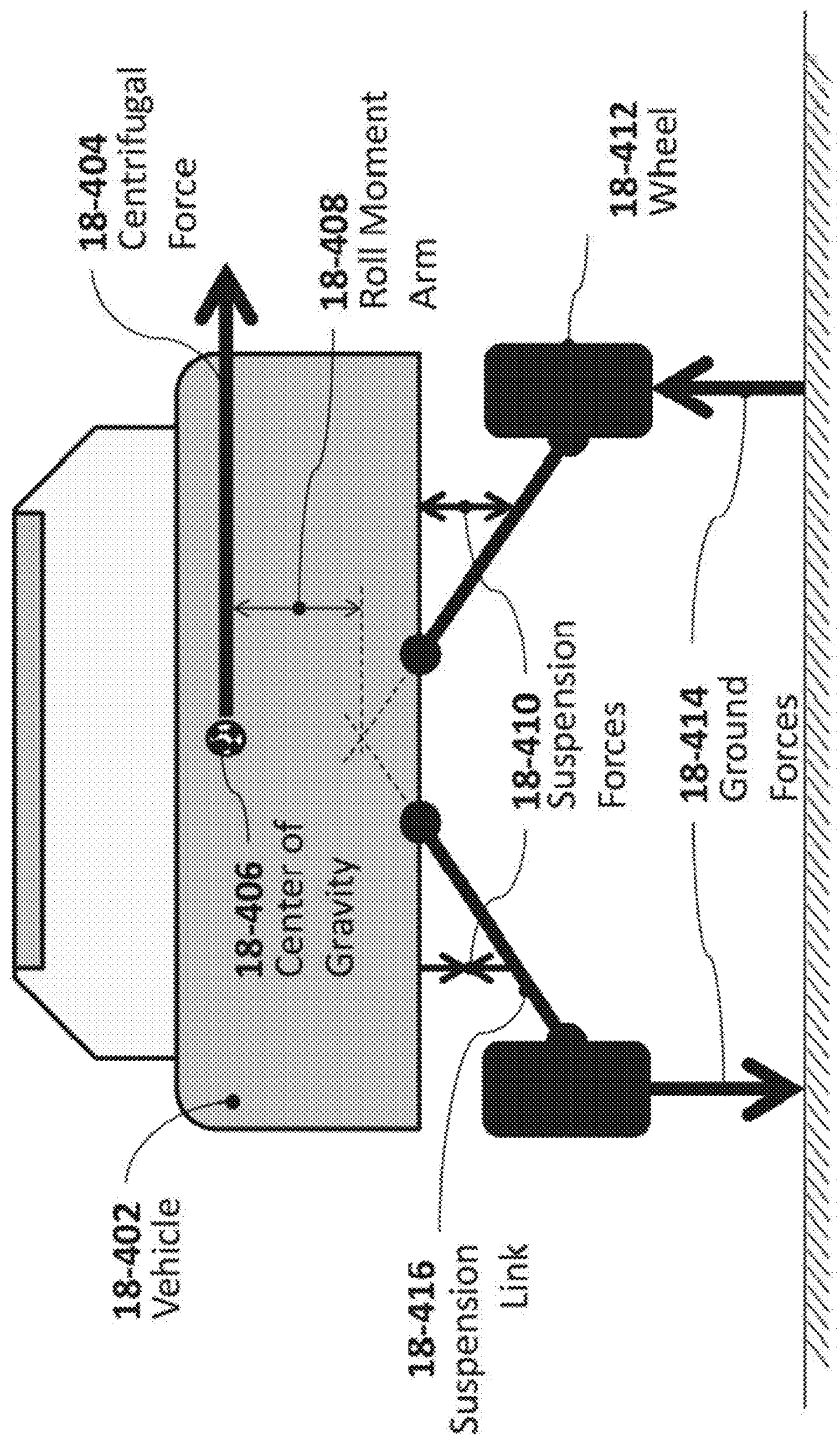
FIG. 91 shows the general layout of a vehicle in a turn, with the forces and moment arms governing the physics of the system.

FIG. 91 shows forces acting on a vehicle in a turn. The vehicle 18-402 is pictured from behind turning left. In a left turn, the centrifugal force on the vehicle 18-404 pulls toward the right side of the vehicle, and may be thought of as acting on the center of gravity of the vehicle 18-406.

The vehicle's suspension as seen from the rear of the vehicle may be thought of as a single link 18-416 connecting each wheel 18-412 to the vehicle body. The link connects the instantaneous center of rotation of the suspension kinematics to the wheel, thus instantaneously representing all the suspension constraint forces (which follow the direction of the link). The intersection of the projections of the two links creates the vehicle's roll center. The distance from the roll center up to the center of gravity is the roll moment arm 18-408, which determines how much the vehicle wants to roll due to the centrifugal force 18-404.

The suspension is held up by suspension forces 18-410, and the two wheels each create a ground force 18-414. Both the suspension and ground forces are shown in the diagram without the static contributions of the vehicle weight.

When the vehicle turns to the left, the roll moment created by the centrifugal force 18-404 around the roll moment arm 18-408 must be counterbalanced by the moment created by the left and right suspension forces.

The suspension forces are composed of spring forces, damper forces and actuator forces, which in this schematic are assumed to be all acting on the same point. In the absence of active forces, a given roll moment may require a fixed roll angle of the vehicle in order to create the necessary spring forces. Damper forces in general may only act on a roll velocity of the vehicle, and are not relevant for steady-state discussions.

Figure 92:
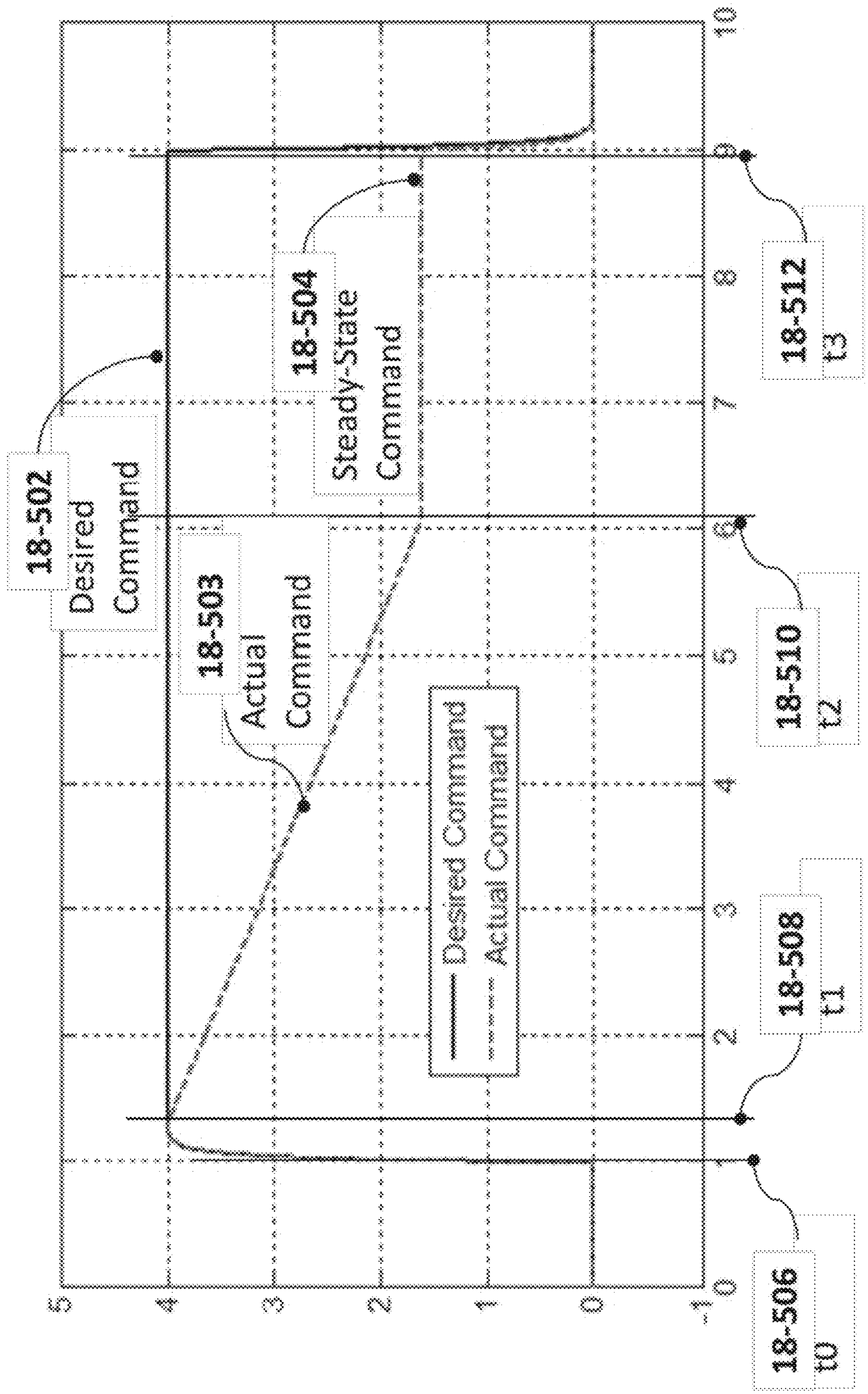
FIG. 92 shows the roll bleed algorithm for a step steer input of long duration.

FIG. 92 shows an example of functionality of the roll bleed algorithm. The desired command 18-502 in this example represents a desired command to during a step steer. This desired command may be based on vehicle stability parameters and might not account for time or energy considerations. The desired command may comprise a flat curve correlating lateral acceleration and roll angle (to ensure the vehicle is always level), or it may allow some roll at a given lateral acceleration. The steering input may be a sudden change of steering angle at time t0 18-506, leading to a desired control force shown by the solid line 18-502 (here represented in units of lateral acceleration, but this may be in terms of actuator or wheel force, or other similar command). The actual roll control command 18-503 follows the desired command up to a time t1 18-508, then slowly decreases until time t2 18-510, at which point it has reached a steady-state command value 18-504. At time t3 18-512 the input is removed and both the desired and actual command go back to 0. The time thresholds may be fixed constants or adaptive based on driving conditions, style, vehicle modes, etc. The reduction of the actual command with respect to the desired command, or the roll bleed, may be set to have a preset slope, a non-linear response, or it may be adaptive based on a number of parameters.

Figure 93:
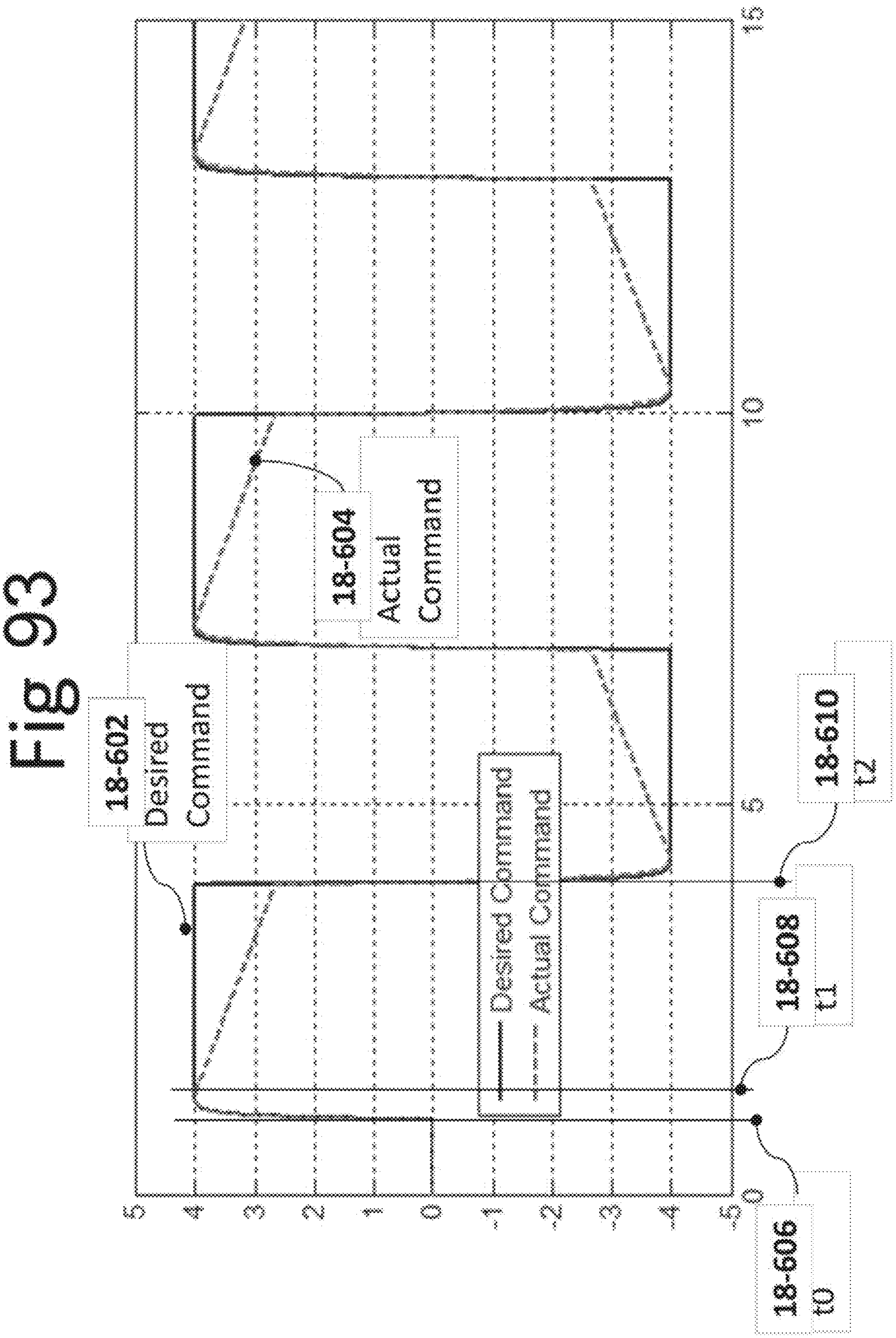
FIG. 93 shows the roll bleed algorithm for a step slalom input of medium duration.

FIG. 93 shows the same roll bleed algorithm for a faster maneuver. This time the input is a step slalom maneuver, where the input steering angle is held constant for three seconds, then changes direction and is again held constant for three seconds. The input changes at time t0 18-606, creating a desired command 18-602 that steps up and holds constant.

The actual command 18-604 again follows the desired command 18-602 until time t1 18-608, and then starts dropping off. This time, the input is removed at time t2 18-610 before the actual roll command has reached its steady-state value, and the actual command simply follows the desired command into the beginning of the next turn, only to then bleed off again as before.

Figure 94:
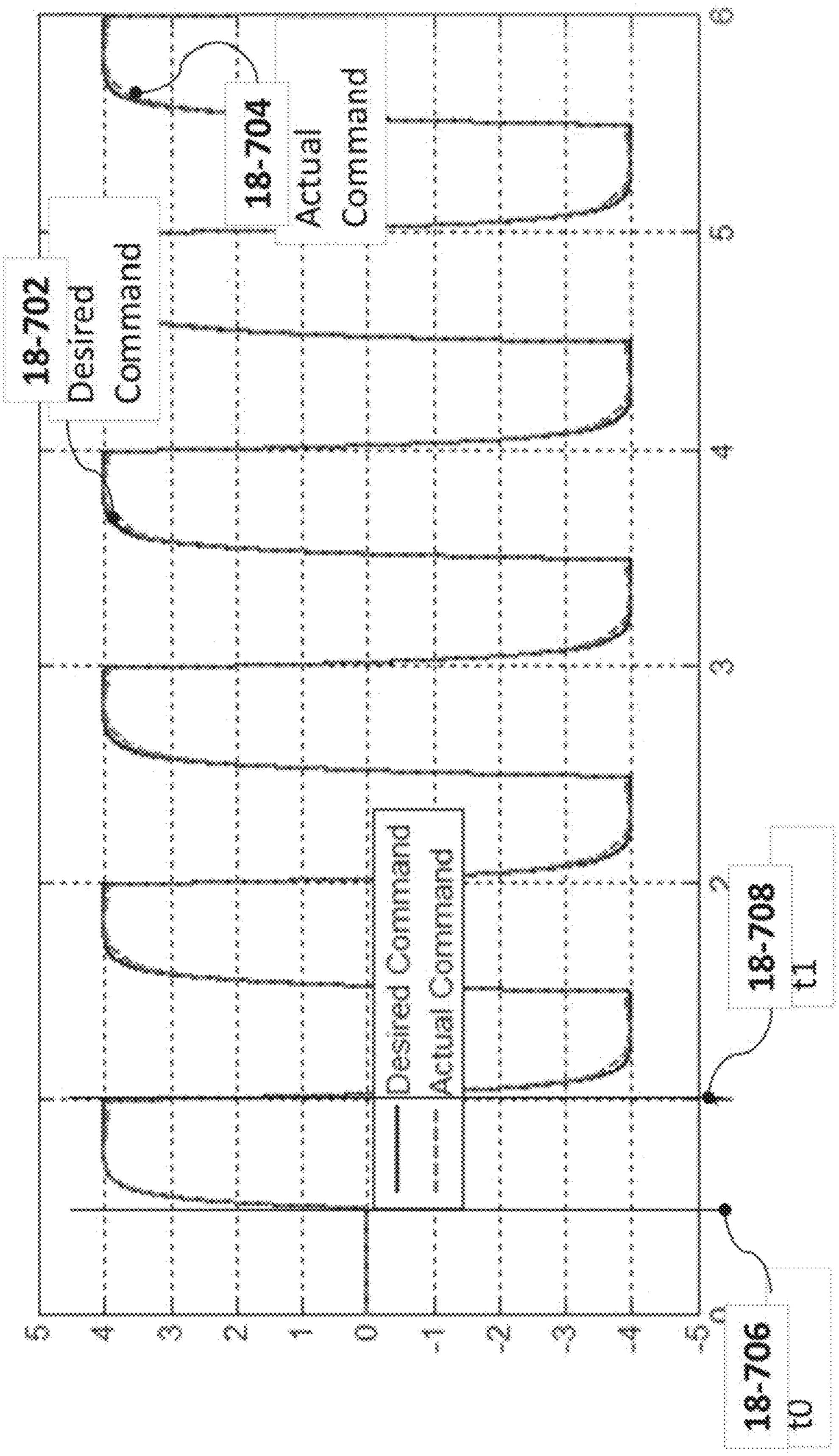
FIG. 94 shows the roll bleed algorithm for a step slalom input of short duration.

FIG. 94 shows the same roll bleed algorithm for an even faster maneuver. This time the input is again a step slalom maneuver, where the input steering angle is held constant for a half second, then reversed. The desired command 18-702 again steps up at time t0 18-706, and then reverses at time t1 18-708. This time though, the actual command follows the desired command through the entire input motion.

Figure 95:
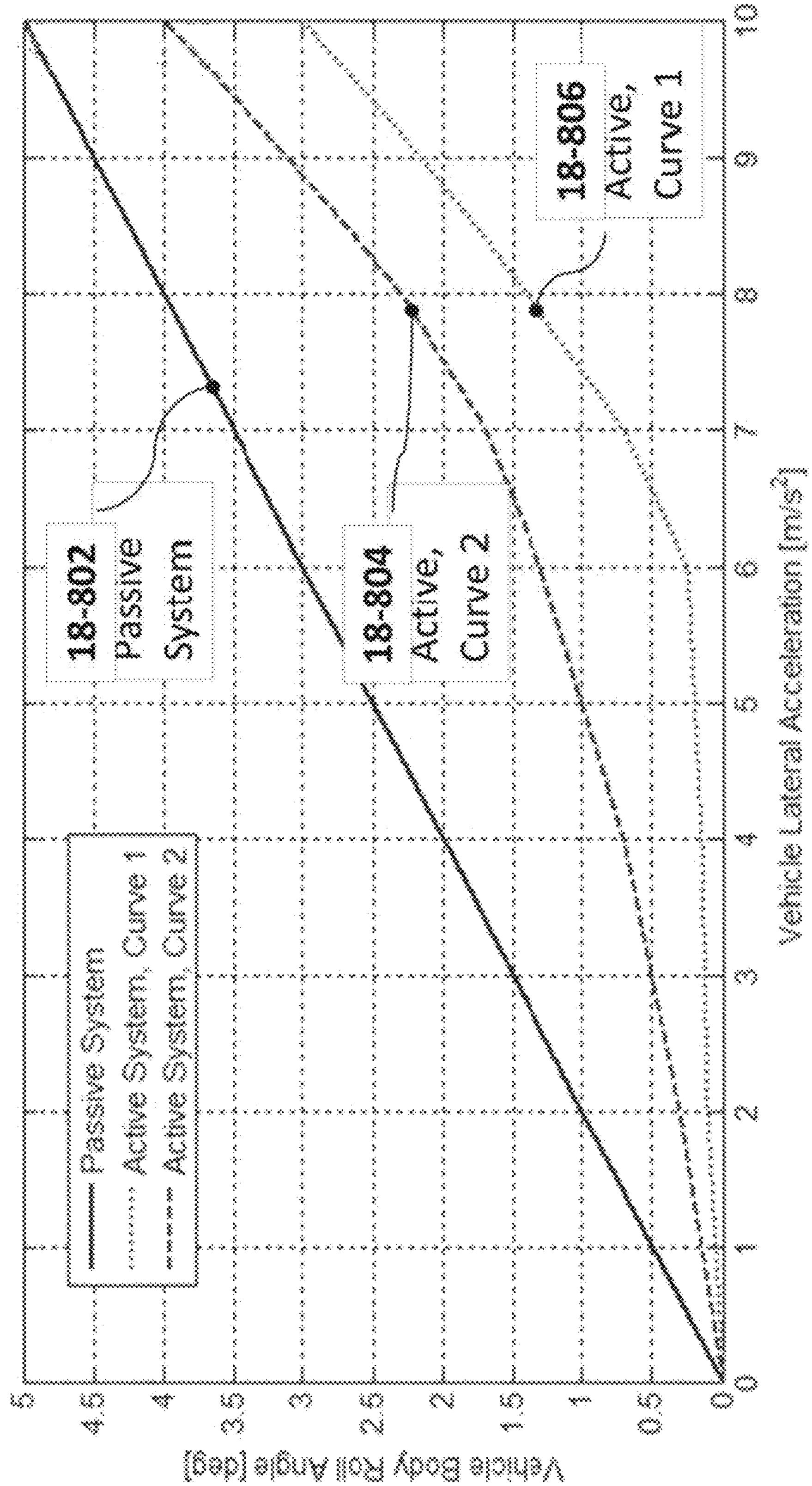
FIG. 95 shows a steady-state roll angle as a function of steady-state lateral acceleration for a passive vehicle and two active curves that are part of a situational active control method.
Figure 96:
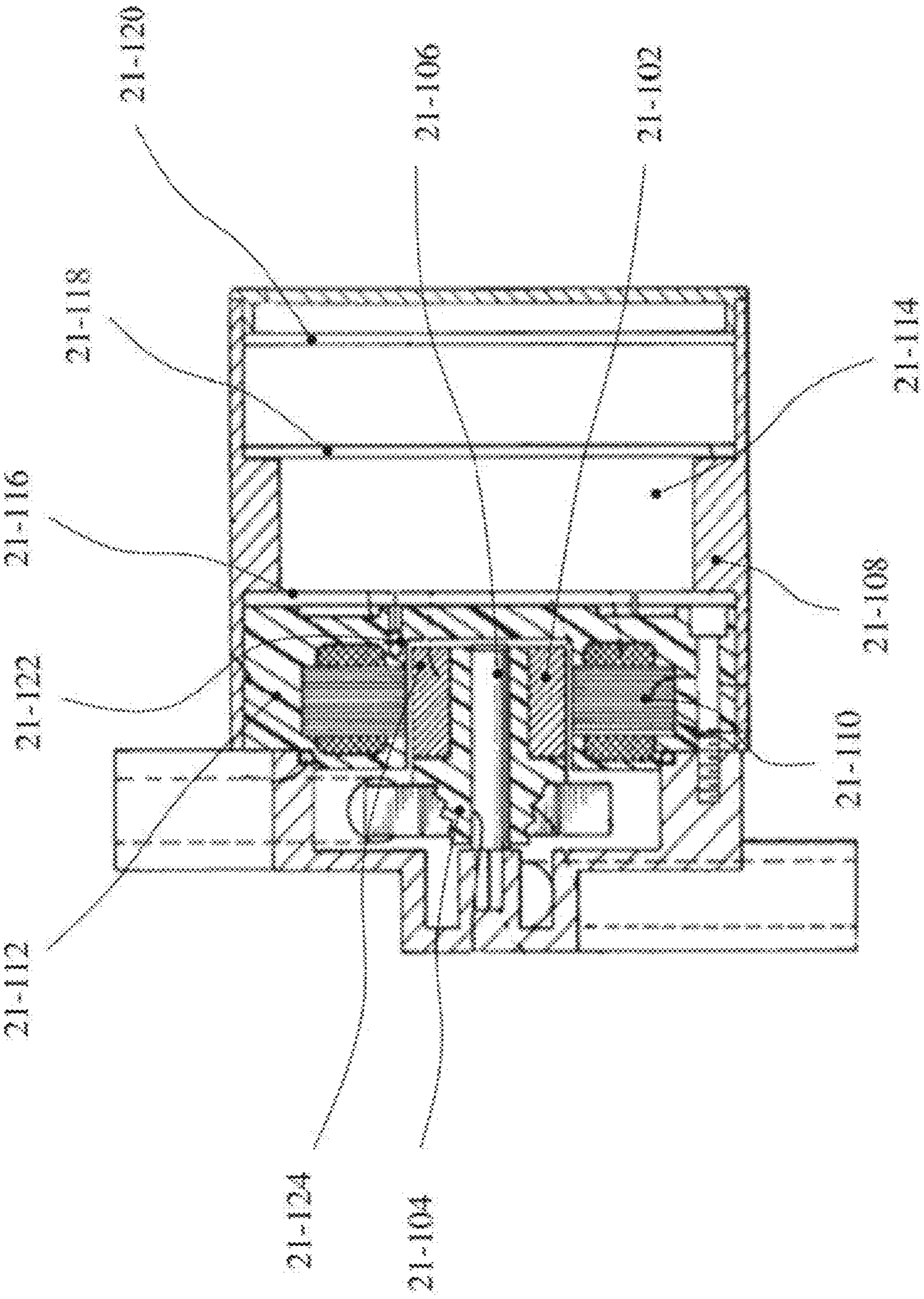
FIG. 96 is a cross section of the integrated pump motor and controller assembly in accordance with the prior art.

FIG. 95 shows examples of the steady-state roll angle of the vehicle body in a passenger vehicle as a function of the steady-state lateral acceleration of the vehicle. A typical passive vehicle may have a response that is governed by springs and thus fairly linear as a function of lateral acceleration. This is shown in curve 18-802. The active suspension algorithm initially responds with a desired roll angle curve that for example may follow a relatively flat curve, and become steeper at higher lateral accelerations due to force limiting in the active suspension system. This curve may look like curve 18-806. Once the roll bleed algorithm has been active for some time, and the system has reached the desired steady-state value at which power consumption is lower, the steady state result might trend to a curve like the one shown in 18-804.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Brushless Dc Motor Rotor Position Sensing in an Active Suspension

In certain types of active suspension actuators, an electric motor is used to provide torque and speed to a hydraulic pump to provide force and velocity to a hydraulic actuator, and conversely, the hydraulic pump may be used as a motor to back-drive the electric motor as a generator to produce electricity from the force and velocity inputted into the actuator.

For reasons of performance and durability, these electric motors may be of the BLDC type and may be mounted inside a housing close-coupled with the pump, where they are encased in the working fluid under high pressure. In order to provide preferred suspension performance, accurate control of the torque and speed of the BLDC motor may be required which may require a rotary position sensor for commutation. The application for use of rotary position sensor for BLDC motor commutation/control in an active suspension actuator is particularly challenging as the BLDC motor is mounted inside a housing where it is encased in the working fluid under high pressures.

An electric motor/generator may be applied in an active suspension system to work cooperatively with a hydraulic motor to control movement of a damper in a vehicle wheel suspension actuator. The electric generator may be co-axially disposed, and close coupled with the hydraulic motor and may generate electricity in response to the rotation of the hydraulic motor, while also facilitating rotational control of the hydraulic motor by applying torque to deliver robust suspension performance over a wide range of wheel events, it may be desirable to precisely control the electric motor/generator. To achieve precise control, precise rotor position information may be needed. In particular, determining the position of the rotor relative to the stator (the windings) is important to precisely control currents passing through the windings based on the rotor position for commutation. To precisely and dynamically control the currents through the windings depending on where the rotor is in its rotation, what direction it is turning, its velocity, and acceleration, a fairly precise reading of rotor position is required. To achieve precisely determining the rotor position, a sensor is used. By applying position determination algorithms that are described below, a low cost sensor (e.g. with accuracy of one degree) may be used. Rotary position sensors may have a signal error ("noise pattern") that is related to position, and this error map can be calibrated into an error correction map, whereby the error can be subtracted to get a more accurate reading, thereby filtering out these noise patterns for the selected subset of sensed rotor positions.

Rotor position may also be used for a variety of reasons other than that for commutation, such as for determining fluid flow velocity from the coupled hydraulic motor, for example, or the motor controller may be applied in an active suspension that senses wheel and body events through sensors, such as a position sensor or body accelerometer etc., and senses the rotational position of the rotor with the position sensor and in response thereto sources energy from the energy source for use by the electric motor to control the active suspension, or wherein the response to the position sensor comprises a vehicle dynamics algorithm (or protocol) that uses at least one of rotor velocity, active suspension actuator velocity, actuator position, actuator velocity, wheel velocity, wheel acceleration, and wheel position, wherein such value is calculated as a function of the rotor rotational position. Another such use of the rotary position sensor may be for the use in a hydraulic ripple cancellation algorithm (or protocol); all positive displacement hydraulic pumps and motors produce a pressure pulsation that is in relation to its rotational position. This pressure pulsation can produce undesirable noise and force pulsations in downstream actuators etc. Since the profile of the pressure pulsation can be determined relative to the pump position, and hence the rotor and hence the source magnet position, it is possible for the controller to use an algorithm that can vary the motor current and hence the motor torque based upon the rotor position signal to counteract the pressure pulsations, thereby mitigating or reducing the pressure pulsations, reducing the hydraulic noise and improving the performance of the system.

In some embodiments of an active suspension system described herein, portions of the BLDC motor (or the complete BLDC motor) may be submerged in hydraulic fluid. This may present challenges to sensing a precise position of the rotor. Therefore, a magnetic target (source magnet) attached on the rotor shaft may be detected by a sensor disposed so that it is isolated from the hydraulic fluid. One such arrangement may include disposing a sensor on a dry side of a diaphragm that separates the fluid from the sensor. Because magnetic flux passes through various materials, such as a nylon, plastic or aluminum etc., it is possible to use such materials for a diaphragm so that the sensor can read the rotor position while keeping the sensor out of the fluid. While a low cost magnetic sensor may provide one-degree resolution with one to two degrees of linearity, which may be sufficient simply for determining rotor position, to precisely control the currents flowing through the windings, additional information about the rotor may be needed, such as acceleration of the rotor. One approach would be to use a more accurate sensor, although this increases costs and may not even be practical given the rotor is immersed in fluid. Therefore, a filter that correlates velocity with position may be utilized. The filter may perform notch filtering with interpolation of any filtered positions. By performing notch filtering, harmonics of the filtered frequency are also filtered out, thereby improving results. By using a combination of filtering, pattern sensing, and on-line auto calibration, precise calibration steps during production or deployment are eliminated, thereby reducing cost, complexity, and service issues. Methods and systems of rotor position sensing in an active suspension system may include magnetically sensing electric generator rotor position of a fluid immersed electric generator shaft through a diaphragm. Other methods and systems may include processing the sensed position data to determine rotor acceleration. Other methods may include processing a series of sensor target detections with at least one of a derivative and integration filter and an algorithm that uses velocity over time to determine position and acceleration of the rotor. Other methods may include detecting the magnetic sensor target each time it passes proximal to the rotary position sensor, resulting in a series of detections that each represent a full rotation of the rotor and then detecting electric motor voltages and/or currents to determine a rotor velocity (as is known in the art of sensorless control of a BLDC motor by measuring the back EMF in the undriven coils to infer the rotor position), then processing the series of detections with an algorithm that calculates rotor position by integrating rotor velocity and resetting absolute position each time the magnetic sensor target passes the magnetic sensor.

By using a single target magnet attached to the center of the rotor shaft the magnet length and the associated 'back iron' of the rotor need only extend to the length required so as to achieve the maximum possible torque of the motor, and not extending further so as to provide rotor magnet length for sensing with Hall effect sensors. This will reduce the required inertia of the rotor assembly. One such arrangement locates the target magnet about the center of the rotor shaft by a non-magnetic light-weight component that not only allows for the flux of the target magnet to adequately penetrate the non-magnetic diaphragm, but also reduces the rotating inertia of the rotor assembly, thereby improving the responsiveness and performance of the system.

Figure 97:
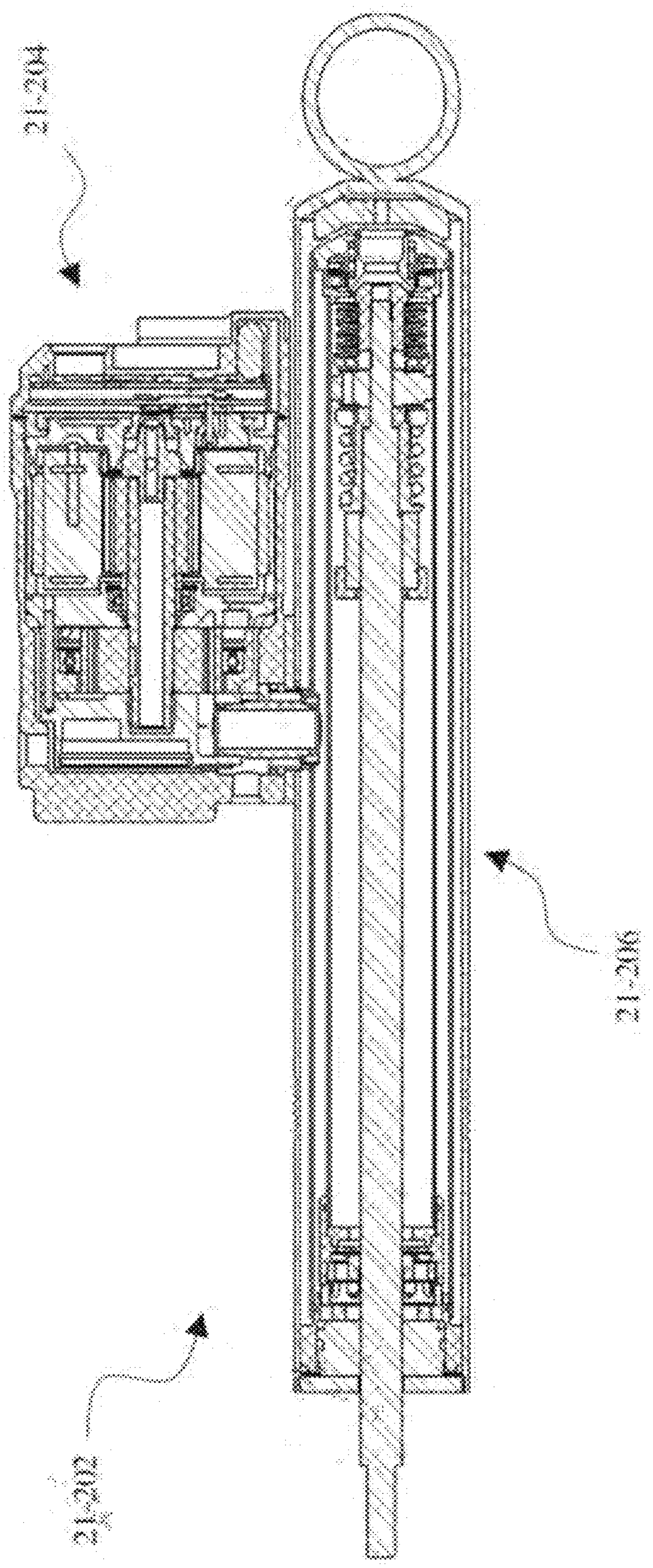
FIG. 97 is an assembly of an active suspension actuator comprising integrated pump motor and controller and a monotube damper body in cross section.

Turning now to the figures, in FIG. 97 an active suspension actuator 21-202 that comprises a side mounted integrated pump, motor and controller assembly 21-204, and a monotube damper assembly 21-206, is shown.

Figure 98A:
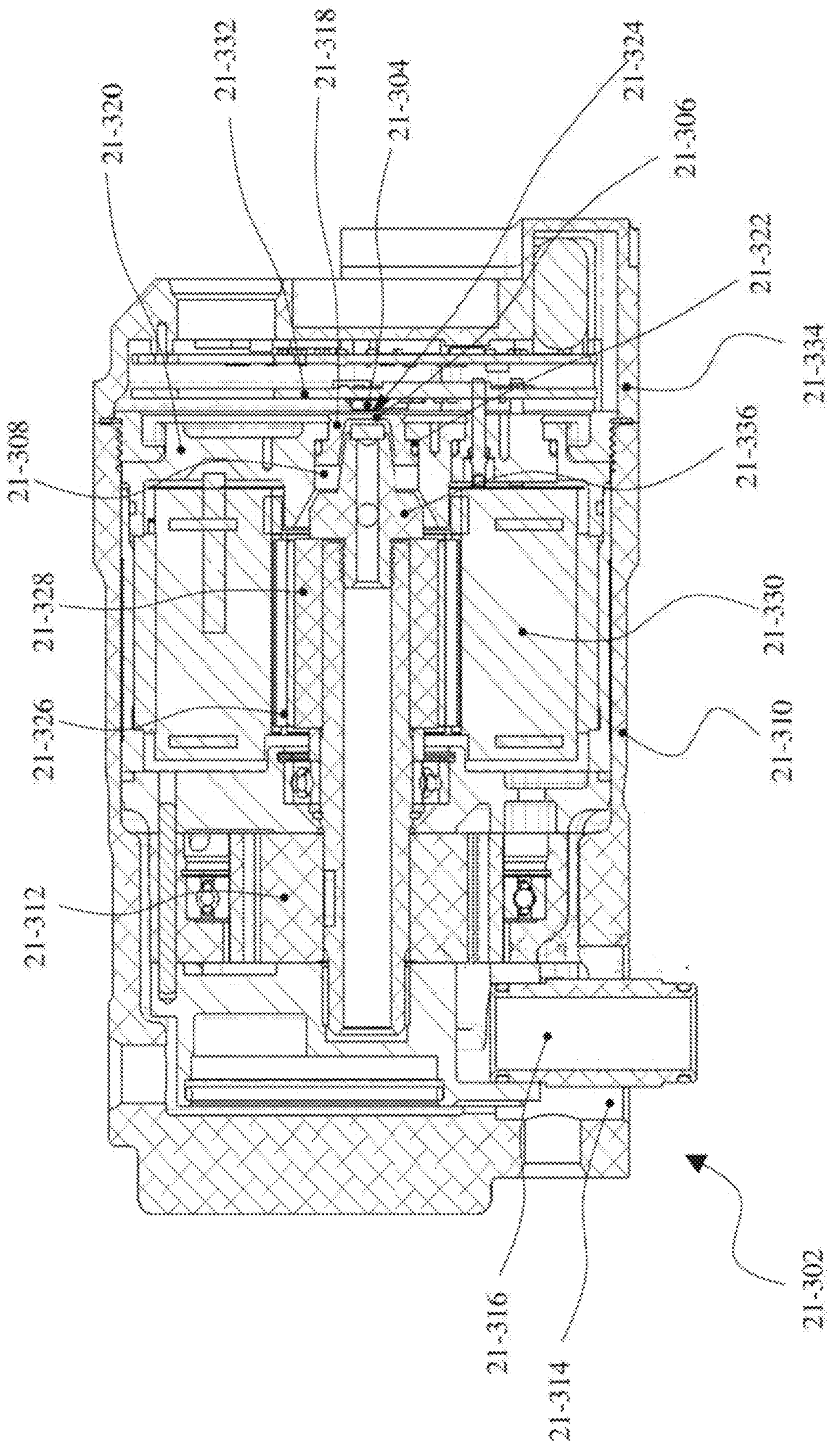
FIG. 98A is a cross section of the integrated pump motor and controller comprising a motor rotor position sensor and controller assembly as used in an active suspension actuator.
Figure 98B:
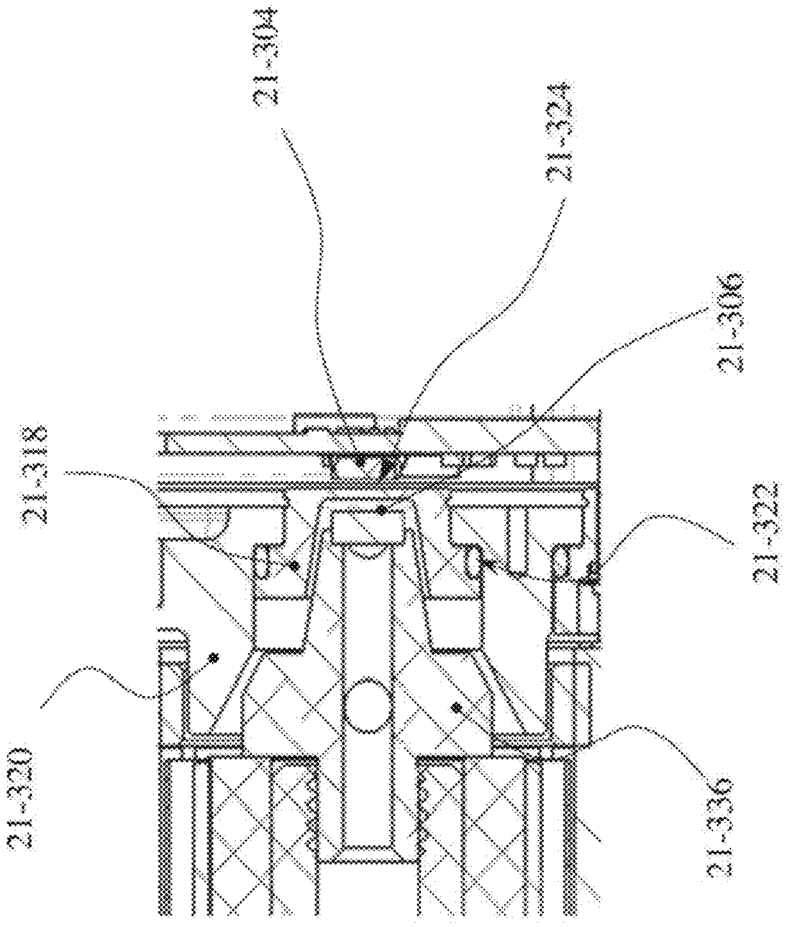
FIG. 98B is a detail view of the BLDC motor rotor position sensor, sensing magnet and diaphragm.

In FIGS. 98A and 98B the integrated pump motor and controller comprising a motor rotor position sensor and controller assembly 21-302 is shown. In the embodiment of FIG. 98A, a rotary position sensor 21-304, that measures the rotational position of a source magnet 21-306 and is protected from the working hydraulic fluid 21-308 under pressure that is contained within the housing 21-310, is shown.

In the embodiment shown, the rotary position sensor may be a contactless type sensor, wherein the rotary position sensor comprises of an array of Hall effect sensors that are sensitive to magnetic flux in the axial direction relative to the axis of rotation of the source magnet and can sense the flux of a diametrically magnetized two-pole source magnet to determine absolute position and a relative position. The array of Hall effect sensors may be connected to an on-board microprocessor that can output the absolute position and a relative position signal as a digital output. This type of sensor allows for a degree of axial compliance of the sensor to the source magnets as well as for radial misalignment of the source magnet to the sensor without degrading sensor output performance, thereby allowing the sensor to operate under normal manufacturing tolerances for position and rotation. This type of sensor may comprise of an on-board temperature sensor the output of which can be used to correct for errors due to temperature variance.

In the embodiment shown, the first port 21-314 of the hydraulic pump 21-312 is in fluid connection with the fluid 21-308 that is contained within the housing 21-310 and the first fluid connection port 21-314. Therefore the pressure of the fluid 21-308 is at the same pressure as the first port of the pump 21-312. The second port of the hydraulic pump 21-312 is in fluid connection with the second fluid connection port 21-316. Depending upon the use of the integrated pump motor and controller assembly 21-302, the first and second fluid connection port may the inlet and outlet of the hydraulic pump, and vice versa, and the first and second fluid connection port may be at high or low pressure or vice versa. As such, the fluid 21-308 contained in the housing 21-310 could be at the maximum working pressure of the pump. In applications such as active suspension actuators, this could reach 150 BAR or above. It is therefore necessary to protect the rotary position sensor 21-304 from such pressures. Although it is known that Hall effect sensors can be protected from working system pressure by encasing them in an EPOXY molding, for example, this type of arrangement is generally suitable for low pressure systems, as it may be impractical to encapsulate the sensor deep enough inside of the EPOXY molding so that the strain induced upon the relatively weak structure of EPOXY does not act upon the sensor, resulting in its failure. As such, in the embodiment shown in FIG. 98A, the rotary position sensor 21-304 is protected from the pressure of the fluid 21-308 by a sensor shield or diaphragm 21-318. The sensor shield 21-318 is located within a bulkhead 21-320, in front of the sensor. The sensor shield 21-318 is exposed to the pressure of the hydraulic fluid 21-308. As shown in FIG. 98B, the sensor shield is sealed to the bulkhead by means of a hydraulic seal 21-322 (although an elastomeric seal is disclosed, a mechanical seal or adhesive, etc. may be used, and the technology is not limited in this regard) such that the hydraulic fluid cannot pass by the sensor shield. The bulkhead 21-320 is sealed to the housing 21-310. A small air gap 21-324 exists between the sensor shield and the sensor so that any deflection of the sensor shield, due to the hydraulic fluid pressure acting on it, does not place any load onto the sensor itself. The sensor shield 21-318 is constructed of a non-magnetic material so that the magnetic fluxes of the source magnet 21-306 can pass through the sensor shield unimpeded. The sensor shield could be constructed from many types of non-magnetic material, such as aluminum or an engineered performance plastic etc., and the technology is not limited in this regard. An example of the selection criteria for the sensor shield material being that it is preferably able to contain the pressure of the fluid 21-308 without failure, it preferably does not deflect enough under pressure that it would contact the rotary position sensor, causing failure of the sensor, it preferably does not impede the magnetic flux of the source magnet so as to create sensing errors, and it preferably is cost effective for the application. The rotary position sensor 21-304 may be adequately shielded from other external magnetic fluxes such as that from the magnets 21-326 on the motor rotor 21-328 or from the motor stator windings 21-330, so as not impair its ability to accurately sense the position of the magnetic flux of the source magnet. In the embodiment shown the rotary position sensor 21-304 may be shielded from these disturbing magnetic fluxes by the bulkhead 21-320. If the bulkhead 21-320 is constructed from a magnetic material, such as steel for example, then it will not allow any errant magnetic fluxes to pass through to the rotary position sensor.

In the embodiment shown in FIG. 98A, the rotary position sensor 21-304 is mounted directly on the motor controller printed circuit board (PCB) 21-332. The PCB 21-332 is supported in a controller housing 21-334 that forms a sensing compartment that is free from the working fluid 21-308. The source magnet 21-306 is located in a magnet holder 21-336 that locates the source magnet coaxially with the BLDC motor rotational axis and the rotary position sensor axis, and in close axial proximity to the sensor shield 21-318. The source magnet and magnet holder are operatively connected to the BLDC motor rotor 21-328. In the embodiment shown the magnet holder 21-336 is constructed of a non-magnetic material so as not to disturb the magnetic flux of the source magnet 21-306. In the highly dynamic application of an active suspension actuator, where there are rapid rotational accelerations and reversals of the motor rotor it is very important to reduce the inertia of the rotating components and for this reason the magnet holder may be constructed of a light weight non-magnetic material, such as aluminum or an engineered performance plastic etc.

In FIG. 99A an alternative embodiment of an integrated pump motor controller 21-402 is shown. This embodiment is similar to that of the embodiment of FIG. 98A with the exception that the rotary position sensor is mounted remotely from the motor controller PCB and the sensor is electrically connected to the motor controller via wires 21-404. This arrangement may advantageous when locating the motor controller in the proximity of the rotary position sensor and source magnet is not practical.

Referring to FIGS. 99A-99B, a rotary position sensor 21-406 is located in a sensor body 21-408 via a sensor holder 21-410. The sensor body and sensor are held in rigid connection to the housing 21-412 and there is a seal 21-414 between the housing and the sensor body. The sensor body is constructed of a magnetic material (such as steel for example) so as to shield the sensor from external unwanted magnetic fluxes (from the BLDC motor rotor magnets or from the stator windings for example) that may degrade the sensor accuracy. In the embodiment shown, the sensor is located coaxially with the rotational axis of the BLDC motor rotor axis. A source magnet 21-416 is located in a magnet holder 21-418 that locates the source magnet coaxially with the BLDC motor rotational axis and the sensor axis, and in close axial proximity to a sensor shield 21-420. The source magnet and magnet holder are operatively connected to the BLDC motor rotor. The sensor shield is constructed so that it has a thin wall section that allows the face of the source magnet to be located close to the working face of the sensor so as to provide sufficient magnetic flux strength to penetrate the sensor so as to provide accurate position signal. The sensor shield 21-420 is exposed to the pressure of the ambient hydraulic fluid. As shown in FIG. 99B, the sensor shield is sealed to the bulkhead by means of a hydraulic seal 21-422 (although an elastomeric seal is disclosed, a mechanical seal or adhesive, etc., could be used, and the technology is not limited in this regard) such that the hydraulic fluid cannot pass by the sensor shield. A small air gap exists between the sensor shield and the sensor so that any deflection of the sensor shield, due to the hydraulic fluid pressure acting on it, does not place any load onto the sensor itself. The sensor shield is constructed of a non-magnetic material so that the magnetic fluxes of the source magnet can pass through the sensor shield unimpeded.

The source magnet holder 21-418 is constructed of a non-magnetic material, such as aluminum or an engineered performance plastic, etc., so as not to degrade the source magnetic flux strength and to reduce rotational inertia. The sensor wires 21-404 are sealed to the sensor body (by means of a hydraulic seal, mechanical seal, or adhesive, etc.) so as to protect the rotary position sensor from the environment.

Figure 100A:
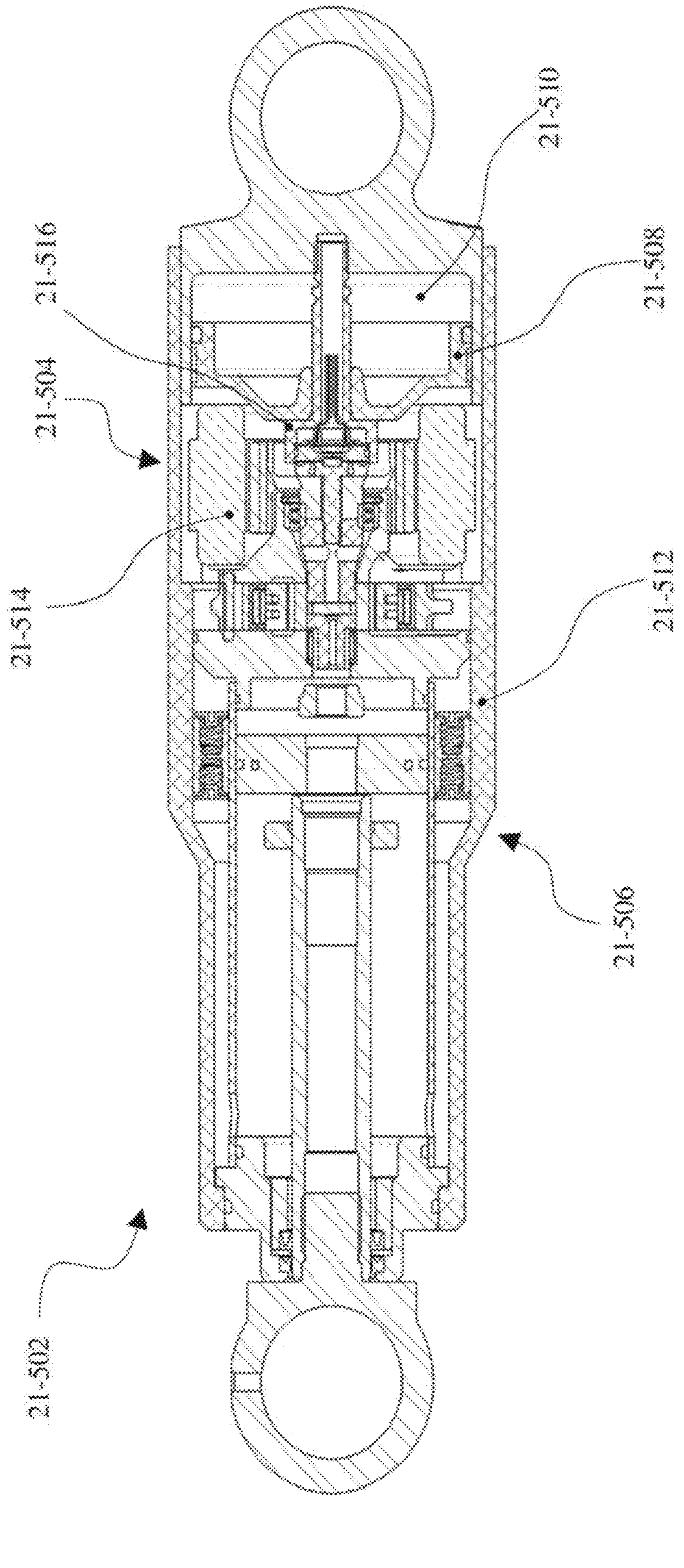
FIG. 100A is an assembly of an in-line active suspension actuator comprising integrated pump motor and controller and a monotube damper body in cross section.
Figure 100B:
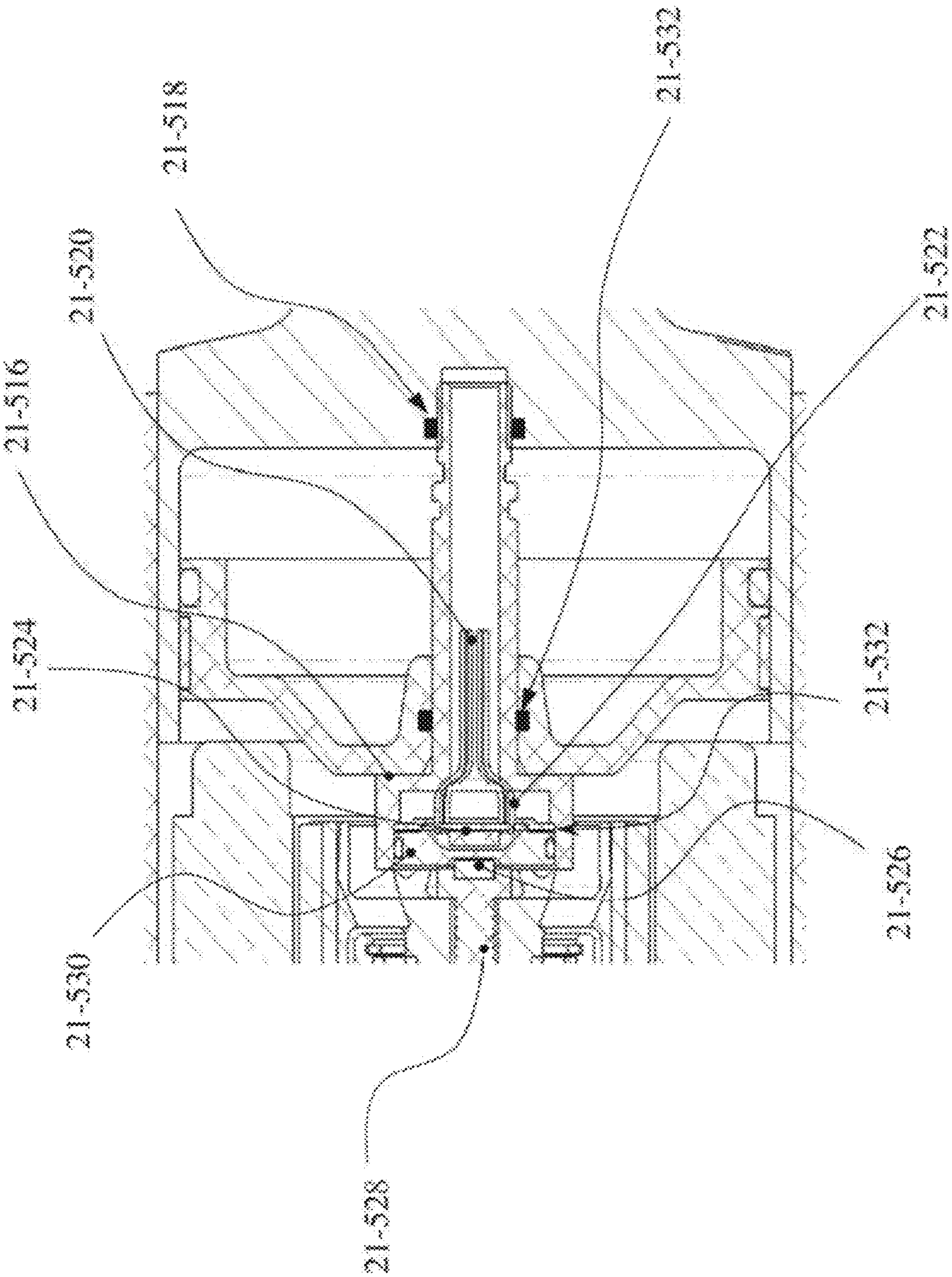
FIG. 100B is a detail view of the in-line active suspension.

In the alternative embodiment of FIGS. 100A and 100B an active suspension actuator 21-502 that comprises an in-line mounted integrated hydraulic pump and motor assembly 21-504, in a monotube actuator assembly 21-506 is disclosed. The operation of the rotary position sensor 21-524 is as described in the embodiments of FIG. 99A, except as described below.

Referring to FIGS. 100A and 100B, in this embodiment a floating piston 21-508 and accumulator chamber 21-510 are housed in the actuator body 21-512 directly behind the BLDC motor 21-514. The accumulator chamber 21-510 may contain a gas under pressure. A sensor body 21-516 is rigidly connected to the damper body 21-512 and may contain a journal diameter that passes through the floating piston 21-508 and into the accumulator chamber 21-510. The floating piston slides on this journal and may contain a seal 21-532 to prevent leakage across the floating piston from the pressurized gas in the accumulator chamber. A seal 21-518 prevents gas leaking past the connection between sensor body and the damper body. Sensor wires 21-520 pass through a central bore in the sensor body and out of the damper body to a remotely located electronic controller. A seal prevents the ingress of contaminants into the sensor cavity 21-522. The sensor body 21-516 is constructed of a magnetic material (such as steel for example) so as to shield the sensor from external unwanted magnetic fluxes (from the BLDC motor rotor magnets or from the stator windings for example) that may degrade the sensor accuracy. In the embodiment shown, the rotary position sensor 21-524 is located coaxially with the rotational axis of the BLDC motor rotor axis. A source magnet 21-526 is located in a magnet holder 21-528 that locates the source magnet coaxially with the BLDC motor rotational axis and the sensor axis, and in close axial proximity to a sensor shield 21-530. The source magnet and magnet holder are operatively connected to the BLDC motor rotor. The sensor shield is constructed so that it has a thin wall section that allows the face of the source magnet to be located close to the working face of the sensor so as to provide sufficient magnetic flux strength to penetrate the sensor so as to provide accurate position signal. The sensor shield 21-530 is exposed to the pressure of the ambient hydraulic fluid. As shown in FIG. 99B, the sensor shield is sealed to the bulkhead by means of a hydraulic seal 21-532 (although an elastomeric seal is disclosed, a mechanical seal or adhesive, and the like, could be used, and the technology is not limited in this regard) such that the hydraulic fluid cannot pass by the sensor shield. A small air gap exists between the sensor shield and the sensor so that any deflection of the sensor shield, due to the hydraulic fluid pressure acting on it, does not place any load onto the sensor itself. The sensor shield is constructed of a non-magnetic material so that the magnetic fluxes of the source magnet can pass through the sensor shield unimpeded.

The source magnet holder 21-528 is constructed of a low density, non-magnetic material, such as aluminum or an engineered performance plastic etc. so as not to degrade the source magnetic flux strength and to reduce rotational inertia.

In the embodiment shown the sensor body protrudes through the floating piston and into the actuator body requiring a second sealing arrangement on the floating piston. It is possible for the sensor body to connect to the actuator body ahead of the floating piston and therefore not protrude through the floating piston. The sensor wires can then pass through the sensor body and the actuator body via a seal.

Figure 101:
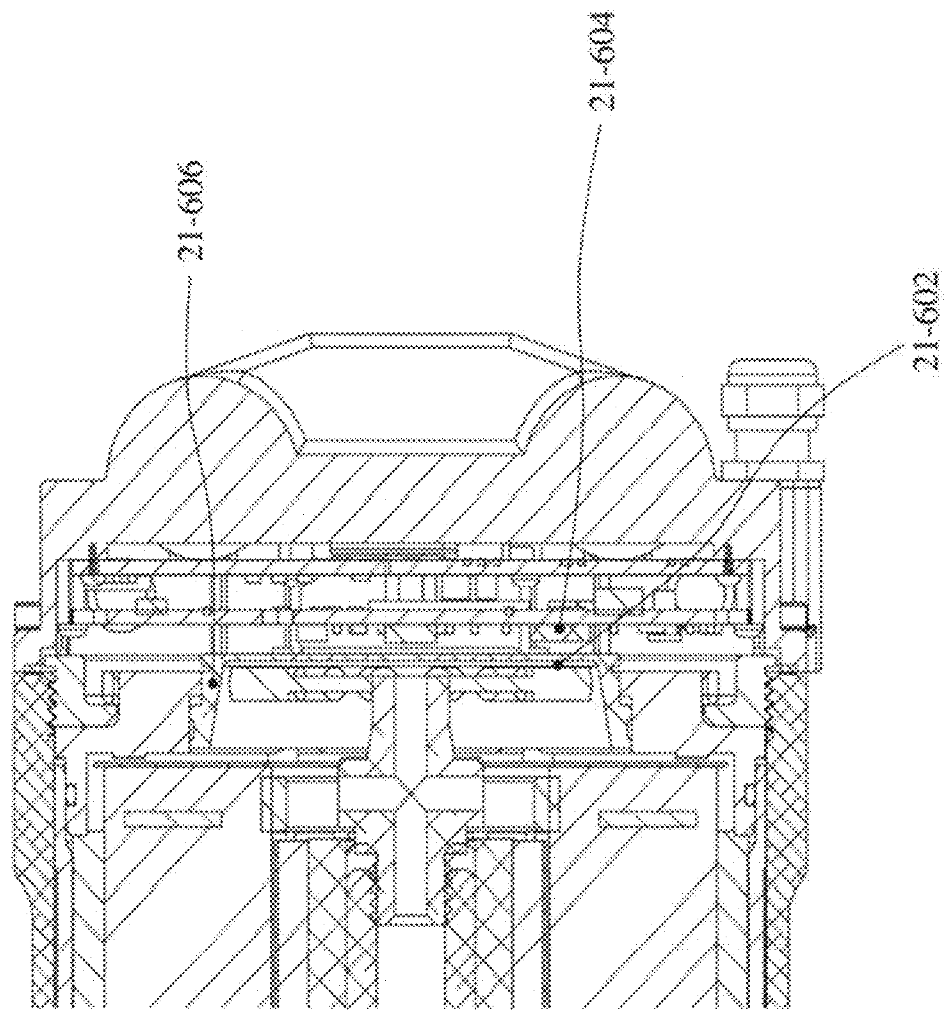
FIG. 101 is a cross section of the BLDC motor rotor position sensor using an annular type source magnet.

In an alternative embodiment as shown in FIG. 101 the source magnet 21-602 is of an annular type and the rotary position sensor 21-604 is mounted eccentrically to the rotor rotational axis and a and senses the flux of the source magnet 21-602 thru the non-magnetic sensor shield 21-606. The functioning and arrangement of this configuration is similar to that as disclosed in the embodiments of FIGS. 98A and 99A. This arrangement may be advantageous by offering finer sensing resolution without a significant increase in cost due to the increased number of poles in the annular source magnet.

In an arrangement similar to the embodiment of the Hall effect rotary position sensor shown in FIG. 100A, an alternative embodiment is to use an optical rotary position sensor that measures the rotational position of a reflective disc which is protected from the working hydraulic fluid under pressure in a similar manner to that described in the embodiment of FIG. 100A, wherein the optical rotary position sensor comprises of a light transmitter/receiver and a reflective disc.

In this embodiment the Hall effect rotary position sensor is replaced by a light transmitter/receiver is mounted onto the controller PCB located off-axis with the rotational axis of the BLDC motor. A sensor shield is located in front of the light transmitter and receiver and is exposed to the hydraulic fluid under pressure in the housing. The sensor shield is sealed such that the hydraulic fluid does not enter the sensor cavity. The sensor shield is constructed of an optically clear material such as an engineered plastic or glass etc., so that the light source can pass through the sensor shield unimpeded. A small air gap exists between the sensor shield and the light transmitter and receiver so that any deflection of the sensor shield, due to the hydraulic fluid pressure acting on it, does not place a load onto the light transmitter and receiver itself. The annular type source magnet as shown in the earlier embodiment FIG. 100A is replaced in this embodiment by the reflective disc that is is connected to, and coaxial with, the BLDC motor, and that is located near the light transmitter and receiver so that light emitted from the light transmitter is reflected back to the light receiver via the optically clear sensor shield.

The reflective disc may contain markings so as to produce a reflected light signal as the disc rotates. The light transmitter receiver then reads this signal to determine the BLDC motor position. From this position motor speed and acceleration can also be determined. The wavelength of light source used is such it can pass through the sensor shield, the oil within the valve and any contaminants contained within the oil, unimpeded, so that the light receiver can adequately read the light signal reflected from the reflective disc.

Although the embodiments of FIGS. 97, 98A, 99A and 100A refer to an electric motor rotary position sensor for use in certain types active suspension actuators, these embodiments can also be incorporated into any electric motor-hydraulic pump/motor arrangement whereby the electric motor is encased in the working fluid (as in compact hydroelectric power packs etc.), and the inventive methods and systems are not limited in this regard.

Although the embodiments show the use of a rotary Hall effect position sensor and optical rotary position sensor, various other types of rotary position sensor, such as encoders, potentiometers, fiber optic and resolvers etc. may be accommodated in a similar manner, for example the Hall effect rotary position sensor could be replace by a metal detector and the source magnet could be replaced by a an element that is adapted to be detected thru the non-metallic sensor shield or the rotary position sensor could be a radio frequency detector and the sensor target be adapted detectable by the sensor and as such, the patent is not limited in this regard.

As sensor technology progresses, it may be possible to use a rotary position sensor that can withstand a high fluid pressure, temperature environment with external magnetic fields, and as such could be incorporated to sense the rotational position of a suitable sensor target, and the patent is not limited in this regard.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Active Chassis Power Management System for Power Throttling

Modern vehicles are limited in their capacity to deliver power to active vehicle actuators and are limited in their ability to accept regenerative power from same. Large power draws may cause a voltage brownout, or under-voltage condition for the vehicle. Excessive regenerated energy may cause vehicle electrical system voltage to rise higher than allowable.

Previous approaches to limiting power consumption in a vehicle electrical system include power design limits per actuator or subsystem, dynamic power degradation as a function of vehicle primary battery voltage and power reduction commands issued by a vehicle ECU to non-critical accessories such as rear window defroster and seat heaters. None of these solutions address the real goals of minimizing the overall power consumption while maintaining adequate actuator performance or allocating the limited power available from the vehicle electrical system to the active vehicle actuators that can do the most good at that particular moment.

Figure 102:
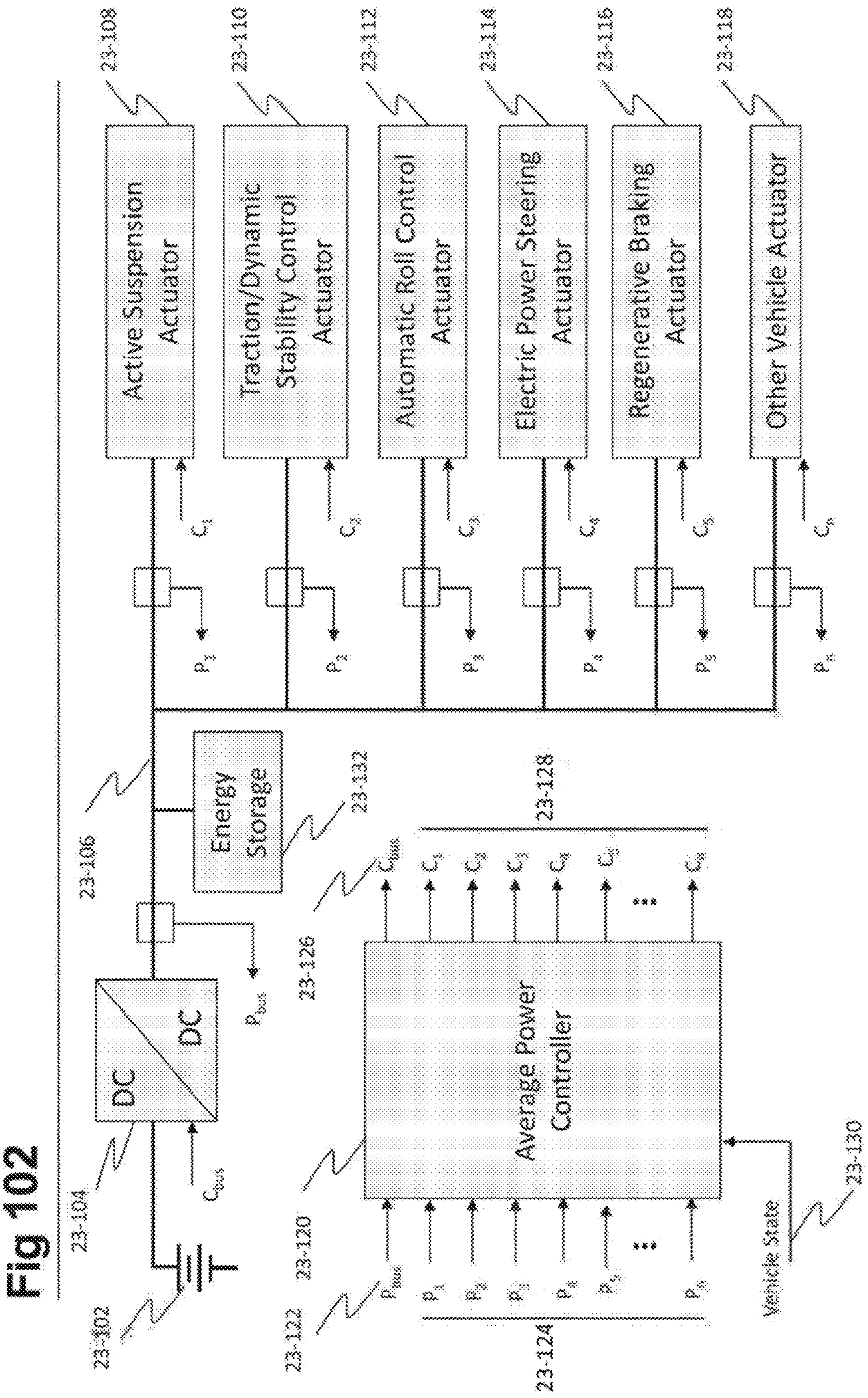
FIG. 102 is a block diagram showing a plurality of active vehicle actuators powered from an independent voltage bus.

Referring to FIG. 102, which shows a plurality of active vehicle actuators powered by a common power bus 23-106, the plurality of active vehicle actuators may include an active suspension actuator at each wheel of the vehicle. The plurality of active vehicle actuators may comprise at least one integrated active vehicle suspension system disposed to perform vehicle suspension functions at a wheel of the vehicle and at least one different type of vehicle actuator. The different type of active vehicle actuator may be an anti-lock braking actuator, an electric air compressor, an automatic transmission actuator, active suspension actuator 23-108, traction/dynamic stability control actuator 23-110, automatic roll control actuator 23-112, electric power steering actuator 23-114, regenerative braking actuator 23-116, rear wheel steering actuator, variable ratio front steering actuator, automatic transmission shift actuator, and air spring air compressor actuator, and the like. The methods and systems described herein are not limited in this regard.

In embodiments the power bus is at least partially generated by a DC/DC converter 23-104 from the vehicle electrical system (shown as battery 23-102.) Typical active vehicle actuators include but are not limited to: active suspension 23-108, traction/dynamic stability control 23-110, automatic roll control 23-112, electric power steering 23-114, and regenerative braking 23-116. Other active vehicle actuators 23-118 are not shown individually but could include: rear wheel steering, variable ratio front steering, automatic transmission shift, and air spring air compressor, and the like. The methods and systems described herein are not limited in this regard.

Also shown is an average power controller 23-120 with power measurement inputs (P) from the bus 23-122 as well as from each actuator 23-124, and power control outputs (C) for the DC/DC converter 23-126 and for each actuator 23-128. The power inputs could be calculated from voltage, current and/or power measurements, or estimated using actuator models but the methods and systems described herein are not limited in this regard. The power inputs could be based on instantaneous energy use, time averaged energy use, energy stored in an energy storage device, and the like. Other power inputs could be feed-forward inputs. Feed-forward inputs could include knowledge of the upcoming road and the like. Any method of estimating power will suffice. The average power controller 23-120 may also take in vehicle power/energy state data 23-130.

The average power controller 23-120 could interface with at least a portion of the plurality of active vehicle actuators to maintain a relative state to at least one actuator power constraint. The relative state could be to stay below the at least one actuator power constraint, above the at least one actuator power constraint, and the like. The average power controller 23-120 may receive the power constraint via a communications network from a separate control unit. The power constraint could be communicated to the at least one actuator via the voltage on the power bus.

A number of methods of controlling power consumption are depicted in FIG. 102. The average power controller 23-120 can either use the total bus power 23-122 to control the DC/DC converter 23-104 or to control all of the actuators in parallel. Controlling the actuators in parallel does not necessarily mean that each receives the same identical control signal. Controlling actuators in parallel as described herein may mean that a single estimate of power is used as the basis for one or more actuator control signals. Each individual signal may be scaled differently for each actuator according to a control protocol that may be based on actuator relative priority, vehicle state, and the like. Vehicle state could be a power state, energy state, and the like. Data representative of vehicle power state and energy state may be main vehicle battery voltage, main vehicle battery current, battery age/state-of-health, auxiliary energy storage state of charge, alternator current, alternator load state, alternator status, alternator RPM, vehicle energy management system data, and the like. Data representative of vehicle state may also include power consumer degradation commands issued by a vehicle electronic control unit. Alternatively, the individual actuator powers 23-124 may be used to individually control the associated actuator, or could be analyzed, (e.g. summed together) to derive the total bus power and used as described previously.

In an alternate embodiment of FIG. 102, an energy storage device 23-132 on the bus can be used in conjunction with the power throttling methods and systems described herein. The energy storage device 23-132 provides a storage location for regenerated energy from regenerative actuators and facilitates allowing this energy to be returned to the plurality of actuators to cover at least some of the power load when the actuators are operating as power consumers. In this way, the average power consumption constraint may potentially be met more easily than for an embodiment without such energy storage, such as without having to throttle actuator power usage as much, thus potentially improving actuator performance while meeting a target average power consumption constraint.

The average power consumption for the plurality of active vehicle actuators may be calculated over at least one time constant. The time basis could be faster than the average power consumption. An average could be taken on the sum of all actuators of the vehicle, or a subset of them. Additionally, the average could be over all time, between vehicle ignition starts, over a small time window, or over any other of a multitude of time periods. In addition, the control system in some embodiments includes a safety mode where power limits are overridden during avoidance, braking, fast steering, and when other safety-critical maneuvers are sensed. Gains in the active vehicle control algorithm may be modified in response to a predicted actuator average power consumption estimate. The predicted actuator average power consumption estimate could be a trend line based on power consumption. The power consumption may be past power consumption, current power consumption, and the like.

The predicted actuator average power consumption estimate may be based on at least one sensor. The sensor may be a power consumption sensor and the like. The at least one sensor that may detect information about future driving conditions and the like. The at least one sensor that may detect future driving conditions may comprise at least one of a forward-looking sensor, a steering action sensor, a GPS, radar, and a signal from another active vehicle actuator. Typical active vehicle actuators include but are not limited to: active suspension 23-108, traction/dynamic stability control 23-110, automatic roll control 23-112, electric power steering 23-114, and regenerative braking 23-116. Other active vehicle actuators 23-118 are not shown individually but could include: rear wheel steering, variable ratio front steering, automatic transmission shift, and air spring air compressor, and the like. The methods and systems described herein are not limited in this regard. The sensor set may also include any of the many signals available in a modern car, including acceleration sensors and rotational rates of the car body (gyroscopes), position or velocity of the suspension, vehicle speed, steering wheel position, and other sensor information such as from GPS sensors or look-ahead cameras. Estimated signals may include estimated (current or upcoming) road vertical position, estimated road roughness, position of the vehicle on the road, and other available signals. For the rear wheels, the information gathered from the front wheels, such as estimated road position, input harshness, suspension travel history, or other useful signals, can then be used to improve the event detection on the rear wheels (and vice versa for the front wheels if the vehicle is traveling in reverse). For actuators on the rear axle of the vehicle, information on the road from the front wheels may be used. The at least one sensor that may detect information about future driving conditions may comprise two front active suspension actuators. Power consumption may be measured using at least one of current sensors and voltage sensors. The average power consumption measurement may be measured over at least one averaging time constant. The averaging time constant may be the length of a moving time window, characteristic time of an exponential averaging filter, and the like. Temporary power consumption may be allowed that is sufficient to prevent passenger movement from exceeding a passenger comfort movement threshold value. The average power consumption may allow a determination, or approximation, of other information about the vehicle; for example, a high demand for power due to wheel events may in turn indicate that the road surface is rough or sharply uneven, that the driver is engaging in driving behavior that tends to result in such wheel events, and the like.

Figure 103:
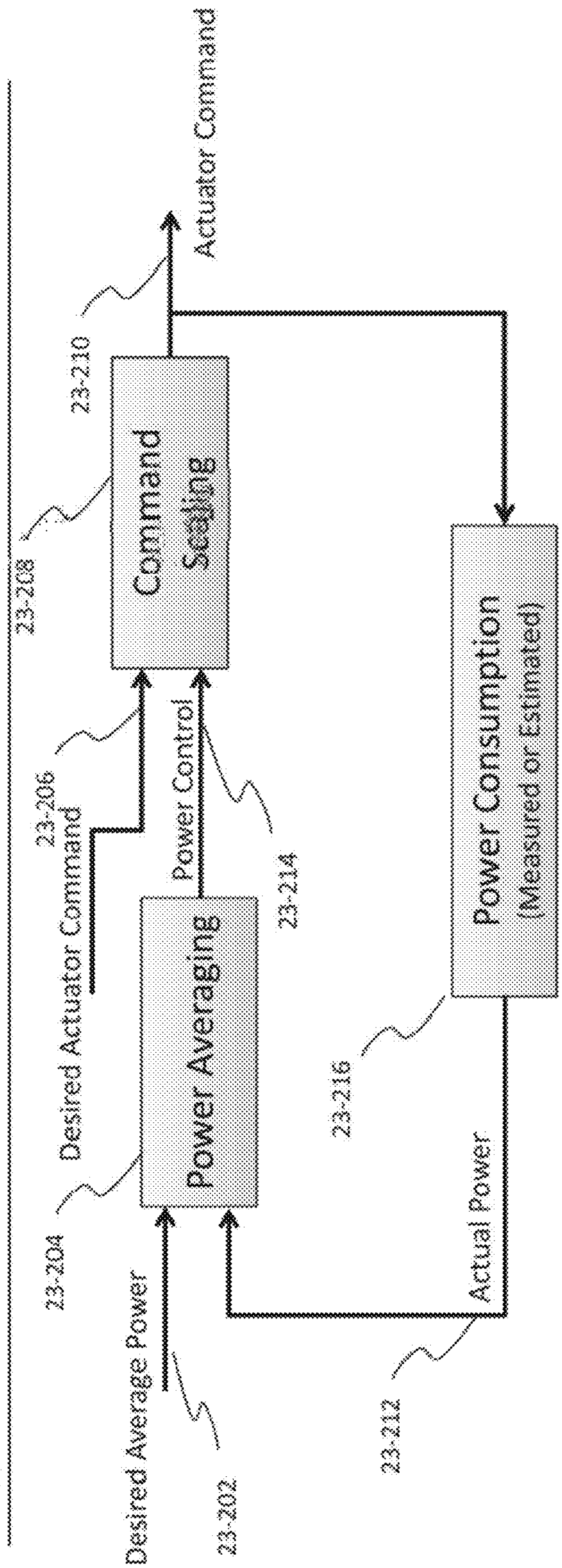
FIG. 103 is a power throttling block diagram for a single actuator.

FIG. 103 depicts an embodiment of an individual actuator-throttling algorithm. The desired average power 23-202 is compared in the power averaging block 23-204 to a calculated quantity correlated with the actual power output, calculated or measured, of the actuator 23-212. In one implementation, this calculated quantity is a filtered moving average of the power, thus providing a low-noise representation of the mean power over a defined past period of time. The difference between the two determines a power control variable 23-214, which is used as input into the command scaling block 23-208 along with the desired actuator command 23-206.

In one implementation, the actuator command is limited to a value derived from the power control input variable. The power control variable for at least a portion of the plurality of active vehicle actuators to ensure that the average power consumption for the portion of the plurality of active vehicle actuators stays either above or below a specified level. A control program could be configured for at least a portion of the plurality of active vehicle actuators to ensure that the average power consumption for the portion of the plurality of active vehicle actuators maintains a relative state to the at least one actuator power constraint. High power control input variable values may allow the actuator to use as much power as needed to achieve maximum performance while low power control input variable values may throttle the actuator command resulting in lower actuator power consumption measured or estimated in the power consumption block 23-216. Once the actual actuator power output reaches the desired average power 23-202, the power control input variable value may increase slightly which may result in and the actuator command throttling being relieved.

Command scaling can be done in many ways that allow for a good correlation of power control input values with average power output. These include but are not limited to: limiting short or medium term output power in the actuator, increasing short or medium term allowable regeneration in actuators that regenerate, or a combination thereof. For active suspension actuators, modifying the torque command may be consistent with other strategies for finding a best possible approximation to the desired command while reducing the power output, such as, for example, reducing the commanded actuator torque to its nearest point to the equal power line.

In a different embodiment, the power control variable can also be used to modify the control gains inside the actuator controller to increase its power efficiency without degrading it performance too much. For example, in an active suspension with regenerative actuators, reducing the overall gain on the body control (which requires power during a large portion of its control range) or increasing the gain on the wheel control (which in large part dampens the wheels and regenerates power) results in lower average power consumption. Variations of this algorithm can be used with other types of regenerative active vehicle actuators. Throttling the gains of the actuator controller to bias the power flow towards the regenerative region results in reduced overall power consumption.

Figure 104:
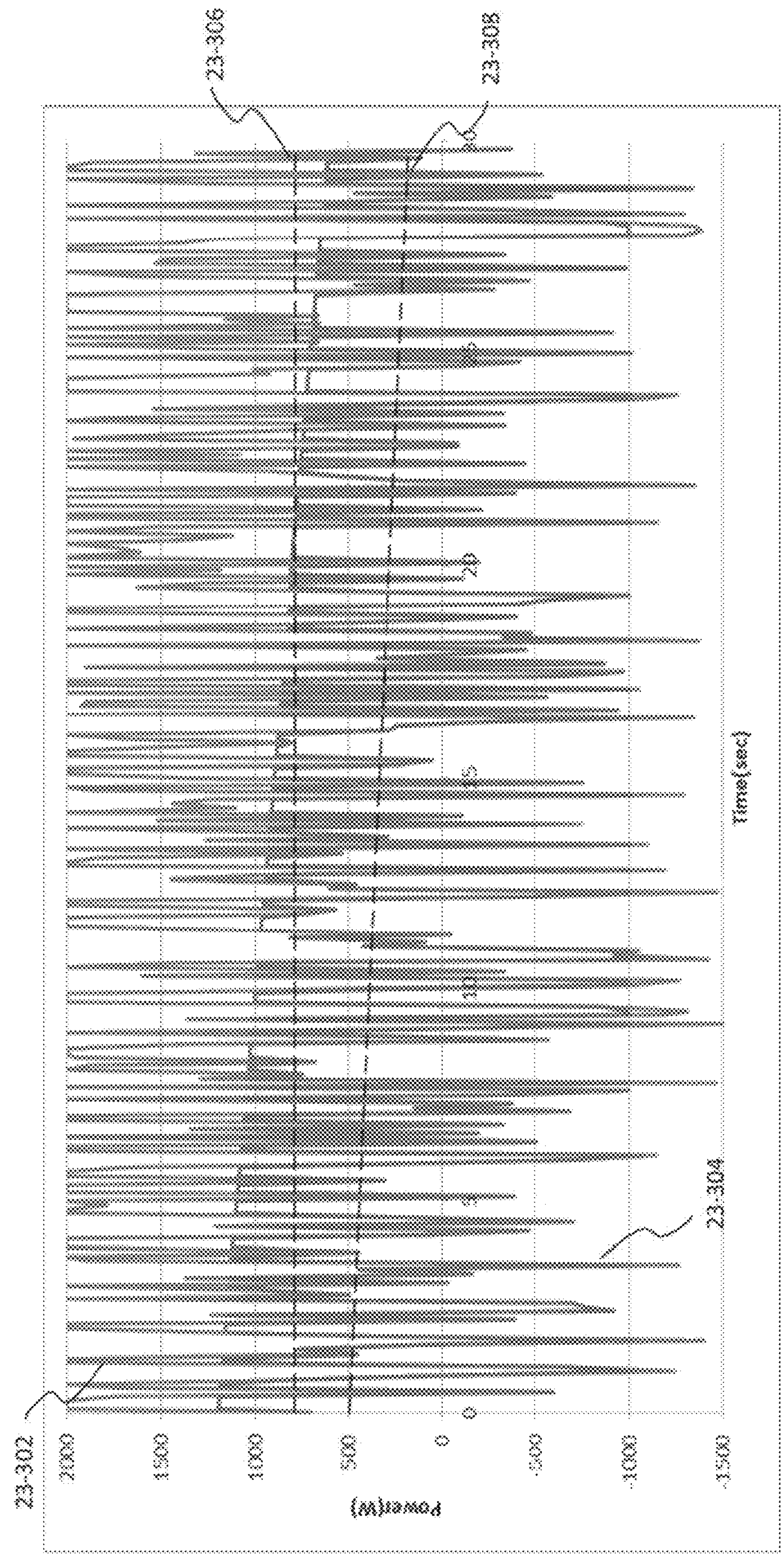
FIG. 104 shows two time traces of active suspension power with and without command limits

FIG. 104 shows two superimposed time traces of the sum of the consumed power for four active suspension actuators in a vehicle. The first trace 23-302 is without power throttling while the second trace 23-304 is with power throttling. The y-axis is power consumed where positive values are when the actuator is consuming power and negative values are when it is regenerating power. In this embodiment, the power control input results in clamping the peak active and peak regenerative power to values that can vary over time in order to reduce the longer-term average power in the actuators. Two trend lines are also shown: 23-306 for the trace without power throttling and 23-308 for the trace with power throttling. The trendlines show that for regenerative active suspension actuators, throttling by clamping peak power reduces the longer term average power consumption substantially and can even result in a system that is substantially energy neutral.

Figure 105:
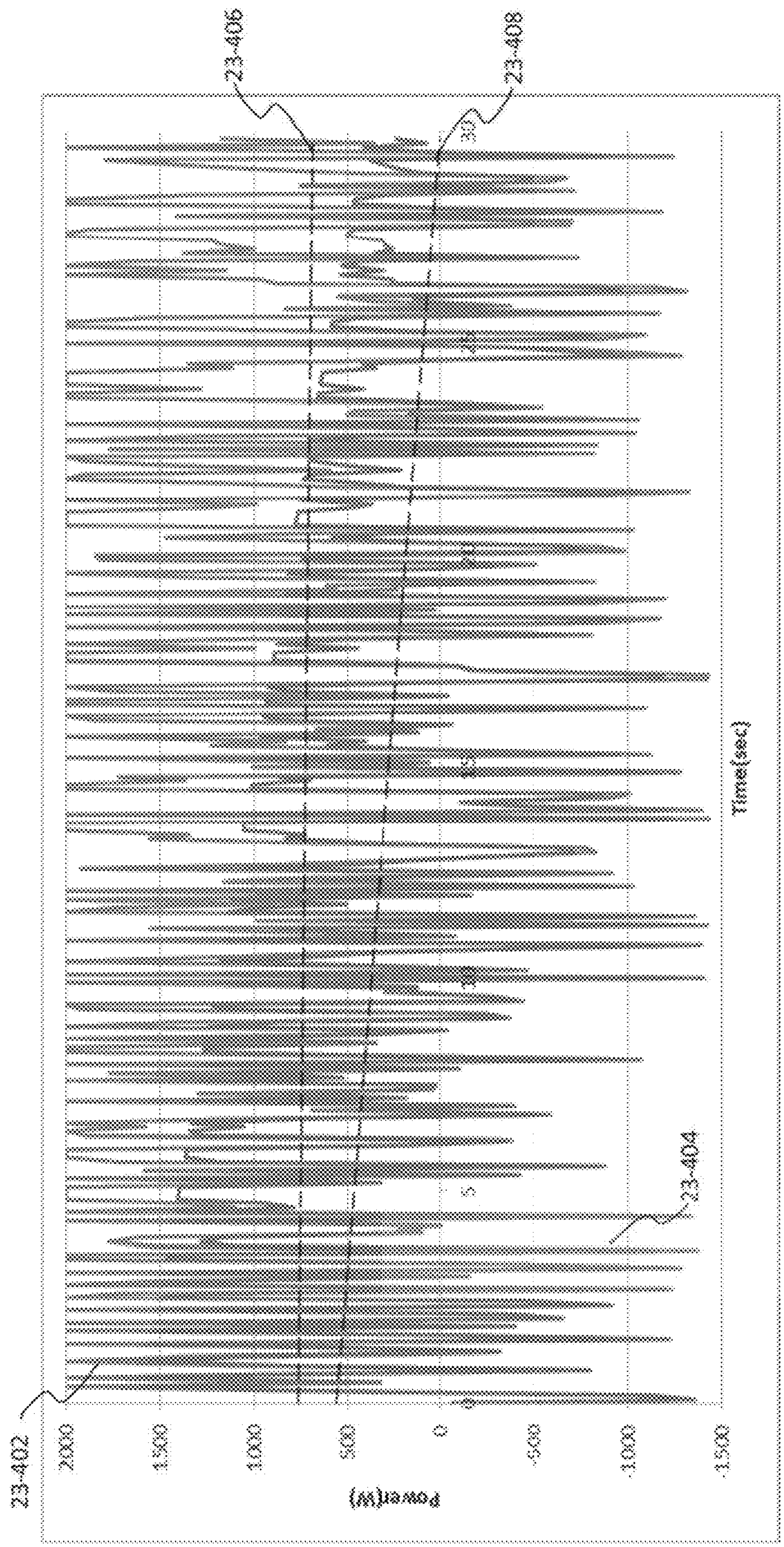
FIG. 105 shows two time traces of active suspension power with varying control gains

FIG. 105 shows two superimposed time traces of the sum of the consumed power for four active suspension actuators in a vehicle. The first trace 23-402 is without power throttling while the second trace 23-404 is with power throttling. The y-axis is power consumed where positive values are when the actuator is consuming power and negative values are when it is regenerating power. In this embodiment, the power control reduces the gains of the actuator controllers over time in order to reduce the longer term average power in the actuators. Two trendlines are also shown: 23-406 for the trace without power throttling and 23-408 for the trace with power throttling. The trend lines show that for a regenerative active suspension actuator, throttling by reducing gains can also reduce power consumption to the point where the longer term average is substantially zero and the plurality of actuators used for active suspension become energy neutral.

The applicability of this method is not limited to active suspension actuators. In fact, it is possible to throttle any plurality of active vehicle actuators that include at least one regenerative actuator capable enough to produce a system that is substantially energy neutral while still maintaining a non-zero level of actuator performance. The level of remaining performance depends on the amount of energy regenerated.

Even non-regenerative actuators can benefit from the power throttling methods and systems described herein to facilitate reducing their power consumption though they cannot achieve energy neutrality alone and remain operative. Dissimilar actuators, such as the actuators described herein and elsewhere may be combined in a comprehensive power throttling approach. In an example, a regenerative-only actuator such as an alternator used for regenerative braking maintains an energy consumption profile that is net energy positive (e.g. below an energy neutral level) can be combined with other regenerative and/or non-regenerative actuators in a comprehensive power throttling operating environment to potentially achieve lower overall total power consumption or perhaps energy neutrality.

Referring back to FIG. 102, an energy storage device on the bus 23-132 can be used in conjunction with throttling. The energy storage device provides a temporary storage location for regenerated energy from regenerative actuators and allows this energy to be returned to the plurality of actuators to cover some of the load when the actuators are operating as power consumers. In this way, the average power consumption constraint can be met more easily without having to throttle as much, thus potentially improving actuator performance.

Figure 106:
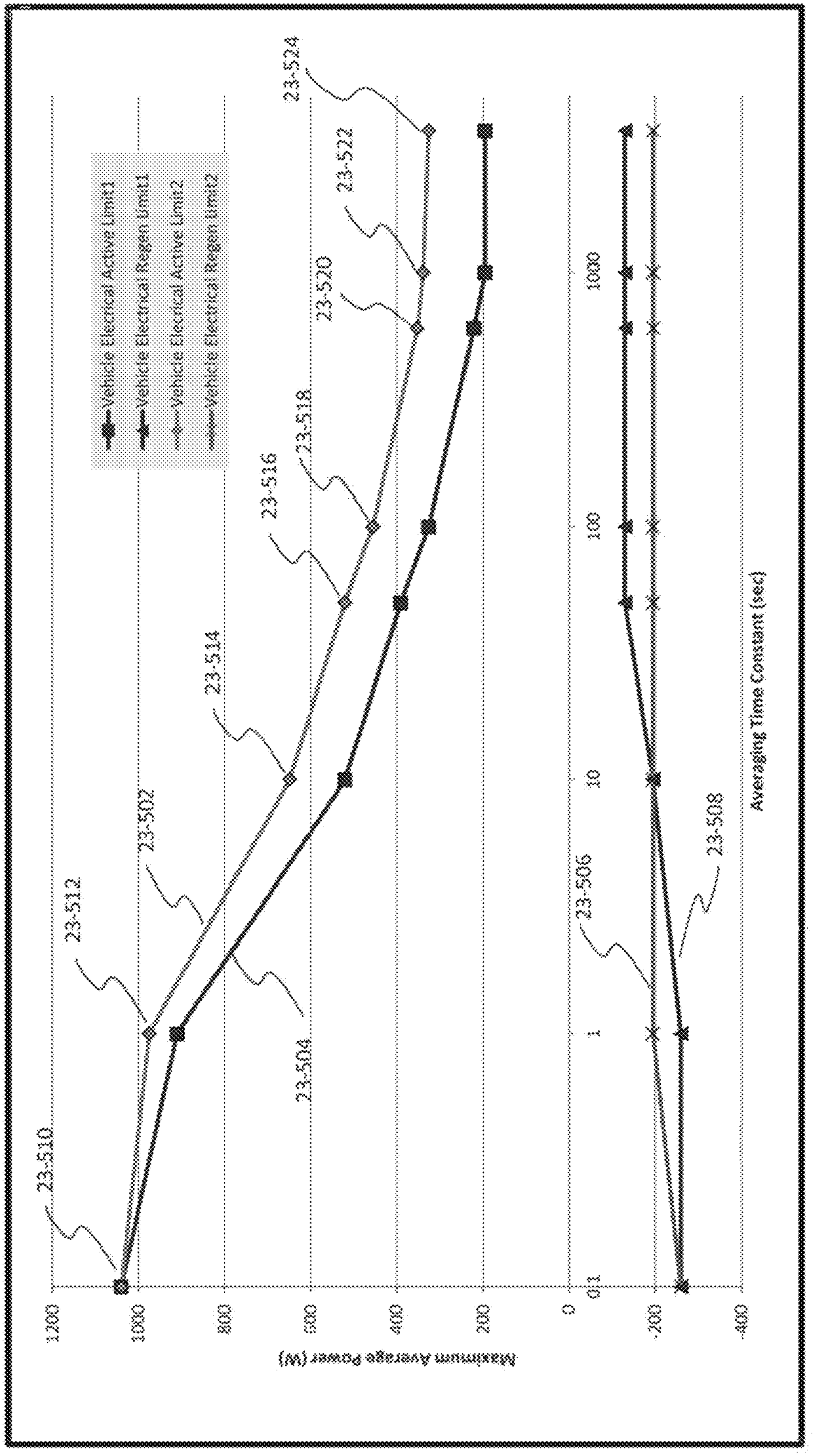
FIG. 106 is a plot depicting two sets of average power consumption constraints as a function of averaging time constant.

FIG. 106 plots four different power consumption constraints in terms of maximum average power consumption versus the time period or length of the moving time window used to perform the average. 23-502 and 23-504 are two representative power consumption constraints that achieve substantially similar short-term average power but that differ in the average power allowed over longer time periods. Also shown are two representative regeneration power constraints (23-506 and 23-508) with different power averaging characteristic objectives over time. These consumption and regeneration constraints are each a "set" of constraints at various averaging times. These constraints may also be represented as a table of points; they are show as a plot simply for illustrative purposes.

The example constraint set 23-502 can best be understood with a description of each point in the set. Constraint point 23-510 specifies that the maximum power consumption averaged over a 100 millisecond moving window length should not exceed 1040 Watts. Similarly, constraint point 23-512 specifies that the maximum power consumption averaged over a 1 second moving window length should not exceed 975 Watts. Continuing on, the rest of the points in the constraint set 23-502 are:

| | | |
|---|---|---|
| 23-514 | 650 W | over a 10 second average |
| 23-516 | 520 W | over a 50 second average |
| 23-518 | 455 W | over a 100 second average |
| 23-520 | 350 W | over a 10 minute average |
| 23-522 | 338 W | over a 16.7 minute average |
| 23-524 | 325 W | over a 1 hour average |

As an example, to meet one of the constraint sets shown in FIG. 106, a power throttling system for an actuator may keep a number of running averages, over the different time constants specified in the constraint set, of the power being consumed by the actuator and calculate the power control output to the actuator controller from a weighted sum of the deviations of these averages from the power consumption constraints for these averaging time periods.

As a practical matter, the power constraint for the shortest time period (23-510, 1040 W over 100 milliseconds) may be implemented as hard power limit such that a no time will the instantaneous power consumed by the actuator exceed this constraints. Although most power electronics used for actuator control have a peak power limit that cannot be exceeded for safety and/or reliability purposes, the power throttling methods and systems described herein may implement a blend of peak and average power throttling that takes into consideration substantively more factors than are needed for implementing a hard peak power limit.

The active vehicle actuator electronic controller may interface with at least a portion of the plurality of active vehicle actuators maintains a relative state to the at least one actuator power constraint. The active vehicle actuator electric controller may receive the power constraint via a communications network from a separate control unit. The relative state may be to stay below the at least one actuator power constraint, above the at least one actuator power constraint, and the like.

In the above description of FIG. 106, the averaging times are the length of the window in a moving average filter. The averaging times could instead be the time constant or characteristic time of an exponential (first order) low-pass filter. Higher order filters are also possible. The methods and systems described herein are not limited in this regard.

Throttling algorithms may use both past power consumption history as well as predictive power-consumption related information based on a range of data sources such as GPS route, weather and road conditions, information from a forward camera about pedestrians, stop signs and other vehicles, as well as direct driver input such as steering, braking and throttle position. In one embodiment a trend line of past power consumption can be used as a factor in a prediction of future power consumption.

An active chassis power management system for power throttling may be associated with an energy-neutral active suspension control system where the goal is to balance the active suspension's regeneration with its use of active power such that the average power drawn from the vehicular high power electrical system over a period of time is substantially zero. This approach has the advantage of allowing the vehicular high power electrical system to be designed for high peak power without the size or cost required to provide high average power.

An active chassis power management system for power throttling may be associated with a vehicular high power electrical system incorporating energy storage, such as supercapacitors or high-performance batteries, to provide the peak power required by the actuators. This allows the actuators to have a high instantaneous power limit for high performance and only require throttling to reduce power consumption over longer time periods.

Using supercapacitors for energy storage is especially advantageous as their voltage directly indicates the energy state or state of charge (SOC) of the energy storage device. Energy neutrality of the plurality of active vehicle actuators can be achieved over time by throttling so that the voltage on the bus stays constant. A similar approach may be taken when using high-performance batteries but may require a different method of estimating SOC.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Conventional passive dampers and semi-active dampers, such as used in active suspension systems, use a combination of valving and springs to provide the desired force-velocity curves for any given application. Although the valve design and spring rates are chosen to give the required pressure vs. flow characteristics during steady state operation, under highly dynamic operation, the pressure vs. flow characteristics can change dramatically due to the effects of the valves' inertia. Therefore, a damper that has been designed to provide substantial damping with respect to velocity, at either low speed or high speed events of a vehicle (such as body roll and heave or speed bumps) may produce undesirable harshness in response to high acceleration wheel events, (i.e. high frequency low amplitude inputs) such as small road imperfections or raised manhole covers etc. Although the flow rates at which these event may occur is low, the acceleration of the fluid is high and harshness is felt on the vehicle due to inertial forces imparted by the fluid on the moving components of a hydraulic valve resisting this acceleration thereby producing a high pressure spike acting on the piston of the damper. The level of harshness may substantially increase as the particular valve complexity increases, (such as in semi-active proportional valves or hydraulic regenerative, active/semi active damper valves that may use close coupled electric motors and hydraulic pump/motors etc.). Any hydraulic damper whereby the valve moves at least partially in lock step with the damper will tend to encounter some extent of undesirable inertial effect.

Described herein is an inertia mitigation accumulator that reduces the effects of undesirable inertial forces thereby reducing damper harshness during high acceleration, low amplitude events. In a first mode, the inertia mitigation accumulator accepts the high acceleration fluid flow (which is at high frequency, low amplitude) wherein the hydraulic motor provides high impedance to this fluid flow, and in a second mode outputs the fluid flow, wherein the hydraulic motor provides lower impedance to fluid flow. This economical system reduces the overall undesirable inertial effect on the damper and therefore reduces damper harshness during the high acceleration, low amplitude events.

According to one aspect, the hydraulic inertia mitigation accumulator captures pressure spikes in the fluid occurring during high acceleration, low amplitude events, through a fluid restriction in its first mode, wherein the hydraulic motor provides high impedance to fluid flow, and softens them upon releasing the fluid through the fluid restriction in its second mode, wherein the hydraulic motor provides lower impedance to fluid flow. The high acceleration, low amplitude event triggers an increase in pressure within the inertia mitigation accumulator. However, this increase in pressure is significantly lower than the overall increase in pressure in the variable pressure side of the damper would be without the inertia mitigation accumulator due to the hydraulic motor's high impedance to high frequency fluid flow.

According to another aspect, the inertia mitigation accumulator captures pressure spikes using a compressible medium comprising at least one of a compressed gas separated by a floating piston, a mechanical force biasing element acting on a floating piston, a movable separating element disposed between the force biasing element and the hydraulic gas, and a movable separating element disposed between the compressed gas and the hydraulic fluid.

According to another aspect, the hydraulic inertia mitigation accumulator may be used in conjunction with regenerative, semi-active, or fully-active suspension actuator architectures including but not limited to: monotube, twin tube, and triple tube and McPherson strut architectures. In another embodiment, the hydraulic inertia mitigation accumulator may be mounted either internal or external to the actuator.

Figure 107:
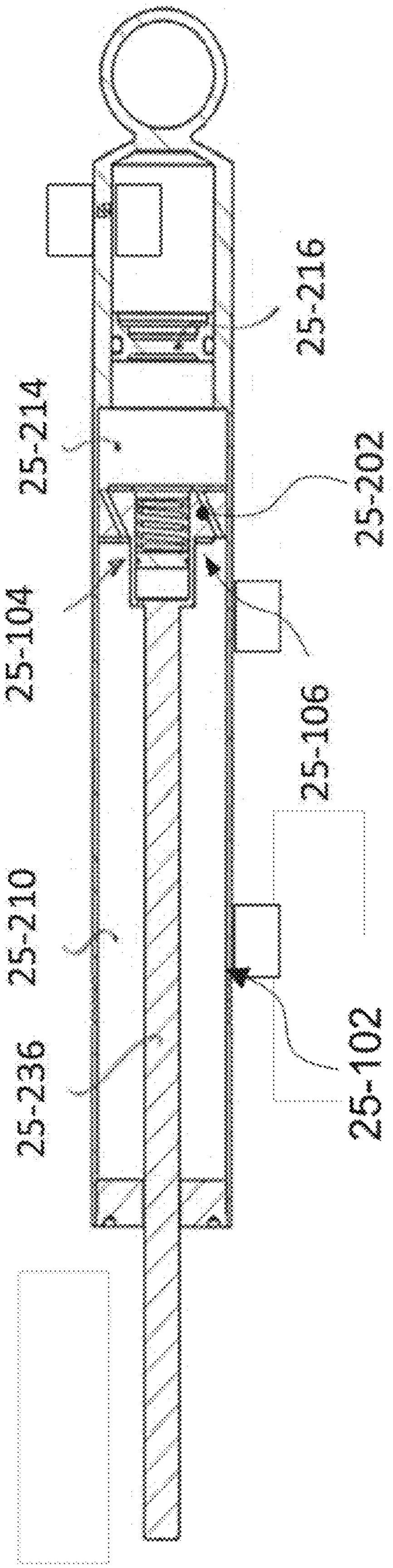
FIG. 107 is an embodiment of a monotube passive damper with a hydraulic inertia mitigation accumulator.
Figure 108:
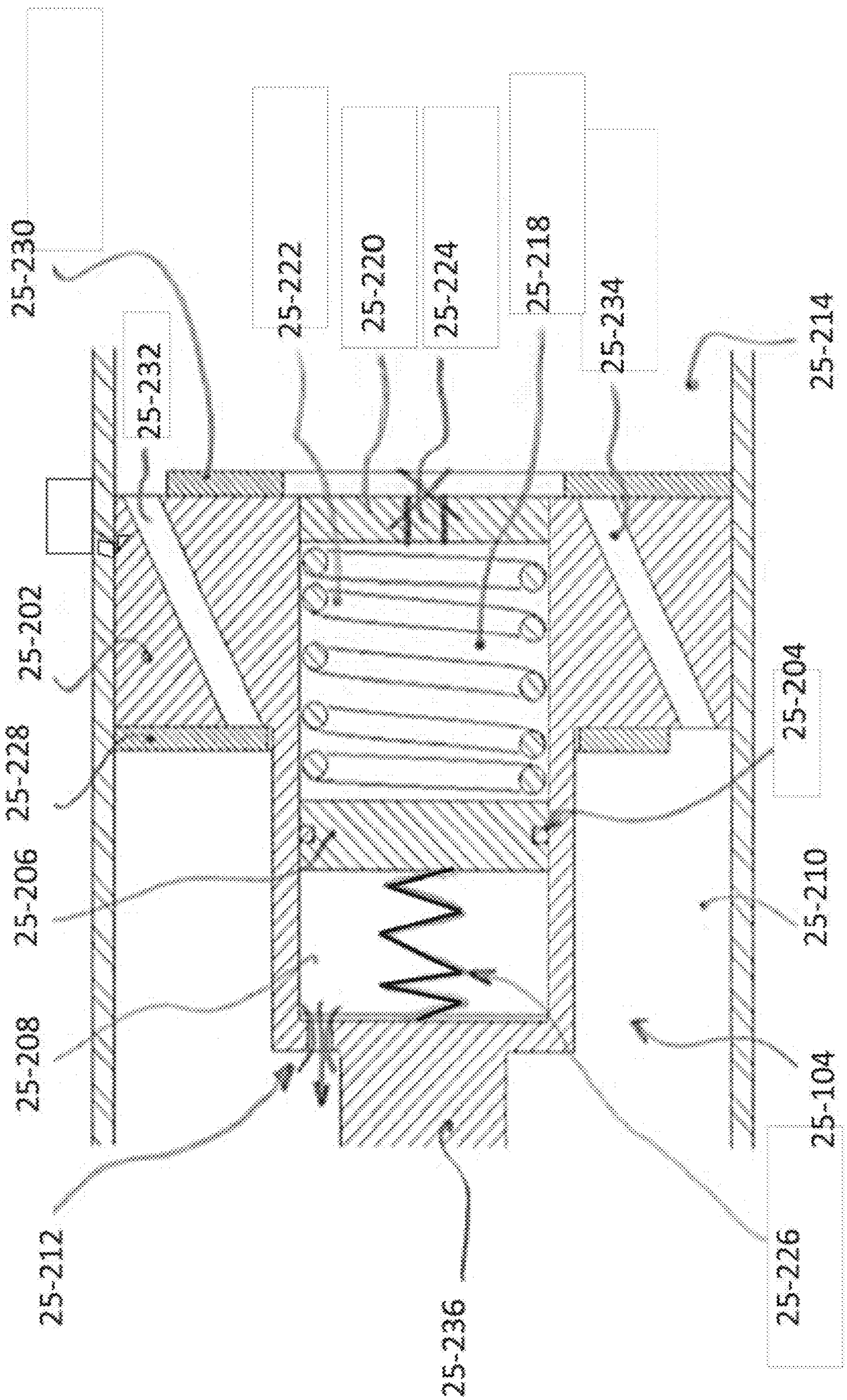
FIG. 108 is a detail view of the embodiment of a hydraulic inertia mitigation accumulator mounted in a piston head of a monotube passive damper.

Referring to FIGS. 107 and 108, a passive monotube damper 25-102 that comprises a hydraulic inertia mitigation accumulator 25-104 in conjunction with conventional passive valving 25-106 is shown. The damper comprises a rebound chamber 25-210, and a compression chamber 25-214, and a piston head 25-202 that separates the compression and rebound chambers and a piston rod 25-236. The compression chamber is in fluid communication with a damper accumulator via the floating piston assembly 25-216. The pressure in the compression chamber remains substantially at constant pressure with respect to damping force whereby the pressure varies only with damper position (and/or temperature). The accumulator is at pre-charge pressure, whereby the pre-charge pressure is normally equal to or slightly greater than the maximum pressure differential across the piston generated by the maximum damping force. In the embodiment shown, the compression chamber is the constant pressure side and the rebound chamber is the variable pressure side, however, in an alternate embodiment the rebound chamber may be the constant pressure side and the compression chamber may be the variable pressure side.

Referring to FIG. 108, the hydraulic inertia mitigation accumulator 25-104 is shown incorporated into the piston head 25-202 of the damper 25-102. The hydraulic inertia mitigation accumulator comprises a bore 25-204 in which a floating piston and seal assembly 25-206 is disposed. The first side of the floating piston and seal assembly 25-206 is in fluid communication with an oil-filled chamber 25-208 that is in fluid communication with the compression chamber 25-210 via an orifice 25-212. In the embodiment shown the orifice is a fixed restriction orifice that offers the same flow restriction in both flow directions, however, in alternate embodiments the orifice may be variable, whereby the restriction may vary with various factors (such as flow velocity, acceleration for example) and may offer different flow restrictions in either flow direction. The construction of such devices is well known to anyone skilled in the art and all types are considered in this disclosure as the patent is not limited in this regard. The second side of the floating piston and seal assembly 25-206 is in communication with hydraulic inertia mitigation accumulator volume 25-218. The hydraulic inertia mitigation accumulator 25-104 is sealed from the compression chamber by means of a seal cap 25-220 and may be at a pre-charge pressure. The precharge pressure of the hydraulic inertia mitigation accumulator being such that when the damper is at rest, the pre-charge pressure from the damper accumulator will displace a volume of oil into the oil-filled chamber 25-208 equalizing the pressures between the damper accumulator and the hydraulic inertia mitigation accumulator, whereby the floating piston and seal assembly 25-206 is disposed is at a predetermined position so that the oil-filled chamber 25-208 contains a known volume of fluid. In an alternate embodiment the accumulator volume 25-218 may contain a mechanical force biasing element 25-222 (such as a compression spring for example), and the oil-filled chamber 25-208 may also contain a mechanical force biasing element 25-226 (such as a compression spring for example), whereby the relative spring forces of the springs 25-222 and 25-226 will be at equilibrium when the piston 25-206 in a known position in the oil-filled chamber 25-208.

The piston head 25-202 contains flow passages 25-232 and 25-234 and passive valving 25-228 and 25-230, whereby under a rebound wheel event fluid will flow from the rebound chamber through the passages 25-234 through the passive valving 15-230 into the compression chamber and under a compression wheel event fluid will flow from the compression chamber through the passages 25-232 through the passive valving 15-228 into the rebound chamber.

When the piston and piston rod accelerate under small amplitude-high frequency rebound wheel event, a pressure spike in the rebound chamber will be generated due to the inertia of the fluid accelerating the passive valving 25-230, in a conventional damper this pressure spike will generate a force spike felt by the damper. However, in the embodiment disclosed, this pressure spike will cause the pressure in the rebound chamber to rise above that of the pressure in the damper accumulator, and hence above that of the hydraulic inertia mitigation accumulator, whereby the pressure rise (or spike) will cause fluid to flow into the oil-filled chamber 25-208 through the orifice 21-212. The fluid flow into the oil-filled chamber 25-208 will dampen the pressure spike that would normally be felt by the damper under such an event. As fluid flows into the oil-filled chamber from the rebound chamber, fluid will flow out of the damper accumulator into the compression chamber to accommodate for the displaced volume lost to the oil-filled chamber 25-208. As the piston rod decelerates in the rebound direction, the pressure in the rebound chamber will fall below that of the pressure in the oil-filled chamber 25-208, whereby oil will flow back out of the oil-filled chamber 25-208 into the rebound chamber, and oil will flow from the compression chamber back into the damper accumulator to accommodate the volume re-introduced into the rebound chamber.

When the piston and piston rod accelerates under small amplitude-high frequency compression wheel event, a pressure spike will be generated due to the inertia of the fluid accelerating the passive valving 25-228, and the pressure in the compression chamber will rise above that of the pressure in the damper accumulator causing fluid to flow into the damper accumulator from the compression chamber. Any fluid flow that goes into the damper accumulator from the compression chamber will not go into the rebound side, creating a pressure drop on the rebound side. In a conventional damper this pressure drop would normally create a force spike felt by the damper due to a pressure drop across the piston head, however, in the embodiment shown when there is a pressure drop in the rebound chamber fluid will flow from the oil-filled chamber 25-208 through the orifice 25-212 into the rebound chamber thereby mitigating the pressure drop and hence the force spike on the damper.

In the embodiment depicted in FIG. 107, the hydraulic inertia mitigation accumulator 25-104 is shown integrated into the piston head of a monotube damper, in alternate embodiments the hydraulic inertia mitigation accumulator 25-104 can be located anywhere in the fluid circuit whereby the inertia mitigation accumulator 25-104 and the oil filled chamber are in fluid communication with the rebound chamber via orifice 25-212 and the inertia mitigation accumulator 25-104 may be mounted internally or externally to the damper or may be integral or connected via hoses, tubes etc. to the damper and the patent is not limited in this regard. The hydraulic inertia mitigation accumulator may be incorporated into all forms or dampers such as monotube, twin tube, triple tube McPherson strut dampers for example, and the patent is not limited in this regard.

Figure 109:
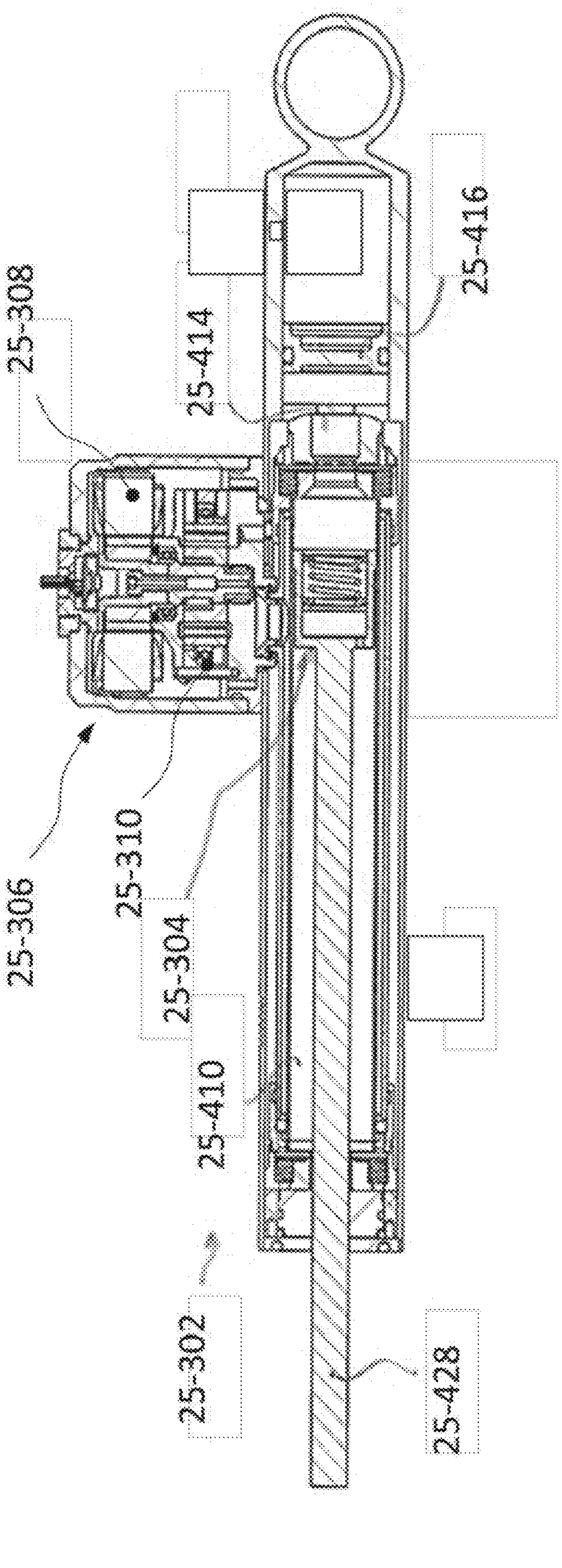
FIG. 109 is an embodiment of a regenerative active/semi active damper with a hydraulic inertia mitigation accumulator.
Figure 110:
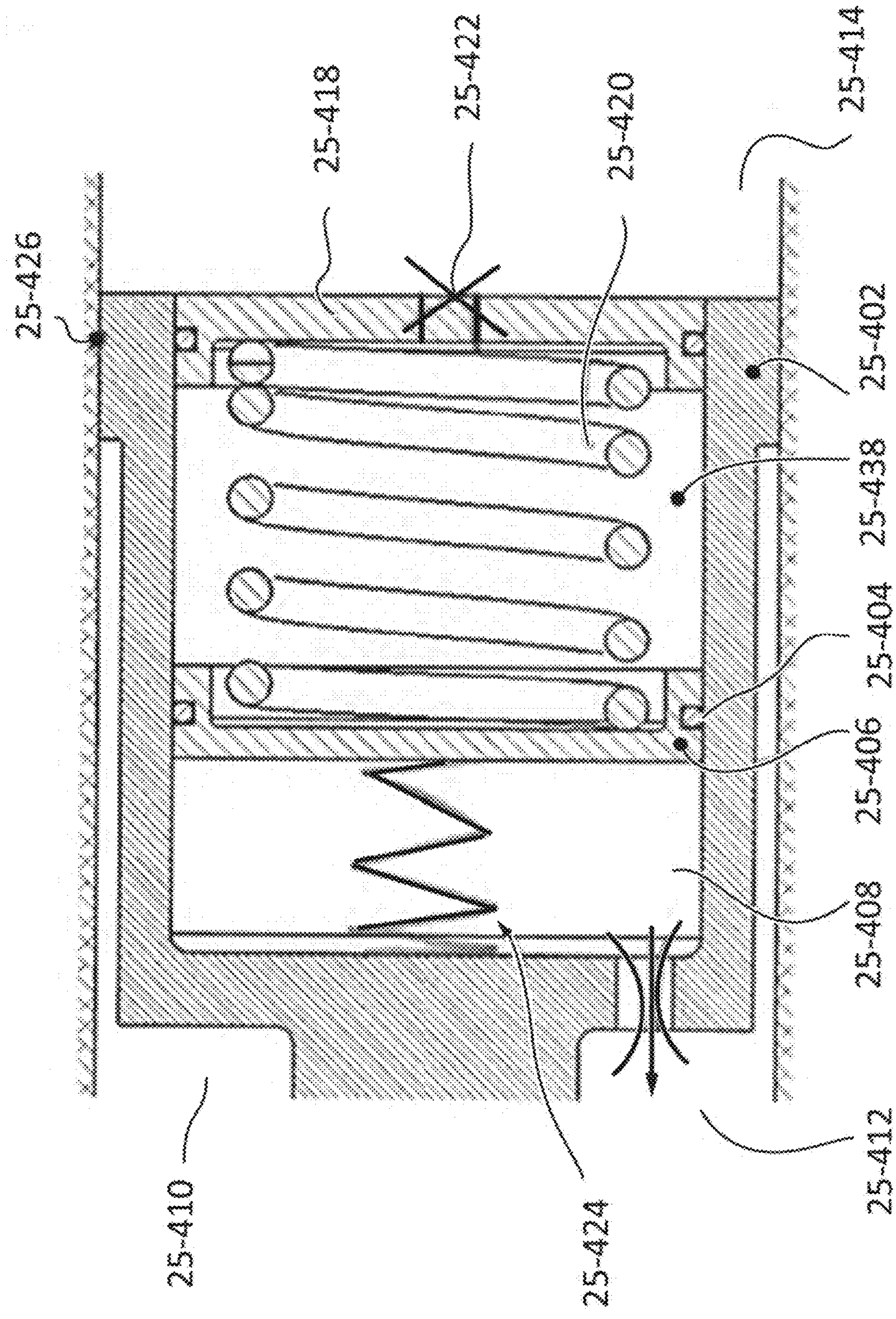
FIG. 110 is an embodiment of a hydraulic inertia mitigation accumulator mounted in a piston head of a regenerative active/semi active damper.

In the embodiment of FIGS. 109 and 110 an active suspension actuator 25-302 that comprises a hydraulic inertia mitigation accumulator 25-304 in conjunction with an integrated smart valve 25-306 is shown. The active suspension actuator comprises a rebound chamber 25-410, and a compression chamber 25-414. A piston head 25-426, that separates the compression and rebound chambers, and a piston rod 25-428. The compression chamber is in fluid communication with an active suspension actuator accumulator via the floating piston assembly 25-416. The smart valve 25-306 comprises an electric motor 25-308 and a hydraulic motor-pump 25-310. The hydraulic motor-pump 25-310 comprises a first port and a second port, whereby the first port is in hydraulic communication with the compression chamber and the second port is in fluid communication the compression chamber. The piston head 25-426 and piston rod 25-428 is disposed in the active suspension actuator so that when the piston and piston rod moves in a first direction (i.e. a rebound stroke) the hydraulic motor-pump rotates in a first rotation, and when the piston and piston rod moves in a second direction (i.e. a compression stroke) the hydraulic motor rotates in a second rotation. The pressure in the compression chamber remains at substantially constant pressure with respect to damping force whereby the pressure varies only with active suspension actuator position (and/or temperature). The accumulator is at pre-charge pressure, whereby the pre-charge pressure is normally equal to or slightly greater than the maximum pressure differential across the piston generated by the maximum damping force. In the embodiment shown, the compression chamber is the constant pressure side and the rebound chamber is the variable pressure side, however, in an alternate embodiment however the rebound chamber may the constant pressure side and the compression chamber may be the variable pressure side.

Referring to FIG. 110, the hydraulic inertia mitigation accumulator 25-304 is shown incorporated into the piston head 25-402 of the active suspension actuator 25-302. The hydraulic inertia mitigation accumulator is comprises a bore 25-404 in which a floating piston and seal assembly 25-406 is disposed. The first side of the floating piston and seal assembly 25-206 is in fluid communication with an oil-filled chamber 25-408 that is in fluid communication with the compression chamber 25-410 via an orifice 25-412. In the embodiment shown the orifice is a fixed restriction orifice that offers the same flow restriction in both flow directions, however, in alternate embodiments the orifice may be variable, whereby the restriction may vary with various factors (such as flow velocity, acceleration for example) and may offer different flow restrictions in either flow direction. The construction of such devices is well known to anyone skilled in the art and all types are considered in this disclosure as the patent is not limited in this regard. The second side of the floating piston and seal assembly 25-406 is in communication with hydraulic inertia mitigation accumulator volume 25-438. The hydraulic inertia mitigation accumulator 25-304 is sealed from the compression chamber by means of a seal cap 25-422 and may be at a pre-charge pressure. The precharge pressure of the hydraulic inertia mitigation accumulator being such that when the active suspension actuator is at rest, the pre-charge pressure from the active suspension actuator accumulator will displace a volume of oil into the oil-filled chamber 25-408 equalizing the pressures between the active suspension actuator accumulator and the hydraulic inertia mitigation accumulator, whereby the floating piston and seal assembly 25-406 is disposed is at a predetermined position so that the oil-filled chamber 25-408 contains a known volume of fluid. In an alternate embodiment the accumulator volume 25-238 may contain a mechanical force biasing element 25-420 (such as a compression spring for example), and the oil-filled chamber 25-408 may also contain a mechanical force biasing element 25-424 (such as a compression spring for example), whereby the relative spring forces of the springs 25-420 and 25-424 will be at equilibrium when the piston 25-406 in a known position in the oil-filled chamber 25-408.

When the piston and piston rod accelerates under small amplitude-high frequency rebound wheel event, a pressure spike in the rebound chamber will be generated due to the fluid accelerating the hydraulic motor-pump 25-310 in the first direction, and the hydraulic motor-pump resisting this acceleration due to its inertia, and this pressure spike will generate a force spike felt by the active suspension actuator. However, in the embodiment disclosed, this pressure spike will cause the pressure in the rebound chamber to rise above that of the pressure in the active suspension actuator accumulator, and hence above that of the hydraulic inertia mitigation accumulator, whereby the pressure rise (or spike) will cause fluid to flow into the oil-filled chamber 25-408 through the orifice 21-412. The fluid flow into the oil-filled chamber 25-408 will dampen the pressure spike that would normally be felt by the active suspension actuator under such an event. As fluid flows into the oil-filled chamber from the rebound chamber, fluid will flow out of the active suspension actuator accumulator into the compression chamber to accommodate for the displaced volume lost to the oil-filled chamber 25-408. As the piston rod decelerates in the rebound direction, the pressure the rebound chamber will fall below that of the pressure in the oil-filled chamber 25-408 due to the inertia of the hydraulic motor-pump 2-310, whereby oil will flow back out of the oil-filled chamber 25-208 into the rebound chamber, and oil will flow from the compression chamber back into the active suspension actuator accumulator to accommodate the volume reintroduced into the rebound chamber thereby minimizing any pressure drop (and hence force spike) due to this deceleration.

When the piston and piston rod accelerates under small amplitude-high frequency compression wheel event, a pressure spike will be generated due to the fluid accelerating the hydraulic motor-pump 2-310 in the second direction, and the hydraulic motor-pump resisting this acceleration due to its inertia, and the pressure in the compression chamber will rise above that of the pressure in the active suspension actuator accumulator causing fluid to flow into the active suspension actuator accumulator from the compression chamber. Any fluid flow that goes into the active suspension actuator accumulator from the compression chamber will not go into the rebound side, creating a pressure drop on the rebound side. This pressure drop would normally create a force spike felt by the active suspension actuator due to a pressure drop across the piston head, however, in the embodiment shown when there is a pressure drop in the rebound chamber fluid will flow from the oil-filled chamber 25-408 through the orifice 25-412 into the rebound chamber thereby minimizing the pressure drop and hence the force spike on the active suspension actuator. As the piston rod decelerates in the compression direction, the pressure the rebound chamber will rise above the pressure in compression chamber (and hence that of the oil-filled chamber 25-408) due to the inertia of the hydraulic motor-pump 2-310, this would normally cause a pressure differential from the compression chamber to the rebound chamber across the piston head resulting in a force spike that would normally be felt by the active suspension actuator. However, in the embodiment shown when the pressure in the rebound chamber rises above that of the oil-filled chamber 25-408 oil will flow into oil-filled chamber 25-408 via the orifice 25-412 The fluid flow into the oil-filled chamber 25-408 will dampen the pressure spike that would normally be felt by the active suspension actuator under such an event. As fluid flows into the oil-filled chamber from the rebound chamber, fluid will flow out of the damper accumulator into the compression chamber to accommodate for the displaced volume lost to the oil-filled chamber 25-408.

As the active suspension actuator can command a static force in either the compression direction or the rebound direction and in either the active or regenerative quadrants of a suspension force velocity graph (i.e. either creating or resisting a force), it is possible to have a static pressure drop across the piston head 25-426, and this static pressure drop will affect the pressure that is in the hydraulic inertia mitigation accumulator 25-304. Depending upon the mode of operation (i.e. whether the static force is in rebound, compression, creating or resisting a force) the pressure in the rebound chamber may be higher or lower than that of the compression chamber. If the pressure in the rebound chamber is higher than that of the compression chamber then there will be fluid flow from the rebound chamber into the oil-filled chamber 25-408 of the hydraulic inertia mitigation accumulator 25-304 until the pressure in the hydraulic inertia mitigation accumulator 25-304 is substantially equal to that of the rebound chamber. In the event of a small amplitude-high frequency rebound wheel event when the actuator is in this mode a pressure spike will be generated above that of the static pressure in the rebound chamber, causing even more fluid to flow into the hydraulic inertia mitigation accumulator 25-304, and as long as there is sufficient piston stroke in the hydraulic inertia mitigation accumulator 25-304 to accept this flow, the hydraulic inertia mitigation accumulator 25-304 will still mitigate this pressure spike in the manner as described above. And in the event of a small amplitude-high frequency compression wheel event when the actuator is in this mode a pressure spike will be generated below that of the static pressure in the rebound chamber and that of the hydraulic inertia mitigation accumulator 25-304, this will cause fluid to flow back out of the hydraulic inertia mitigation accumulator 25-304, and the hydraulic inertia mitigation accumulator 25-304 will mitigate this pressure spike in the manner as described previously.

If the operating mode of the active suspension actuator is such that the static pressure in the rebound chamber is lower than that of the compression chamber, then there will be fluid flow from the oil-filled chamber 25-408 of the hydraulic inertia mitigation accumulator 25-304 to the rebound chamber until the pressure in the hydraulic inertia mitigation accumulator 25-304 is substantially equal to that of the rebound chamber. In the event of a small amplitude-high frequency rebound wheel event when the actuator is in this mode a pressure spike will be generated above that of the static pressure in the rebound chamber, causing fluid to flow back into the inertia mitigation accumulator 25-304, and the hydraulic inertia mitigation accumulator 25-304 will mitigate this pressure spike in the manner as described previously. And in the event of a small amplitude-high frequency compression wheel event when the actuator is in this mode a pressure spike will be generated below that of the static pressure in the rebound chamber causing even more fluid to flow out of the hydraulic inertia mitigation accumulator 25-304, and as long as there is sufficient piston stroke in the hydraulic inertia mitigation accumulator 25-304 to supply this flow, the hydraulic inertia mitigation accumulator 25-304 will still mitigate this pressure spike in the manner as described above.

In the embodiment depicted in FIG. 109, the hydraulic inertia mitigation accumulator 25-404 is shown integrated into the piston head of an active suspension actuator, in alternate embodiments the hydraulic inertia mitigation accumulator 25-404 can be located anywhere in the fluid circuit whereby the inertia mitigation accumulator 25-304 and the oil filled chamber are in fluid communication with the rebound chamber via orifice 25-412 and the inertia mitigation accumulator 25-304 may be mounted internally or externally to the active suspension actuator or may be integral or connected via hoses, tubes etc. to the active suspension actuator, and the patent is not limited in this regard. The hydraulic inertia mitigation accumulator may be incorporated into all forms or active suspension actuator architectures such as monotube, twin tube, triple tube McPherson strut arrangements for example, and the patent is not limited in this regard.

In another embodiment, the seal cap 25-220 may be omitted so that the chamber 25-438 may be in fluid communication with the compression chamber 25-414. In this embodiment, the chamber 25-438 displaces some fluid from the compression chamber 25-414 when the damper is at rest, and during operation the hydraulic inertia buffer operates to allow fluid from the compression chamber 25-414 to enter into chamber 25-438, thus displacing the accumulator piston 25-406 and forcing fluid out of the chamber 25-408 and through the orifice 25-412 into the rebound chamber 25-410. The entire process works in reverse when pressure builds up in the rebound chamber 25-410, forcing fluid through the orifice 25-412 into the chamber 25-408, displacing the piston 25-406 and moving fluid from chamber 25-438 into the compression chamber 25-414 of the hydraulic actuator.

Figure 111:
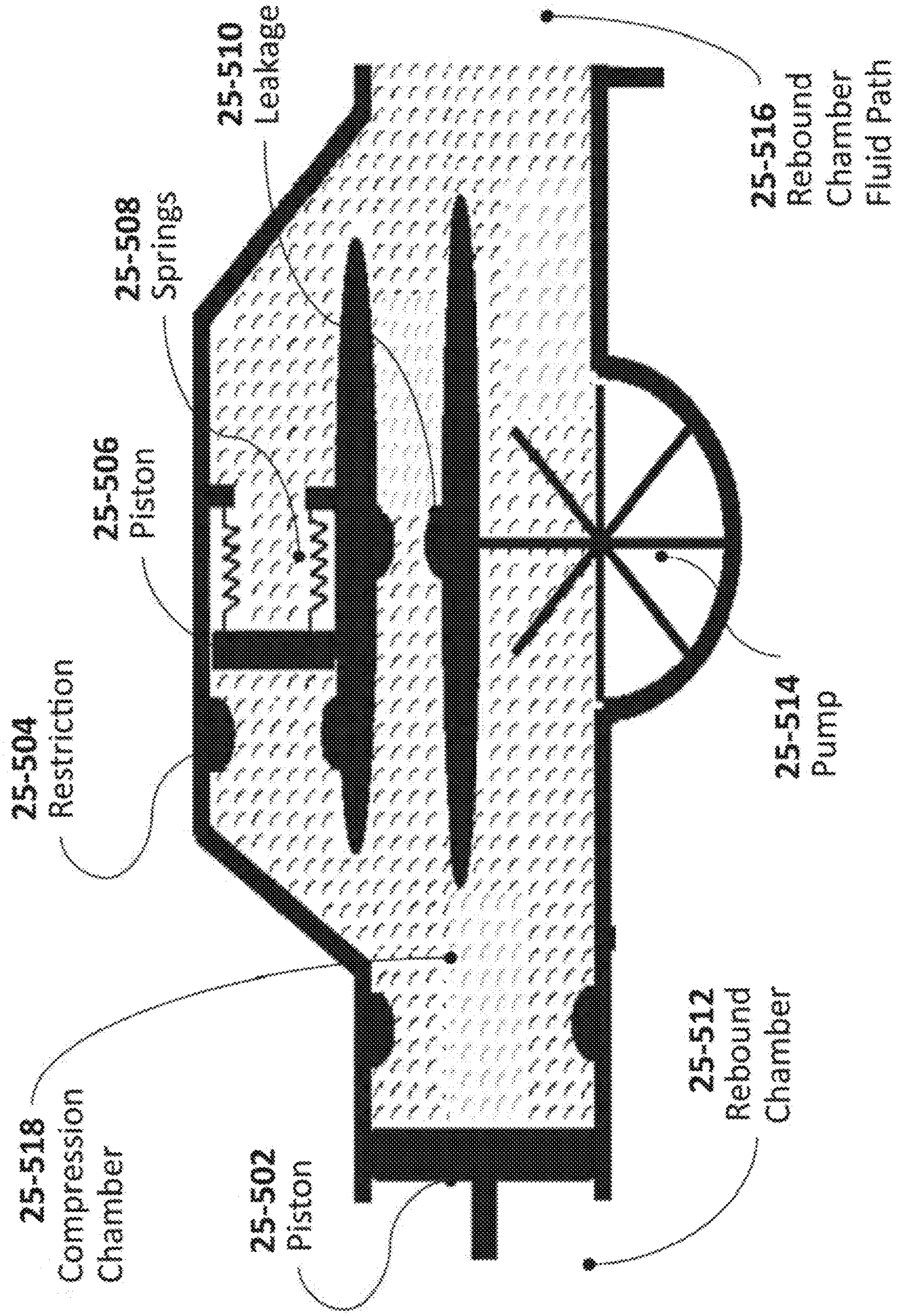
FIG. 111 shows an embodiment of a hydraulic inertia mitigation system in fluid communication with both a compression and rebound chamber, using mechanical springs.

FIG. 111 shows a schematic layout of such a device. In this figure, the hydraulic actuator is composed of a piston 25-502 separating the rebound chamber 25-512 from the compression chamber 25-518. A hydraulic motor-pump unit 25-514 is in fluid communication with the compression and rebound chambers to allow for force generation, and may be operatively coupled to an electric motor not shown in the schematic. The moment of inertia of the rotating components of the pump-motor makes it difficult for this flow path to adapt to fast accelerations of the piston 25-502. A parallel leakage path 25-510 exists in most hydraulic pumps and is drawn here for completeness, but is not relevant to the invention. The hydraulic circuit is closed by a fluid path 25-516 communicating the rebound chamber on the right side of the drawing to the rebound chamber 25-512 on the left side of the drawing. The complete fluid path is left out of the schematic for simplicity. Also included in this embodiment, although not depicted in FIG. 111 is a gas accumulator comprising a gas volume capable of absorbing a portion of the volume of the piston rod; this gas volume is in fluid communication with either the rebound or compression chambers, as described previously.

A parallel fluid path is built to communicate on one side with the compression chamber 25-518, and on the other side with the rebound chamber 25-516. This parallel path may be incorporated into the piston, or may be external, as previously described in this disclosure.

The parallel fluid path contains three schematic elements. A flow restriction 25-504 can be on the compression side or rebound side of the parallel path. This is similar to the restrictions depicted as elements 25-412 and 25-212 for alternate embodiments. The parallel fluid path also contains a separating piston 25-506. This is similar to the separating pistons depicted as elements 25-406 and 25-206 in alternate embodiments. A mechanical force element 25-508, here represented by two springs but not limited in this regard, provides a restoring force on the separating piston 25-506.

When the piston is rapidly accelerated in either direction, flow rapidly wants to move from the rebound chamber into the compression chamber, or vice-versa. The hydraulic motor-pump exhibits high impedance to high acceleration inputs due at least partially to its inertia, causing the pressure in the rebound chamber to rise if the piston moves to the left in the drawing. Likewise pressure in the compression chamber will rise if the piston moves to the right during high acceleration inputs. In the presence of a gas accumulator as described previously for a monotube damper, the pressure in the chamber not in fluid communication with the gas accumulator would rise or fall, and the pressure in the chamber in fluid communication with the gas accumulator would remain substantially constant.

When the pressure in the rebound chamber rises over the pressure in the compression chamber, the piston 25-506 of the hydraulic inertia mitigation device will move to the left in this schematic until the force in the restoring element 25-508 increases enough to compensate for the pressure differential. This forces fluid to move out of the rebound chamber into the volume vacated by the motion of the piston, and into the compression chamber from the volume displaced by the separating piston. This motion of fluid reduces the pressure spike that would otherwise be seen by allowing the piston 25-502 to move at least part of the way even without any flow going through the motor-pump unit 25-514. This fluid flow is forced on at least one side through a flow restriction 25-504, thus removing energy from the dynamic behavior of the system.

The entire process works the same way in reverse, when the piston is accelerated to the right and the pressure in the compression chamber rises over the pressure in the rebound chamber.

In the presence of a quasi-static pressure differential across the piston 25-502, for example caused by actions of the hydraulic pump-motor unit 25-514, the separating piston will find an equilibrium point where the restoring force in the force element 25-506 compensates for the pressure differential across the separating piston 25-506, and no fluid will flow through the parallel path with the hydraulic inertia compensation device.

Figure 112:
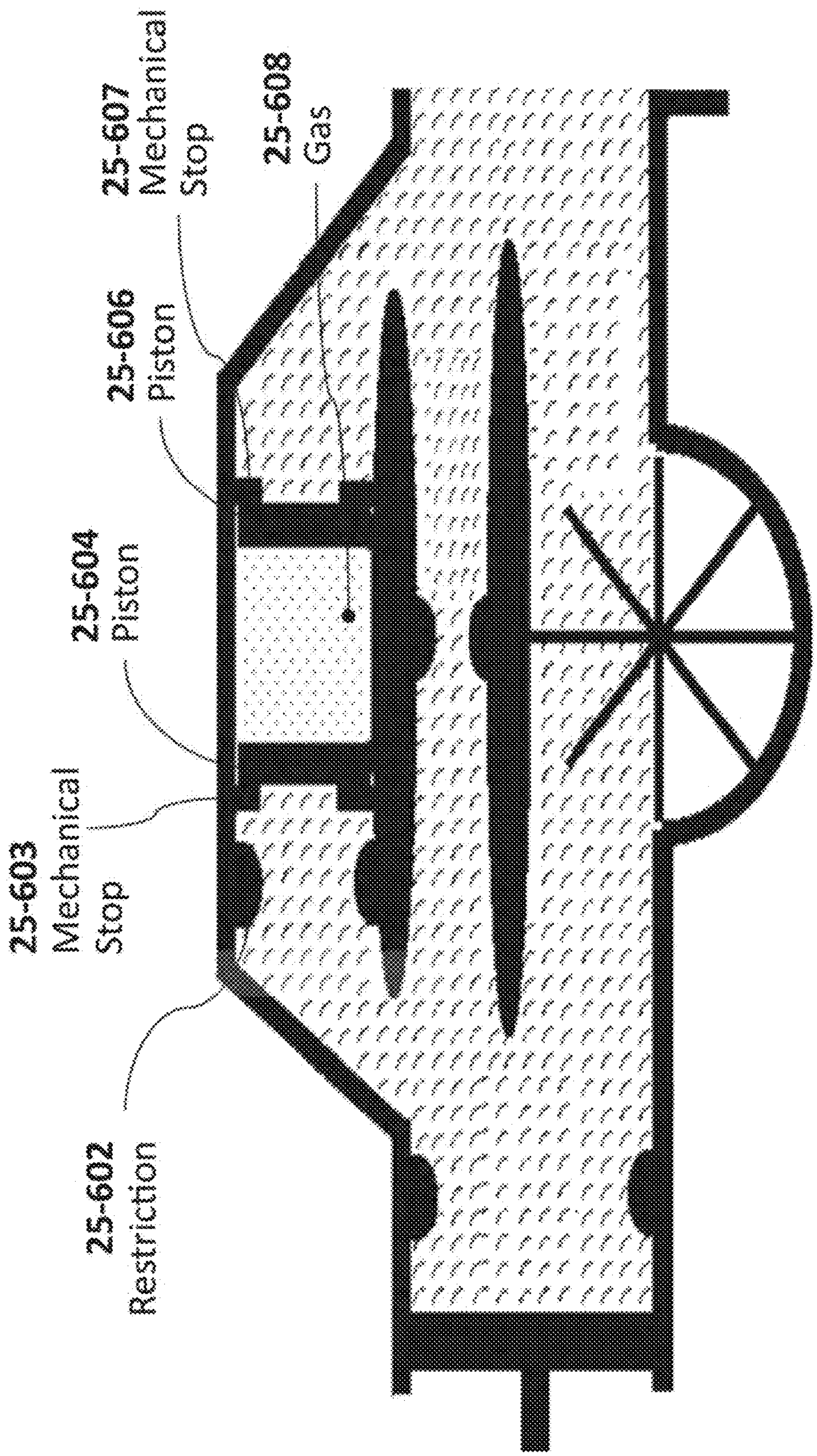
FIG. 112 shows an embodiment of a hydraulic inertia mitigation buffer in fluid communication with both a compression and rebound chamber, using a gas accumulator.

Another embodiment is shown in FIG. 112. The figure shows the same setup as in FIG. 111 for the hydraulic actuator, pump-motor unit, and rebound and compression chambers. The difference is that in this case, the parallel path contains four elements. The first element is again a flow restriction 25-602, which could be placed on either side of the parallel path or on both sides. The second element is a first separating piston 25-604, separating the compression chamber from a gas volume 25-608. The last element is another separating piston 25-606 separating the gas volume from the rebound chamber.

In the embodiment depicted in FIG. 112, a rise in pressure in the compression chamber will create fluid flow pass the flow restriction 25-602 and displace the separating piston 25-604 until the pressure in the gas chamber 25-608 is substantially equal to the pressure in the compression chamber. This displaces fluid and results in the compression chamber pressure rise due to hydraulic motor-pump impedance being mitigated. Therefore, the compression chamber presser will not rise as much in response to a motion of the piston as it would if this inertia mitigation feature were not used even though the path through the hydraulic motor-pump unit has high impedance and cannot accept fluid flow at high acceleration levels of the fluid flow itself. If the pressure in the compression chamber and the gas is now higher than the pressure in the rebound chamber, then the second separating piston 25-606 must rest on a mechanical stop 25-607 to provide the force equal to the pressure differential.

A rise in pressure in the rebound chamber will create fluid flow that will displace the separating piston 25-606 and increase the gas pressure in the gas chamber 25-608 until it equals the pressure in the rebound chamber. In this case, the other separating piston 25-604 will rest on the mechanical stop 25-603. Again, fluid flow into the hydraulic inertia mitigation device will reduce the pressure spike even if the hydraulic motor-pump unit can not accept flow due to its high impedance at high accelerations.

Another embodiment of the same device requires two separate hydraulic accumulators as the ones described in FIGS. 110 and 108, each in fluid communication with one of the rebound and compression chambers of the hydraulic actuator.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The present invention applies to many different fields, as previously mentioned, but shall here be described using an application in the field of electric motor controls for simplicity. It shall be noted here that by no means is the invention solely confined to this field, but that it applies to any field where sensor errors correlated with the sensor reading present undesirable effects.

In one embodiment, electric motor controls rely on knowledge of the position of a rotor with respect to a stator at any time in order to correctly align the phase of the rotating magnetic field with respect to the stationary magnetic field. Especially for applications involving low-speed and high torque operation, where model-based position estimation ("sensorless") techniques cannot be used, a position sensor is required, and the cost of this sensor can be of significant impact on the system design.

A low quality sensor reading can introduce large errors, especially when the sensor output is used to derive calculated quantities, such as velocity and acceleration. Lower cost sensors in general tend to exhibit more pronounced output errors. These errors can be of many different varieties, but can be grouped into major functional groups.

The first group contains errors that exhibit no correlation with the sensor reading or other easily measurable external factors, such as electrical noise, discretization or quantization errors, or the like. The second group contains errors that correlate with external influences, such as temperature errors, pressure errors, humidity errors, or the like. The third group contains errors that exhibit correlation with the actual sensor reading, such as calibration errors, position-dependent errors, velocity-dependent errors, or the like.

Figure 113:
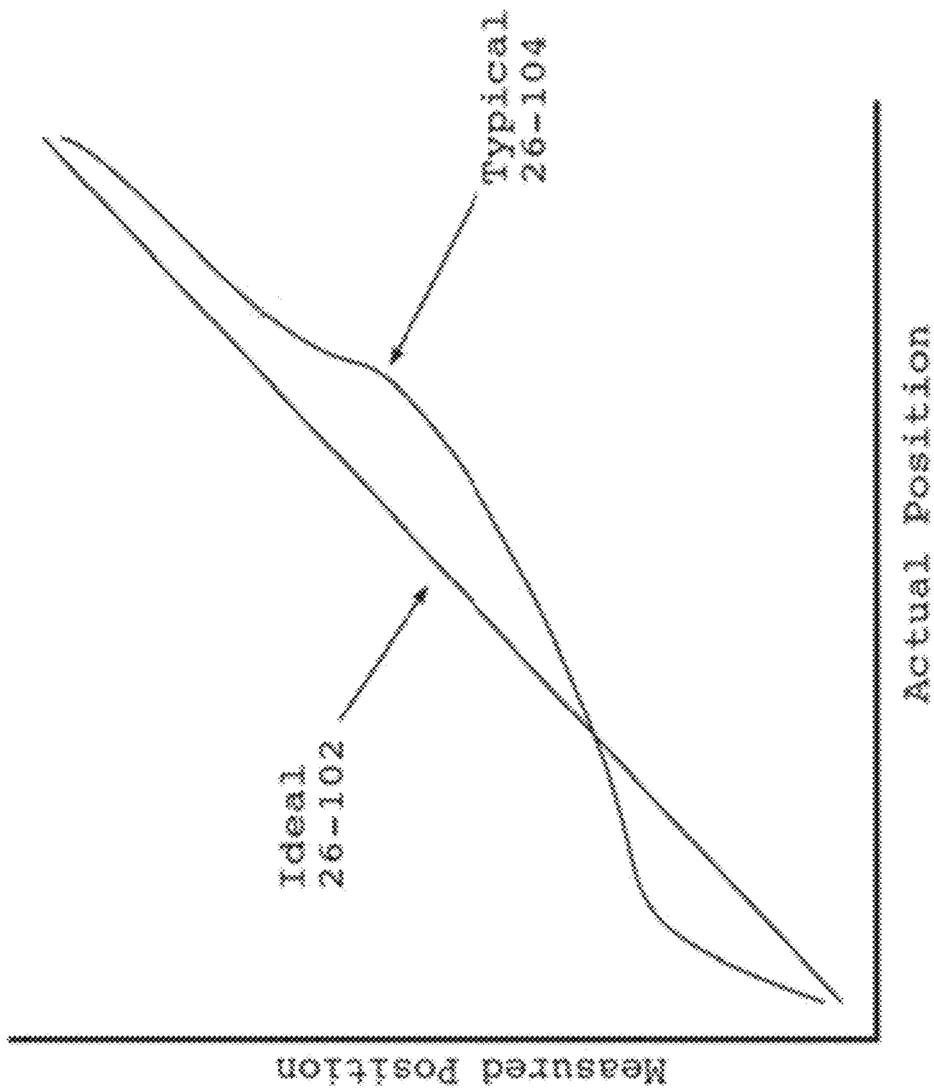
FIG. 113 shows a typical map of actual position versus measured position for a sensor with position-dependent errors.

For the purposes of the present disclosure, we focus on the third type of errors, which contain a repeated pattern over the range of operation of the sensor. FIG. 113 shows an example of a relationship between actual measured quantity (on the ordinate axis, in this case showing position) and the output of a typical sensor (on the abscissa) for a sensor exhibiting output errors that fall into the third category. Curve 26-102 shows the ideal output for the sensor, which perfectly follows the measured quantity across its full range. Curve 26-104 on the other hand shows a typical output signal with some repeatable deviation from the measured quantity over the range of operation of the sensor.

Methods exist to filter errors from the signal; however, these filters add latency, which is unacceptable in many applications. Alternative methods of measuring position and/or velocity may exist, but may not be usable over the entire operating region of the system, or the standard deviation of their signal may be too high.

Methods exist to calibrate a low cost sensor during manufacture. The cost of such a calibration process increases the cost of the resulting product. Additionally, if the sensor errors drift over time (or due to temperature, pressure, or other environmental factors), a one-time, static calibration will not be effective.

The present methods and systems allow for calibration of a low quality sensor to produce a low-latency, high accuracy output signal. This serves multiple purposes. It enables the use of a lower cost sensor in applications where a sensor is required, while maintaining performance equivalent of a system with a higher cost sensor. It also enables the use of a low-cost sensor in situations where a higher cost sensor would be warranted for only a small portion of the operating range. This is typically the case in motor control applications, where a position sensor is not needed for higher velocity operation, but is needed to obtain good low-velocity performance. For many of these applications, a high cost sensor is used even though the system is only rarely requiring it during its normal operation.

In one embodiment, the method described here can be applied to a position sensor in a rotary three-phase brushless electric motor. The sensor can be a low-cost magnetic rotary position encoder that exhibits deviation of the measurement from the actual position in part due to sensor misalignment, sensor assembly errors, and materials tolerances. FIG. 113 shows a typical curve representing the sensor output as a function of the actual position.

For any sensor reading, the measured position signal can be decomposed into the actual position, an error that is strongly correlated with the actual signal, and any error not correlated with the output signal. This can be written in the form:

$$P_{measured}=P_{actual}+e_c(P_{actual})+e_u \quad \text{EQUATION 1}$$

Where $P_{measured}$ is the output of the sensor, $P_{actual}$ is the signal the sensor is trying to read, $e_c$ is the part of the error in the sensor output signal which is correlated with the actual measured quantity (and is thus a function of the actual signal), and $e_u$ is the part of the error in the sensor output signal which is uncorrelated with the actual measured quantity.

Figure 118:
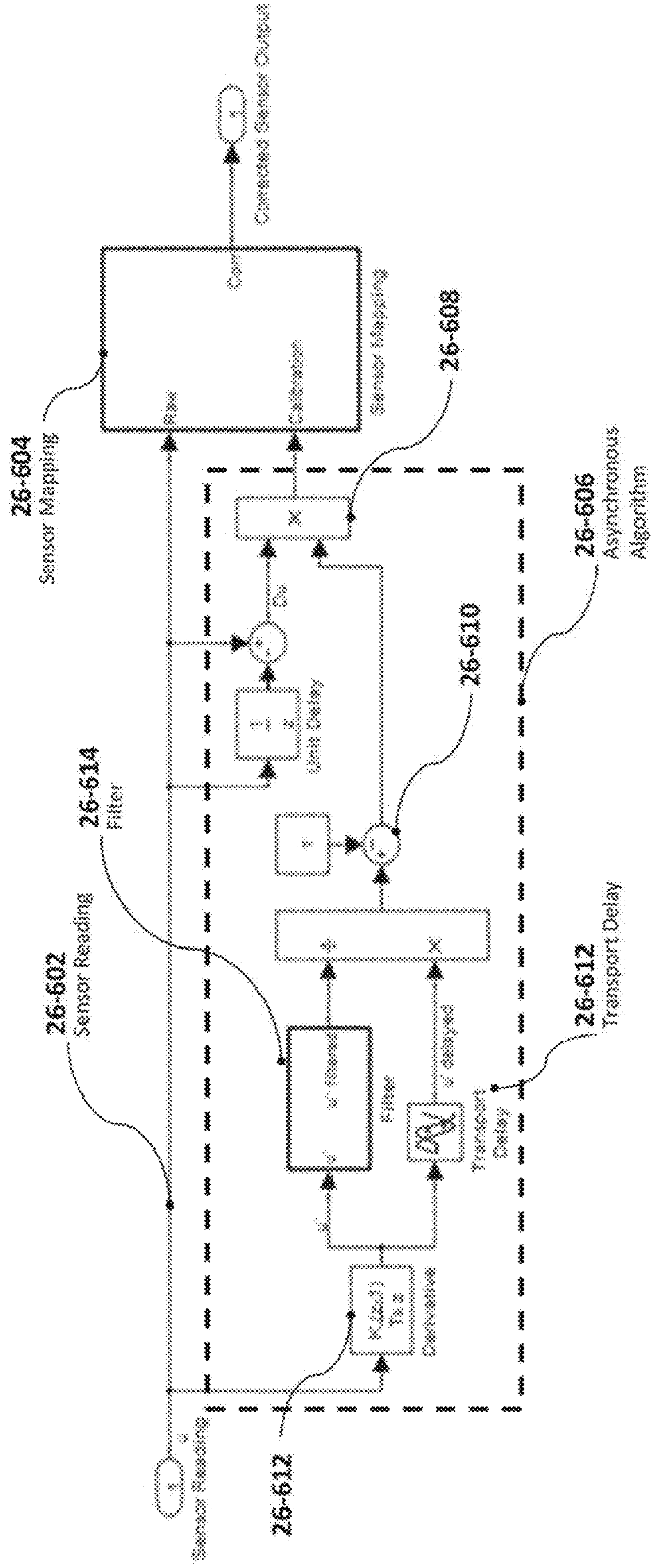

FIG. 118 shows a representation of the process. In this figure, a sensor reading 26-602 is fed into a sensor mapping algorithm 26-604 in a synchronous way, thus not introducing any latency beyond the latency of the sensor mapping algorithm.

The sensor mapping algorithm can be of many forms. In one embodiment, the sensor mapping consists of a lookup table correlating the sensor reading to the actual value of the output. For each sensor reading, there is a corresponding entry with the actual, corrected, output the sensor would have provided if it had no error. In another embodiment, the table could have entries for only a subset of the possible sensor readings, and the output could be determined by interpolating the table for the sensor reading at each time step, using one of many well-known interpolation techniques available, including simply choosing the nearest calibration value.

In another embodiment, the mapping algorithm represents the incremental actual step size of the sensor at each position instead of the output the sensor should have read. In this embodiment, the sensor reading can be treated as incremental and for each reading the step size found through the mapping algorithm is applied as an incremental step to the corrected output.

In another embodiment, the sensor mapping algorithm could apply a formula representing a curve, whereby the corrected sensor output is a function of the sensor reading. In one embodiment, the function is the sum of a series of sine or cosine waves with parameters for the amplitude and phase of each. In another embodiment, the function is the sum of a series of exponential terms with parameters representing the gain factor for each term. In another embodiment, the function is a Taylor expansion series.

In another embodiment, the sensor mapping algorithm could take multiple inputs. In this way, the calibration could happen at different operating points where the sensor's calibration is expected or known to vary, and for which the method may create a sensor mapping. In this embodiment the sensor mapping could use a multi-dimensional lookup table, or a multi-dimensional function, to calculate the corrected sensor signal from the measured sensor signal and other measured or estimated quantities. For example, the sensor's calibration may vary with the operating temperature and the mapping algorithm may take the sensor reading and the measured or estimated temperature and calculate the corrected sensor output. In this embodiment, the sensor calibration method described here would create a multi-dimensional table or function by storing the calculated error signal along with the measured or estimated temperature at the time the calibration was performed.

FIG. 113 shows what the mapping algorithm might look like, where the input into the mapping algorithm would be the ordinate axis in the plot ("measured position"), and the output of the mapping algorithm would represent the curve shown in 26-104 through interpolation, lookup table, or any of the methods described above.

Note that for at least some of the embodiments described above, the process requires that the periodicity of the sensor be known in terms of absolute signal. As an example, for an angular position sensor in an electric motor, as long as the sensor has an absolute output, or as long as an absolute reference signal is available from other source, for example from a single index signal derived from a hall-effect sensor, then the periodicity of the sensor is known, independent of the actual reading of the sensor.

For example, if the sensor reads 350 degrees of angle change, and then wraps back to its beginning position, then we can derive from that fact that the periodicity of the sensor is 350 degrees of measured output, which we also know corresponds to 360 degrees of actual signal due to the symmetry of the physical embodiment.

Applying the mapping algorithm to the sensor output allows for a sensor correction with extremely low latency, since the only process required to go from a measured signal to a corrected signal is calculating the output of the mapping algorithm at the current point.

Referring back to FIG. 118, we can now follow the remainder of the process. The asynchronous algorithm 26-606 is used to calculate the parameters in the mapping algorithm, defined in one of the many ways described above.

To explain the function of the algorithm, we can first differentiate the sensor reading with respect to time. By differentiating Equation 1, we get $$V_{measured} = \frac{\delta(P_{measured})}{\delta t} = \frac{\delta(P_{actual})}{\delta t} + \frac{\delta(e_c(P_{actual}))}{\delta P_{actual}}\frac{\delta(P_{actual})}{\delta t} + \frac{\delta(e_u)}{\delta t} \quad \text{EQUATION 2}$$

$$V_{measured} = V_{actual}\left(1 + \frac{\delta e_c(P_{actual})}{\delta P_{actual}}\right) - \frac{\delta(e_u)}{\delta t} \quad \text{EQUATION 3}$$

Figure 115:
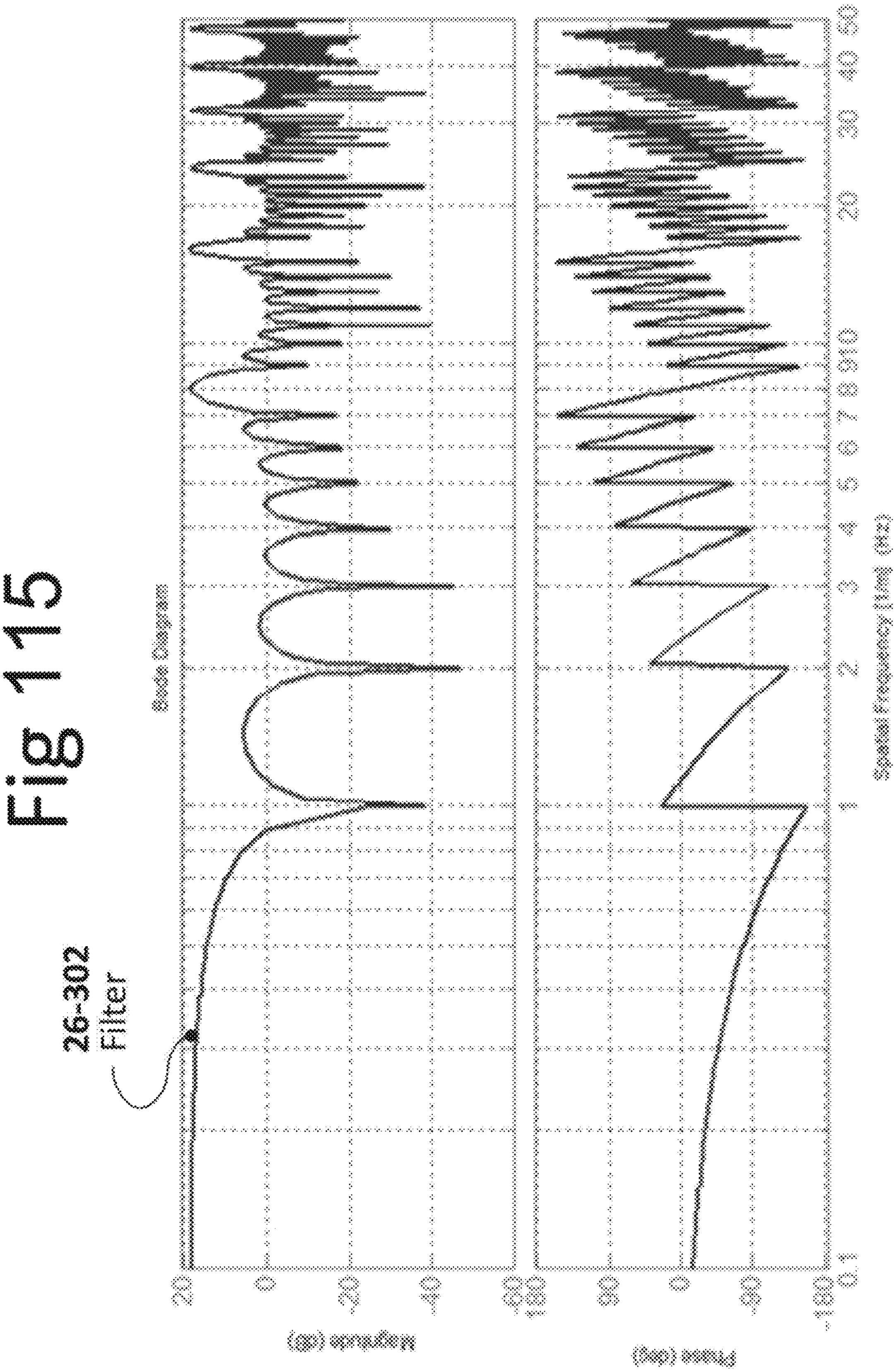
FIG. 115 shows the bode plot of a sample filter used for the sensor calibration

If we want to remove the error content $e_c(P_{actual})$ that is correlated with the sensor signal, then we can apply a periodic filter, which notches out the signal of interest. FIG. 115 shows one embodiment of such a filter, which is designed to remove spatial frequencies of 1 [1/m] and several multiples of that frequency from a sensor signal that measures distance (position) and is periodic at 1 m.

Figure 119:
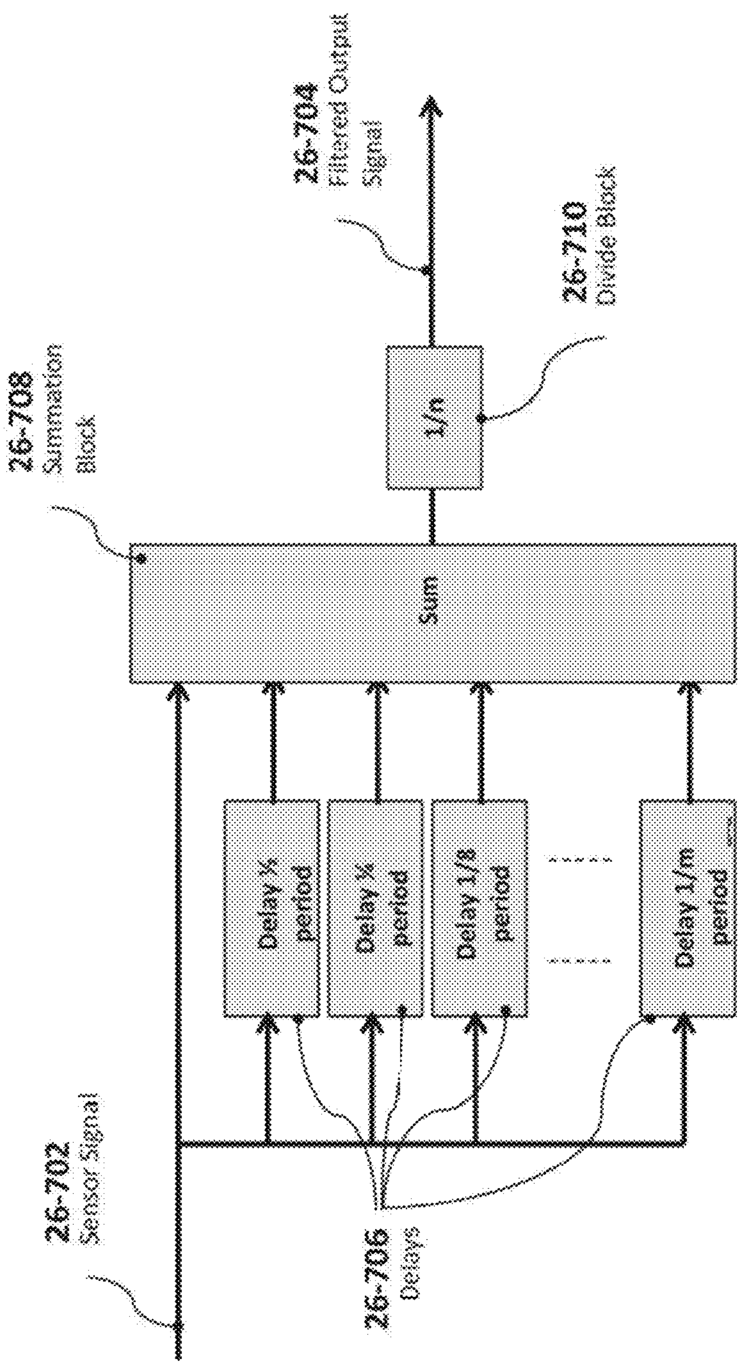

The particular embodiment of a filter described above is well known to those skilled in the art and was constructed in a way shown in FIG. 119. In this embodiment, a sensor signal 26-702 is split into more than one components, which in turn are delayed by half the period they are designed to remove by using transport delays 26-706, which can be implemented in an analog or digital fashion. The resulting signals are then added together in the summation block 26-708, and divided by the total number of components in the divide block 26-710. The resulting filtered output signal 26-704 will now be sharply notched at the frequencies desired, as can be seen from the Bode representation of this filter in FIG. 115.

In FIG. 115, curve 26-302 represents the Bode magnitude (in the top half of the plot) and phase (in the bottom half) of the filter thus constructed. Like any filter, it exhibits some group delay, as can be seen in the phase representation; this group delay must be taken into account in the following steps.

The filter used for the purpose described above is in no way constrained to be a filter of the kind described in the example above. It should be understood that any type of filter that allows filtering out specific periodic elements from the differentiated sensor signal is a valid alternative to the one presented here.

Applying a filter as described above to the expression in Equation 3 results in removing the component of the error signal that is correlated with the actual signal, since it will be attenuated by the filter. This yields $$V_{measured,filtered} \approx V_{actual,filtered} + \left(\frac{\delta(e_u)}{\delta t}\right)_{filtered} = V_{actual,filtered}6 + \text{noise} \qquad \text{EQUATION 4}$$

We find that the result is a filtered estimate of the actual velocity, along with a "noise" term that represents any error uncorrelated to the position signal. If we assume that the actual signal will in general not have any component that is correlated with the original sensor signal (in the example case, the angular position), and if we average over a sufficiently long time interval and a sufficiently broad range of operating points, the filtered actual signal is approximately equal to the actual signal delayed by the group delay in the filter, as expressed by Equation 5:

$$V_{measured,filtered} \approx V_{actual,filtered} \approx V_{actual,delayed} \qquad \text{EQUATION 5}$$

Note that this approximation is valid even if the actual signal exhibits content that is partially correlated to the original sensor signal, or correlated in a non-linear way. This will simply mean that more averaging is required to make the statement true.

As a next step we can use a transport delay, described by block 26-612 in FIG. 118, with a delay equivalent to the approximate group delay in filter 26-614, to create a delayed version of the measured velocity. This can be written as:

$$V_{measured,delayed} = V_{actual,delayed}\left(1 + \frac{\delta e_c(P_{actual})}{\delta P_{actual}}\right) + \text{noise} \qquad \text{EQUATION 6}$$

If we now divide the result of Equation 6 by the result of Equation 5 to obtain the following:

$$\frac{\Delta e_c}{\Delta P_{actual}} \approx \frac{\delta e_c(P_{actual})}{\delta P_{actual}} = \left(\frac{V_{measured,delayed}}{V_{measured,filtered}} - 1\right) + \text{noise} \qquad \text{EQUATION 7}$$

$$\Delta P_{actual} = \Delta P_{measured} - \Delta e_c \qquad \text{EQUATION 8}$$

$$\Delta e_c \approx (\Delta P_{measured} - \Delta e_c)\left(\frac{V_{measured,delayed}}{V_{measured,filtered}} - 1\right)$$

$$\Delta e_c \approx \Delta P_{measured}\left(1 - \frac{V_{measured,filtered}}{V_{measured,delayed}}\right)$$

These operations are shown in FIG. 118, and the end result is the output of 26-608, which in this example provides the incremental position error as a function of the measured position.

Figure 114:
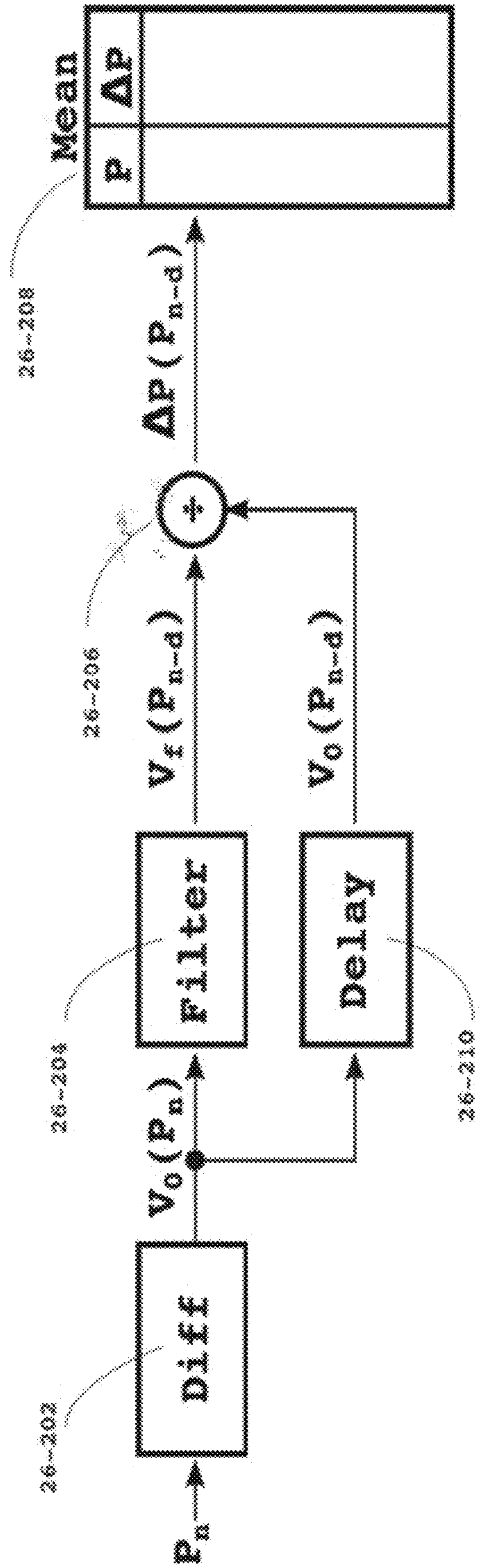
FIG. 114 shows the flow diagram of the encoder calibration algorithm

FIG. 114 shows a flow diagram for the process described here. The sensor signal Pn is differentiated in block 26-202 to create the measured differential signal, for example by using discrete-time differentiation algorithms. The resulting signal is put through a filter 26-204 and also through a delay 26-210, and the results of each of those calculations are divided by each other in block 26-206. The output of this is the position error, which is stored in table 26-208 representing the mapping algorithm in this simplified case.

Any entry in this table at a given position is then averaged over time in order to remove the effects of any uncorrelated error signal. After only a few averages, the table then may contain a very good estimate of the actual calibration error as a function of the measured signal.

The entire calculation is run in an asynchronous way, meaning the output of the calculation does not affect the sensor reading at the present time step. Instead, once the buffer 26-208 may contain enough averages, the correction is simply added at each time step to the measured signal, thus removing any latency that would be present if we simply filtered the signal through a time-based filter at any step. By averaging the correction over many cycles, we remove any uncorrelated error from it, which would be impossible with simple filtering.

The correction mechanism described above can be adapted in many different ways in order to improve its outputs. First of all, the mechanism should be applied only in operating ranges where the sensor exhibits strong correlated errors, defined as the component of the sensor signal error that is directly correlated with the sensor signal itself, and in operating ranges where the sensor does not exhibit strong correlation between the actual signal and the signal itself. For example, if there was significant motion in a manner always correlated with the sensor's output position reading, then this correlated motion signal would cloud the sensor calibration as described above.

In many cases, the algorithm described above can simply be used only in the operating ranges where the signal is deemed good, and can be stopped at all other times. In one embodiment, the calibration routine is run above a certain angular velocity, to ensure many signal updates from the position sensor, and below a second angular velocity, to ensure that the sensor readings are valid and not skewed due to other factors.

In another embodiment, the calibration algorithm can also be run during an initial time period and then stopped once enough data is collected to create a trustworthy mapping table. In another embodiment, the update rate of the mapping table depends on the operating range of the system; for example, the update rate could be fast while the system is in an operating range where the sensor signal is deemed valuable, and slower in an operating range where the sensor signal is less useful or trustworthy.

In another embodiment, the mapping algorithm can be run on data acquired over a period of time, and not run during operation of the sensor. The calibration parameters thus obtained can then be used in real-time operation of the mapping algorithm, without the asynchronous part of the method running in real-time.

Another advantage of this calibration technique is the fact that it can work well even in the presence of significant uncorrelated noise. If the noise is correlated to other factors but not the signal itself, then its contribution will quickly be averaged out if the sensor is spanning a large enough portion of its operating range.

In many sensor applications, the sensor signal is necessary during a portion of the operating range of the system, and is less needed in other portions. By way of example, it is well known by those skilled in the art that an angular position sensor in a rotary electric motor is needed to obtain good performance from the commutation algorithm, especially at very low angular velocities. At the same time, for this kind of system it is also common to use model-based estimation of the angular position, which can deliver very good accuracy at higher angular velocities of the system due to the effects of the counter-electromotive force, which become more pronounced at higher velocities. It is in fact often true that at these higher velocities, the angular position estimate from the model-based ("sensorless") calculation is more reliable and accurate than the position sensor output, which at high velocity often suffers from excessive lag and low resolution.

Figure 116:
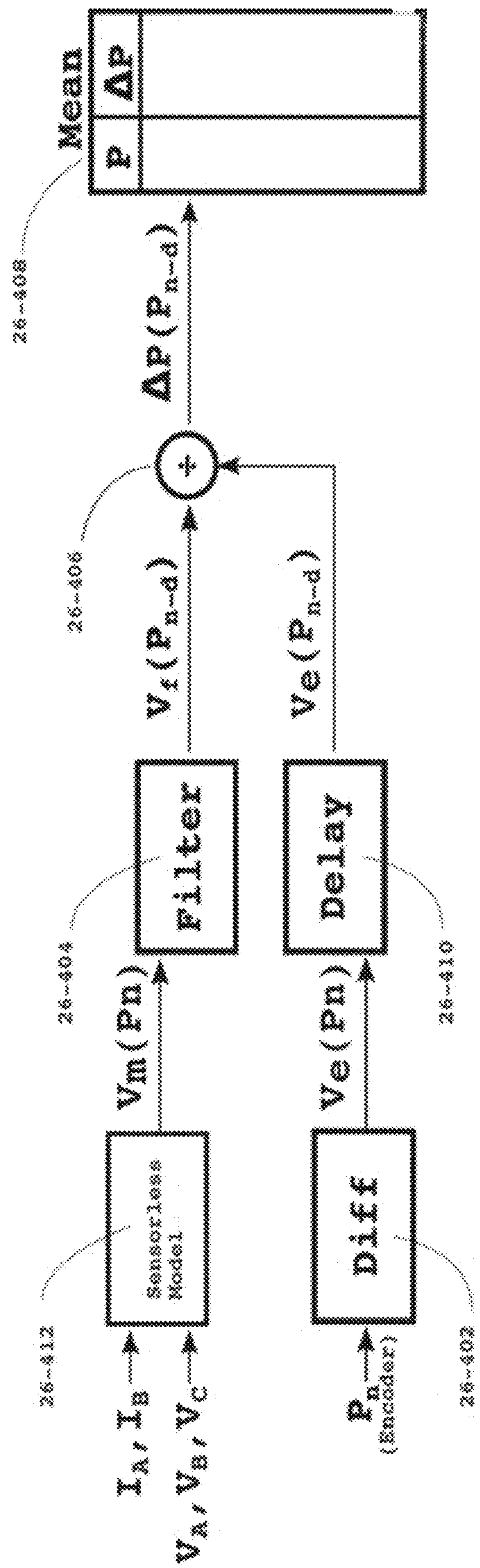
FIG. 116 shows the flow diagram of the calibration algorithm in the presence of a model-based position estimate.

This is a good example that can be used to explain the reasoning behind the following inventive method. FIG. 116 shows a simple representation of this aspect, whereby a sensor signal defined as above is differentiated in block 26-402 and then delayed in block 26-410 by a transport delay that is substantially equal to the group delay in filter 26-404. A set of sensor signals from other sensors not directly correlated with the signal we are trying to calibrate are then used to feed a model 26-412. The model output signal is then fed into the filter 26-404, which operates in a similar way to the notch filter described above. The outputs of filter 26-404 and the delay 26-410 are then compared to each other in block 26-406, yielding entries into the mapping table 26-408.

Figure 117:
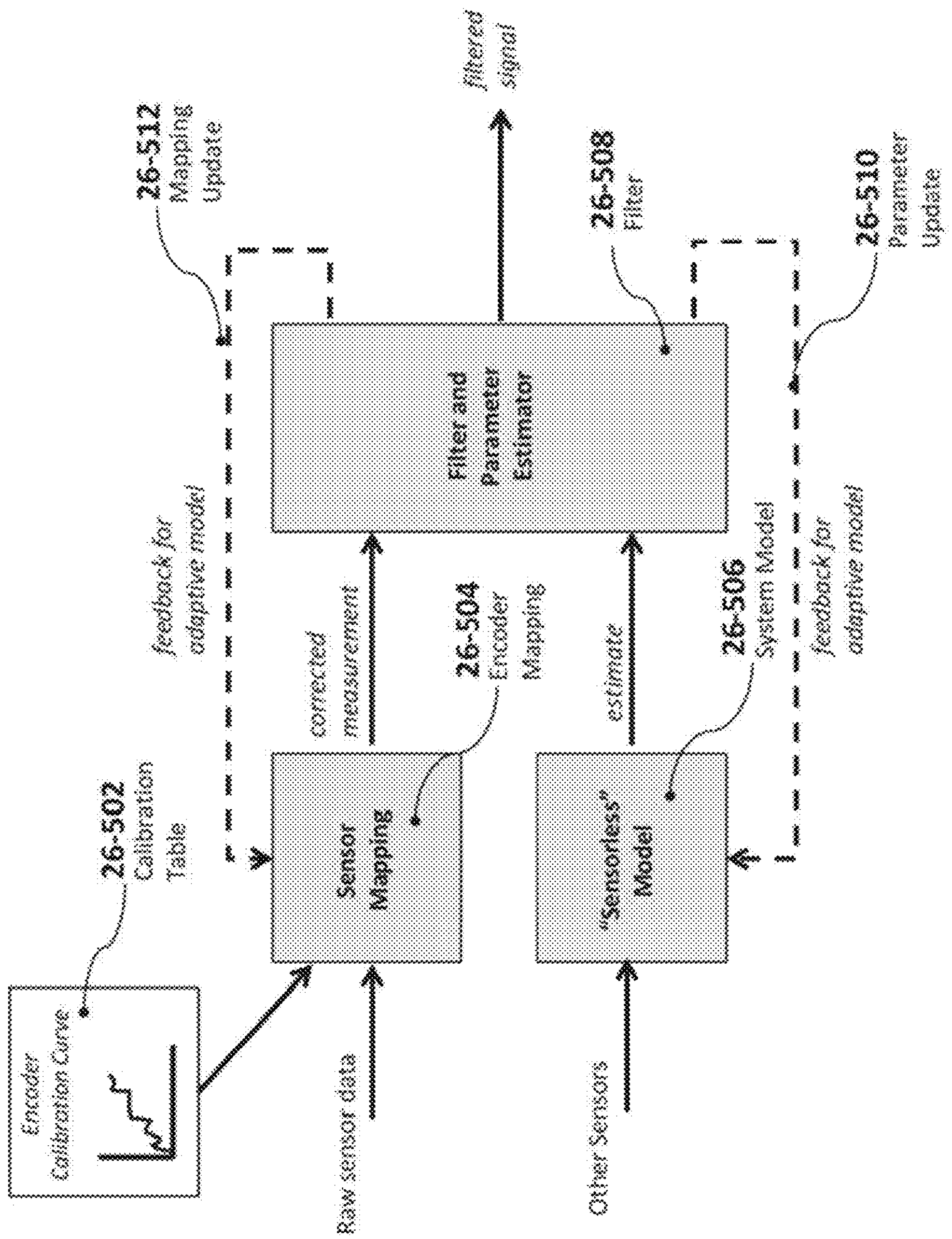

A more generalized embodiment of the method might have the schematic layout shown in FIG. 117. Here an encoder calibration table 26-502 might be generated with the method described previously, and is used as an input into the encoder mapping algorithm 26-504, which converts raw sensor data into corrected measurements.

Other external sensors, which might in general not be directly correlated with the measurement, and could include, in the case of an electric motor, such quantities as currents measured on the motor windings, voltages across the phase legs of the motor, duty cycles of the switches in a PWM scheme for controlling motor winding voltage, and others, are used as inputs to a model of the system 26-506. In the case of an electric motor, this is commonly done and often called "sensorless" technique, but it could more generally represent any model that allows for an estimate of the measurement being calibrated.

Both the corrected measurement resulting from the sensor mapping algorithm 26-504 and the estimate resulting from the model calculation 26-506 are then fed into a filter and parameter estimation block 26-508. This block takes care of multiple functions. First and foremost, it combines the estimated and measured (and corrected) signals to provide the best possible sensor output signal. This might be done for example through averaging, filtering, or selecting of the two signals. In one embodiment, the filter block might implement a bled filter, whereby the one signal is high-pass filtered and the other is low-pass filtered, if there is a significant difference in the quality of the two signals at different frequencies. This can for example be the case if one of them is based on acceleration measurements, and the other on position measurements, in which case the acceleration-based signal will be more reliable at high frequencies and the position-based one more reliable at low frequencies. In a different embodiment, the filter block may choose to blend the two signals through a weighted average, whereby the weighting factors on each signal change as a function of operating range. For example, if the one signal was based on an electric motor model and was more accurate at higher speeds, and the sensor was a position signal and thus more accurate at lower speeds, then the filter might average the two values with weighting factors that would be low for the position signal at high speeds, and low for the model-based signal at low speeds.

Many other embodiments of this filter are possible, and are too numerous to list here but are in general well-known techniques. They include Kalman filtering, blend filtering, and simple techniques such as selecting one of the two signals at each given time depending on external information.

Two other outputs result from the filter block 26-508. The first output is the parameter update 26-510 for the system model 26-506. This output might follow for example Kalman filter techniques, whereby the system model is used as the predictor, and part of the filter block as the corrector. This allows for updating of the model parameters based on the actual sensor, wherever the actual sensor is trustworthy and is deemed well calibrated.

The remaining output of the filter block 26-508 is the mapping update 26-512. This output is used to update the sensor mapping algorithm by using information from the system model where this is deemed more reliable than the corrected sensor signal. In this manner, the system model can provide a good calibration to the raw sensor in a range of operation where the raw sensor is not trustworthy, and the corrected sensor can provide a calibration for the system model at times when the system model is not trustworthy.

This scheme can in general be applied to many different sensor systems, in situations where there is a sensor of inferior quality, and an estimate that is not always reliable, There, the method described herein can help solve both problems by calibrating the sensor, and using its information to improve the system model.

While the present inventive method has been described mostly using the example of rotary position sensors, it is understood by the inventors that the method applies to many other types of sensors with the enabling information in this document.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The method described here can be used in conjunction with predictive inertia compensation in systems where rotary inertia is a concern. In order to cancel inertia effects, a high quality sensor signal is important and in general this requirement would lead to increased cost. Using the inventive methods described here, this cost can be contained and the results improved by calibrating a lower quality sensor and improving its accuracy, thus making it useful for the purposes of predictive inertia cancellation.

The inventive methods described here have a lot of synergy with active ripple cancellation techniques in systems that combine hydraulic motor/generators and electric motors. In order to electronically reduce the effects of the inherent torque ripple in the hydraulic motor/generator, it is imperative to have a good position signal that allows for correct timing of the ripple cancellation intervention. With a lower quality sensor, this is not possible and thus can cause increased cost without the methods and systems described here.

The synergy is also very important in the other direction, because in a system where the hydraulic motor and the electric motor are operatively tightly coupled, the hydraulic pressure ripple will cause velocity fluctuations that are periodic with the angular orientation of the motor, or more precisely, with a multiple thereof that is related to the number of lobes in the hydraulic pump. These fluctuations can have a significant negative impact on the functionality of the sensor calibration algorithm described here, since they will not average out easily. This might lead to a poor sensor calibration, and thus a poor overall performance. In the presence of torque ripple cancellation however, the overall amount of velocity fluctuations may be less at some operating points, and the components due to torque ripple will be known and can thus be subtracted off the sensor signal.

Multi-Path Fluid Diverter Valve

Some aspects of the system relate to a passive valve that contains a free flow mode and a diverted bypass mode in order to protect the hydraulic pump (including hydraulic motors) in a back-drivable hydraulic system from overspinning. Other aspects relate to velocity activated flow control valves that redirect fluid at a given flow rate. Other aspects relate to passive valving for use in an active suspension system for vehicles.

Generally, except where context indicates otherwise, references to a first port are synonymous with a first inlet or inlet port, a second port are synonymous with a first outlet or free flow port, and a third port are synonymous with a second outlet or bypass port, unless otherwise specified in particular embodiments herein.

Furthermore, the following is a list of definitions of relevant terms, specifically pertaining to but not limited to the descriptions of FIGS. 139A-149B. These definitions are intended to help the reader understand the terms used in the description of embodiments herein, and should not be considered to limit the terms. For example, the concept of the pair of effective projected pressure areas being substantially equal may simply mean that the two pressure areas are of roughly equal area, or other definitions that may suffice depending on the embodiment.

transition between modes encompasses, without limitation, the transition regime of the diverter valve as the movable sealing element moves from its first mode to its second mode.

(sealing) manifold assembly encompasses, without limitation, the various elements of the diverter valve assembly that are not part of the movable sealing element and that do not move with respect to another during the transition between the first and second modes.

assembly encompasses, without limitation, a grouping of physically connected parts. An assembly may include voids or passages that are fully or partially fluid filled and are created by the interaction of these solid components.

surface (area) encompasses, without limitation, an area of a part that is at least partially outlined by physical features of the component such as edges, holes, passages, etc.

all surfaces encompasses, without limitation, a number of surfaces that combined make up all the surfaces responsible for forming a volume, such as a solid component, a cavity, a flow passage, etc.

section encompasses, without limitation, a portion of a surface area or of a volume that may not be outlined by any physical features. A section may also refer to entire parts, surfaces, or assemblies of several parts or surfaces. If a surface or volume is divided into several sections, each of these sections is unique such that no two sections share part of the same surface or volume.

all sections encompasses, without limitation, a number of sections that combined make up a full surface, or volume, or a combination of unique surfaces or volumes.

Functionally important sections are sections that may contain features that are at least partially responsible for forming a fluid passage, for forming an effective sealing surface with the movable sealing element, a section of the movable sealing element, a flow restriction etc. Several elements may share common features.

axial direction encompasses, without limitation, the direction of travel of the movable sealing element when transitioning between the first and second modes. In many embodiments of the diverter valve, the axial direction is collinear with the axis of rotational symmetry of the movable sealing element.

axial travel position encompasses, without limitation, the relative position of the movable sealing element with respect to its sealing manifold assembly. Also referred to herein as axial spool position for any embodiment of the spool type diverter valve.

transition stroke encompasses, without limitation, the path the movable sealing element describes as it travels between its first and second mode.

facing towards the first port encompasses, without limitation, an area is understood to face towards the first port if all axial components of the normal vectors of this surface point from the second to the first mode of the movable sealing element.

facing towards the second port encompasses, without limitation, an area is understood to face towards the first port if all axial components of the normal vectors of this surface point from the first to the second mode of the movable sealing element.

projected (fluid) pressure area encompasses, without limitation, the projection of a surface section of a component of the diverter valve assembly that is entirely exposed to fluid and entirely stands in primary fluid pressure communication with the same flow path, onto a plane that is perpendicular to the axial direction of travel of the movable sealing element. In the case where the surface section is entirely in contact with the fluid that entirely stands in primary fluid pressure communication with the same flow path or pressure level there are two possible opposing types of projected pressure areas: the first type that accounts for any surface regions of a given surface section that face towards the first port, and the second type that accounts for all surface regions of a given surface section that face towards the second port. Any regions of a surface section for which the axial component of their normal vectors is zero do not contribute to either of those two types of projected pressure areas. Special care is preferably taken to properly calculate the projected pressure areas of any surface section that is partially or fully exposed to any fluid volume that each respectively stand in primary fluid pressure communication with one or more fluid paths. In such cases, the projected pressure areas of such surface sections need to be determined separately, independently considering each of their surface sections that stand in primary fluid pressure communication with the same fluid path or pressure level. The resulting projected pressure areas cannot be easily combined into a single combined projected pressure area, or a pair of opposing combined projected pressure areas.

effective (projected) (fluid) pressure area encompasses, without limitation, the net resultant projected fluid pressure area of all the surface sections on a part in communication with a discrete flow path or a discrete fluid volume.

individual (fluid) flow passage encompasses, without limitation, the fluid filled chamber with a single fluid entry port and a single fluid exit port wherein the volume of fluid that that enters is equal to the volume of fluid that exits and there are no internal features that would cause the fluid volume to be split into multiple smaller fluid volumes within the confines of this chamber. effective (fluid)

flow passage encompasses, without limitation, a set of individual flow passages that combine to form a larger flow passage between a single entry flow port and a single exit flow port such that if a fluid volume was passed through this flow passage, it would split multiple smaller volumes and then combine into a single fluid volume within the confines of the chamber before passing through the single exit flow port.

(fluid) flow path encompasses, without limitation, the path travelled by a fluid volume through a flow passage that is equal to the set of paths that a substantial portion of the fluid volume describes as it passes through the set of all individual flow passages between its entry and exit flow ports of an effective fluid passage.

main (fluid) flow path encompasses, without limitation, the first path that leads from the first port to the second port, or the second main flow path that leads from the first port to the third port. The first main flow path is active in the first mode of the diverter valve and in some embodiments also in the second mode as well as during the transition between the first and second modes. The second main flow path is only active during the second mode and, in some embodiments of the diverter valve, to a varying extent during the transition between the first and second modes.

main (fluid) flow passage encompasses, without limitation, the two flow passages that create the two main flow paths within the diverter valve assembly.

wetted area encompasses, without limitation, a section of a surface that is fully in contact with fluid.

effective (fluid) flow area of an individual flow passage encompasses, without limitation, the effective flow area of an individual flow passage at any point along the flow path between its entry and exit ports which is equal to the minimum wetted area projected on a plane that passes through this point such that the plane is perpendicular to the direction of the flow path effective (fluid) flow area encompasses, without limitation, the effective flow area of a flow passage at any point along the flow path between its entry and exit ports which is equal to the sum of the effective flow areas of the individual flow passages that form the effective flow passage at this point.

(fluid) flow restriction encompasses, without limitation, a section of a flow passage along the flow path wherein the effective flow area of the fluid path is smaller than the effective flow area of the fluid path in a section immediately before or after this section of the flow passage. Flow restrictions with smaller effective flow areas, longer sections of flow constriction, or that experience fluid passing through at higher rates of flow generally affect more substantial changes in fluid pressure between their entry and exit ports and are called more restrictive.

substantial (fluid) flow restriction encompasses, without limitation, a section of a flow passage along a flow path wherein the flow passage is substantially more restrictive than the section of the flow passage immediately before or after the section. The change in pressure across a substantial flow restriction may substantially account for the overall change in pressure between the entry and exit ports of the flow path.

fluid chamber encompasses, without limitation, a section of a flow passage that either lies between two substantial fluid flow restrictions, between the entry port and a first substantial flow restriction, or between a final substantial flow restriction and the exit port. If there is no substantial flow restriction along a flow passage, the entire flow passage may also be considered a fluid chamber.

fluid (pressure) communication encompasses, without limitation, a flow passage between a fluid cavity and a main flow passage or a substantial flow restriction within a main flow path of the diverter valve. In some embodiments it also encompasses, without limitation, fluid flow passages between functional elements. In such embodiments, the flow path between the first and second ports can also be referred to as the fluid communication path the between the first and second ports.

primary fluid (pressure) communication path encompasses, without limitation, any fluid chamber or cavity that shares at least one surface section with the movable sealing element that has at least two fluid pressure communication paths. In some fluids chamber or cavities of this type, at least one of the fluid pressure communication paths has a substantially larger effective fluid flow area than the others. Any such fluid pressure communication paths are also called primary fluid communication paths.

first (fluid) flow restriction encompasses, without limitation, an embodiment of a substantial flow restriction in which, for most embodiments of the diverter valve, it encompasses, without limitation, the only substantial flow restriction along the main flow path between the first and second ports during the first mode.

effective annular (fluid) pressure area encompasses, without limitation, in several embodiments of the diverter valve, the main flow path between the first and second ports includes a central opening at the center of a rotationally symmetric movable sealing element. In some of these embodiments, the first flow restriction between the first and second ports is at least partially formed by the surfaces at or near the inner diameter of the movable sealing element wherein the effective projected pressure area of the movable sealing element is sometimes referred to as the effective annular pressure area of the spool.

net (fluid) pressure force encompasses, without limitation, the sum of all fluid pressure forces acting on all sections of a surface, a combination of sections, the entirety of a surface of a solid component, or of an element. Generally referring to the sum of fluid pressure forces acting on at least a small surface section of the movable sealing element in the direction of travel of the movable sealing element when transitioning between the first and second modes.

net (external) force encompasses, without limitation, the sum of all external forces of a related type acting on all sections of a surface, on a combination of sections, on the entirety of a surface of a part, or element. Generally referring to the sum of all forces of that same related type acting on at least a small surface section of the movable sealing element in the direction of travel of the movable sealing element when transitioning between the first and second modes.

net force balance encompasses, without limitation, the sum of all substantial external forces acting on a part or an assembly within the diverter valve assembly. The types of external forces considered for this net force balance generally include any net pressure forces acting on the part or assembly, any biasing forces such as forces due to any number of compressed spring elements, inertial forces due to acceleration, gravity etc. In most contexts herein, a net force balance encompasses, without limitation, the sum of all substantial external forces acting on the movable sealing element in the direction of travel of the movable sealing element when transitioning between the first and second modes.

variably damped encompasses, without limitation, the situation where the damping level of an element experiences varies throughout its motion. In most contexts herein, variably damped encompasses, without limitation, position dependent damping of the movable sealing element such that at any two positions during its transition stroke between the first and second modes, there can be different levels of damping.

smooth pressure response encompasses, without limitation, a characteristic change in the differential pressure between any combination of the three main flow ports of the diverter valve during the transition between the first and second modes as compared to just before entering and immediately after exiting that transition mode. A pressure response between two of these ports can be considered smooth if the change in differential pressure across these two ports with respect to time during the dynamic transition between the first and second mode is similar to the change in differential pressure across the same two ports with respect to time immediately before or immediately after entering the transition mode. In the case where multiple diverter valves are used in combination with multiple dampers, a smooth pressure response can refer to a force response of at least one of the dampers during the transition of any of the diverter valves that are part of that system such that the change in force with time immediately before and immediately after the transition between modes of the diverter valve is similar to the change in force with time during the transition of modes of that diverter valve.

Figure 120A:
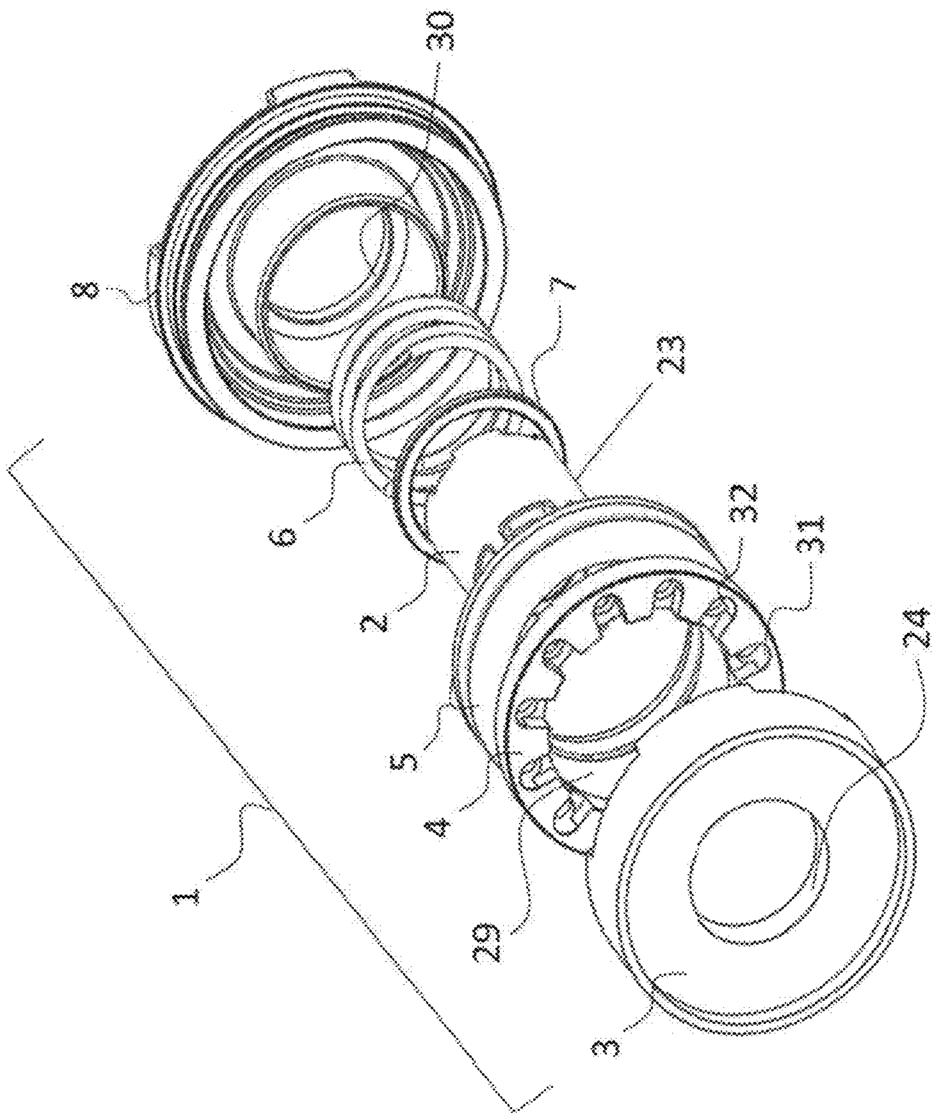
Figure 120B:
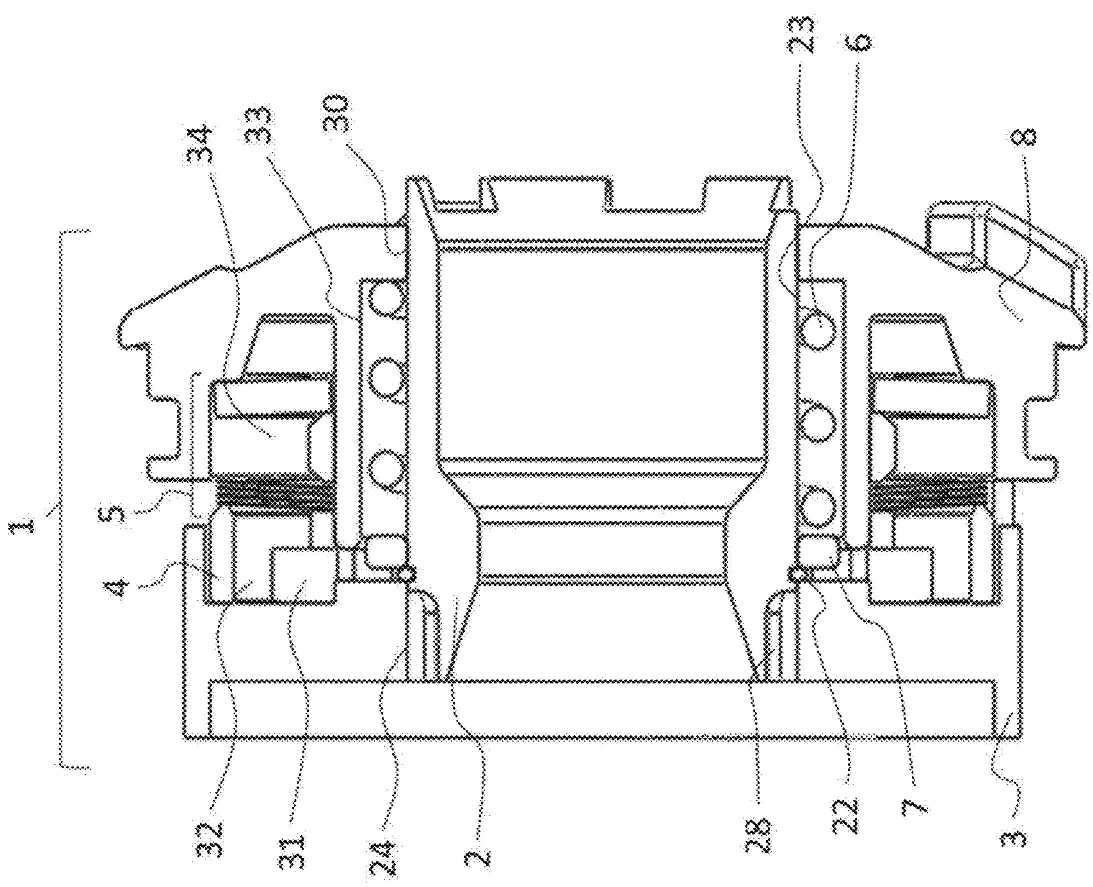

Regarding FIGS. 120A and 120B, a spool type compression diverter valve (CDV) assembly 1 with radial sealing is disclosed.

CDV 1 consists of a valve support 8, a spool valve 2, a valve seal plate 3, a manifold plate 4, a blow off valve (BOV) assembly 5, a valve spring 6, a spring support 7, and a snap ring 22 (the valve support 8 and the manifold plate 4, collectively a manifold). The spring support and snap ring can be manufactured as an integral part of the spool valve 2, and the multi-path fluid diverter valve methods and systems described herein are not limited in this regard.

In FIG. 120B the same spool type embodiment of a compression diverter valve 1 is shown in the assembled state.

The valve support 8 locates the manifold plate 4, via the bore 29 of the manifold plate 4, thereby ensuring that the axis of the manifold plate 4 is co-axial with the axis of the valve support 8. The manifold plate 4 in turn locates the seal plate 3 via the same bore 29, thereby ensuring that the axis of the manifold plate 4 is co-axial with the axis of the seal plate 3. The manifold plate 4 is axially located against the seal plate 3 by the BOV stack 5 that is sandwiched between the valve support 8 and the manifold plate 4 with a pre-load. The BOV stack 5 could be in the form of a damping valve such as a digressive flexible disk stack. The BOV stack 5 creates a BOV cavity 34. The spool valve 2 is located between the bore 30 of the valve support 8 and the bore 24 of the seal plate 3. In the free state, the spool valve 2 is held in the 'un-activated' free flow mode, i.e. the first mode, position with a force element, here a pre-load by means of the valve spring 6 creating, a closing force against the spring support 7, and snap ring 22 that is positively held in the spool valve 2. The said spring force reacts against the valve support 8 so that the snap ring 22 is held firmly against the seal plate 3. The manifold plate 4 contains a plurality of passages 31 disposed around the bore 29 of the manifold plate 4 that are on fluid communication with a plurality of holes 32 that are placed in the manifold plate 4, so that there is fluid communication between the bore 29 of the manifold plate 4 and the faces of the manifold plate 4. The valve spring 6 is located in a spring cavity 33 in the valve support 8. The spring cavity 33 is in fluid communication with the bore 29 of the manifold plate 4, and hence the passages 31 and holes 32 in the manifold plate 4. The BOV assembly 5 blocks fluid flow from the holes 32 in the manifold plate and the BOV cavity 34 until a predetermined pressure differential is reached, this being the BOV cracking pressure. The flow/pressure characteristic of the BOV assembly 5 being tuned to a specific curve, this curve may be a digressive curve. The BOV assembly 5 may act as a check valve and block fluid flow from the BOV cavity 34 to the holes 32 in the manifold plate 4 regardless of the pressure in the BOV cavity 34. An orifice may be placed between the BOV cavity 34 and the spring cavity 33 so that the pressure between the BOV cavity 34 and the spring cavity 33 will equalize, if there is no or little flow between them.

As the spool valve 2 strokes toward the activated position, the spring support 7 moves in the bore that forms the spring cavity 33 of the valve support 8, displacing fluid from the spring cavity. The outside diameter of the spring support 7 may be a close fit to the spring cavity bore to restrict flow of the displaced fluid, thereby damping the motion of the spool valve. The fluid restriction may be sized so as to dampen any spool valve oscillations that may occur during its operation while not adversely affecting the response of the spool valve. The spring support 7 may be a separate component as shown, or may be formed as an integral part of the spool valve 2. The fluid restriction may be in the form of an annular gap between the outside diameter of the spring support 7 and the bore of the spring cavity 33, or by a slot or notch etc. that is formed into the spring support 7.

Figure 121:
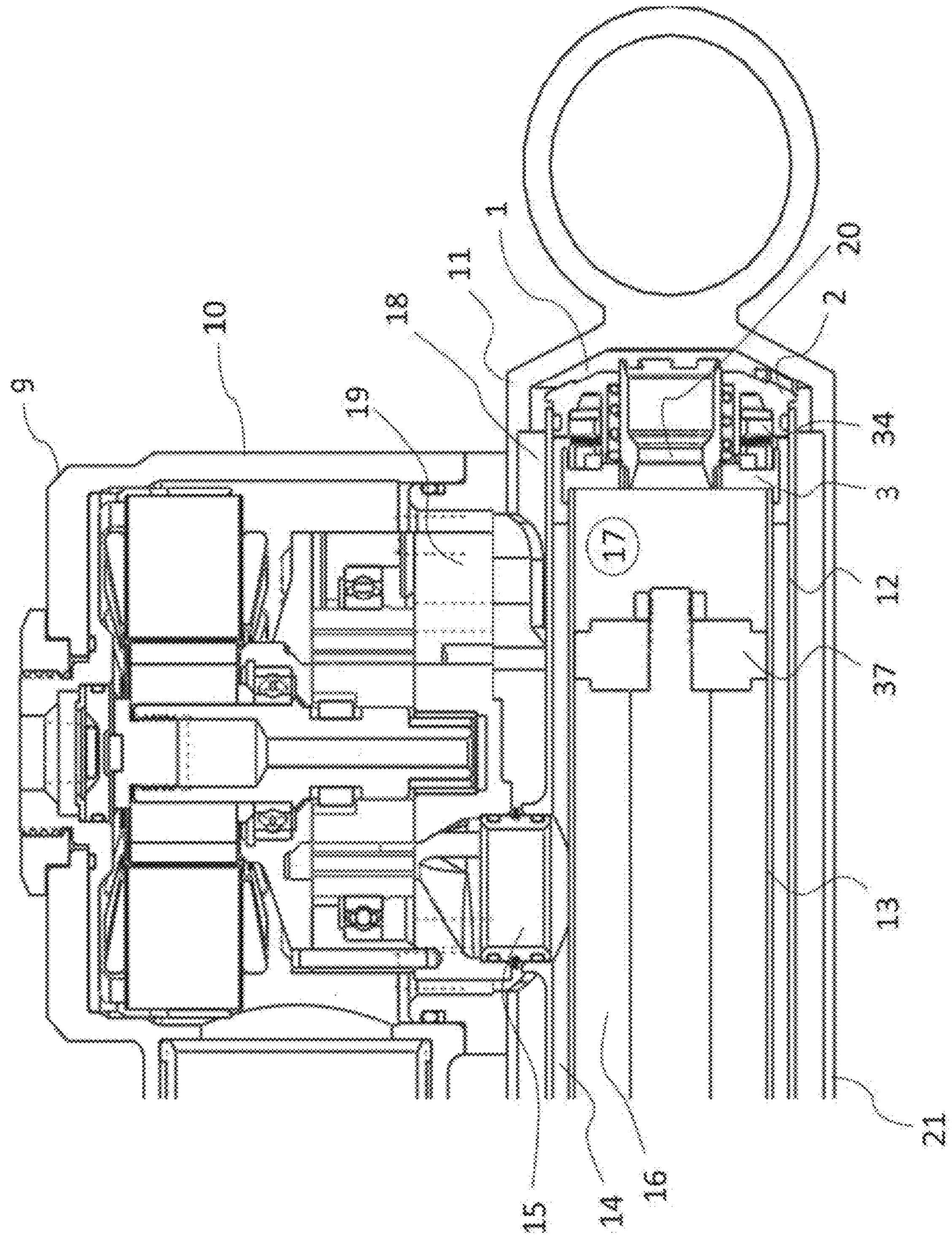

In FIG. 121, a regenerative active/semi active damper 9 that consists of a hydraulic regenerative, active/semi active damper valve 10, and a pressure charged triple-tube damper assembly 21, containing an embodiment of a compression diverter valve 1, is shown.

The valve support 8 is held concentric to the damper body 11 and locates the damper middle tube 12. The seal plate 3 locates the damper pressure tube 13, and creates a first annular flow passage 14 that is in fluid communication with the first port 15 of the hydraulic pump/motor of the hydraulic valve 10 and the rebound chamber 16. The first annular flow passage 14 is also in fluid communication with the BOV cavity 34. The seal plate 3 caps off the compression chamber 17. The middle tube 12 seals on the valve support 8, and creates a second annular flow passage 18 that is in fluid communication with the second port 19 of the hydraulic pump/motor of the hydraulic valve 10 and the compression chamber 17 via the concentric orifice through its axis 20 in the spool valve 2. While the orifice is called a concentric orifice, the invention is not limited to orifices that travel through the center. It may be offset, skewed, and other suitable shapes, sizes, and locations. Concentric in this disclosure typically means it is contained within a moveable sealing element irrespective of specific location within.

A piston 37 is disposed in the pressure tube so as to create a first chamber and a second chamber, wherein the first chamber is the rebound chamber 16 and the second chamber is the compression chamber 17.

Figure 122:
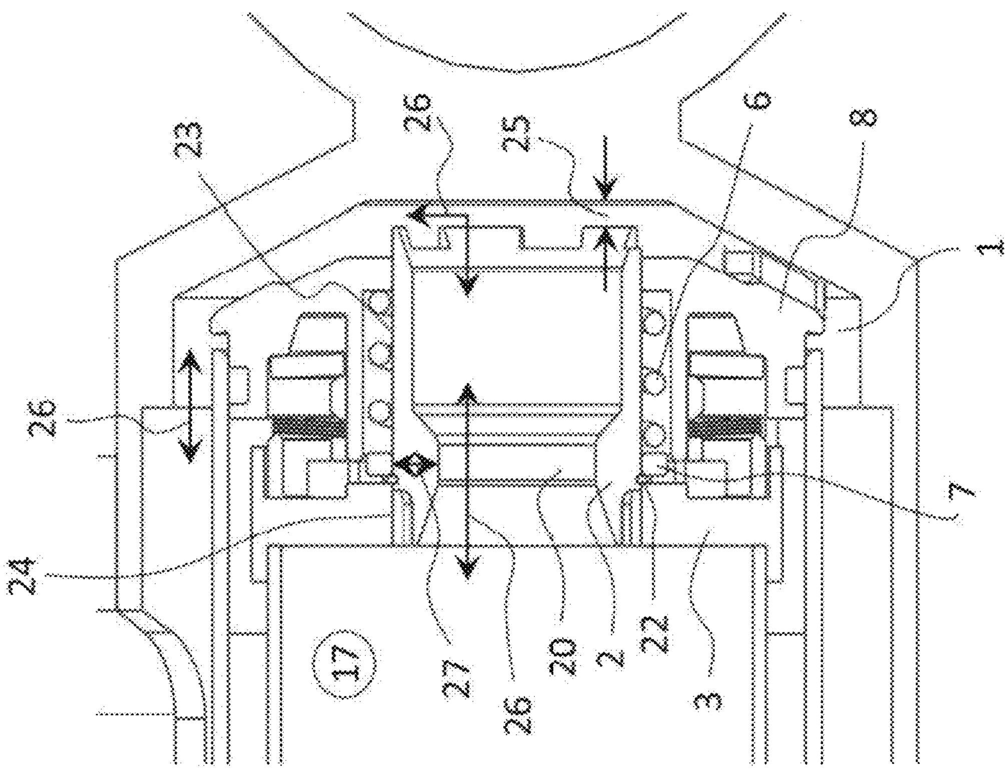

Referring to FIG. 122, a compression diverter valve in the 'un-activated' position is shown.

In the position shown in FIG. 122, the spool valve 2 is held in the 'un-activated' first mode position by the pre-load of the valve spring 6, and when in this position the full uninterrupted outside diameter 23 of spool valve 2 is located within the bore 24 of the seal plate 3, the diametrical clearance between the full outside diameter 23 of spool valve 2 and the bore 24 of the seal plate 3 is such that any appreciable fluid flow from the compression chamber 17 is blocked from passing through the bore 24 of the seal plate 3. Fluid can flow from the compression chamber 17 through a first port that is defined by the bore 24 of the seal plate 3, through the concentric orifice 20 of spool valve 2, through a second port, the annular gap 25 that exists between the end of the spool valve 2 and the damper body 11, into the second annular flow passage 18 and hence into the second port 19 of the hydraulic pump/motor of the hydraulic valve 10, and vice versa as shown by flow arrows 26. Whereby the concentric orifice 20 creates a first fluid restriction.

As fluid flows from the compression chamber 17 through the concentric orifice 20 of spool valve 2 to the second port 19 of the hydraulic pump/motor of the hydraulic valve 10, a pressure drop is created that acts upon the projected area 27 of the spool valve 2 to create a net axial force on the spool that opposes the force from the valve spring 6. The force generated by the said pressure drop is proportional only to the said fluid flow from the compression chamber 17 to the second port 19 of the hydraulic pump/motor of the hydraulic valve 10, and is unaffected by any pressure differential that may exist between the compression chamber 17 and the rebound chamber 16. The spool valve 2 will remain in the un-activated first mode position until the said net axial force acting on the spool valve 2 from the said pressure drop generated by the fluid flow from the compression chamber 17 to the second port 19 of the hydraulic pump/motor of the hydraulic valve 10, is equal to that of the force from the said pre-load from the valve spring 6. Once the said net axial force becomes greater than the force from the said pre-load, then the spool valve will move away from the seal plate 3 toward the valve support 8, thereby reducing the annular gap 25.

If there is no flow from the compression chamber 17 to the second port 19 of the hydraulic pump/motor of the hydraulic valve 10, then no said net axial force will occur, regardless of any pressure differential that may exist between compression chamber 17 and the rebound chamber 16, and the valve will remain in the un-activated first mode position. This is due to the fact that with no flow, the force from fluid pressure acting on both sides of the moveable spool valve 2 may be configured to be approximately equal and opposite.

When there is fluid flow from the second port 19 of the hydraulic pump/motor of the hydraulic valve 10 to the compression chamber 17 via spool valve 20, then a pressure drop is created that acts upon the projected area 26 of the spool valve 2 to create a net axial force on the spool that is complimentary to the force from the valve spring 6 and will ensure that the spool valve 2 will remain in the un-activated first mode position.

The diametrical clearance between the full outside diameter 23 of spool valve 2 and the bore 30 of the valve support 8 is such that any appreciable fluid flow from the spring chamber 33 to the annular gap 25, and vice versa, is blocked.

Referring to FIG. 123, a CDV in the 'activated', second mode, diverted bypass position is shown.

When there is sufficient flow from the from the compression chamber 17 to the second port 19 of the hydraulic pump/motor of the hydraulic valve 10, the said pressure drop will generate a sufficient net axial force to move the spool valve 2 toward a second mode position so that fluid flows from the first port to a third port that is created by the flow notches 28, that are disposed around the outside of the valve spool diameter 23. This will generate a fluid passage from the compression chamber 17 through the bore 24 in the seal plate 3 to the spring cavity 33, as shown by flow arrows 35. Fluid can now flow from the compression chamber 17 through the bore 24 in the seal plate 3 to the spring cavity 33 into the passages 31 and holes 32 in the manifold plate 4. If the differential between the pressure in the holes 32 and the pressure BOV cavity 34 is greater than the said predetermined cracking pressure of the BOV assembly 5, then there will be fluid flow from the holes 32, and hence the compression chamber 17, and the BOV cavity 34, and hence the rebound chamber 16, creating a by-pass flow. As the valve spool 2 moves to the second mode position, the annular gap 25 will decrease and the flow from the compression chamber 15 to the second annular flow passage 18, and hence the second port 19, will become restricted. A predetermined flow rate from the from the compression chamber 17 to the second port 19 of the hydraulic pump/motor of the hydraulic valve 10, will generate a sufficient net axial force to move the spool valve fully to the activated state (a diverted bypass second mode) whereby the annular gap 25 is fully closed, then flow from the compression chamber 17 to the second port 19 of the hydraulic motor will be forced to flow through the small passages 36 that exist in the end of the valve spool 2. In some embodiments the annular gap 25 may only partially close during the activated state in order to allow additional flow from the compression chamber 15 to the second port of the hydraulic motor 19. The passages 36 will then create a second fluid restriction from the compression chamber 17 to the second port 19. The flow restriction of the passages 36 and the pressure/flow characteristic being such that when the said predetermined flow rate from the compression chamber 17 to the second port 19 is reached and the valve spool fully activates to the second mode, the flow from the compression chamber 17 to the second port 19 will remain mostly constant at this predetermined value, and any additional fluid flow from the compression chamber 17 will now pass through the valve spool 2 via the notches 28, through the BOV assembly 5 and hence to the rebound chamber 16, by-passing the second port 19 of the hydraulic pump/motor of the hydraulic valve 10. In this state, the pressure differential between the compression chamber 17 and the rebound chamber 16 is now a function of the flow through the BOV assembly 5, and the pressure/flow curve of the BOV assembly 5. In some embodiments, this BOV functionality may be eliminated to allow free passage or an alternative restriction to the rebound chamber 16.

In this activated second mode state, the CDV will now limit the flow to, and hence the speed of, the hydraulic regenerative, active/semi active damper valve 10, and the damping force generated being controlled passively by the pressure/flow curve of the BOV assembly 5, thereby protecting the regenerative, active/semi active damper valve 10 from overspeeding during high speed compression damper events.

Although this embodiment refers to a compression diverter valve it is anticipated that the damper may have a similar valve in the rebound chamber so as to offer protection from overspeeding during high speed rebound damper events, and the multi-path fluid diverter valve methods and systems described herein are not limited in this regard.

Figure 124:
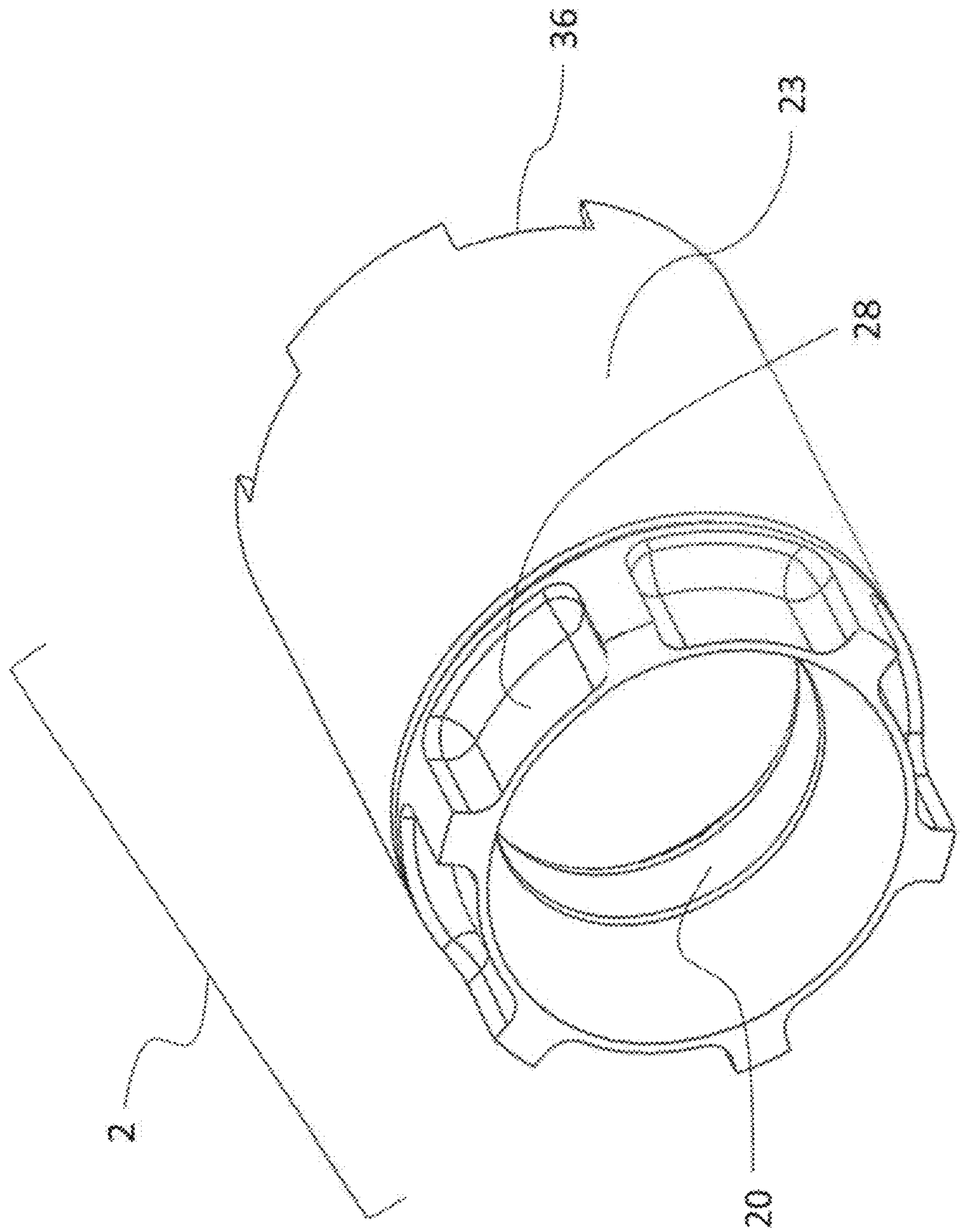

Referring to FIG. 124, the spool valve 2 is shown in detail to show the flow notches 28 and the flow passages 36.

The flow notches 28 in the spool valve 2 can be positioned and sized so that fluid flow can only occur between the compression chamber 17 and the spring cavity 33 once a predetermined annular gap size 25 is achieved. The rate at which fluid can flow between the compression chamber 17 and the spring cavity 33 with reference to spool position can be accurately controlled by the shape of the notches and/or by staggering the number of notches that become active with spool position, so as to modulate and smooth the action of the spool valve 2 as it transitions from the un-activated first mode state to the activated state second mode. This will smooth out any force spikes that may occur due to the transition between these states.

Figure 125A:
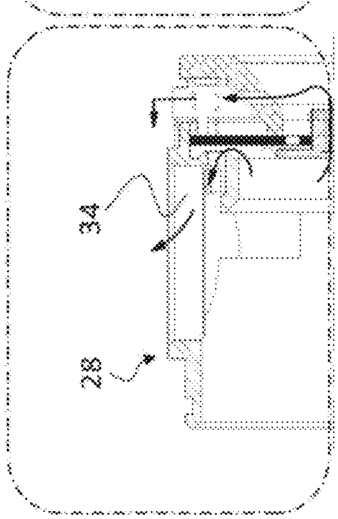
Figure 125B:
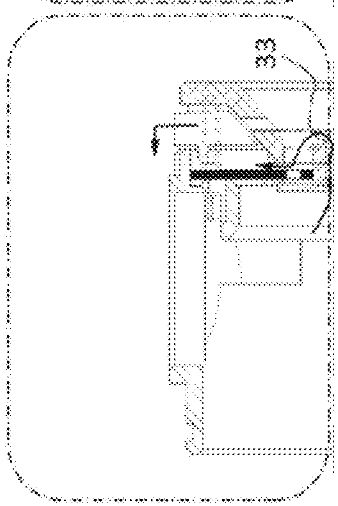
Figure 125C:
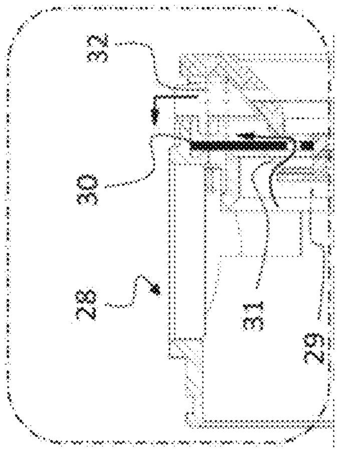

FIGS. 125A-125F shows a diverter valve arrangement with multistage activation. FIGS. 125A through 125C show diverter valve operation that is comparable to FIGS. 125D through 125E, however, via a different embodiment. The basic diverter operation of the embodiment of FIGS. 125A-125F is substantially the same as described previously, however, the operation from free-flow mode to diverted mode occurs in stages.

Figure 125D:
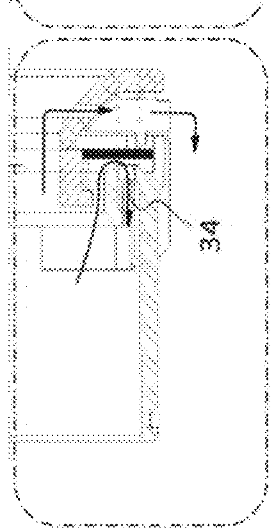
Figure 125E:
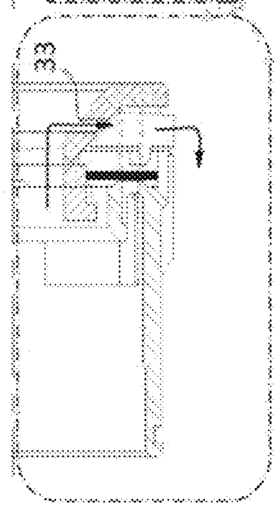
Figure 125F:
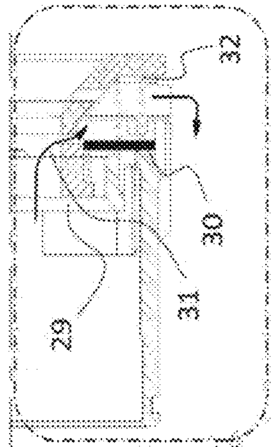

In FIGS. 125C and 125F the diverter valve 28 is in the first mode and flow from either the compression chamber (or rebound chamber) flows through the first port, opening 31, into a second port (a first outlet port) 32. The opening 31 creates a first fluid restriction.

In FIGS. 125B and 125E when a predetermined flow rate is reached, the net force from the flow-induced pressure drop on the first stage valve 29 forces it closed against the spring 31. When the first stage valve 29 closes, flow can no longer pass through the first port, opening 31, and is forced through a second fluid restriction, orifice 33. This will limit the flow that can go to the second port.

In FIGS. 125A and 125D, after the first stage valve 29 is closed, the pressure in the compression chamber (or rebound chamber) will increase due to the restriction offered by the second restriction of orifice 33. This pressure will act upon the second stage valve 30, until the force generated by this pressure overcomes the force of the spring 32. The second valve stage will then open a third port (a second outlet port) 34 and the diverter valve will be in the second mode. This will allow bypass flow to go directly to the rebound chamber from the compression chamber (or vice versa) via the third port 34 bypassing the hydraulic pump/motor.

The force of springs 32 will determine at what pressure the second stage activates and can therefore be tuned to give the desired bypass damping force. Here, the second stage valve may comprise of a stack of flex discs arranged so that the pressure/flow curve can be further tuned to give the desired damping force curve. Several blowoff-valving techniques are known in the art beyond flex disks, and any may suffice. It is oftentimes desirable to have passive damping control over these flow/pressure characteristics in order to perform functional tasks such as smoothing force slope transitions.

By selection of the correct spring forces and spring rates of the springs 31 and 32, it is possible for the second stage valve to slightly open as the first stage closes to give a more progressive transition from the first to second stage operation if so desired.

It is also possible to use more valves and springs, in series or parallel, so as to offer three or more stages of operation.

Figure 126A:
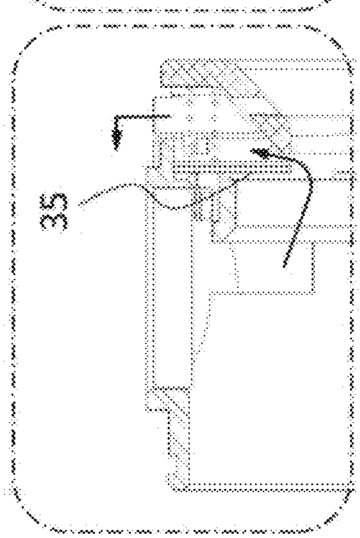
Figure 126B:
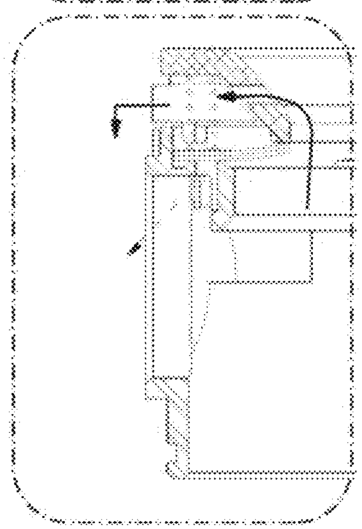
Figure 126C:
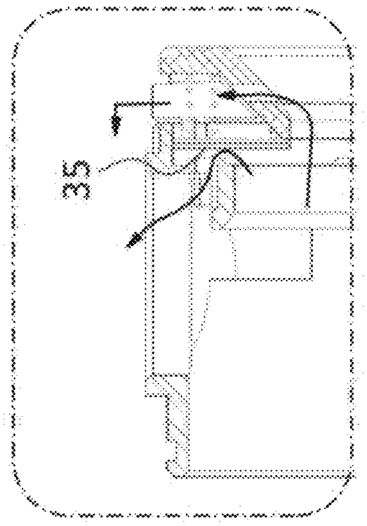
Figure 126D:
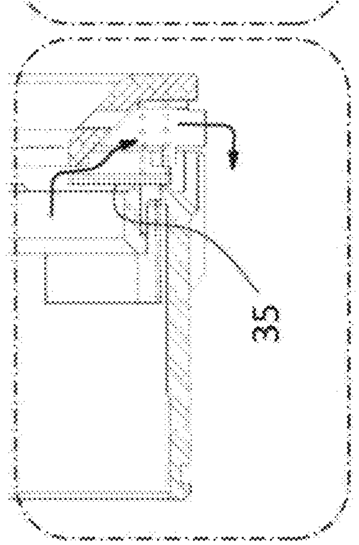
Figure 126E:
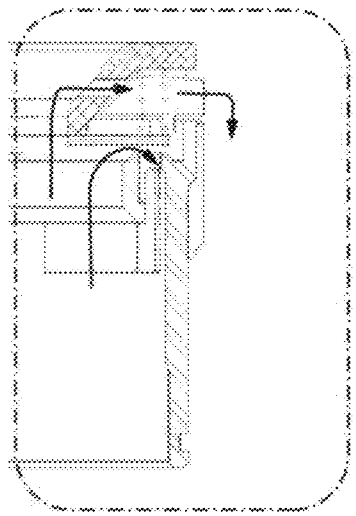
Figure 126F:
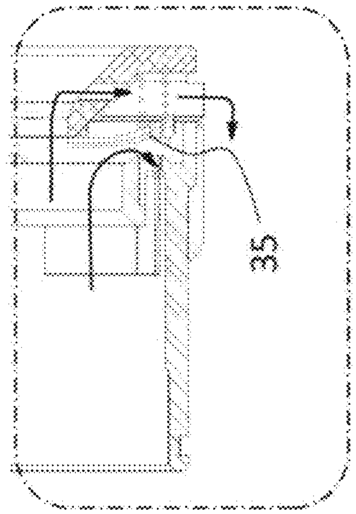

FIGS. 126A-126F shows a diverter valve arrangement with flex disc activation. FIGS. 126A through 126C show DV operation that is comparable to FIGS. 126D through 126E, however via a different embodiment. The basic diverter operation of the embodiments in FIGS. 126A-126F is substantially the same as described in FIGS. 125A-125F, however, the operation from free-flow mode to diverted mode now occurs in in a smooth transition due to the flexure of the flex discs 35.

Figure 127:
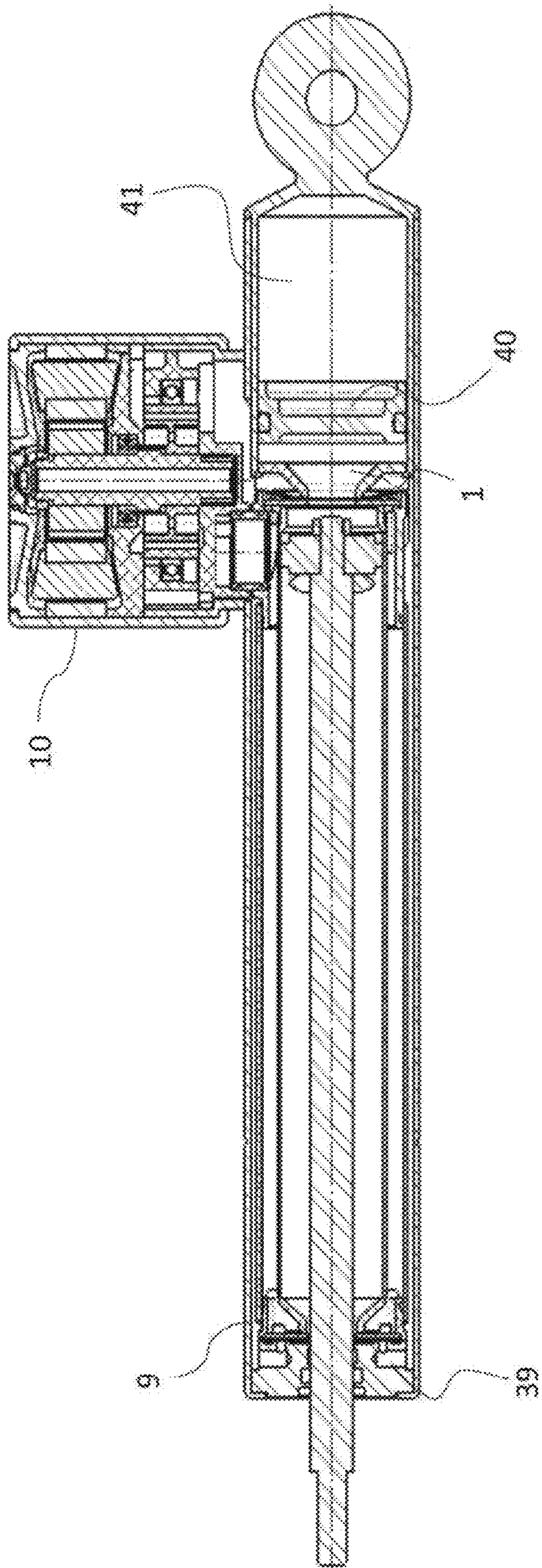

FIG. 127 shows a triple-tube active damper with an internal accumulator and face sealed disc embodiment of a diverter valve arrangement.

The triple-tube active damper consists of a damper assembly 9 and valve assembly 10 that is rigidly attached to damper assembly 9. The valve assembly 10 may contain an electric motor/generator controller that is rigidly attached to it so as to form an electronically controlled "smart valve."

The damper assembly 9 contains a rebound diverter assembly 39 and a compression diverter valve assembly 1. The accumulator floating piston (FP) 40 is located behind the compression diverter valve assembly 1, and the accumulator gas volume 41 is located behind the FP 40 ahead of the damper bottom mount.

Figure 128:
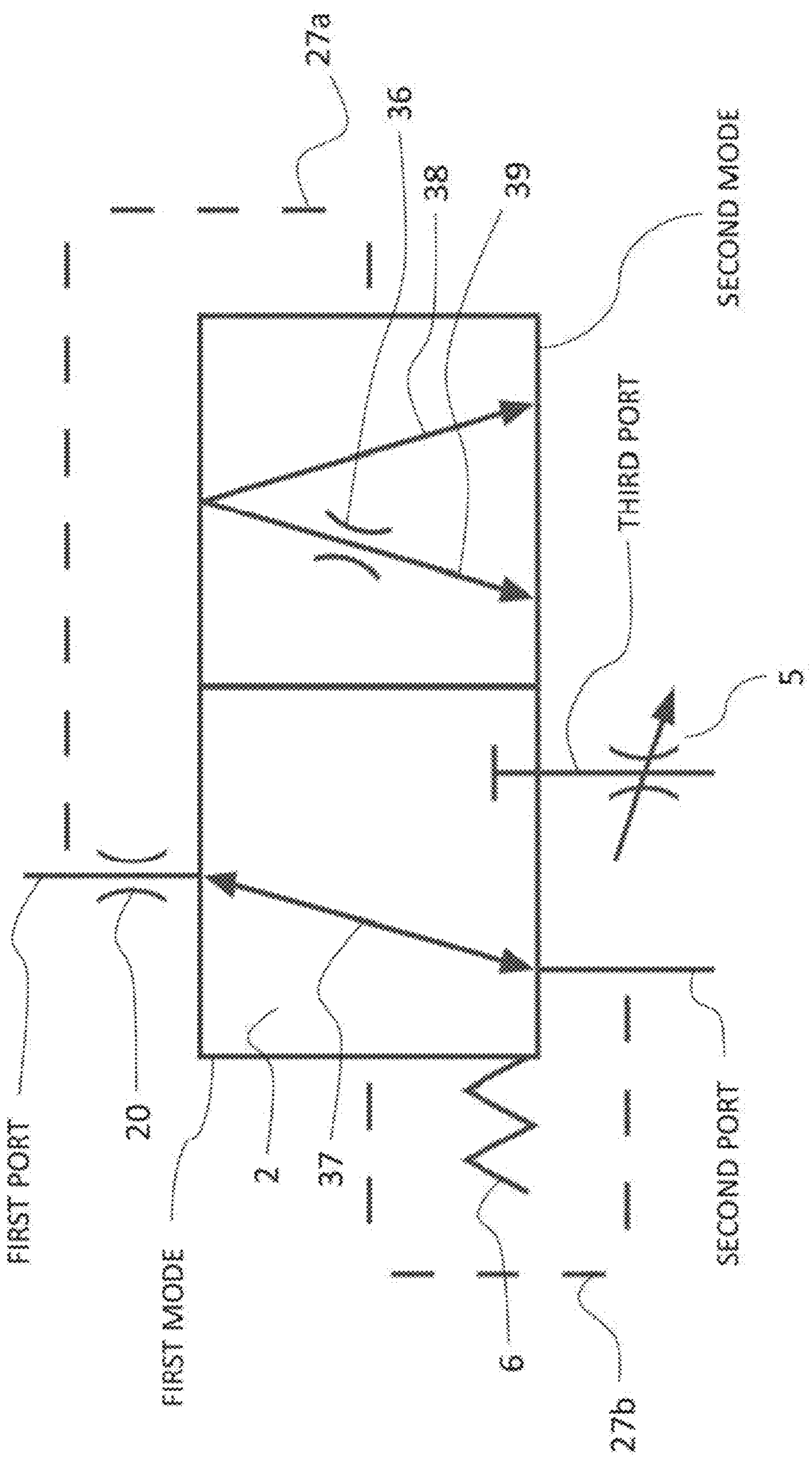

Referring to FIG. 128, the embodiment of a diverter valve is shown schematically. This shows the first port (the inlet), second port (the first outlet port) and third port (the second outlet port), the moveable valve 2 (such as a spool valve), the BOV assembly 5, the pre-load spring 6, the first fluid restriction 20, the pressure acting on the annular area 27*a* (pressure at first port), 27*b* (pressure at second port), the second fluid restriction 36, and the first mode and second mode. The embodiment shows a "free flow" first mode wherein fluid flows through the first port, through the diverter 37, and into a second port (optionally coupled to a hydraulic pump/motor). This fluid path contains a first restriction 20 such that there is a pressure drop from the first port to the second port. When the pressure drop across the fluid restriction 20 creates a pressure differential between the opposing annular areas 27*a* and 27*b* to overcome the pre-load spring 6, the valve 2 switches to a diverted bypass second mode. This pressure drop is partially or wholly fluid flow velocity dependent, making the actuation point flow velocity dependent. In some embodiments the first fluid restriction 20 may be in the fluid path during the first mode only (i.e. the restriction 20 would move to the left double arrowed straight line 37). The first fluid restriction may also be variable based on parameters such as valve mode. In a second mode, fluid is able to pass from the first port to the third port via a fluid path 38. Additionally, in some embodiments fluid may pass from the first port through a second fluid restriction 36, to the second port. Optionally, a blowoff valve 5 or progressive valve stack may be operatively coupled to the output of the third port.

Referring to FIGS. 129, 130, 132, 134 & 136 the rebound diverter valve (RDV) 39 comprises a throttle body 49, a sealing disc 2 and a seal body 3. The seal body 3 is held concentric to the damper body of 11 and locates the damper pressure tube 17. The seal body 3 also locates and seals off a middle tube 12. This may provide a first annular flow passage 14, between the pressure tube and middle tube that is in fluid communication with the first port of the hydraulic pump/motor of the hydraulic valve 10, via a connector tube 43. A second annular flow passage 18, is generated between the middle tube 12 and the damper body of 11 that is in fluid connection to the second port of the hydraulic pump/motor of the hydraulic valve 10. A first port in the diverter valve is created via a bore in the center of the sealing disc 2

In a first mode, the sealing disc 2 is held against the seal body 3 by springs 6, (shown in FIG. 136), exposing a first side of the sealing disc to the pressure in the rebound chamber 16. A first fluid restriction is generated via the relatively small circular flow passage 20 between the second side of the sealing disc 2 and throttle body 49. The seal body 3 also may contain flow orifices 75 that are in fluid communication with the first annular passage 14, and when the sealing disc 2 is held against the seal body 3 by springs 6, the sealing disc 2 blocks off the flow orifices 75, so that no flow exists between the rebound chamber 44 and the first annular passage 14.

A second port is created by flow passages 72 in the throttle body 49 that is in fluid communication with the second annular flow passage 18, and hence the second port of the hydraulic pump/motor of the hydraulic valve 10. Via the first port, the rebound chamber 16 is in fluid communication with the circular flow passage 20, and the flow passages 72 in the throttle body 49, as shown by the flow arrows, 35. Therefore, when the damper is in rebound, fluid flows from the rebound chamber 16, through the first port, through the circular flow passage 20, through the second port of flow passages 72 in the throttle body 49, and to the second port of the hydraulic pump/motor of the hydraulic valve 10, via the second annular flow passage 18, as shown by flow arrows 44 and 26. The relatively small circular flow passage 20 offers a first fluid restriction to this flow, and may cause a pressure drop on the second side of the sealing disc 2 that is proportional to the flow, this may generate a force imbalance across the sealing disc 2, counteracting the preload on the sealing disc from the springs 6. As the rebound flow increases, the pressure drop and hence the force imbalance across sealing disc 2 also increases, until the force imbalance becomes greater than the spring preload, whereby, the sealing disc 2 may start to close toward the throttle body 49. As the sealing disc 2 closes toward the throttle body 49, the circular flow passage 20 decreases in size and hence increases the pressure drop and the force imbalance thereby, causing the sealing disc 2 to close even further, until it becomes fully closed against the throttle body 49, whereby the RDV is in a second mode. The circular flow passage 20 may now be completely closed, as shown in FIG. 132. The RDV is therefore flow activated, and since rebound flow is proportional to rebound damper velocity, the RDV is activated at by rebound damper velocity. By adjusting the preload on the springs 6 and/or the size of the circular flow passage 20, the velocity at which the valve activates can be readily tuned.

When the RDV 39 is in second mode, (as shown in FIG. 132), flow to the second port of the hydraulic pump/motor of the valve assembly 10 is severely restricted, forcing fluid through a second fluid restriction via small orifices 36 in the sealing disc 2, as shown by flow arrows 35. This may limit the speed at which the pump/motor of the assembly 10 rotates when the RDV is activated.

As the sealing disc 20 closes toward the throttle body 49, it moves away from the seal body 3, opening a third port via the small flow orifices 75 that are in fluid communication with the first annular passage 14. This may now allow fluid flow from the rebound chamber 44 to the first annular passage 14, via the small flow orifices 75. As well as being in fluid communication the second port of the pump/motor of the hydraulic valve 10, the first annular passage 14 is also in fluid communication with the compression chamber 17, via flow passages 74 in the CDV throttle body 73, as shown in FIG. 131.

Therefore, when the RDV 39 is in the second mode, it may allow flow from the rebound chamber 44 to two distinct flow paths; the first flow path is to the second port of the pump/motor of the hydraulic valve 10, via the second fluid restriction of orifices 36 in the sealing disc 2, and the second flow path is to compression chamber, via the first annular passage 14, and flow passages 74 in the CDV throttle body 73. Therefore, when in the second mode, the RDV 39 bypasses some flow from the primary flow path—the second port of the pump/motor of the hydraulic valve 10, to a secondary flow path—the compression chamber 17. This has the effect of limiting flow to the pump/motor of the hydraulic valve 10, whilst bypassing flow from the rebound chamber 16 to the compression chamber 17 simultaneously controlling the pressure drop that is generated.

Since the flow to the compression chamber 17 is via the small flow orifices 75 in the seal body 3, the pressure/flow characteristic of this flow path can be readily controlled to provide the desired passive damping coefficient when the damper velocity is at a high enough speed to activate the diverter valve. As well as varying the orifice flow coefficient, the distance that the sealing disc 2 moves away from the seal body 3 can be varied to vary the flow coefficient. Also, the sealing disc 2 may constructed of a stack of flex washers (as opposed to one, stiffer, washer) that can vary the opening to the small flow orifices 75, due to flexure of the flex washer stack under increasing pressure in the rebound chamber. These types of valves are well known in the art and the multi-path fluid diverter valve methods and systems described herein are not limited in this regard. Due to the flexibility of how the passive damper coefficient can be tuned, the passive damper coefficient can be higher than the maximum damper force generated by the hydraulic regenerative, active/semi active damper valve 10, or lower than the minimum damper force generated by the hydraulic regenerative, active/semi-active damper valve 10, or anywhere in between, as shown in FIG. 138.

When the sealing disc 2 is held against the seal body 3 by springs 6, the small flow orifices 75 in the seal body 3 present an area on the second side of the sealing disc 2, and any pressure differential that exists between the first annular passage 14 and the second annular passage 18 (due to the pressure differential between the rebound and compression chambers due to the damper force), may generate a force on the sealing disc due to the area presented on the second side of the sealing disc. This force may act in parallel to the force imbalance on the sealing disc 2 from the flow through the first fluid restriction, and by controlling the pressure differential between the first annular passage 14 and the second annular passage 18, the force imbalance, and hence the activation point, on the RDV can be controlled. Since the differential between the first annular passage 14 and the second annular passage 18 is controlled by the hydraulic regenerative, active/semi-active damper valve 10, the damper velocity at which the RDV activates from the first mode to the second mode can now be controlled by varying the damper force via the hydraulic regenerative, active/semi-active damper valve 10. The loading on the hydraulic regenerative, active/semi active damper valve, 10 can be accurately controlled so as to smooth out the transition to passive damping when the RDV activates, thereby improving the ride quality of the damper.

Since the passive damper coefficient after the RDV has been activated can be readily tuned to be either greater or lower than the maximum damper force, and the damper velocity at which the RDV activates can be controlled by the hydraulic regenerative, active/semi active damper valve, a broad damper force curve, similar to that shown in FIG. 138 can be achieved, whereby; the activation velocity at max damper force is shown by point 76, the activation velocity at min damper force is shown by point 79, and the curve 77 represents the maximum tuned passive damping coefficient after the RDV has activated, and the curve 78 represents the minimum tuned passive damping coefficient after the RDV has activated. The area 79 between the maximum and minimum tuned passive damping coefficient curves 77 and 78 respectively, is the broad range to which the passive damping coefficient can be tuned, to suit any particular application. One method for tuning this damper force-velocity characteristic at damper velocities larger than the activation velocity 80, within the tuning range of maximum and minimum passive damping coefficient curves 77 and 78, is by tuning the pressure-flow characteristic of the diverter valve BOV 5, in this case of the RDV.

When the damper is in compression, fluid may flow from the second port of the hydraulic pump/motor of the hydraulic valve 10, through the second annular flow passage 18 into the rebound chamber 44. Fluid may be in communication from the compression chamber 17 to the first annular passage 14, via the CDV 1. The pressure in the compression chamber 17 may be proportional to the compression damping force, and this pressure may be present at the small flow orifices 75. Due to the area exposed on the sealing disc 2 from the small flow orifices 75, the compression chamber pressure may generate a separating force on the sealing disc, counter-acting the preload placed on the sealing disc 2 from the springs 6. Once the separating force becomes greater than the preload force, the sealing disc 2 may start to move away from the seal body 3, allowing fluid to flow from the first annular passage 14 (and hence the compression chamber 17) to the rebound chamber 16. This may limit the pressure that can be achieved in the compression chamber, and thereby the RDV may now act as a compression BOV, when the damper is in compression. Although the diverter valve offers blow-off functionality, it might be desirable to use another BOV acting with, or instead of, the diverter valve BOV. This other BOV could be in several forms, and the patent is not limited in this regard.

Referring to FIGS. 131, 133, 135 & 137; the compression diverter valve (CDV) 1 operates in a similar manner to that of the RDV 39, and operates to limit the pump/motor speed of the hydraulic valve 10 when the damper is at high compression damper velocities, and to provide a broad passive compression damper coefficient after the CDV has been activated, as well as to act as a rebound BOV limiting the maximum rebound pressure when the damper is in rebound.

Although the damper architecture shown in the above figures is that of a monotube arrangement, the valving described above can be used in a hydraulic regenerative, active/semi-active damper valve that is incorporated in a twin tube or triple tube damper architecture, and the multi-path fluid diverter valve methods and systems described herein are not limited in this regard.

For purposes of clarity, the following is a list of figure elements and their respective references in this disclosure and the figures, specifically pertaining to but not limited to FIGS. 139A-139C through 30A-30B:

2—designates the movable sealing element.

6—designates a force element that biases the movable sealing element into the first mode position, such as a spring.

20—designates a surface section(s) on the movable sealing element, at least partially forming the first fluid flow restriction in the fluid path between the first and second ports.

26—designates fluid flow arrow(s) along the main fluid flow path between the first and second ports.

27*a*—designates the projected effective fluid pressure area of the movable sealing element onto a plane perpendicular to the direction of travel of the movable sealing element during the transition between the first and second modes, of any surface sections that stand in primary fluid pressure communication with the flow path between the first and second ports, facing towards the first port.

27*b*—designates the projected effective fluid pressure area of the movable sealing element onto a plane perpendicular to the direction of travel of the movable sealing element during the transition between the first and second modes, of any surface sections that stand in primary fluid pressure communication with the flow path between the first and second ports, facing towards the second port.

27*c*—designates the projected pressure area onto a plane normal the direction of travel of the movable sealing element of an area on the movable sealing element that stands in primary fluid pressure communication with flow path between the first and second ports.

27*d*—designates the projected pressure area onto a plane normal to the direction of travel of the movable sealing element that does not stand in primary fluid pressure communication with the flow path between the first and second ports.

33—designates a fluid cavity comprised of at least one surface section of the movable sealing element.

36—designates the second fluid restriction(s) in the fluid path between the first and second ports that is generally substantially negligible during the first mode. During the transition between modes, in some embodiments, this second flow restriction may consist of two distinct flow restrictions:

36*a*—a first flow restriction that becomes more restrictive during the transition between the first and second modes and less restrictive in the reverse transition as a function of axial stroke position of the movable sealing element and:

36*b*—designates a second flow restriction that behaves in reverse manner to the first flow restriction 36*a* by becoming less restrictive during the transition between the first and second modes and more restrictive in the reverse transition as a function of axial stroke position of the movable sealing element.

36*a*—designates the second fluid restriction(s) in the fluid path between the first and second ports that is generally substantially negligible during the first mode.

45—designates a pressure level near the first port of the diverter valve assembly.

46—designates a pressure level near the second port of the diverter valve assembly.

47—designates a pressure level near the third port of the diverter valve assembly.

48—designates a pressure level primarily in communication with pressure levels somewhere along the flow path between the first and second ports.

50—designates a primary fluid pressure communication passage between a fluid cavity and a fluid flow path.

51—designates label(s) for an effective fluid pressure area acting on the movable sealing element projected onto plane that is perpendicular to the direction of travel of the movable sealing element during the transition between first and second modes.

52—designates the axis of rotational symmetry of the movable sealing element and, in many embodiments, the sealing manifold assembly.

53—designates the sealing manifold assembly that houses the movable sealing element, the first, second, and third ports, any fluid flow paths, fluid flow restrictions and/or fluid flow valves between the first and second ports or between the first and third ports.

54—designates motion arrow(s) indicating direction of travel of the movable sealing element when transitioning between the first and second modes.

55—designates secondary sealing interface(s) between the movable sealing element and the manifold assembly on which it seals, at least partially restricting pressure and flow communication between the first and second ports during the second mode.

56—designates sealing interface(s) between the movable sealing element and the manifold assembly on which it seals, substantially restricting pressure and flow communication between the first and third ports in the first mode.

57*a*—designates a system pressure level in a first fluid chamber of the diverter valve assembly.

57*b*—designates a system pressure level in a second fluid chamber of the diverter valve assembly.

57*c*—designates a system pressure level in a fluid cavity.

58—designates a shaped insert that is a part of the sealing manifold assembly 53 of the diverter valve, at least partially responsible for forming the second flow restriction 36 along the flow path between the first and second ports.

59—designates fluid flow arrow(s) indicating a primary fluid flow path passing through a primary fluid pressure communication path between a fluid cavity and a fluid flow path.

60—designates label(s) for a primary fluid pressure communication passage between a fluid cavity and a fluid flow path.

61—designates an effective fluid flow area of a flow passage between two fluid chambers of the diverter valve assembly.

61*a*—designates the effective fluid flow area of the second flow restriction 36 along the flow path between the first and second ports.

61*b*—designates the effective fluid flow area of the primary pressure communication feature between the spring cavity and another fluid volume within the diverter valve assembly.

62*a*—designates an element of the diverter valve assembly that is either part of the movable sealing element or part of its sealing manifold assembly.

62*b*—designates an element of the diverter valve assembly, separate from element 62*a*, that is either part of the movable sealing element or part of its sealing manifold assembly. If element 62*a* is a representation of its first embodiment, 62*b* is a representation of its second embodiment, and vice versa.

63—designates a reference measurement scale indicating travel position of movable sealing element, fixed with respect to element 62*b*.

64—designates a sealing flow-gap between the movable sealing element and the manifold assembly on which it seals.

65—designates surface section(s) on an element of the diverter valve assembly, at least partially forming a variable fluid flow restriction between two separate elements of the diverter valve assembly that varies as a function of the relative position of these two elements with respect to another.

66—designates a qualitative characteristic curve showing the effective primary fluid flow area between two fluid chambers as a function of travel position of the movable sealing element with respect to the manifold assembly on which it seals.

67—designates a coordinate axis with units of displacement showing the relative travel position of the movable sealing element with respect to the manifold assembly on which it seals.

68—designates a coordinate axis with units of area showing the effective primary fluid flow area between two fluid chambers.

69—designates fluid flow arrow(s) indicating a primary fluid flow path through a primary fluid pressure communication passage between two fluid chambers.

70—designates fluid flow arrow(s) indicating leakage fluid flow path through a sealing gap between two mating fluid sealing surfaces.

71*a*—designates pressure force arrow(s) representing the component of the net fluid pressure force acting on a surface, that is directed along the direction of travel the movable sealing element, towards the first port of the diverter valve assembly.

71*b*—designates pressure force arrow(s) representing the component of the net fluid pressure force acting on a surface, that is directed along the direction of travel the movable sealing element, towards the second port of the diverter valve assembly.

Referring to FIG. 139A, a schematic of a spool type diverter valve is shown in or near the first mode position of the spool type movable sealing element 2. The direction of travel of the spool during the transition between the first and second modes is indicated by motion arrow 54. The spool 2 is rotationally symmetric about its axis of symmetry 52. The internal bore of the spool 20 forms the first flow restriction in the flow path between the first and second ports, indicated by fluid flow arrows 26. In the first mode position, the spool valve seals radially 56 on its outer diameter with the sealing manifold assembly 53 allowing negligible flow and pressure communication between the first and third ports. In the second mode the spool valve seals at least partially with the sealing manifold assembly on secondary sealing surface 55 which is perpendicular to the axis of symmetry of the spool, at least partially sealing the flow path between the first and second ports. In this embodiment, any fluid communication between the first and second ports when the spool 2 is in the second mode position, passes through the secondary flow restriction along the flow path between the first and second ports 36. In this embodiment, the pressure level near the inlet of the spool 45 is close to the pressure at the first port. The pressure level after the secondary flow restriction along the flow path between the first and second ports 46 is close to the pressure level at the second port. The pressure level just after the primary sealing interface 56 between the spool 2 and the sealing manifold 53 along the flow path between the first and third ports 47 is either similar to the pressure level at the third port, or similar to the pressure level in the BOV cavity. For these conditions to be met during all modes, any other changes in pressure along sections of flow paths within the diverter valve assembly due to elements not explicitly detailed in this schematic (other than a BOV) are assumed to be substantially negligible. Therefore, it is sufficient to interchangeably refer to pressure 45 the pressure at or near the first port, pressure 46 the pressure at or near the second port, and pressure 47 the pressure at or near the third port. The force element that biases the movable sealing element into the first mode position 6 sits in a fluid cavity 33 which stands in primary fluid pressure communication with a pressure level 48 at a point along the flow path between the first and second ports, through a pressure communication element 50. The respective projected pressure areas 27*c* of a particular set of surface sections of the spool 2 onto a plane perpendicular the axial direction of the spool 2 are labeled 51. A unique capital letter A through E is assigned to each surface, as well as a sign (+ or −) depending on whether the respective projected pressure area faces towards the first port (−) or towards the second port (+).

Referring to FIG. 139B, shown is a stack of all projected pressure areas 27*c* A through E with the corresponding relative magnitudes preserved.

Referring to FIG. 139C, shown is the stack of all projected pressure areas 27*c* A through E, as shown in FIG. 139B, grouped by corresponding directional vectors (+) and (−), to form the pair of effective pressure areas 27*a* and 27*b* for the set of all fluid immersed effective pressure areas on the movable sealing element 2 that stand in primary pressure communication with the flow path between the first and second ports. For the embodiment of the diverter valve shown in FIGS. 139A-139C, these two resulting opposing effective pressure areas 27*a* and 27*b* are substantially equal in magnitude.

FIGS. 139A through 139C present a method to determine one of the possible unique pairs of effective projected pressure areas, for one of the unique sets of all surface sections that stand in pressure communication with the same unique flow path or pressure level, for any arbitrary spool type embodiment of the movable sealing element 2. This same or any analogous methods can be used to determine all unique effective projected pressure area pairs for any other embodiment of the movable sealing element 2, as well as for fluid cavities 33.

A unique feature of the spool type embodiment of the diverter valve as shown in the schematic of FIG. 139A, is that any complete sets of all possible fluid-submerged projected pressure areas of all surface sections of this embodiment of movable sealing element, that are not negligible, 27*c* A through E, are entirely only exposed to the pressure levels along a single unique flow path: pressure levels along the flow path between the first and second ports 48. For other embodiments of the diverter valve, the movable sealing element may have any number of unique sets of projected pressure areas that each stand in pressure communication with different unique flow paths or pressure levels. For these different types of movable sealing elements, the pairs of effective projected pressure areas for any of these unique flow paths or pressure levels, need to be evaluated separately.

For a unique set of embodiments of the diverter valve where all possible sets of projected pressure areas from only one pair of effective projected pressure areas, as is the case with the embodiment shown in FIGS. 139A-139C, the following are preferably true:

The primary sealing interface 56 between the movable sealing element 2 and its sealing manifold assembly 53 should establish a radial seal (perpendicular to the direction of travel of the movable sealing element)

any fluid cavities 33 that each share at least a small surface section with the movable sealing element 2, each either stand in primary fluid pressure communication with the flow path between the first and second ports, or each is directed only in the radial direction with respect to the movable sealing element 2, perpendicular to the direction of projection.

For any embodiments of the diverter valve that meet these requirements, the net fluid pressure force acting on the respective movable sealing element 2, depends only on the fluid flow rate passing between the first and second ports and is not substantially impacted by pressure levels that exists elsewhere in the hydraulic system of the diverter valve.

Referring to FIG. 140; shown is a schematic of a spool type embodiment of a diverter valve. The figure elements and descriptions detailed in this schematic are similar to those shown in the schematic of FIG. 139A with some key differences. The fluid cavity 33 which houses the spring element 6 that biases the movable sealing element 2 into the first mode position is not in primary fluid pressure communication with the flow path between the first and second ports, but rather is in primary fluid pressure communication with the flow path between the first and third ports. Due to the radial primary sealing interface 56 between the movable sealing element 2 and its sealing manifold assembly 53, there is substantially negligible flow and pressure communication between the first and third ports during the first mode. The pressure level 47 inside the fluid cavity 33 is substantially equal to the pressure level near the third port 47 or near the effective pressure level inside a BOV cavity. This is because any number of elements, acting as an effective blowoff valve (BOV) along the flow path between the first and third ports during the second mode, may be placed between the primary sealing interface 56 and the flow features that constitute the third port, establishing a substantially different pressure level inside the BOV cavity than may exist at or near the features that constitute the third port of the diverter valve.

In this embodiment of the diverter valve, the two effective projected pressure areas that constitute the pair of effective projected pressure areas that is in pressure communication with the flow path between the first and second ports, are substantially equal in size. Unlike in the schematic of FIG. 139A, these two effective pressure areas 27*a* & 27*b* are not explicitly shown. Instead, all pairs of effective projected pressure areas 27*d* of surface sections that do not stand in primary fluid pressure communication with the flow path between the first and second ports are shown. Each of the individual effective projected pressure areas that constitute these pairs of effective projected pressure areas is labeled 51 with a unique capital letter A & B and a sign indicating the direction each is facing: effective projected pressure area A is facing towards the second port (+), and effective projected pressure area B is facing towards the first port (−), forming a unique pair of effective projected pressure areas that stands in primary pressure communication with a pressure level 47, and is not in primary pressure communication with the flow path between the first and second ports.

If the two areas that constitute a unique pair of effective projected pressure areas are substantially equal in size, the fluid pressure force acting on the part due to those areas in the direction normal to the projection plane is only dependent on effective pressure variations along the section of the fluid path or fluid volume that stands in primary pressure communication with any of the projected pressure areas that substantially contribute the this pair of effective projected pressure areas. If all of these effective pressure variations along this section of a flow path or volume are substantially a function of the volumetric fluid flow passing along this section of a flow path or fluid volume, substantially all effective pressure force acting on the part due to this unique pair of effective pressure areas is substantially only a function of this volumetric fluid flow.

The following is a general set of rules relating a unique effective fluid pressure force acting on a fluid submerged part or assembly due to system pressures acting on any one of the unique pairs of effective projected pressure areas, to the relative sizes of the two effective pressure areas constituting this unique pair of effective projected pressure areas and the respective effective pressures acting over these two effective projected pressure areas: Any substantially equal pair of effective pressure areas that are fully in primary fluid pressure communication with a unique flow path on a fully fluid immersed part, will only generate a pressure force on the part in the direction normal to the projection plane. The pressure force is entirely dependent on the fluid flow rate along the corresponding flow path.

Any pair of effective pressure areas that are fully in primary fluid pressure communication with a unique flow path on a fully fluid immersed part that are not substantially equal will generate a pressure force on the part in the direction normal to the projection plane. The pressure force is partially dependent on the fluid flow rate along that flow path, and partially dependent on the absolute system pressure at some point along that flow path.

Any pair of effective pressure areas on a fully fluid immersed part that are fully in primary fluid pressure communication, are substantially equal, and are at substantially the same pressure level, will generate a pressure force on that part that is substantially negligible.

Any pair of effective pressure areas on a fully fluid immersed part that are fully in primary fluid pressure communication, are not substantially equal, and are at substantially the same pressure level, will generate a pressure force on the part. The pressure force is fully dependent on the pressure level that the effective pressure areas stand in communication with.

For any fully fluid-immersed part or assembly whose surface sections stand in primary fluid pressure communication with any unique flow path and pressure level, any combination of these effects can combine to effectively impart any combination of possible flow and pressure dependencies on the net fluid pressure force acting on the part or assembly.

In most embodiments of the diverter valve, it is desirable to achieve a net fluid pressure force acting on the movable sealing element 2 along its direction of travel during the transition between the first and second modes that substantially depends solely on the fluid flow rate along the flow path between the first and second ports. It is also desirable for the net fluid force acting on the movable sealing element 2 to be independent of other pressure forces within the hydraulic system.

In order for the net fluid pressure force on the movable sealing element, in its axial direction, to be solely dependent on the fluid flow rate between the first and second ports, the pair of effective pressure areas of the movable sealing element that are in primary fluid pressure communication with the flow path between the first and second ports that are projected onto a plane perpendicular to the axial direction of the movable sealing element, should be substantially equal in size. Furthermore, any pairs of effective projected pressure areas of the movable sealing element that are in primary fluid pressure communication with other unique flow paths that each are not sections of the flow path between the first and second ports, such as pressure levels along the flow path between the first and third ports, should be substantially negligible in size. The pressure forces generated by the fluid acting on these areas does not contribute to the net pressure force balance on the movable sealing element in its axial direction. Any remaining pairs of effective projected pressure areas on the movable sealing element that are in primary fluid pressure communication with other unique pressure level that each are not sections of any of the flow paths that have already been accounted for, such as a unique pressure level along the flow path between the first and third ports, should be substantially equal in size, such that they do not contribute to the net pressure force balance on the movable sealing element in its axial direction.

The first embodiment of a spool type diverter valve detailed in the schematic FIG. 139A has a single pair of effective projected pressure areas that are fully in primary fluid pressure communication with the flow path between the first and second ports. The second embodiment of a spool type diverter valve detailed in schematic FIG. 140 has two unique pairs of effective projected pressure areas, one of which is fully in primary fluid pressure communication with the flow path between the first and second ports, the other of which is in primary pressure communication with a unique pressure level along the flow path between the first and third ports and is therefore not in primary fluid pressure communication with the flow path between the first and second ports. The first pair is exposed to an effective range of pressure levels 47 along the flow path between the first and second ports, the second pair is exposed to a unique pressure level 48. The second pair of effective projected pressure areas is represented as B(−) and A(+). The effective pressure force acting on the movable sealing element due to this second pair is substantially negligible.

In order to achieve a flow dependent activation of the diverter valve wherein the transition from the first to the second mode is due solely to the effect of the fluid flow along the flow path between the first and second ports, the net external forces acting on the movable sealing element 2, other than the net pressure force and the opposing force from the effective force element, are preferably kept to substantially negligible levels. These net external forces include but are not limited to inertial forces due to acceleration. Movable sealing element optimized for low effective density and size are preferable for use in environments exposed to substantial acceleration levels, such as certain types of suspension systems.

Referring to FIGS. 139A & 140; in the first mode position of both embodiments of a spool type diverter valve as detailed in the two schematics, the normal vectors of all effective sealing interfaces 56 between the movable sealing element and its sealing manifold assembly are substantially perpendicular to the direction of travel of the movable sealing element 54 in the axial direction.

Referring to FIG. 140; a unique aspect of the specific embodiment of the spool type diverter valve as shown in the schematic is that when the movable sealing element 2 is in the second mode position, the normal vectors of all effective sealing interfaces 55 between the movable sealing element 2 and the manifold assembly on which it seals 53 are substantially perpendicular to the direction of travel of the movable sealing element 54 in the axial direction. Radially sealing interfaces in the second mode position are also possible to achieve with some embodiments of the disc type diverter valve.

Another unique aspect of the specific embodiment of the spool type diverter valve as shown in FIG. 140 is that only the first flow restriction along the path between the first and second ports contributes substantially to the net pressure force balance on the spool during the second mode. This is due to the fact that during the second mode, the normal vectors of the effective sealing interfaces 55 between the movable sealing element 2 and the manifold assembly on which it seals 53 are substantially perpendicular to the direction of travel of the movable sealing element 54. In addition, the secondary flow restriction 36 along the path between the first and second ports becomes active during the second mode. The secondary flow restriction 36 does not contribute to the net pressure force balance on the movable sealing element 2 because the effective change in pressure that is created by the fluid passing through this substantial flow restriction does not act on any effective pressure areas of the spool.

The embodiment of a spool type diverter valve detailed in FIGS. 139A through 123 is substantially similar to the embodiment of a spool type diverter valve as detailed in the schematic of FIG. 140.

FIG. 141 is a schematic of an embodiment of a spool type diverter valve. The figure elements and descriptions shown in this schematic are substantially similar to those shown in the schematic of FIG. 139A. There are several key differences between the two schematics. The schematic shown in FIG. 141 does not show any projected pressure areas. Instead, various possible embodiments of primary pressure communication features 50 are shown. These features communicate pressure between all of any number of unique fluid cavities 33 that each may house spring elements 6 and the main flow path between the first and second ports. For ease of understanding, FIG. 141 depicts a single effective cavity 33 housing a single effective spring element 2. Fluid flow arrows 59 indicate the direction of fluid flow out of the cavity during the transition between the first and second modes. This fluid evacuation or inflow (depending on direction of travel) is caused by the motion of the movable sealing element 2 as it transitions between its first and second mode positions. In this embodiment, the movable sealing element 2 acts to effectively decrease the volume of the spring cavity 33 during the transition from the first mode to the second mode. Conversely, during the transition from the second mode to the first mode, the volume of the spring cavity 33 increases to return its original size.

Some embodiments of the spool type diverter valve shown in FIG. 141 may use several primary fluid pressure communication channels 50 to communicate pressure between the effective spring cavity 33 and the flow path between the first and second ports have at least one channel that is substantially different from the others. This difference can either be in size, position, length, shape, or the pressure level along the flow path between the first and second ports that it communicates the spring cavity 33 with. Those trained in the art may recognize that any combination of fluid communication passages 50 can be functionally replaced by a single flow passage that generates substantially similar transition behavior of the of the movable sealing element 2 with respect to the performance metrics discussed herein.

In the embodiment of the spool type diverter valve detailed in the schematic of FIG. 141 a number of possible fluid pressure communication channels 50 between the spring cavity 33 and the main flow path between the first and second ports are shown. Each is functionally different. Also shown are corresponding fluid flow arrows 59 and labels 60. Each pressure communication channel 50 is uniquely labeled by a capital letter A through D that refers to the effective pressure level at the point along the flow path between the first and second ports that it connects the spring cavity with. Each label 60 also has a value associated with it that represents an angle in units of degrees. Each of these angles refers to the approximate angle that each of the corresponding flow paths of flow entering or exiting the spring cavity 33 through a pressure communication channel 50 describe when joining or diverging from the main flow path between the first and second ports. For example, the flow exiting the spring cavity 33 through flow channel B(90) describes a 90 degree angle in order to align with the main flow path. The flow exiting the spring cavity 33 through flow channel C(0) is already aligned with the main flow path at the point of exit. In the schematic, channels C(90) and C(0) are functionally equivalent since both channels should describe 90 degree angles to align with the main flow path, C(0) internally and C(90) just after exiting the spring cavity 33, and both exit at substantially the same point along the main flow path. The shape and size of channel C(0) is arbitrary at all points along the channel prior to the exit into the main flow path between the first and second ports.

It is assumed that flow paths C(0) and C(90) are referencing substantially equal pressure levels along the main flow path. It is also assumed that any number of spring cavities 33 and spring elements 6 can be combined into an effective single spring element 6 and single spring cavity 33 with a single pressure communication channel 50. The effective spring cavity 33 and effective spring elements 6 are assumed to produce substantially similar transition behavior to an embodiment with multiple spring cavities 33, spring elements 6, and primary fluid pressure communication channels 50, of additively similar design.

The relative placement, size, and angle with respect to the main flow path of the primary pressure communication channels 50 can substantially affect the transition behavior of the valve.

In general, the pressure level along the main flow path that any such primary pressure communication channel 50 communicates to can be manipulated in design to set the activation flow rate of the valve. For any otherwise substantially equivalent embodiment of the diverter valve with a different relative placement of the primary pressure communication channel 50 between the spring cavity 33 and the main flow cavity can have a different activation flow rate. By referencing different projected pressure areas with different pressure levels along the main flow path between the first and second ports, the net biasing force acting on the movable sealing element can be substantially different.

For example, pressure near the second port 46 is assumed to be significantly smaller than pressure near the first port 45 when the flow is going from the first to the second port. Channel A(180) communicates the pressure in the spring cavity 33 with the pressure in the main flow path near the first port 45. Channel D(90) communicates the pressure in the spring cavity 33 with the pressure in the main flow path near the second port 46. A spool 2 with channel A(180) will produce a higher pressure in the spring cavity 33 than a spool 2 with channel D(90). This higher pressure acting on the spool 2 will contribute to the net pressure force the spool 2 experiences and will activate at a higher flow rate.

The pressure at various points in the system is expected to change due to the transition of the valve from the first mode to the second mode. In some embodiments, these pressure changes can be predicted. By communicating the pressure in the spring cavity 33 to a point of predictable pressure change the valve can be tuned to produce a slower, smoother transition from the first mode to the second mode. Fast transitions may be undesirable because they could cause the pressure response of the diverter valve to be drastic. This could produce fluttering of the spool or other undesirable harshness within the system the diverter valve is substantially interacting with.

Another method for setting the desired effective biasing force acting on the movable sealing element 2 is by adjusting the design of the pressure communication channel 50, particularly the angle which it describes in order to join the main flow path. Depending on the point along the main flow path to which the pressure is communicated, a substantial range in exit angles can be achieved by design. For example, channels C(90) and C(0) both exit at substantially the same point along the main flow path, but describe substantially different angles in order to align with the main flow along the flow path between the first and second ports.

A pressure communication channel 50 between the first and second ports can be used to add damping to the transition motion of the spool 2 in order to achieve a smoother pressure response during the transition. This damping is caused by the fluid being displaced from the spring cavity 33 into the main flow path through any numbers of channels 50. The smaller the effective flow area of these effective primary pressure communication features 50, the greater is their damping effect on the movable sealing element during the transition of the spool. The channels 50 are sized to effectively act as flow restrictions. For example, during the transition between the first and second modes, the faster the spool moves, the faster fluid is forced to pass through the effective primary pressure communication channel 50, out of the cavity 33 to join the main flow path between the first and second ports, causing the pressure inside the spring cavity to rise substantially above the pressure level at the exit of the channel. This increased pressure acts on the effective projected pressure area on the surface section of the movable sealing element 2 that is exposed to the spring cavity 33, effectively introducing a pressure force, biasing the movable sealing element into the first mode position, thereby acting to slow its motion towards the second mode position.

These damping effects can be designed to vary as a function of spool 2 position during the transition of modes by letting the effective flow area of the effective primary pressure communication channel 50 vary as a function of the transition stroke position of the movable sealing element.

Another method for achieving a smooth pressure response of the diverter valve during the transition between the first mode and the second mode may involve active elements that are used to control the overall changes in pressure across any combination of flow paths between the three ports of the diverter valve. For example, such an active element could be used to actively control the amount of fluid passing between the first and third ports, thereby controlling the flow passing through the main flow path between the first and second ports. Another such an active element could be a variable flow restriction that replaces the second flow restriction along the flow path between the first and second ports.

Referring to the schematics of FIGS. 142A through 142D, shown are two solid sections of components of the diverter valve assembly 62*a* and 62*b*. One of the two sections is part of the movable sealing element 2 and the other part is part of the sealing manifold assembly 53. It is unimportant which element refers to which feature because the only relevant topic is the width of the effective flow gap between the two elements. Elements 62*a* and 62*b* act to at least partially vary an effective fluid flow area along a flow path as a function of axial travel position of the movable sealing element 2 as it transitions between the first and second modes. Such functional elements may include but are not limited to:

the radial sealing interface that seals against the flow path between the first and third ports during the first mode of the spool type embodiment of the diverter valve (Also see FIGS. 122 through 124).

primary pressure communication channels 50 that communicate the pressure in a fluid cavity that is at least partially formed by sharing surface sections with the movable sealing element 2 with pressure levels either along the flow path between the first and second ports, or any other system levels, the first flow restriction along the flow path between the first and second ports.

the second flow restriction along the first and second ports.

Referring again to FIGS. 142A through 142D; shown is a variable effective flow area 61 between the two parts 62*a* and 62*b*. This area varies as a function 66 of the relative axial 54 position 63 of the two parts 62*a* and 62*b* with respect to one another. The shape of the surface section 65 describes the effective flow area between the two parts and defines an effective sealing gap 64

Position dependent features of the diverter valve assembly that allow for flow restrictions to vary as a function of the transition stroke position of the movable sealing element 2 with respect to the manifold assembly on which it seals 53, allow for several types of settable features that can be designed to achieve desirable transition behavior and can be applied to many types of diverter valve embodiments.

One embodiment of a position dependent feature of this type can be features of the primary sealing interface between the movable sealing element and the manifold assembly 56. These features of the primary sealing interfaces can be implemented as any combination of craved channels, holes, and other types of angled or sculpted surfaces, to let the effective flow area of the flow path between the first and second ports, at the primary sealing interface, change as any function of the axial position of the movable sealing element with respect to the sealing manifold assembly. The flow path between the first and third ports can be made up of any number of unique flow passages and flow features that all serve the same function of directing at least a significant portion of flow entering the diverter valve through the first port to the third port, during the second mode.

Referring to FIG. 143; a schematic of the first fluid restriction 20 is shown along the fluid path between the first and second ports. Motion arrow 54 indicates the axial direction of the movable sealing element 2. For the purposes of discussing this schematic, the movable sealing element 2 may be understood to be of the spool type or of a similar type such as the disc type. This schematic illustrates an example of the relative shapes of the surface sections making up the first flow restriction between the movable sealing element 2 and on the manifold assembly on which it seals 53. The restriction can be formed in such a way that the effective flow area between these surfaces sections varies as a function of the relative transition stroke position of the movable sealing element 2 with respect to the manifold assembly on which it seals.

Referring to FIGS. 144A through 144D; shown are schematics of substantially similar elements and functionality to those detailed in FIGS. 142A through 142D. A substantial difference between these two sets of schematics is that one of the two solid parts, 62*b*, surrounds the other solid part 62*a* on enough sides to effectively form a fluid cavity between the two parts. The geometry produces a distinct pressure communication passage at each interface of the two parts. Parts 62*a* and 62*b* could, but do not necessarily, represent the movable spool element 2 and the manifold on which it seals 53, irrespectively.

In the first position shown in FIG. 144A, the two parts are positioned with respect to one another such that both pressure communications passages have substantially negligible effective fluid flow areas 61. Therefore, these surface interfaces act as effective sealing interfaces between the fluid cavity 33 and the two fluid volumes at respective pressure levels 57*a* and 57*b*.

Due to the substantial difference in the respective effective lengths of each of the sealing flow restrictions as depicted, the sealing interface on the right side of part 62*b* is substantially less restrictive than the sealing interface to the left side of part 62*b*. Therefore, even in this first sealing position, the right sealing flow passage may be understood to be the primary pressure communication feature between the fluid cavity 33 and other system pressure levels. It is therefore reasonable to assume that the change in fluid pressure across the right flow passage is substantially lower at any flow rate than the change in fluid pressure over the left flow passage at the same flow rate.

As the two parts 62*a* and 62*b* move with respect to one another along the axial direction 54 of the movable sealing element 2 to other positions shown in FIGS. 144B and 144C, the effective flow area of the right flow path varies as a function 66 while the effective flow area of the sealing interface 64 that makes up the left flow passage 70 remains substantially constant and negligible.

As the two parts move with respect to another, the volume of the fluid cavity varies linearly, forcing fluid to enter or exit through the two flow passages, depending on the direction of relative motion of the two parts with respect to another. It is clear that due to the variable, position dependent nature of the effective flow restriction formed by the right flow passage, the resistive damping effect the two parts have on each other also varies in a similar manner as a function of the relative position of the two parts with respect to another along the axial direction 54.

Referring to FIGS. 145A through 145B, a schematic is shown of substantially similar elements and functionality as previously detailed in FIGS. 144A through 144D. This schematic shows a specific embodiment of a position dependent damping feature wherein the effective fluid flow area 61 and the effective restriction length of the primary pressure communication path 69 between the fluid cavity 33 and another fluid volume do not vary substantially as a function 66 of the relative position 63 of parts 62*a* and 62*b* with respect to another. This embodiment results in a substantially constant, positionally independent damping effect of one part with respect to the other part, 62*a* & 62*b*, respectively.

Referring to FIGS. 146A and 146B; shown is a schematic of two different embodiments of the second flow restriction 36 along the flow path 26 between the first and second ports. The movable sealing element 2 is shown in the second mode position of a spool type diverter valve. In the second mode positions of the embodiments of the diverter valves shown in FIGS. 146A & 146B, the ends of both spools 2 establish partial axial seals 54 with the sealing manifold assembly 53 at the sealing interface 55. Pressure levels 57*a*, 57*b*, and 57*c* are all pressure levels along the flow path between the first and second ports. As the fluid flow following the flow path between the first and second ports passes through the second flow restriction, an effective separation fluid pressure force acts on the surface sections forming the flow restriction. Since the effective flow area of the restriction is substantially less than the effective flow areas of the flow passages just before and just after the restriction, by design, the result is an equal and opposite pressure force acting on the pair of projected pressure areas of the second flow restriction, shown by the pair of pressure force arrows 71*a* & 71*b*.

In embodiments of this second flow restriction where all surface sections that form the restriction are part of the same part or assembly, such as in FIG. 146A, the effective separating pressure forces experienced by this part or assembly are only experienced internally and do not contribute to the overall net force balance acting on this part or assembly. This is the case for the movable sealing element 2 during the second mode, in the embodiment as shown in FIG. 146A.

In the case of the embodiment shown in FIG. 146B, the surface sections forming the second flow restriction along the flow path between the first and second ports are shared between both the movable sealing element 2 and its sealing manifold assembly 53. In this case, the net pressure separating forces acting on the surface sections forming this second flow restriction are shared between the movable sealing element and its sealing manifold assembly. Therefore, the separating pressure force generated by flow passing through the second flow restriction acts to substantially contribute to the overall net force balance acting on the shown type of embodiment of the movable sealing element during the second mode.

Referring to FIGS. 147A and 147B; shown is an embodiment of a spool type rebound diverter valve (RDV). FIG. 147A shows the spool 2 in its second mode (activated) position. FIG. 147B shows the spool 2 in its first mode (de-activated) position. A remarkable feature of these embodiments that should explicitly be pointed out is the damper rod 42, along with the spool type movable sealing element 2, is partially responsible for forming the first flow restriction 20 along the flow path between the first and second ports of the diverter valve assembly, as indicated by fluid flow arrows 26. The axial direction of motion of the movable sealing element 2 is indicated by motion arrows 54. The force element 6 that biases the spool 2 into it first mode position is shown as a closed ground spring in order to distribute the spring force relatively evenly over the entire spring support 7 surface. The spring sits in the spring cavity 33 that, during the first mode, is in primary pressure communication with the flow path between the first and second ports via several radial holes situated near the end of the spool such that during the transition stroke between the first and second modes, these holes gradually close off the primary pressure communication channels 50 with between spring cavity 33 and the flow path between the first and second ports until substantially all pressure communications paths between cavity 33 and other fluid volumes are along sealing interfaces as the movable sealing element transitions to its second mode position.

This is one embodiment of a spool feature designed to variably dampen the motion of the movable sealing element 2 during its transition between the first and second modes. These radial holes serve as primary pressure communication channels 50 between the spring cavity 33 and the flow path between the first and second ports during the first mode They serve as a second flow restriction 36 between the first and second ports during the second mode, such that this second flow restriction 36 is substantially greater than the first flow restriction 20 along that same path.

In FIG. 147A, fluid flow arrows 38 are shown that follow along the flow path between the first and third ports of the diverter valve. As the spool transitions between the first and second modes, flow features 28 in the primary radial sealing interface 56 between the spool 2 and the sealing manifold 53 gradually vary the effective fluid flow area between the first and third ports as a function of axial travel position of the spool 2. A progressive valve stack 5 is designed to add an additional effective fluid restriction to the flow path between the first and third ports during the second mode as well as during the transition between modes.

Referring to FIGS. 148A through 148C; shown is a schematic of an embodiment of a spool type diverter valve at the second flow restriction along the flow path between the first and second ports. FIG. 148A shows the second flow restriction in the first mode position. FIG. 148B shows that second flow restriction at an arbitrary point in the transition stroke position. FIG. 148C shows the second flow restriction in the second mode position. According to this embodiment, in the first mode position, the primary pressure communication channel 50 between the spring cavity 33 and the flow path 26 between the first and second ports is represented as several radial holes near the end of the spool (similar to as shown in the schematics of FIGS. 147A and 147B). During the transition stroke of the spool, the effective flow area 50 of these radial holes with respect to the spool cavity 61*b* decreases substantially without becoming an effective sealing interface before reaching the second mode position. These radial holes act as variable damping elements on the movable sealing element 2 during its transition between modes. In this embodiment, the primary pressure communication channel 50 between the spring cavity 33 and the port with which it communicates is still substantial during the second mode.

Another feature of the spool type diverter valve detailed in FIGS. 148A through 148C is the way in which the secondary flow restriction 36*a* that exists in the first mode, transforms into the secondary flow restriction 36*b* as it exists in the second mode, by fully sealing off the original flow path 36*a* while simultaneously opening up a new flow passage 36*b*. A shaped insert 58 that is part of the manifold assembly 53 is used to define the way in which the effective flow area 61*a* of the secondary flow restriction, as it exists during the first mode, varies as a function of the axial stroke position of the movable sealing element 2. Simultaneously, sections of the radial holes 36*b* that form the primary pressure communication channels 50 between the spring cavity 33 and the flow path between the first and second ports 26 become gradually uncovered (refer to FIG. 148B), proportional to the axial stroke position of the spool. These sections fully form the second fluid flow restriction 36*b* during the second mode (refer to FIG. 148C), or, depending on the shape of the insert, can already contribute to the secondary flow restriction 61*a* prior to the spool 2 reaching the second mode position (refer to FIG. 148B).

Referring to FIGS. 149A and 149B; shown is a schematic of an embodiment of a spool type diverter valve. This embodiment is substantially similar to the embodiment shown in FIGS. 148A through 148C, the main difference being the geometry of the shaped insert 58 that is part of the manifold assembly 53 and determines how the effective flow area 61*a* of the second flow restriction varies as a function of the axial stroke position of the movable sealing element. In embodiment shown in FIGS. 149A and 149B, the shaped insert 58 is designed such that it creates an effective radial sealing interface 55 with the inner diameter of the end of the movable sealing element 2 at some point during the axial transition stroke between the first and second modes, such that, in the second mode, all sealing surfaces on the spool are purely oriented in the radial direction (perpendicular to the direction of travel of the spool 2 during the transition between the first and second modes).

Gerotor

Some aspects relate to a broadband pressure/flow ripple attenuator for positive displacement pumps/motors. Other aspects relate to a broadband pressure ripple attenuator for use in vehicle systems such as active suspension systems.

Generally, except where context indicates otherwise, references to an inlet port are synonymous with a first port and references to an outlet port are synonymous with a second port. This port reference is the standard operating mode; however, all ports can be either inlet ports or outlet ports depending on the unit operating mode. In addition, a single port may be used to act as both an inlet and an outlet port.

Generally, references to a hydraulic pump/motor include hydraulic pumps, hydraulic motors, or devices that can act as both hydraulic pumps and motors. Such references include but are not limited to positive displacement hydraulic pump/motors.

Turning now to the figures and initially FIG. 150, a hydraulic pump/motor consists of a gerotor set comprised of an outer element 28-1 with N+1 teeth and an inner element 28-2 with N teeth is shown. The gerotor is bound on one of its faces by a manifold 28-12 which contains an inlet kidney port 28-9 and an outlet kidney port 28-10; these ports are in direct communication with the pockets of the gerotor. The manifold 28-12 contains buffer communication ports 28-26 and 28-27. In this embodiment the buffer communication port 28-26 can be considered an inlet port, and buffer communication port 28-27 can be considered an outlet port. At the depicted angular orientation of FIG. 150, the buffer inlet port 28-26 is exposed to the inlet kidney port 28-9 and the buffer outlet port 28-27 is sealed from the inlet kidney port 28-9. At other angular orientations buffer inlet port 28-26 may be sealed from the inlet kidney port 28-9 while buffer outlet port 28-27 may be exposed. There may also be angular orientations at which both buffer ports 28-26 and 28-27 are sealed to the inlet kidney port 28-9 by the lobe of inner element 28-2. When considering a counter clockwise (CCW) rotation of the gerotor and the gerotor operating as a motor, the orientation of the buffer ports 28-26 and 28-27 is such that when rotating into the known orientation of pressure rising above the theoretical nominal pressure, the inlet port comes into fluid communication with buffer port 26 in the manifold 28-12. This causes pressure to be transmitted from the inlet port 28-9 into the buffer port 28-26. Upon further CCW rotation, the inner element 28-2 seals off both inlet and outlet buffer ports 28-26 and 28-27 from communication with the gerotor inlet port 28-9 and the pressure inside the buffer chamber holds steady. Upon further CCW rotation toward the known orientation of pressure falling below the theoretical nominal pressure, the inlet port 28-9 comes into communication with the buffer outlet port 28-27 in the manifold 28-12, and the buffer chamber pressure is transmitted out of buffer outlet port 28-27 through flow notch 28-17 and back into gerotor inlet port 28-9. Hence, when the gerotor is in the regime of pressure rising above the theoretical nominal pressure, due to the actual flow rate of the gerotor being higher than that of the nominal flow rate, an oil volume is directed from gerotor inlet port into the buffer, thereby reducing the actual gerotor flow rate close to or at the nominal gerotor flow rate. This volume of oil is then stored in the buffer at, or close to, the nominal operating pressure of the gerotor, during a time when the flow rate transitions from being above the nominal flow rate to being below the nominal flow rate, and when the gerotor is in the regime of pressure falling below the theoretical nominal pressure, due to the actual flow rate of the gerotor being lower than that of the nominal flow rate, this oil volume is directed out from the buffer into the gerotor inlet port, thereby raising the actual gerotor flow rate close to, or at, the nominal gerotor flow rate. This has the effect of significantly reducing the flow ripple, and hence the pressure ripple of the gerotor and as the buffer accepts, stores and re-injects the 'flow mis-match volume' at or near the operating pressure of the gerotor, there is little energy, and hence efficiency lost from the ripple attenuation. In fact if the port timing were perfect and the flow into and out of the buffer could happen without any pressure loss from the nominal gerotor pressure, then the buffer would reduce completely any ripple and without any loss in efficiency. Obviously in practice it is not possible to obtain perfect port timing and to transfer fluid to and from the buffer without pressure loss so some ripple will remain and there will be some loss in efficiency. Although the depiction of a gerotor acting as a motor, operating in a CCW direction is discussed above, the operation of the buffer may be similar when the gerotor operates in any direction and acts as either a motor or a pump and it is possible to use either the lobes of either the inner element 28-2 or the outer element 1 to expose and conceal the buffer ports 28-26 and 28-27 to the inlet port 28-9, and the buffer ports may be in communication with the outlet port 28-10 instead of the inlet port 28-9 depending upon application, and hence the invention is not limited in this regard.

In order to achieve optimal port timing between the buffer and either the gerotor inlet or outlet, a preferred embodiment of that of FIG. 151 may be used.

In FIG. 151 a similar embodiment to that of FIG. 150 is shown, whereby flow notches 28-17 are featured in the inner element 28-2.

The inner element 28-2 contains a plurality of flow notches 28-17 equal to the number of lobes on the inner element 28-2. These notches are in fluid communication with the pocket formed between outer element 28-1 and inner element 28-2 at the location of the notch. Consider first counter clockwise (CCW) rotation of the gerotor and the gerotor operating as a motor. When rotating into the known orientation of rising pressure above the theoretical nominal pressure, one of the flow notches 28-17 first comes into fluid communication with buffer port 28-26 in the manifold 28-12. This causes pressure to be transmitted from the inlet port 28-9 into the buffer port 28-26 through the flow notch 28-17. Upon further CCW rotation, the inner element 28-2 seals off both inlet and outlet buffer ports 28-26 and 28-27 from communication with the gerotor inlet port 28-9 and the pressure inside the buffer chamber holds steady. Upon further CCW rotation toward the known orientation of falling pressure below the theoretical nominal pressure, the notch 28-17 comes into communication with the buffer outlet port 28-27 in the manifold 28-12, and the buffer chamber pressure is transmitted out of buffer outlet port 28-27 through flow notch 28-17 and back into gerotor inlet port 28-9. Thereby ripple attenuation is achieved in a similar manner to that of embodiment of FIG. 150.

Although the depiction of a gerotor acting as a motor, operating in a CCW direction is discussed above, the operation of the buffer may be similar when the gerotor operates in any direction and acts as either a motor or a pump, and it is possible to incorporate the flow notches 28-17 into either the inner element 28-2 or the outer element 28-1 to open and close the buffer ports 28-26 and 28-27 to the inlet port 28-9, and the buffer ports may be in communication with the outlet port 28-10 instead of the inlet port 28-9 depending upon application, and hence the invention is not limited in this regard.

In FIG. 152 a gerotor set with a flow manifold including buffer ports 28-12 is shown.

The buffer inlet flow port 28-26 is hydraulically connected to passage 28-18 which leads directly to a chamber 28-19. The chamber 28-19 may include a moveable piston or any compressible medium as described in previous sections such as a rubber bladder or gas bag. The buffer outlet port 28-27 is likewise in communication with the chamber 28-19 via the same or similar passage 28-18. In the embodiment shown, the buffer port 28-26 and passage(s) 18 along with buffer chamber 28-19 are located in flow manifold 28-12; it is also possible for these features to be located in a separate body and the invention should not be limited in this regard.

As known in the art, it is necessary to ensure that the inner and outer gerotor elements remain in axial hydraulic balance, and the use of shadow ports in a gerotor cap, opposite to the gerotor inlet and outlet flow ports in the gerotor manifold, is well understood, to this end it is possible to have shadow notches on an opposing gerotor cap that are of similar shape, size and position to that of the buffer ports 28-26 and 28-27 so as to provide an axial hydraulic balance on the inner element. The shadow notches may or may not break through to the shadow ports in the gerotor cap.

Referring to FIG. 153, the inner gerotor element with buffer notches is shown.

In the embodiment shown in FIG. 153, the inner element 28-2 contains buffer flow notches 28-17 that are contained in the profile of the element itself. The buffer flow notches 28-17 may extend some depth through the thickness of the inner element 28-2 but preferentially not all the way through. Although the depth of the notch is not critical to the port timing the depth may have impact on the pressure loss due to flow through the notch and as such this depth may be sized taking into account pressure loss and structural integrity of the gerotor element. The notches 28-17 may extend radially toward the center of the inner element but it is preferential not to extend all the way to the inner bore 28-200.

As known in the art, it is necessary to ensure that the inner and outer gerotor elements remain in axial hydraulic balance, and the use of shadow ports in the gerotor cap, opposite to the gerotor inlet and outlet flow ports in the gerotor manifold is well understood, to this end it is possible to have shadow notches on the opposite face of the inner gerotor that are of similar shape, size and position to that of the flow notches 28-17 so as to provide an axial hydraulic balance on the inner element.

In FIG. 154 a lower flow manifold with buffer ports is shown.

The inlet buffer port 28-26 and the outlet buffer port 28-27 are both featured in the face of lower flow manifold 28-12. Their orientation on the manifold is determined from flow analysis and corresponds to orientations of nominally rising and falling pressure. When considering the lower flow manifold 28-12 as an individual part, the buffer ports 28-26 and 28-27 are not directly connected to the gerotor inlet port 28-9 or outer port 28-10.

Referring to FIG. 155, the lower flow manifold 28-12 with integrated buffer is shown.

In the embodiment shown in FIG. 155, the compressible medium is a gas volume 28-29 with a moveable piston 28-28. The buffer inlet port 28-26 is connected to buffer passage 28-18 which is in turn connected to buffer chamber 28-19. The gas compression volume 28-29 is separated and sealed from buffer chamber 28-19 by piston 28-28. In the primary mode of operation (CCW rotation of the gerotor), as buffer inlet port 28-26 is exposed to gerotor inlet port 28-9, uncovered by lobes of inner element 28-2 as discussed above, the rising pressure in gerotor inlet port 28-9 is communicated through buffer passage 28-18 and into buffer chamber 28-19. The rising buffer chamber 28-19 pressure causes the force on piston 28-28 to increase thereby compressing the gas volume 28-29 and causing the gas pressure to increase. This process absorbs some amount of the rising pressure in gerotor inlet port 28-9 by volume compensation. When the buffer outlet port 28-27 becomes exposed to the falling pressure in gerotor inlet port 28-9 the reverse process occurs and flow is induced from buffer chamber 28-19 through buffer passage 28-18 and out of buffer outlet port 28-27 back into gerotor inlet port 28-9. This depressurizes gas compression volume 28-29 and the piston 28-28 strokes accordingly. This cycle repeats for every lobe passing of inner element 28-2 and thus every instance of notch 28-17. The mean compression of volume 28-29 depends on the average pressure at port 28-9, the compression and expansion process described above is attributable to only the higher frequency ripple in pressure and not to lower frequency changes in overall system pressure. Overall changes in average system pressure will cause the nominal compression and pressure of gas volume 28-29 to change as well; this will generally occur at a lower frequency than the process described above. It is recognized that there is an ideal shape, size and orientation for ports 28-26 and 28-27 as well as notches 28-17, however other shapes, sizes and orientations are possible and as such the present invention should not be limited in this regard.

In FIG. 156 an external gear pump/motor with buffer ports is shown.

In the embodiment shown in FIG. 156, the positive displacement pump/motor is an external gear pump/motor with gear members 28-45 and 28-46. The function of this device is largely the same as previous embodiments. At some orientation of known rising pressure in inlet port 28-9, a buffer inlet port 28-26 is exposed by the lobes of element 28-45 (or 28-46), whereby a corresponding buffer passage and buffer chamber is in communication with buffer inlet port 28-26 and some compressible medium serves to absorb pressure fluctuations. At some orientation of known falling pressure in inlet port 9, a buffer outlet port 28-27 (not shown) is exposed by the lobes of element 28-45 (or 28-46), and the reverse process occurs whereby flow is induced from buffer chamber through a buffer passage and out of buffer outlet port 28-27 back into the inlet port 28-9.

It is possible to include flow notches (similar to those of notches 28-17 in the previous embodiments) on the face of the gear 28-45 (or 28-46) to communicate the inlet port 28-9 with the buffer communication ports 28-26 and or 28-27, to optimize the buffer port timing as described in the previous embodiments.

It is recognized that there is an ideal shape, size and orientation for ports 28-26 and 28-27 as well as notches 28-17, however other shapes, sizes and orientations are possible and as such the present invention should not be limited in this regard.

In FIG. 157 an axial piston pump/motor cylinder block and port plate with buffer ports is shown.

In the embodiment shown in FIG. 157, the positive displacement pump/motor is an axial piston pump/motor (such as a swashplate type or bent axis type) with a cylinder block 28-51 and a port plate 28-52. The function of these types of hydraulic units are well understood in the art, and the device shown in the embodiment will operate in the usual manner with the exception of the addition of the flow notches 28-17 in the cylinder block 528-1, buffer communication ports 28-26 and 28-27 in the port plate 28-52 (this could also be a manifold as per the previous embodiments) that communicate to a buffer attenuator (not shown) as described in previous embodiments. At some orientation of known rising pressure in inlet port 28-9, a buffer inlet port 28-26 is exposed to the inlet port 28-9 by the flow notches 28-17 in the cylinder block 28-51, whereby a corresponding buffer passage and buffer chamber is in communication with buffer inlet port 28-26 and some compressible medium serves to absorb pressure fluctuations. At some orientation of known falling pressure in inlet port 28-9, a buffer outlet port 28-27 is exposed to the inlet port 28-9 by the flow notches 28-17 in the cylinder block 28-51, whereby a corresponding buffer passage and buffer chamber is in communication with buffer outlet port 28-27 and the reverse process occurs, whereby flow is induced from the buffer chamber through a buffer passage and out of buffer outlet port 28-27 back into the inlet port 28-9.

Referring to FIG. 158 a buffer chamber assembly with an expandable compliant material is shown.

In the embodiment shown in FIG. 158 the buffer gas compression volume 28-29 is created by a void in buffer cup 28-49 and bound by a complaint rubber membrane 28-48 that is pinched between the buffer cup 28-49 and the porous bounding plate 28-47. The initial pressure in buffer chamber 28-29 may be pre-charged by charge port 28-50 and thus be higher than the pressure on the right hand side of bounding plate 28-47 causing the rubber membrane 28-48 to be forced against bounding plate 28-47. The holes in bounding plate 28-47 allow hydraulic pressure acting on the right hand side of bounding plate 28-47 to be transmitted through to rubber membrane 28-48. When and only when the pressure on the right hand side of bounding plate 28-47 rises above the pre-charge pressure in buffer chamber 28-29, the rubber membrane 28-48 deforms by stretching to compress the gas in buffer chamber 28-29 until the pressure on both sides of rubber membrane 48 are equal or nearly equal due to any additional force on membrane 48 attributable to the stiffness of the rubber membrane 28-48 itself. When the pressure on the right hand side of bounding plate 28-47 is lower or equal to the pre-charge pressure in buffer chamber 28-29, the rubber membrane 28-48 will remain forced against bounding plate 28-47 and the buffer will not be active.

Referring to FIG. 159 a buffer chamber assembly with a collapsible compliant material is shown.

In the embodiment shown in FIG. 159 the buffer gas compression volume 28-29 is created by a void in buffer cup 28-49 much the same as in FIG. 158. The initial gas pressure in buffer chamber 28-29 may be pre-charged by charge port 28-50 and thus be higher than the pressure on the right hand side of bounding plate 28-52 causing the rubber membrane 28-51 to be forced against bounding plate 28-52. The holes in bounding plate 28-52 allow hydraulic pressure acting on the right hand side of bounding plate 28-52 to be transmitted through to rubber membrane 28-51. When and only when the pressure on the right hand side of bounding plate 28-52 rises above the pre-charge pressure in buffer chamber 28-29, the rubber membrane 28-51 deforms by collapsing to compress the gas in buffer chamber 28-29 until the pressure on both sides of rubber membrane 28-51 are equal or nearly equal due to any additional force on membrane 28-51 attributable to the stiffness of the rubber membrane 28-51 itself. Although a rubber membrane is described in the embodiments above shown in FIG. 158 and FIG. 159, it is possible that a metallic or plastic membrane is utilized. The metallic or plastic membrane may incorporate convolutions so as to give the membrane elasticity so it may deflected under pressure without offering any significant stiffness that will cause a pressure differential between the gas pressure in chamber 28-29 and the hydraulic pressure applied to it, and to allow then membrane to deflect without fatiguing.

Referring to FIG. 160 a buffer chamber assembly with a metallic diaphragm compliant material is shown.

In the embodiment shown in FIG. 160 the buffer gas compression volume 28-29 is created by a void in buffer cup 28-49 much the same as in FIGS. 158 and 159. The initial gas pressure in buffer chamber 28-29 may be pre-charged by charge port 50 and thus be higher than the pressure on the right hand side of bounding plate 28-47 causing the metallic diaphragm 28-53 to be forced against bounding plate 28-47. When and only when the pressure on the right hand side of bounding plate 28-47 rises above the pre-charge pressure in buffer chamber 28-29, the metal diaphragm 28-53 deforms by flexing at its convolutions to compress the gas in buffer chamber 28-29 until the pressure on both sides of metallic diaphragm 28-53 are equal or nearly equal due to any additional force on diaphragm 28-53 attributable to the stiffness of the metallic diaphragm 28-53 itself.

Referring to FIG. 161 a buffer chamber assembly with a gas, the nominal pressure of which references bulk system pressure, is shown.

In the embodiment shown in FIG. 161 the buffer gas compression volume 28-29 is created by a void in buffer cup 28-49 as in the above embodiments and bound by a compliant membrane 28-48 on one side and by a gas-permeable wall 28-55 on the other. The initial gas pressure in buffer chamber 28-29 may be atmospheric and compliant membrane 48 is initially against porous bounding plate 28-47. Gas reservoir 56 is bound by the other side of gas-permeable wall 28-55 and by floating piston 28-54. Both the backside of floating piston 28-54 and the front of compliant membrane 48 are exposed to the variable system pressure in fluid path 28-57. Under low frequency rising system pressure in fluid path 28-57 the force on floating piston 28-54 increases causing it to move to the right to compress gas reservoir 28-56. Gas-permeable wall 28-55 is tuned as a damper such that it provides little resistance to flow for low-frequency changes in gas pressure and high resistance to flow for high-frequency changes in gas pressure. As floating piston 28-54 compresses gas reservoir 28-56 at low frequency some of the gas permeates through gas-permeable wall 28-55 and fills buffer chamber 28-29 causing the pressure to rise. Compliant membrane 28-48 has enough restoring force that it remains relatively forced against porous bounding plate 28-47 during this low frequency process. As high frequency changes in system pressure (pressure ripple) rise above and below the bulk system pressure they act on the front of compliant membrane 28-48 causing small deformations of membrane 28-48 to compress and expand buffer volume 28-29. Because the gas-permeable wall 28-55 is tuned with holes that provide high resistance to flow at high frequency changes in pressure the gas-permeable wall 28-55 acts as a bounding wall of buffer volume 28-29. In effect the low frequency pressure-volume is the combination of volumes 28-56 and 28-29 while the high frequency pressure-volume is restricted to volume 28-29. In this manner the "pre-charge" of buffer volume 28-29 is a reference of and always nearly equal in value to the nominal system pressure, eliminating the need for pre-charging this volume and for deforming compliant membrane 28-8 to accept large changes in system pressure. The only deformations of compliant membrane 28-48 are to accept high-frequency volumes caused by the high-frequency ripple of the system. Because the volume of buffer volume 28-29 remains constant while its pre-charge pressure varies, the effective compressibility or "volumetric stiffness" of the buffer volume 28-29 in the volume limit of high-frequency ripple is very nearly constant.

FIG. 162 shows a plot of pressure vs. compressed buffer volume. Assuming an initial buffer volume 28-29 at pressure P, the pressure in the volume will increase along curve 28-200 as the volume is compressed. The slope of the line dP/dV represents the volumetric stiffness of the buffer volume 28-29. The curve is concave up indicating that the volume becomes increasingly stiffer as it is compressed. As the volume is compressed from pressure P to pressure 5 P along curve 28-200 the slope increases dramatically to a level 28-202/28-201. If instead of compressing the initial buffer volume along curve 28-200 the buffer volume was kept constant while pressure was added to a level 5 P, as in the above embodiment, the pressure will then increase along curve 28-205 as the volume is compressed. The slope of line 28-205 at a pressure of 5 P is given by 28-204/28-203. The slope of line 28-200 at this same pressure level is dramatically larger meaning that a simple compressible volume results in a much stiffer buffer volume at increasing pressure.

To obtain a perfectly constant compressibility or volumetric stiffness for any level of system pressure, if required, it is also necessary to cause the buffer volume to increase with increasing pressure. This can be achieved by means of a separate gas chamber the volume of which is variable and connected freely to the buffer volume 28-29 similarly separated from gas reservoir 28-56 by gas-permeable wall 28-55. One method of varying the volume of this additional gas chamber is by way of a mechanical link to the floating piston 28-54. Another method of achieving a correctly variable buffer volume 28-29 is by allowing the gas-permeable wall to move in the opposite direction as floating piston 28-54, again possibly by a mechanical link. Other means of inducing motion of a wall to expand or contract buffer volume 28-29 such as piezo actuation are recognized and the invention should not be limited in this regard.

Referring to FIG. 163 a plot of pressure ripple attenuation with a buffer is shown. The data plotted in FIG. 163 is taken from a gerotor pump on a hydraulic flow bench. The gerotor is spun by means of a driveshaft with a level of torque such that a nominal pressure differential of around 170 psi is created from the inlet to the discharge of the gerotor unit. In this case the discharge pressure is held constant at approximately 400 psi and the inlet pressure drops below that level when torque is applied. The baseline gerotor pump pressure differential 28-206 can be seen to fluctuate or ripple at a consistent frequency which is the lobe frequency of the gerotor. The magnitude of ripple itself fluctuates slightly from lobe to lobe and is upwards of 70 to 80 psi from peak to peak. The gerotor pump outfitted with a ripple buffer has a pressure differential 28-207 that ripples at a very similar frequency to the baseline pressure 28-206, however, the magnitude is considerably lower, being around 35 psi from peak to peak. These two data sets came from actual test data on units tested back to back. Care was taken to ensure that assembly procedure had no influence on the differences between the two data sets (the only difference is the inclusion of the ripple buffer). This level of attenuation is approximately a factor of two or around −6 dB.

The embodiments above that utilize a gerotor pump/motor discuss the buffer ports and buffer features located in the flow manifold. There exist, however, other solutions in which the buffer features are located elsewhere. One solution is for buffer features to be contained in a blind end top cap connected to shadow ports. Another possible solution is to locate the buffer features external to the primary gerotor ports in some external body.

The invention claimed is:

1. An integrated electro-hydraulic pump system, comprising:

- a first housing that includes:
  - a controller; and
  - a rotary position sensor; and
- a second housing that includes:
  - a quantity of hydraulic fluid contained in a volume in the second housing;
  - a bulkhead portion that separates the volume in the second housing from the first housing,
  - an electric motor with a stator and a rotor, wherein the electric motor is received in a cavity partially formed by a second portion of the second housing and the bulkhead portion;
  - a hydraulic pump that is positioned coaxially relative to the rotor and operatively coupled to the rotor, wherein the rotor is immersed in the quantity of hydraulic fluid;
  - a source magnet coaxially located and connected to the rotor and immersed in the quantity of hydraulic fluid, wherein the source magnet has a magnetic field;
  - a sensor shield received in a central opening of the bulkhead portion and interposed between the source magnet and rotary position sensor, wherein the sensor shield is constructed from a non-magnetic material, wherein an inner surface of the sensor shield is exposed to a pressure of the quantity of hydraulic fluid, and wherein the sensor shield is configured to maintain an air gap between an outer surface of the sensor shield and the rotary position sensor; and
  - a first port and a second port wherein at least the first port is in fluid communication with the quantity of hydraulic fluid, wherein the rotary position sensor is configured and positioned to measure an orientation of a portion of the magnetic field of the source magnet that penetrates through the sensor shield, and wherein the controller is configured to determine an angular position of the rotor based on the measurement.

2. The system of claim 1, further comprising a first hydraulic seal located between the sensor shield and the bulkhead portion.

3. The system of claim 2, wherein the electric motor is a BLDC motor.

4. The system of claim 3, wherein the bulkhead portion and the second portion of the second housing are distinct portions, and wherein a second hydraulic seal is interposed between the bulkhead portion and the second portion of the second housing.

5. The system of claim 1, further comprising a temperature sensor configured to measure a temperature, wherein the controller is configured to correct for errors due to a temperature variance at the rotary position sensor.

6. The system of claim 1, wherein the electric motor is a BLDC motor.

7. The system of claim 1, wherein second portion of the second housing is substantially cylindrical.

8. The system of claim 1, wherein the system is configured to supply hydraulic fluid to an active suspension actuator, and wherein the active suspension actuator is configured to operate at a maximum working pressure in at least one operating condition.

9. The system of claim 8, wherein in the at least one operating condition the quantity of hydraulic fluid has a pressure that is equal to the maximum working pressure.

10. The system of claim 9, wherein the maximum working pressure is equal to at least 150 bar.

11. An active suspension actuator system, comprising:

- a first housing that includes:
  - a controller; and
  - a rotary position sensor;
- a second housing that includes:
  - a quantity of hydraulic fluid contained in a volume in the second housing;
  - a bullkhead portion that separates the volume in the second housing from the first housing,
  - an electric motor with a stator and a rotor, wherein the electric motor is received in a cavity partially formed by a second portion of the second housing and the bulkhead portion;
  - a hydraulic pump that is positioned coaxially relative to the rotor and operatively coupled to the rotor, wherein the rotor is immersed in the quantity of hydraulic fluid;
  - a source magnet coaxially located and connected to the rotor and immersed in the quantity of hydraulic fluid, wherein the source magnet has a magnetic field;
  - a sensor shield received in a central opening of the bulkhead portion and interposed between the source magnet and rotary position sensor, wherein the sensor shield is constructed from a non-magnetic material, wherein an inner surface of the sensor shield is exposed to a pressure of the quantity of hydraulic fluid, and wherein the sensor shield is configured to maintain an air gap between an outer surface of the sensor shield and the rotary position sensor; and
  - a first port and a second port wherein at least the first port is in fluid communication with the quantity of hydraulic fluid, wherein the rotary position sensor is configured and positioned to measure an orientation of a portion of the magnetic field of the source magnet that penetrates through the sensor shield, and wherein the controller is configured to determine an angular position of the rotor based on the measurement; and an actuator that includes:

a first actuator port and a second actuator port;

wherein the first actuator port is in fluid communication with the first port of the second housing and the second actuator port is in fluid communication with the second port of the second housing.

12. The system of claim 11, wherein the actuator includes a compression volume and an extension volume, and wherein the first actuator port is in hydraulic fluid communication with the compression volume and the second actuator port is in hydraulic fluid communication with the extension volume.

13. A method of operating an electro-hydraulic pump of an active suspension actuator system, the method comprising:

disposing a magnetic sensor target on a rotor, of an electric motor of the electro-hydraulic pump, that is immersed in a hydraulic fluid;

disposing a diaphragm to establish a dry region that does not contain hydraulic fluid so that the magnetic sensor target passes proximal to a magnetic sensor across the diaphragm as the rotor rotates;

positioning the magnetic sensor in the dry region;

detecting an orientation of a magnetic field of the magnetic sensor target as it passes proximal to the magnetic sensor due to a rotation of the rotor;

determining an angular position of the rotor; and controlling an electric motor driving the electro-hydraulic pump at least partially based on the angular position of the rotor.

14. The method of claim 13, further comprising controlling at least one of torque and rotational speed of the rotor by adjusting current flowing through windings of the electric motor based on the determined angular position.

15. The method of claim 13, further comprising controlling at least one of torque and rotational speed of the rotor by commutating the electric motor based on the determined angular position, wherein the electric motor is a BLDC motor.

16. The method of claim 13, further comprising processing a series of angular positions of the rotor with at least one of a derivative and integration filter and an algorithm that uses velocity over time to determine position and acceleration of the rotor.

17. The method of claim 13, wherein the hydraulic fluid is pressurized to a maximum working pressure of the electro-hydraulic pump.

18. The method of claim 17, wherein the maximum working pressure exceeds an operable pressure limit of the magnetic sensor.

19. A system comprising:

a housing comprising a first compartment configured to contain hydraulic fluid;

a sensor compartment connected to the first compartment;

a rotary position sensor disposed in the sensor compartment;

an electric motor disposed in the first compartment, wherein the electric motor includes a rotor configured to be immersed in the hydraulic fluid in the first compartment;

a hydraulic pump configured to be disposed in the hydraulic fluid in the first compartment, wherein the electric motor is operatively coupled to the hydraulic pump;

a bulkhead at least partially separating the first compartment from the sensor compartment;

a sensor shield integrated with the bulkhead, wherein the sensor shield and the bulkhead are configured to separate the hydraulic fluid in the first compartment from the sensor compartment;

a source magnet attached to a first end portion of the rotor and configured to be immersed in the hydraulic fluid in the first compartment; and an air gap disposed between the sensor shield and the rotary position sensor, wherein the source magnet is coaxial with a rotational axis of the rotor, and wherein the rotary position sensor is configured and positioned to sense a magnetic flux of the source magnet through the sensor shield.

20. The system of claim 19, further comprising:

a controller housing that includes the sensor compartment; and a controller supported in the controller housing, wherein the controller is configured to determine an angular position of the electric motor based at least in part on an orientation of the magnetic flux of the source magnet.

21. The system of claim 20, wherein the controller is configured to control at least one selected from a torque and a velocity of the electric motor.

22. The system of claim 20, further comprising a temperature sensor configured to measure a temperature of the rotary position sensor, wherein the controller is configured to correct for errors due to a temperature variance of the rotary position sensor.

23. The system of claim 19, wherein the electric motor is a brushless direct current (BLDC) motor.

24. The system of claim 19, further comprising a hydraulic seal, wherein the hydraulic seal seals the sensor shield with the bulkhead.

25. The system of claim 19, wherein the sensor shield is constructed of a non-magnetic material.

26. The system of claim 19, wherein the bulkhead is constructed of a magnetic material.

27. The system of claim 19, wherein the rotary position sensor is shielded from external magnetic fluxes from magnets of rotor and motor stator windings of the electric motor.

28. The system of claim 19, wherein the sensor shield is configured to avoid contact with the rotary position sensor due to deflection of the sensor shield due to a pressure of the hydraulic fluid.

29. The system of claim 19, wherein a pressure of the hydraulic fluid in the first compartment during operation exceeds an operable pressure limit of the rotary position sensor.

30. The system of claim 19, wherein a first port of the hydraulic pump is configured to be in fluid communication with the hydraulic fluid contained within the first compartment and a first fluid connection port of the housing and a second port of the hydraulic pump is configured to be in fluid communication with a second fluid connection port of the housing.

31. The system of claim 30, further comprising a hydraulic actuator comprising a compression chamber and a rebound chamber, wherein one of the first port of the housing or the second port of the housing is fluidly coupled to the compression chamber, and wherein the other of the first port of the housing or the second port of the housing is fluidly connected to the rebound chamber.

32. The system of claim 31, wherein the hydraulic pump is fluidly coupled to the hydraulic actuator via hydraulic hoses.

33. The system of claim 31, wherein the hydraulic actuator, the first compartment, and the sensor compartment are integrated into the housing.

34. The system of claim 19, wherein the rotary position sensor comprises an array of Hall effect sensors, and wherein the source magnet comprises a diametrically magnetized two-pole magnet.

35. The system of claim 19, wherein the electric motor is configured to drive the hydraulic pump in a first mode of operation, and wherein the hydraulic pump is configured to back-drive the electric motor as a generator in a second mode of operation.

36. The system of claim 19, wherein the system is an electrohydraulic pump configured to supply fluid to an active suspension actuator.

37. The system of claim 19, wherein the rotary position sensor is coaxial with a rotational axis of the rotor.

38. The system of claim 19, wherein the rotor includes a rotor shaft, wherein a first end of the rotor shaft is operatively coupled to the hydraulic pump, and wherein the source magnet is attached to a second end of the rotor shaft.

39. An active suspension actuator comprising the system of claim 19.

* * * * *

UNITED STATES PATENT AND TRADEMARK OFFICE

CERTIFICATE OF CORRECTION

PATENT NO. : 12,179,539 B2
APPLICATION NO. : 18/491335
DATED : December 31, 2024
INVENTOR(S) : Zackary Martin Anderson et al.

It is certified that error appears in the above-identified patent and that said Letters Patent is hereby corrected as shown below:

In the Claims

In Claim 11, Column 338, Line 37 please delete “bullkhead” and insert -- bulkhead --

Signed and Sealed this
Eleventh Day of February, 2025

Coke Morgan Stewart
*Acting Director of the United States Patent and Trademark Office*